US00RE46108E

(19) United States
(12) Reissued Patent
Ohnishi et al.

(10) Patent Number: US RE46,108 E
(45) Date of Reissued Patent: Aug. 16, 2016

(54) COMMUNICATION DEVICE

(71) Applicant: Panasonic Intellectual Property Corporation of America, Torrance, CA (US)

(72) Inventors: Toshiaki Ohnishi, Kyoto (JP); Masaru Yamaoka, Osaka (JP); Mitsuaki Oshima, Kyoto (JP); Michihiro Matsumoto, Shiga (JP); Tomoaki Ohira, Tokyo (JP); Shohji Ohtsubo, Kanagawa (JP); Tsutomu Mukai, Osaka (JP); Yosuke Matsushita, Osaka (JP); Hironori Nakae, Osaka (JP); Kazunori Yamada, Aichi (JP)

(73) Assignee: PANASONIC INTELLECTUAL PROPERTY CORPORATION OF AMERICA, Torrance, CA (US)

(21) Appl. No.: 14/482,538

(22) Filed: Sep. 10, 2014

Related U.S. Patent Documents

Reissue of:

(64) Patent No.: 8,560,012
Issued: Oct. 15, 2013
Appl. No.: 13/262,030
PCT Filed: Nov. 30, 2010
PCT No.: PCT/JP2010/006987
§ 371 (c)(1),
(2) Date: Sep. 30, 2011
PCT Pub. No.: WO2011/065028
PCT Pub. Date: Jun. 3, 2011

(30) Foreign Application Priority Data

Nov. 30, 2009 (JP) ..... 2009-272792
Oct. 1, 2010 (JP) ..... 2010-224423
Nov. 25, 2010 (JP) ..... 2010-262993

(51) Int. Cl.
*H04W 36/00* (2009.01)
*G08C 17/00* (2006.01)

(52) U.S. Cl.
CPC ..... *G08C 17/00* (2013.01); *G08C 2201/20* (2013.01); *G08C 2201/32* (2013.01); *G08C 2201/71* (2013.01); *G08C 2201/91* (2013.01)

(58) Field of Classification Search
None
See application file for complete search history.

(56) References Cited

U.S. PATENT DOCUMENTS 5,648,813 A 7/1997 Tanigawa et al.

(Continued)

FOREIGN PATENT DOCUMENTS

EP 2 124 508 A1 11/2009

(Continued)

OTHER PUBLICATIONS

Office Action issued Jun. 24, 2014 in corresponding Chinese Application No. 201080006022.9 (with partial English translation).

(Continued)

*Primary Examiner* — Minh Dieu Nguyen
(74) *Attorney, Agent, or Firm* — Wenderoth, Lind & Ponack, L.L.P.

(57) ABSTRACT

The communication device can easily serve as an extended user interface such as a remote controller of a target apparatus without causing any complicated operations to a user. The communication device includes the following units. An apparatus information obtainment unit (203) obtains apparatus information from an apparatus. A position information obtainment unit (206) obtains position information of the communication device (102). An operation information obtainment unit (212) obtains operation information based on the apparatus information. A storage unit (213) stores the position information as apparatus position information indicating as a position of the apparatus, in association with the operation information. A direction sensor unit (207) detects direction of the communication device (102). A directional space calculation unit (208) calculates a directional space of the communication device (102). A selection unit (209a) specifies the apparatus existing in the directional space based on the apparatus position information and selects the operation information associated with the specified apparatus. An operation information transmission unit (215) transmits, based on the selected operation information, a control signal to the specified apparatus so as to allow the communication device to operate the apparatus.

9 Claims, 290 Drawing Sheets

(56) References Cited

U.S. PATENT DOCUMENTS

| | | | | |
|---|---|---|---|---|
| 6,118,442 | A | 9/2000 | Tanigawa | |
| 6,148,211 | A | 11/2000 | Reed et al. | |
| 6,348,956 | B1 | 2/2002 | Tanigawa et al. | |
| 6,424,838 | B1 | 7/2002 | Stobbe et al. | |
| 6,529,745 | B1 | 3/2003 | Fukagawa et al. | |
| 7,139,562 | B2 | 11/2006 | Matsui | |
| 7,212,228 | B2 * | 5/2007 | Utsumi et al. | 348/139 |
| 7,292,264 | B2 * | 11/2007 | Itokawa | 348/143 |
| 7,649,456 | B2 * | 1/2010 | Wakefield et al. | 340/539.13 |
| 7,668,533 | B2 * | 2/2010 | Hagiwara | 455/411 |
| 7,751,834 | B2 * | 7/2010 | Park | G01S 5/02 345/157 |
| 7,764,308 | B2 * | 7/2010 | Kusaka et al. | 348/211.3 |
| 7,768,420 | B2 * | 8/2010 | Neogi et al. | 340/12.53 |
| 7,864,043 | B2 * | 1/2011 | Camp et al. | 340/539.13 |
| 8,044,780 | B2 * | 10/2011 | Tseng et al. | 340/435 |
| 8,121,019 | B2 | 2/2012 | Tsutsui | |
| 8,213,914 | B2 * | 7/2012 | Kim et al. | 455/414.2 |
| 8,214,459 | B2 | 7/2012 | Matsubara et al. | |
| 8,237,801 | B2 * | 8/2012 | Levien et al. | 348/207.1 |
| 8,400,530 | B2 | 3/2013 | Ikeda et al. | |
| 8,443,055 | B2 * | 5/2013 | Imai et al. | 709/218 |
| 8,447,514 | B2 * | 5/2013 | Kato | 701/431 |
| 8,549,109 | B2 | 10/2013 | Matsubara et al. | |
| 8,560,012 | B2 | 10/2013 | Ohnishi et al. | |
| 8,627,075 | B2 | 1/2014 | Ikeda et al. | |
| 8,692,905 | B2 | 4/2014 | Ikeda et al. | |
| 8,892,688 | B2 | 11/2014 | Matsubara et al. | |
| 2002/0047945 | A1 | 4/2002 | Tanigawa et al. | |
| 2004/0121725 | A1 | 6/2004 | Matsui | |
| 2008/0318576 | A1 * | 12/2008 | So et al. | 455/436 |
| 2009/0023462 | A1 | 1/2009 | Dent | |
| 2009/0081950 | A1 | 3/2009 | Matsubara et al. | |
| 2009/0290065 | A1 * | 11/2009 | Asayama et al. | 348/553 |
| 2009/0323667 | A1 * | 12/2009 | Doi et al. | 370/349 |
| 2010/0283586 | A1 | 11/2010 | Ikeda et al. | |
| 2011/0007901 | A1 | 1/2011 | Ikeda et al. | |
| 2011/0312278 | A1 | 12/2011 | Matsushita et al. | |
| 2011/0316426 | A1 | 12/2011 | Iwanami et al. | |
| 2012/0019674 | A1 | 1/2012 | Ohnishi et al. | |
| 2012/0246687 | A1 | 9/2012 | Matsubara et al. | |
| 2013/0038634 | A1 | 2/2013 | Yamada et al. | |
| 2013/0196591 | A1 | 8/2013 | Ikeda et al. | |
| 2013/0218451 | A1 | 8/2013 | Yamada | |
| 2013/0247117 | A1 | 9/2013 | Yamada et al. | |
| 2014/0009268 | A1 | 1/2014 | Oshima et al. | |
| 2014/0020032 | A1 | 1/2014 | Matsubara et al. | |
| 2014/0105397 | A1 | 4/2014 | Ikeda et al. | |
| 2014/0152856 | A1 | 6/2014 | Ikeda et al. | |
| 2014/0206381 | A1 | 7/2014 | Yamada et al. | |
| 2014/0213290 | A1 | 7/2014 | Yamada | |
| 2015/0019970 | A1 | 1/2015 | Matsubara et al. | |

FOREIGN PATENT DOCUMENTS

| | | |
|---|---|---|
| JP | 7-135689 | 5/1995 |
| JP | 9-116985 | 5/1997 |
| JP | 10-215244 | 8/1998 |
| JP | 2000-270237 | 9/2000 |
| JP | 2001-249899 | 9/2001 |
| JP | 2001-516999 | 10/2001 |
| JP | 2003-234840 | 8/2003 |
| JP | 2003-296237 | 10/2003 |
| JP | 2004-048132 | 2/2004 |
| JP | 2004-145720 | 5/2004 |
| JP | 2004-166193 | 6/2004 |
| JP | 2004-201031 | 7/2004 |
| JP | 2004-297334 | 10/2004 |
| JP | 2005-354543 | 12/2005 |
| JP | 2006-099540 | 4/2006 |
| JP | 2006-146753 | 6/2006 |
| JP | 2006-266945 | 10/2006 |
| JP | 2006-279424 | 10/2006 |
| JP | 2007-43316 | 2/2007 |
| JP | 2007-134962 | 5/2007 |
| JP | 2007-221194 | 8/2007 |
| JP | 2007-228497 | 9/2007 |
| JP | 2007-304787 | 11/2007 |
| JP | 2008-170309 | 7/2008 |
| JP | 2008-287596 | 11/2008 |
| JP | 2008-306667 | 12/2008 |
| JP | 2009-080593 | 4/2009 |
| JP | 2009-193433 | 8/2009 |
| JP | 2009-229295 | 10/2009 |
| JP | 2010-147847 | 7/2010 |
| JP | 5419895 | 2/2014 |
| WO | 99/13662 | 3/1999 |
| WO | 2006/123413 | 11/2006 |
| WO | 2007/069323 | 6/2007 |
| WO | 2009/063628 | 5/2009 |
| WO | 2009/084243 | 7/2009 |

OTHER PUBLICATIONS

Extended European Search Report issued Jan. 30, 2014 in corresponding European Application No. 10832877.4.
Extended European Search Report issued Feb. 17, 2015 in corresponding European Application No. 14178337.3.
Office Action issued May 11, 2015 in U.S. Appl. No. 14/483,762.
International Search Report issued Feb. 22, 2011 in corresponding International Application No. PCT/JP2010/006987.

* cited by examiner

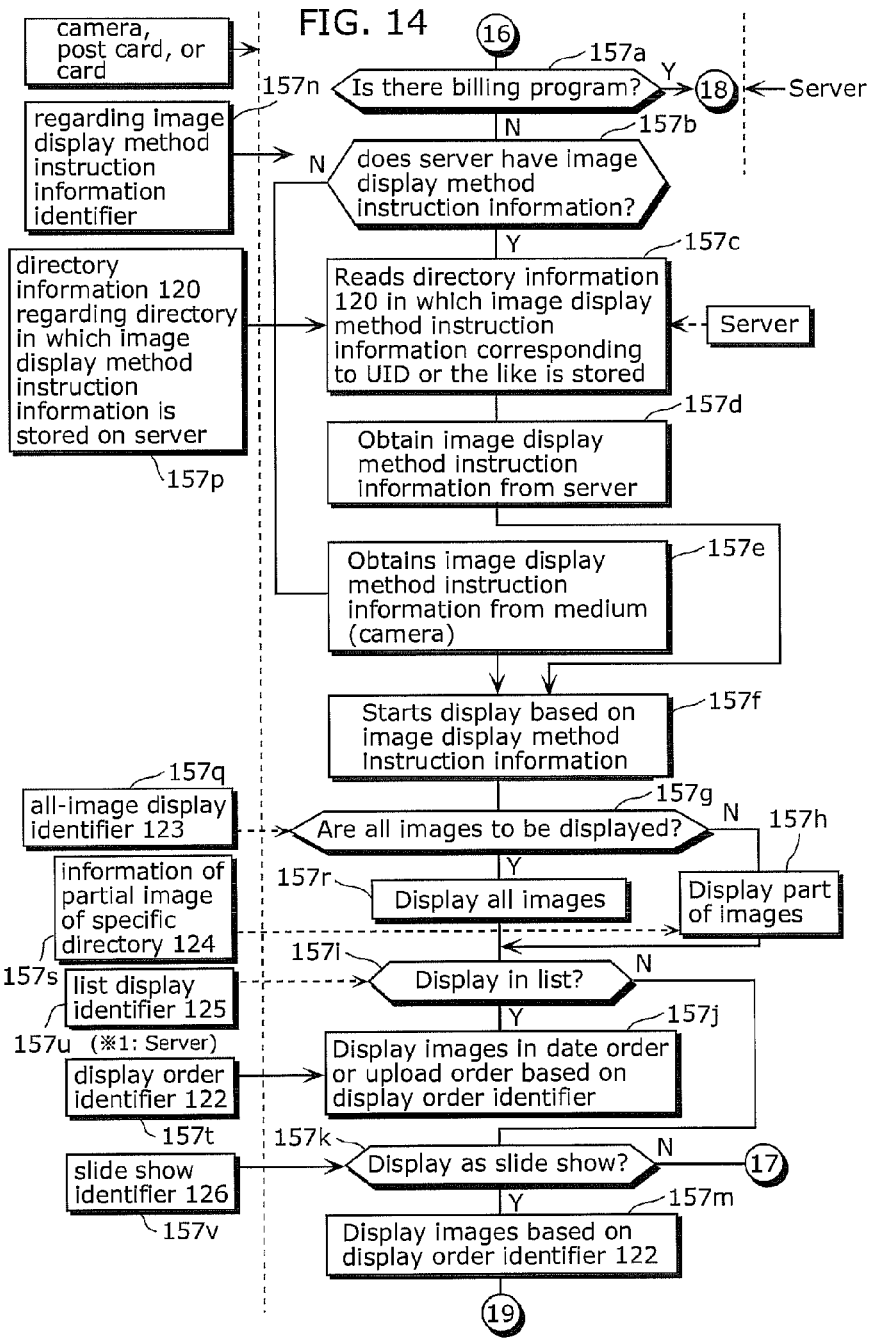
FIG. 14
16
camera, post card, or card
157a
Is there billing program?
Y
18
Server
157n
regarding image display method instruction information identifier
N
157b
does server have image display method instruction information?
N
Y
157c
directory information 120 regarding directory in which image display method instruction information is stored on server
Reads directory information 120 in which image display method instruction information corresponding to UID or the like is stored
Server
157p
157d
Obtain image display method instruction information from server
157e
Obtains image display method instruction information from medium (camera)
157f
Starts display based on image display method instruction information
157q
all-image display identifier 123
157g
Are all images to be displayed?
N
157h
Y
157r
Display all images
Display part of images
information of partial image of specific directory 124
157l
157s
list display identifier 125
Display in list?
N
Y
157j
157u
(※1: Server)
display order identifier 122
Display images in date order or upload order based on display order identifier
157t
157k
slide show identifier 126
Display as slide show?
N
17
Y
157m
157v
Display images based on display order identifier 122
19

FIG. 25

```
array picArray;

Main(void){                                  6006
        Bool cn = ConnectServer(URL);
        if(cn!=false){                                6007
                SetDownloaded(DLcomplete);
                picArray = DownloadedData(cn);
        }                                                 6008
        return;
}
                6009
                        6010
void DLcomplete(void){
        StartSlideShow(picArray);
        return
}
```

(a) Camera: Flowchart (Upload)

FIG. 40B
(b1)
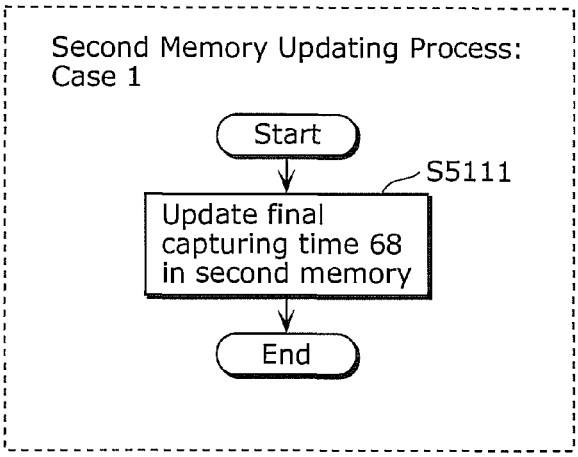
(b2)
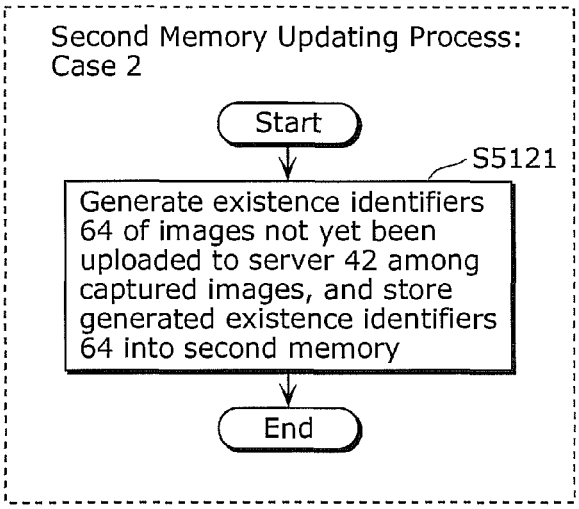

FIG. 40C
(b3)
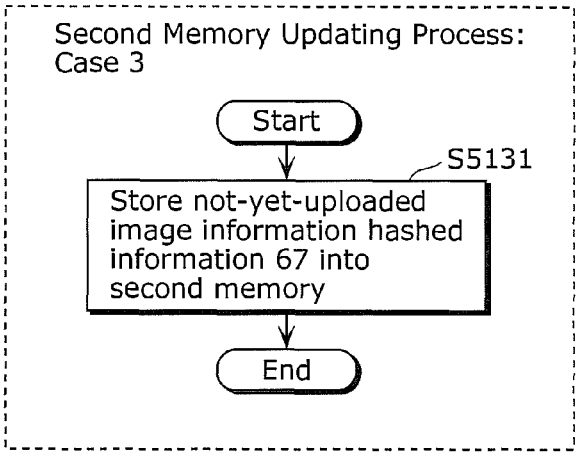
(b4)
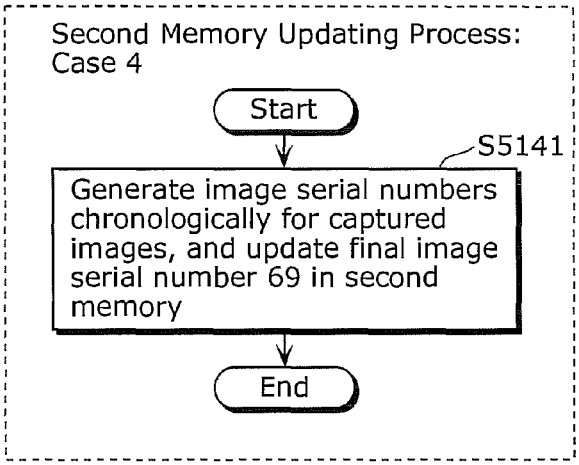

Uploading Process: case 1

Uploading Process: case 2

Uploading Process: case 3

Uploading Process: case 4

TV: Flowchart

FIG. 46A
(a)
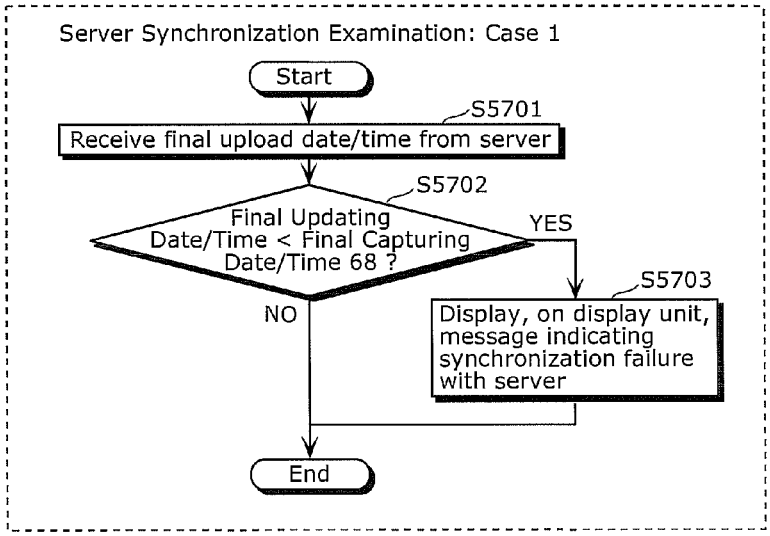
(b)
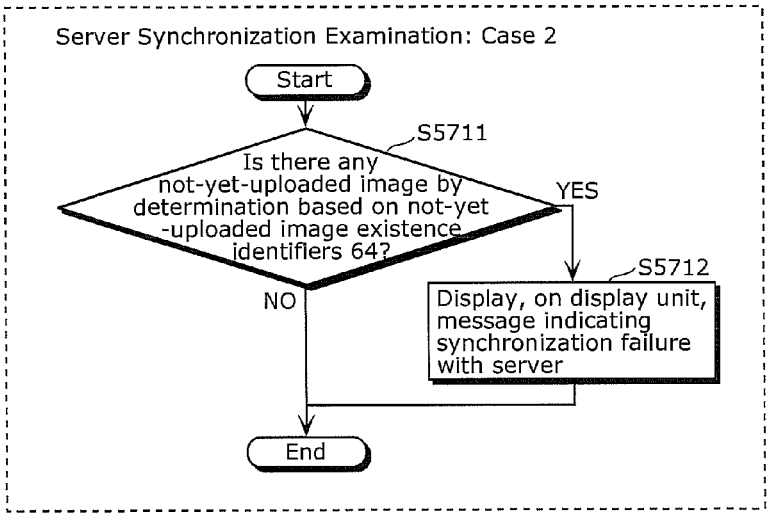

FIG. 46B
(c)
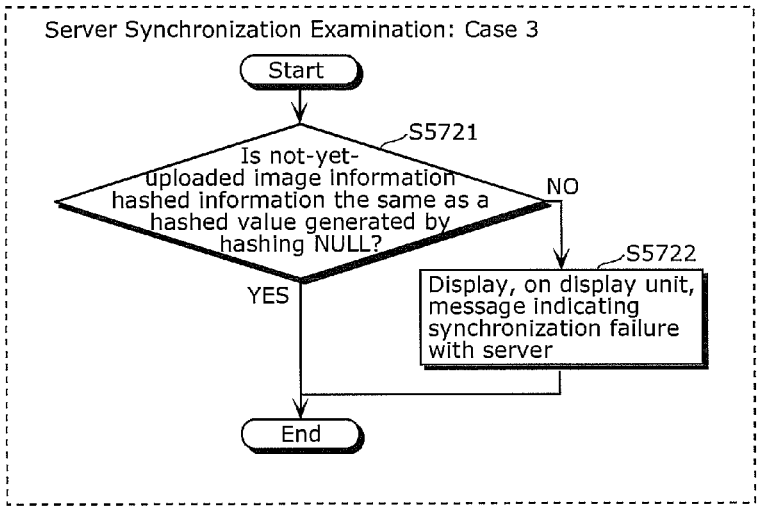
(d)
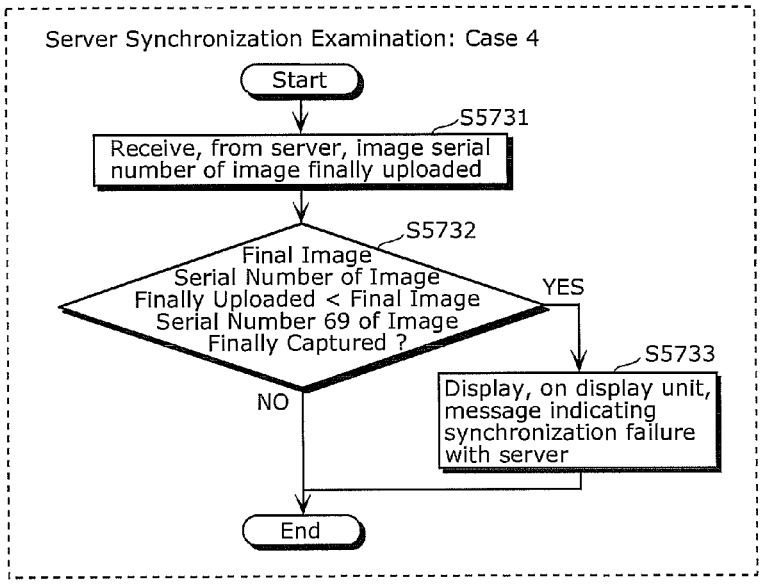

FIG. 47A

5940

(1)Uploading from Image Capturing Device (camera)

| | | | |
|---|---|---|---|
| Camera ID 5901 | Sever Address(www.panasonic-server.com) 5902 | | |
| Server Login ID 5903 | | Server Login Password 5904 | |
| Uploading-Image Number 5906 | | | |

FIG. 47B

5950

(2)RF-ID Communication

| Camera ID 5911 | Sever Address(www.panasonic-server.com) 5912 |
|---|---|
| Server Login ID 5913 | Server Login Password 5914 |
| Final Capturing Time (Case 1) 5915 | |
| Not-yet-Uploaded Image Data Existence Identifiers (Case 2) 5916 | |
| Not-yet-Uploaded Image Information Hashed Information (Case 3) 5917 | |
| Final Image Serial Number (Case 4) 5918 | |
| Captured Image Display Method Instruction Information 5919 | |

5928 5926

| Image ID | Upload |
|---|---|
| Sample1.jpg | Done |
| Sample2.jpg | Done |
| Sample3.jpg | Not yet |

5927 5920 5921 5922 5923 5924 5925

| Image ID | List Display | Slide Show | Print | Video Reproduction | Download | Security Password |
|---|---|---|---|---|---|---|
| Sample1.jpg | yes | automatic | disable | disable | disable | |
| Sample2.jpg | no | manual | allow | allow | allow | ××××××× |
| Sample3.jpg | no | disable | allow | manual | disable | ○○○○○○ |

FIG. 57

508

| Customer Attribute Database | | | | |
|---|---|---|---|---|
| ID | Gender | Age | Product/Service Genre | Price Range |
| 01 | Female | 20's to 30's | Reasonable Trip | ¥150,000 to ¥250,000 |
| 02 | Female | 30's to 40's | Childhood Products, Gourmet | less than ¥100,000 |
| 03 | Female | 50's to 60's | Fashion, Family Trip | ¥300,000 or more |
| 04 | Male | 20's to 30's | Reasonable Trip | ¥100,000 to ¥200,000 |
| 05 | Male | 30's to 40's | Childhood Products, Home Products | less than ¥50,000 |
| 06 | Male | 50's to 60's | Hobby, Family Trip | ¥400,000 or more |

FIG. 58

507

| Electronic Catalog Database | | | |
|---|---|---|---|
| ID | Product/Service Genre | Price | Product/Service Data |
| 01 | Reasonable Trip | ¥50,000 | Korea, 3 days and 2 nights with Gourmet |
| 02 | Reasonable Trip | ¥150,000 | Hawaii, 5 days with various optional activities |
| 03 | Reasonable Trip | ¥300,000 | 3 European countries, 8 days and 7 nights, A-level hotel |
| 04 | Fashion | ¥10,000 | Apparel on Bargain Sale, limited time only |
| 05 | Fashion | ¥30,000 | Direct imported bag from Italy |
| 06 | Fashion | ¥100,000 | Jewelry selected by buyer this year |

FIG. 80

| 75 UID | 2105 Target Apparatus Information | 2250 Setting Information |
|---|---|---|
| UID0001 | REC-0001 | Recorder Setting Information A |
| | TV-0005 | TV Setting Information A |
| | NPC-0002 | Laptop Setting Information A |
| UID0002 | DSC-0125 | DSC Setting Information A |
| UID0003 | REC-0001 | Recorder Setting Information B |
| | TV-0083 | TV Setting Information A |
| UID0005 | DSC-0008 | DSC Setting Information B |
| UID0010 | DPC-0001 | Desktop Setting Information A |

FIG. 81

2101

Memory

75b

| UID |
| --- |
| UID0001 |

111

| Medium Identification Information |
| --- |
| Card |

2103

Apparatus Operation Information

| Index | 2104 Operation Apparatus Identification Information | 2105 Target Apparatus Information | 2260 Operation Instruction Information | | | 2107 Communication Information |
| --- | --- | --- | --- | --- | --- | --- |
| | | | 2106 Instruction Detail Information | Instruction Target Information | 2261 Communication Execution Information | |
| 1 | Recorder | REC-0001 | Setting Information Change | Change Target Information A | Communication is executed. | Communication Information A |
| 2 | TV | TV-0005 | Setting Information Change | Change Target Information B | Communication is executed. | Communication Information A |
| 3 | Laptop | NPC-0002 | Setting Information Change | Change Target Information C | Communication is executed. | Communication Information B |
| 4 | Camera | DSC-0008 | Setting Information Change | Change Target Information D | Communication is executed. | Communication Information C |
| 5 | Recorder | REC-0002 | Setting Information Change | Change Target Information A | Communication is not executed. | None |

FIG. 84

Memory

| UID |
| --- |
| UID0002 |

| Medium Identification Information |
| --- |
| Card |

Apparatus Operation Information

| Index | Operation Apparatus Identification Information | Target Apparatus Information | Operation Instruction Information | | | Communication Information |
| --- | --- | --- | --- | --- | --- | --- |
| | | | Instruction Detail Information | Instruction Target Information | Communication Execution Information | |
| 1 | Recorder | All apparatuses | Setting Information Change (Timer Recording) | TV Program ID, Recording Mode | Communication is not executed. | None |
| 2 | Recorder | All apparatuses | Setting Information Change (Timer Recording) | TV Program Code, Recording Mode | Communication is executed. | URL, Login ID, Password |

FIG. 85

Memory

| UID |
| --- |
| UID0003 |

| Medium Identification Information |
| --- |
| Card |

Apparatus Operation Information

| Index | Operation Apparatus Identification Information | Target Apparatus Information | Operation Instruction Information | | | Communication Information |
| --- | --- | --- | --- | --- | --- | --- |
| | | | Instruction Detail Information | Instruction Target Information | Communication Execution Information | |
| 1 | Vehicle Navigation Device | All apparatuses | Setting Information Change (Highlighted Display) | Landmark Information A (Map No. A, coordinates: xxx, yyy) | Communication is not executed. | None |
| 2 | Vehicle Navigation Device | All apparatuses | Setting Information Change (Highlighted Display) | Landmark Information B (Map No. B, coordinates: zzz, www) | Communication is not executed. | None |

FIG. 137A (2) Product Information

| | |
|---|---|
| YO1U | Part Number ID (TV Part Number, Color Information) |
| YO1Un | UID (Product Serial Number) |
| YO1Ua | Address of Registration Server (www.panasonic-server.com) |
| | Server Login ID |
| | Server Login Password |
| | Operation Program |

FIG. 137B (3) Server Registration Information

| |
|---|
| Part Number ID (TV Part Number, Color Information) |
| UID (Product Serial Number) |
| Position Information of Mobile Terminal N20 |
| Server Login ID |
| Server Login Password |

FIG. 138A

| Part Number | UID | Position Information (Latitude, Longitude, Altitude) |
|---|---|---|
| Model Number of TV N10A | Product Serial Number of TV N10A | Latitude 139° 46.aa<br>Longitude 35° 41.bb<br>Altitude 1.cc [m] |

FIG. 138B

| Part Number | UID | Position Information (Latitude, Longitude, Altitude) |
|---|---|---|
| Model Number of TV N10A | Product Serial Number of TV N10A | Latitude 139° 46.aa<br>Longitude 35° 41.bb<br>Altitude 1.cc [m] |
| Model Number of BD Recorder N10B | Product Serial Number of BD Recorder N10B | Latitude 139° 46.dd<br>Longitude 35° 41.ee<br>Altitude 1.ff [m] |
| Model Number of Air Conditioner N10C | Product Serial Number of Air Conditioner N10C | Latitude 139° 46.gg<br>Longitude 35° 41.hh<br>Altitude 1.hh [m] |
| ⋮ | | |
| Model Number of Air Conditioner N10J | Product Serial Number of Air Conditioner N10J | Latitude 139° 46.kk<br>Longitude 35° 41.ll<br>Altitude 1.mm [m] |
| Model Number of FF Heater N10K | Product Serial Number of FF Heater N10K | Latitude 139° 46.nn<br>Longitude 35° 41.oo<br>Altitude 1.pp [m] |

FIG. 143A (1) Positional Information

| |
|---|
| Position Information |
| Second Server Login ID |
| Second Server Login Password |

FIG. 143B (2) First Product Control Information

| |
|---|
| Part Number ID (Part Number, Color Information of Air Conditioner N10J) |
| UID (Product Serial Number of Air Conditioner N10J) |
| Product Control Command (Power ON) |

FIG. 143C (3) Second Product Control Information

| |
|---|
| Part Number ID (Part Number, Color Information of TV N10A) |
| UID (Product Serial Number of TV N10A) |
| Product Control Command (Power OFF) |

FIG. 145

| Part Number ID | UID | Position Information (X-coordinate, Y-coordinate, Z-coordinate) |
|---|---|---|
| Model Number of TV N10A | Product Serial Number of TV N10A | X-coordinate 0[m]<br>Y-coordinate 0[m]<br>Z-coordinate 0[m] |
| Model Number of BD Recorder N10B | Product Serial Number of BD Recorder N10B | X-coordinate a[m]<br>Y-coordinate b[m]<br>Z-coordinate c[m] |
| Model Number of Air Conditioner N10C | Product Serial Number of Air Conditioner N10C | X-coordinate d[m]<br>Y-coordinate e[m]<br>Z-coordinate f[m] |
| ⋮ | | |
| Model Number of Air Conditioner N10J | Product Serial Number of Air Conditioner N10J | X-coordinate g[m]<br>Y-coordinate h[m]<br>Z-coordinate i[m] |
| Model Number of FF Heater N10K | Product Serial Number of FF Heater N10K | X-coordinate j[m]<br>Y-coordinate k[m]<br>Z-coordinate l[m] |

FIG. 147

| Accuracy Identifier | Part Number ID | Processing to be performed when position information in re-received server registration information is different from registered position information |
|---|---|---|
| High | Air Conditioner<br>Solar Panel<br>Fire Alarm | Update position information of mobile device N20 |
| Low | TV<br>BD Recorder<br>FF Heater | Update registered position information |

FIG. 153

| Product Serial Number | Product Number | Position Information | Remote Control Information | |
|---|---|---|---|---|
| | | | Operation Information | Display Information |
| P123456TV | TH-P46Z1 | First Floor Living Room (x1,y1) | Power ON:C5000<br>Power OFF:C50A0<br>Sound Volume Up:C50EF<br>⋮ | Detail Remote Control Mode |
| P456789AC | CS-X500 | Second Floor Bed Room (x3,y2) | Power ON:C5900<br>Power OFF:C59A0<br>Temperature Up:C59EF<br>⋮ | Simple Remote Control Mode |
| P789012WA | NA-VR5600 | First Floor Dressing Room (x3,y3) | Power ON:C7200<br>Washing Start:C72CE<br>Drying Start:C723D<br>⋮ | Simple Remote Control Mode |
| ⋮ | ⋮ | ⋮ | | ⋮ |

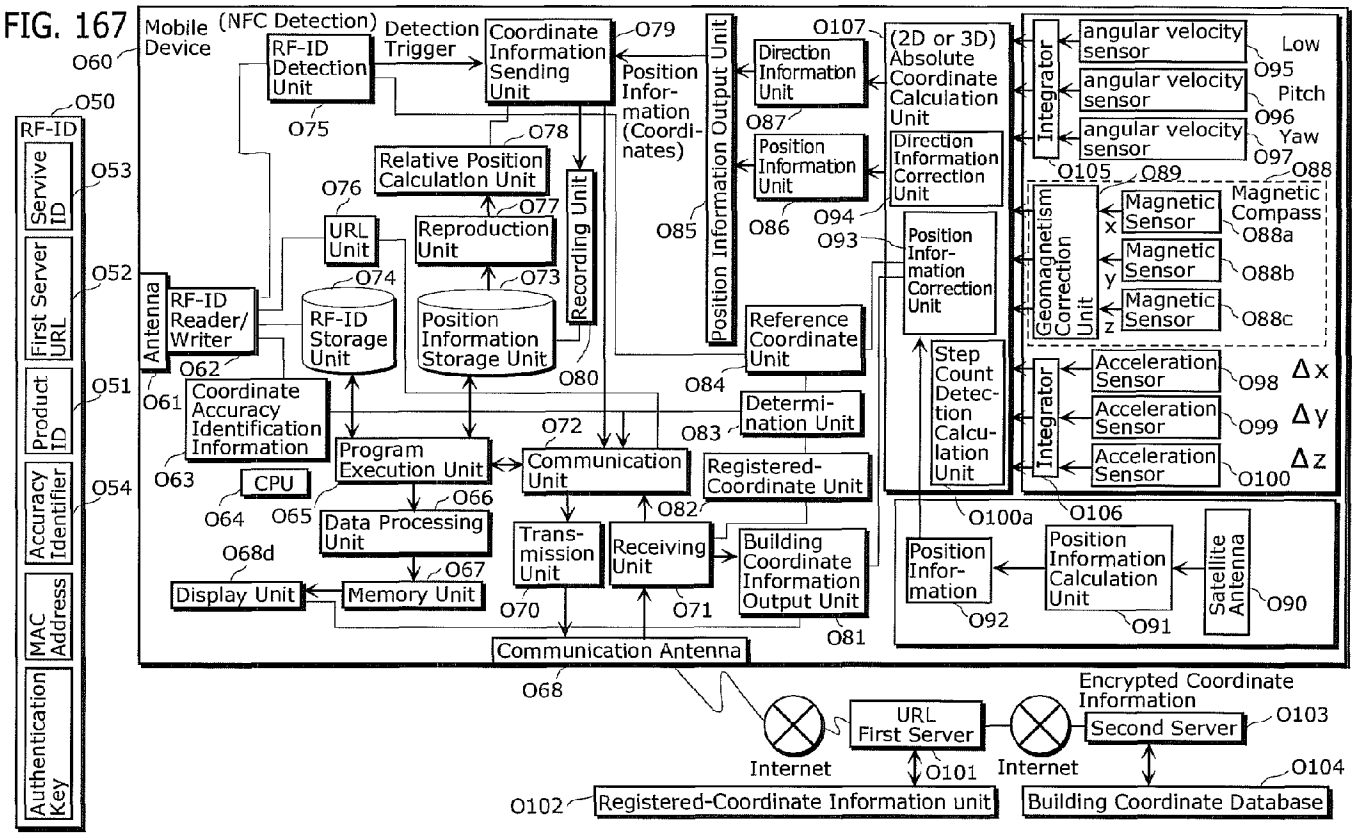
Mobile Device
O60
(NFC Detection)
RF-ID Detection Unit
O75
Detection Trigger
Coordinate Information Sending Unit
O79
Position Infor-mation (Coordi-nates)
Antenna
O61
RF-ID Reader/Writer
O62
Coordinate Accuracy Identification Information
O63
CPU
O64
O65
Program Execution Unit
O66
Data Processing Unit
O67
Memory Unit
Display Unit
O68d
URL Unit
O76
RF-ID Storage Unit
O74
Relative Position Calculation Unit
O78
Reproduction Unit
O77
Position Information Storage Unit
O73
Recording Unit
O80
Communication Unit
O72
Trans-mission Unit
O70
Receiving Unit
O71
Communication Antenna
O68
Position Information Output Unit
O85
Direction Information Unit
O87
Position Information Unit
O86
O107
Reference Coordinate Unit
O84
Determi-nation Unit
O83
Registered-Coordinate Unit
O82
Building Coordinate Information Output Unit
O81
(2D or 3D) Absolute Coordinate Calculation Unit
Direction Information Correction Unit
Position Infor-mation Correction Unit
O94
O93
Step Count Detec-tion Calcu-lation Unit
O100a
Position Infor-mation
O92
Position Information Calculation Unit
O91
Satellite Antenna
O90
O106
Integrator
Integrator
O105
Geomagnetism Correction Unit
O89
angular velocity sensor
O95
angular velocity sensor
O96
angular velocity sensor
O97
Low
Pitch
Yaw
Magnetic Sensor x
Magnetic Sensor y
Magnetic Sensor z
O88
Magnetic Compass
O88a
O88b
O88c
Acceleration Sensor
O98
Acceleration Sensor
O99
Acceleration Sensor
O100
Δx
Δy
Δz
Internet
URL First Server
O101
Registered-Coordinate Information unit
O102
Internet
Encrypted Coordinate Information
O103
Second Server
O104
Building Coordinate Database
FIG. 167
O50
RF-ID
O53
Service ID
O52
First Server URL
O51
Product ID
O54
Accuracy Identifier
MAC Address
Authentication Key

FIG. 172

| Product | Accuracy Identifier O54 | Processing performed by Determination Unit O83 |
|---|---|---|
| Air Conditioner<br>Solar Panel<br>Fire Alarm<br>Built-in Dishwasher<br>Air Conditioner in Bath Room<br>•<br>•<br>• | High | Determine that a position of mobile device O60 is to be corrected. |
| TV<br>BD Recorder<br>•<br>•<br>•<br>• | Low | Determine that a position of mobile device O60 is not to be corrected. |

FIG. 179
(a)
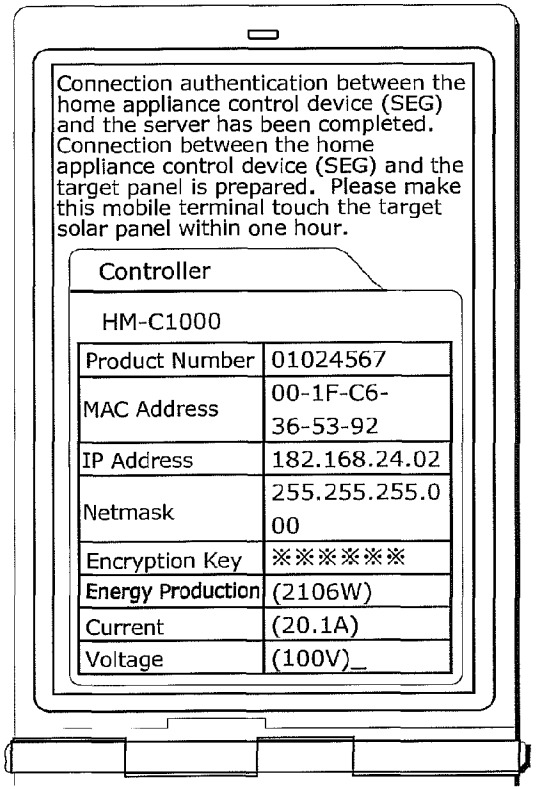
(b)
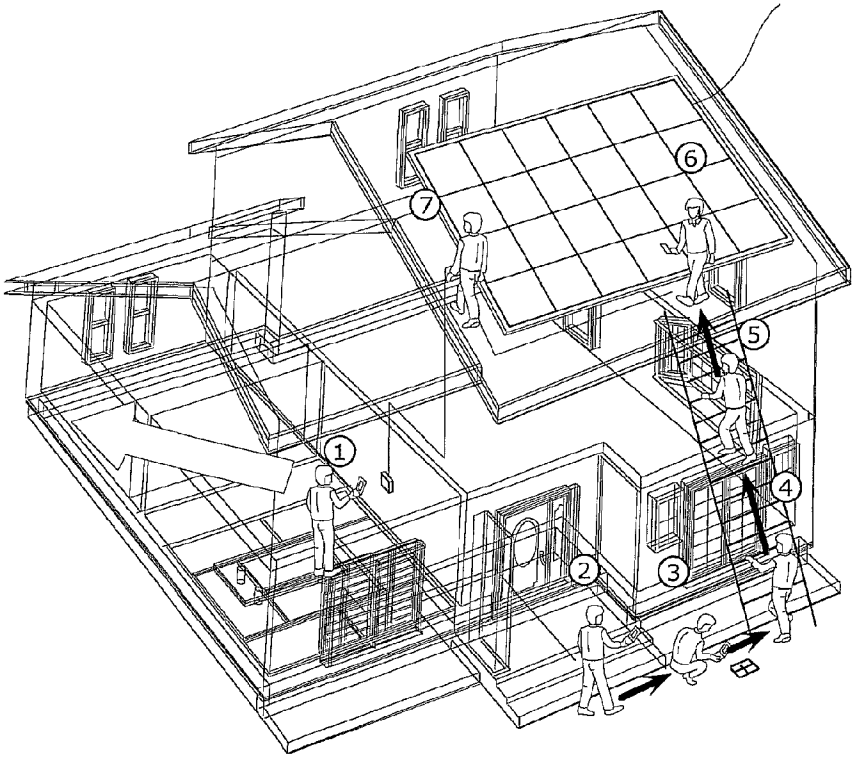

Example: Living Room ($X_1$, $Y_1$, $Z_1$ to $X_2$, $Y_2$, $Z_2$)
If the shape of a room is complicated and not a simple cuboid, such a room is considered as a combination of a plurality of cuboids.

Area close to a reference point where map-matching is difficult because failure of accurate detection of user's turning causes the current position of the mobile device to vary depending on the respective rooms

FIG. 234

409a

| | Reference Point 1 Entrance Door | Reference Point 2 Living Room Door | Reference Point 1 Living Room Area where two doors are close to each other |
|---|---|---|---|
| First Priority Sensor | Angular Velocity Sensor | Angular Velocity Sensor | Angular Velocity Sensor |
| Second Priority Sensor | Acceleration | Sound | None |
| Operating Time Period | 10 seconds | 10 seconds | 10 seconds |
| Time Period after Detection | 5 seconds | 3 seconds | 10 seconds |
| In-Time Discovery Percentage | 70 % | 30 % | 80 % |
| Map-Matching Error Rate | 20 % | 30 % | 30 % |
| Close Distance | 3 meters | 5 meters | 6 meters |

FIG. 236

411a

| ① Entrance Door | ② Living Room Door |
|---|---|
| 1. Sound Sensor | 1. Acceleration Sensor |
| 2. Acceleration Sensor | 2. Angular Velocity Sensor |
| 3. Angular Velocity Sensor | 3. Geomagnetic Sensor |
| 4. Acceleration Sensor + Angular Velocity Sensor | |

FIG. 244

419a

| | |
|---|---|
| Original Reference Point Accuracy | 100 points |
| Move Amount | 15 m |
| Number of Steps | 37 steps |
| Turning Amount | 1800 degrees to the left, 1890 degrees to the right |
| Elapsed Time | 15 seconds |
| Move Amount along Z-axis | 4 m, 34 m upwards (in plus direction), 30 m downwards (in minus direction) |
| Coordinate Accuracy Evaluation Point | 85 points |

420a

| Point | Reference Point A | TV-A | TV-B |
|---|---|---|---|
| Coordinate Accuracy Evaluation Point | 100 | 85 | 60 |

FIG. 260 Structure of Data Recorded on nonvolatile or ROM Storage Unit in IC Tag of NFC

| 960a | 960b | 960c | 960d | 960e | 960f | 960g | 960h | 960i | 960j |
|---|---|---|---|---|---|---|---|---|---|
| Tag ID | Signature of Tag ID | Manufacturer Code | Model, Serial Number | Key ID | URL | On-Sale Mode Identifier | Privacy Protection Identifier | Home Appliance Power Source Identifier | CPC Activation Identifier |
| ID Unique | Impossible to rewrite in factory | Recorded in factory | Impossible to rewrite in factory | Impossible to rewrite in factory | Impossible to rewrite in factory | Authentication or encryption is necessary in recording. Decryption is necessary in reproducing | Authentication or encryption is necessary in recording. | Possible to record only on home appliance CPU | Possible to record only on home appliance CPU |
| ID of Tag | signature data | manufacturer code | product model number, product serial number | shared key | URL of server to be connected to product | identifier indicating ON or OFF of on-sale mode (demonstration mode) If the identifier is ON, menu usable in mobile terminal is restricted, and more complicated and more various steps are required to register the product in server. | Not output a use history or product serial number | identifier indicating ON or OFF of power supply unit of home appliance If the identifier is OFF, instruction for forcing power supply unit to be activated is transmitted to home appliance as needed. | identifier indicating whether or not CPC is activated If the identifier is OFF, instruction for forcing CPU to be activated is transmitted to home appliance as needed. |

| 960k | 960m | 960n | 960p | 960q | 960r | 960s | 960t |
|---|---|---|---|---|---|---|---|
| Error Information | Use History (the number of uses, and the like) | Use History (Log Data) | Control Instruction | Customization Data | Coordinate Information | Coordinate Accuracy Evaluation Point | Coordinate Identifier |
| Possible to record only on home appliance CPU | Possible to record only on home appliance CPU | Possible to record only on home appliance CPU | Encryption is necessary in recording | | Authentication or encryption is necessary in recording. | Possible to record from home appliance CPU or terminal. Authentication or encryption is necessary in recording | |
| code indicating error of home appliance | product use history total power consumption total $CO_2$ consumption total use time period | log data of product use history Log data prior to trouble is stored. | | | 3D coordinate (position) information of production attached with tag | evaluation point indicating accuracy of 3D coordinate (position) information of production attached with tag Higher evaluation value indicates more accurate position. | Identifier indicates which the coordinates are, relative coordinate, absolute coordinate, or longitude/latitude. |

FIG. 266
The screen display may be rotated by user operation
The screen display may be rotated in cooperation with acceleration meter and gyro.
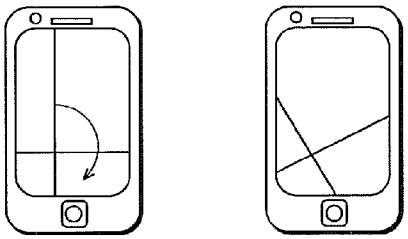
If an inclination of the cross mark is changed, the user can easily match the antenna positions even if a line indicating the tag position is short.
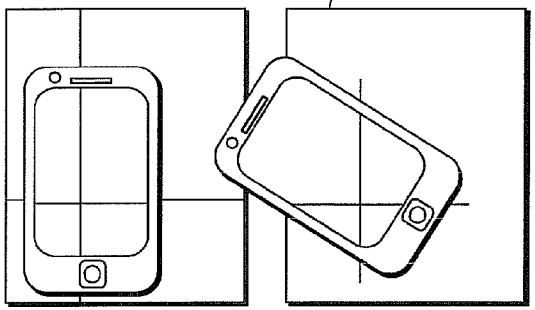

COMMUNICATION DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue of U.S. Pat. No. 8,560,012, which issued on Oct. 15, 2013.*

TECHNICAL FIELD

The present invention relates to communication devices, and more particularly to a communication device that uses proximity wireless communication to serve as an extended user interface for a home appliance.

BACKGROUND ART

There has been disclosed a communication device which reads apparatus information out from an Integrated Circuit (IC) tag on an apparatus by using proximity wireless communication, then registers operation information corresponding to the readout apparatus information, so that the communication device can serves as a remote controller of the apparatus (for example, Patent Reference 1). This communication device has operation units each of which enables the communication device to serve as a remote controller that remotely controls a predetermined target apparatus to be controlled. The communication device includes an IC tag reader unit and a Central Processing Unit (CPU). The IC tag reader unit reads, from an IC tag on the target apparatus, apparatus information corresponding to the target apparatus. The CPU executes a registration program for registering a control information data file and the apparatus information read by the IC tag reader unit. In the control information data file, the apparatus information is stored in association with control information. The CPU also executes the registration program for obtaining the control information associated with the apparatus information from the control information data file, and for registering various control instructions of the obtained control information to the respective operation units. Then, when one of the operation units is pressed, the communication device transmits, to the target apparatus, a specific control instruction corresponding to the pressed operation unit from among the registered control instructions of the control information.

There also has been disclosed a remote control user interface using proximity wireless communication which has been conceived in consideration of operation simplicity and usability (for example, Patent Reference 2). This remote control user interface includes an operation sheet and a remote controller. The operation sheet holds wireless tags in respective regions segmented for respective different operation items. In each of the tags, information necessary to operate an external electronic device is stored. By using the operation sheet, the remote controller transmits a command signal to the electronic device. Then, the remote controller side reads the information from the wireless tag on the operation sheet not without being in contact with the operation sheet, and transmits a command signal based on the readout information to the electronic device.

There still has been disclosed a control device that allows a user to select necessary information by a simple operation, for example, by pointing by a remote controller to a button (selected button) on a display of a display unit (for example, Patent Reference 3). This control device includes a remote controller unit, a display coordinate unit, a selected-button recognition unit, and a screen display control unit. By using an angular sensor included in the remote controller, the remote controller unit detects and measures an angle change amount between two directions which is caused when the user (operator) holding the remote controller moves the remote controller. The display coordinate unit calculates, from initial coordinates and the angle change amount, two-dimensional (2D) coordinates of the button selected on the display of the display unit by the remote controller. The selected-button recognition unit determines the selected button based on the calculated 2D coordinates and button position information stored in a button information storage unit. The screen display control unit displays buttons on respective positions on the display of the display unit and displays the selected button by hot spot. When the operator intends to decide the button selected by the screen display control unit, the operator presses a decision button on the remote controller to transmit a decision signal. This control device can select necessary information by such a simple operation.

PRIOR ART

Patent Reference

Patent Reference 1: Japanese Unexamined Patent Application Publication No. 2007-134962

Patent Reference 2: Japanese Unexamined Patent Application Publication No. 2004-145720

Patent Reference 3: Japanese Unexamined Patent Application Publication No. 2000-270237

DISCLOSURE OF INVENTION

Problems that Invention is to Solve

However, the above-described conventional technologies have the following problems.

In Patent Reference 1, when a user intends to operate the target apparatus by the communication device, the user needs to select the target apparatus to be controlled (operated) by the communication device, via a display unit, buttons, and keys of the communication device. More specifically, there is a problem that complicated operations such as plural various operations are necessary for the communication device in order to cause the communication device to serve as a remote controller for the target apparatus when the target apparatus is selected.

In Patent Reference 2, different operation sheets are necessary for different electronic devices to be operated. In other words, with the increase of electronic devices which a user wishes to control, the number of operation sheets for the electronic devices is also increased.

In Patent Reference 3, the remote controller transmits an angle change amount regarding a move of the operator to the control device, and the control device determines a location pointed by the operator based on the angle change amount. Therefore, the control of the target apparatus requires the remote controller, the control device, and the display device. In short, Patent Reference 3 has a problem that a plurality of devices are required to control the apparatus. Moreover, Patent Reference 3 does not consider the situation where a plurality of target apparatuses are to be operated, and neither discloses nor suggests a method of registering a target apparatus selected by the operator and instructions corresponding to the target apparatus.

In order to solve the above-described problems of the conventional technologies, an object of the present invention is to provide a communication device that can easily serve as an extended user interface, such as a remote controller, of a target apparatus, without causing any complicated operations to a user.

Means to Solve the Problems

In accordance with an aspect of the present invention for achieving the object, there is provided a communication device including: an apparatus information obtainment unit configured to obtain, from an apparatus, apparatus information for uniquely identifying the apparatus; a position information obtainment unit configured to obtain position information indicating a position of the communication device; an external communication unit configured to perform external communication; an operation information obtainment unit configured to obtain, via the external communication unit, operation information for allowing the communication device to operate the apparatus, based on the apparatus information; a storage unit configured to store the position information and the operation information in association with each other, the operation information being obtained by the operation information obtainment unit, and the position information being obtained when the apparatus information obtainment unit obtains the apparatus information and being considered as apparatus position information indicating a position of the apparatus; a direction sensor unit configured to generate direction information indicating a direction to which the communication device faces; a directional space calculation unit configured to calculate a directional space based on the position information obtained by the position information obtainment unit and the direction information generated by the direction sensor unit, the directional space being a space pointed by the communication device facing the space; a selection unit configured to (i) specify the apparatus existing in the directional space based on the apparatus position information stored in the storage unit, and (ii) select, from the storage unit, the operation information associated with the apparatus position information of the specified apparatus; and an operation information transmission unit configured to transmit, based on the operation information selected by the selection unit, a control signal to the apparatus specified by the selection unit so as to allow the communication device to operate the apparatus.

With the above structure, the communication device according to the aspect of the present invention can store the position information of the communication device and the operation information of the apparatus in association with each other. In addition, the use of the position information of the apparatus to be operated by the communication device enables the user to operate the apparatus merely by pointing the communication device such as a mobile device to the apparatus. As a result, the aspect of the present invention can provide a communication device that can easily serve as an extended user interface, such as a remote controller, of the apparatus, without causing any complicated operations to the user.

Furthermore, the communication device may further include a proximity wireless communication unit configured to perform proximity wireless communication, wherein the apparatus information obtainment unit is configured to obtain the apparatus information regarding the apparatus via the proximity wireless communication unit.

With the above structure, the communication device according to the aspect of the present invention can easily obtain the operation information of the apparatus such as a home appliance by single pressing of a button, by using via proximity wireless communication without causing any complicated operations to the user.

Still further, the selection unit may include: an apparatus direction calculation unit configured, when there are a plurality of apparatuses including the apparatus in the directional space, to calculate plural pieces of apparatus direction information based on the position information of the communication device and plural pieces of apparatus position information including the apparatus position information, the plural pieces of apparatus direction information each indicating a direction from the communication device to a corresponding one of the apparatuses, and the plural pieces of apparatus position information being stored in the storage unit and each indicating a position of the corresponding one of the apparatuses; a difference calculation unit configured to calculate a difference between the direction information of the communication device and each of the plural pieces of apparatus direction information; and an apparatus decision unit configured to decide, as the specified apparatus existing in the directional space, an apparatus having the difference that is smaller than a predetermined value from among the apparatuses, the difference being calculated by the difference calculation unit.

With the above structure, even if there are a plurality of apparatuses in an oriented direction of the communication device according to the aspect of the present invention, the communication device can appropriately select, as a target apparatus to be operated by the communication device, an apparatus closer to the oriented direction pointed by the communication device from among the plurality of apparatuses.

Still further, the selection unit may include: a space information storage unit configured to store space information indicating (a) a space and (b) an arrangement of the apparatus in the space; and an apparatus decision unit configured, when there are a plurality of apparatuses including the apparatus in the directional space, to (i) obtain the space information including information of a space in which the communication device exists from the space information storage unit based on the position information of the communication device, and (ii) decide, as the specified apparatus existing in the directional space, an apparatus existing in the space in which the communication device exists based on the obtained space information.

With the above structure, the communication device according to the aspect of the present invention can use the space information such as room arrangement information of a building. As a result, it is possible to decrease a possibility that the user selects a wrong apparatus to which the user does not intend to point.

Still further, the communication device may further include a display unit, wherein the selection unit includes: a pitch angle detection unit configured to generate pitch angle information indicating an angle of a pitch direction of the communication device; a pitch angle information storage unit configured to store the pitch angle information in association with the apparatus information; and an apparatus decision unit configured to decide, as the specified apparatus existing in the directional space, an apparatus selected by a user from an apparatus candidate list displayed on the display unit, wherein the display unit is configured to display, as the apparatus candidate list, apparatuses existing in the directional space, based on plural pieces of apparatus position information including the apparatus position information stored in the storage unit and plural pieces of pitch angle information including the pitch angle information stored in the pitch angle information storage unit, and the pitch angle detection unit is configured to store the generated pitch angle information into the pitch angle information storage unit in association with the apparatus decided by the apparatus decision unit.

With the above structure, the communication device according to the aspect of the present invention can consider habits of the user in consideration of an angle change in a pitch direction of the communication device. As a result, it is possible to increase an accuracy of selecting the target apparatus to be operated by the communication device.

Still further, the communication device may further include an apparatus state obtainment unit configured to obtain an operation state of the apparatus, wherein the display unit is further configured to display, based on the operation state obtained by the apparatus state obtainment unit, (a) the apparatus candidate list and (b) plural pieces of operation information including the operation information associated with respective apparatuses in the apparatus candidate list.

With the above structure, if a plurality of apparatuses are specified as candidates to be operated by the communication device, the communication device according to the aspect of the present invention can change the operation information depending on the operation state of each of the apparatuses. As a result, pieces of information to be displayed on the communication device can be simplified.

Still further, the apparatus information obtainment unit may further include: an absolute position generation unit configured to generate absolute position information of the communication device; and a relative position generation unit configured to generate relative position information of the communication device, the relative position information indicating a position moved from a position indicated by the absolute position information, wherein the position information is generated from the absolute position information and the relative position information. Still further, the communication device may further include a still determination unit configured to obtain move information of the communication device from the relative position information and the direction information, and determine, based on the move information, whether or not the communication device is still, wherein the direction sensor unit is configured to generate the direction information indicating a direction to which the communication device faces, when the still determination unit determines that the communication device is still.

With the above structure, the communication device according to the aspect of the present invention can operate the apparatus, at the timing where the user points the communication device to the apparatus and stops a move of the communication device to be still.

Still further, when it is determined based on the apparatus information that it is possible to obtain the apparatus position information from the storage unit, the position information obtainment unit may (i) store, into the storage unit, the absolute position information generated by the absolute position obtainment unit as the apparatus position information, and (ii) initialize the relative position information generated by the relative position generation unit.

With the above structure, the communication device according to the aspect of the present invention can decrease accumulated errors of the relative position information generated by the relative position generated unit such as an acceleration sensor.

Still further, the communication device may further include a display unit, wherein, when it is determined, based on the direction information and the position information, that the communication device is outside a communicable range where the operation information transmission unit is capable of transmitting the control signal to the apparatus, the display unit is configured to display a fact that the communication device is outside the communicable range, when the operation information transmission unit is to transmit the control signal to the apparatus.

With the above structure, if the communication device according to the aspect of the present invention is outside the communicable range of the operation information transmission unit, the communication device can warn the user to persuade the user to be back to the communicable range. For example, since a communicable range of infrared communication is limited due to narrow directionality, the above structure can improve usability.

Still further, the communication device may further include a sound sensor unit configured to detect sound information produced by the apparatus, wherein the communication device determines, based on the sound information detected by the sound sensor unit, whether or not the transmission of the control signal to the apparatus is successful.

With the above structure, the communication device according to the aspect of the present invention can allow the operation information transmission unit to perform reliable one-way communication without requesting a feedback response.

Still further, the communication device may further include an operation history obtainment unit configured to obtain an operation history including a history of the transmission of the control signal to the apparatus, wherein the communication device transmits the operation history to a server by performing the external communication, when it is determined that the transmission of the control signal to the apparatus is successful.

With the above structure, even if the apparatus does not have a means for communicating via a general-purpose network such as the Internet, the communication device according to the aspect of the present invention can transmit the reliable operation history of the apparatus to a server.

Still further, the apparatus information may further include individual identification information for identifying a user of the communication device, and the communication device may control the display on the display unit, based on the individual identification information.

With the above structure, the communication device according to the aspect of the present invention can serve as a remote control interface suitable for each user. For example, if the user does not require detailed operations, the communication device displays a simple interface.

Still further, the operation information obtainment unit may obtain external communication operation information of the apparatus for allowing the communication device to operate the apparatus via the external communication unit, when it is determined, based on the position information obtained by the position information obtainment unit, that the apparatus does not exist in a range where the operation information transmitting unit is capable of transmitting the control signal to the apparatus, and the communication device may operate the apparatus via the external communication unit based on the external communication operation information.

With the above structure, the communication device according to the aspect of the present invention can easily serve as a remote control interface of the apparatus connected to a general-purpose network such as the Internet, even if the communication device is outside a building. For example, when the communication device is pointed to a direction of user's home, the communication device can serve as a remote controller of an operable apparatus in the user's home.

Still further, the apparatus information obtainment unit may include a reading unit configured to read the apparatus information from an image regarding the apparatus information, the image being provided on the apparatus.

With the above structure, the communication device according to the aspect of the present invention can obtain the apparatus information, when a simple information image such as a two-dimensional (2D) bar-code is provided on the apparatus.

Effects of the Invention

The present invention can realize a communication device that can easily serve as an extended user interface, such as a remote controller, of a target apparatus, without causing any complicated operations to a user. For example, use of position information of the target apparatus enables the user to operate the target apparatus merely by pointing the communication device to the target apparatus. In addition, if the communication device has a proximity wireless communication function, use of the proximity wireless communication enables the user to easily obtain operation information of the target apparatus such as a home appliance by single pressing of a button.

BRIEF DESCRIPTION OF DRAWINGS

FIG. 14 is a flowchart of the processing performed by the image capturing device and the TV, according to the first embodiment of the present invention.

FIG. 25 presents an example of description of the operation program for downloading image and executing slide show.

FIG. 40B shows flowcharts of uploading steps in the camera according to the second embodiment of the present invention.

FIG. 40C shows flowcharts of uploading steps in the camera according to the second embodiment of the present invention.

FIG. 46A shows flowcharts of details of FIG. 45.

FIG. 46B shows flowcharts of details of FIG. 45.

FIG. 47A presents a data format of the RF-ID communication between the camera and the TV.

FIG. 47B presents a data format of the RF-ID communication between the camera and the TV.

FIG. 57 is a table of a data structure of a customer attribute database.

FIG. 58 is a table of a data structure of an electronic catalog database.

FIG. 80 is a table of pieces of setting information registered in the server.

FIG. 81 is a table of pieces of apparatus operation information registered in the RF-ID card.

FIG. 84 is a table of apparatus operation information registered in the RF-ID card used in the recorder.

FIG. 85 is a table of apparatus operation information registered in the RF-ID card used in a vehicle navigation device.

FIG. 109 is a flowchart of a flow of processing of copying a product serial number and the like from HF-RFID to UHF-RFID upon factory shipment of an apparatus M003.

FIG. 110 is a flowchart of a flow of processing in a distribution process of the apparatus M003.

FIG. 111 is a block diagram according to a thirteenth embodiment of the present invention.

FIG. 112 is a flowchart according to the thirteenth embodiment of the present invention.

FIG. 113 is a flowchart according to the thirteenth embodiment of the present invention.

FIG. 114 is a diagram of a network environment in home ID registration.

FIG. 115 is a hardware diagram of the communication device in the home ID registration.

FIG. 116 is a functional block diagram of the communication device in the home ID registration.

FIG. 117 is a flowchart of the home ID registration.

FIG. 118 is a flowchart of home ID obtainment.

FIG. 119 is a sequence diagram of the home ID registration.

FIG. 120 is a functional block diagram of communication devices in home ID sharing.

Figure 121:
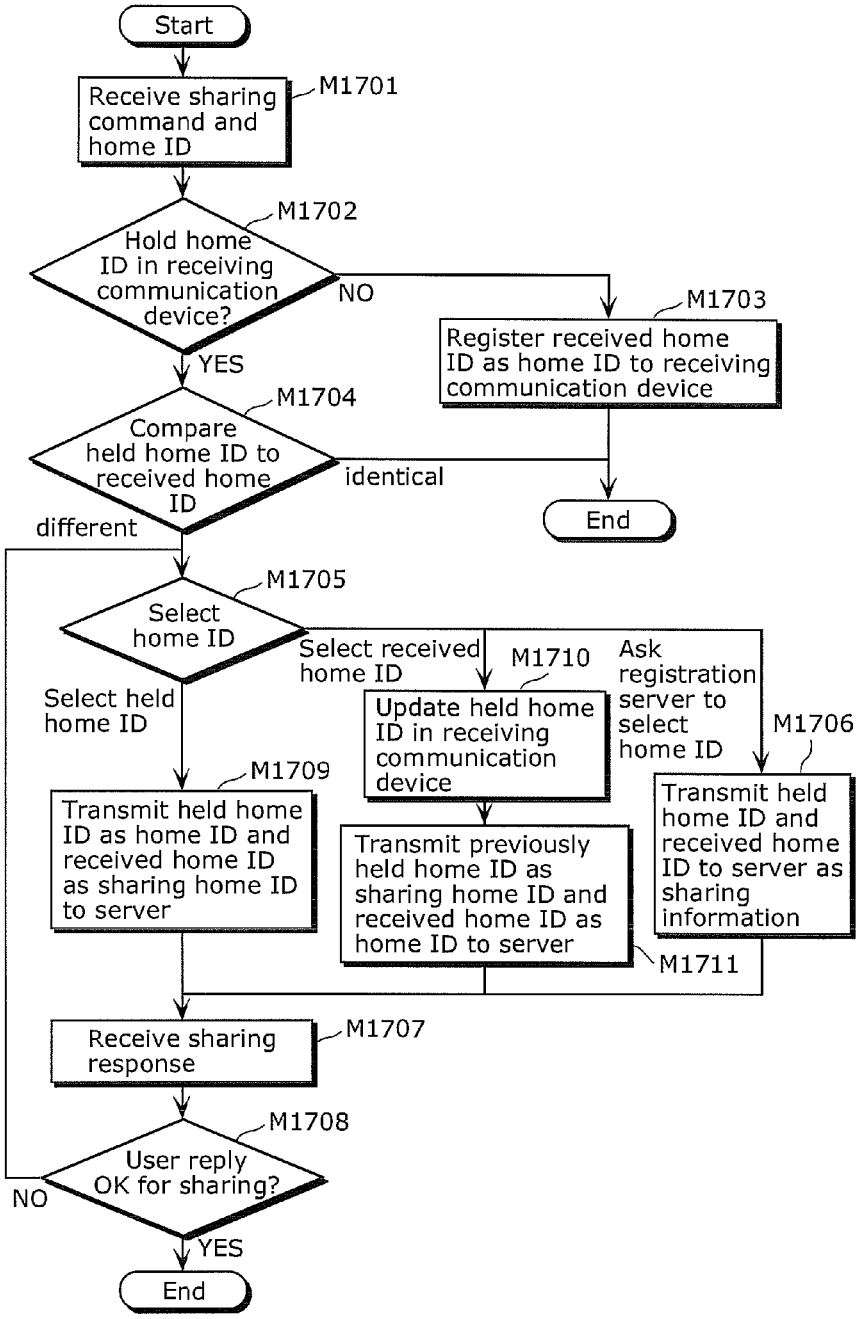

FIG. 121 is a flowchart of processing performed by a receiving communication device in the home ID sharing (using proximity wireless communication).

Figure 122:
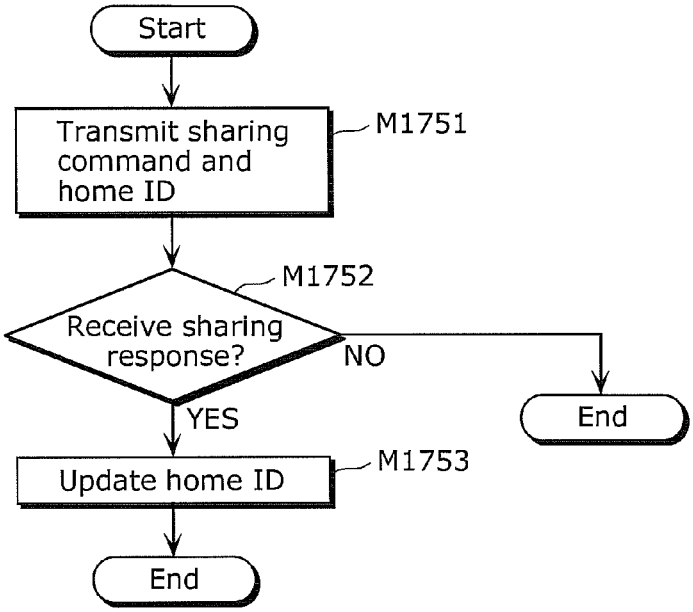

FIG. 122 is a flowchart of processing performed by a transmitting communication device in the home ID sharing (using proximity wireless communication).

Figure 123:
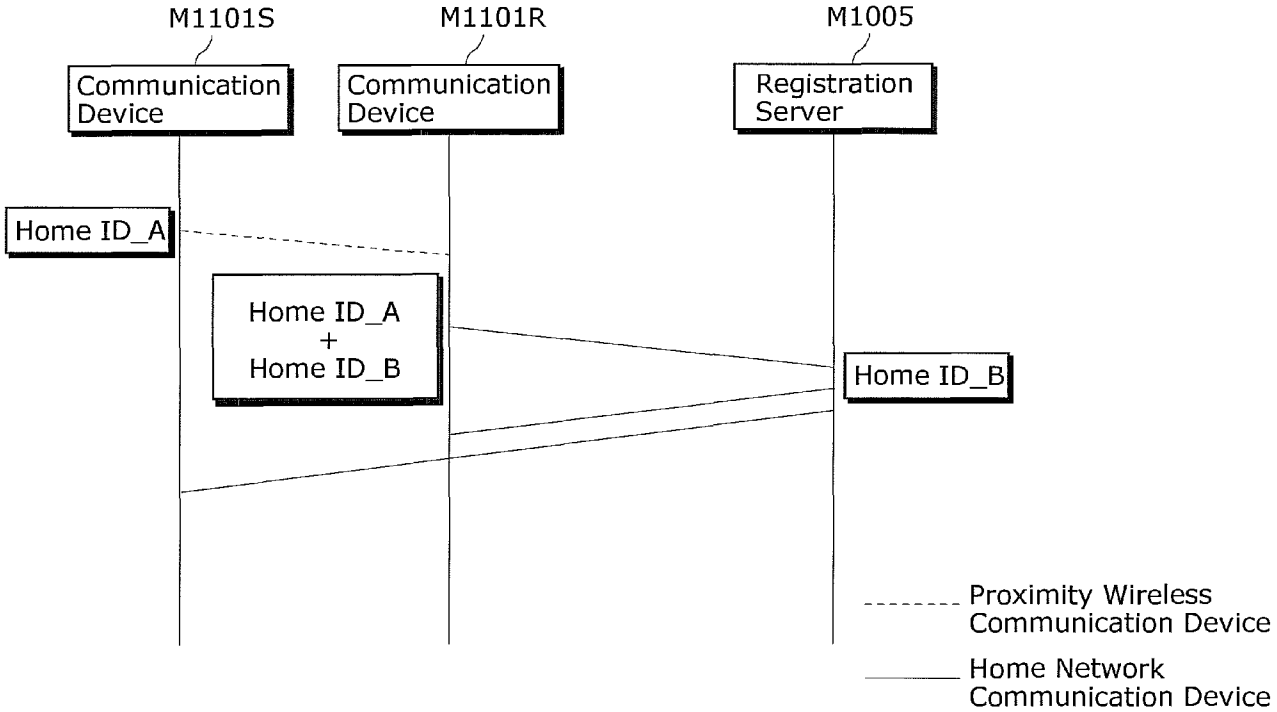

FIG. 123 is a sequence diagram of the home ID sharing (using proximity wireless communication).

Figure 124:
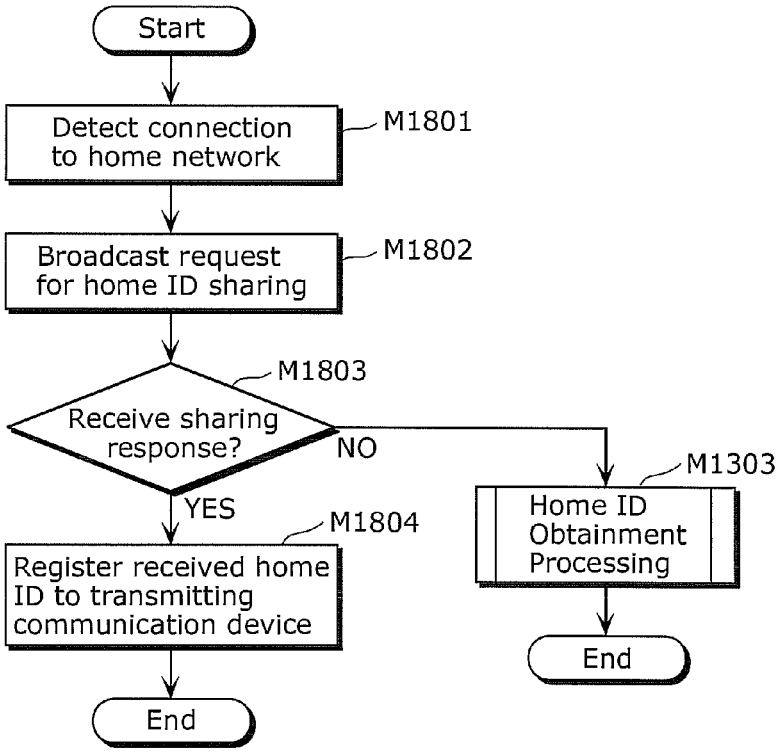

FIG. 124 is a flowchart of processing performed by the receiving communication device in the home ID sharing (using a home network device).

Figure 125:
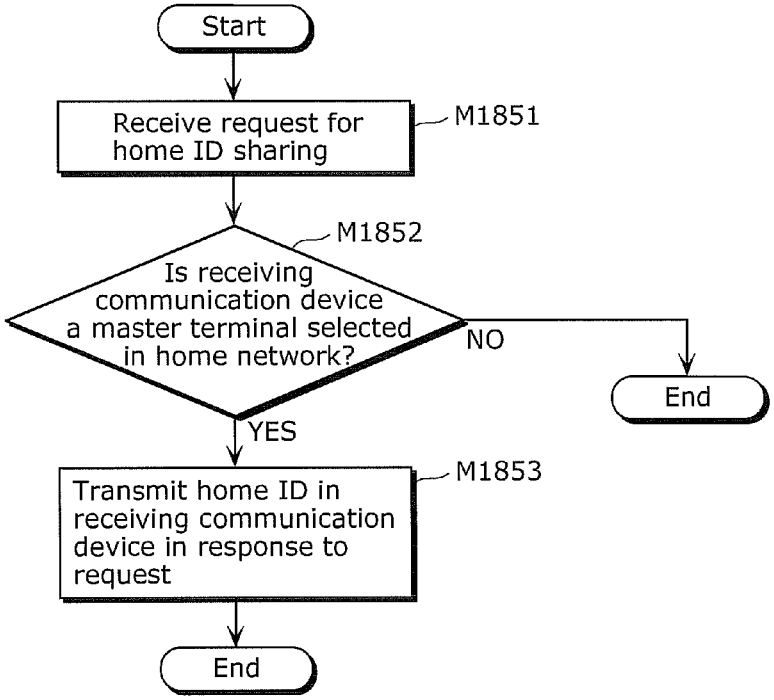

FIG. 125 is a flowchart of processing performed by the transmitting communication device in the home ID sharing (using the home network device).

Figure 126:
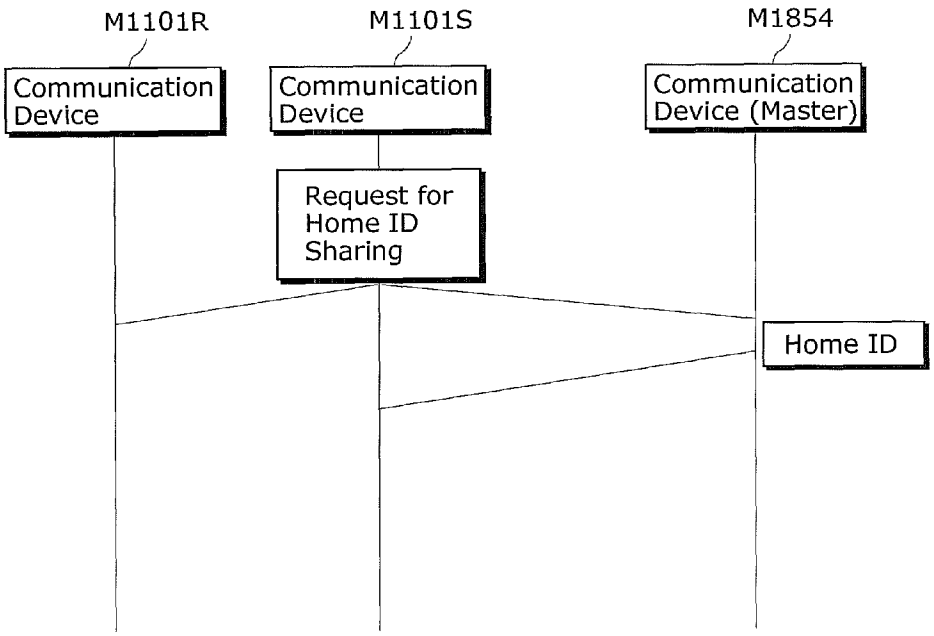

FIG. 126 is a sequence diagram of the home ID sharing (using the home network device).

Figure 127:
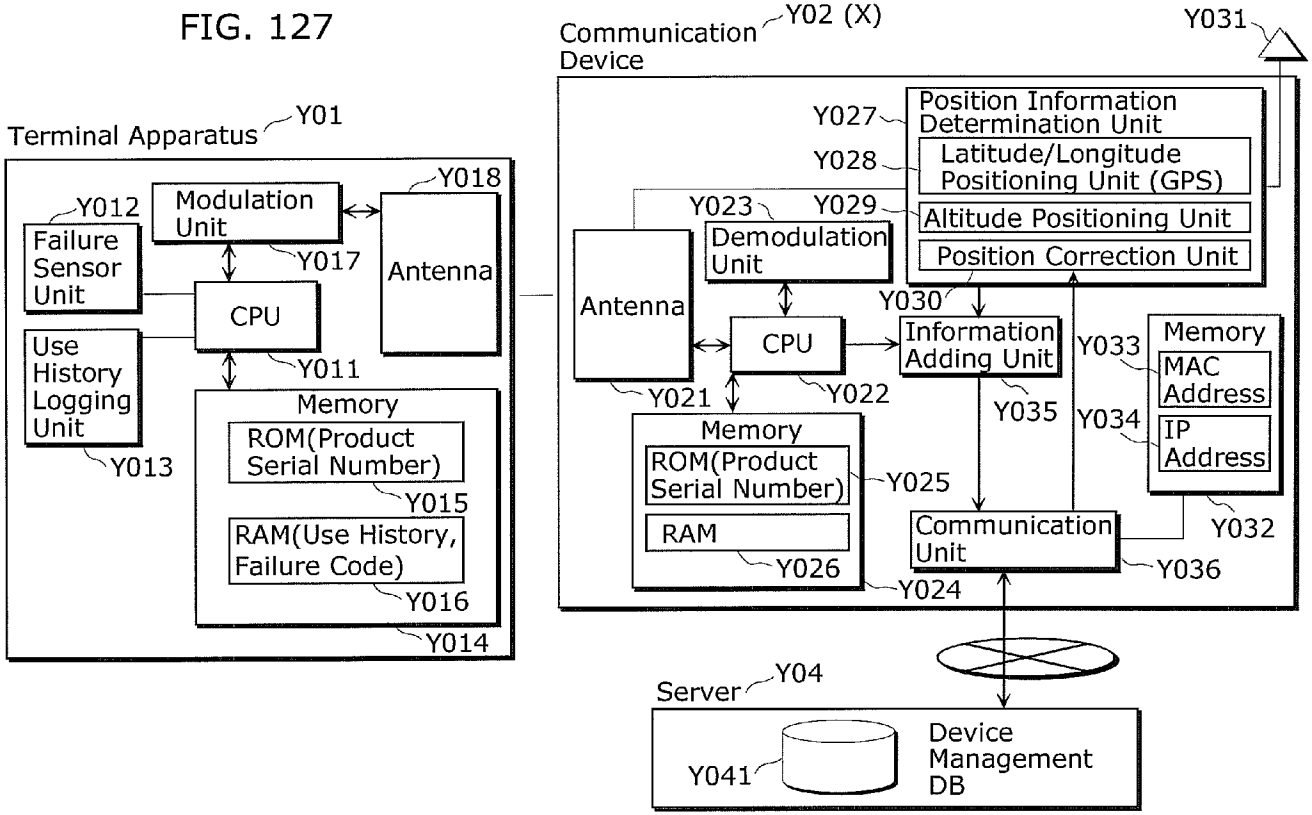

FIG. 127 is a block diagram of a device management system according to a sixteenth embodiment of the present invention.

Figure 128:
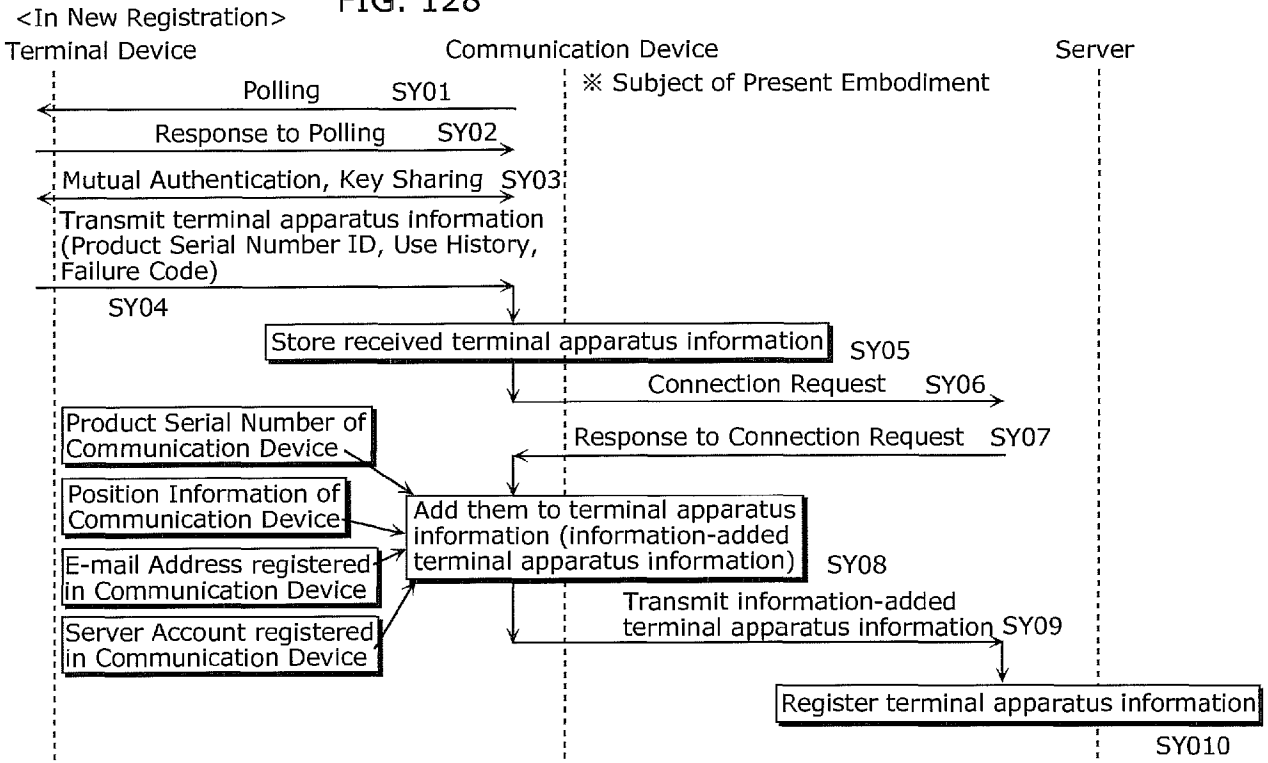

FIG. 128 is a sequence diagram of the device management system according to the sixteenth embodiment of the present invention.

Figure 129:
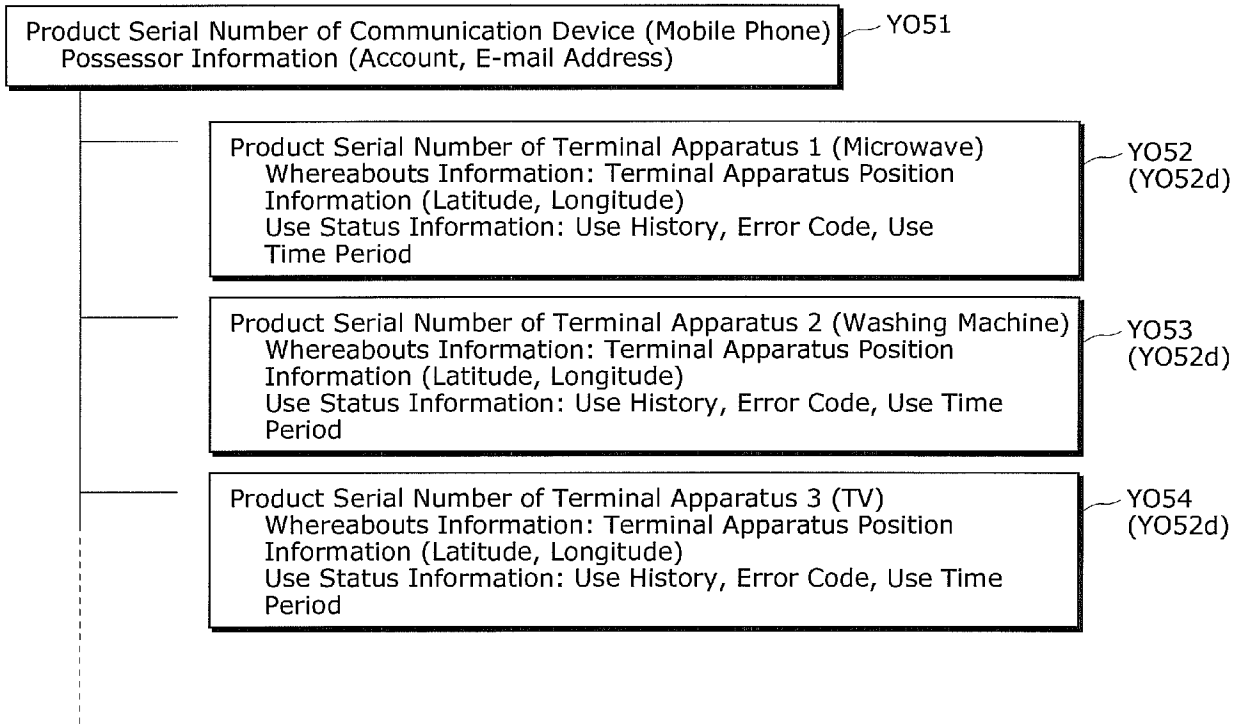

FIG. 129 is a schematic diagram of a structure of a device management database according to the sixteenth embodiment of the present invention.

Figure 130:
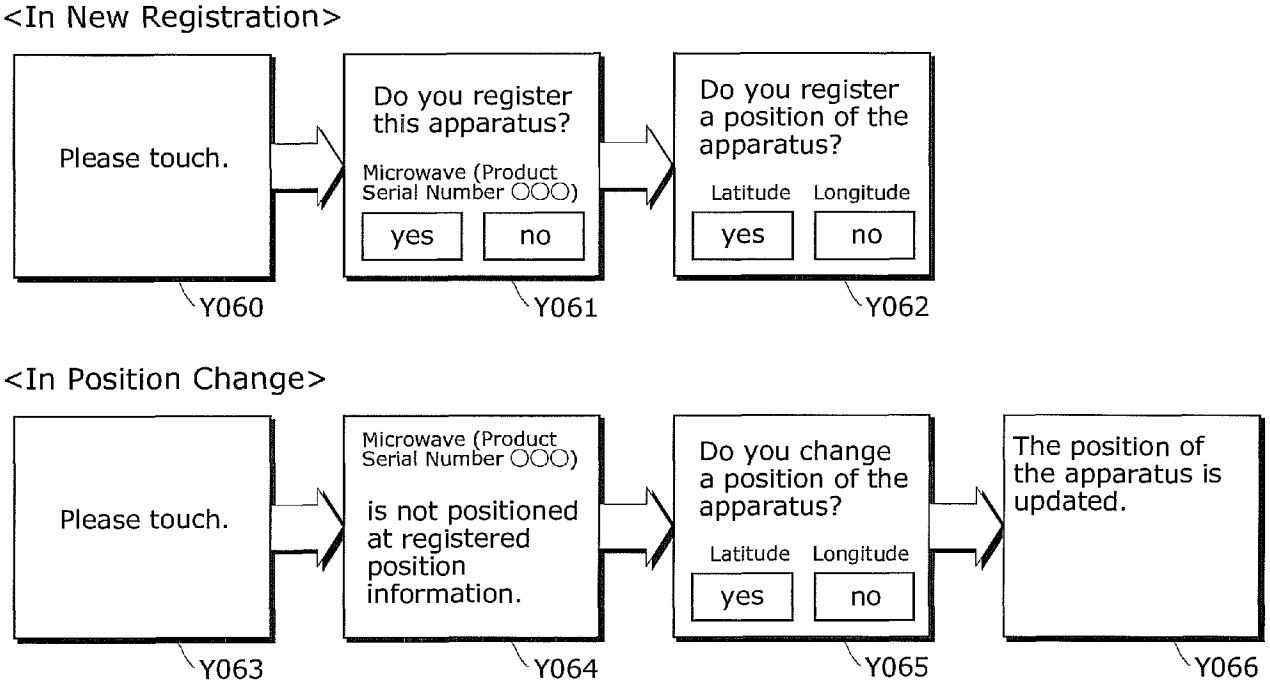

FIG. 130 is a schematic diagram of display of the device management system according to the sixteenth embodiment of the present invention.

Figure 131:
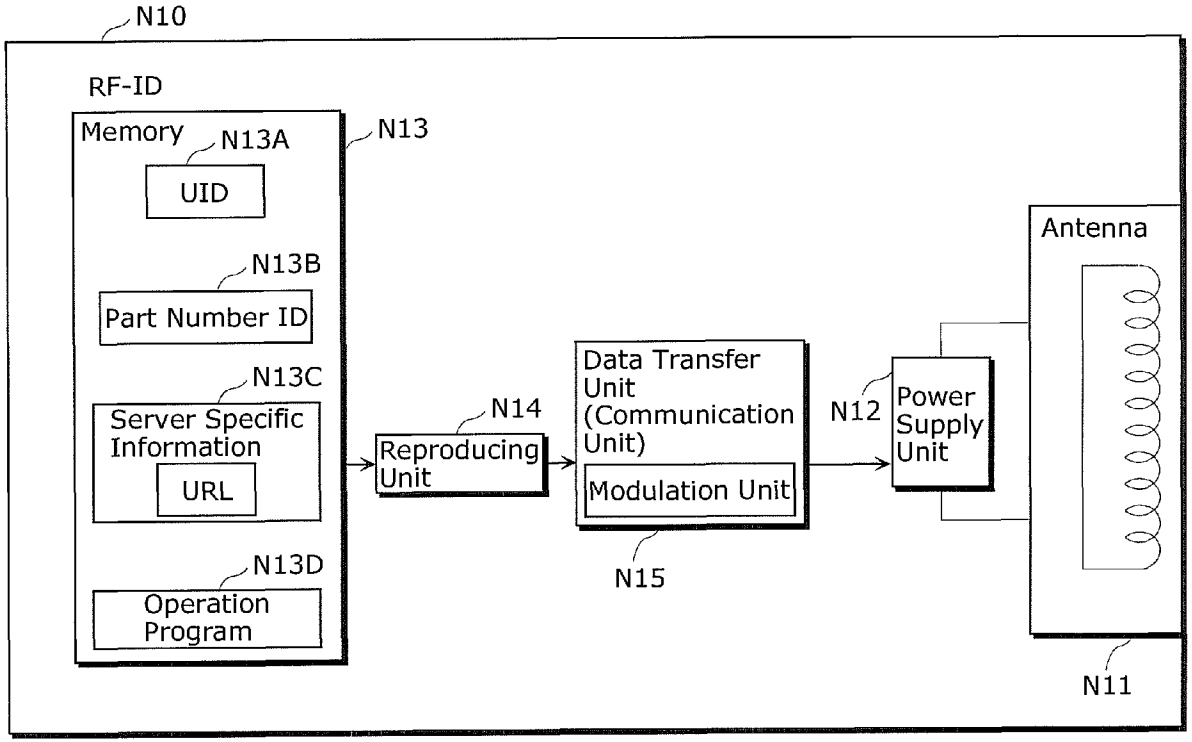

FIG. 131 is a functional block diagram of a RF-ID unit N10 according to a seventeenth embodiment of the present invention.

Figure 132:
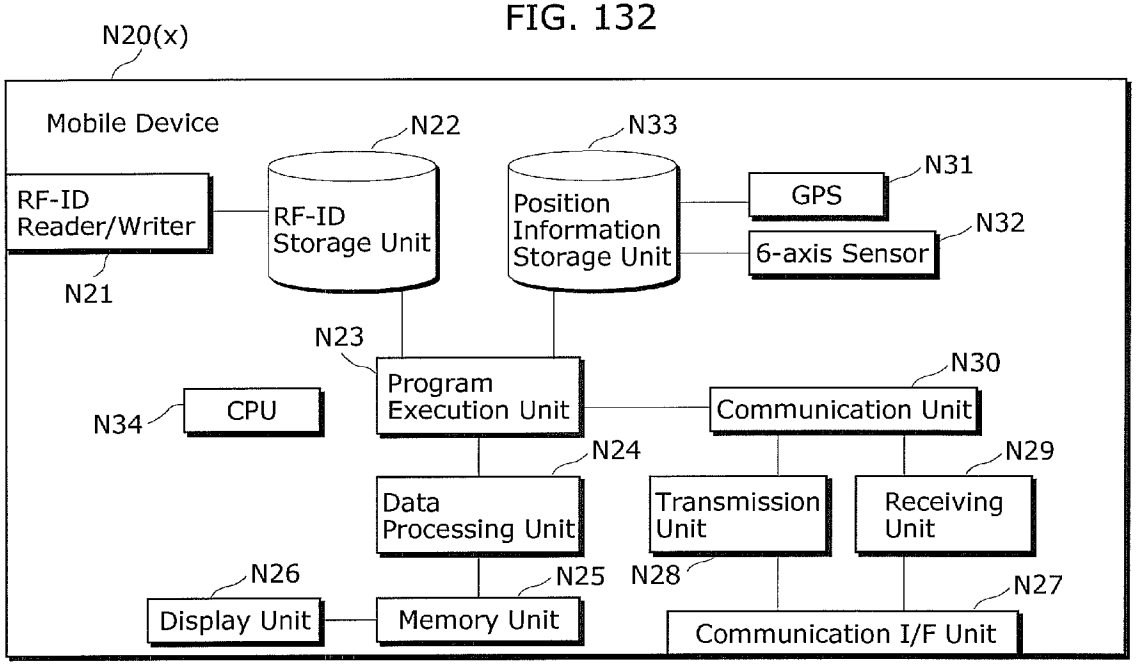

FIG. 132 is a functional block diagram of a mobile device N20 according to the seventeenth embodiment of the present invention.

Figure 133:
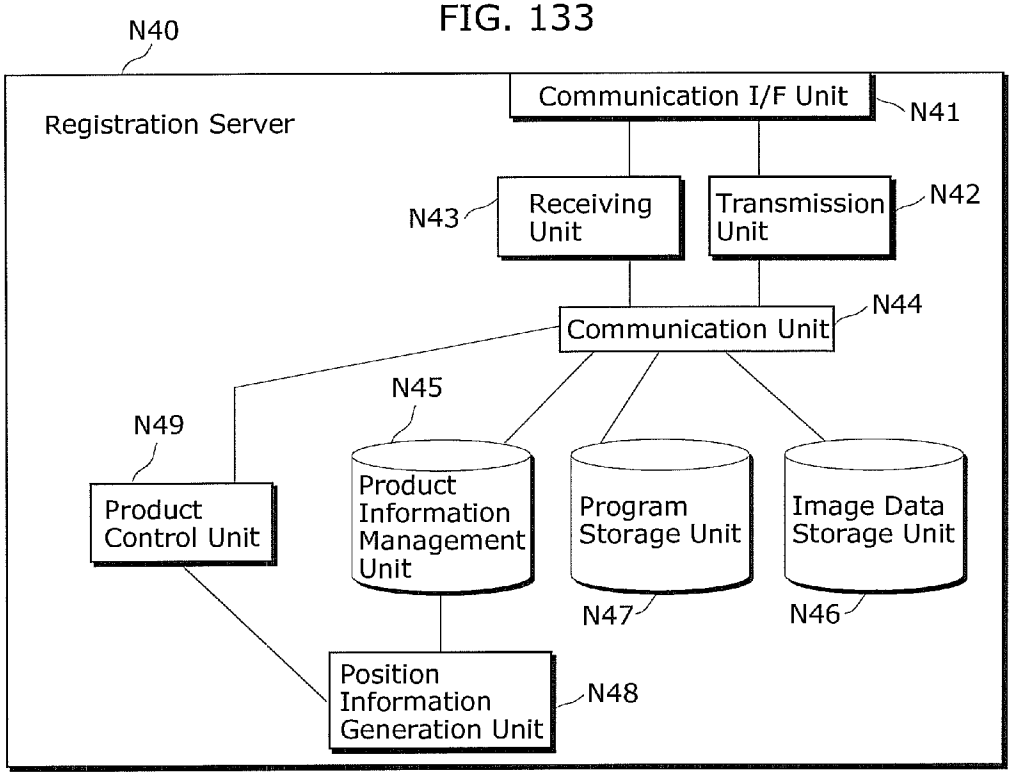

FIG. 133 is a functional block diagram of a registration server N40 according to the seventeenth embodiment of the present invention.

Figure 134:
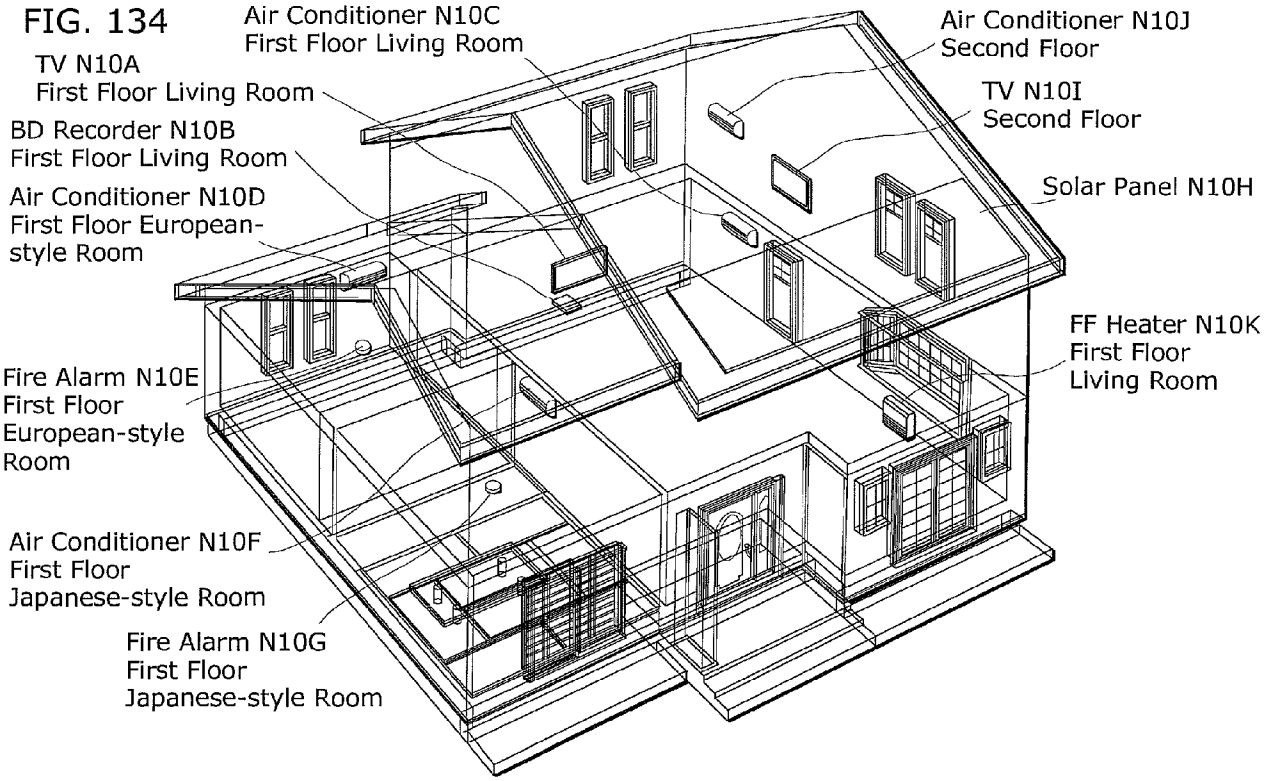

FIG. 134 is a diagram illustrating an example of an arrangement of networked products according to the seventeenth embodiment of the present invention.

Figure 135:
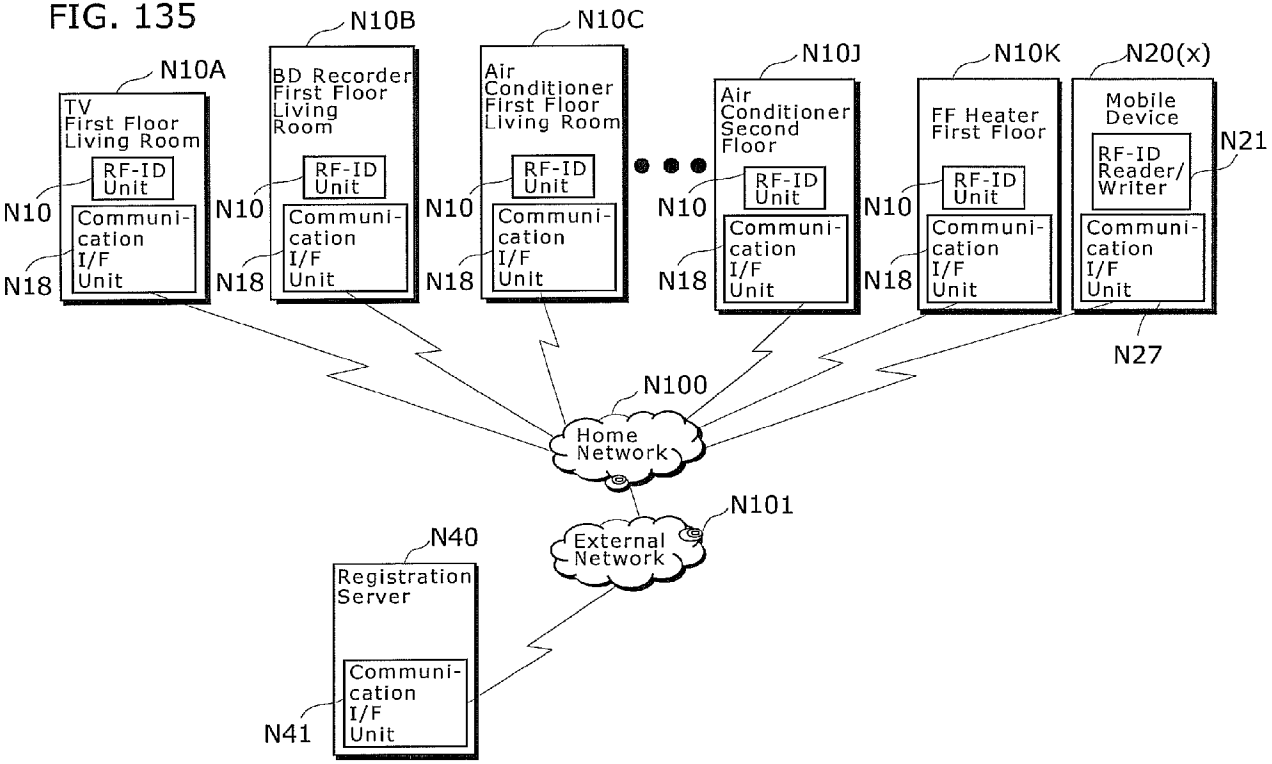

FIG. 135 is a diagram illustrating an example of a system according to the seventeenth embodiment of the present invention.

Figure 136:
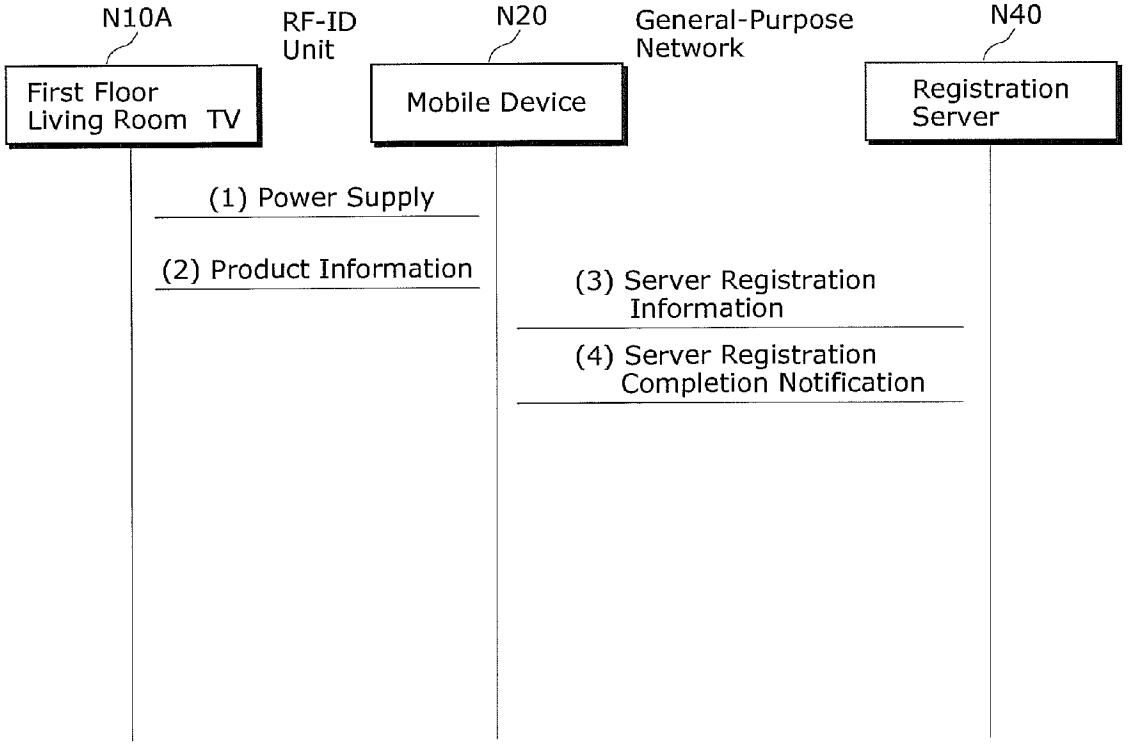

FIG. 136 is a sequence diagram for registering information of a TV N10A into a registration server N40, according to the seventeenth embodiment of the present invention.

FIG. 137A is a table illustrating an example of a structure of product information according to the seventeenth embodiment of the present invention.

FIG. 137B is a table illustrating an example of a structure of server registration information according to the seventeenth embodiment of the present invention.

FIG. 138A is a table illustrating an example of a structure of product information stored in a product information management unit N45 according to the seventeenth embodiment of the present invention.

FIG. 138B is a table illustrating an example of product information managed in the product information management unit N45 according to the seventeenth embodiment of the present invention.

Figure 139:
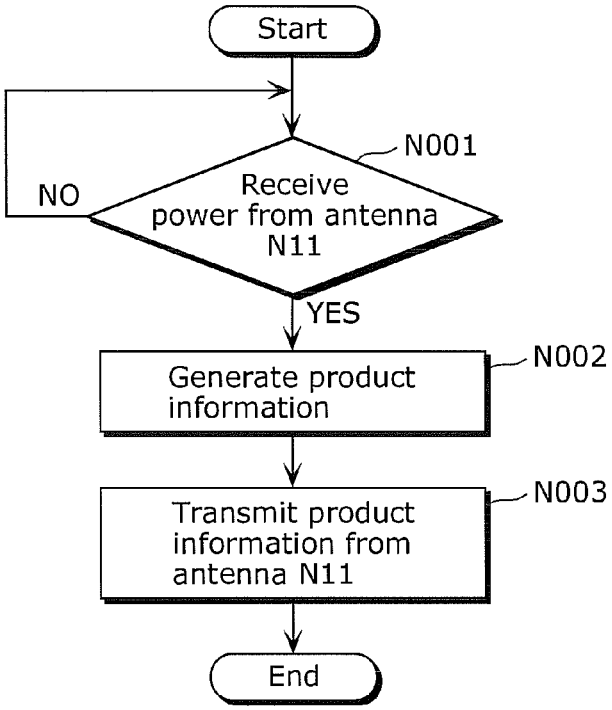

FIG. 139 is a flowchart illustrating an example of processing performed by a RF-ID unit N10 to perform product registration according to the seventeenth embodiment of the present invention.

Figure 140:
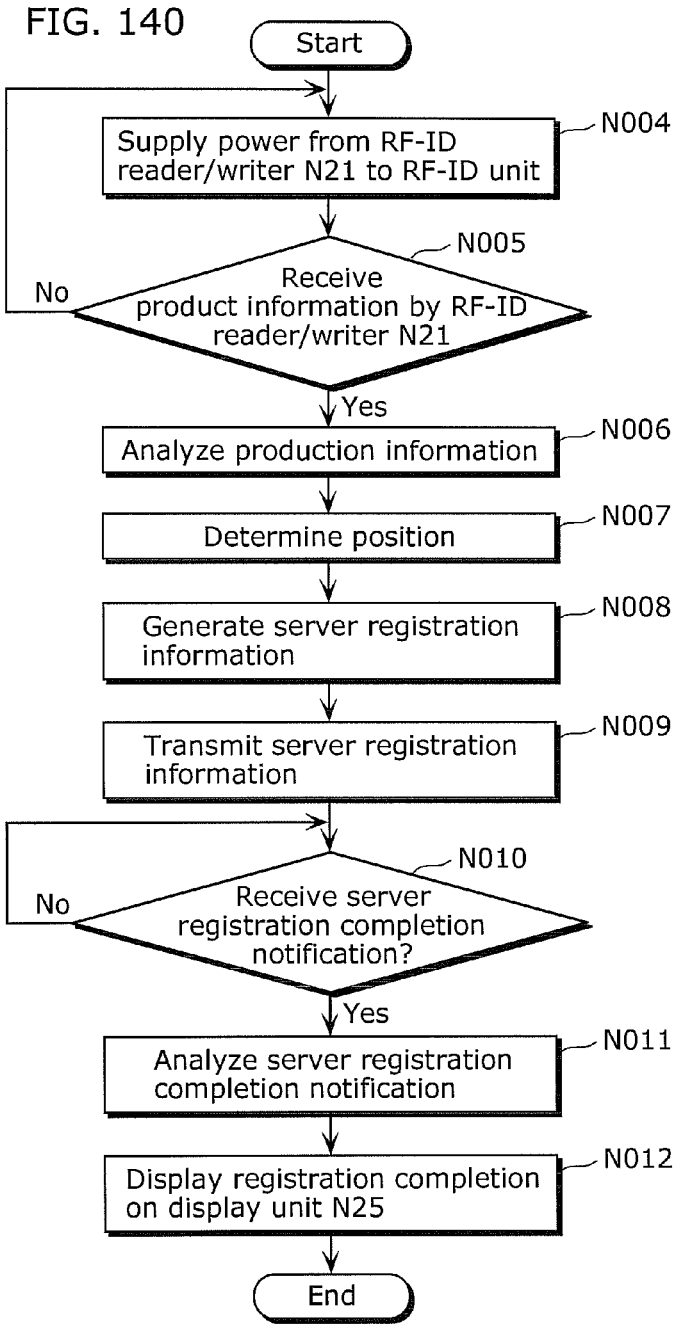

FIG. 140 is a flowchart illustrating an example of processing performed by a mobile device N20 to perform product registration according to the seventeenth embodiment of the present invention.

Figure 141:
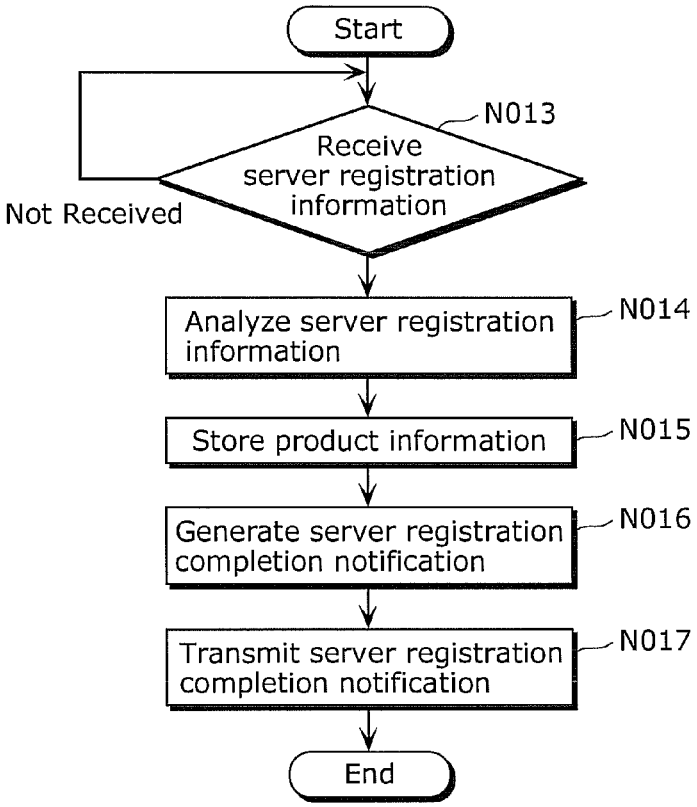

FIG. 141 is a flowchart illustrating an example of processing performed by a registration server N40 to perform product registration according to the seventeenth embodiment of the present invention.

Figure 142:
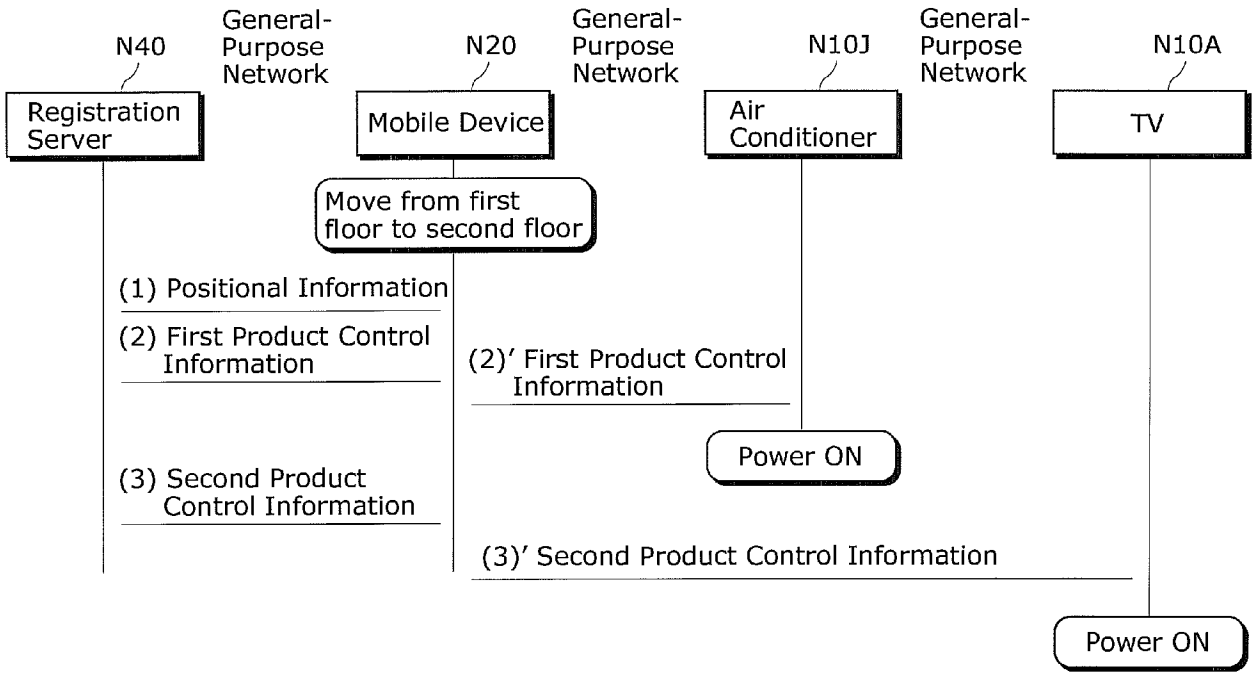

FIG. 142 is a sequence diagram illustrating an example of controlling power for an air conditioner N10J and a TV N10A according to the seventeenth embodiment of the present invention.

FIG. 143A is a table illustrating an example of a structure of positional information according to the seventeenth embodiment of the present invention.

FIG. 143B is a table illustrating an example of a structure of first product control information according to the seventeenth embodiment of the present invention.

FIG. 143C is a table illustrating an example of a structure of second product control information according to the seventeenth embodiment of the present invention.

Figure 144:
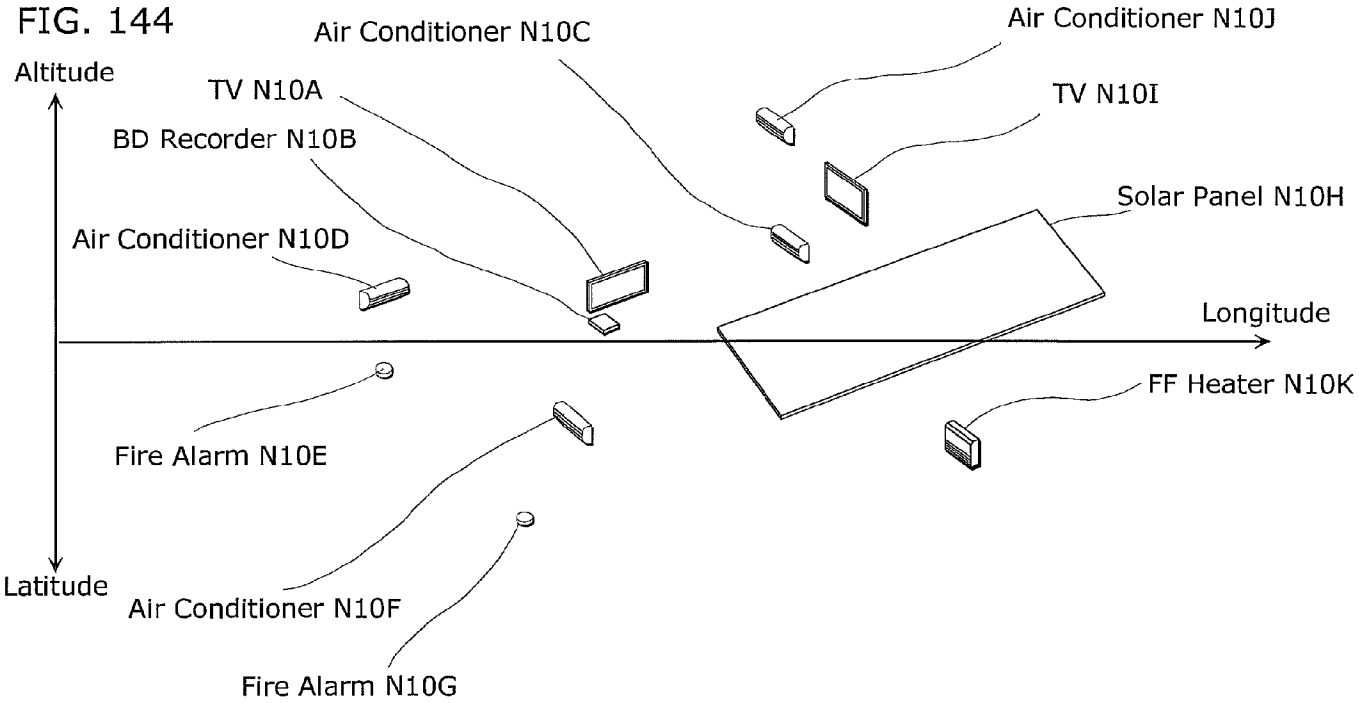

FIG. 144 is a diagram illustrating a product map generated by a position information generation unit N48 according to the seventeenth embodiment of the present invention.

FIG. 145 is a table illustrating an example of a structure of product information stored in the product information management unit N45 according to the seventeenth embodiment of the present invention.

Figure 146:
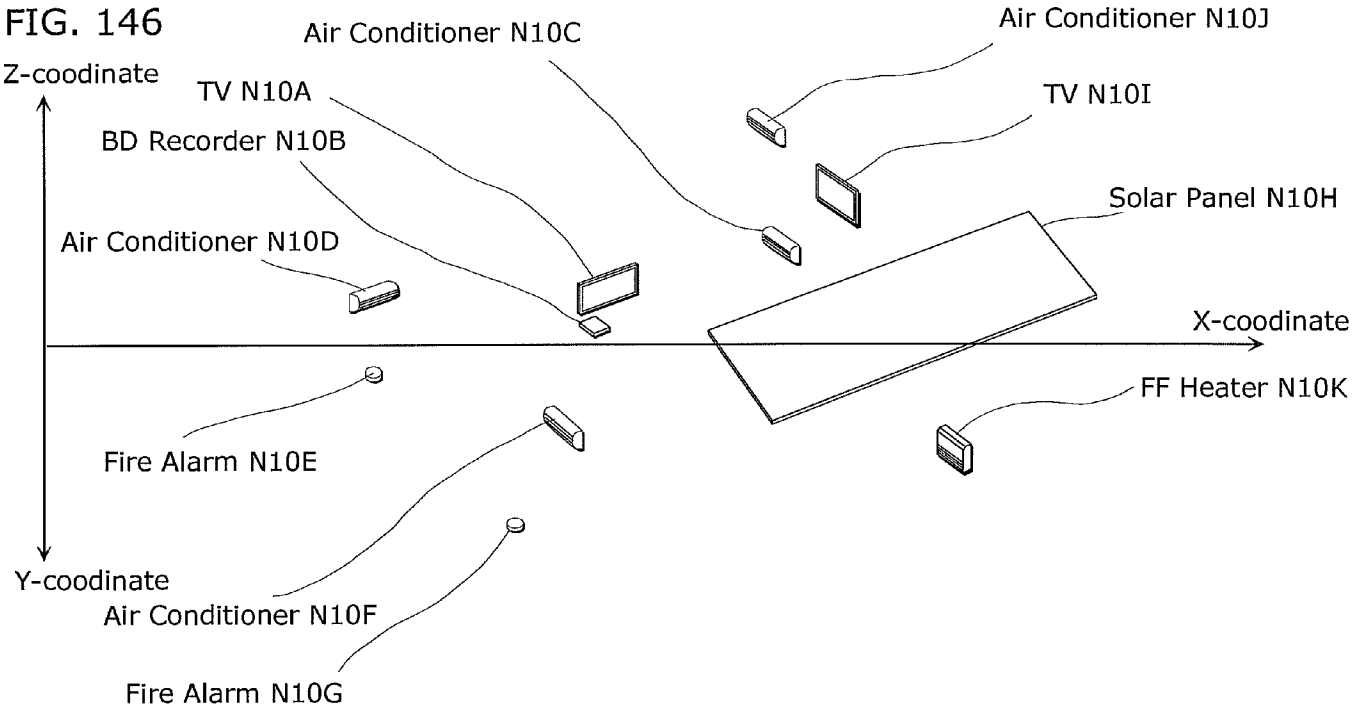

FIG. 146 is a diagram illustrating a product map generated by the position information generation unit N48 according to the seventeenth embodiment of the present invention.

FIG. 147 is a table illustrating examples of an accuracy identifier according to the seventeenth embodiment of the present invention.

Figure 148:
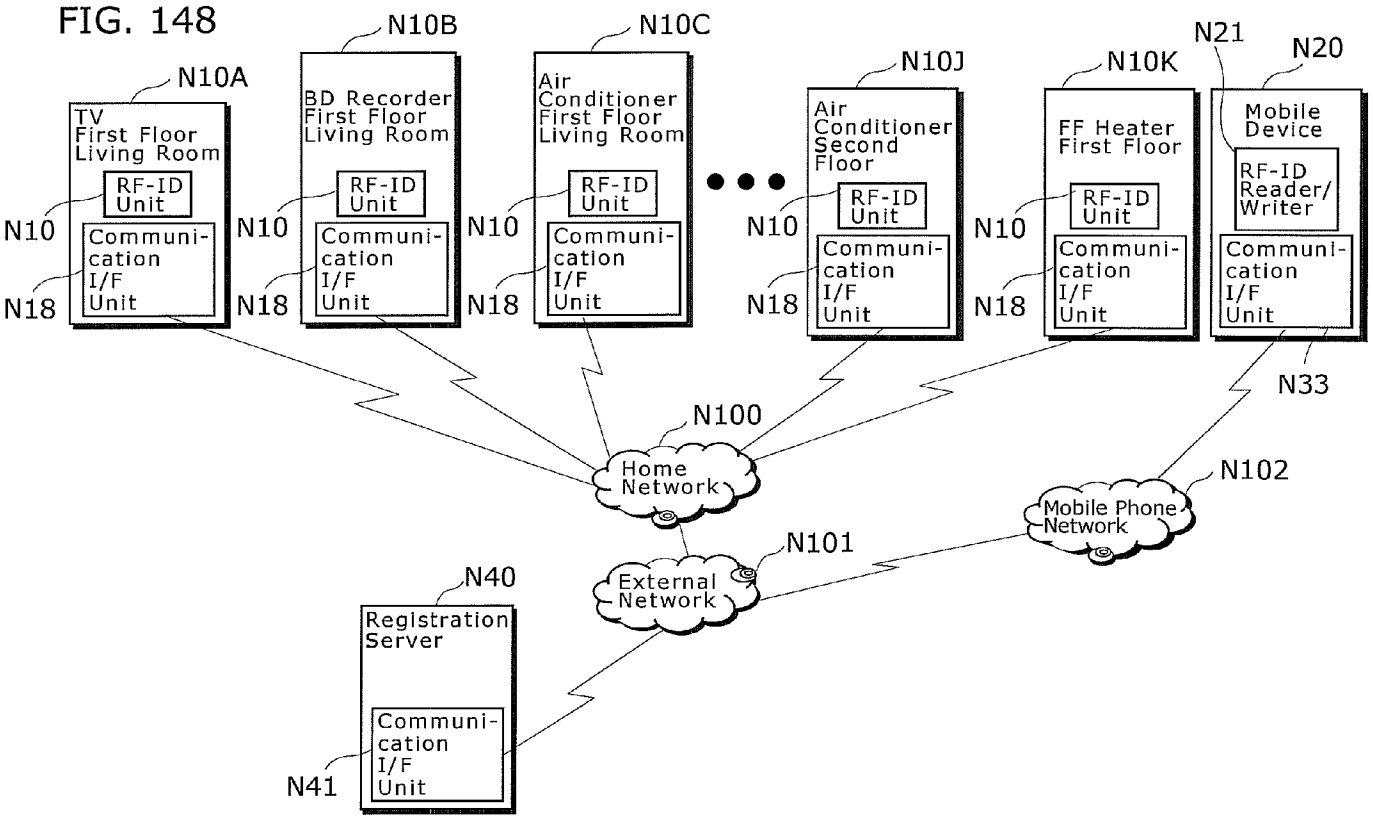

FIG. 148 is a diagram illustrating an example of a system according to the seventeenth embodiment of the present invention.

Figure 149:
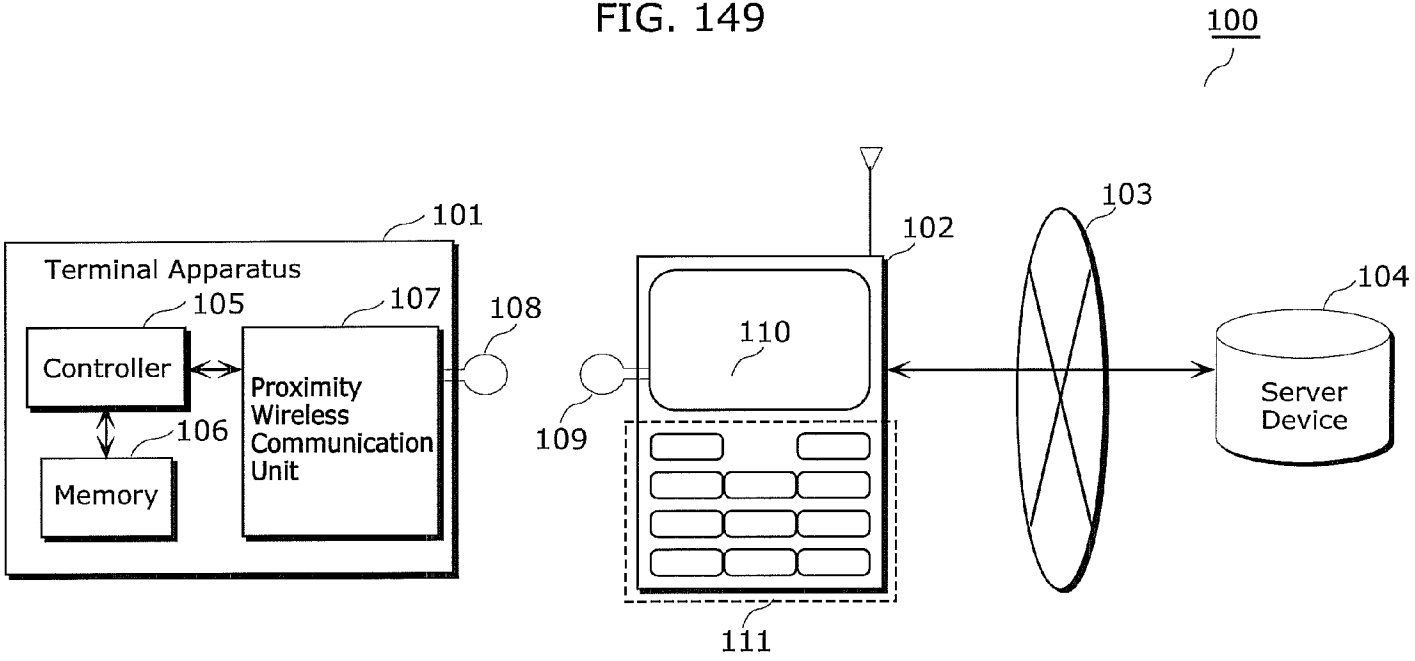

FIG. 149 is a schematic diagram showing a communication system according to an eighteenth embodiment of the present invention.

Figure 150:
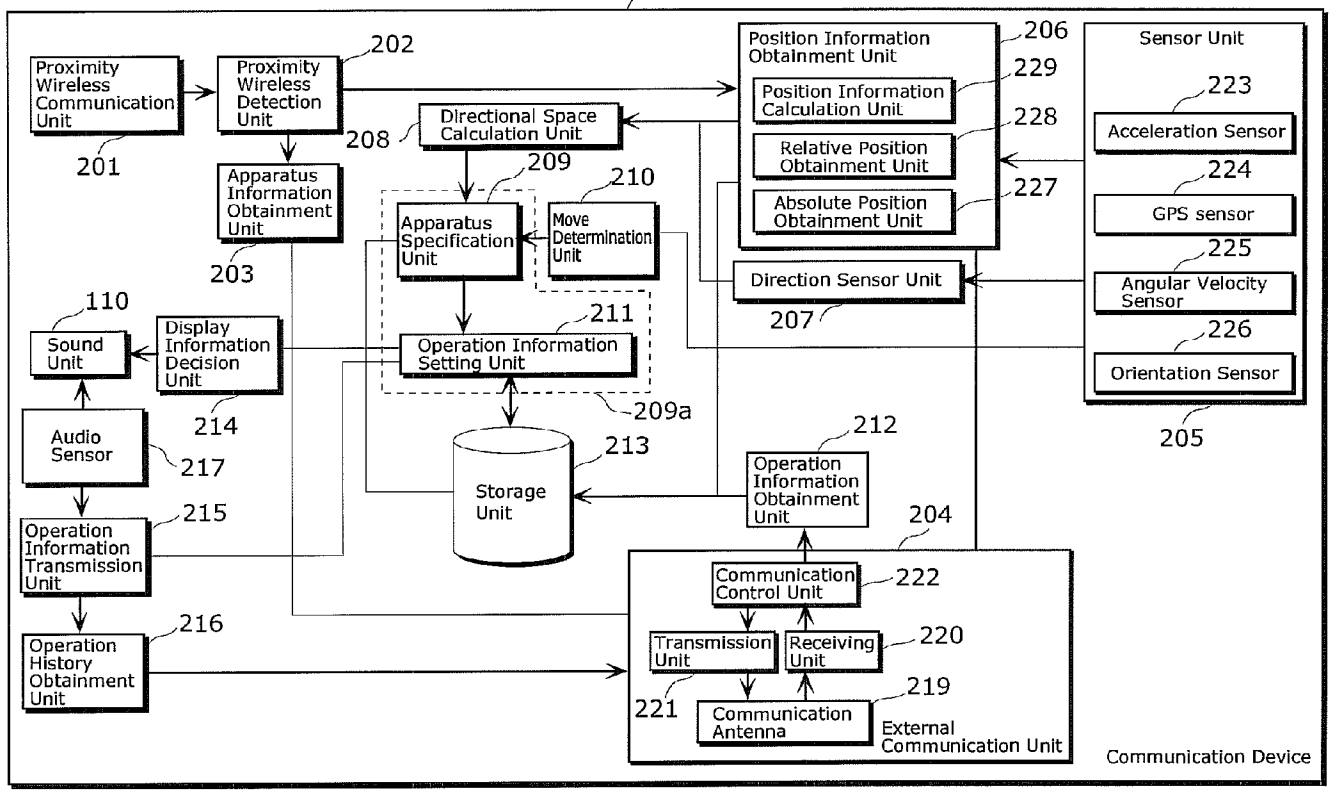

FIG. 150 is a block diagram showing a structure of a communication device according to the eighteenth embodiment of the present invention.

Figure 151:
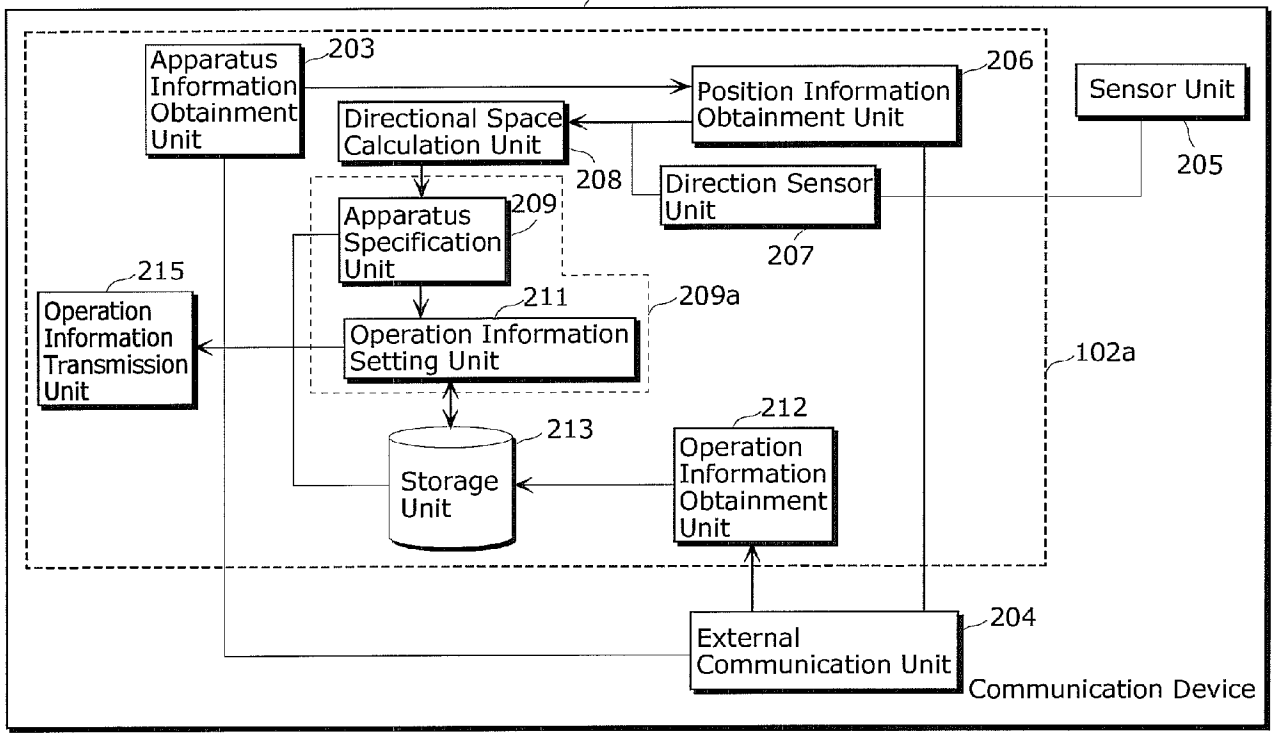

FIG. 151 is a block diagram showing a minimum structure of the communication device according to the eighteenth embodiment of the present invention.

Figure 152A:
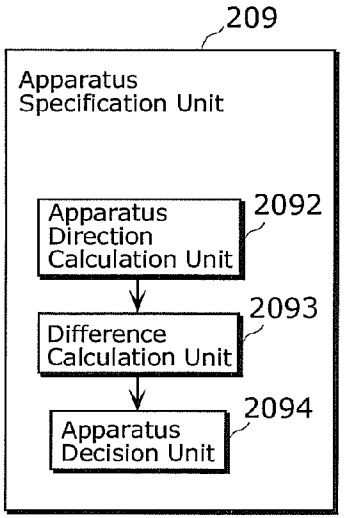

FIG. 152A is a block diagram showing an example of a detailed structure of an apparatus specification unit according to the eighteenth embodiment of the present invention.

Figure 152B:
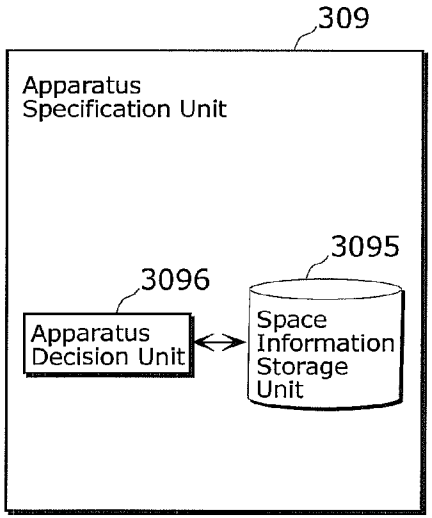

FIG. 152B is a block diagram showing another example of a detailed structure of the apparatus specification unit according to the eighteenth embodiment of the present invention.

Figure 152C:
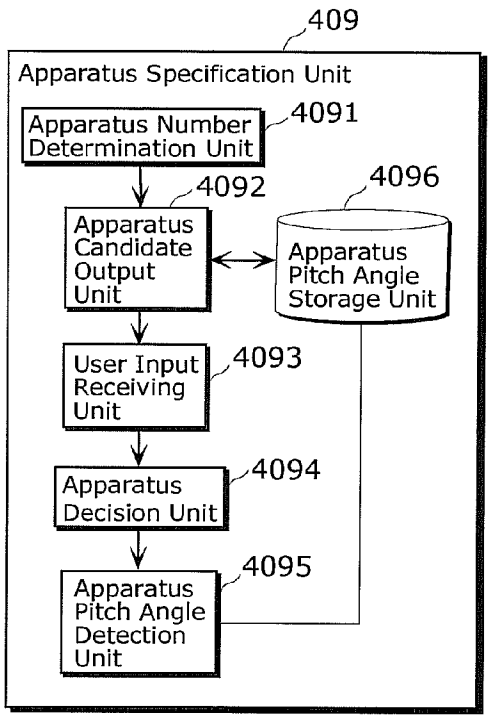

FIG. 152C is a block diagram showing still another example of a detailed structure of the apparatus specification unit according to the eighteenth embodiment of the present invention.

FIG. 153 is a table showing an example of a data structure stored in a storage unit according to the eighteenth embodiment of the present invention.

Figure 154:
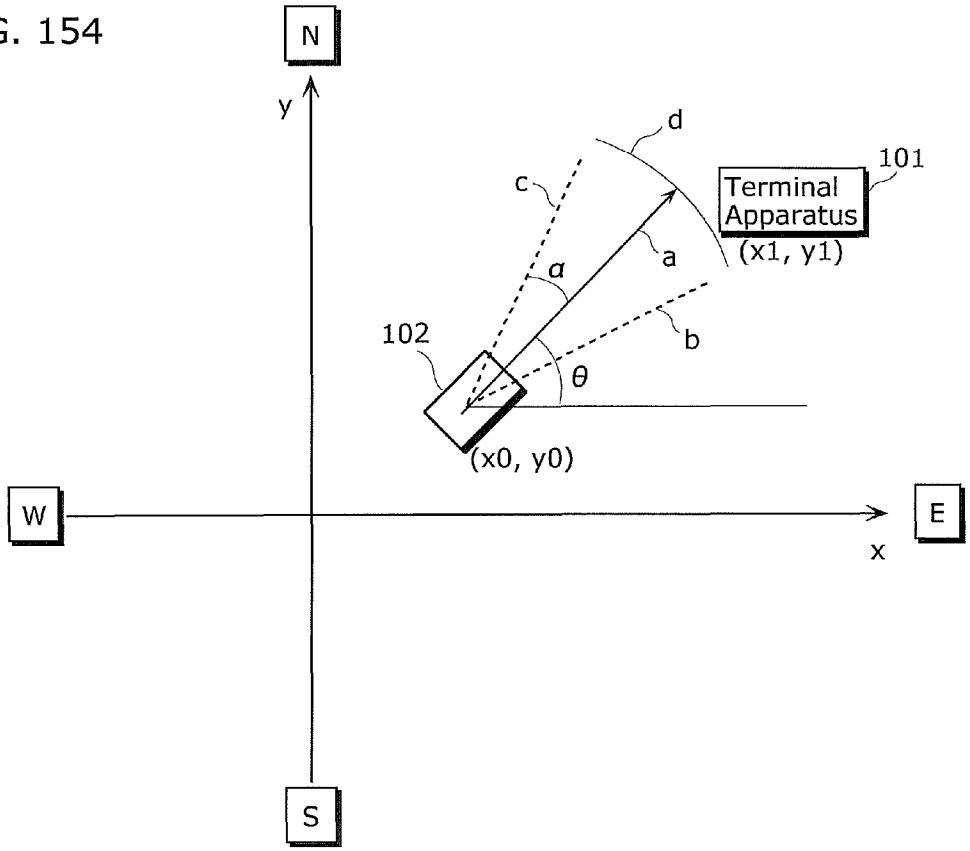

FIG. 154 is a graph showing an example of a method of calculating a directional space by a directional space calculating unit according to the eighteenth embodiment of the present invention.

Figure 155:
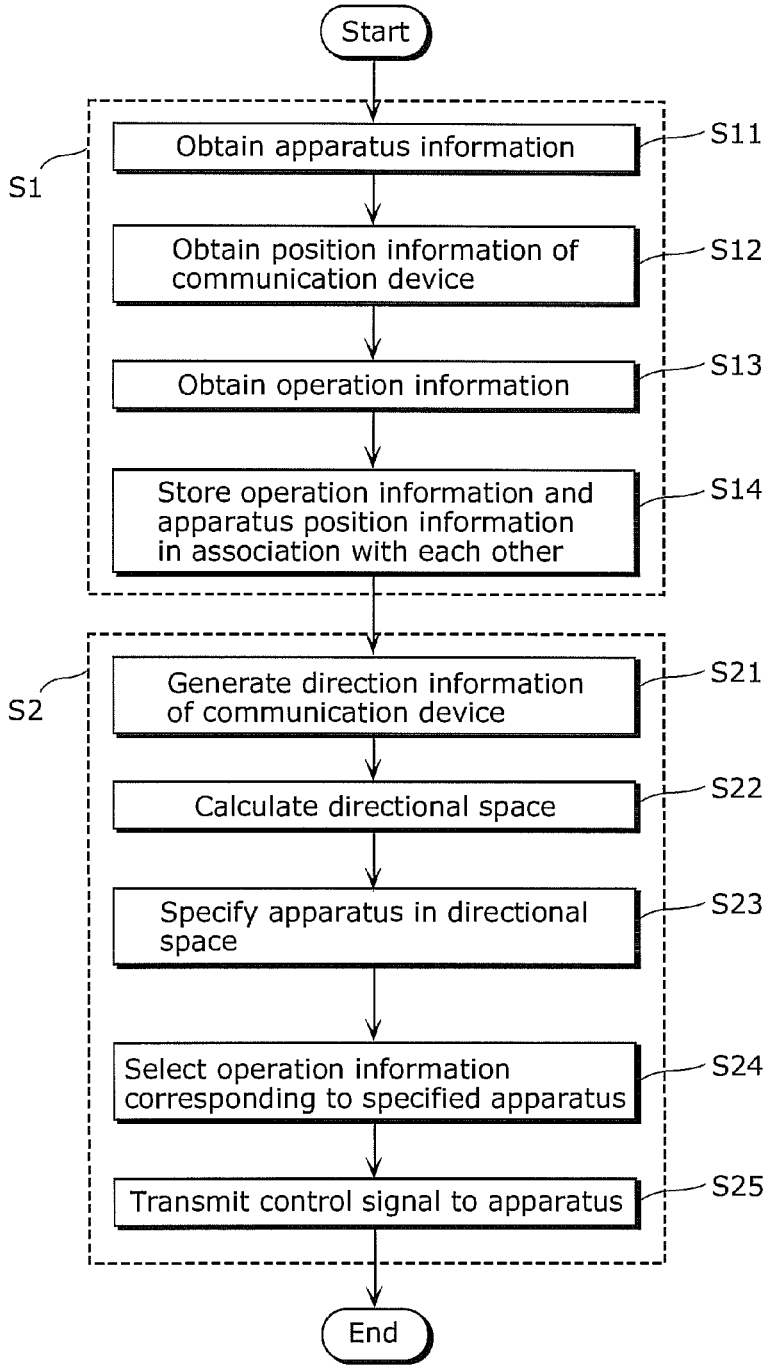

FIG. 155 is a flowchart of a summary of processing performed by the communication device according to the eighteenth embodiment of the present invention.

Figure 156:
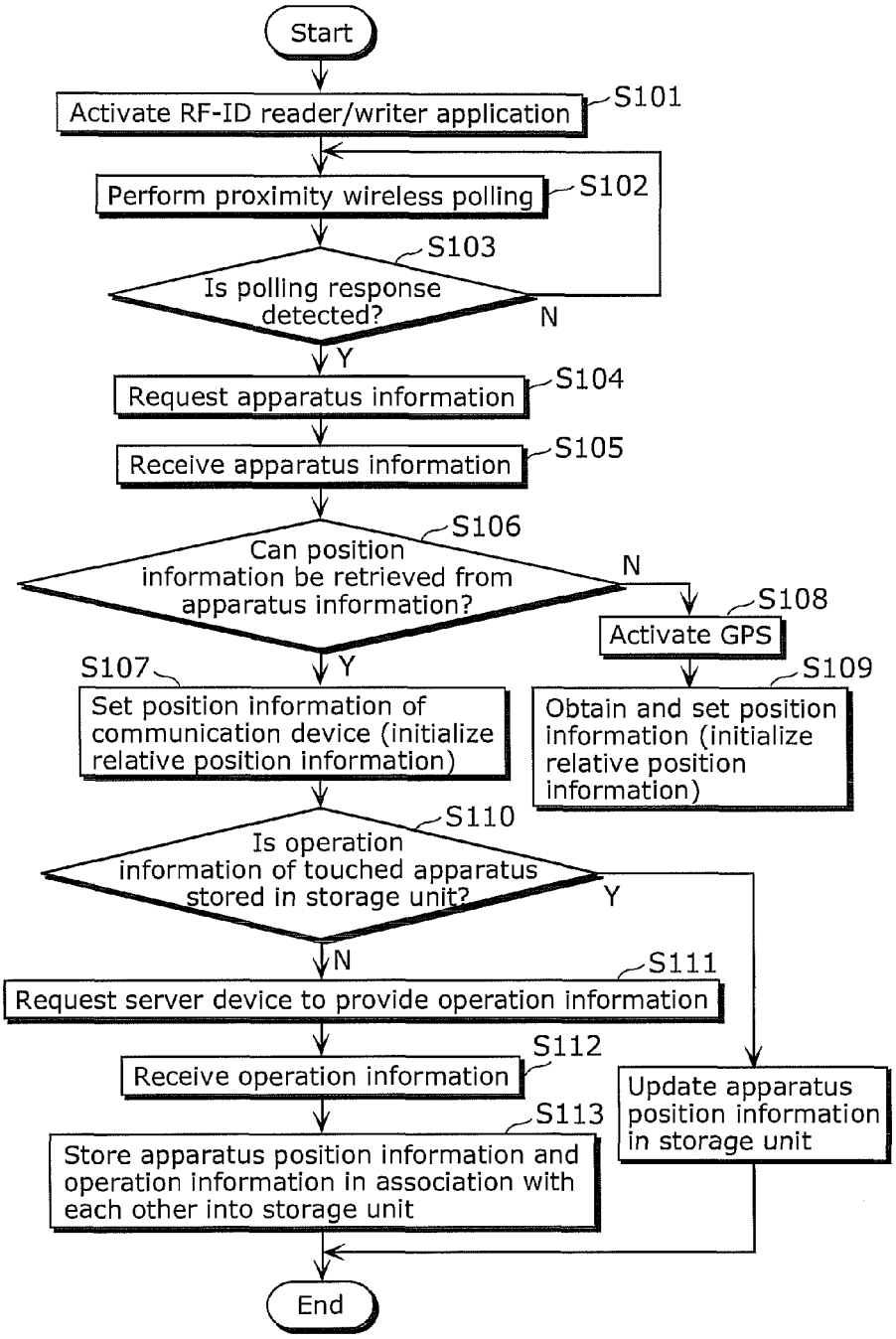

FIG. 156 is a flowchart of registering operation information onto a storage unit of the communication device according to the eighteenth embodiment of the present invention.

Figure 157:
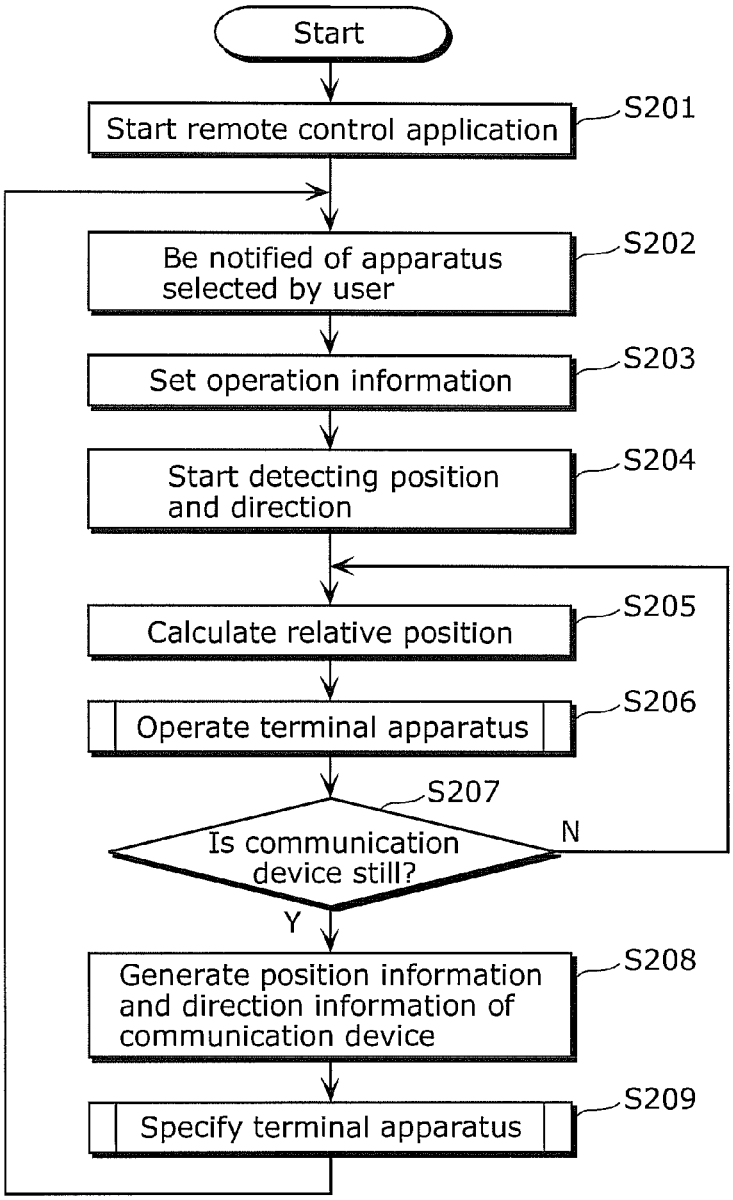

FIG. 157 is a flowchart of setting remote control information into the communication device to serve as a remote controller, according to the eighteenth embodiment of the present invention.

Figure 158:
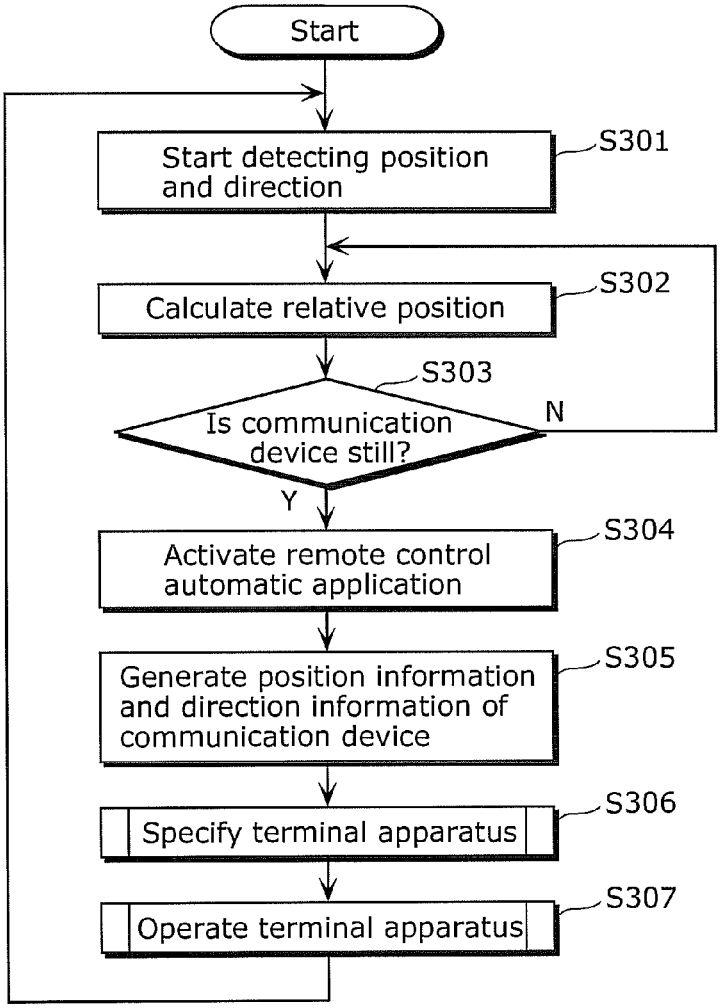

FIG. 158 is a flowchart of setting remote control information into the communication device to serve as a remote controller, according to the eighteenth embodiment of the present invention.

Figure 159:
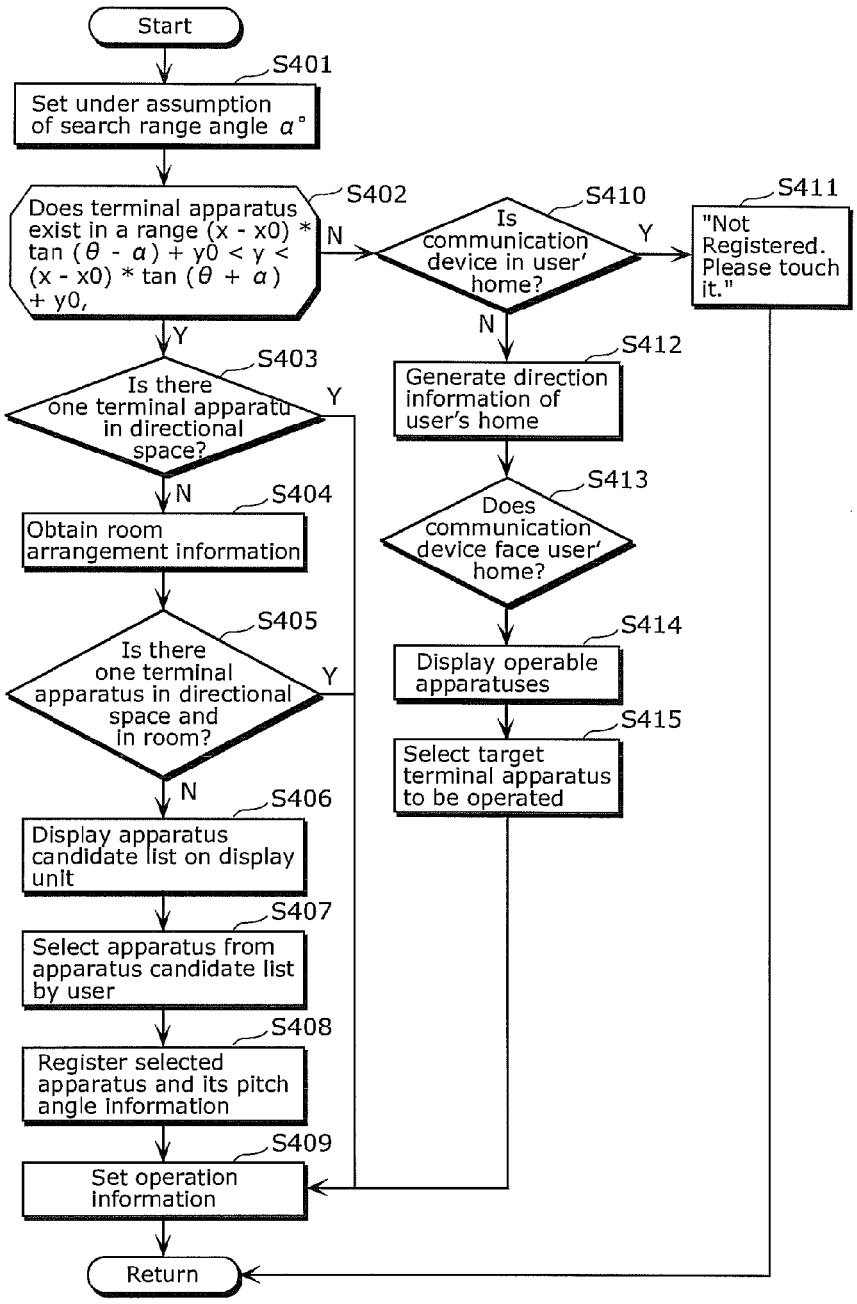

FIG. 159 is a flowchart of an example of processing of specifying a terminal apparatus existing in a direction pointed by the communication device according to the eighteenth embodiment of the present invention.

Figure 160:
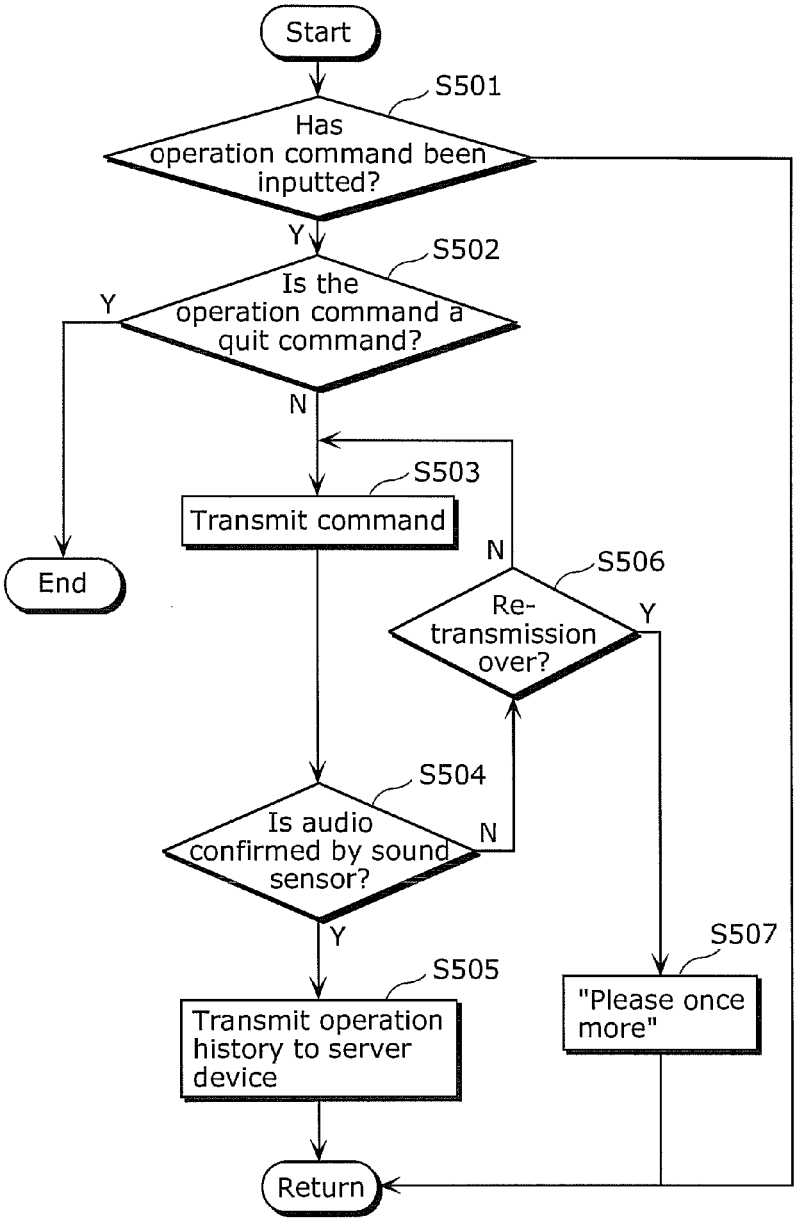

FIG. 160 is a flowchart of an example of processing of operating a target terminal apparatus by using, as a remote controller, the communication device according to the eighteenth embodiment of the present invention.

Figure 161:
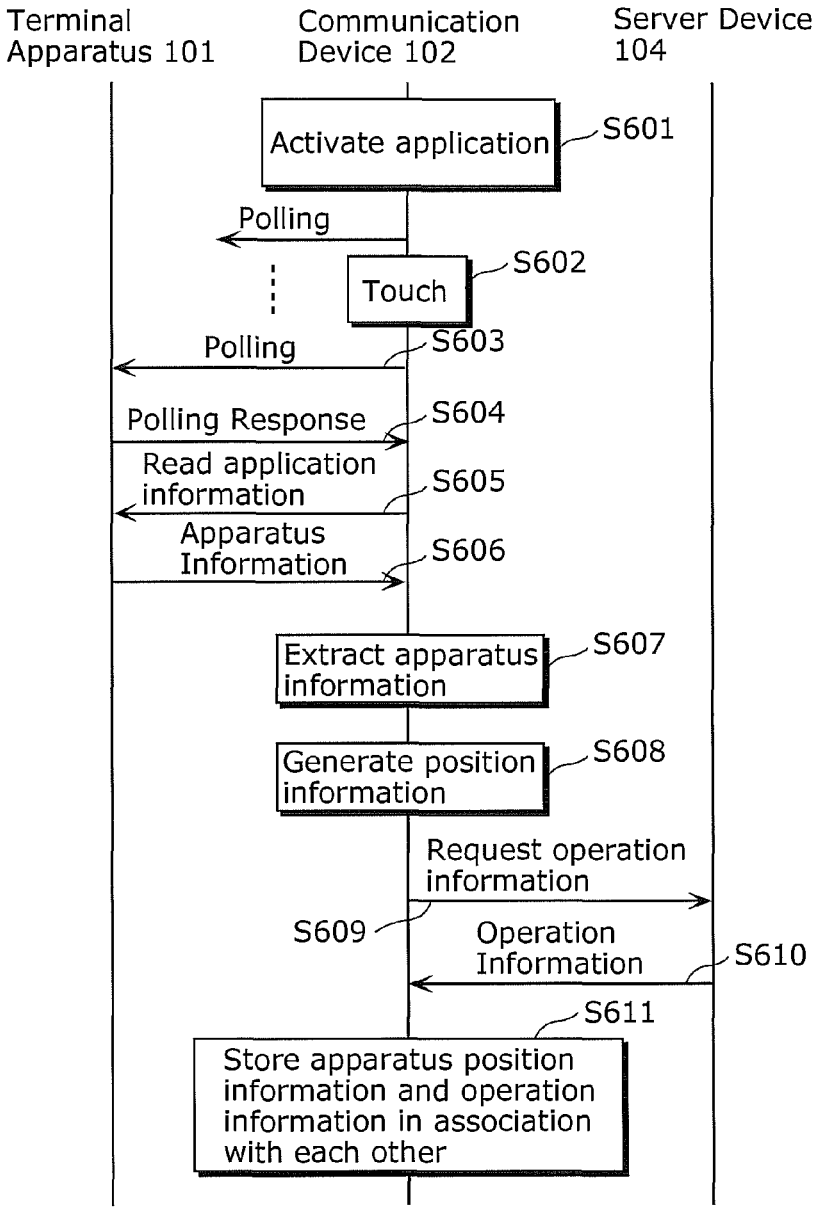

FIG. 161 is a sequence of data flow in registration of operation information performed by the communication device according to the eighteenth embodiment of the present invention.

Figure 162:
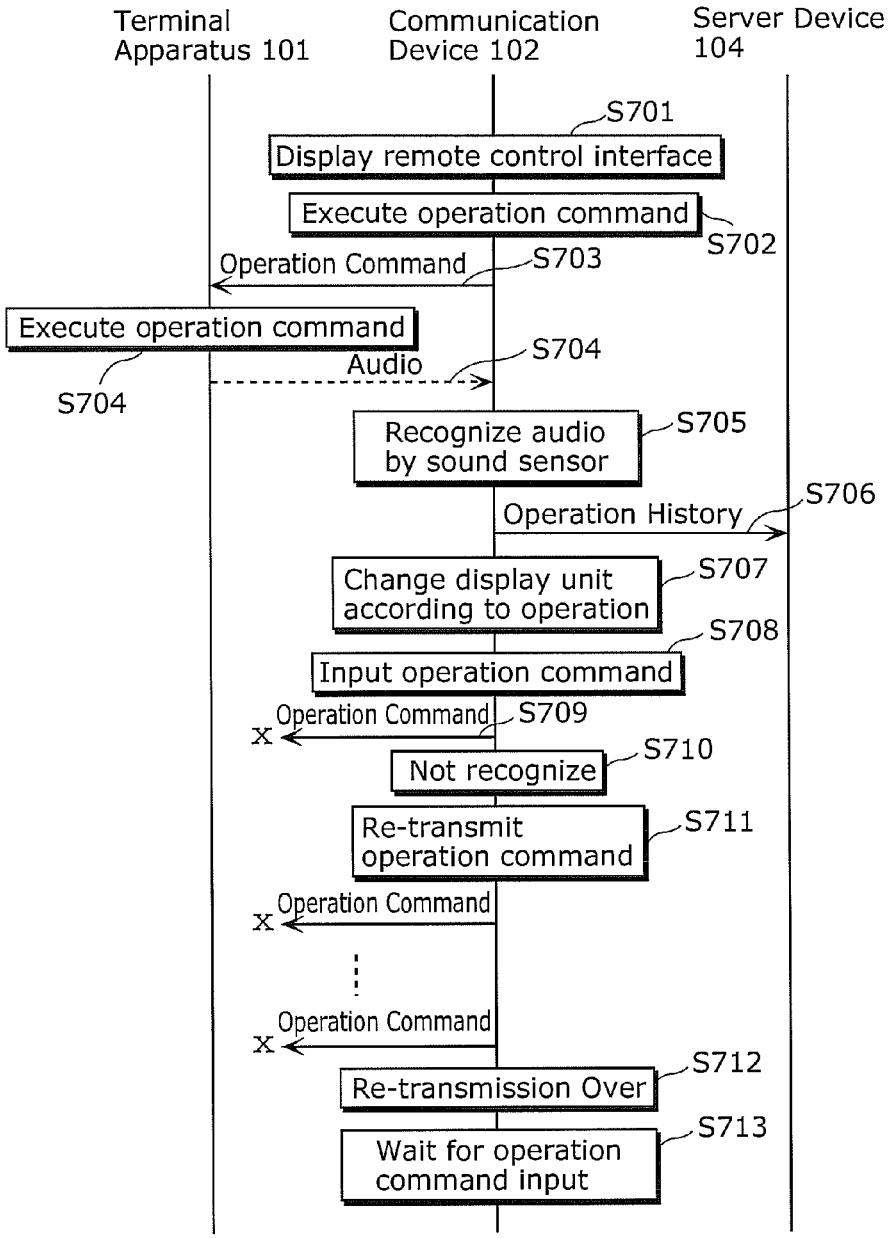

FIG. 162 is a sequence of data flow where the communication device serves as a remote controller to operate a terminal apparatus, according to the eighteenth embodiment of the present invention.

Figure 163B:
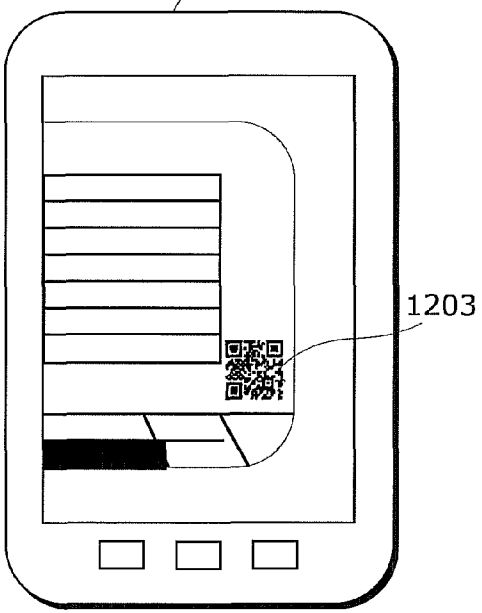
Figure 163A:
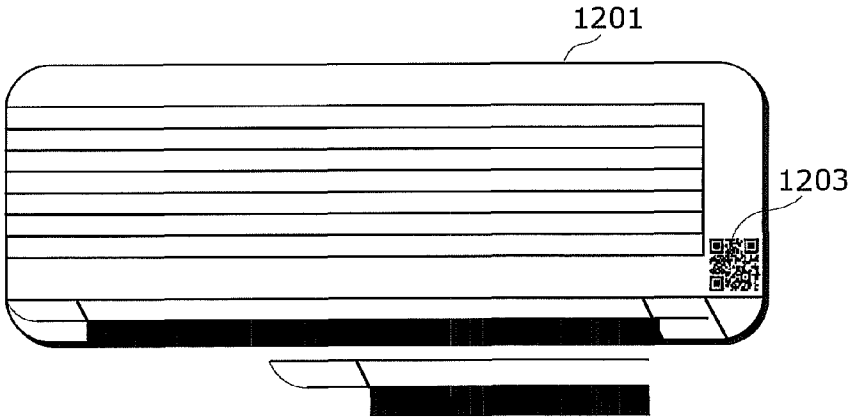

FIG. 163A is a diagram showing the case where a two-dimensional (2D) bar-code is provided as apparatus information of the terminal apparatus 101, according to the eighteenth embodiment of the present invention.

FIG. 163B is a diagram showing an example of the case where the apparatus information of the terminal apparatus 101 is read from the 2D bar-code, according to the eighteenth embodiment of the present invention.

Figure 164A:
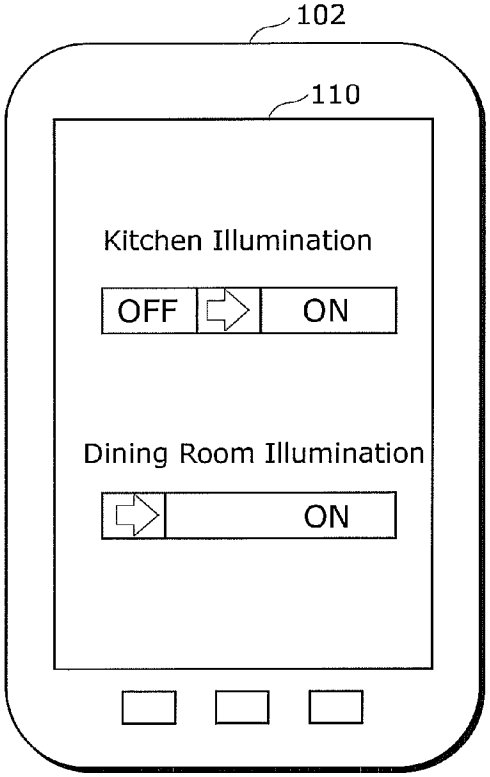

FIG. 164A is a diagram showing a display example of a display unit in the case where a plurality of illumination apparatuses are operated.

Figure 164B:
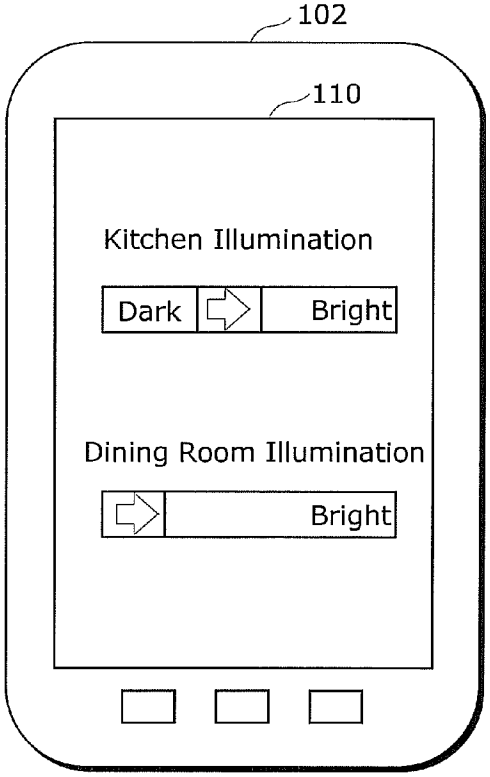

FIG. 164B is a diagram showing a display example of a display unit in the case where a plurality of illumination apparatuses are operated.

Figure 165A:
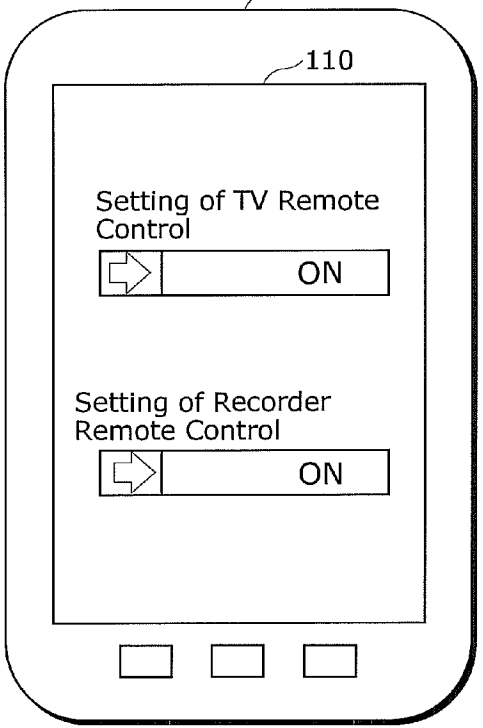

FIG. 165A is a diagram showing a display example in the case where a user is persuaded to select which apparatus among a plurality of apparatuses should be operated by a communication device 102 as a remote controller.

Figure 165B:
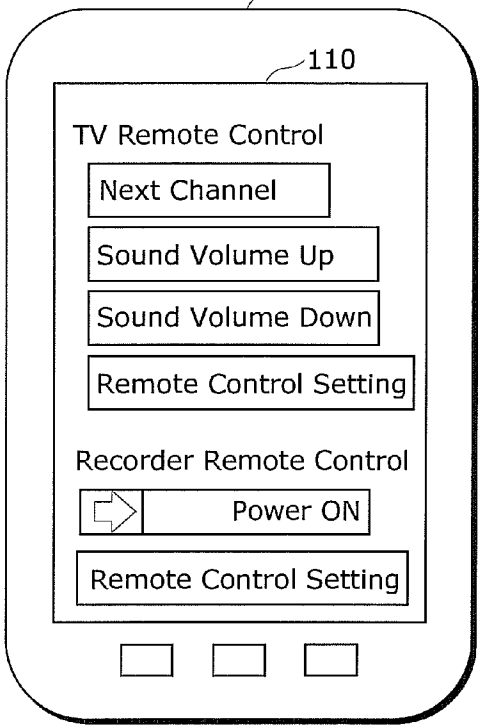

FIG. 165B is a diagram showing an example in the case where the communication device 102 sets operation information according to a current operating status of the terminal apparatus 101.

Figure 166:
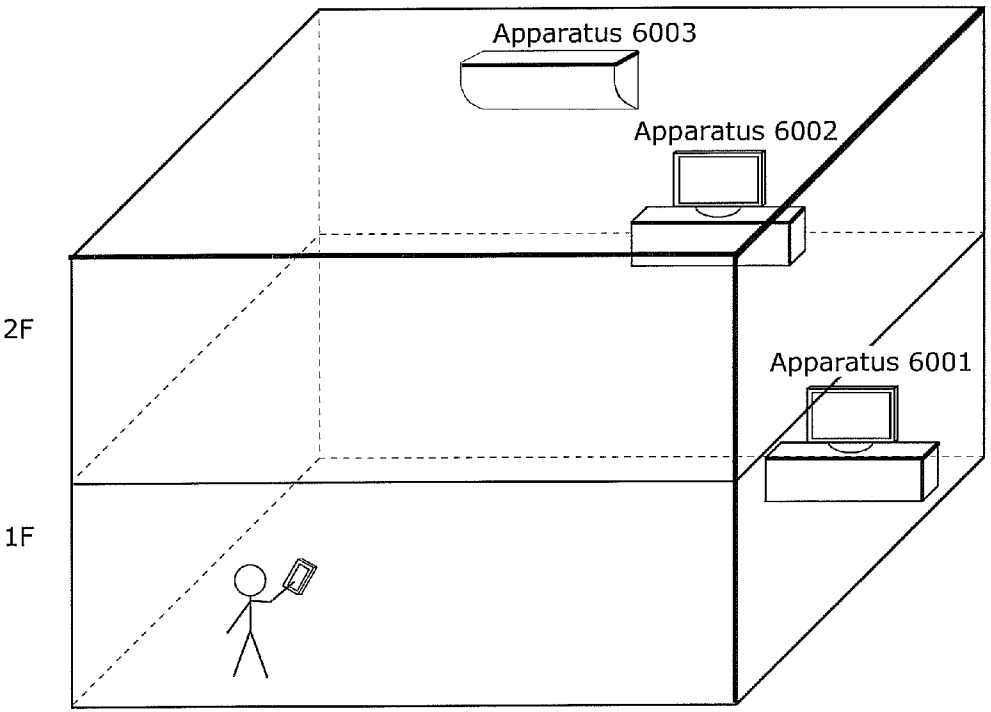

FIG. 166 is a schematic diagram of remote control operation for the second floor, according to the eighteenth embodiment of the present invention.

FIG. 167 is a diagram illustrating an example of an entire system according to a nineteenth embodiment of the present invention.

Figure 168:
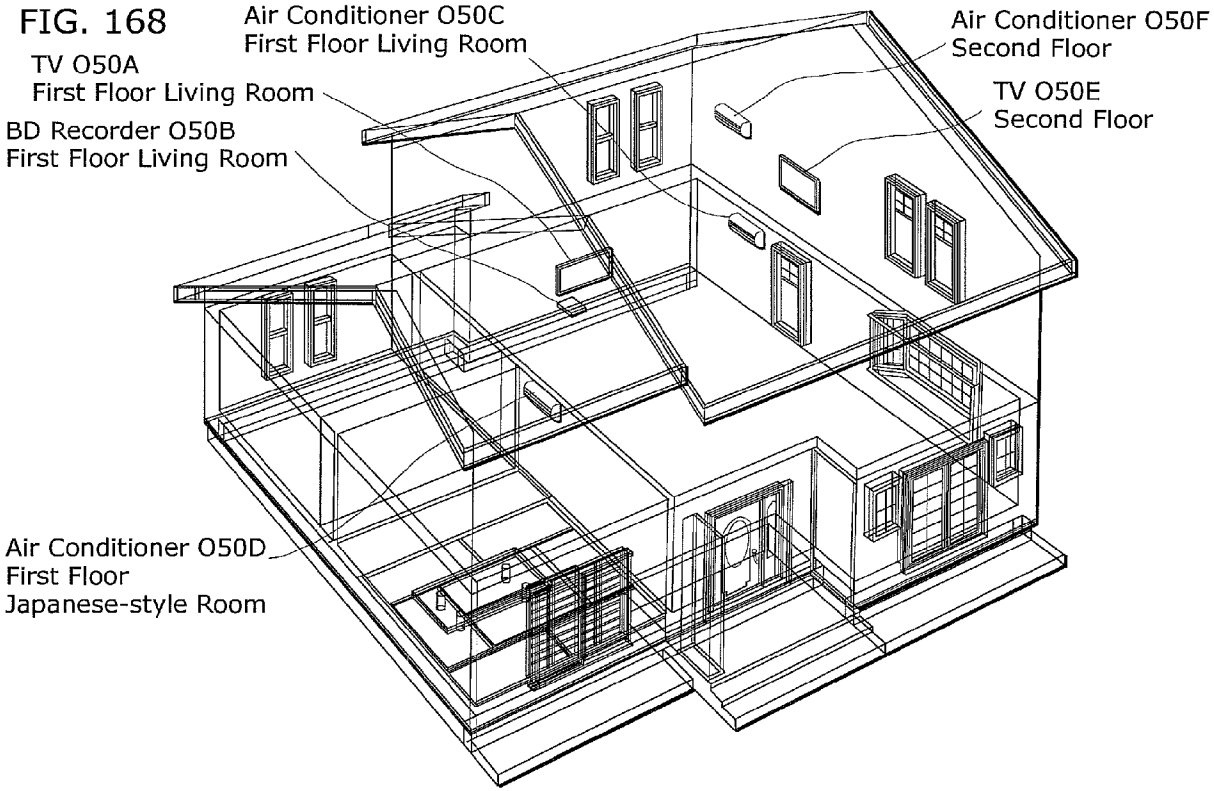

FIG. 168 is a diagram illustrating an example of an arrangement of products embedded with RF-ID units O50 according to the nineteenth embodiment of the present invention.

Figure 169:
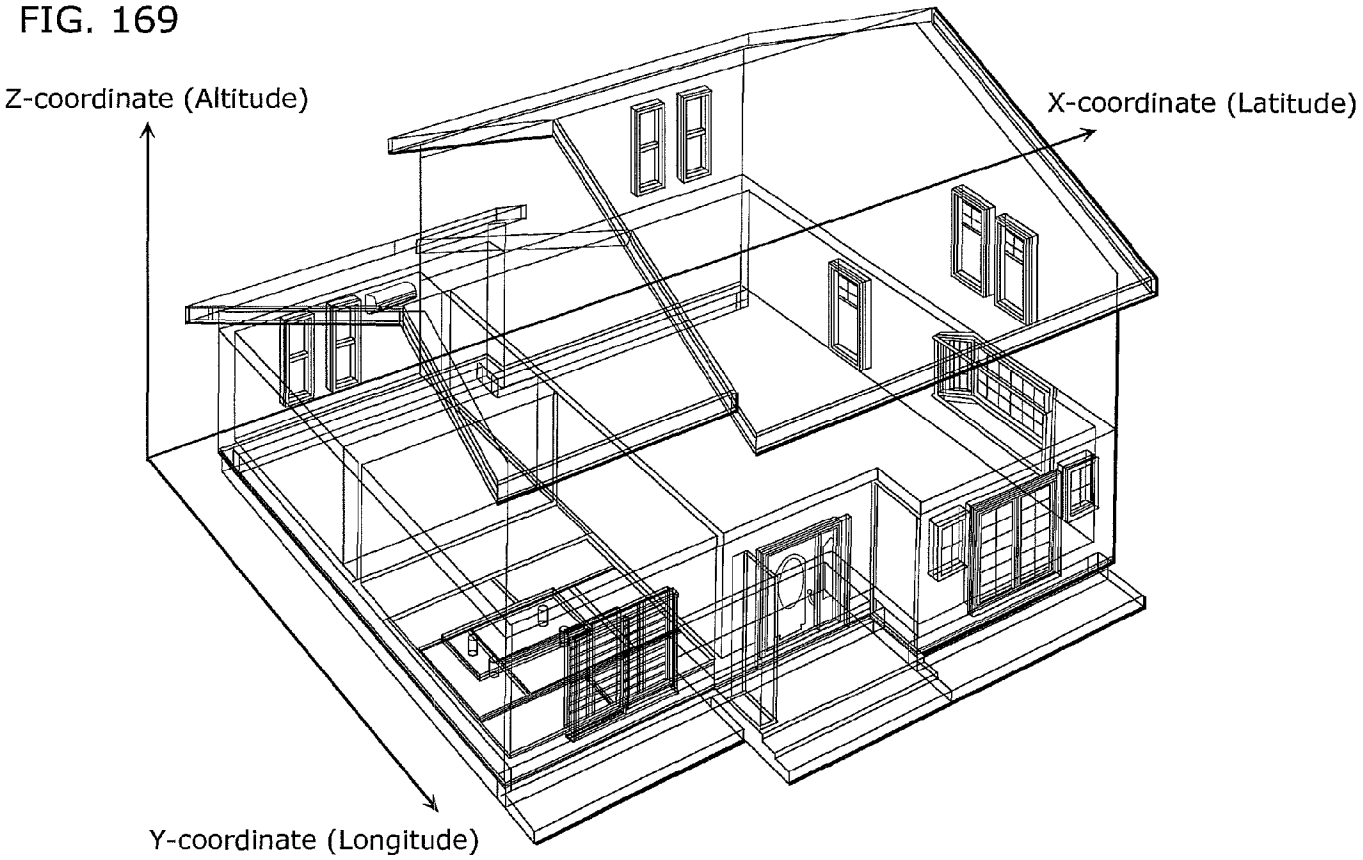

FIG. 169 is a diagram illustrating an example of a three-dimensional (3D) map of a building, which is building coordinate information extracted from a building coordinate database O104 according to the nineteenth embodiment of the present invention.

Figure 170:
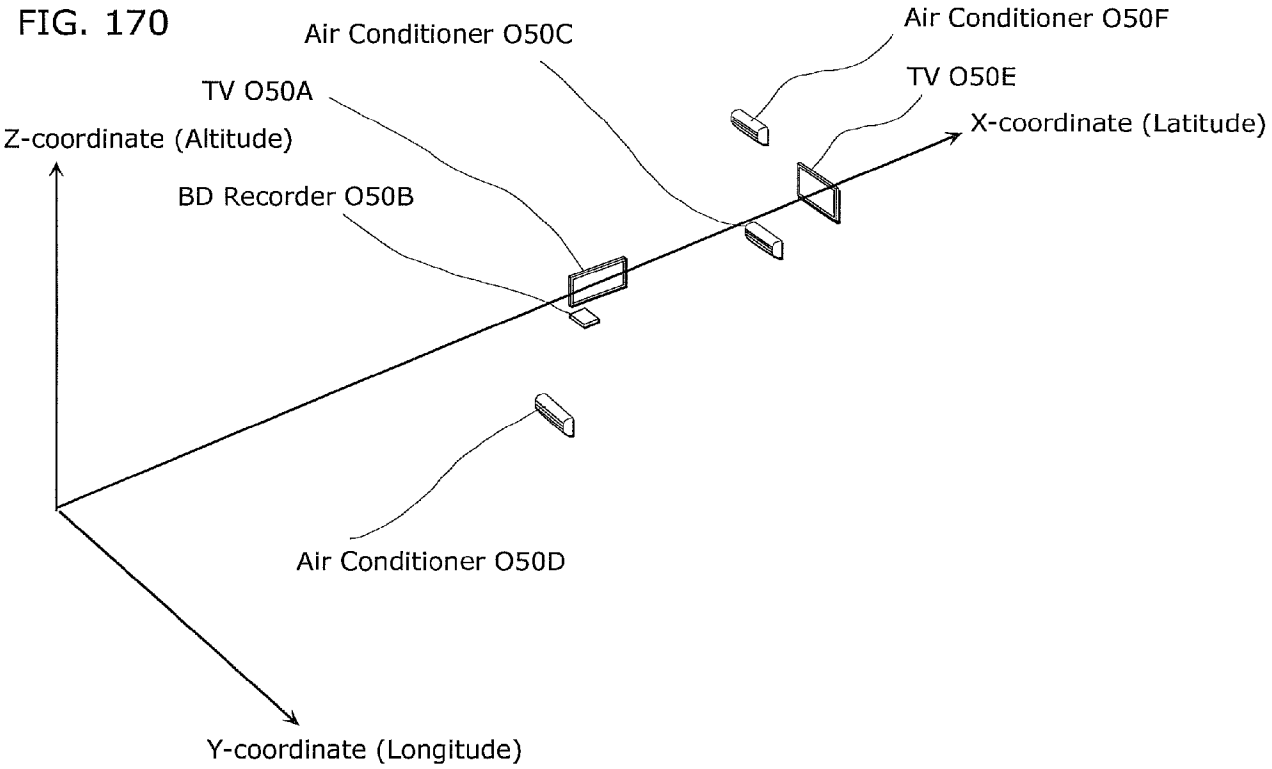

FIG. 170 is a diagram illustrating an example of image data of a 3D map of products which is generated by a program execution unit O65 according to the nineteenth embodiment of the present invention.

Figure 171:
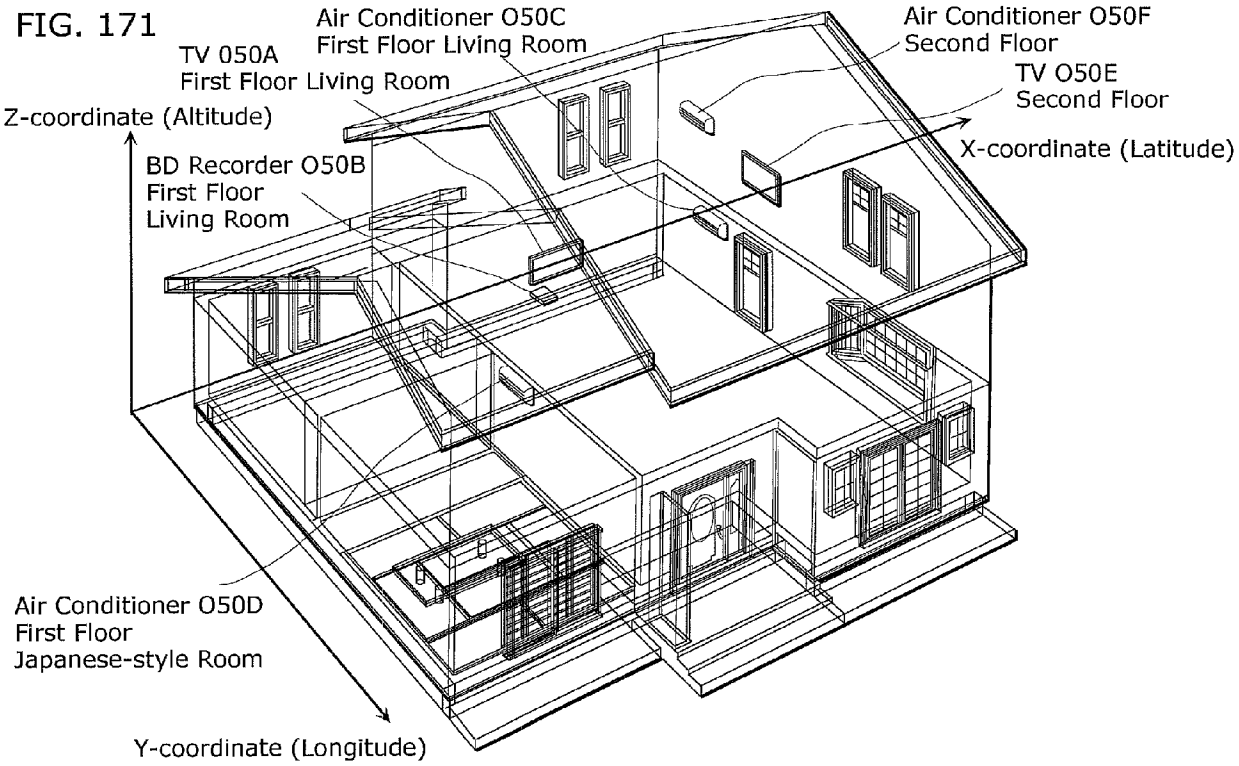

FIG. 171 is a diagram illustrating an example of a 3D product map in which image data of FIG. 128 is combined with the already-displayed image data of FIG. 129 by a display unit O68d according to the nineteenth embodiment of the present invention.

FIG. 172 is a table illustrating examples of an accuracy identifier according to the nineteenth embodiment of the present invention.

Figure 173:
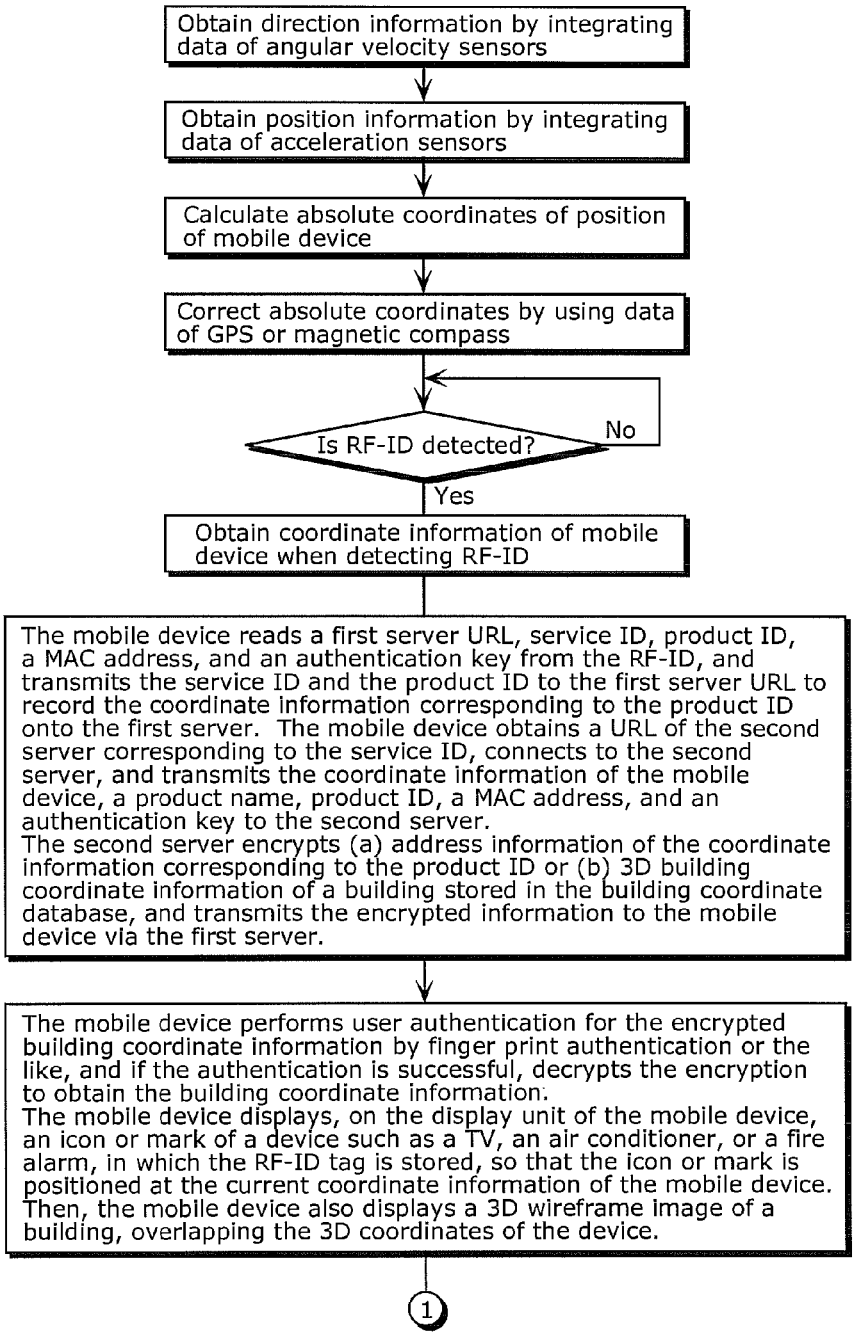

FIG. 173 is a flowchart illustrating an example of processing for the 3D map according to the nineteenth embodiment of the present invention.

Figure 174:
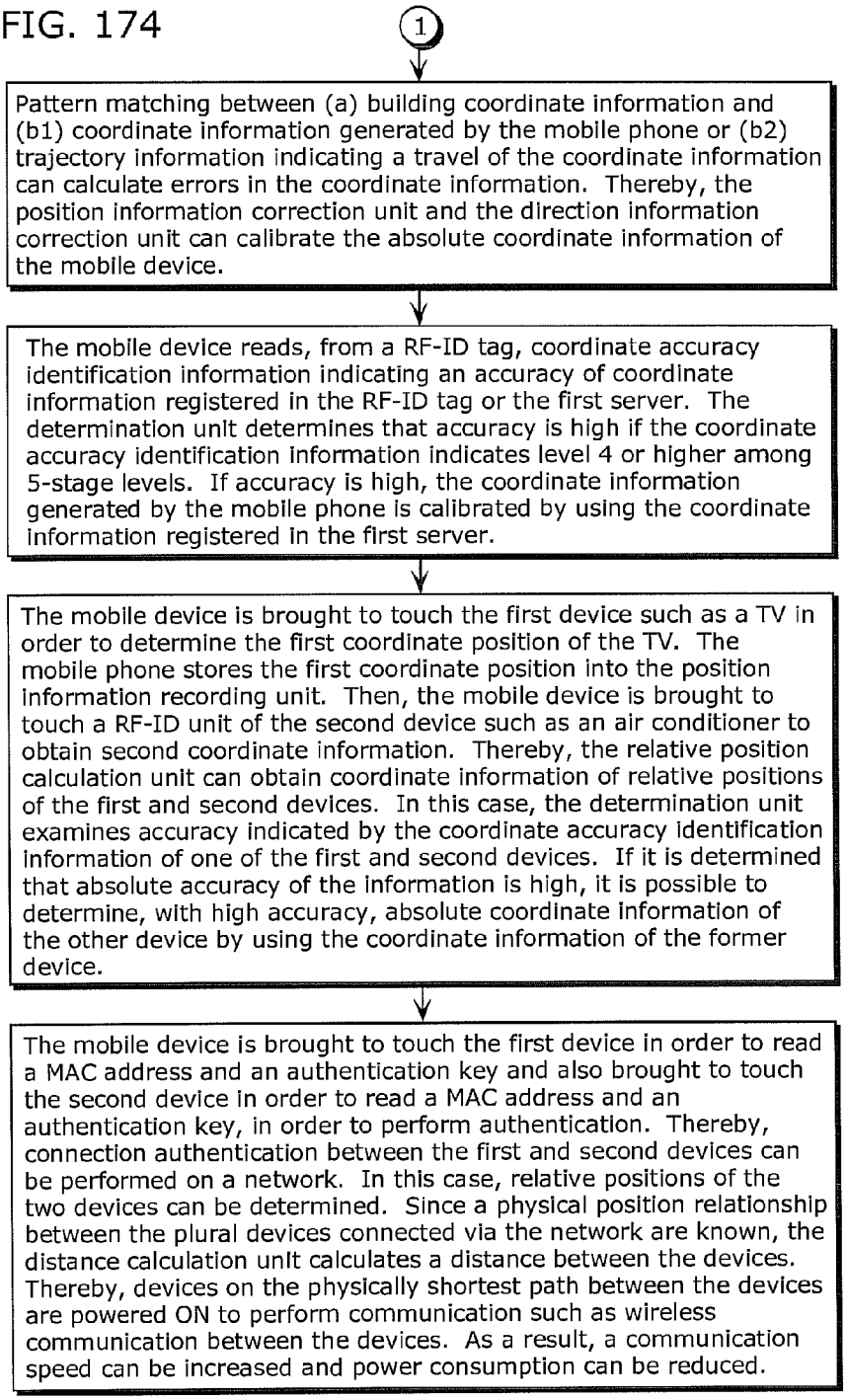

FIG. 174 is a flowchart illustrating an example of processing for the 3D map according to the nineteenth embodiment of the present invention.

Figure 175:
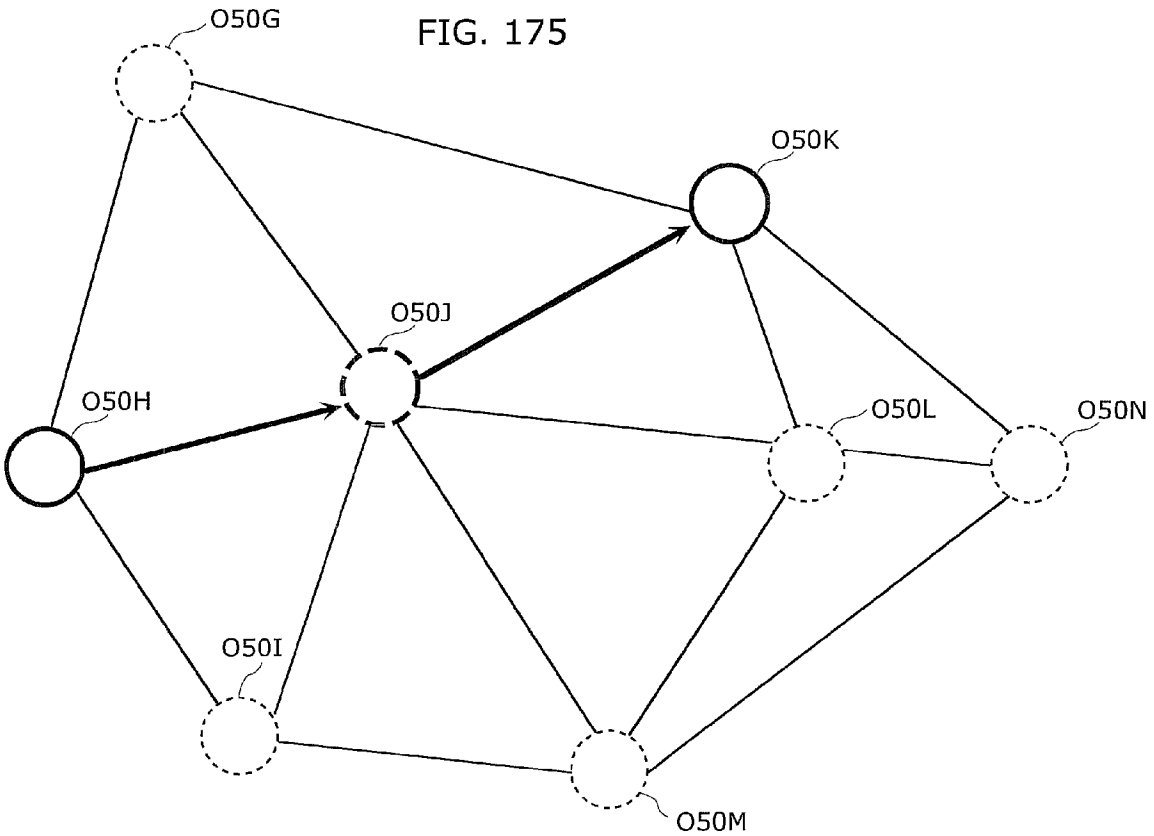

FIG. 175 is a diagram illustrating an example of a specific small power wireless communication system using the 3D map according to the nineteenth embodiment of the present invention.

Figure 176:
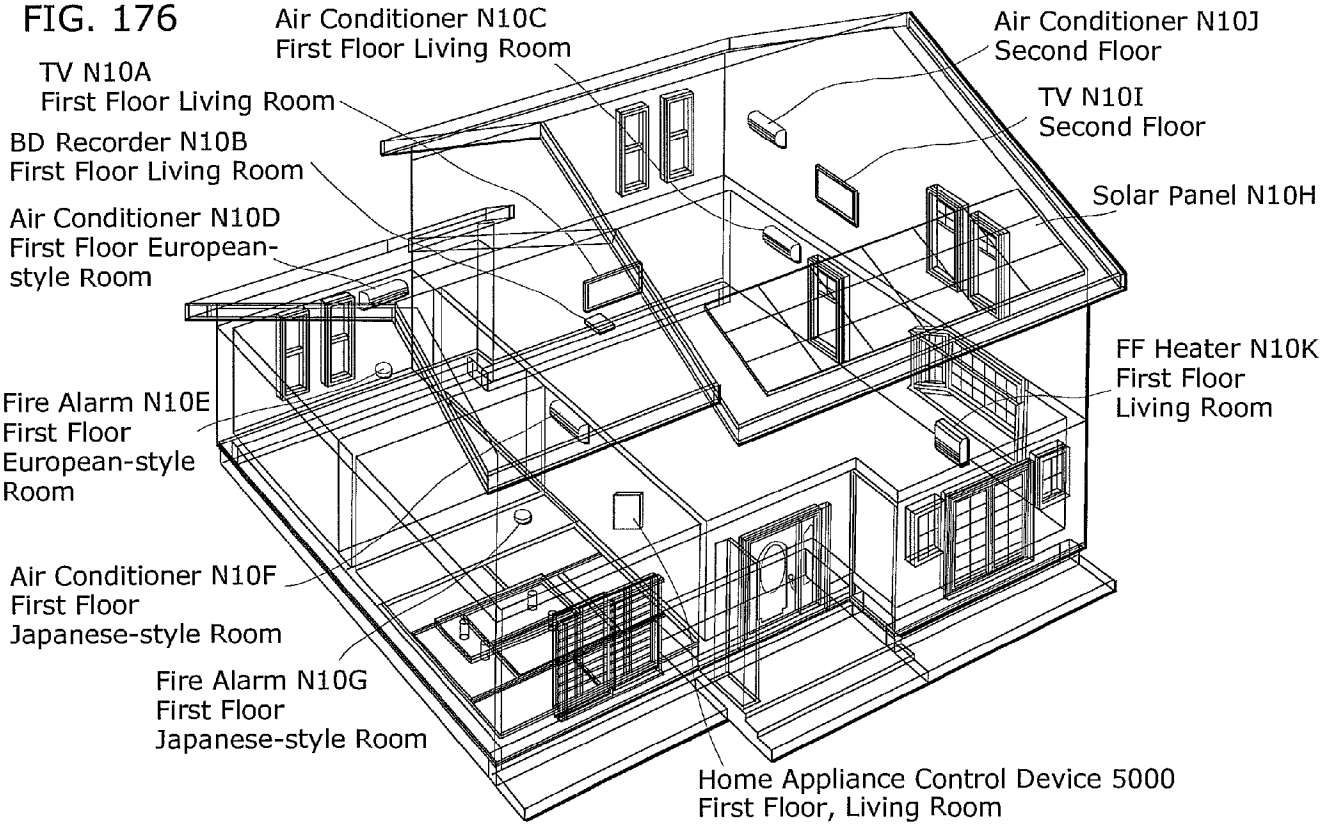

FIG. 176 is a configuration of network environment for apparatus connection setting according to a twentieth embodiment of the present invention.

Figure 177:
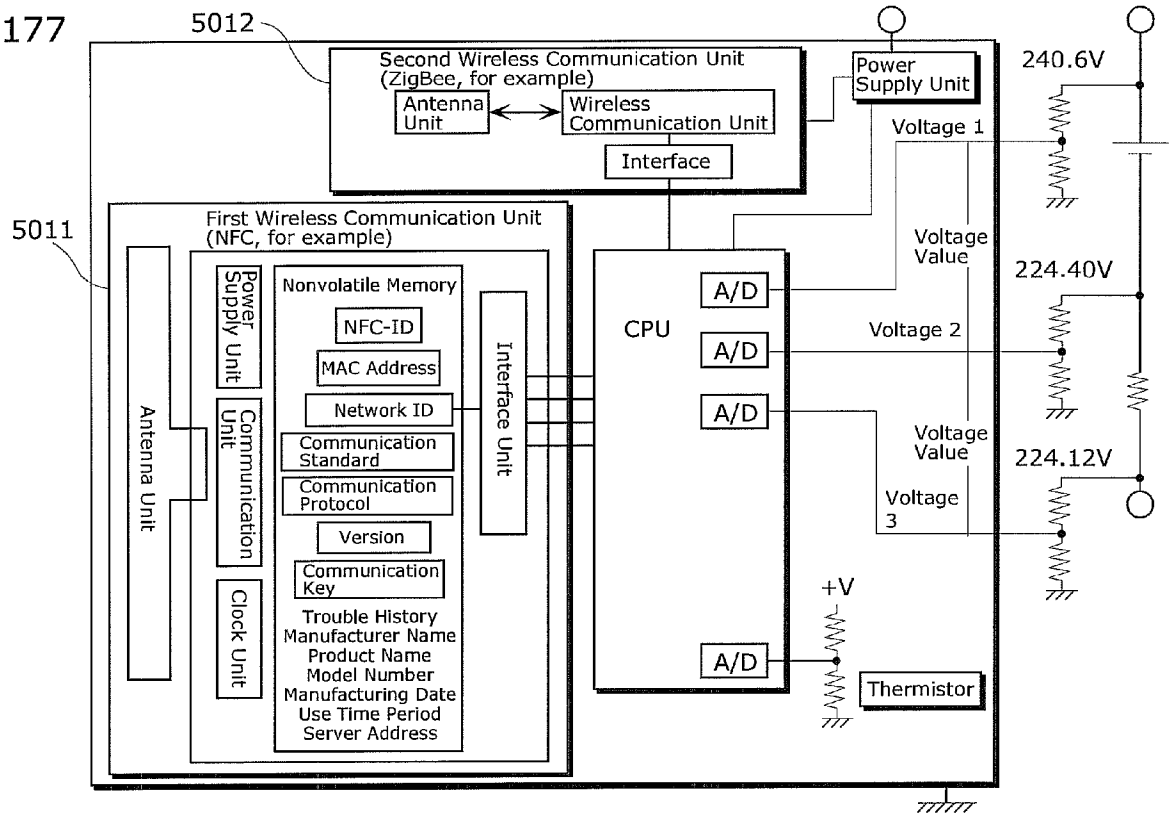

FIG. 177 is a diagram showing a structure of a network module of an apparatus according to the twentieth embodiment of the present invention.

Figure 178:
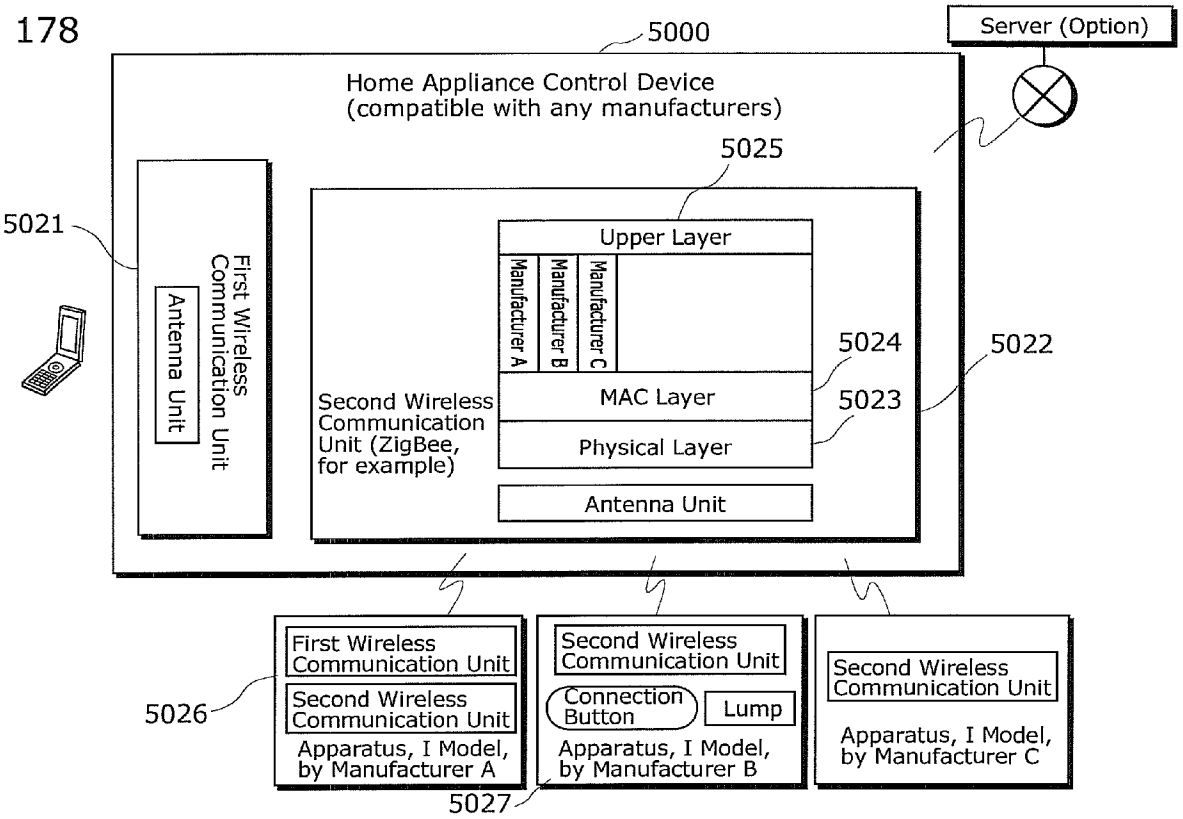

FIG. 178 is a functional block diagram of a structure of a home appliance control device according to the twentieth embodiment of the present invention.

FIG. 179 is a diagram for explaining a user action for setting a solar panel according to the twentieth embodiment of the present invention.

Figure 180:
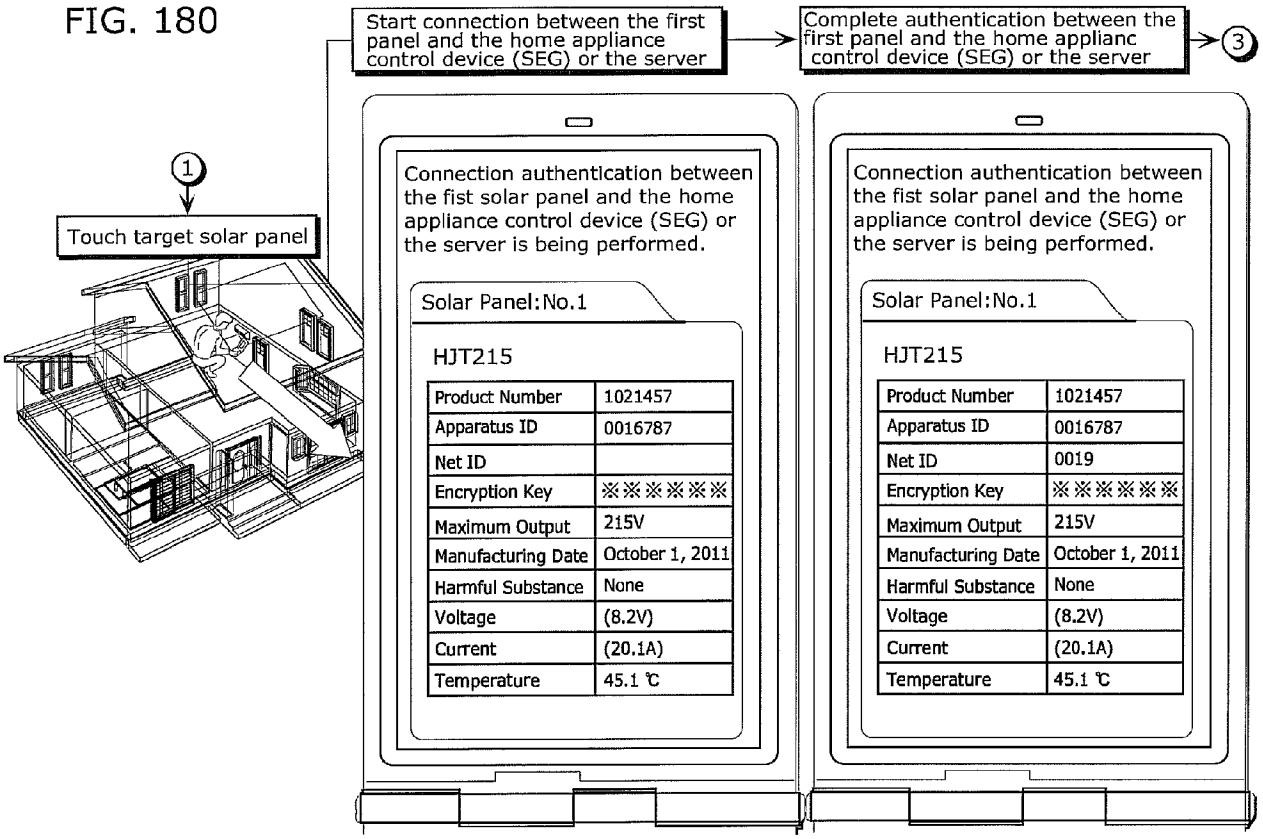

FIG. 180 is a diagram of switching of a mobile terminal screen in setting the solar panel according to the twentieth embodiment of the present invention.

Figure 181:
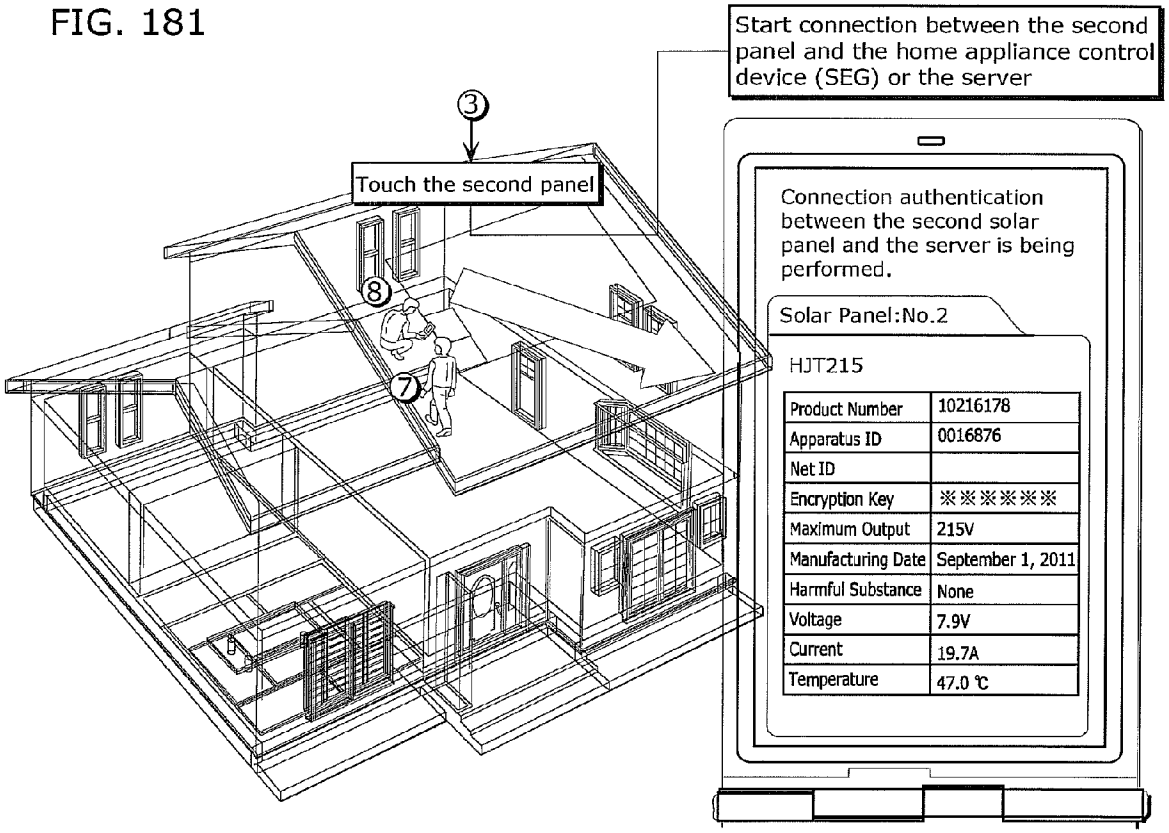

FIG. 181 is a diagram of switching of a mobile terminal screen in subsequent authentication of the solar panel according to the twentieth embodiment of the present invention.

Figure 182:
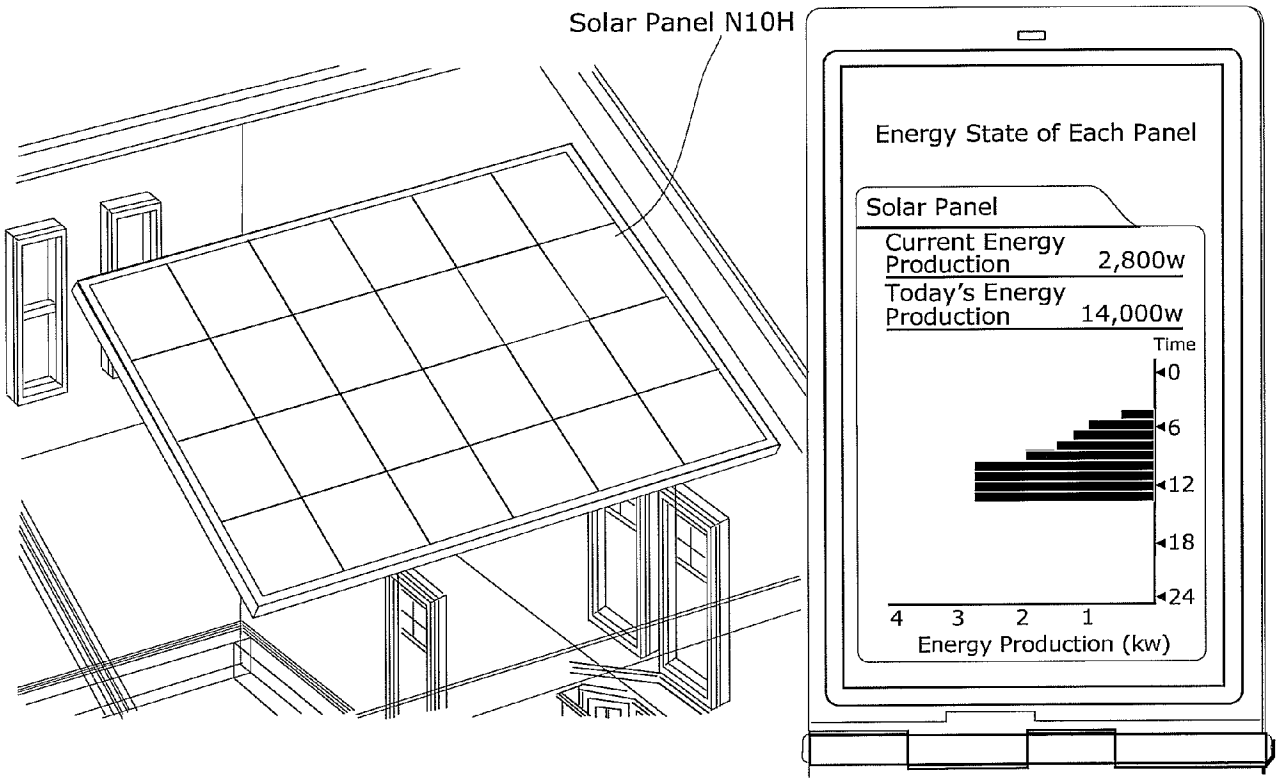

FIG. 182 is a diagram of a mobile terminal screen in checking energy production of a target solar panel according to the twentieth embodiment of the present invention.

Figure 183:
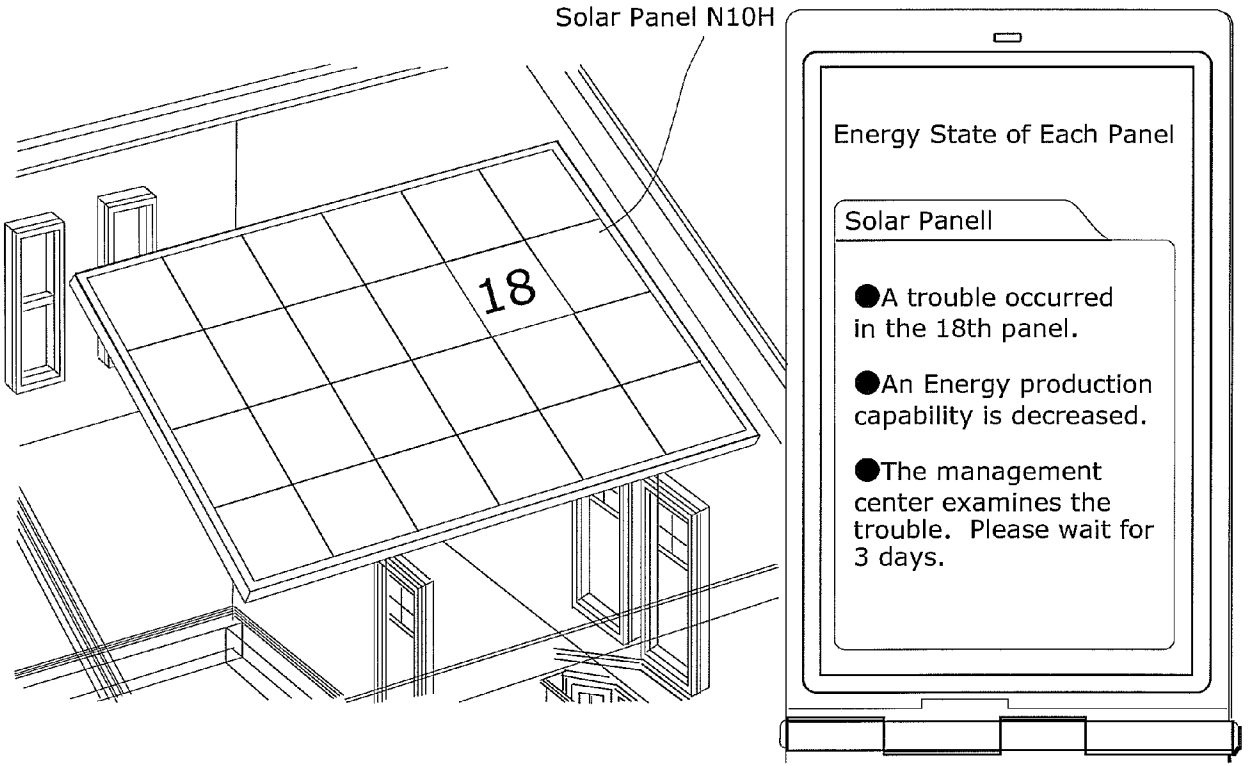

FIG. 183 is a diagram of a mobile terminal screen in checking a trouble of a solar panel according to the twentieth embodiment of the present invention.

Figure 184:
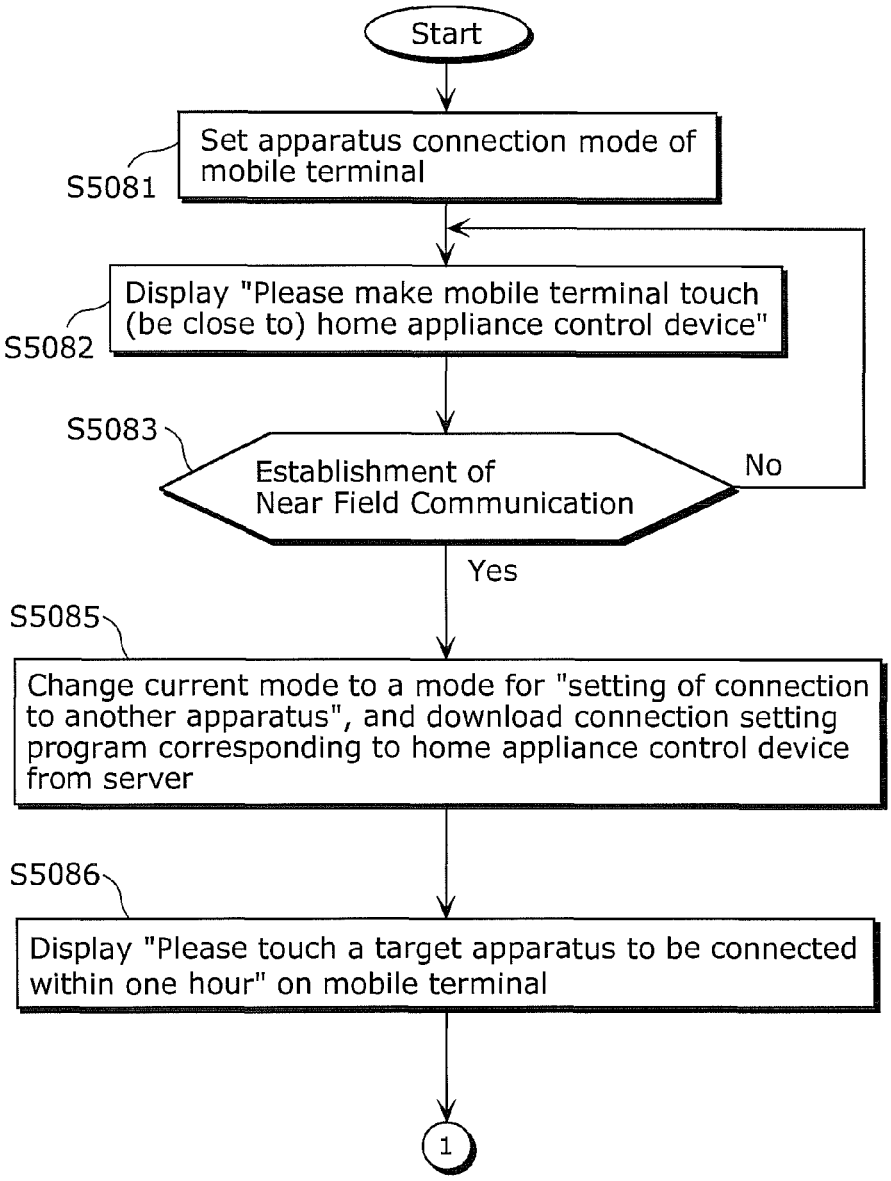

FIG. 184 is a part of a flowchart of processing performed by the mobile terminal in setting the solar panel according to the twentieth embodiment of the present invention.

Figure 185:
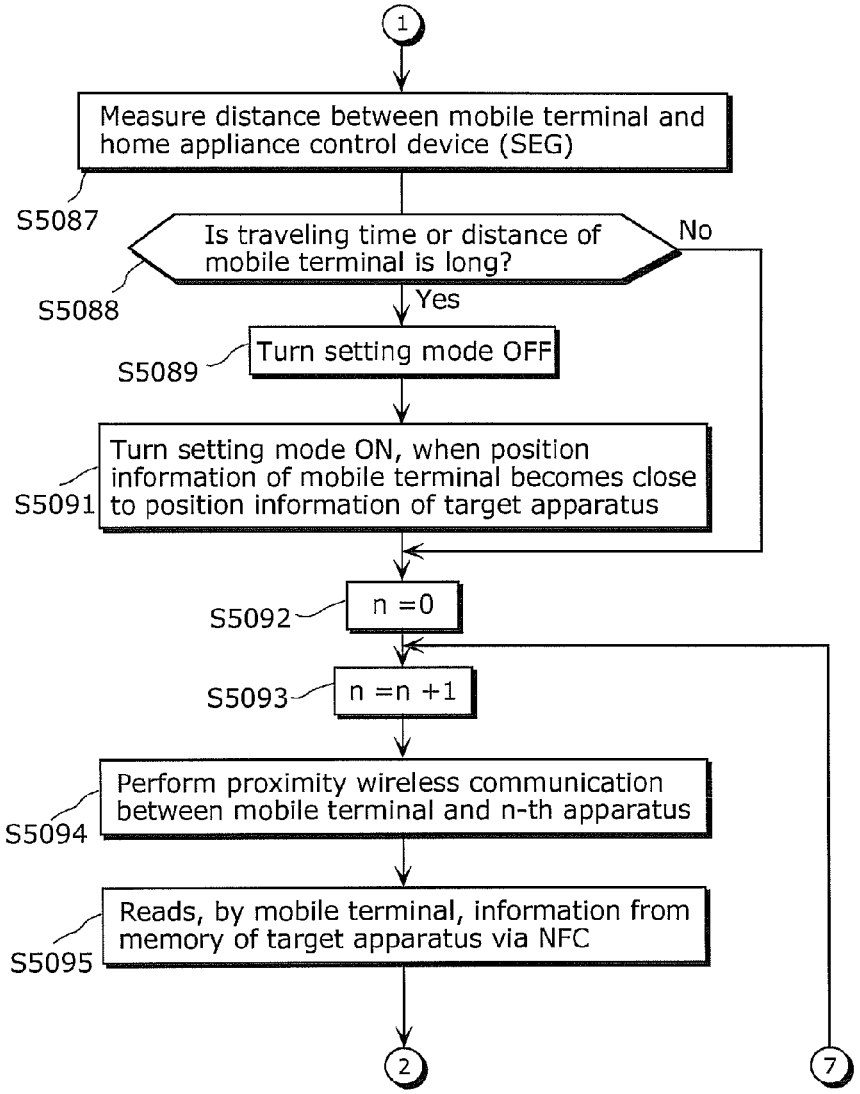

FIG. 185 is a part of the flowchart of the processing performed by the mobile terminal in setting the solar panel according to the twentieth embodiment of the present invention.

Figure 186:
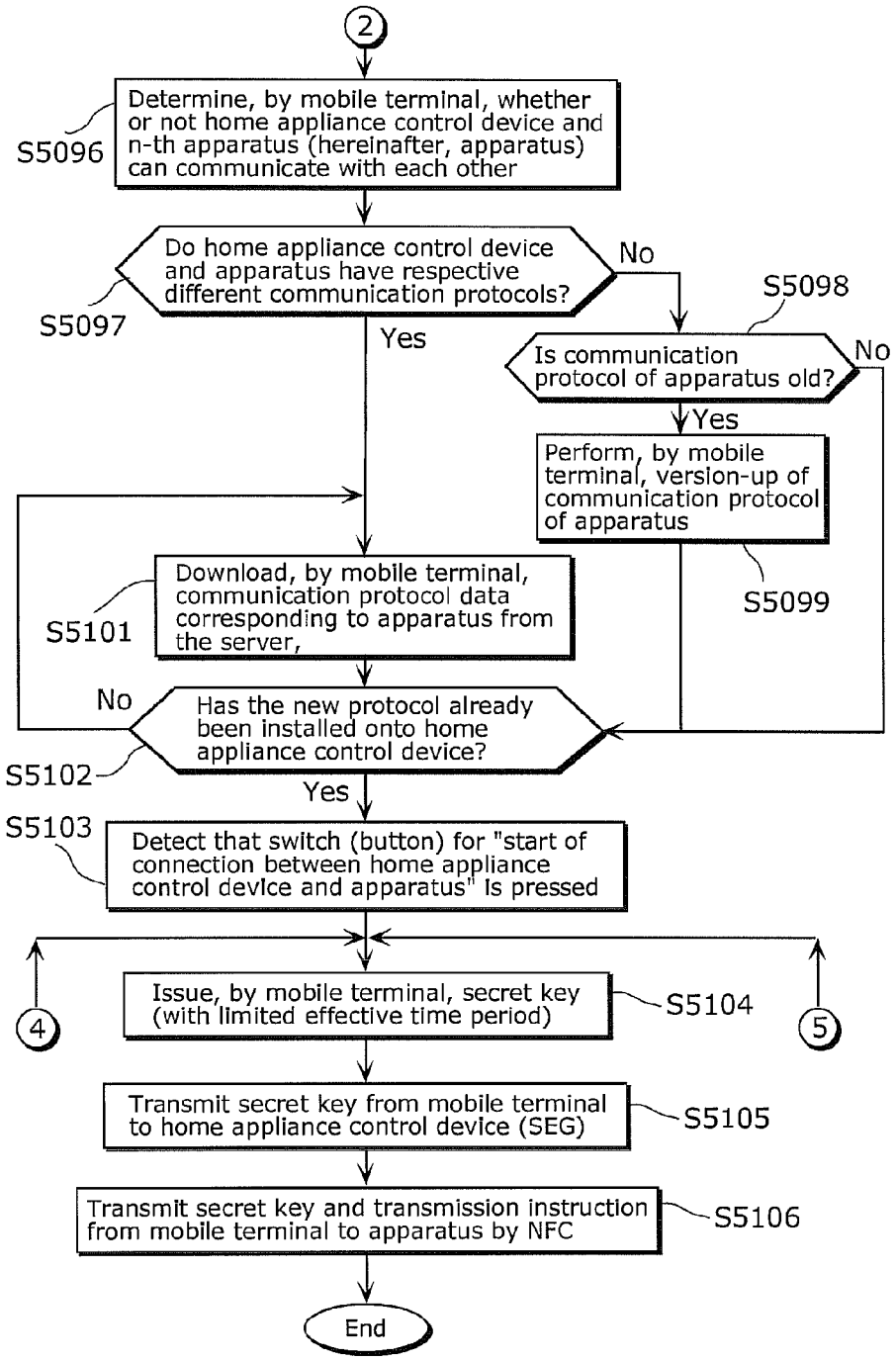

FIG. 186 is a part of the flowchart of the processing performed by the mobile terminal in setting the solar panel according to the twentieth embodiment of the present invention.

Figure 187:
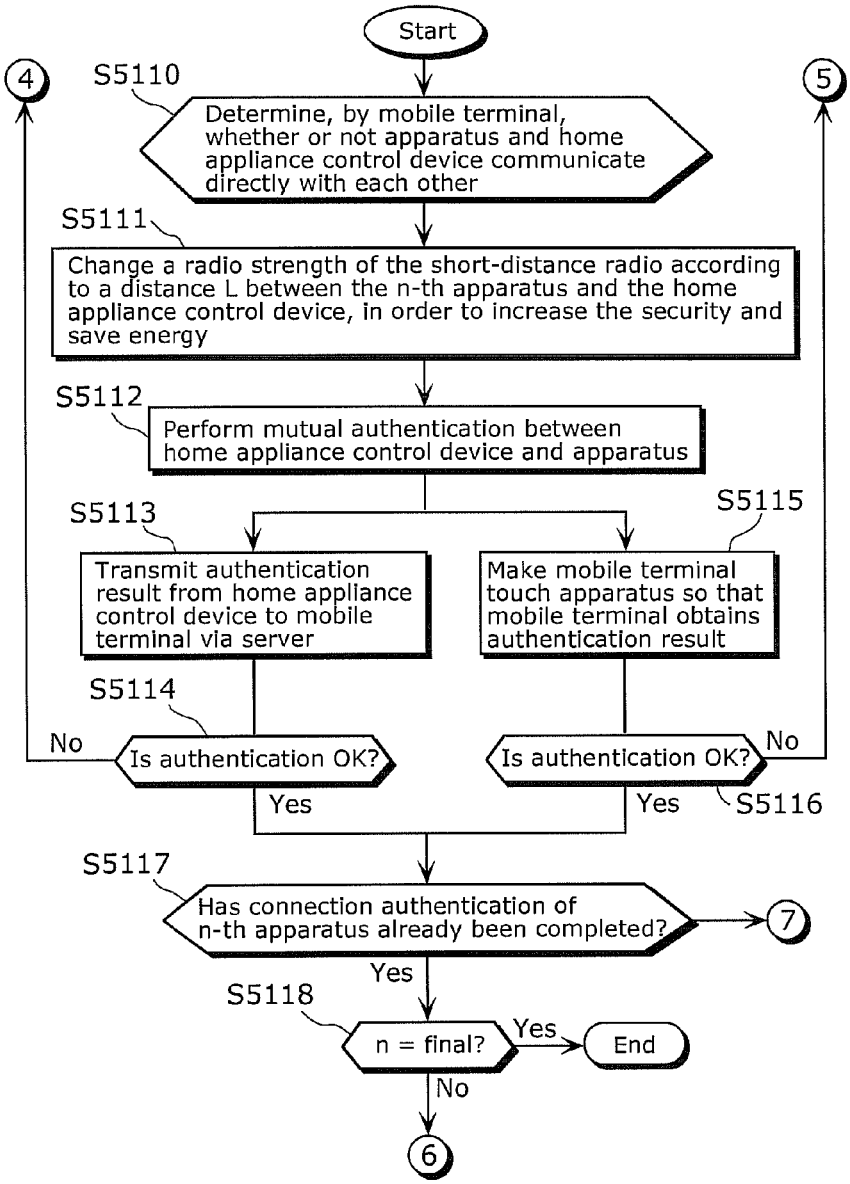

FIG. 187 is a part of the flowchart of the processing performed by the mobile terminal in setting the solar panel according to the twentieth embodiment of the present invention.

Figure 188:
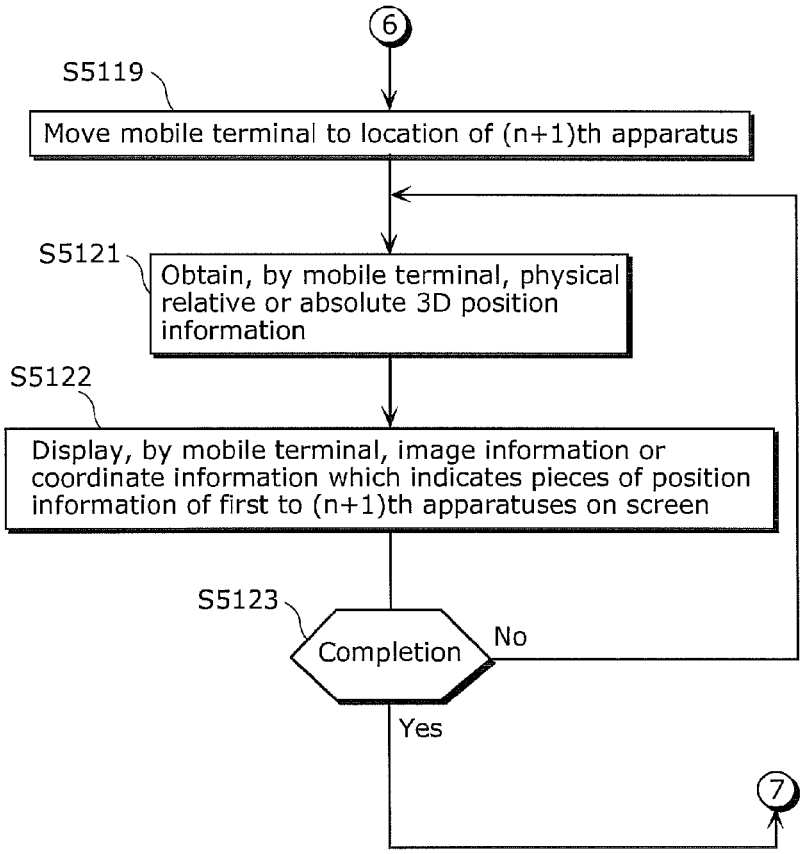

FIG. 188 is a part of the flowchart of the processing of the setting the solar panel according to the twentieth embodiment of the present invention.

Figure 189:
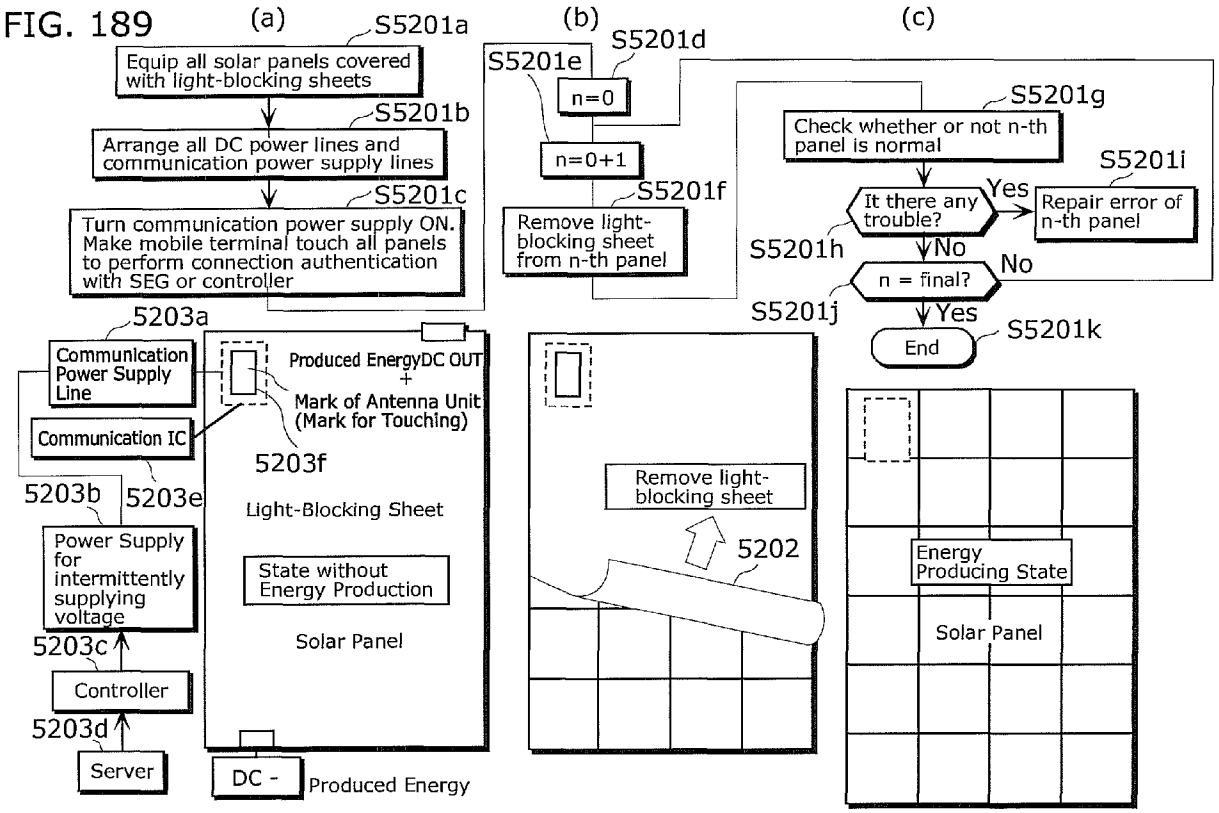

FIG. 189 is a flowchart of processing of equipping the solar panel according to the twentieth embodiment of the present invention.

Figure 190:
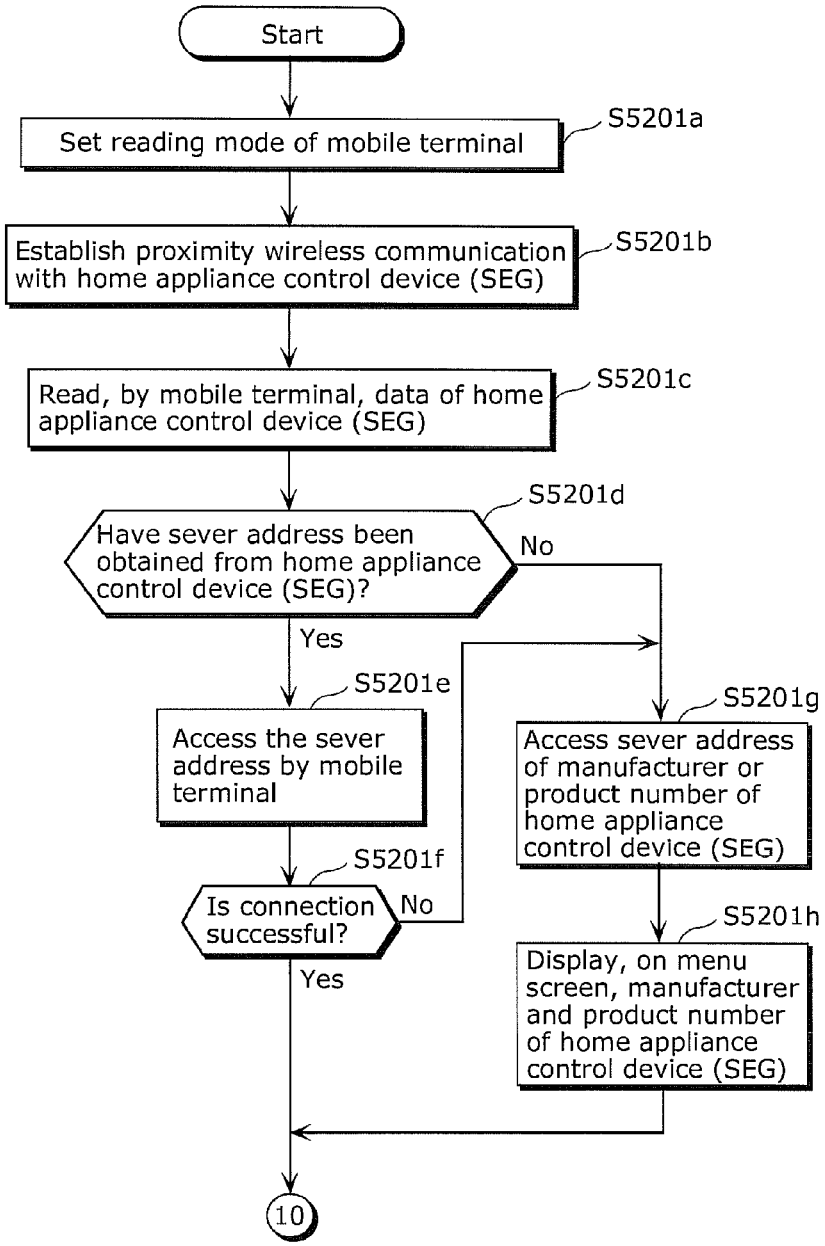

FIG. 190 is a flowchart of processing of connecting an apparatus to a home appliance control device (SEG), according to the twentieth embodiment of the present invention.

Figure 191:
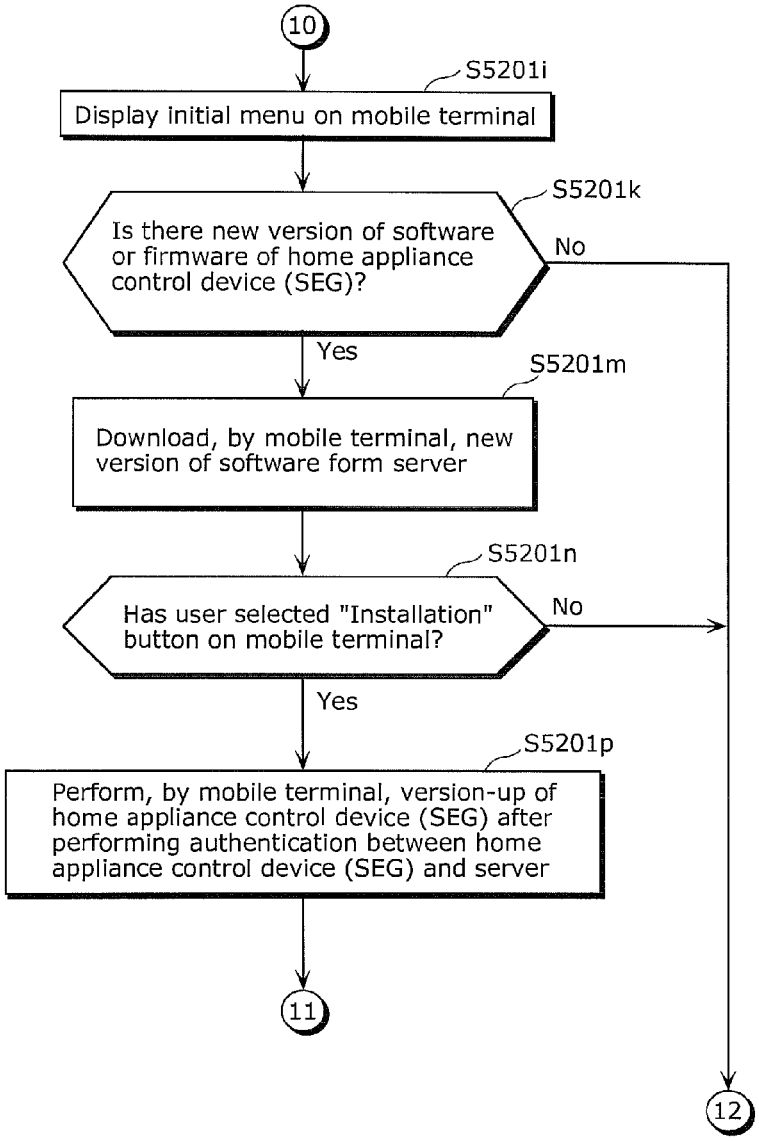

FIG. 191 is a flowchart of processing of connecting the apparatus to the home appliance control device (SEG), according to the twentieth embodiment of the present invention.

Figure 192:
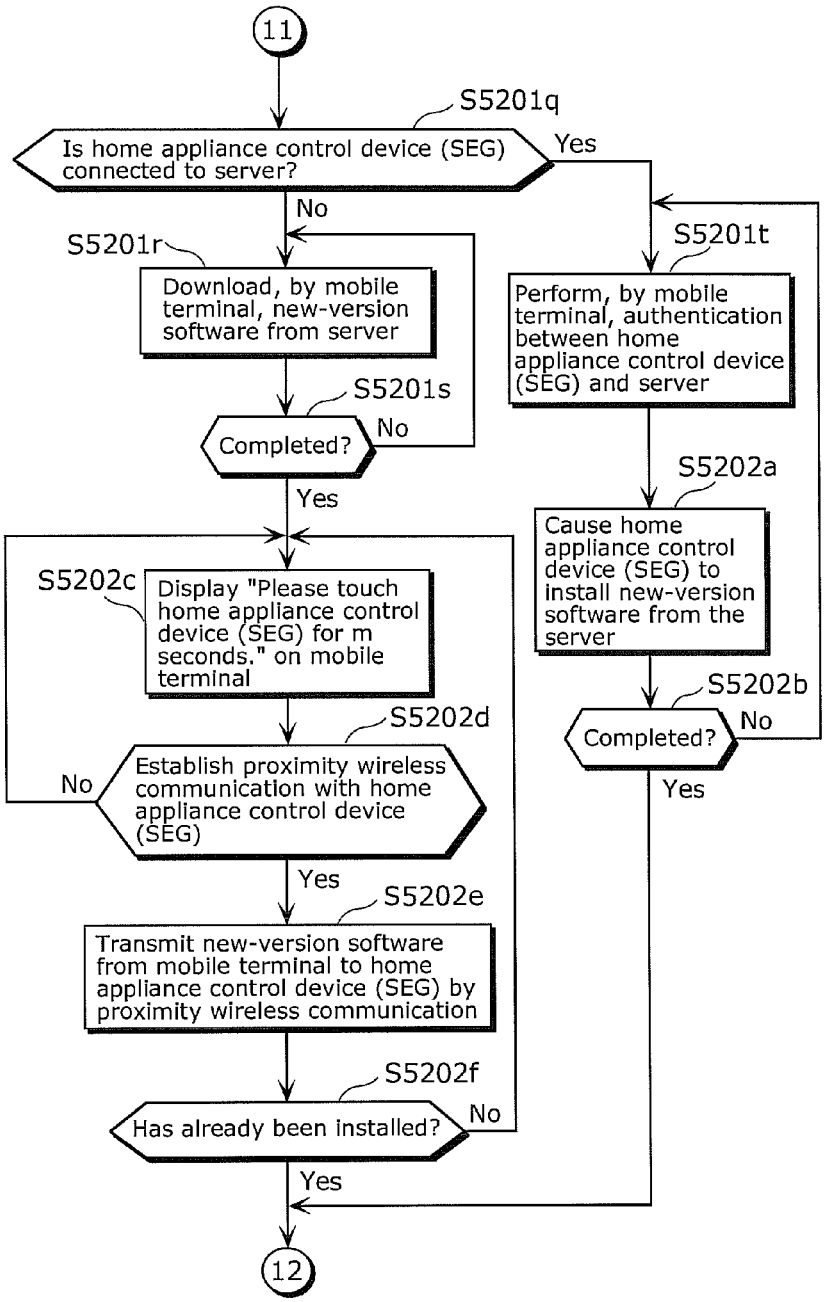

FIG. 192 is a flowchart of processing of installing new-version software onto the home appliance control device (SEG) according to the twentieth embodiment of the present invention.

Figure 193:
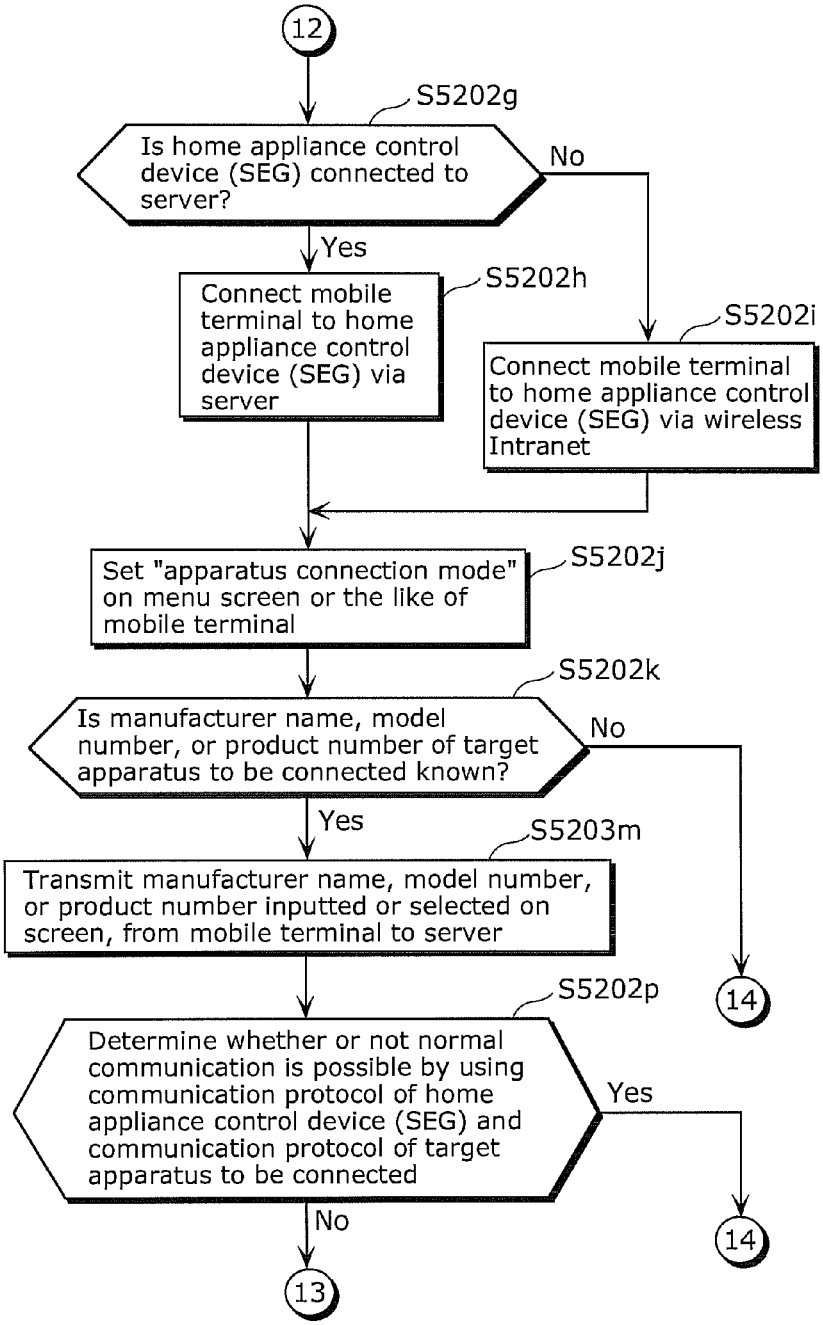

FIG. 193 is a flowchart of processing for connection between the home appliance control device (SEG) and a target apparatus, according to the twentieth embodiment of the present invention.

Figure 194:
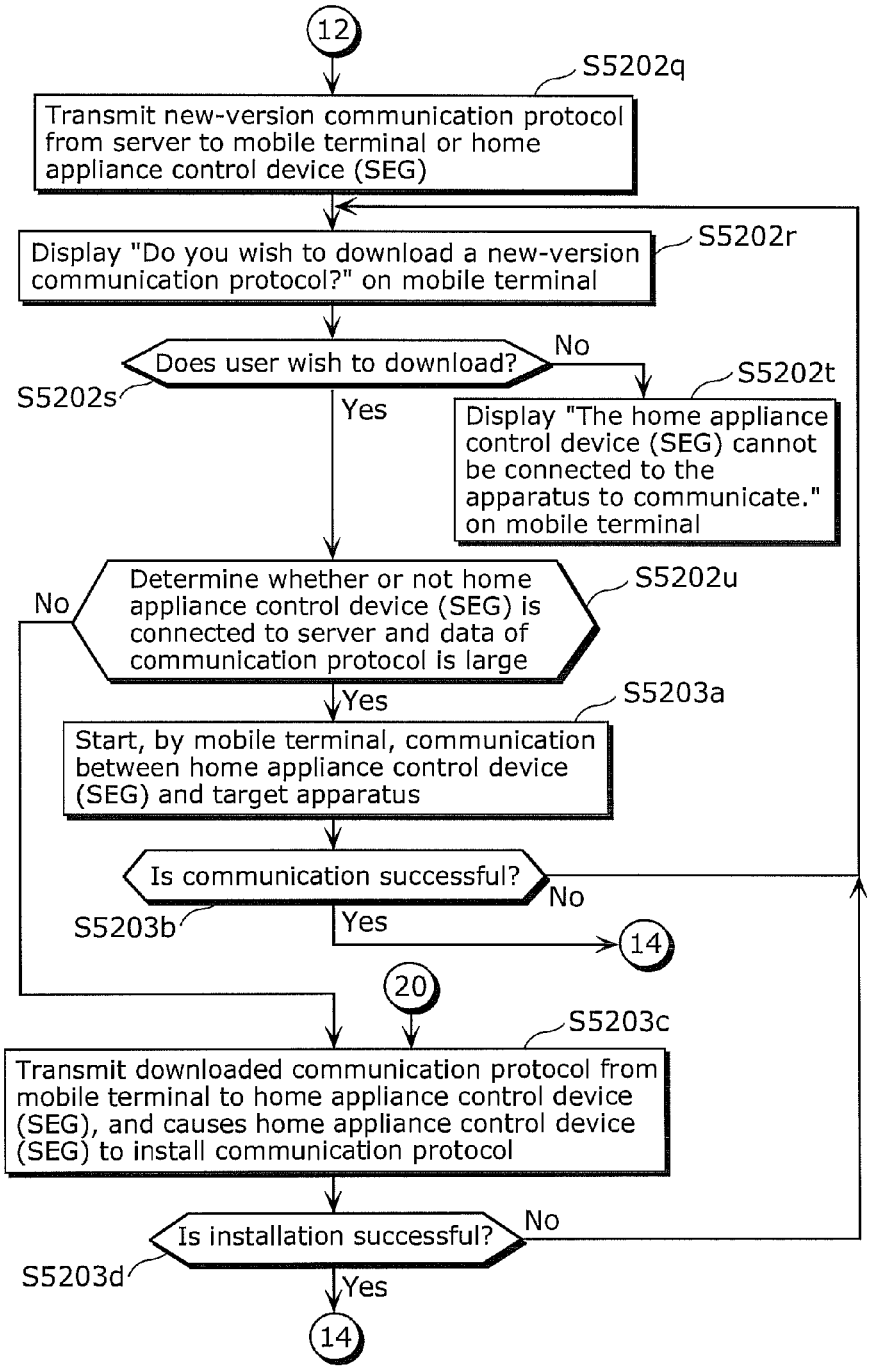

FIG. 194 is a flowchart of processing for connection between the home appliance control device (SEG) to the target apparatus, according to the twentieth embodiment of the present invention.

Figure 195:
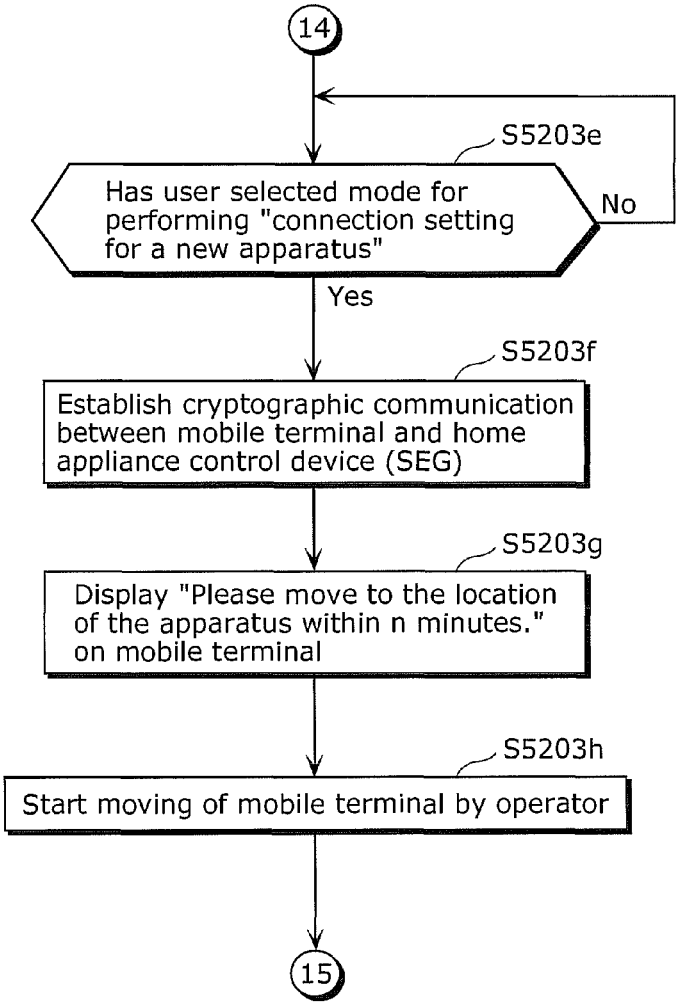

FIG. 195 is a flowchart of processing for connection between the home appliance control device (SEG) to the target apparatus, according to the twentieth embodiment of the present invention.

Figure 196:
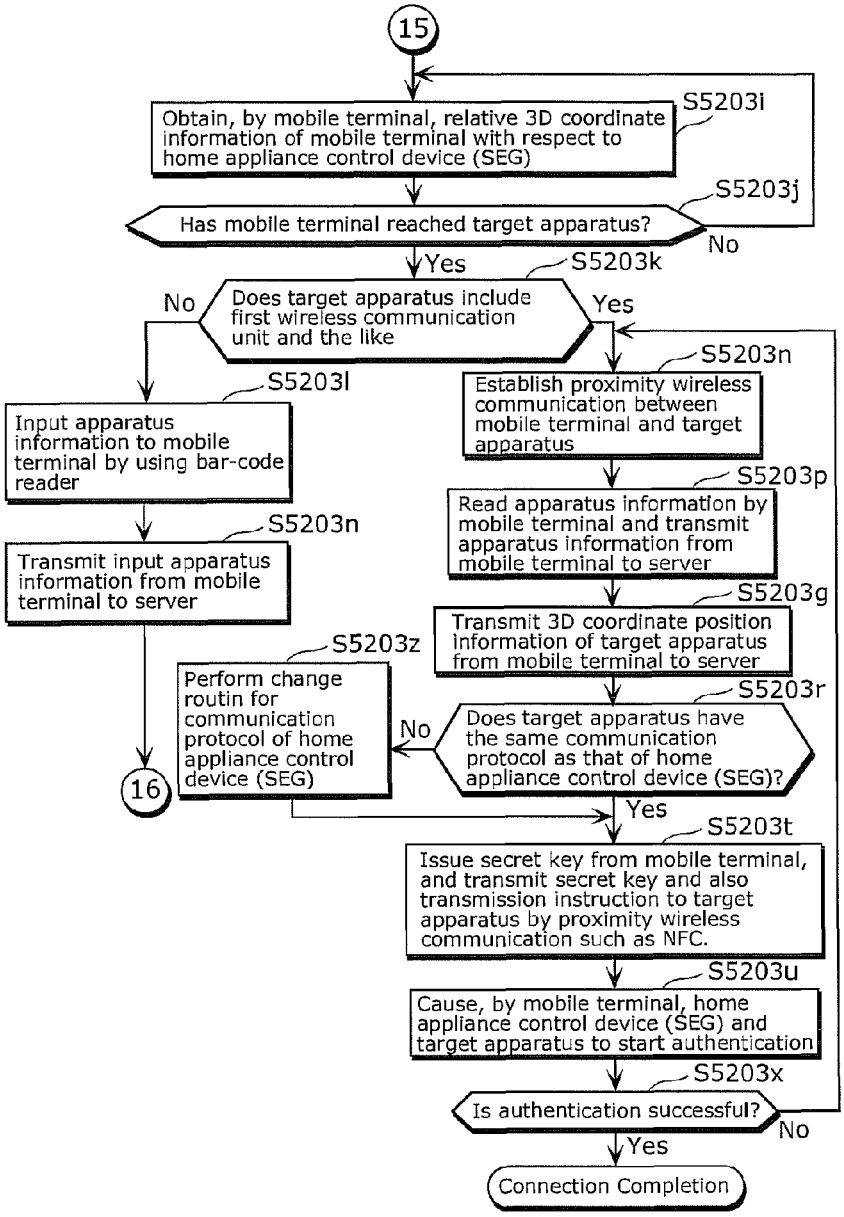

FIG. 196 is a flowchart of processing for connection between the home appliance control device (SEG) to the target apparatus, according to the twentieth embodiment of the present invention.

Figure 197:
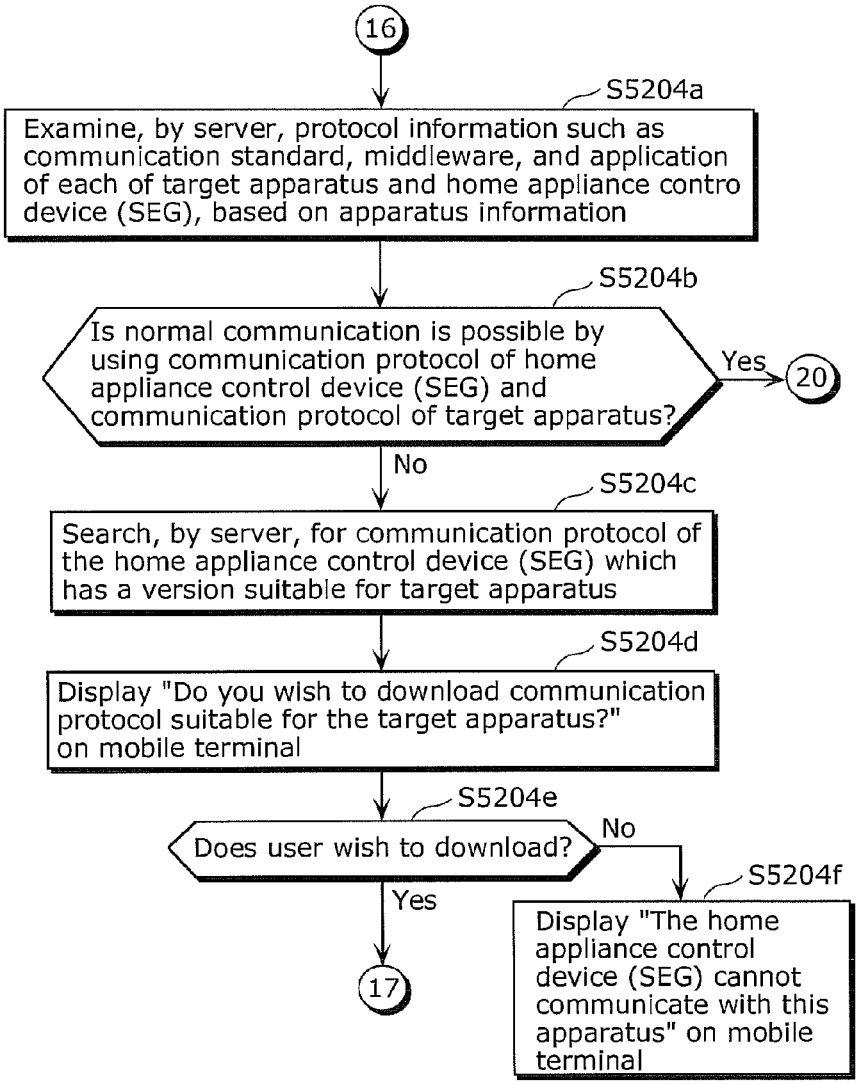

FIG. 197 is a flowchart of processing for connection between the home appliance control device (SEG) to the target apparatus, according to the twentieth embodiment of the present invention.

Figure 198:
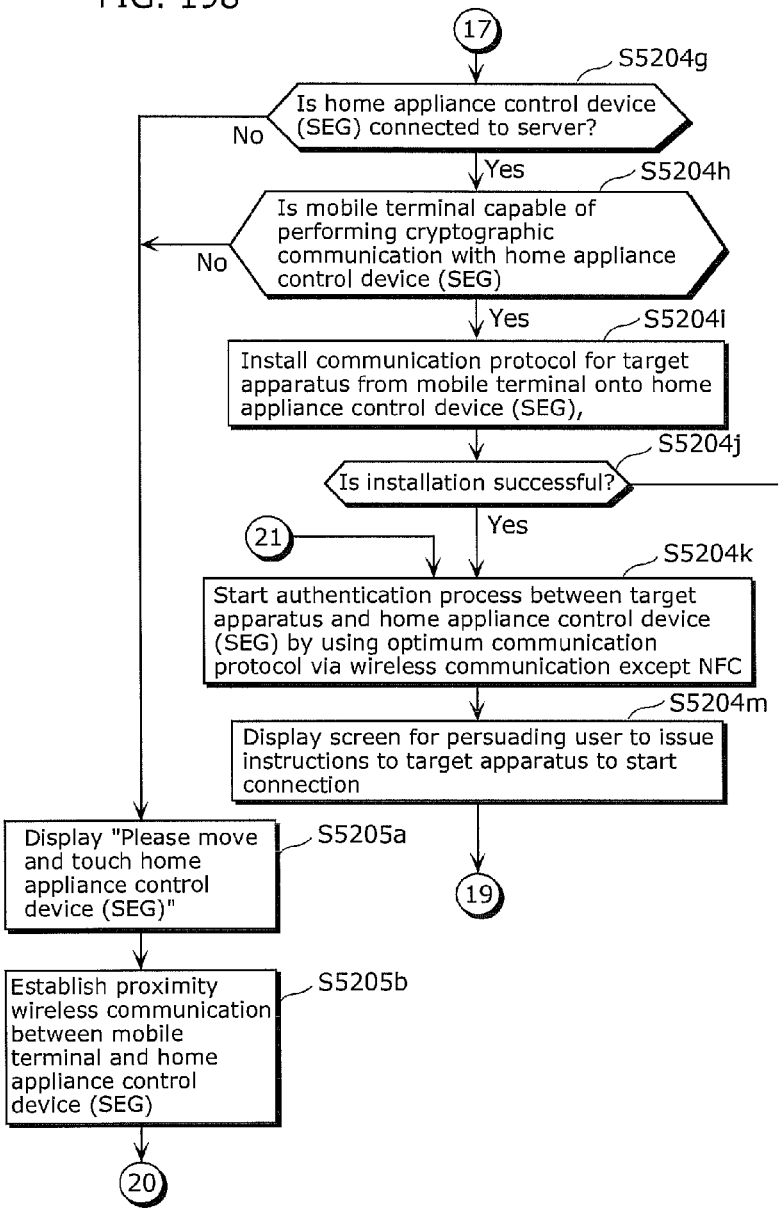

FIG. 198 is a flowchart of processing for connection between the home appliance control device (SEG) to the target apparatus, according to the twentieth embodiment of the present invention.

Figure 199:
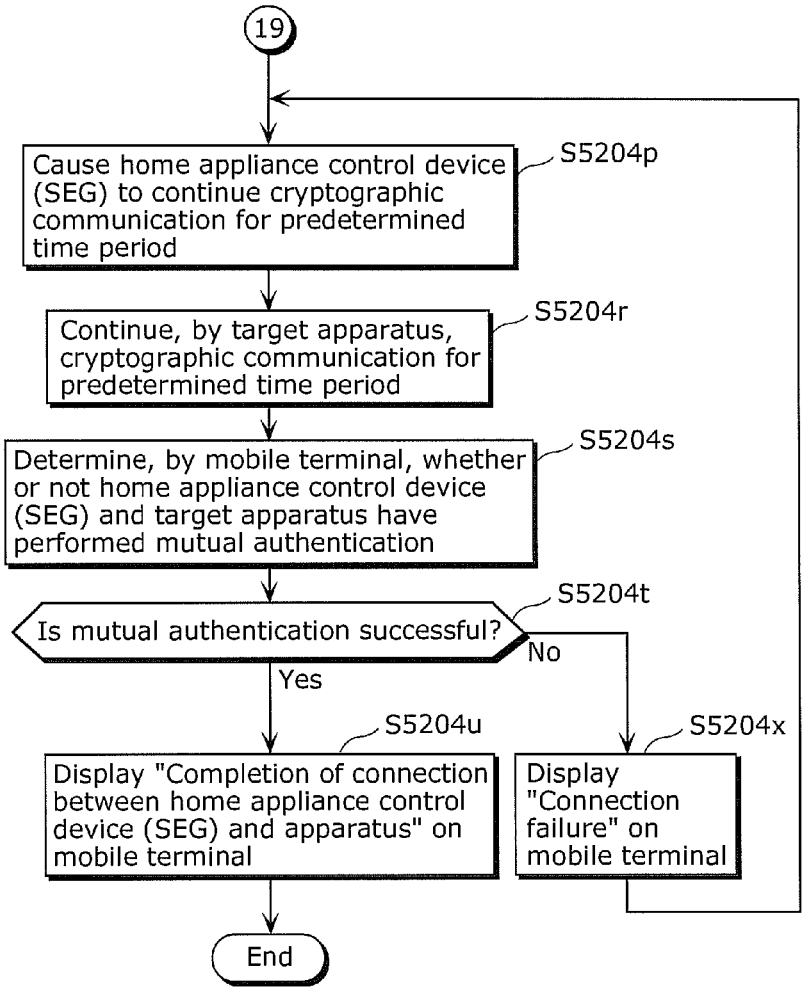

FIG. 199 is a flowchart of processing for connection between the home appliance control device (SEG) to the target apparatus, according to the twentieth embodiment of the present invention.

Figure 200:
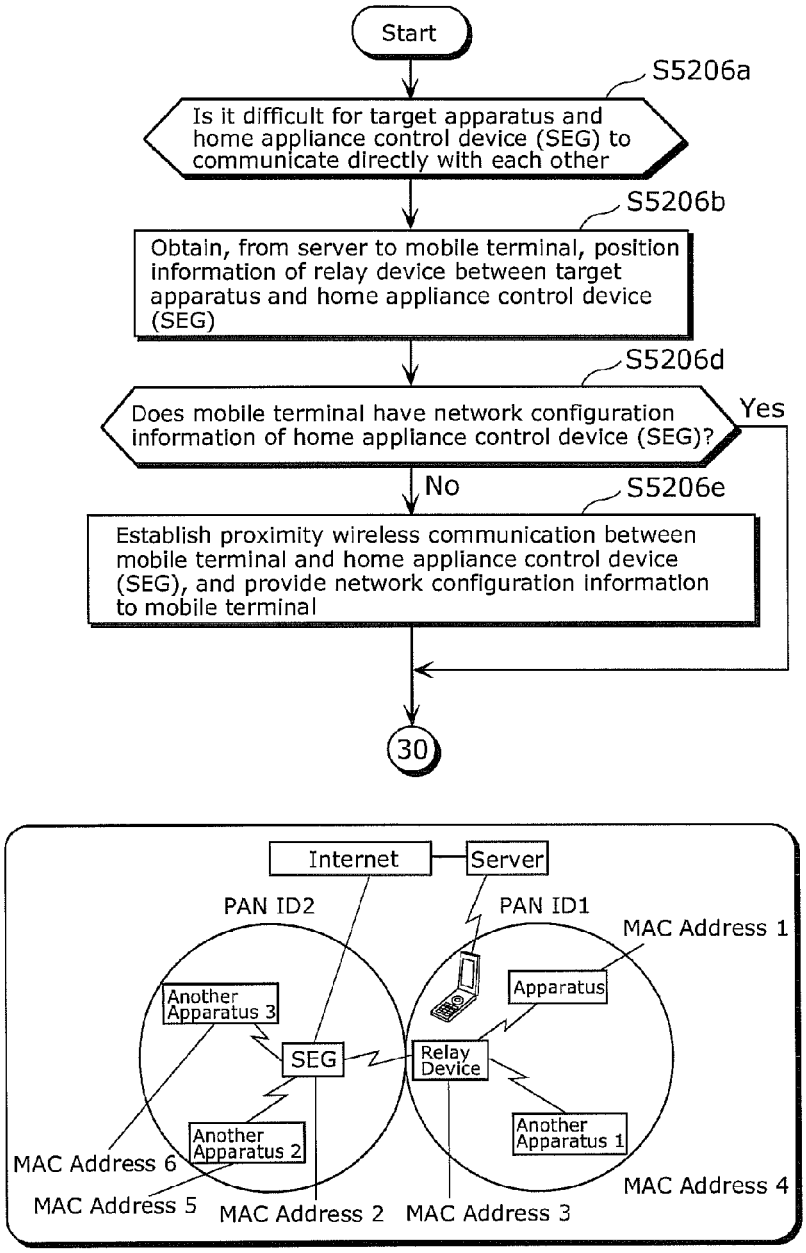

FIG. 200 is a flowchart of processing for connection between the home appliance control device (SEG) to the target apparatus via a relay device, according to the twentieth embodiment of the present invention.

Figure 201:
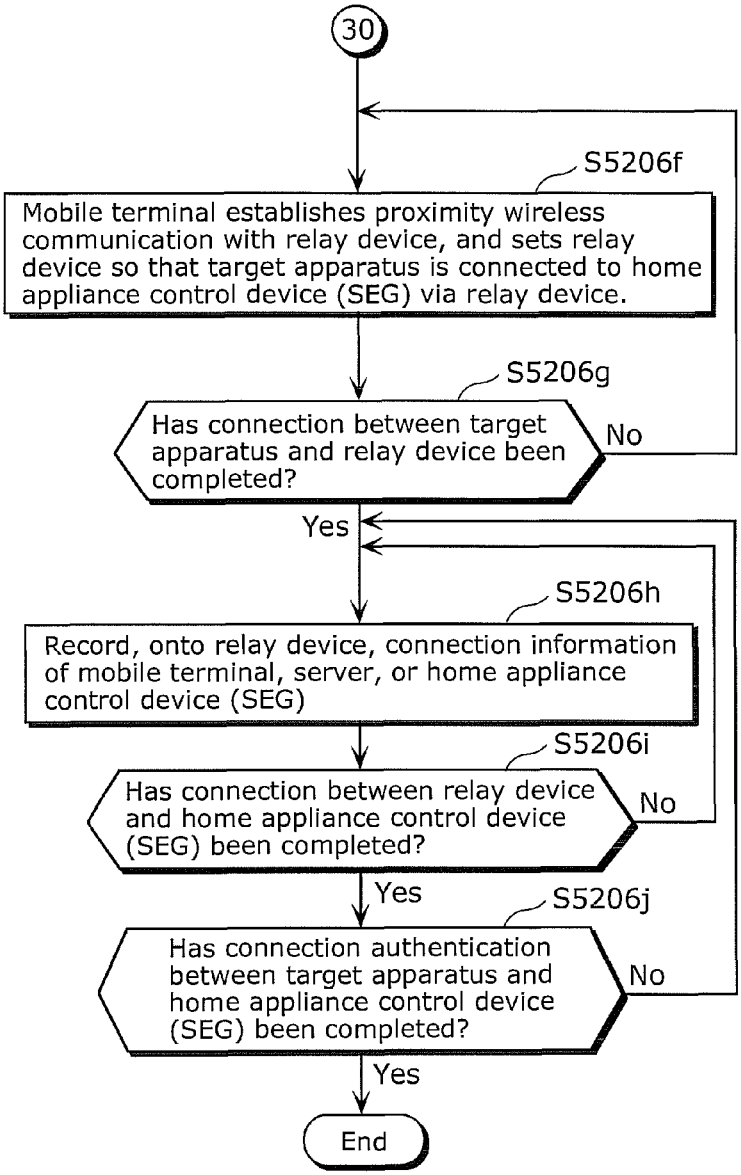

FIG. 201 is a flowchart of processing for connection between the home appliance control device (SEG) to the target apparatus via the relay device, according to the twentieth embodiment of the present invention.

Figure 202:
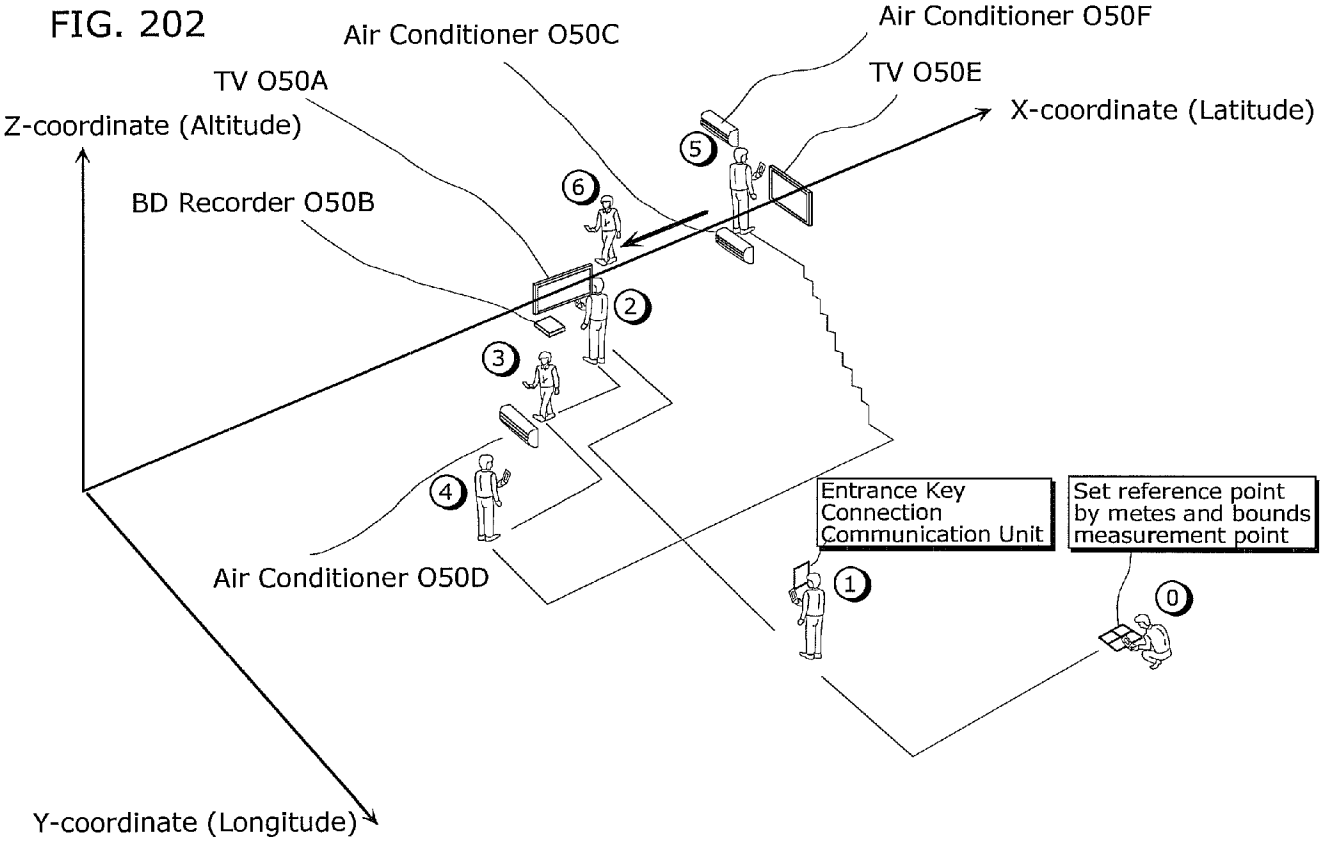

FIG. 202 is a diagram of an example of image data on a three-dimensional (3D) map generated by a program execution unit O65 according to a twenty-first embodiment of the present invention.

Figure 203:
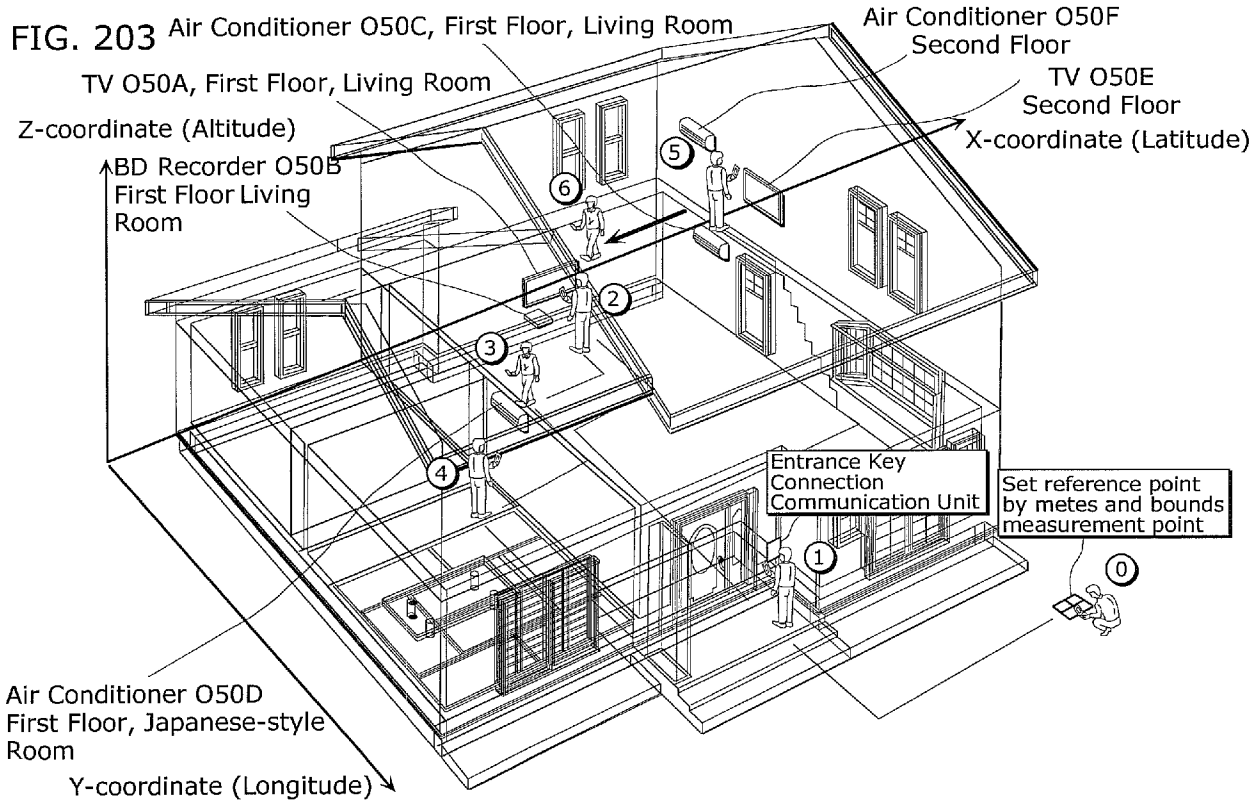

FIG. 203 is a diagram of an example of a product 3D map generated by a display unit O68d by combining the image data of FIG. 169 and the displayed image data of FIG. 202, according to the twenty-first embodiment of the present invention.

Figure 204:
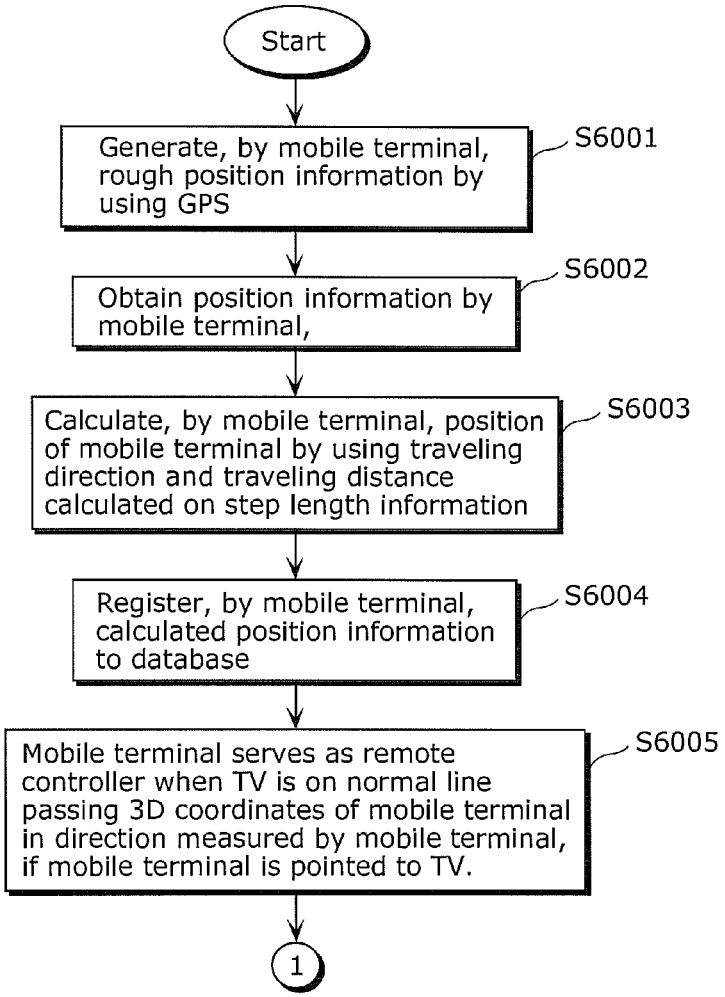

FIG. 204 is a flowchart of remote control operation according to the twenty-first embodiment of the present invention.

Figure 205:
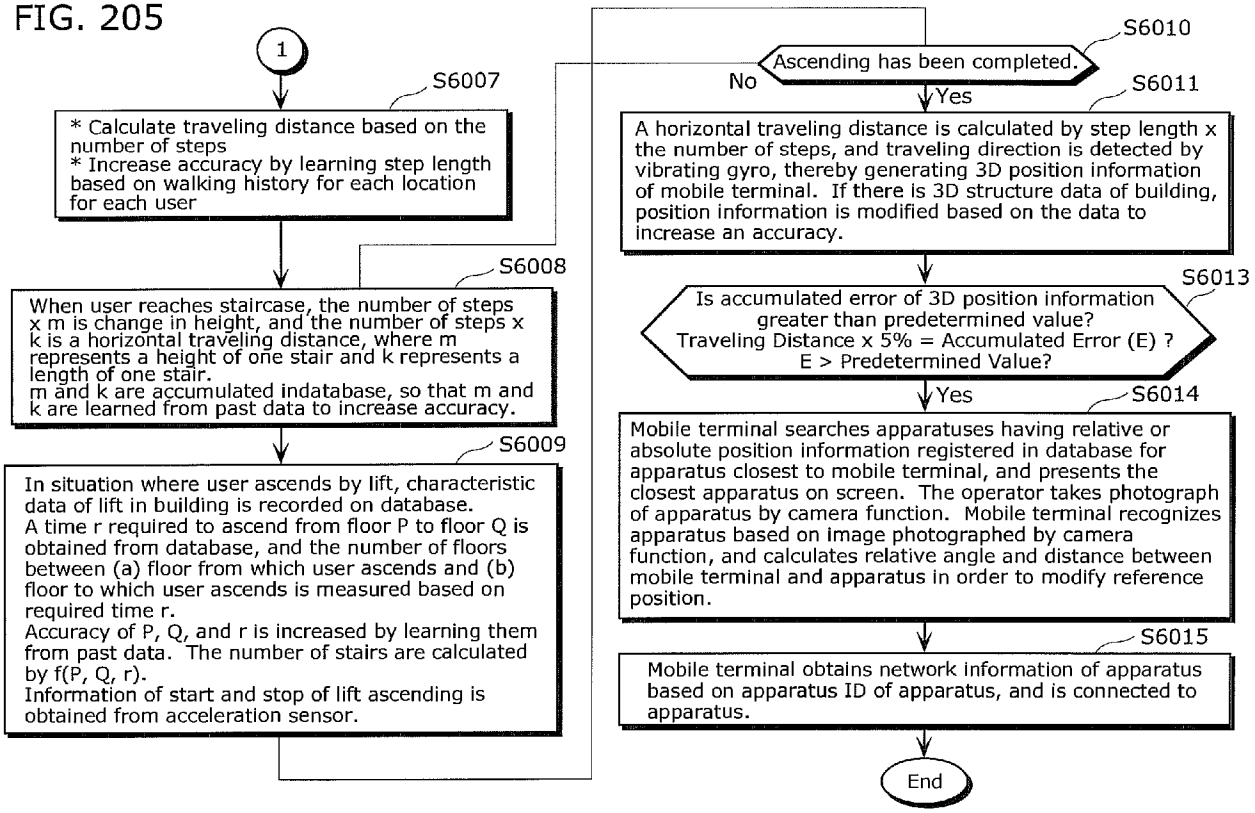

FIG. 205 is a flowchart of remote control operation according to the twenty-first embodiment of the present invention.

Figure 206:
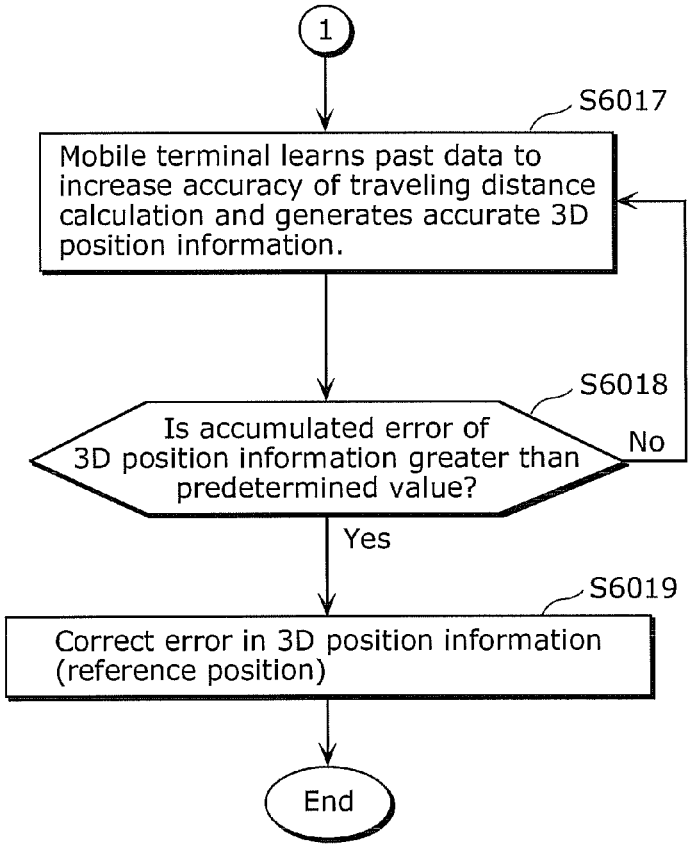

FIG. 206 is a flowchart for explaining of significance of detailed processing shown in FIG. 205.

Figure 207:
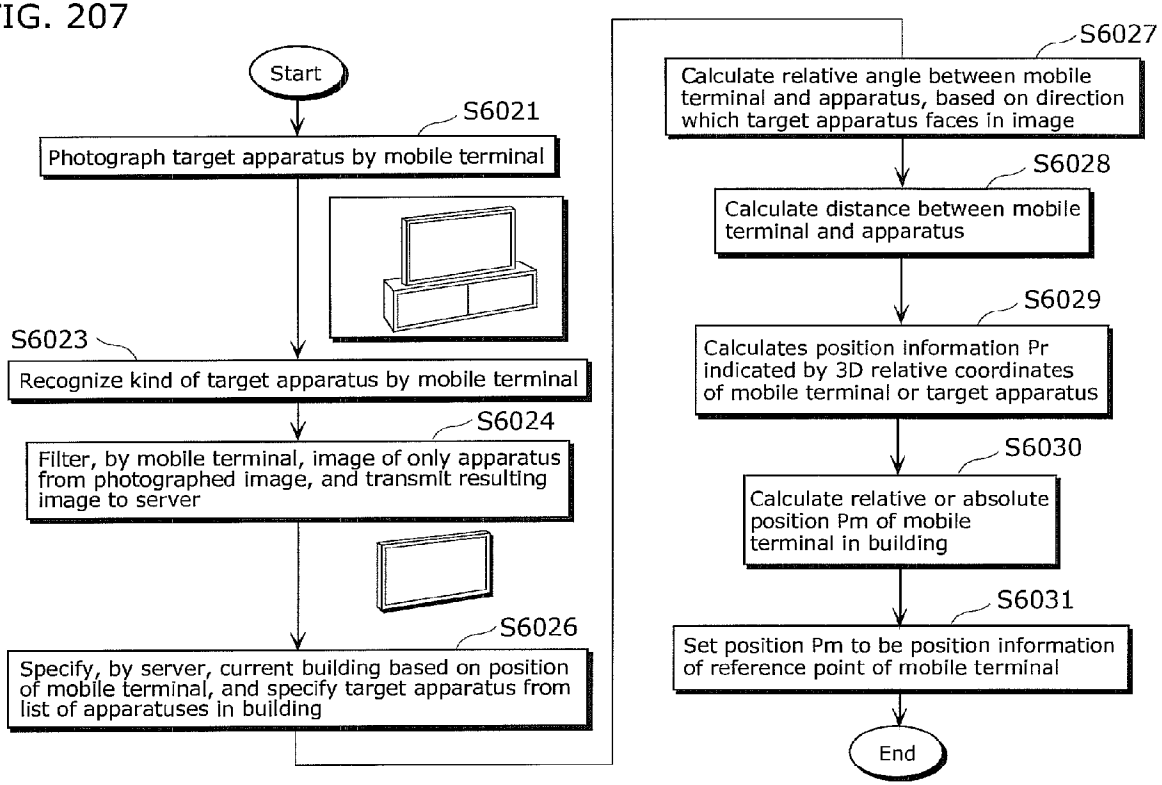

FIG. 207 is a flowchart for explaining processing of determining a correct reference point of a mobile terminal when a current reference point of the mobile terminal is not correct, according to the twenty-first embodiment of the present invention.

Figure 208:
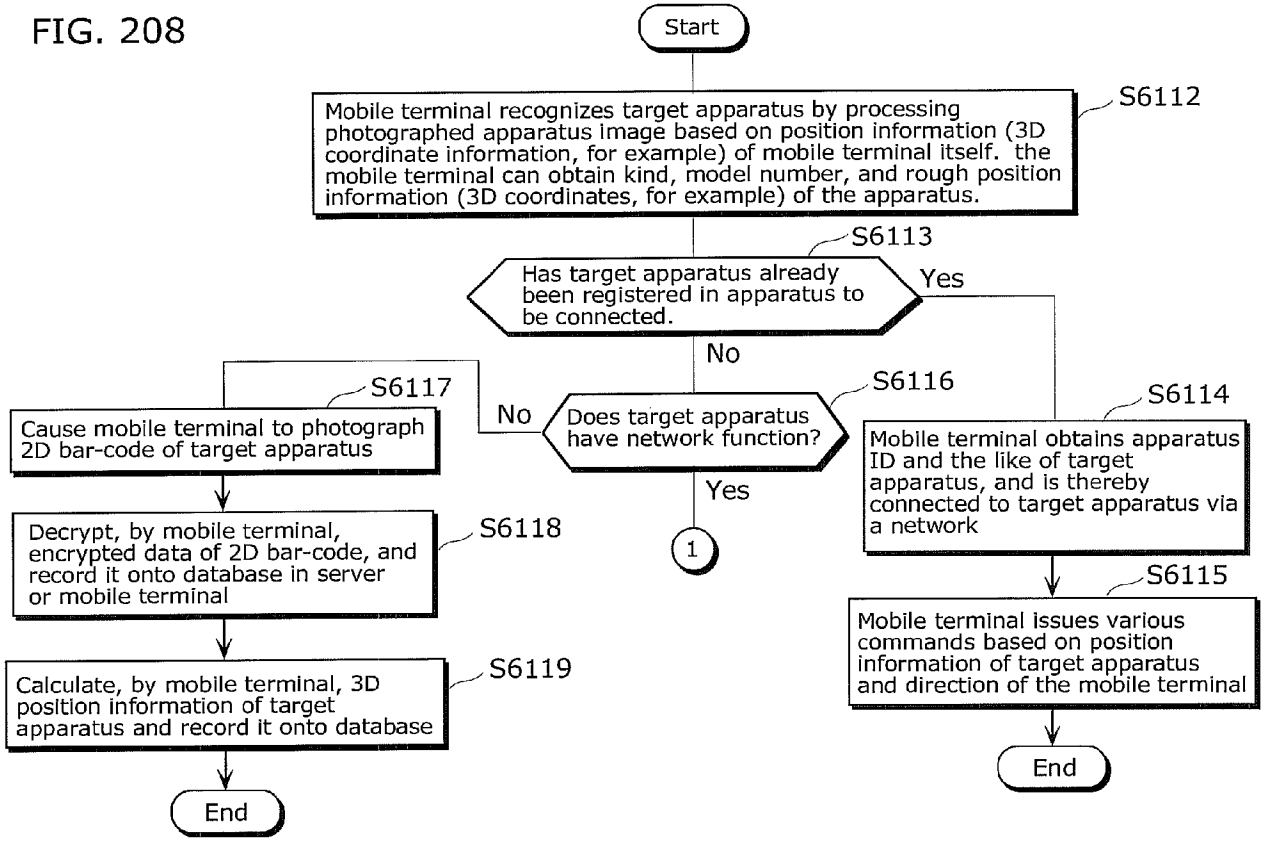

FIG. 208 is a flowchart for explaining processing of connecting an apparatus to a parent device when the apparatus does not have NFC function, according to the twenty-first embodiment of the present invention.

Figure 209:
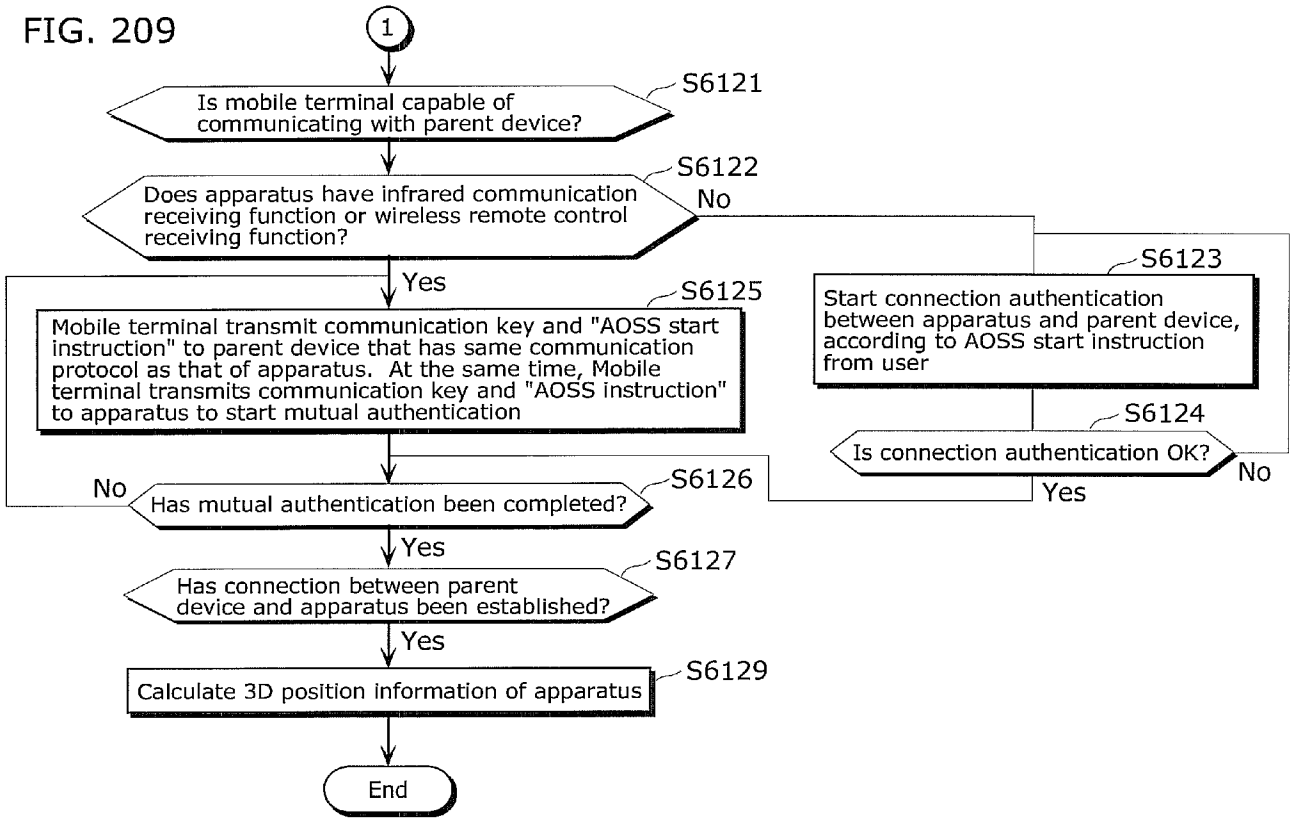

FIG. 209 is a flowchart for explaining processing of connecting the apparatus to the parent device when the apparatus does not have NFC function, according to the twenty-first embodiment of the present invention.

Figure 210:
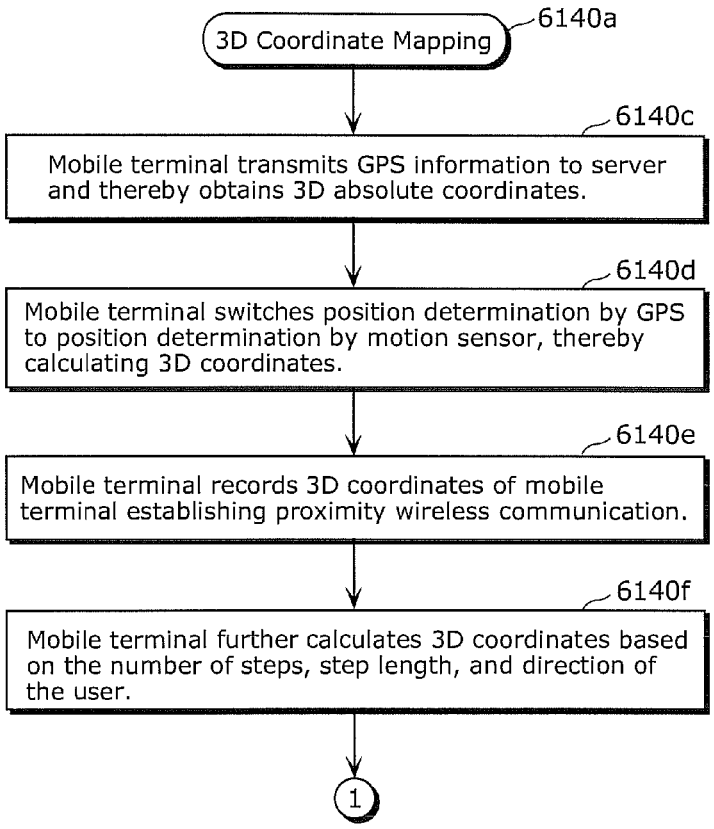

FIG. 210 is a flowchart of a position information registration method according to the twenty-first embodiment of the present invention.

Figure 211:
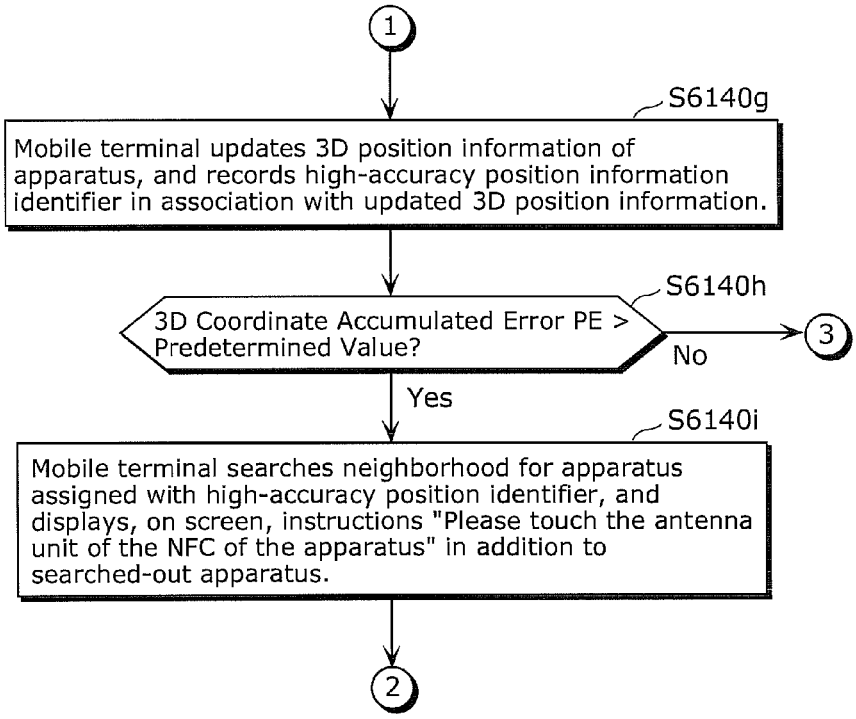

FIG. 211 is a flowchart of the position information registration method according to the twenty-first embodiment of the present invention.

Figure 212:
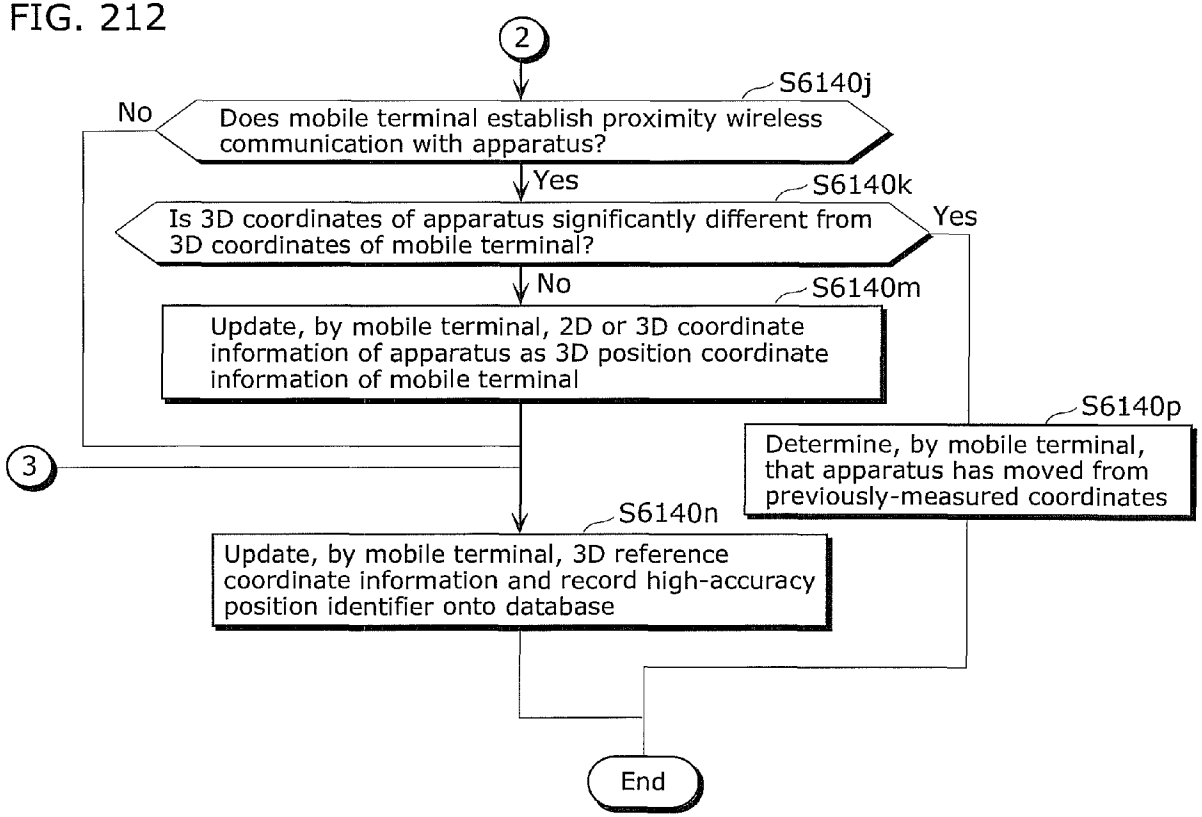

FIG. 212 is a flowchart of the position information registration method according to the twenty-first embodiment of the present invention.

Figure 213:
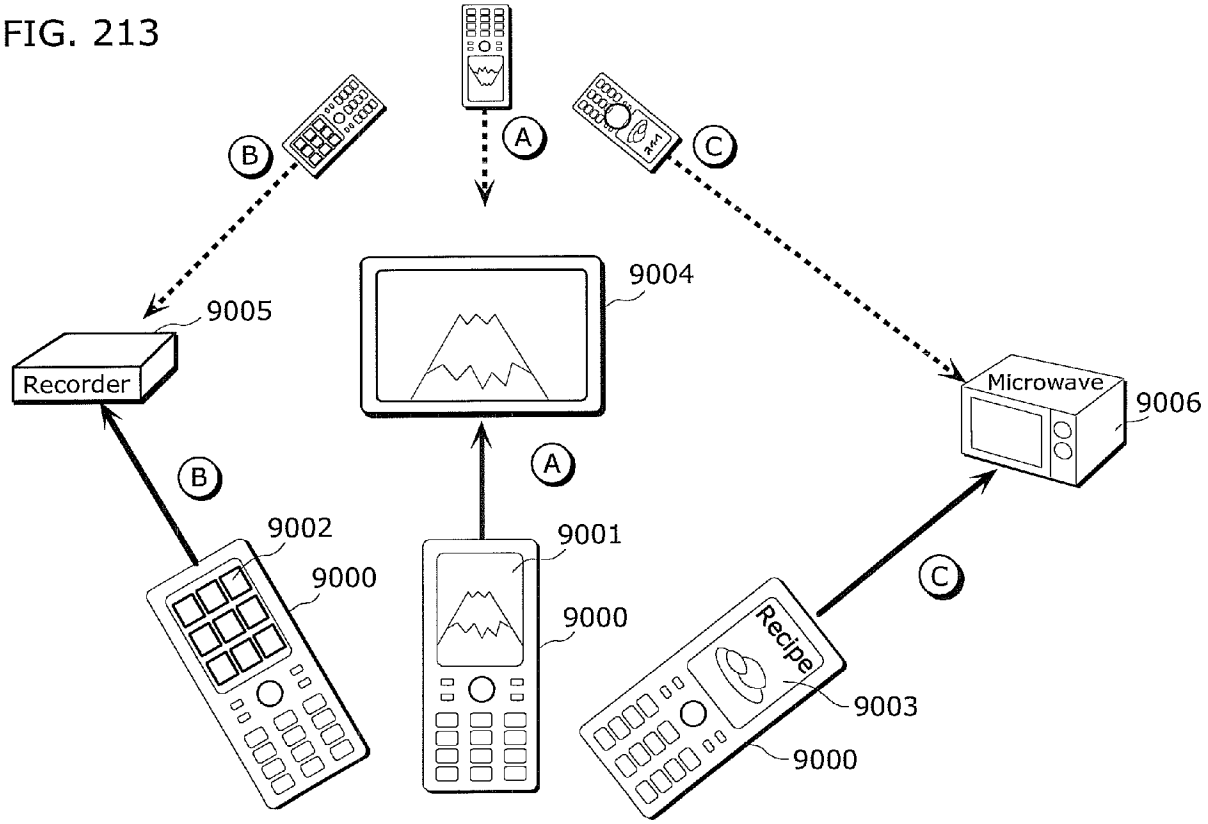

FIG. 213 is a diagram for explaining the situation of a mobile device and cooperation apparatuses according to a twenty-second embodiment of the present invention.

Figure 214:
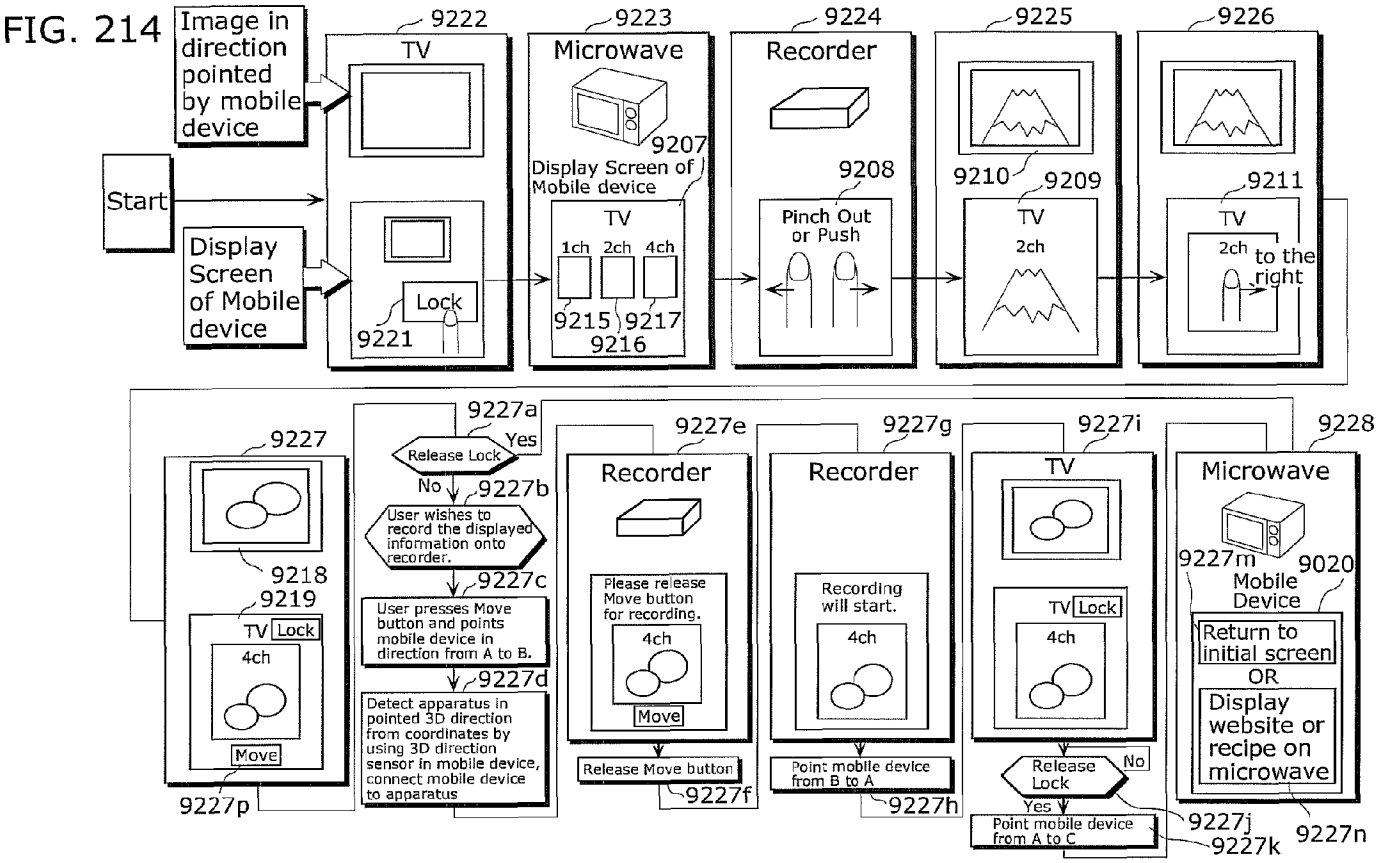

FIG. 214 is a diagram showing display screens of a mobile device and display screens of a cooperation apparatus, according to the twenty-second embodiment of the present invention.

Figure 215:
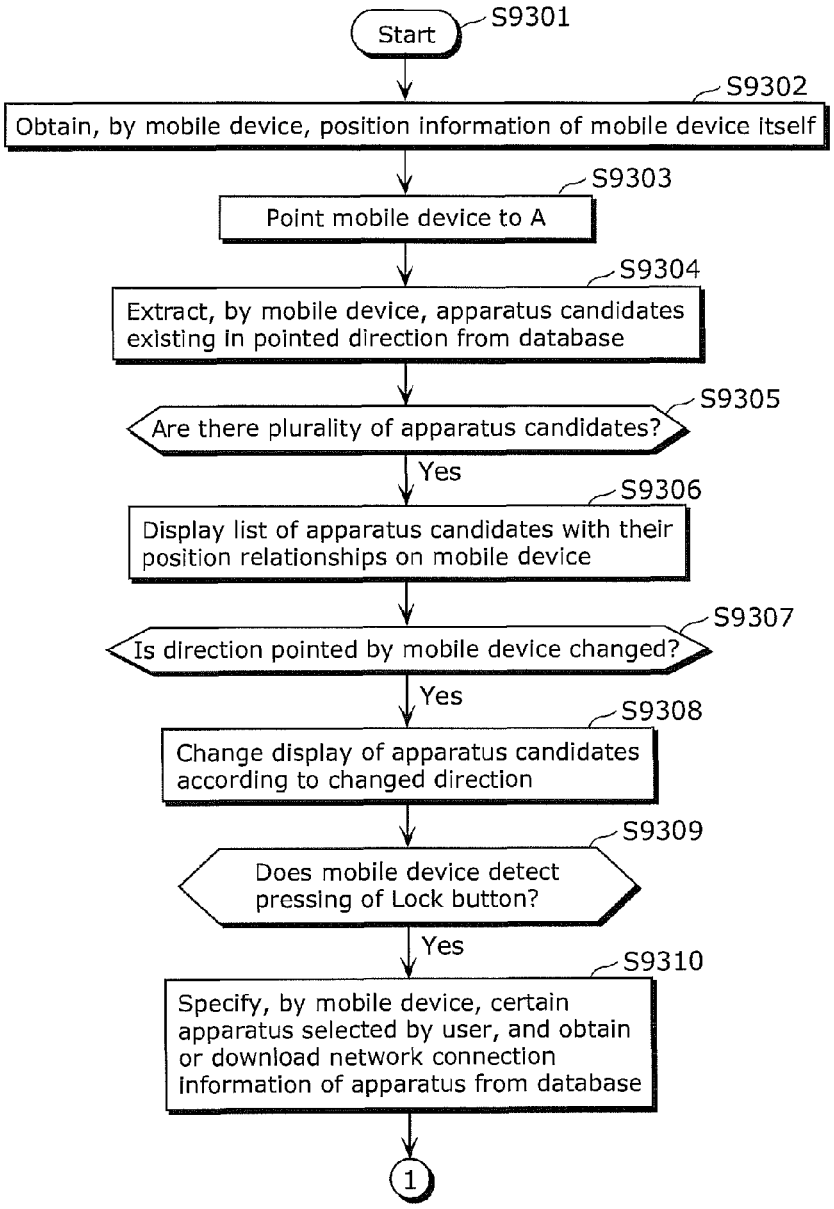

FIG. 215 is a flowchart of processing according to the twenty-second embodiment of the present invention.

Figure 216:
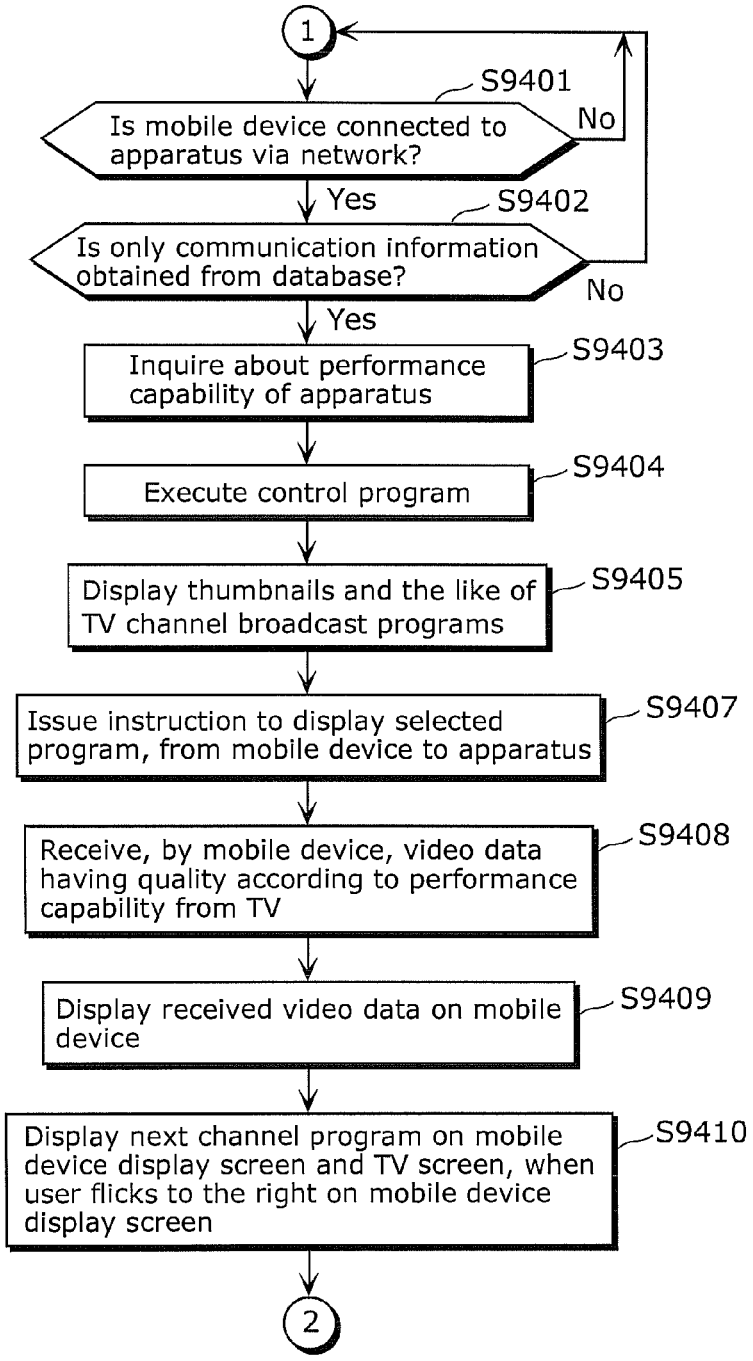

FIG. 216 is a flowchart of the processing according to the twenty-second embodiment of the present invention.

Figure 217:
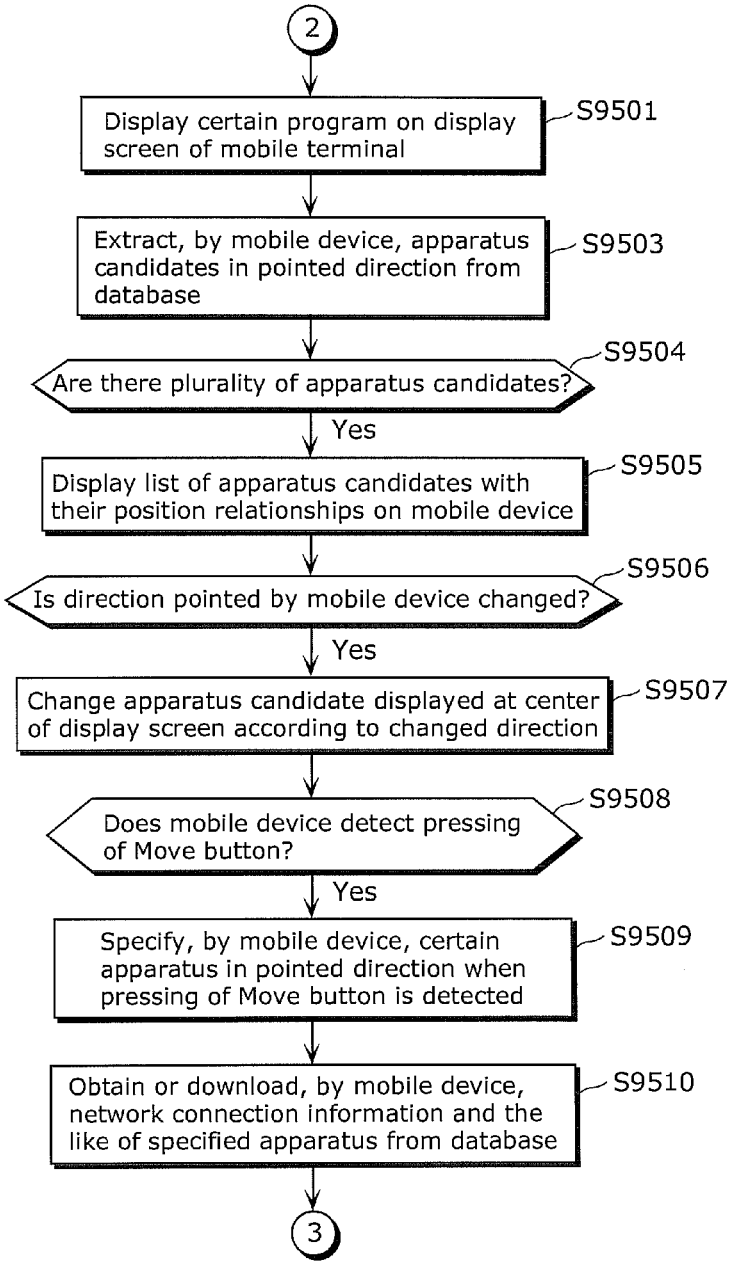

FIG. 217 is a flowchart of the processing according to the twenty-second embodiment of the present invention.

Figure 218:
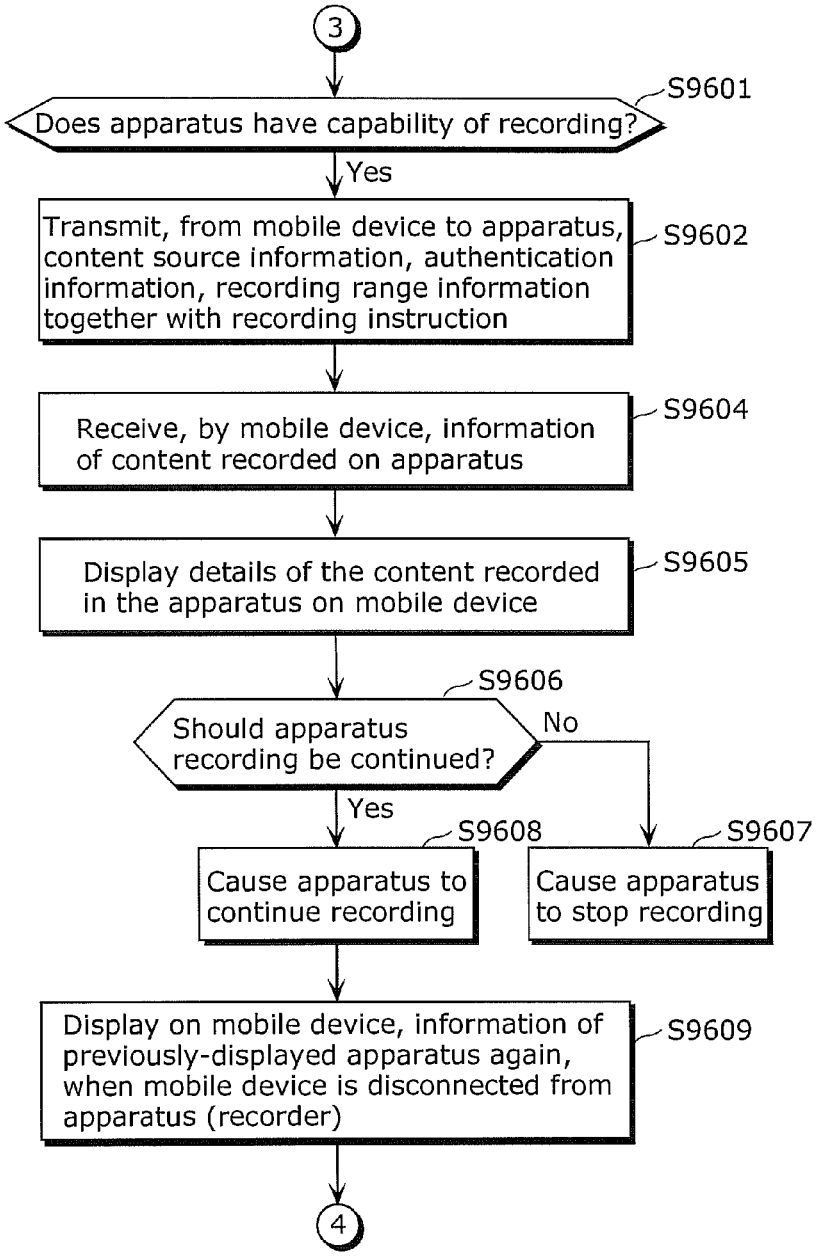

FIG. 218 is a flowchart of the processing according to the twenty-second embodiment of the present invention.

Figure 219:
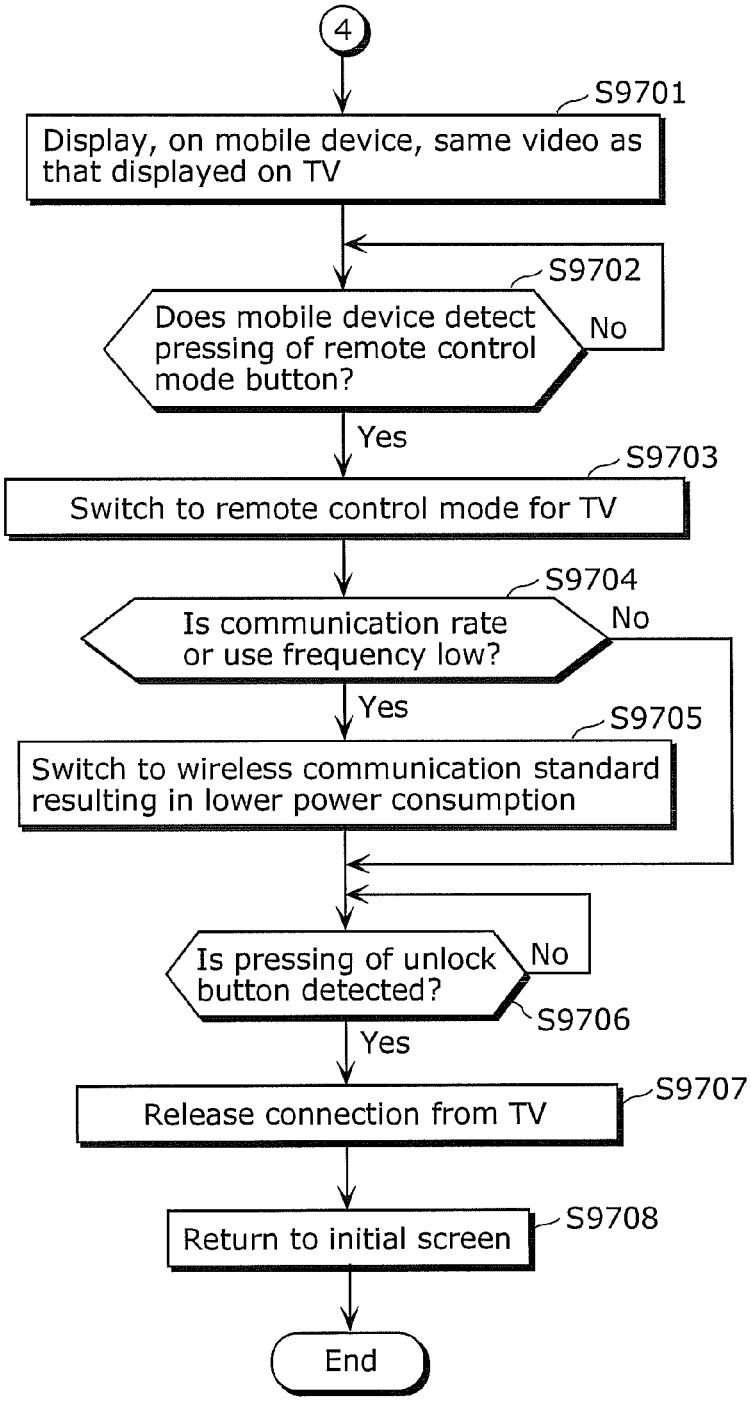

FIG. 219 is a flowchart of the processing according to the twenty-second embodiment of the present invention.

Figure 220:
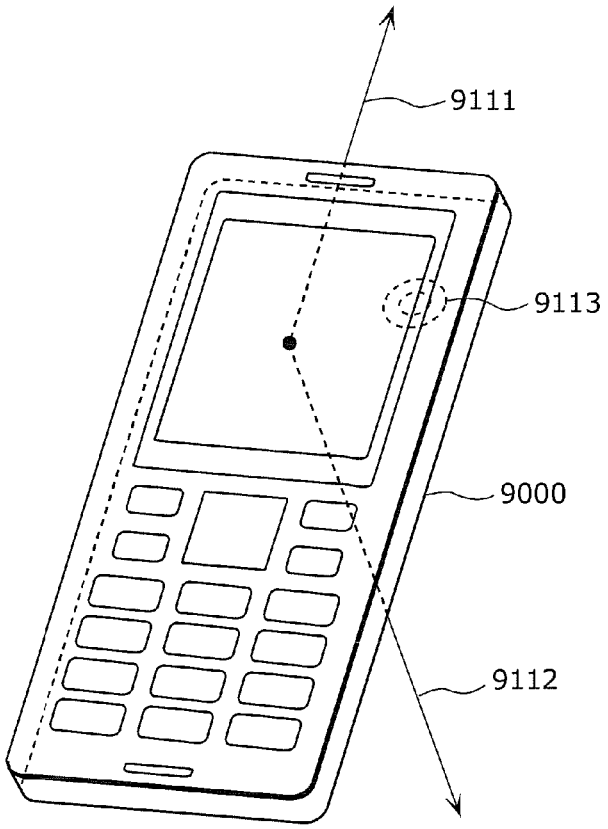

FIG. 220 is a schematic diagram of the mobile device according to the twenty-second embodiment of the present invention.

Figure 221:
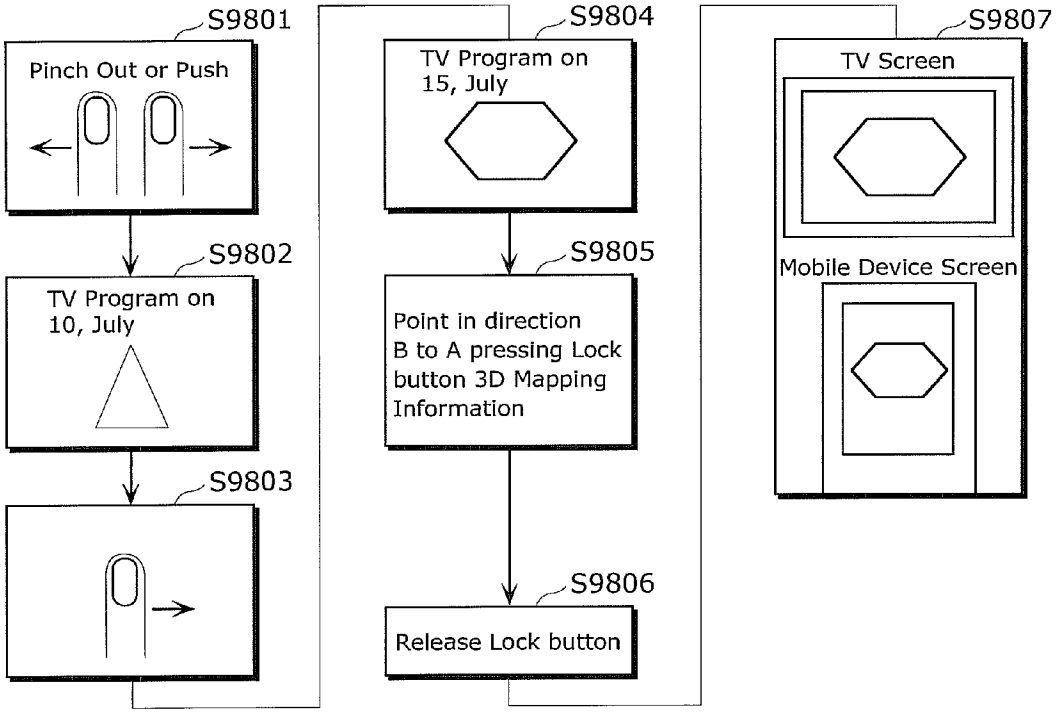

FIG. 221 is a flowchart of an example of displays of the mobile device and a cooperation apparatus, according to the twenty-second embodiment of the present invention.

Figure 222:
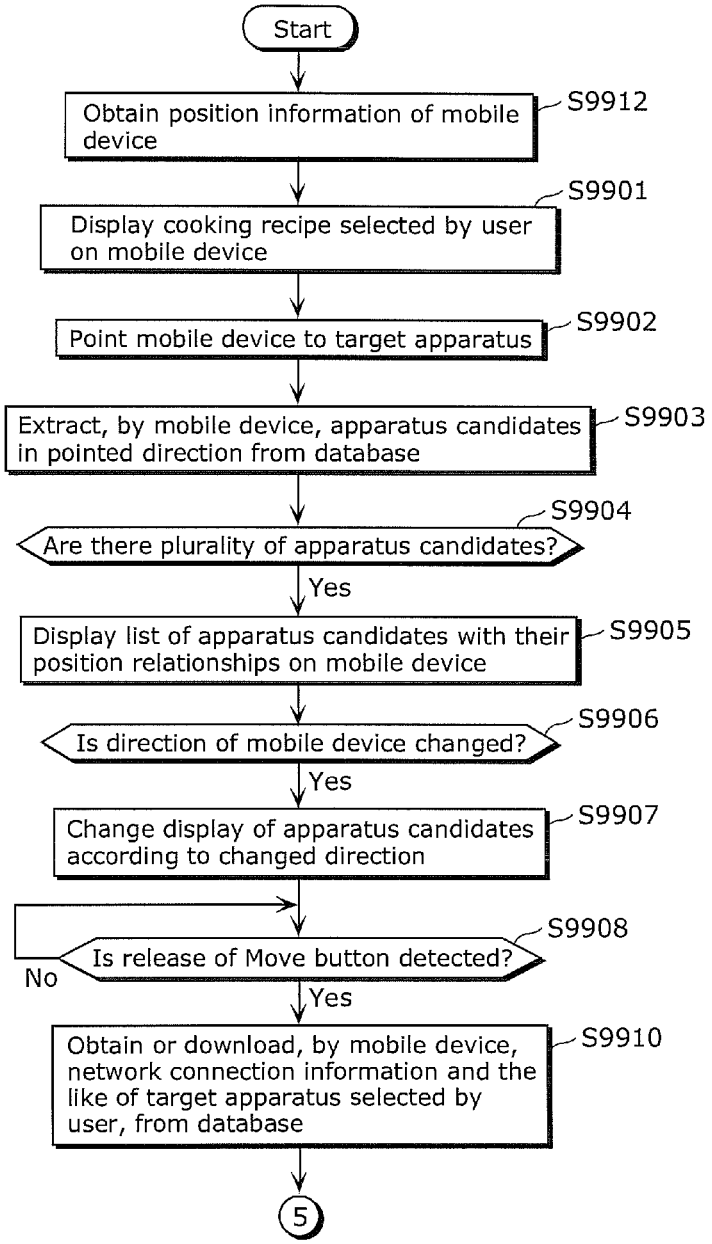

FIG. 222 is a flowchart of processing in the case where the cooperation apparatus is a microwave, according to the twenty-second embodiment of the present invention.

Figure 223:
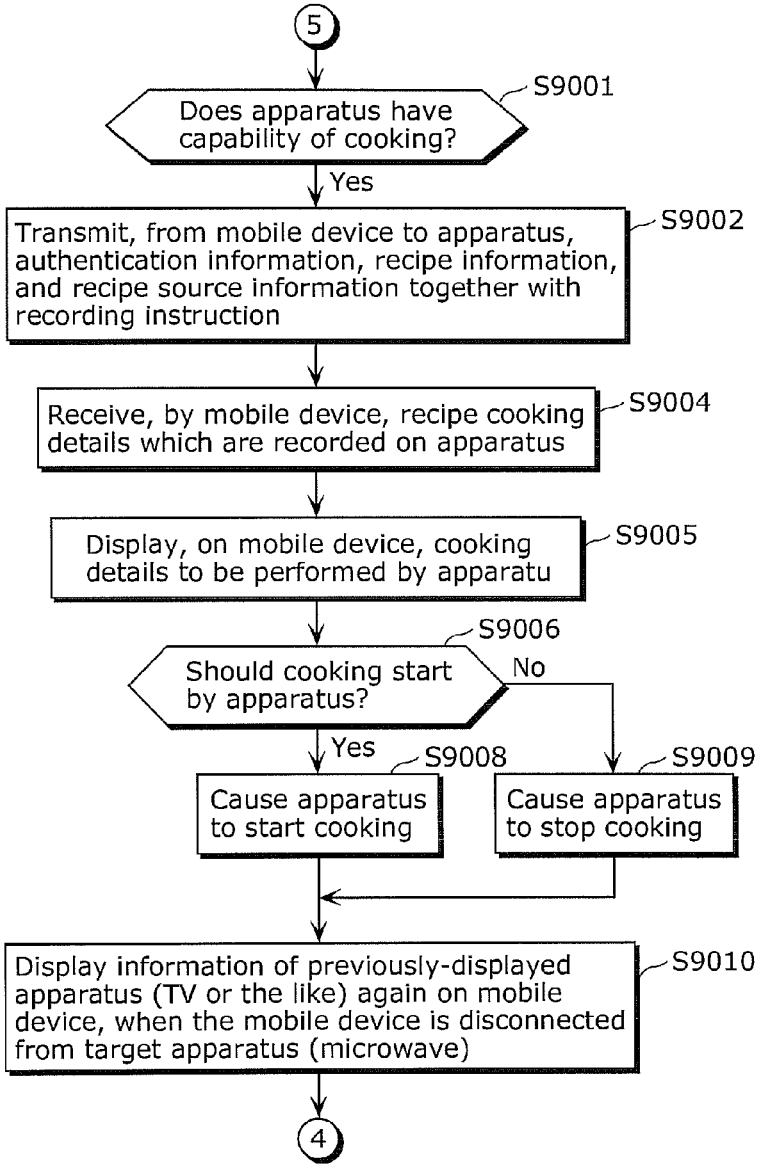

FIG. 223 is a flowchart of processing in the case where the cooperation apparatus is a microwave, according to the twenty-second embodiment of the present invention.

Figure 224:
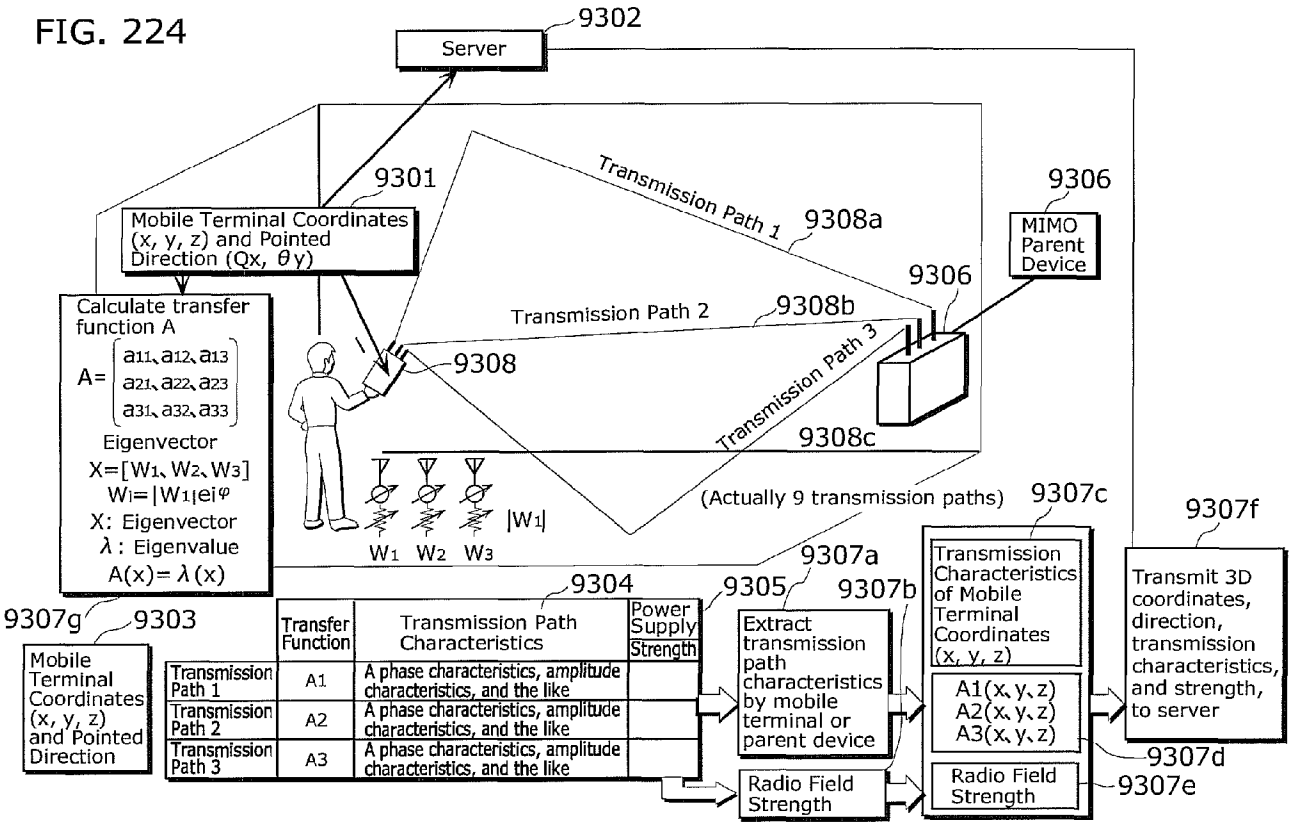

FIG. 224 is a diagram for explaining a communication method for establishing a plurality of transmission paths by using a plurality of antennas and performing transmission via the transmission paths.

Figure 225:
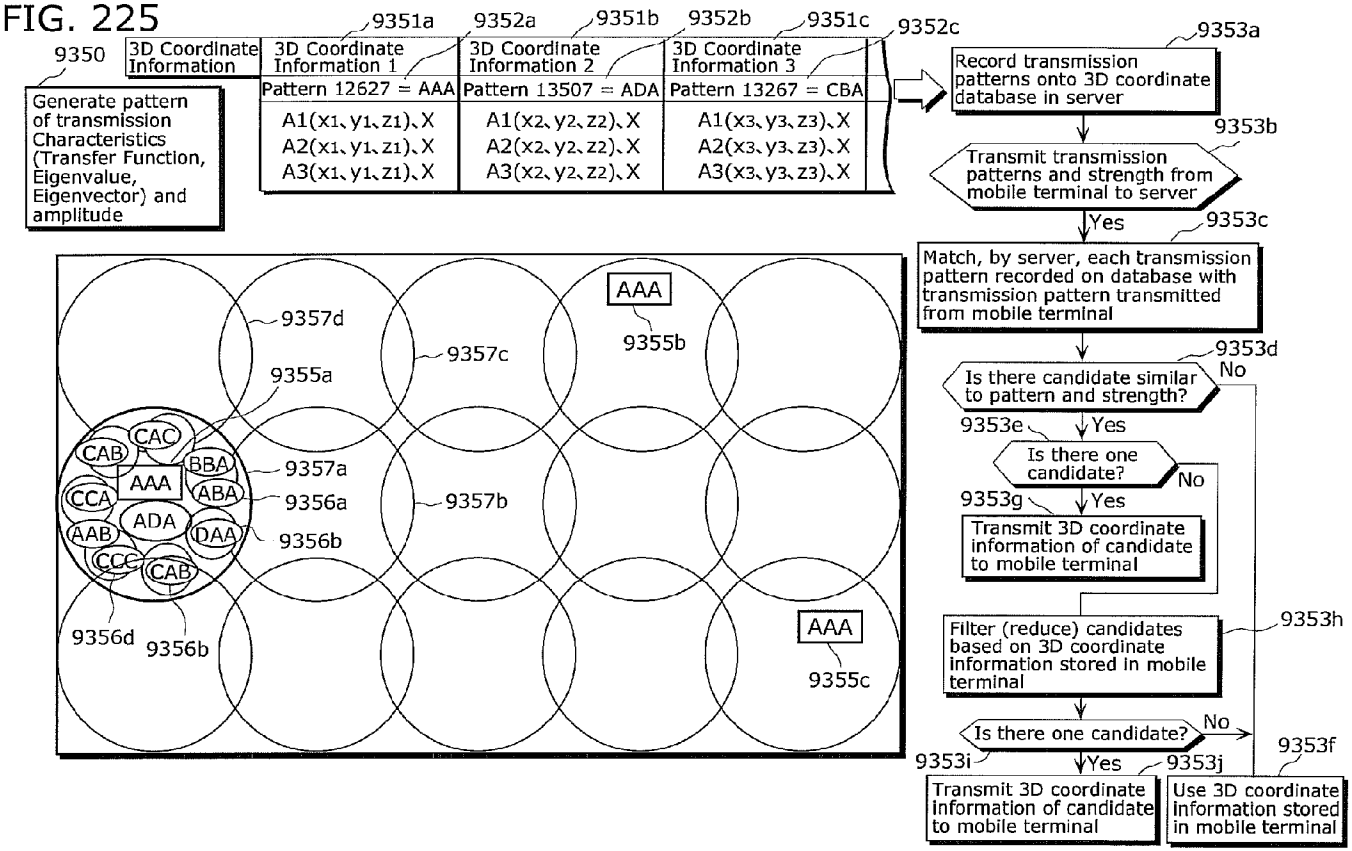

FIG. 225 is a flowchart for explaining a method for obtaining position information in the communication method using the transmission paths.

Figure 226:
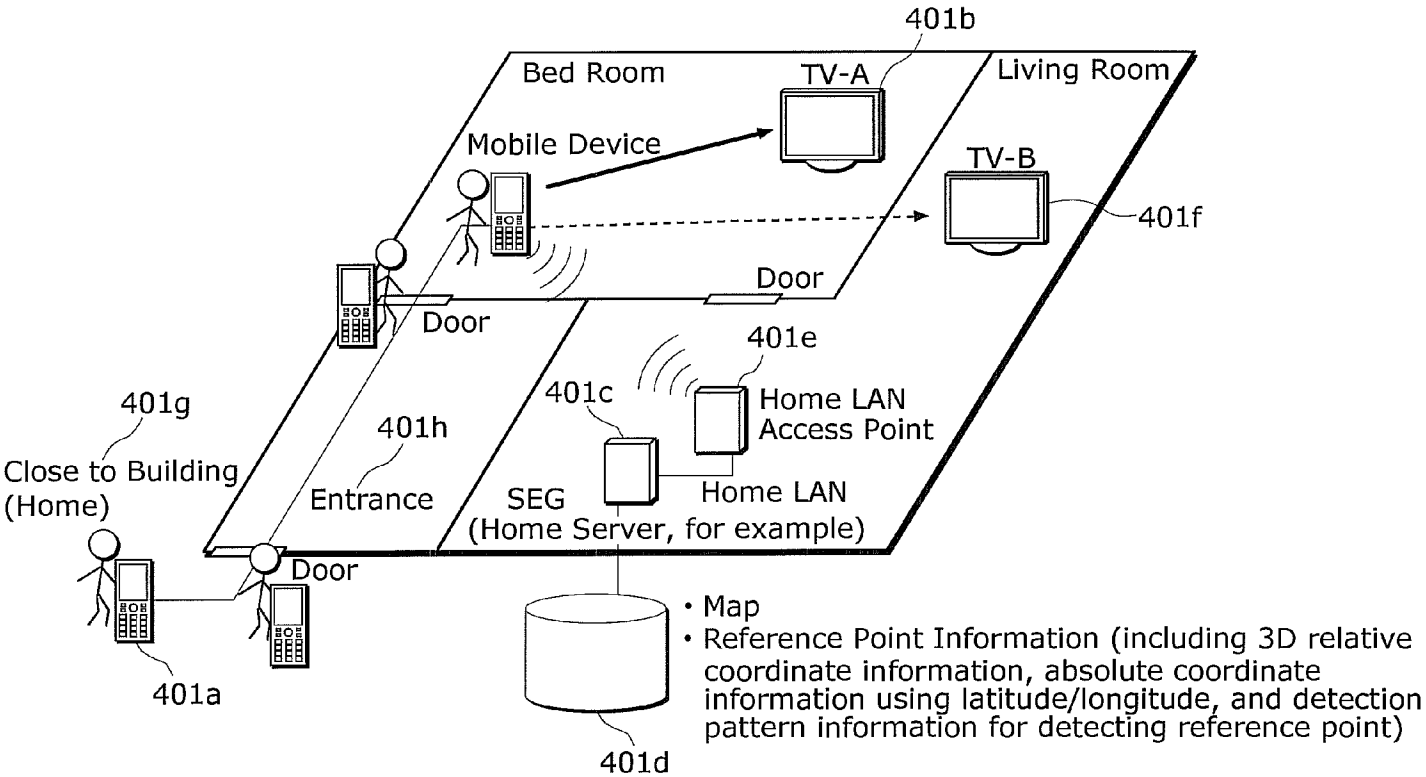

FIG. 226 is a diagram showing an example of apparatuses related to moves of a mobile device near and inside a building (user's home), according to the twenty-second embodiment of the present invention.

Figure 227:
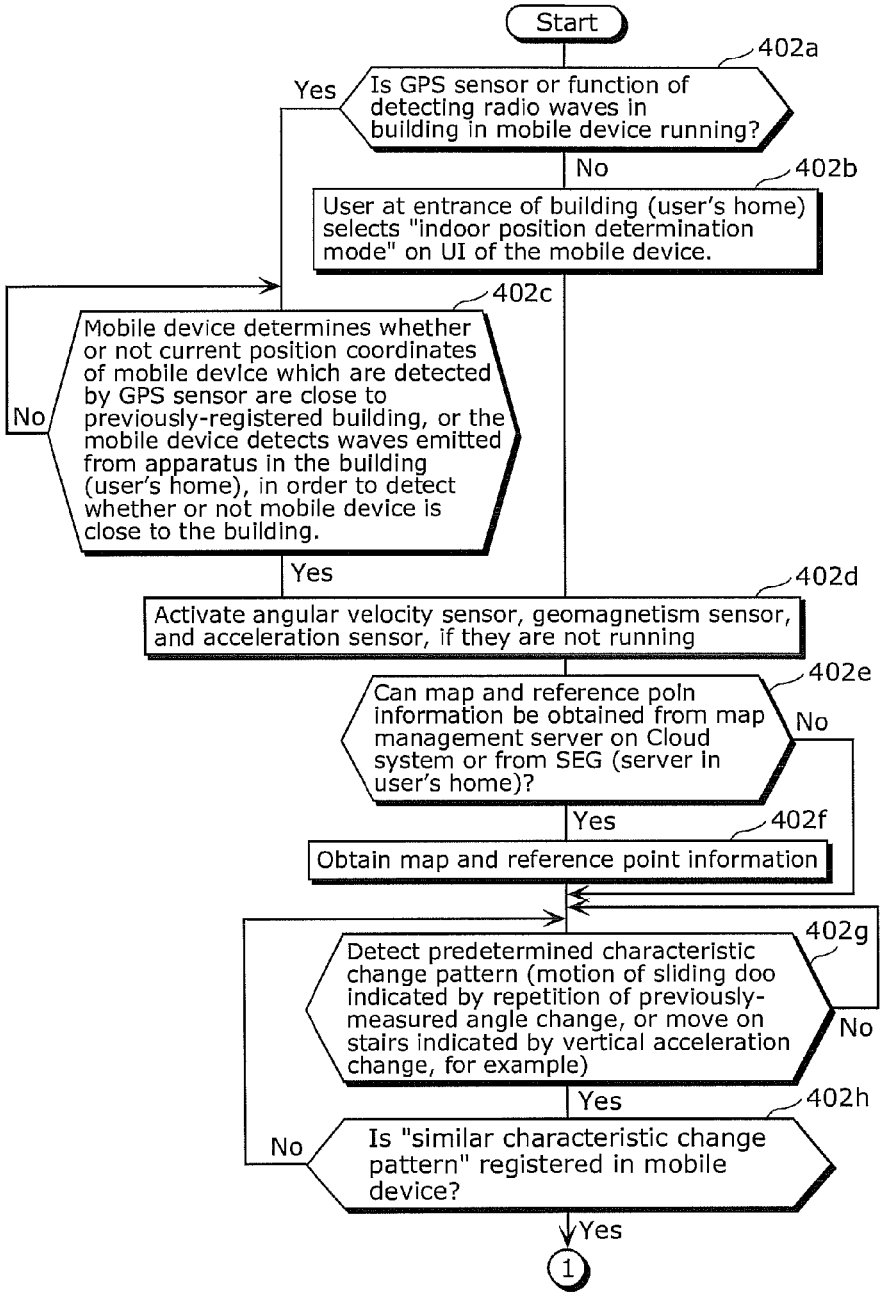

FIG. 227 is a flowchart of processing of determining a position of a mobile device in the building, according to a twenty-third embodiment of the present invention.

Figure 228:
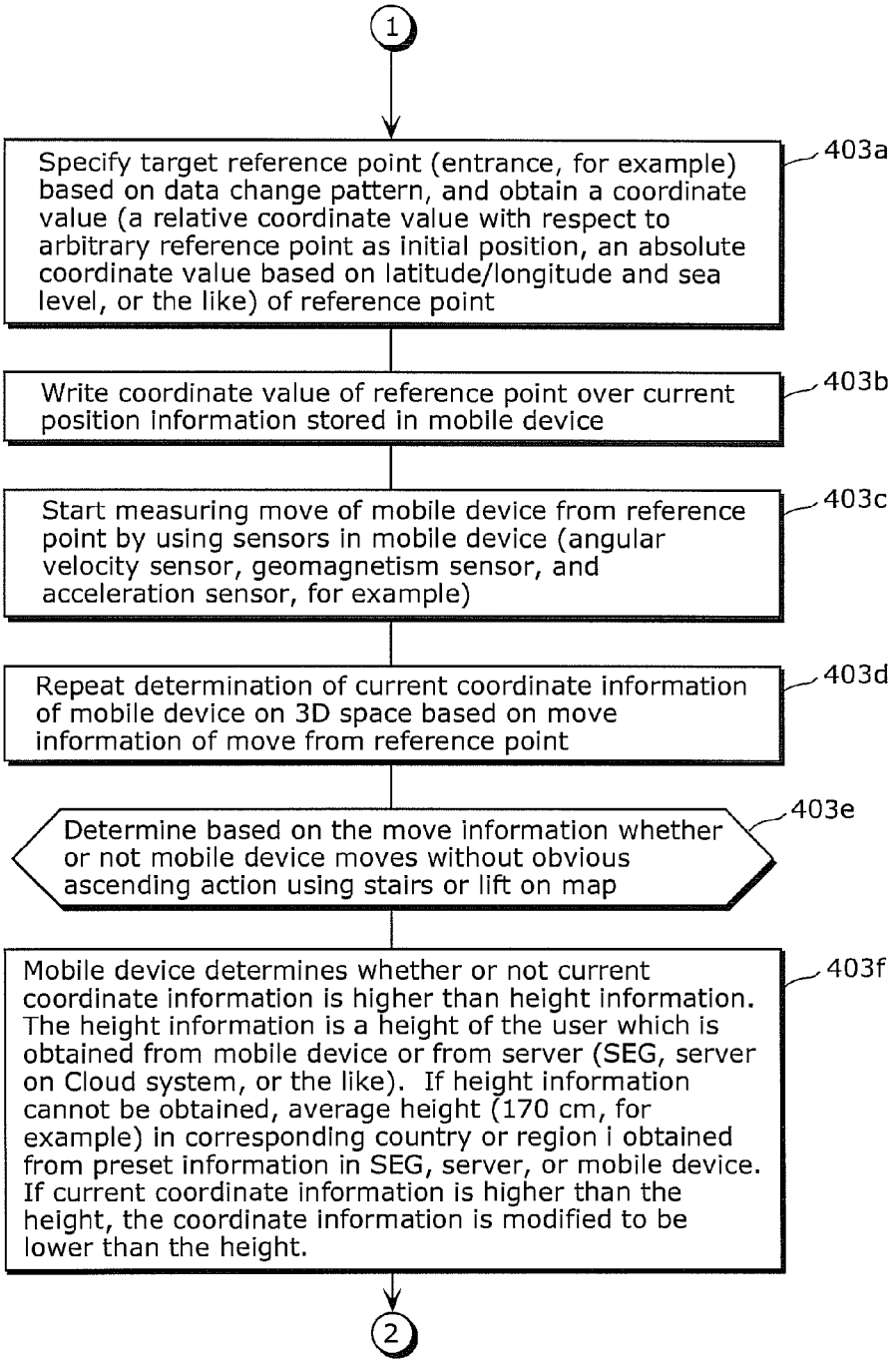

FIG. 228 is a flowchart of processing of determining a position of the mobile device in the building, according to the twenty-third embodiment of the present invention.

Figure 229:
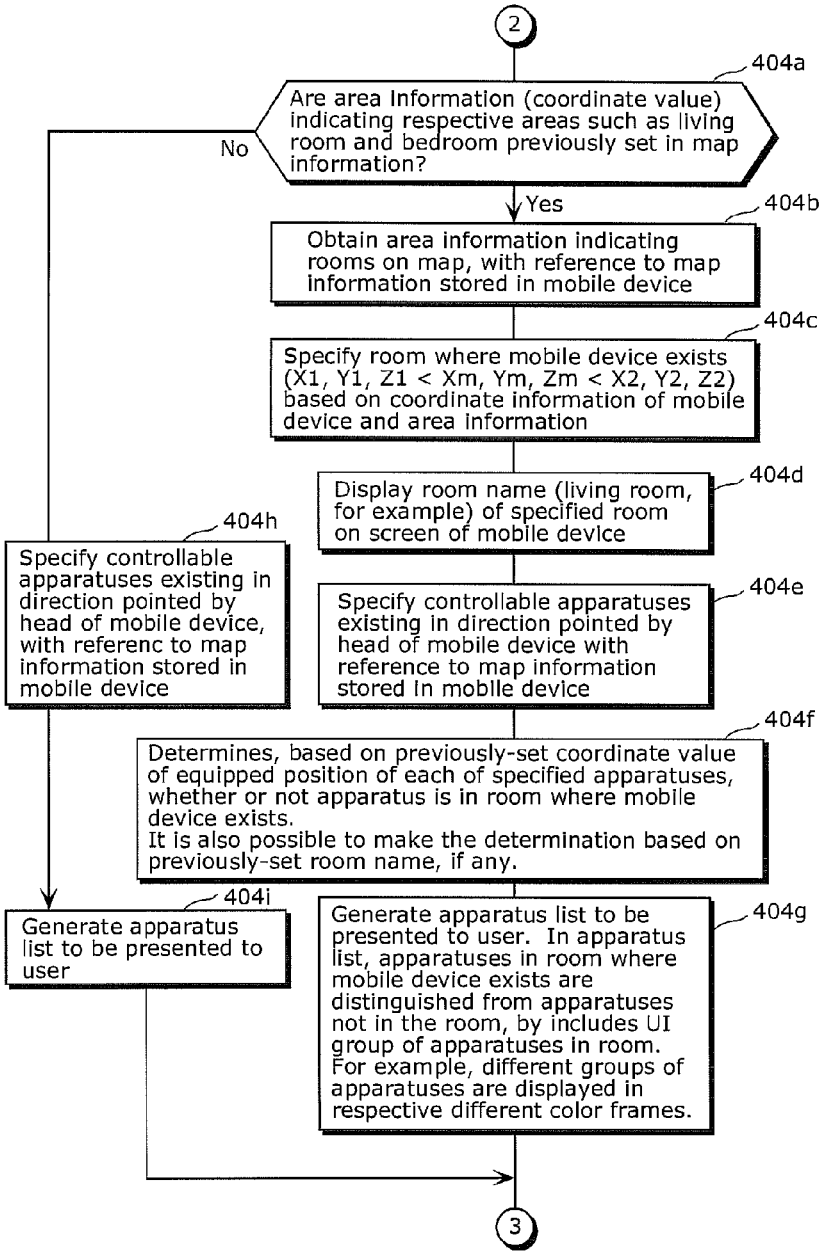

FIG. 229 is a flowchart of processing of determining a position of the mobile device in the building, according to the twenty-third embodiment of the present invention.

Figure 230:
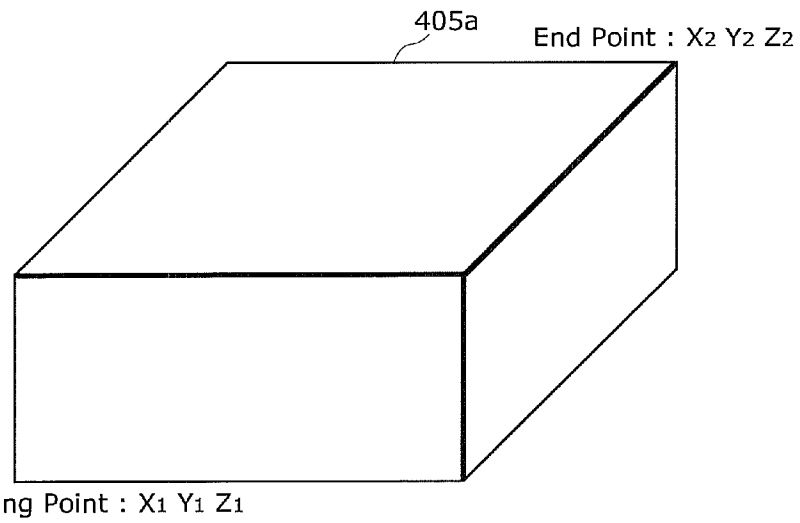

FIG. 230 is a diagram showing an example of information indicating an area of a room on a 3D map according to the twenty-third embodiment of the present invention.

Figure 231:
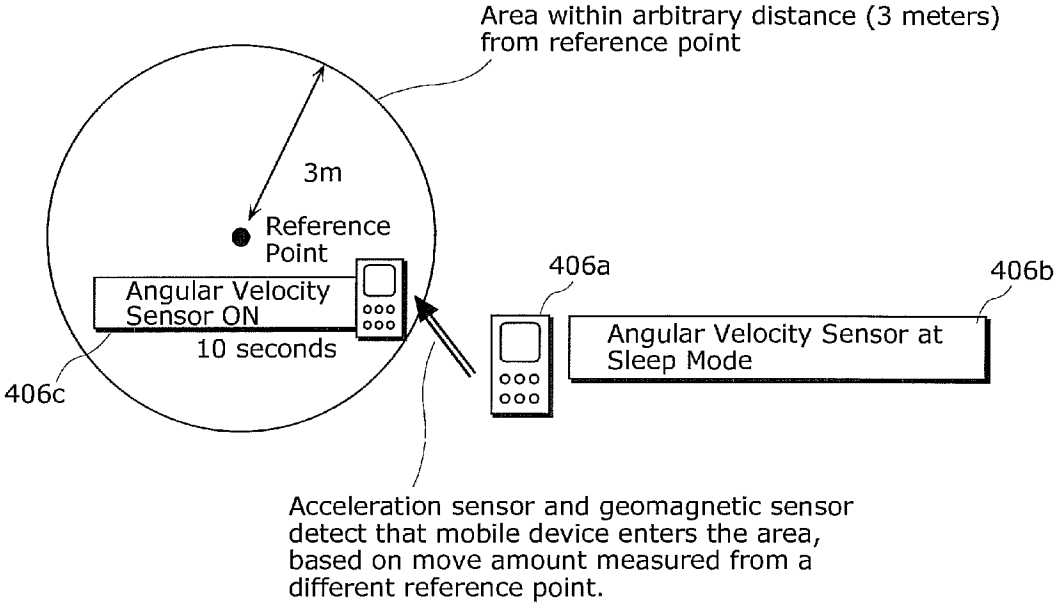

FIG. 231 is a diagram showing a move of the mobile device near a reference point according to the twenty-third embodiment of the present invention.

Figure 232:
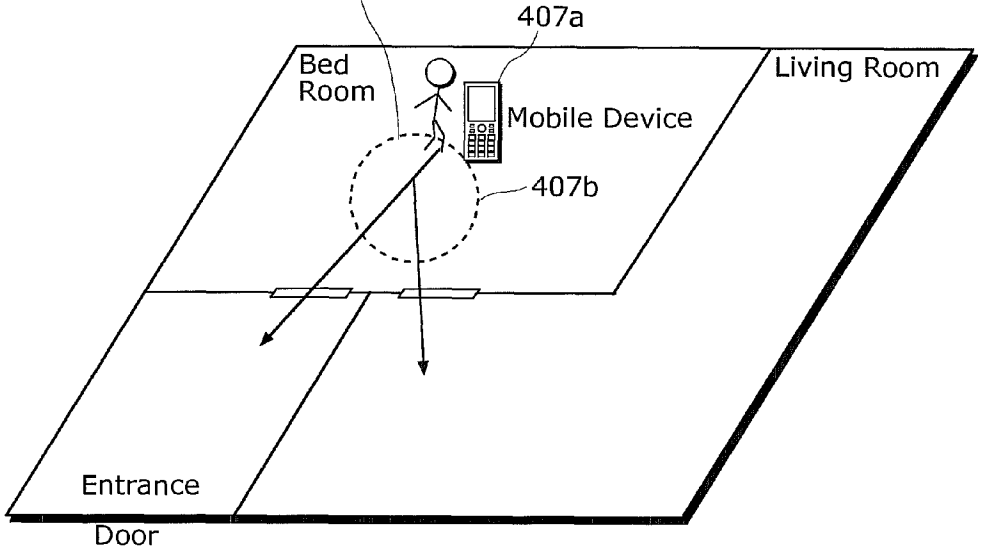

FIG. 232 is a diagram showing a location to be detected with a high accuracy in a direction of moving the mobile device, according to the twenty-third embodiment of the present invention.

Figure 233:
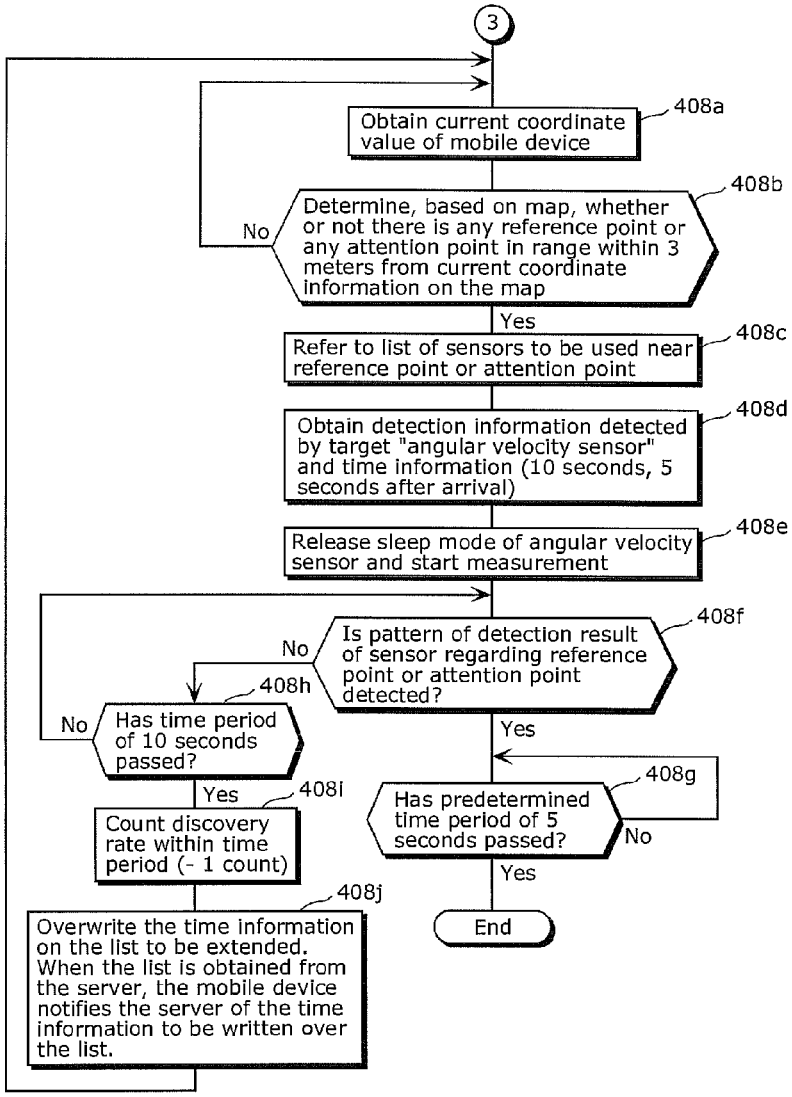

FIG. 233 is a flowchart of processing of determining a position of the mobile device in the building, according to the twenty-third embodiment of the present invention.

FIG. 234 is a table of moves of the mobile device near reference points and an attention point, according to the twenty-third embodiment of the present invention.

Figure 235:
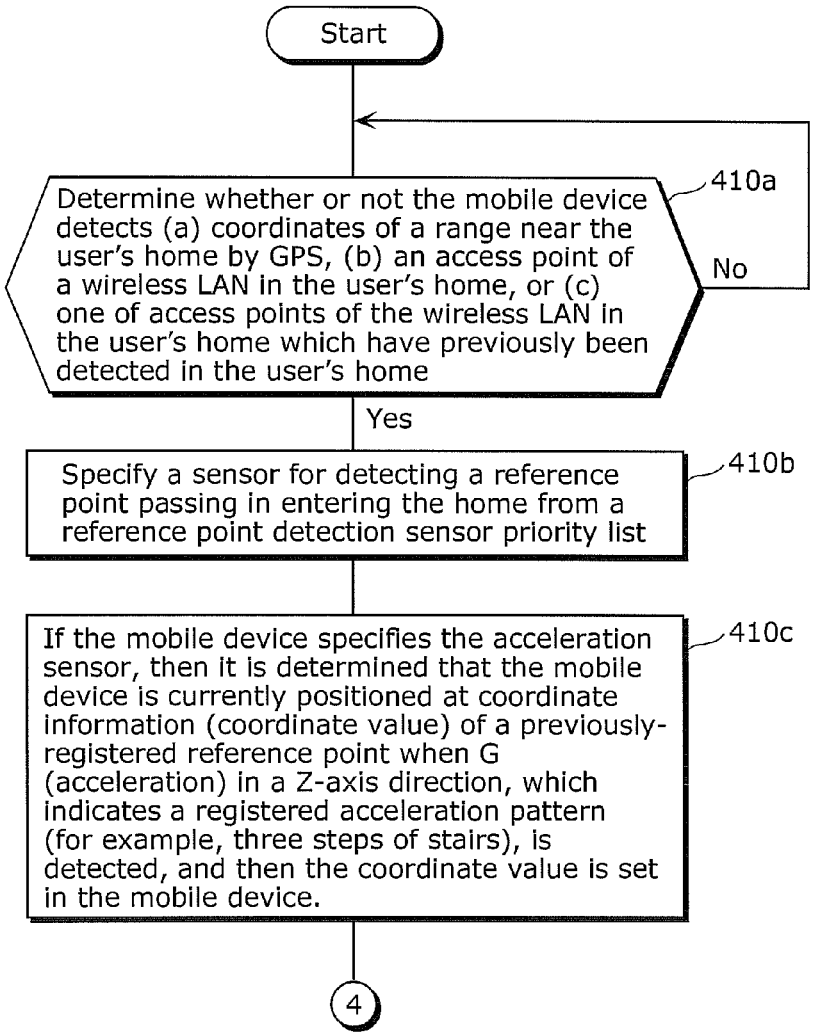

FIG. 235 is a flowchart of processing of determining a position of the mobile device in the building, according to the twenty-third embodiment of the present invention.

FIG. 236 is a list indicating priorities of sensors for detecting each of reference points, according to the twenty-third embodiment of the present invention.

Figure 237:
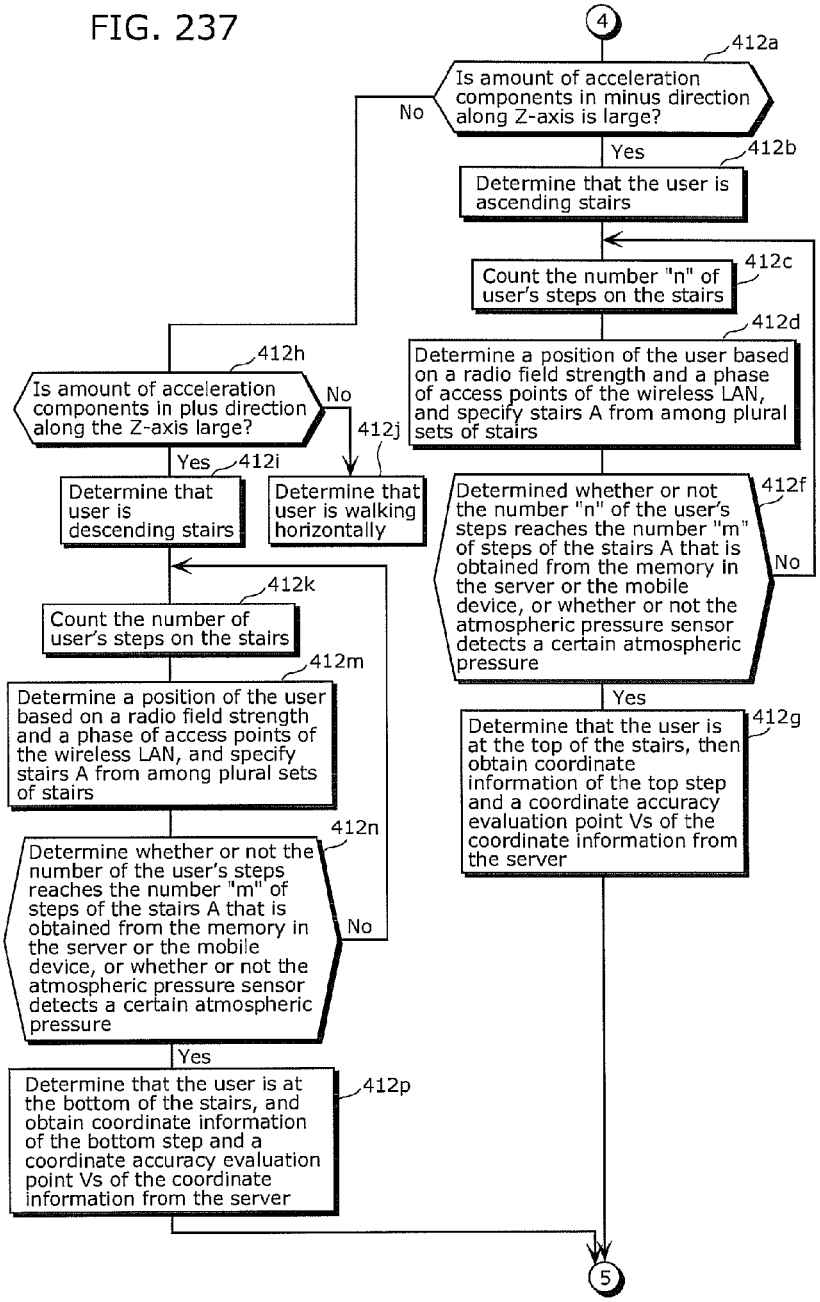

FIG. 237 is a flowchart of processing of determining a position of the mobile device in the building, according to the twenty-third embodiment of the present invention.

Figure 238:
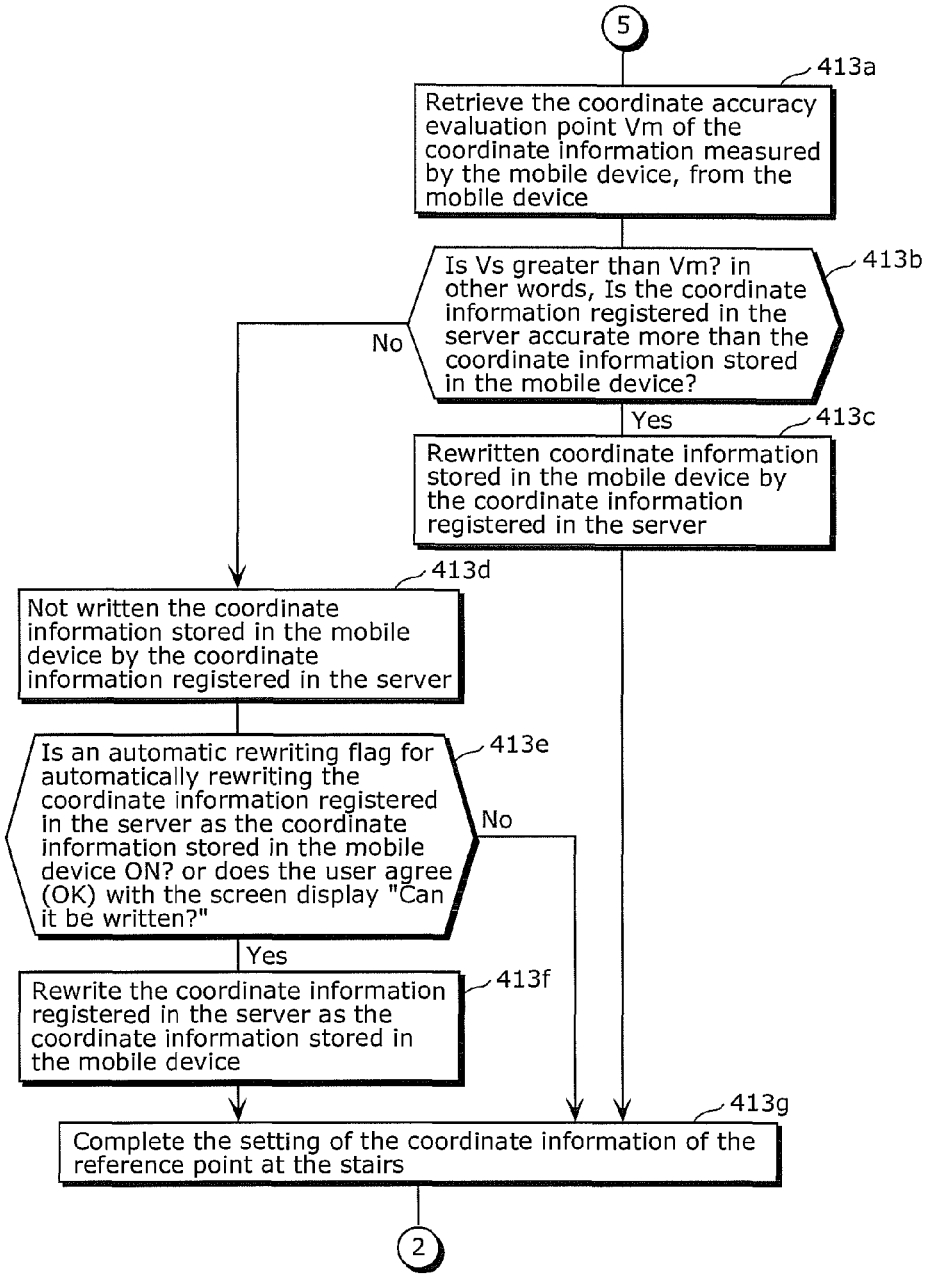

FIG. 238 is a flowchart of processing of determining a position of the mobile device in the building, according to the twenty-third embodiment of the present invention.

Figure 239:
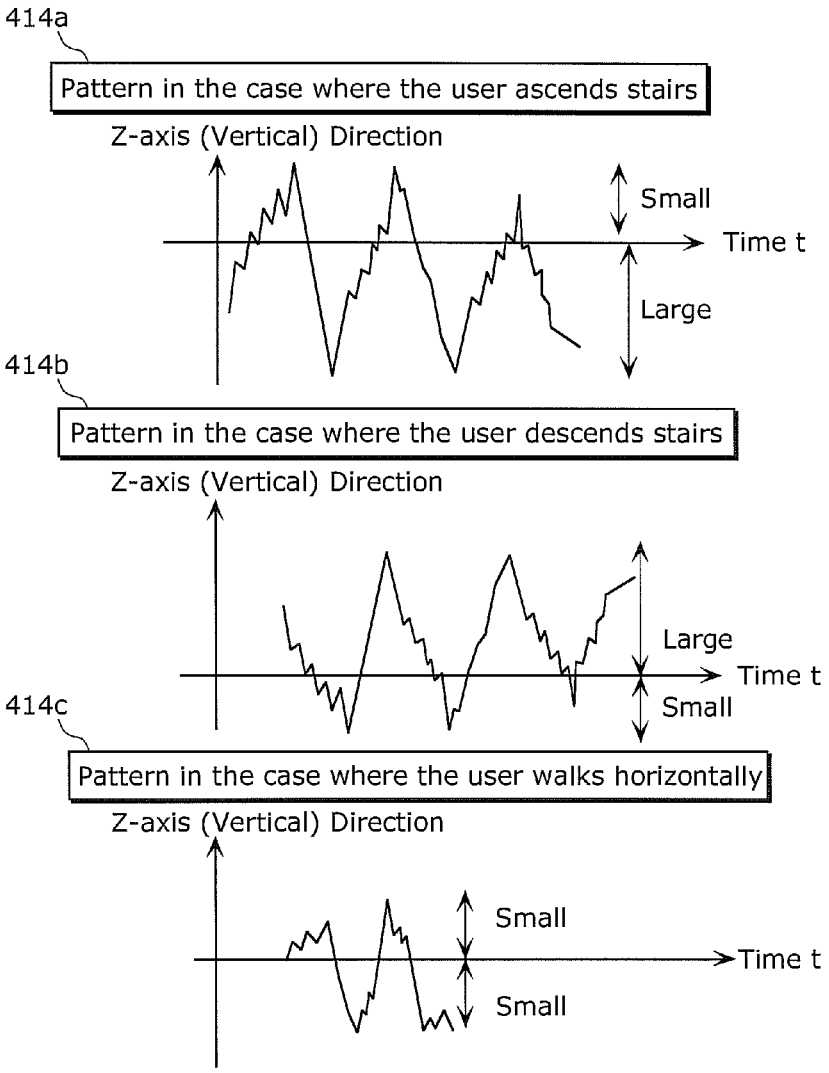

FIG. 239 shows graphs each indicating detection data in a Z-axis (vertical) direction of an acceleration sensor, according to the twenty-third embodiment of the present invention.

Figure 240:
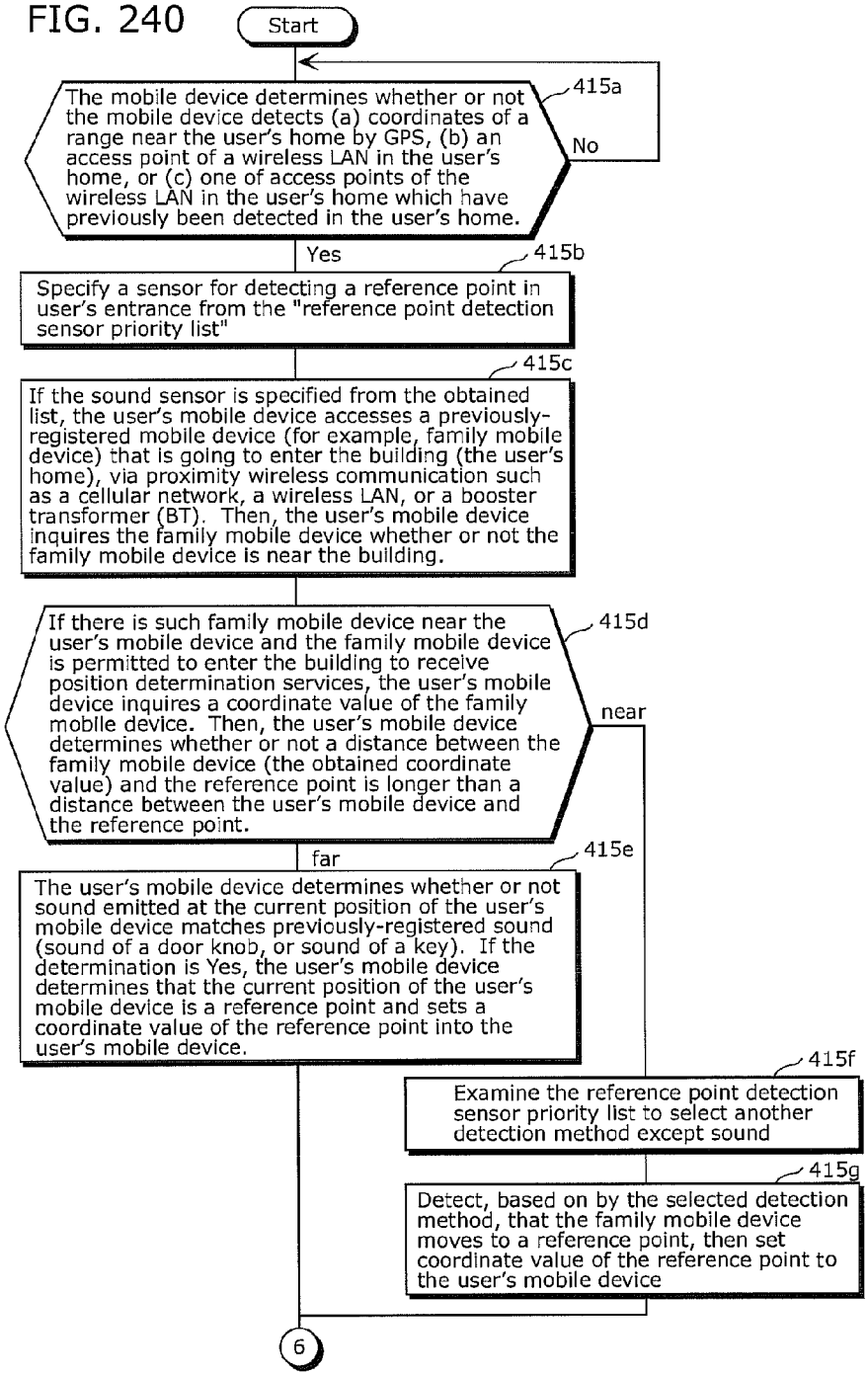

FIG. 240 is a flowchart of processing of determining a position of the mobile device in the building, according to the twenty-third embodiment of the present invention.

Figure 241:
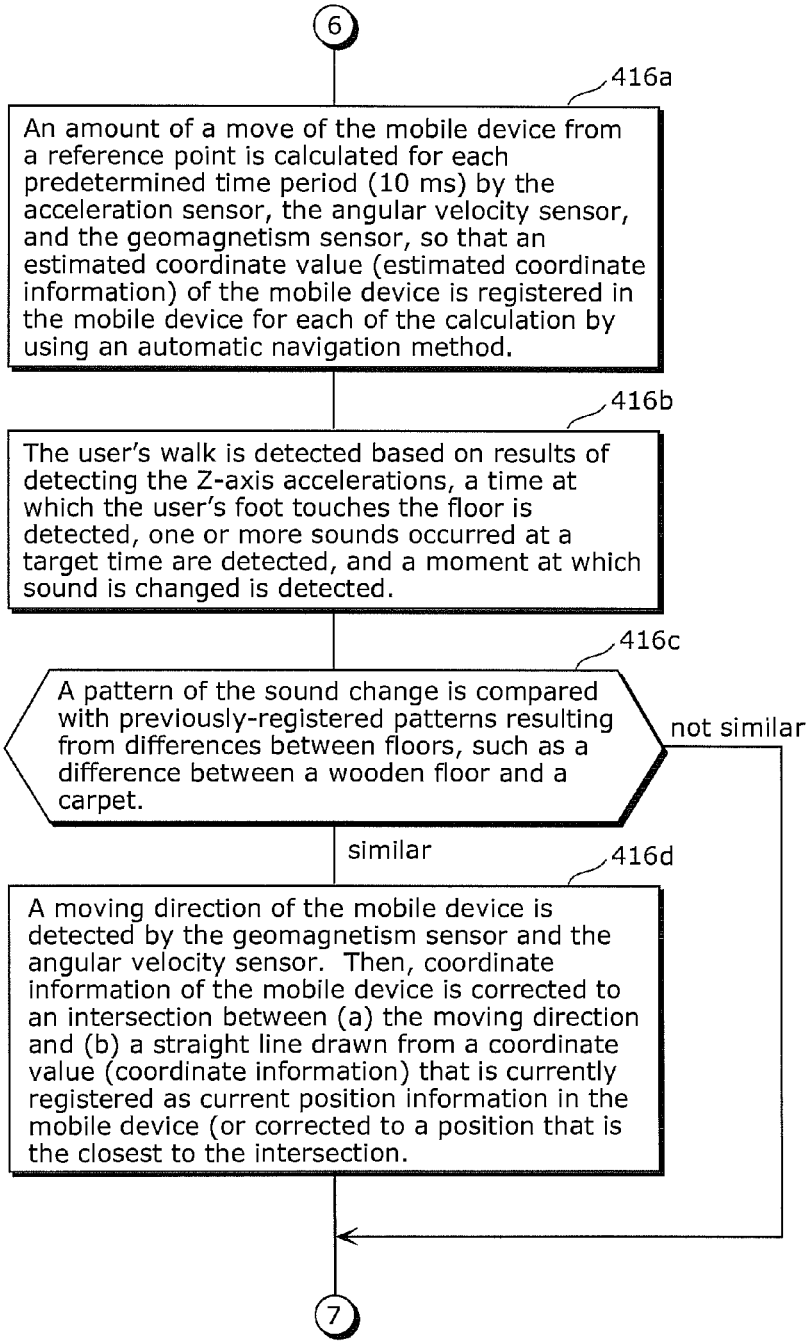

FIG. 241 is a flowchart of processing of determining a position of the mobile device in the building, according to the twenty-third embodiment of the present invention.

Figure 242:
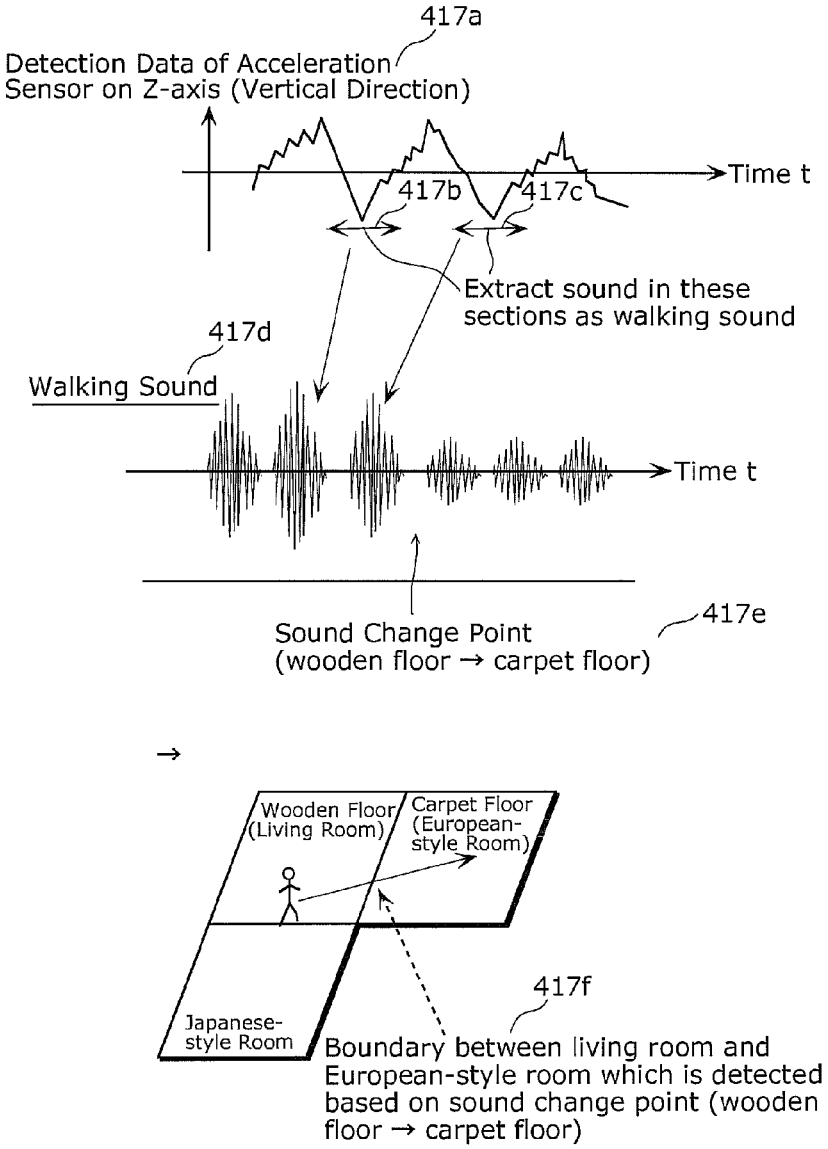

FIG. 242 shows graphs and a diagram for showing a relationship between detection data and walking sound in the acceleration Z-axis (vertical) direction, according to the twenty-third embodiment of the present invention.

Figure 243:
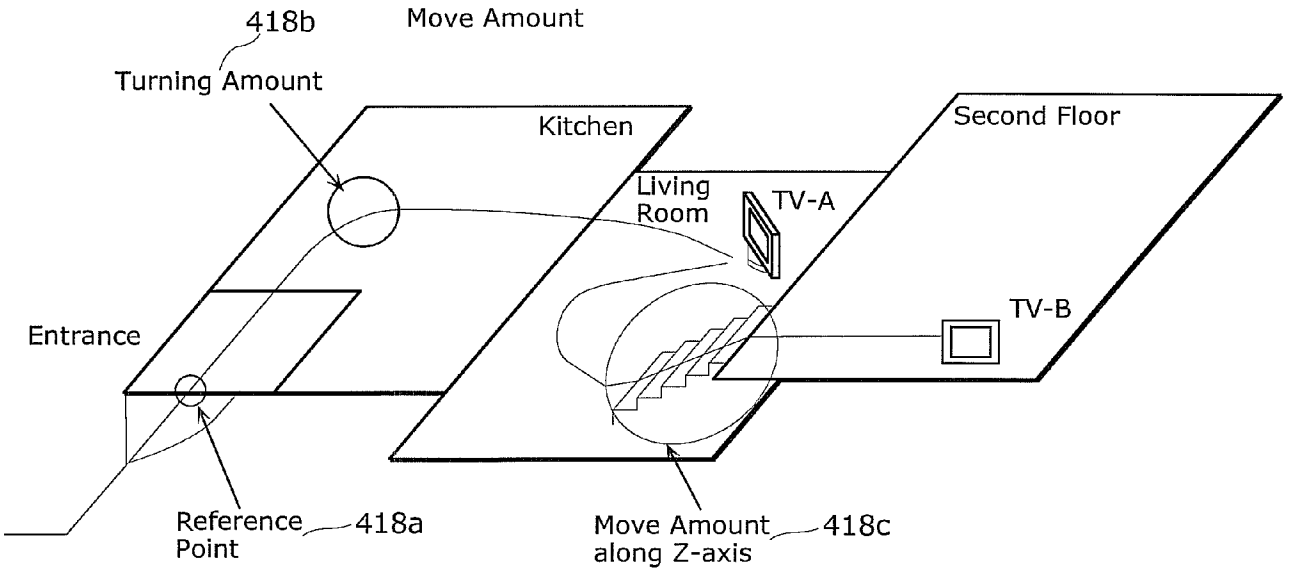

FIG. 243 shows a diagram showing an example of moves in the building, according to the twenty-third embodiment of the present invention.

FIG. 244 is a table indicating a path from a reference point to a next reference point, according to the twenty-third embodiment of the present invention.

Figure 245:
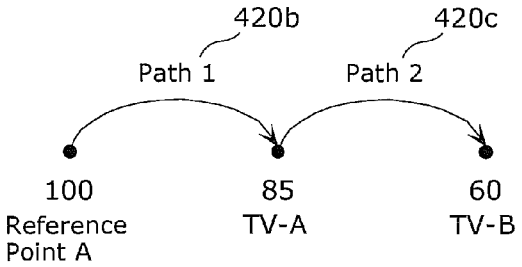

FIG. 245 shows a table and a diagram for explaining original reference point accuracy information, according to the twenty-third embodiment of the present invention.

Figure 246:
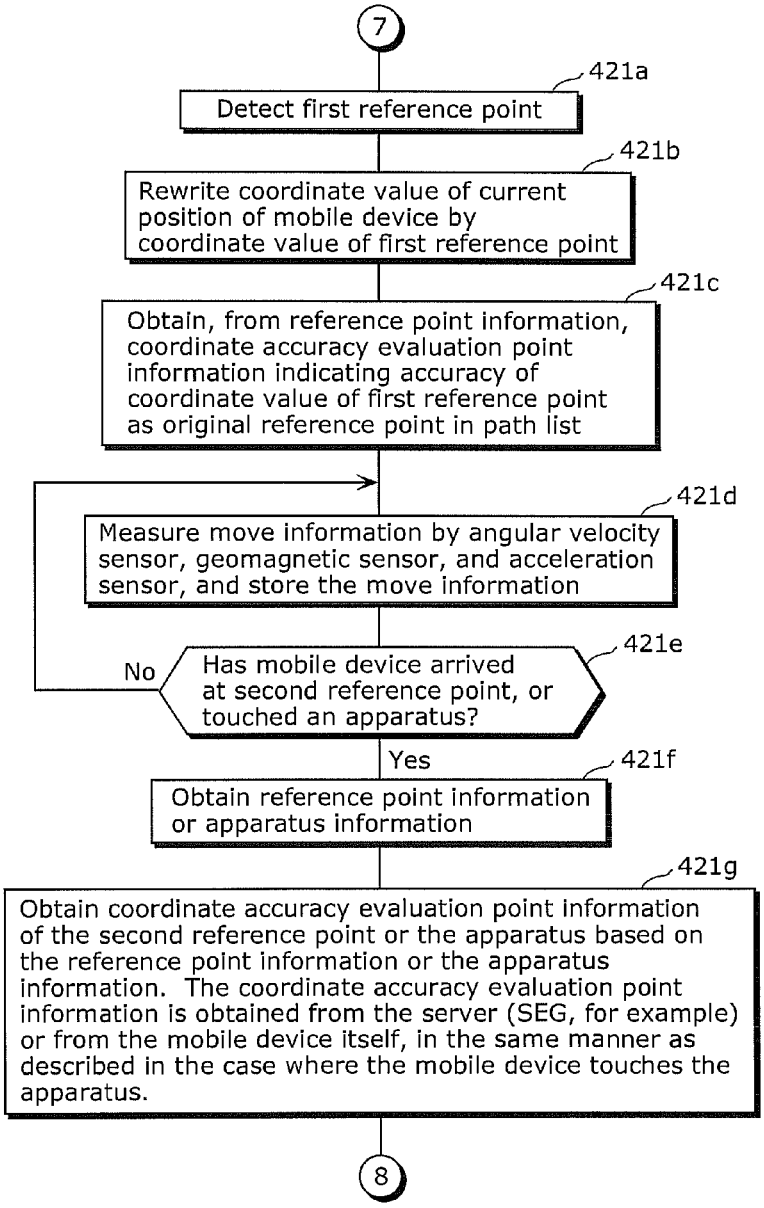

FIG. 246 is a flowchart of processing of determining a position of the mobile device in the building, according to the twenty-third embodiment of the present invention.

Figure 247:
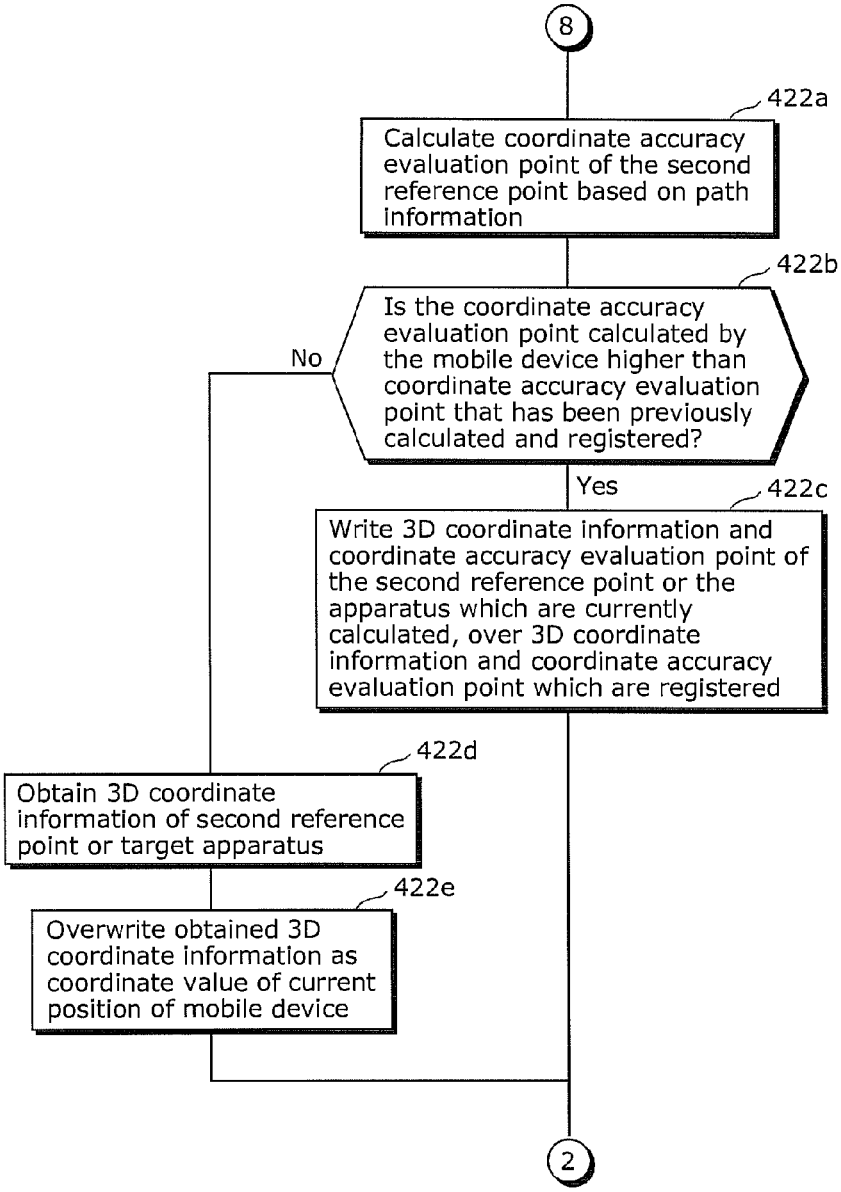

FIG. 247 is a flowchart of processing of determining a position of the mobile device in the building, according to the twenty-third embodiment of the present invention.

Figure 248:
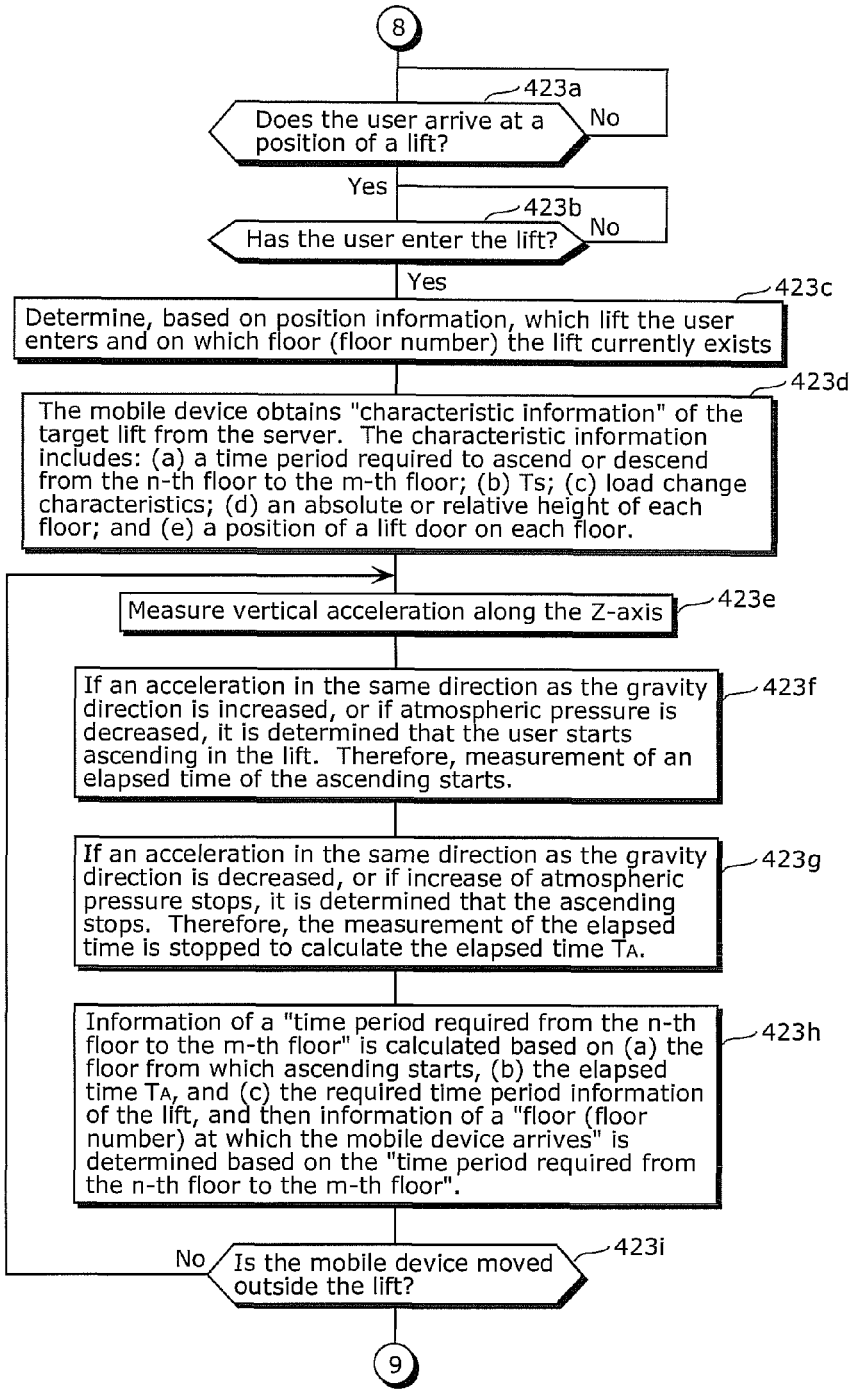

FIG. 248 is a flowchart of processing of determining a position of the mobile device in the building, according to the twenty-third embodiment of the present invention.

Figure 249:
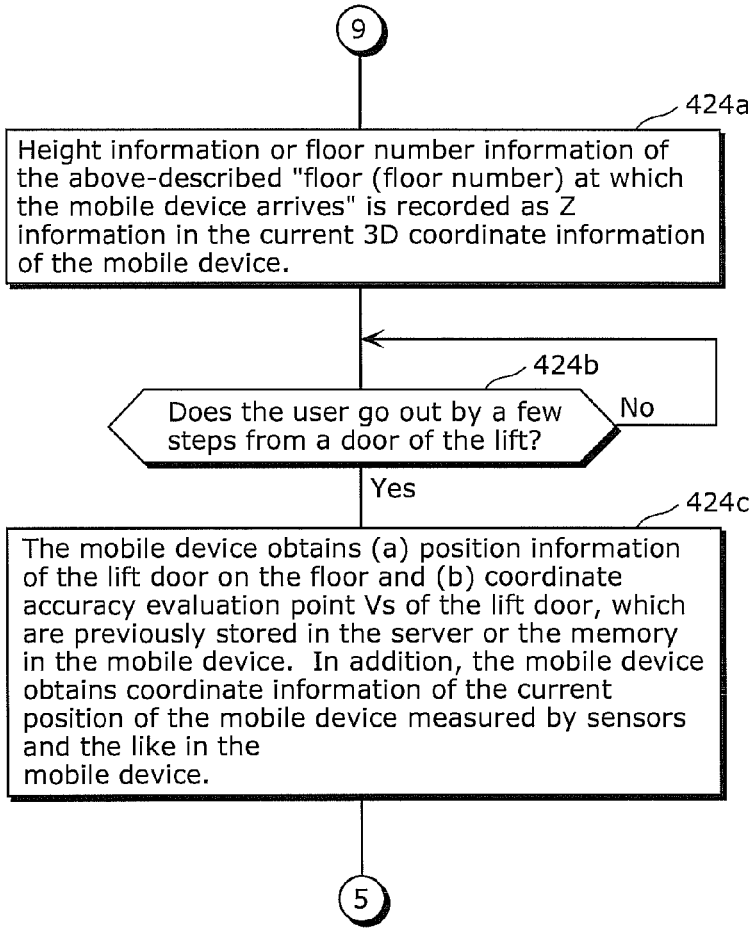

FIG. 249 is a flowchart of processing of determining a position of the mobile device in the building, according to the twenty-third embodiment of the present invention.

Figure 250:
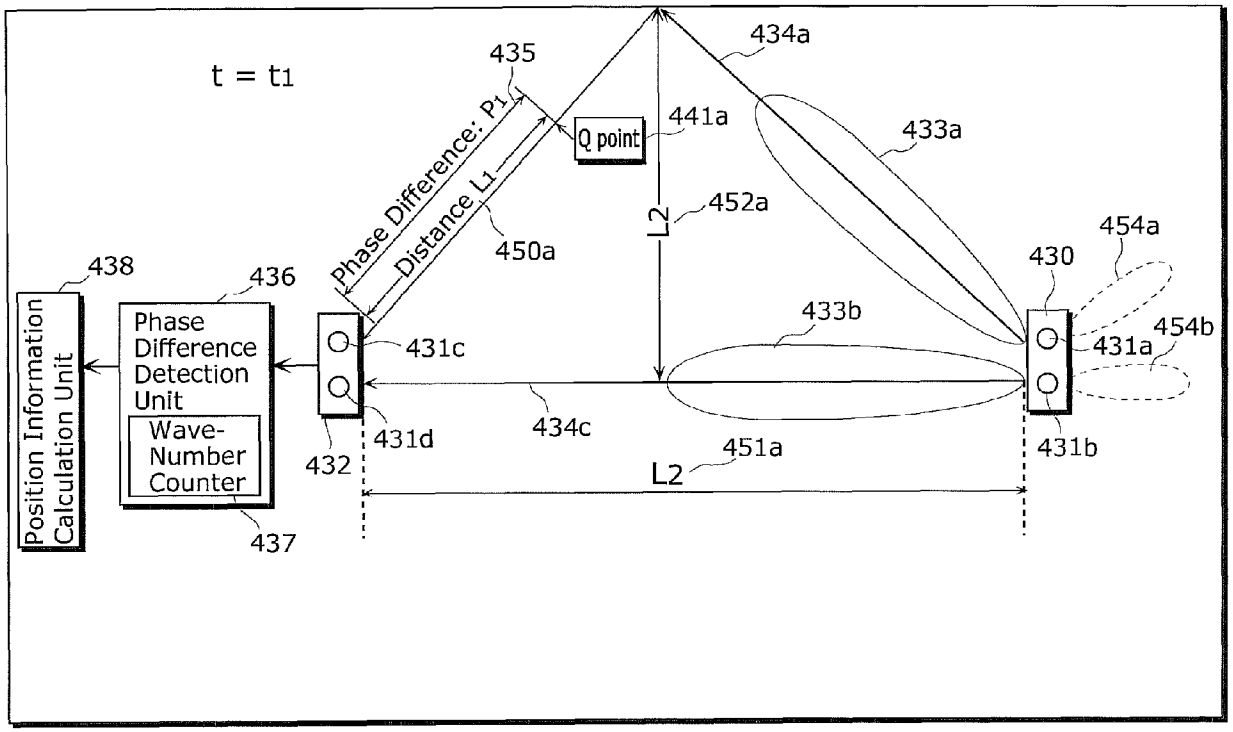

FIG. 250 is a diagram showing the principal of position determination, according to the twenty-third embodiment of the present invention.

Figure 251:
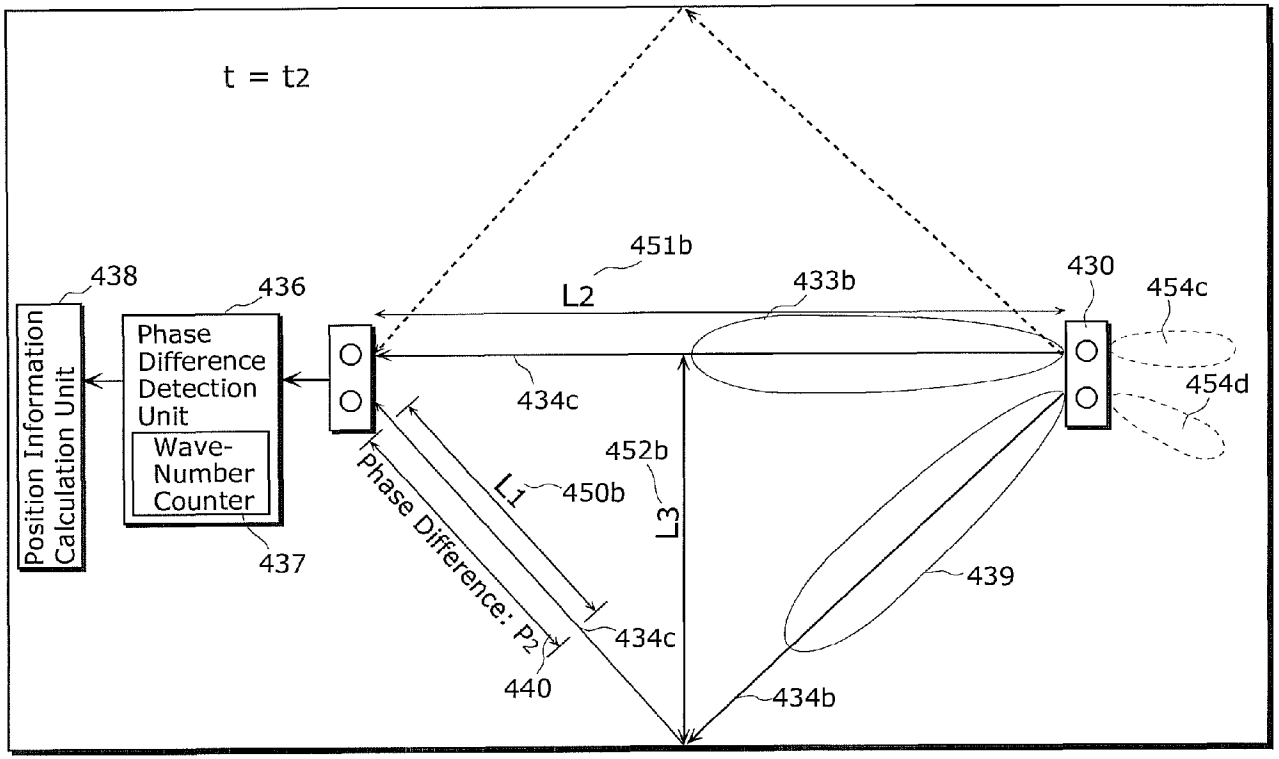

FIG. 251 is a diagram showing the principal of position determination, according to the twenty-third embodiment of the present invention.

Figure 252:
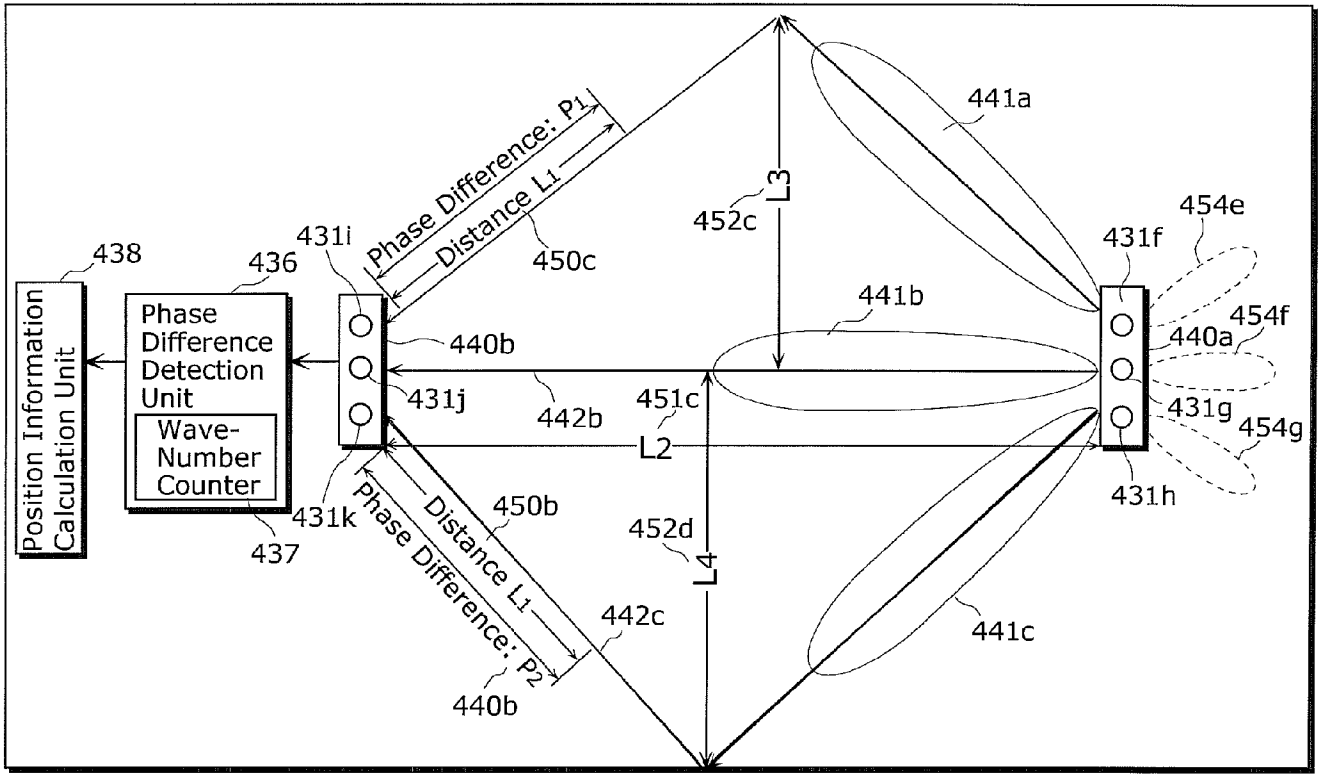

FIG. 252 is a diagram showing the principal of position determination, according to the twenty-third embodiment of the present invention.

Figure 253:
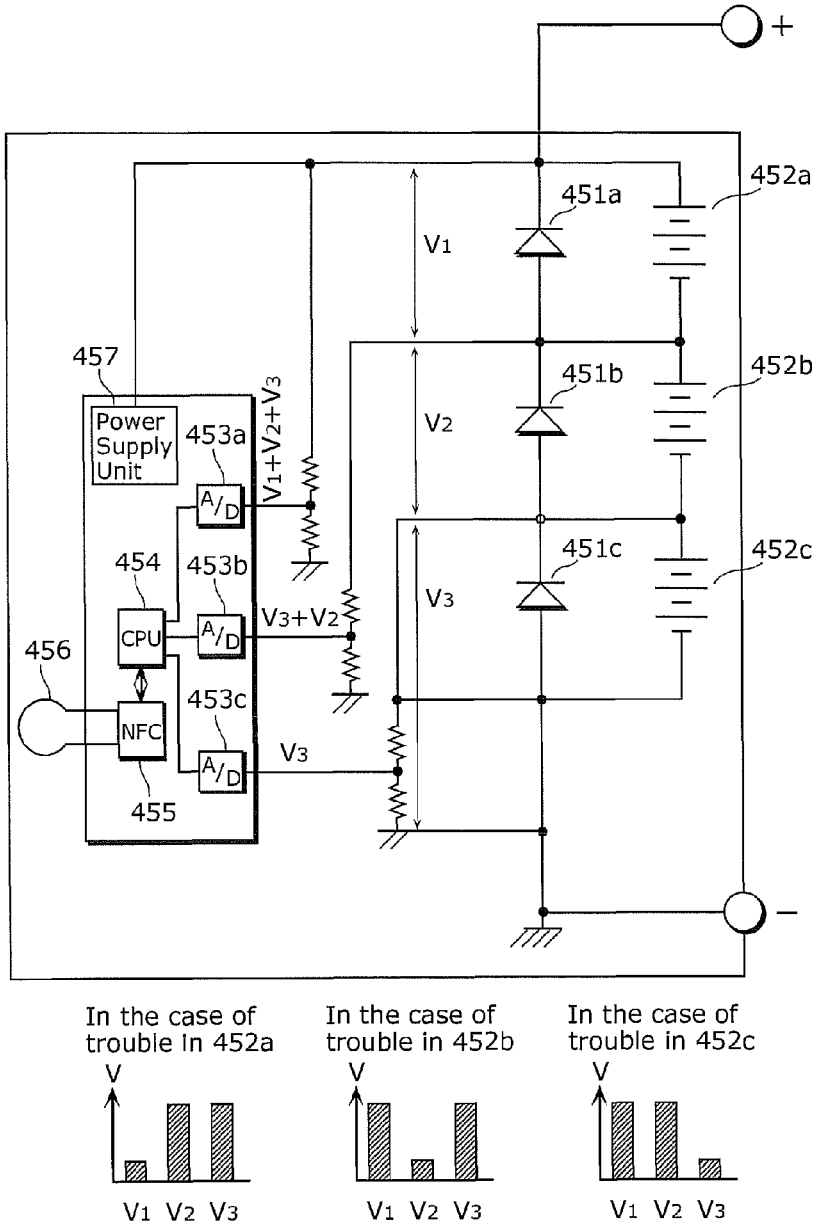

FIG. 253 is a circuit diagram of a solar cell according to the twenty-third embodiment of the present invention.

Figure 254:
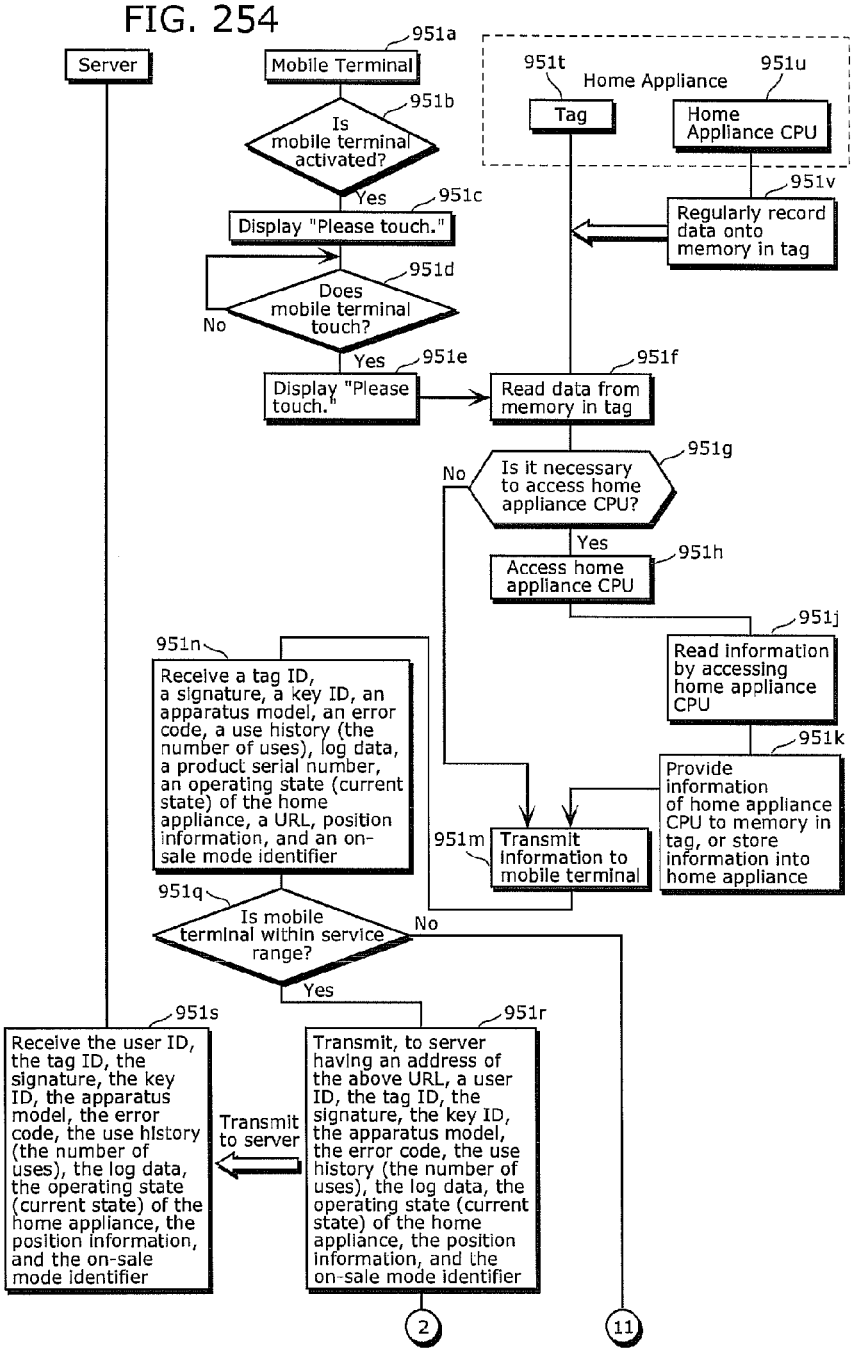

FIG. 254 is a flowchart according to a twenty-fourth embodiment of the present invention.

Figure 255:
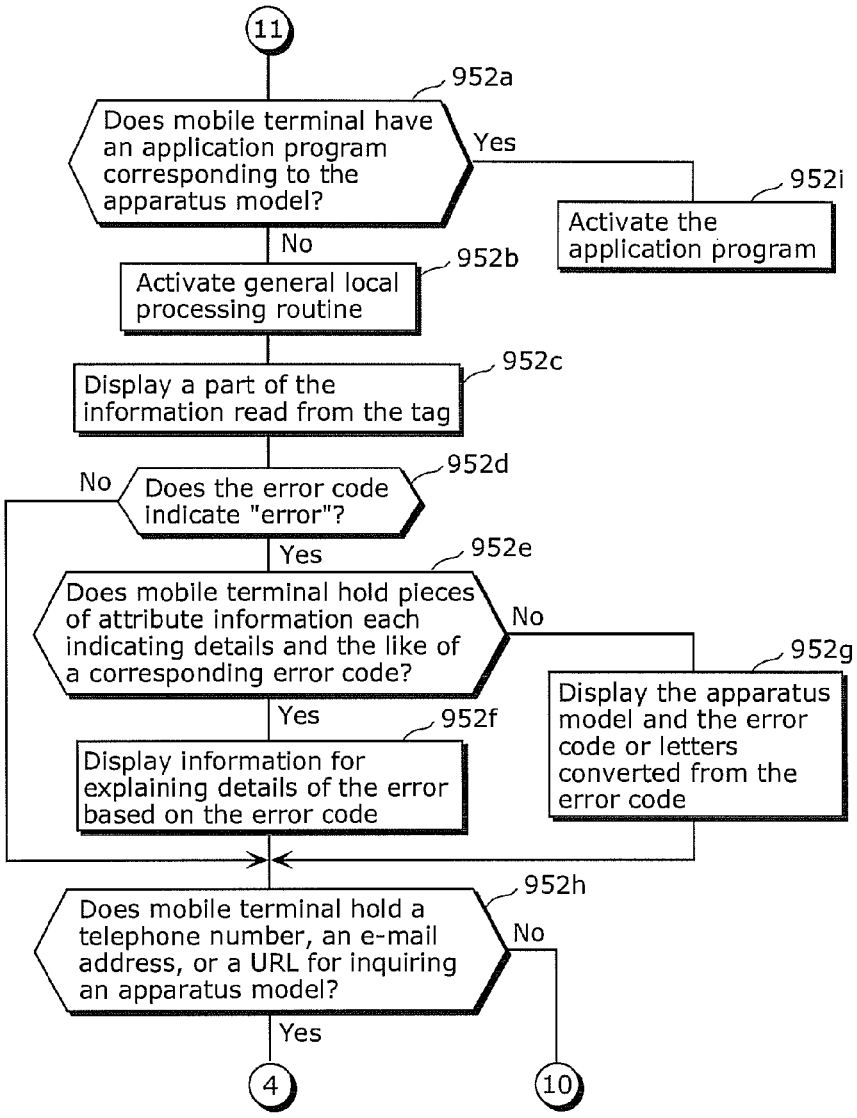

FIG. 255 is a flowchart according to the twenty-fourth embodiment of the present invention.

Figure 256:
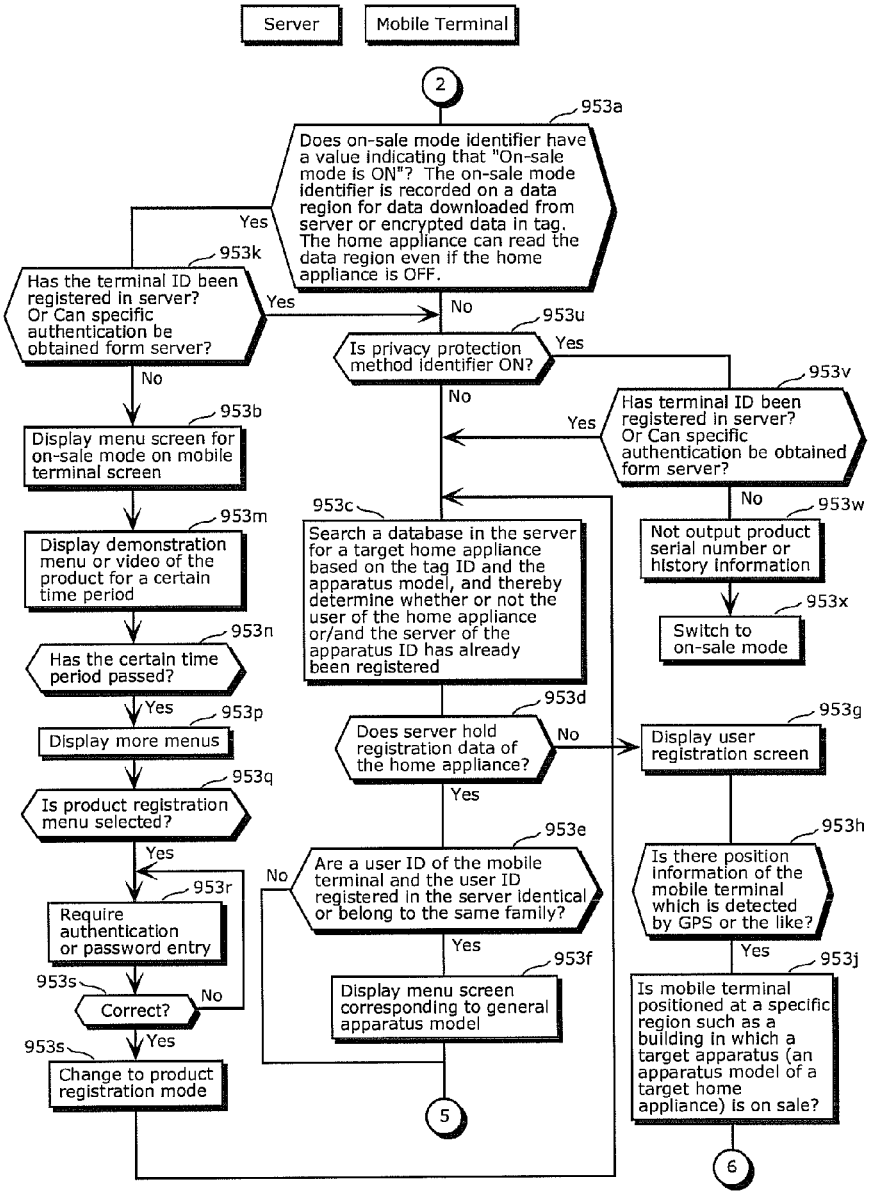

FIG. 256 is a flowchart according to the twenty-fourth embodiment of the present invention.

Figure 257:
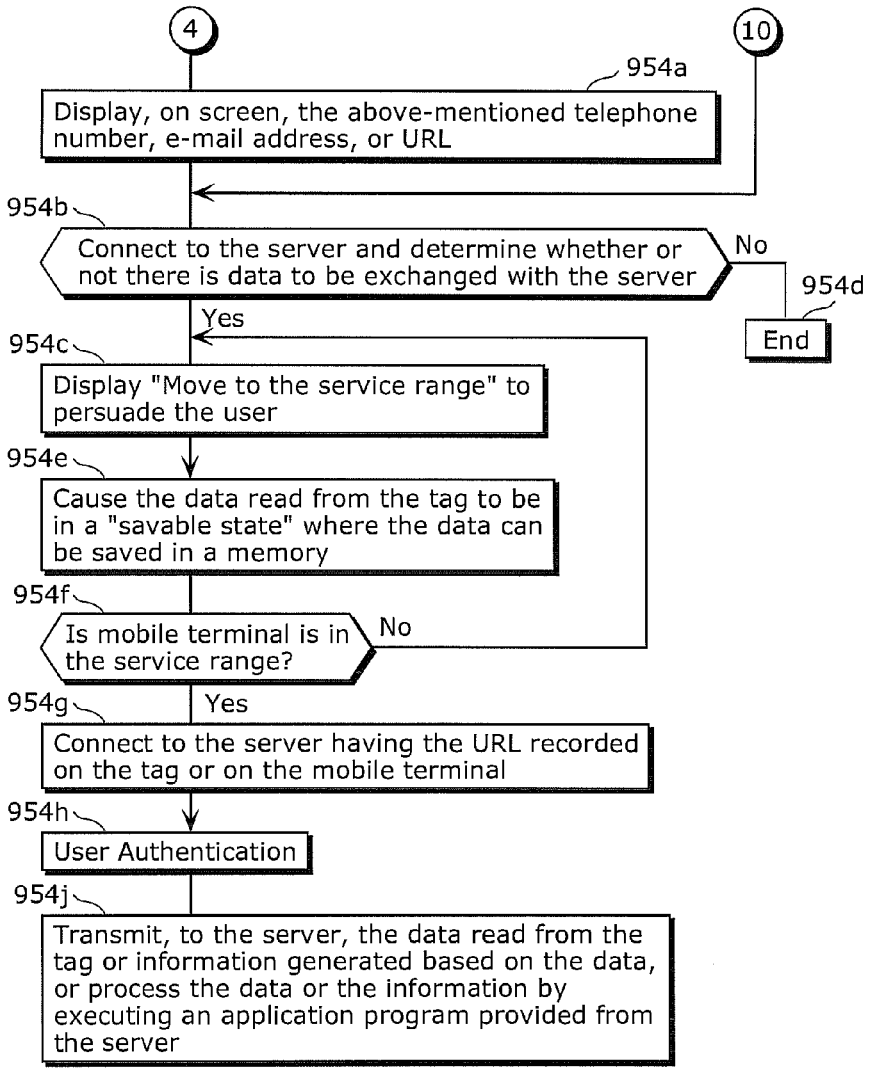

FIG. 257 is a flowchart according to the twenty-fourth embodiment of the present invention.

Figure 258:
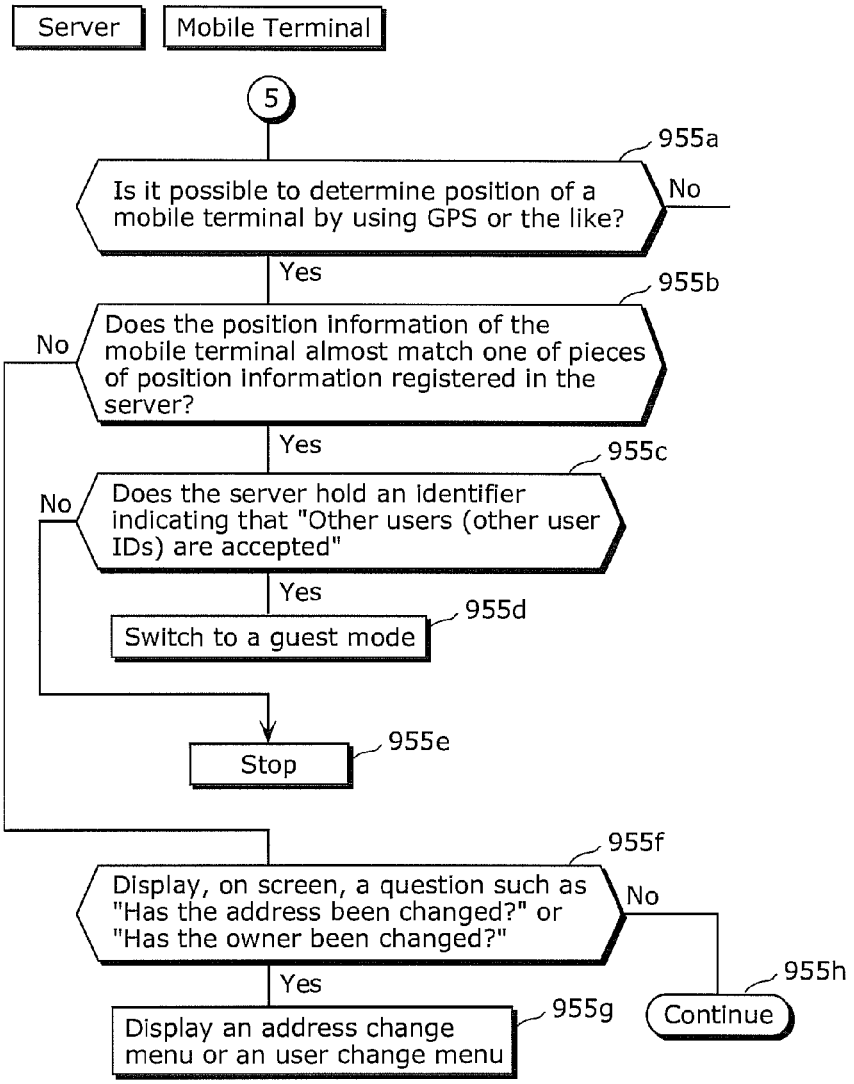

FIG. 258 is a flowchart according to the twenty-fourth embodiment of the present invention.

Figure 259:
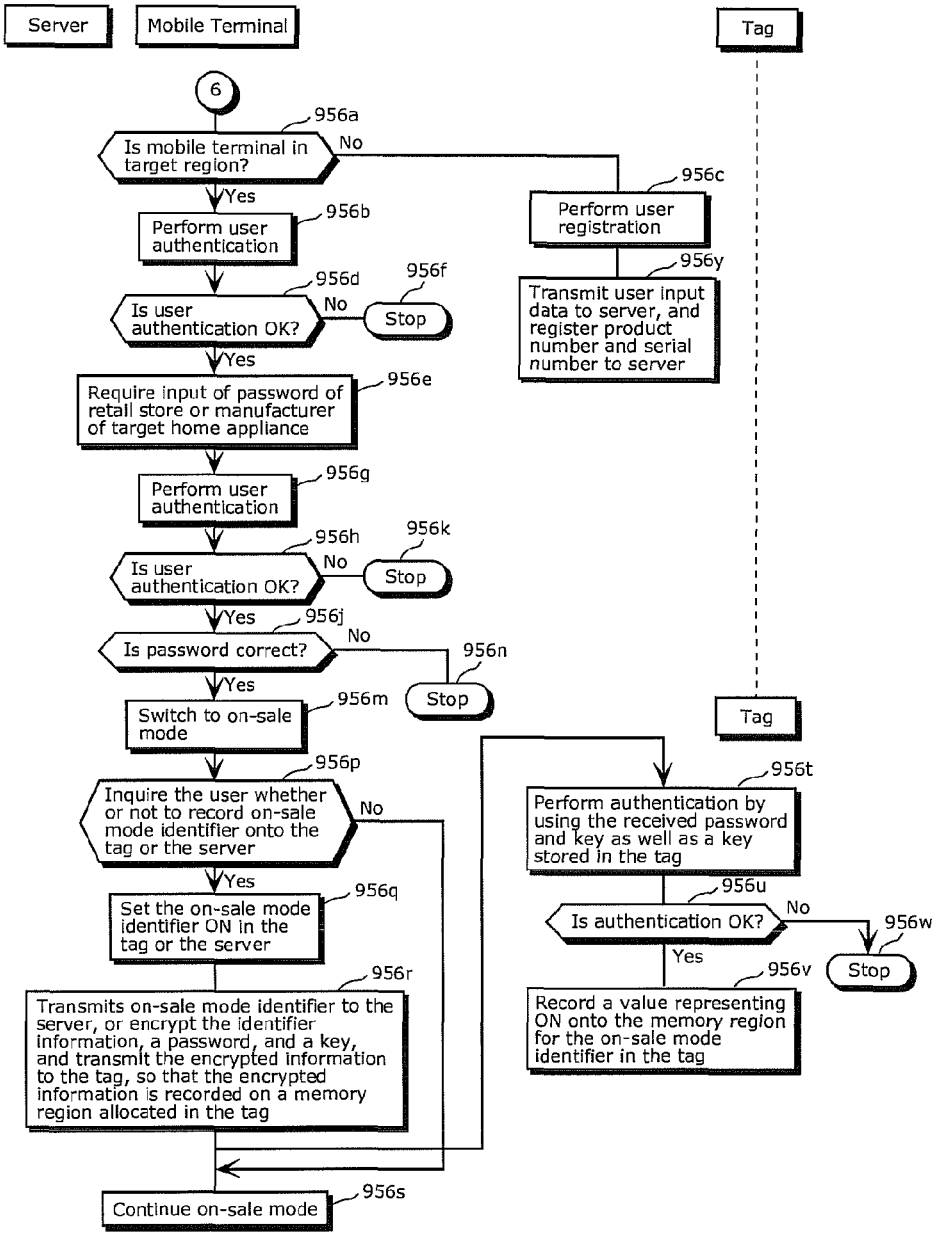

FIG. 259 is a flowchart according to the twenty-fourth embodiment of the present invention.

FIG. 260 is a table indicating information recorded on a tag, according to the twenty-fourth embodiment of the present invention.

Figure 261:
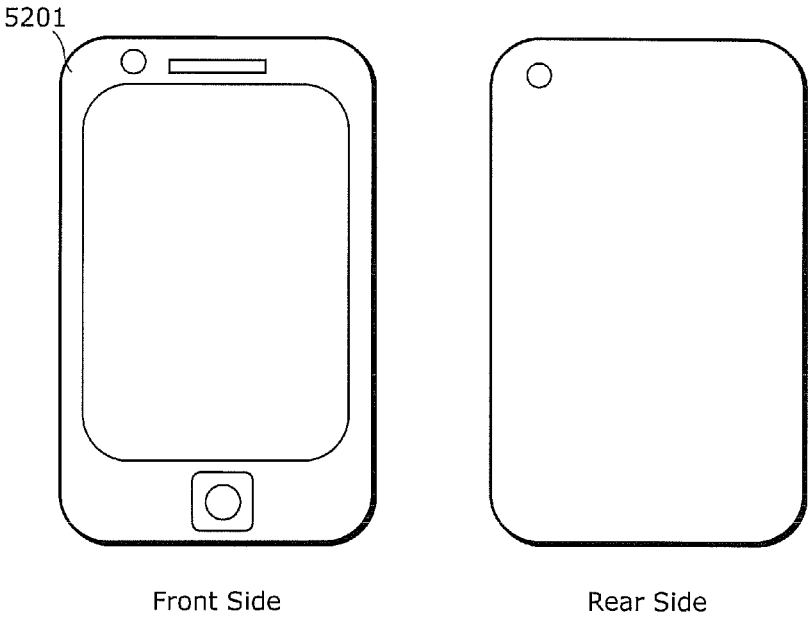

FIG. 261 is a diagram of a mobile terminal according to a twenty-fifth embodiment of the present invention.

Figure 262:
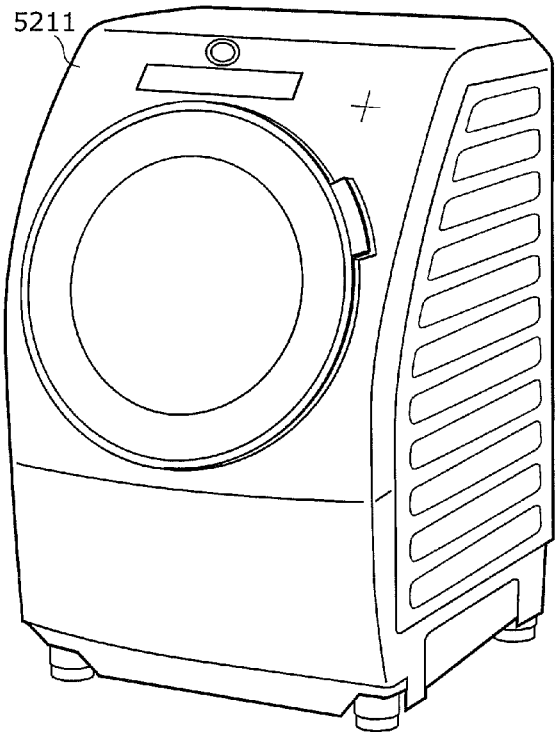

FIG. 262 is a diagram of a home appliance according to the twenty-fifth embodiment of the present invention.

Figure 263:
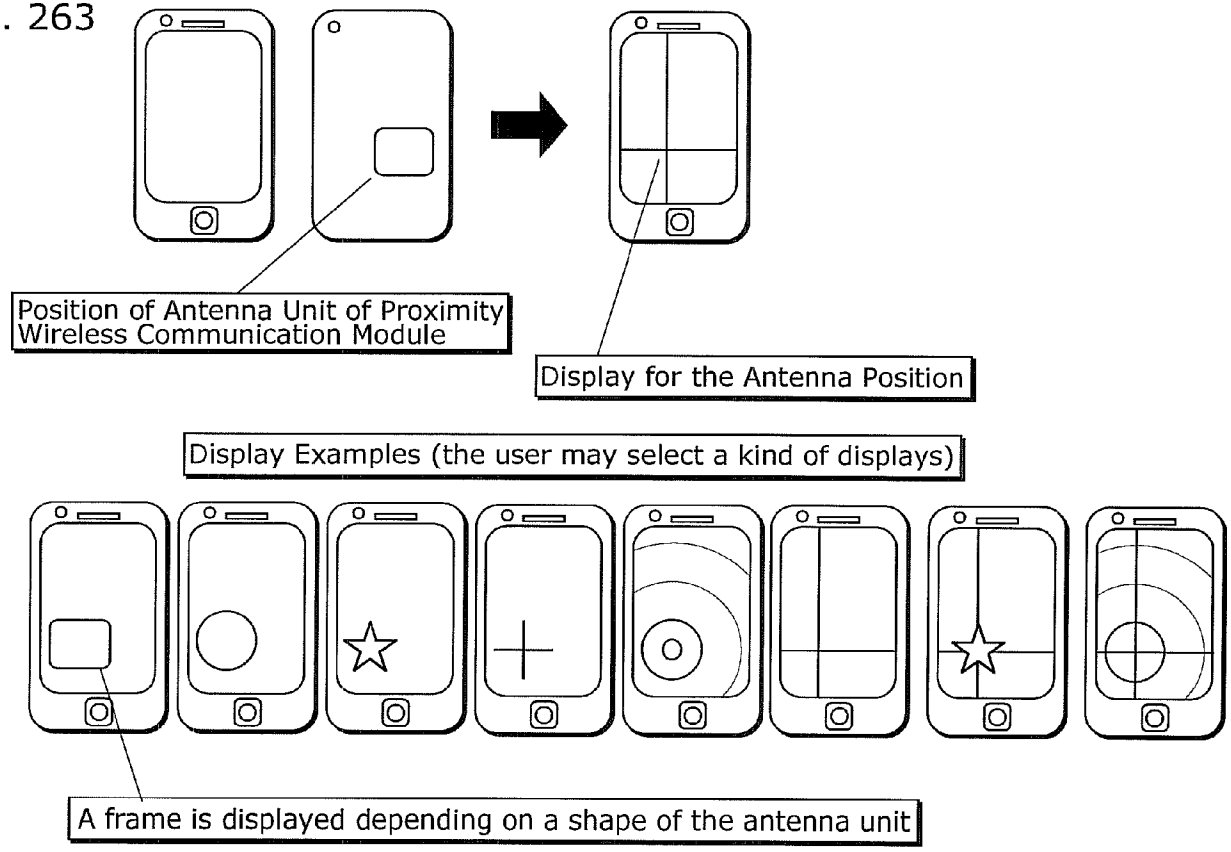

FIG. 263 is a diagram of display states of a module position of the mobile terminal according to the twenty-fifth embodiment of the present invention.

Figure 264:
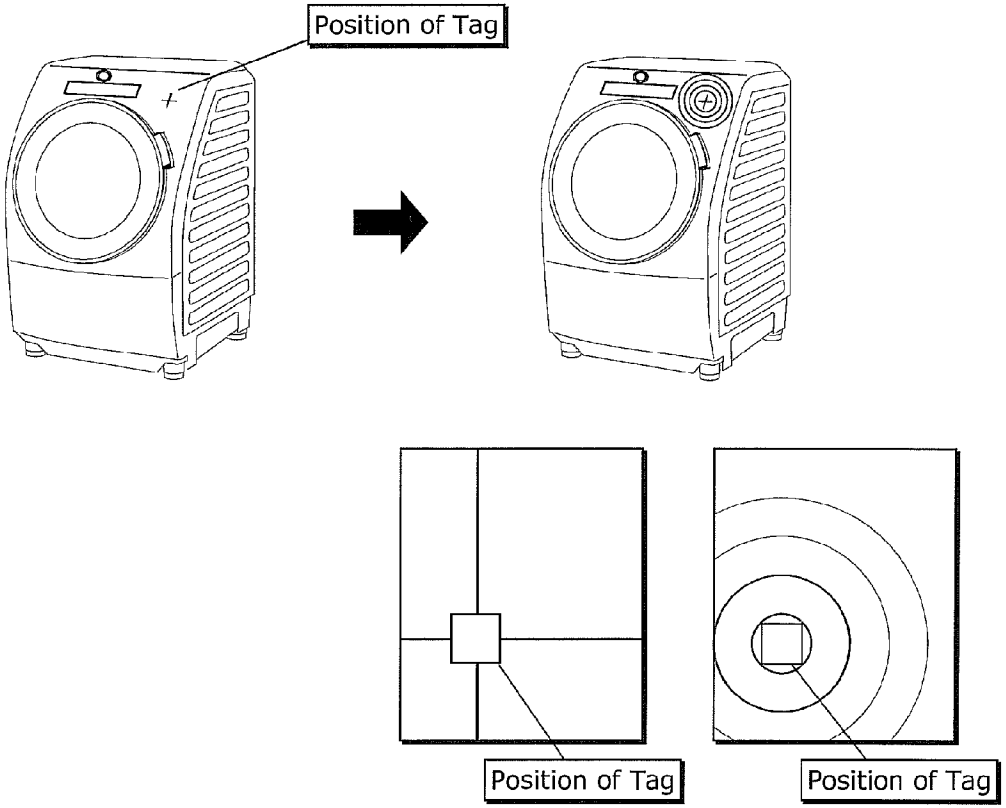

FIG. 264 is a diagram of display states of a module position of the mobile terminal according to the twenty-fifth embodiment of the present invention.

Figure 265:
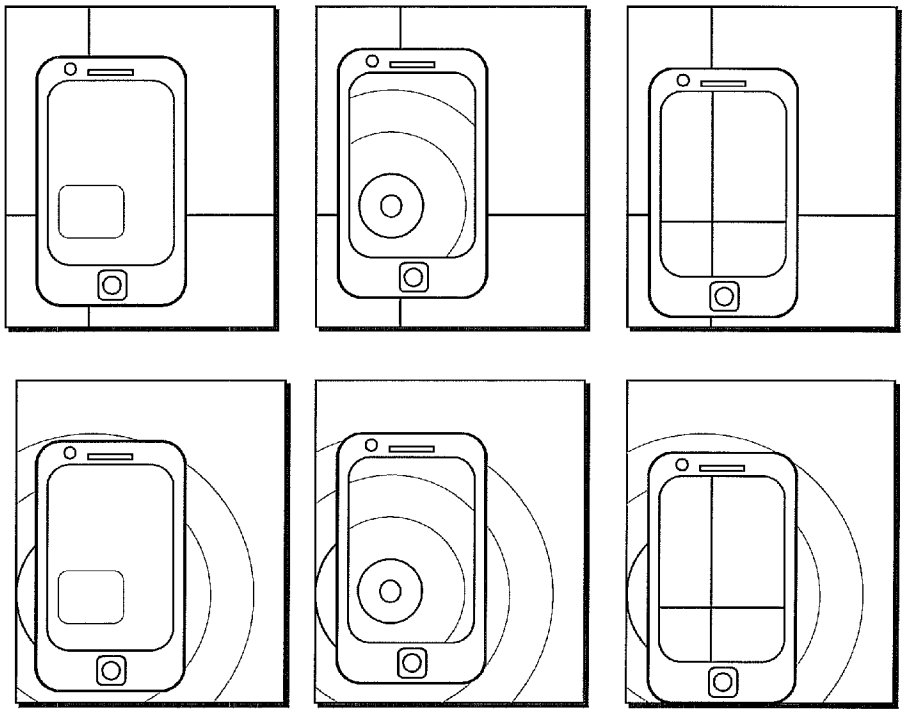

FIG. 265 is a diagram showing proximity wireless communication states of the mobile terminal and the home appliance, according to the twenty-fifth embodiment of the present invention.

FIG. 266 is a diagram showing the situation where proximity wireless communication mark is cooperated with an acceleration meter and a gyro, according to the twenty-fifth embodiment of the present invention.

Figure 267:
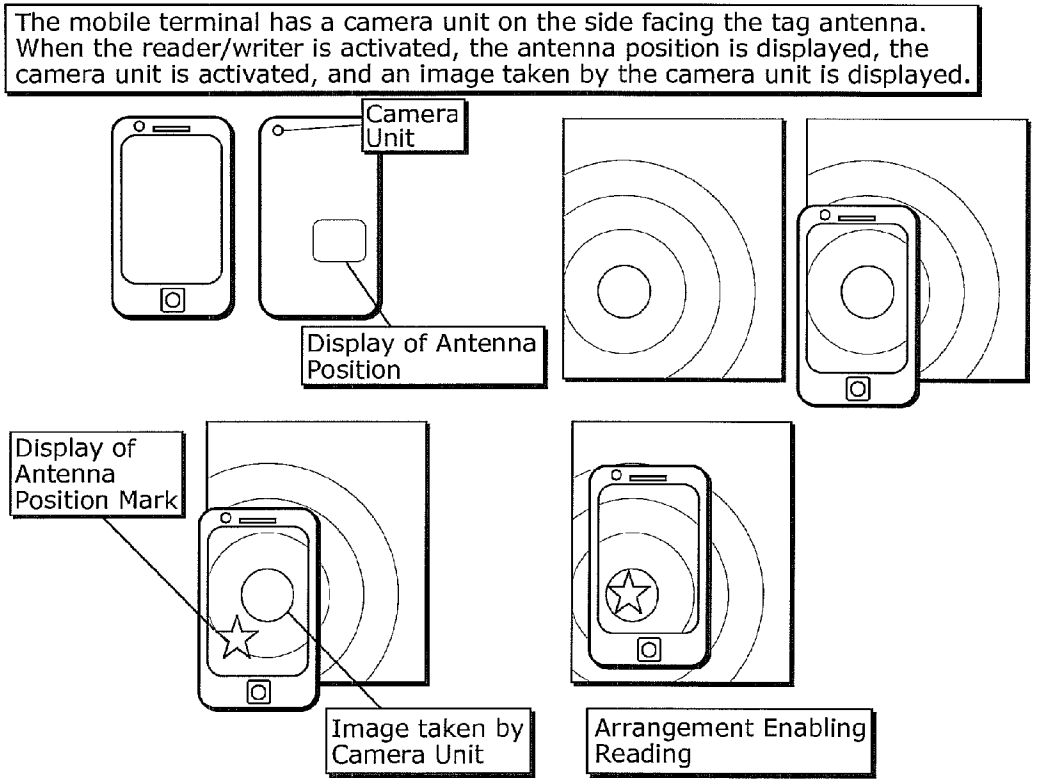

FIG. 267 is a diagram showing the situation where proximity wireless communication mark is cooperated with a camera, according to the twenty-fifth embodiment of the present invention.

Figure 268:
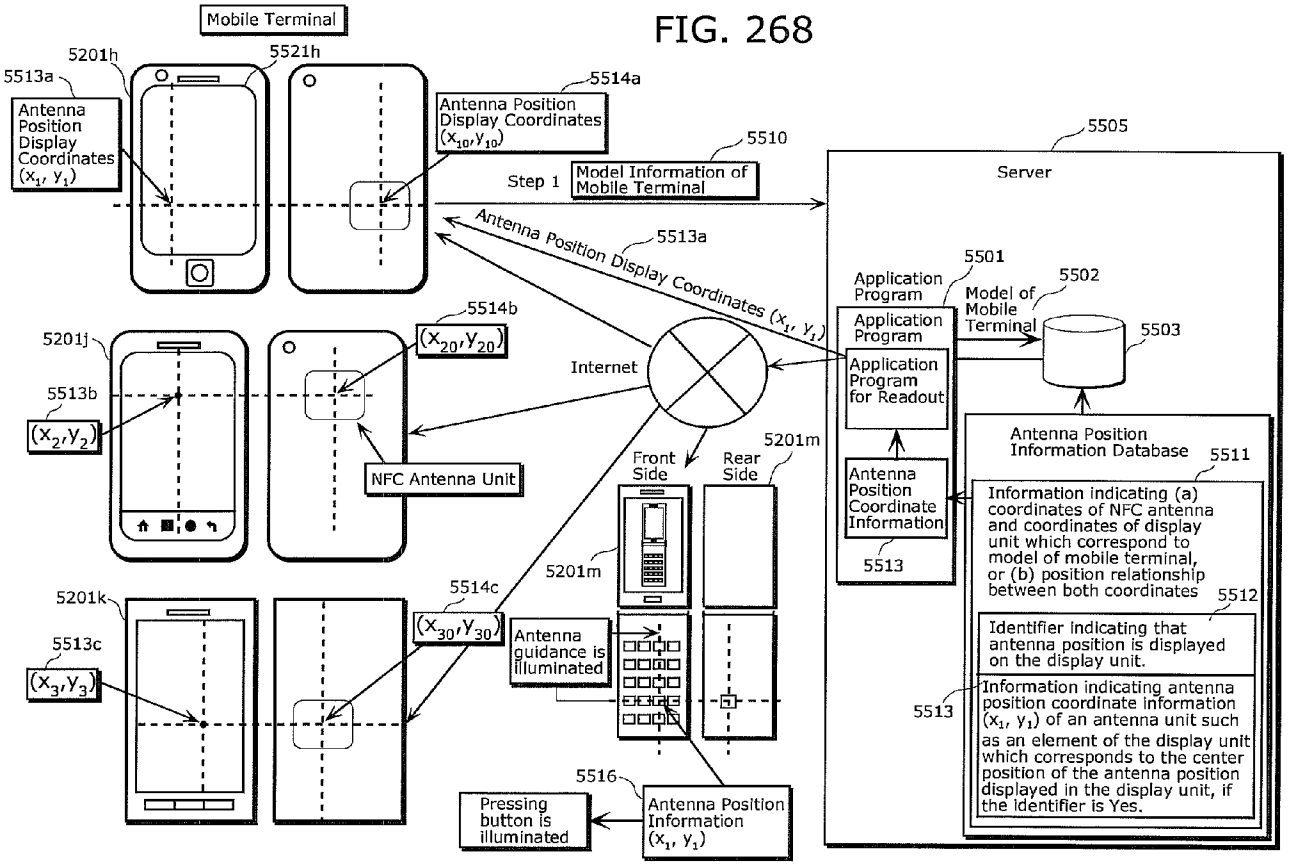

FIG. 268 is a diagram showing the situation where an application program is downloaded from a server, according to the twenty-fifth embodiment of the present invention.

Figure 269:
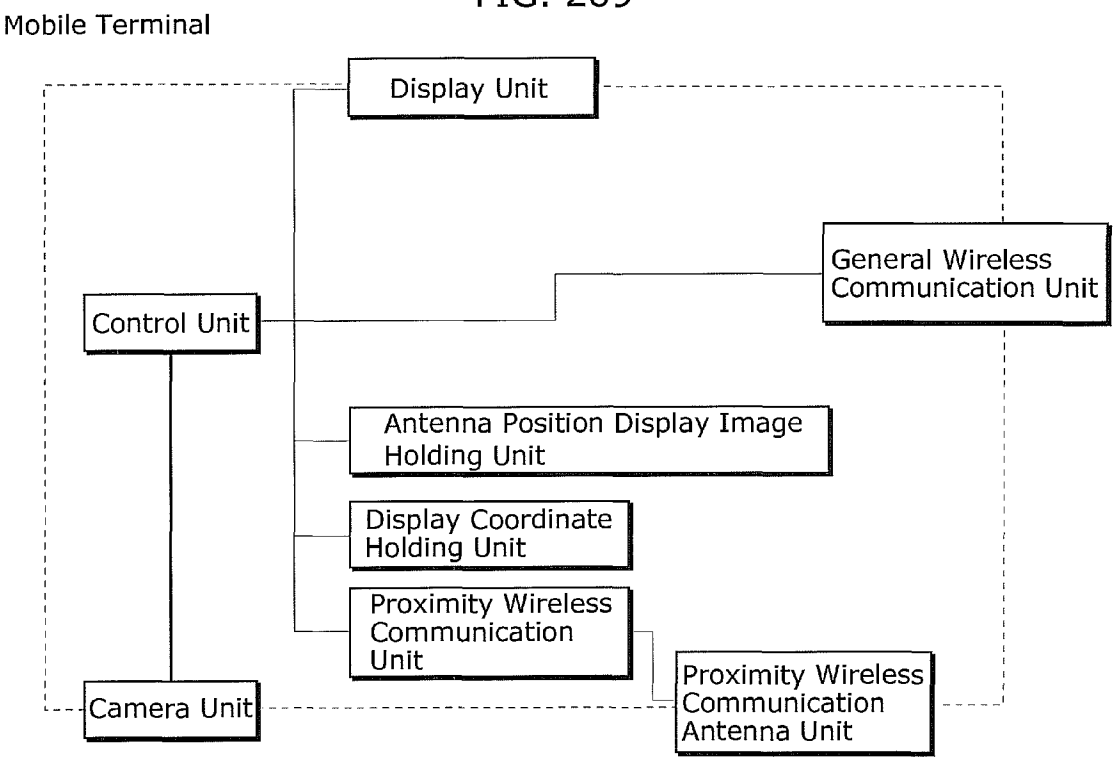

FIG. 269 is a functional block diagram according to the twenty-fifth embodiment of the present invention.

Figure 270:
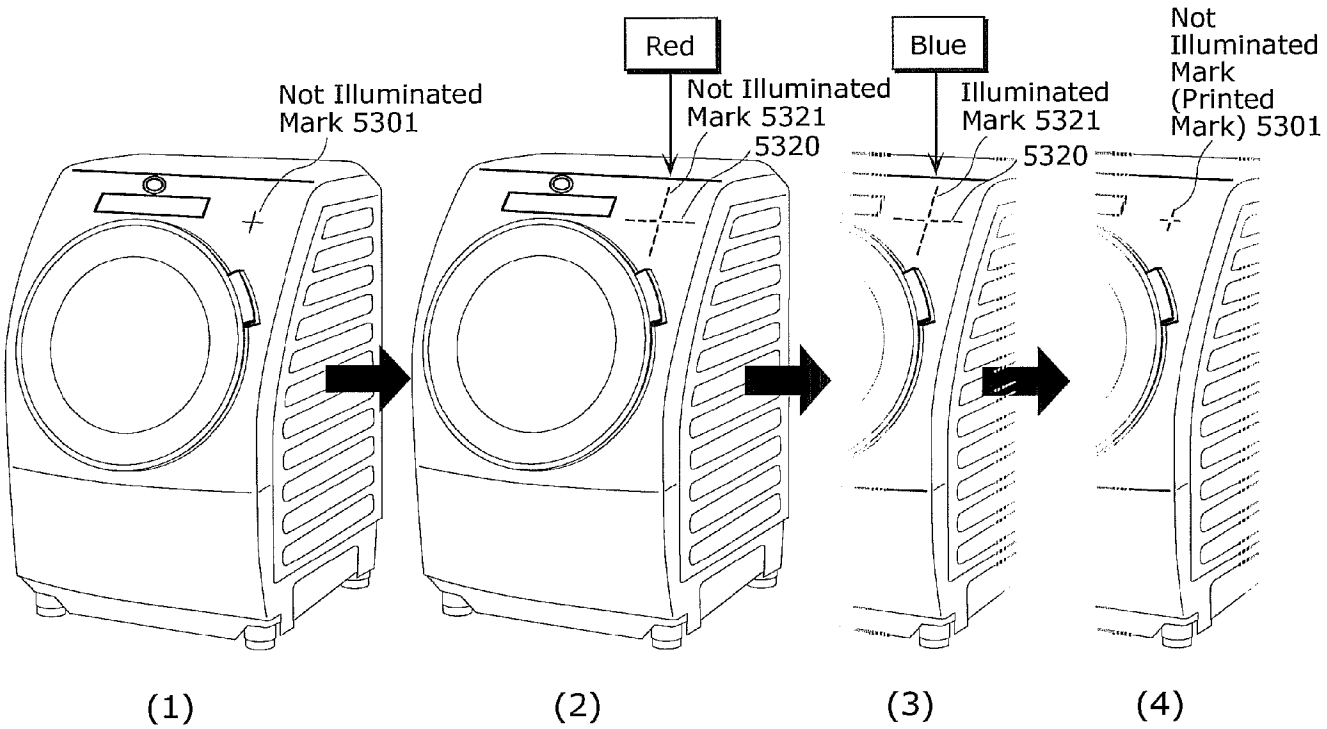

FIG. 270 is a diagram of state changes in the case where a trouble occurs in a home appliance, according to the twenty-fifth embodiment of the present invention.

Figure 271:
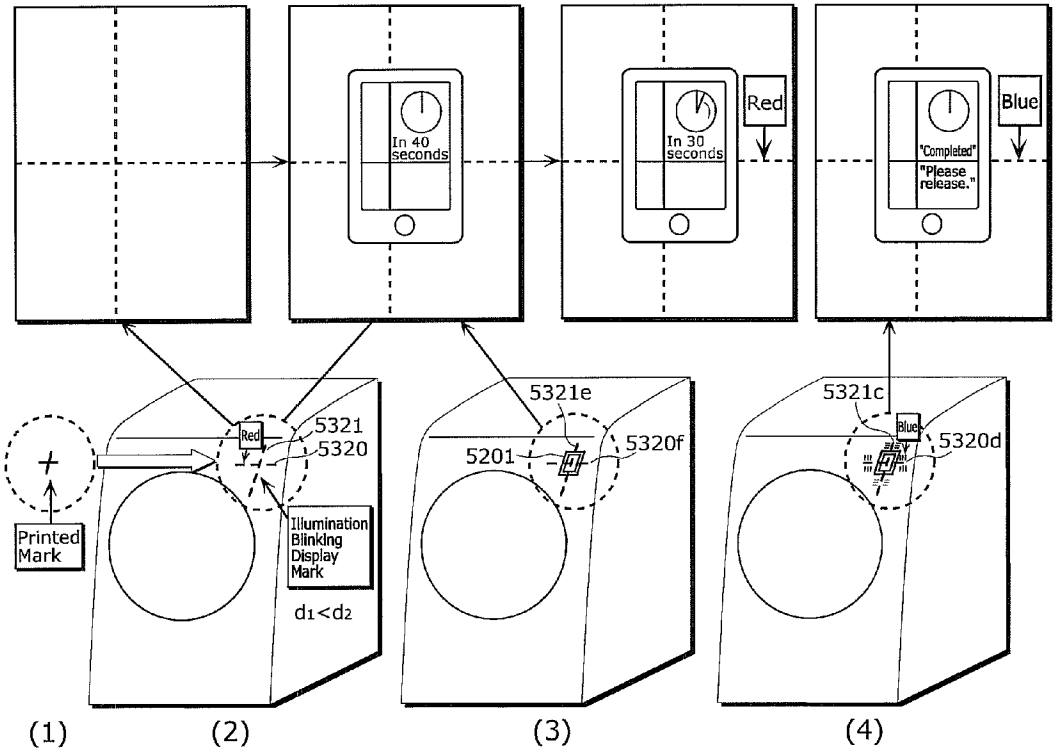

FIG. 271 is a diagram of state changes in the case where the home appliance performs communication for a long time, according to the twenty-fifth embodiment of the present invention.

Figure 272:
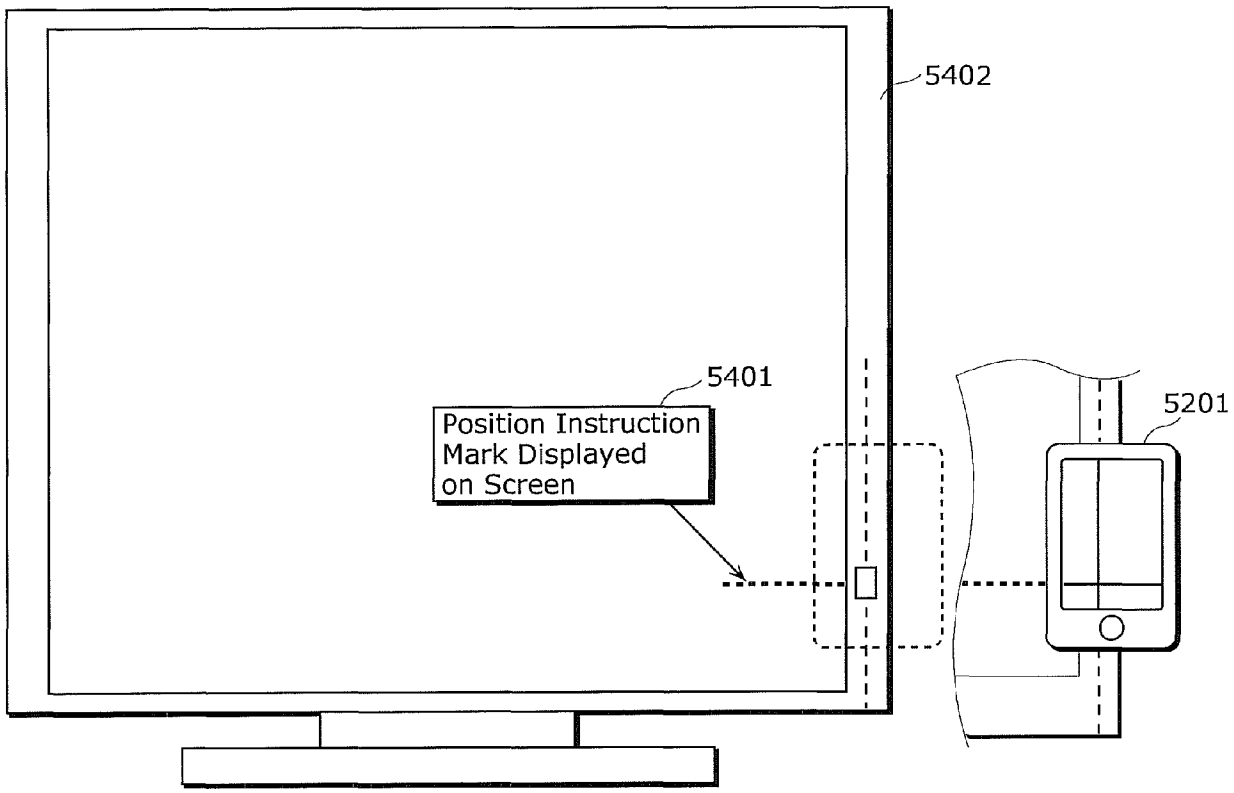

FIG. 272 is a diagram of a home appliance having a display screen according to the twenty-fifth embodiment of the present invention.

Figure 273:
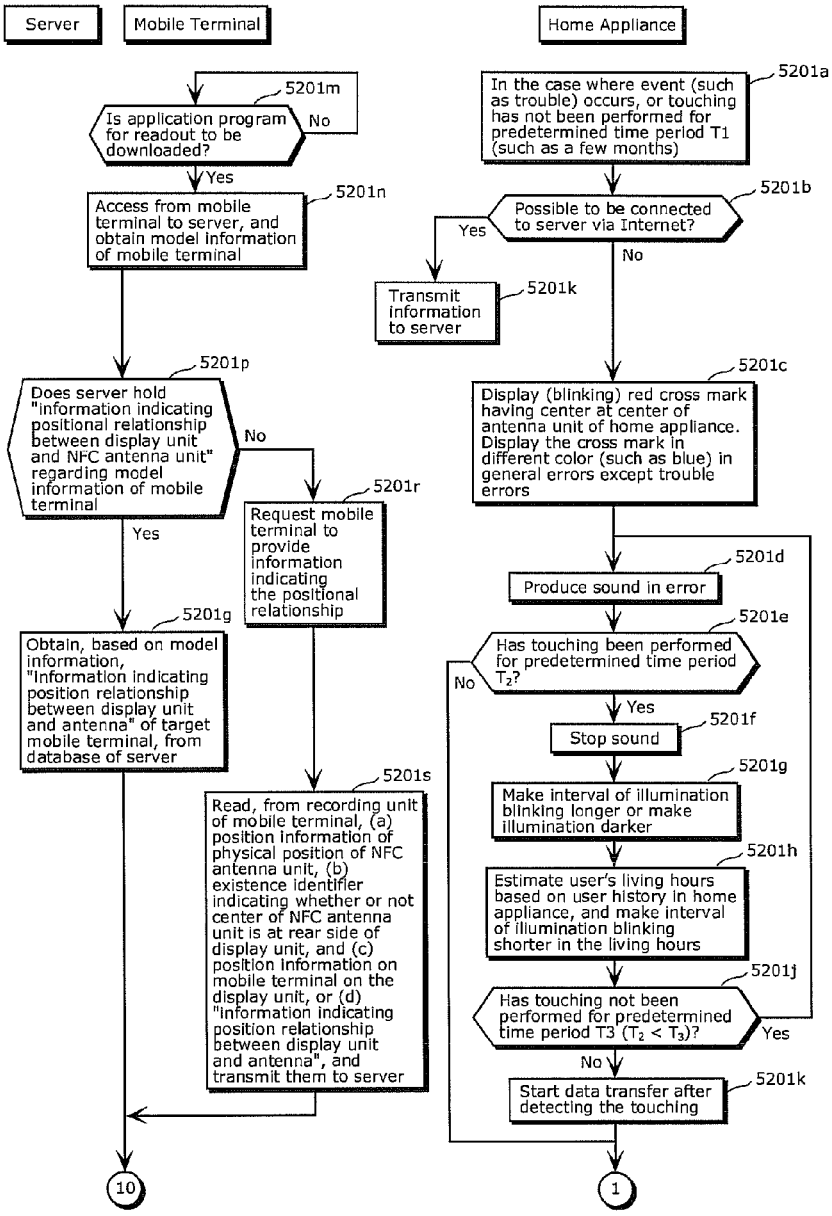

FIG. 273 is flowchart 1 according to the twenty-fifth embodiment of the present invention.

Figure 274:
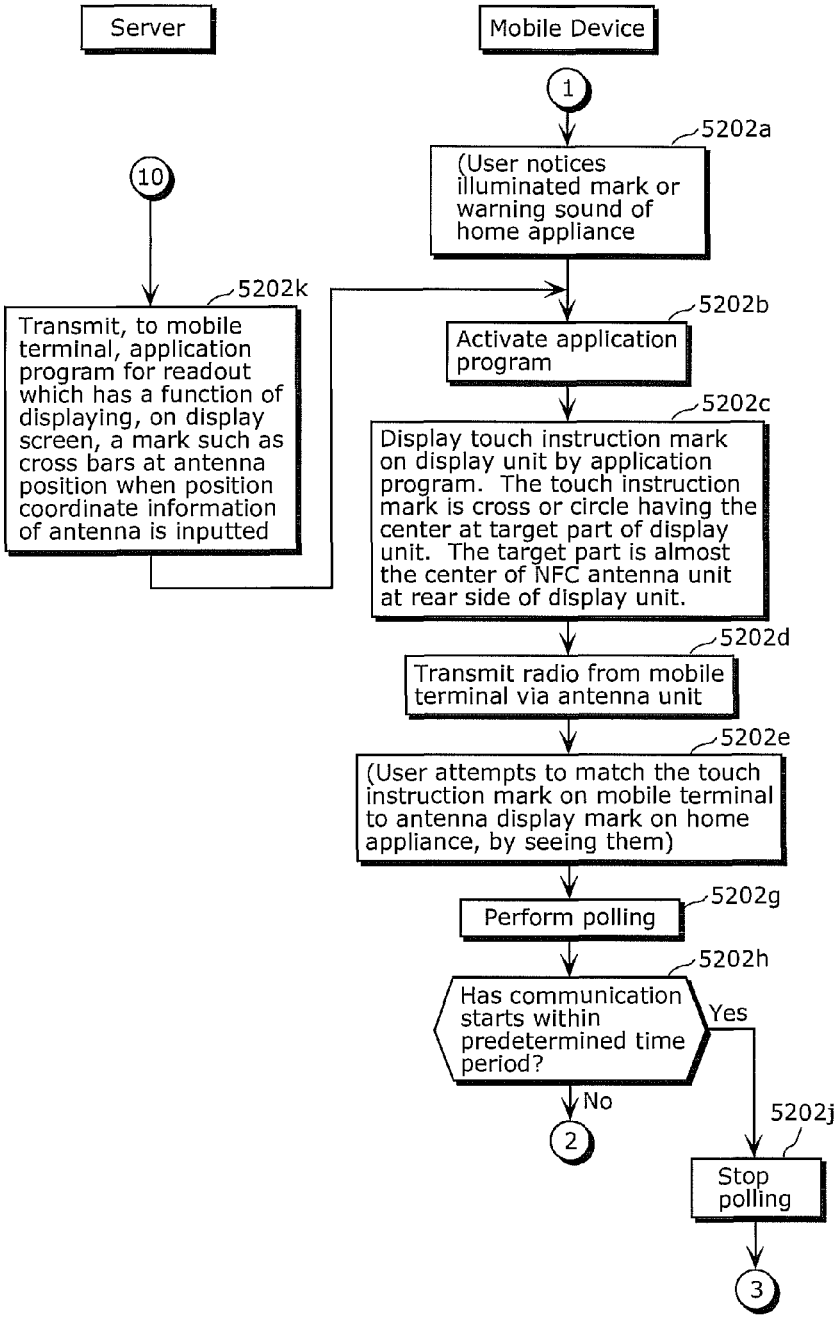

FIG. 274 is flowchart 2 according to the twenty-fifth embodiment of the present invention.

Figure 275:
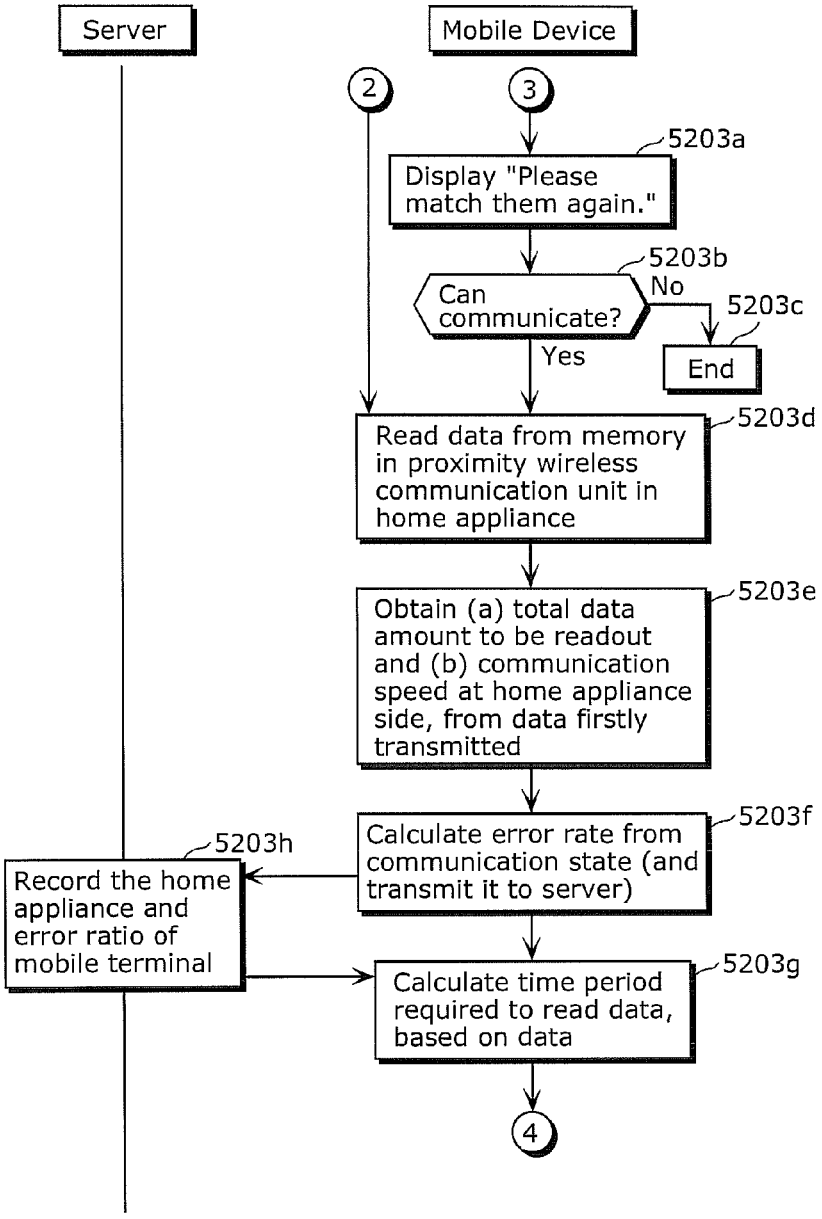

FIG. 275 is flowchart 3 according to the twenty-fifth embodiment of the present invention.

Figure 276:
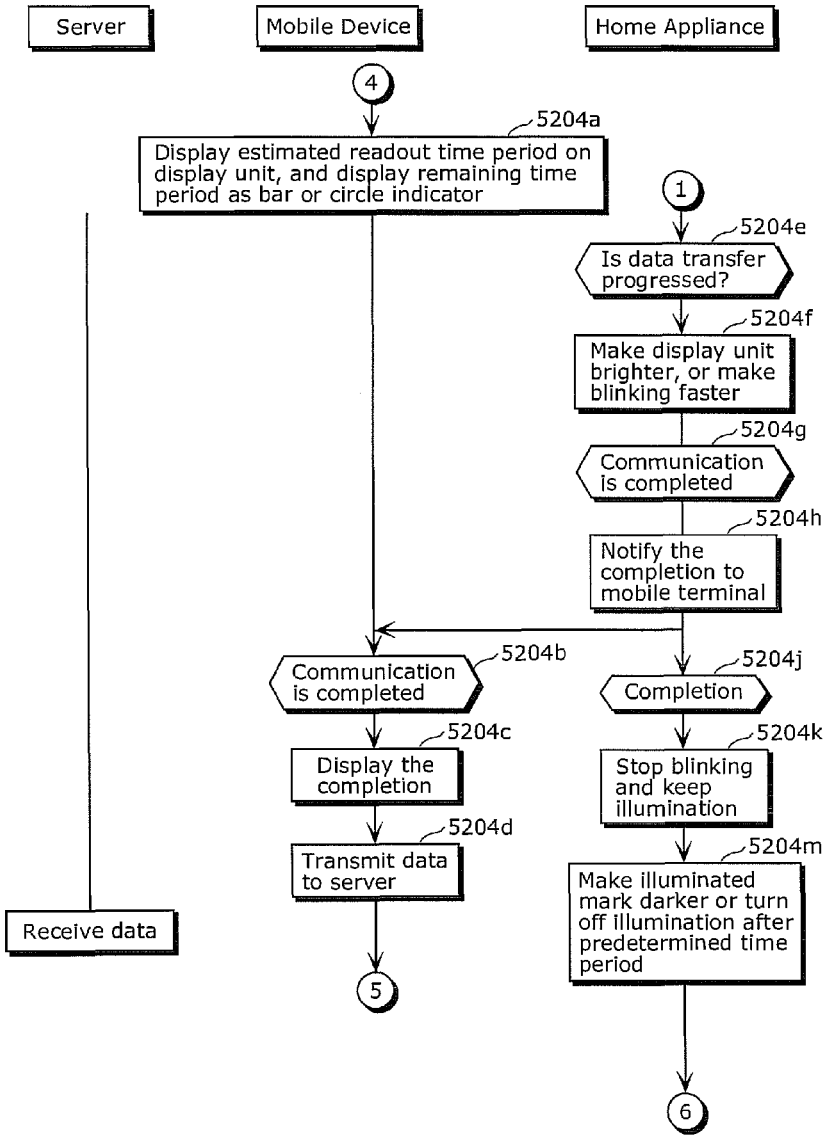

FIG. 276 is a flowchart according to the twenty-fifth embodiment of the present invention.

Figure 277:
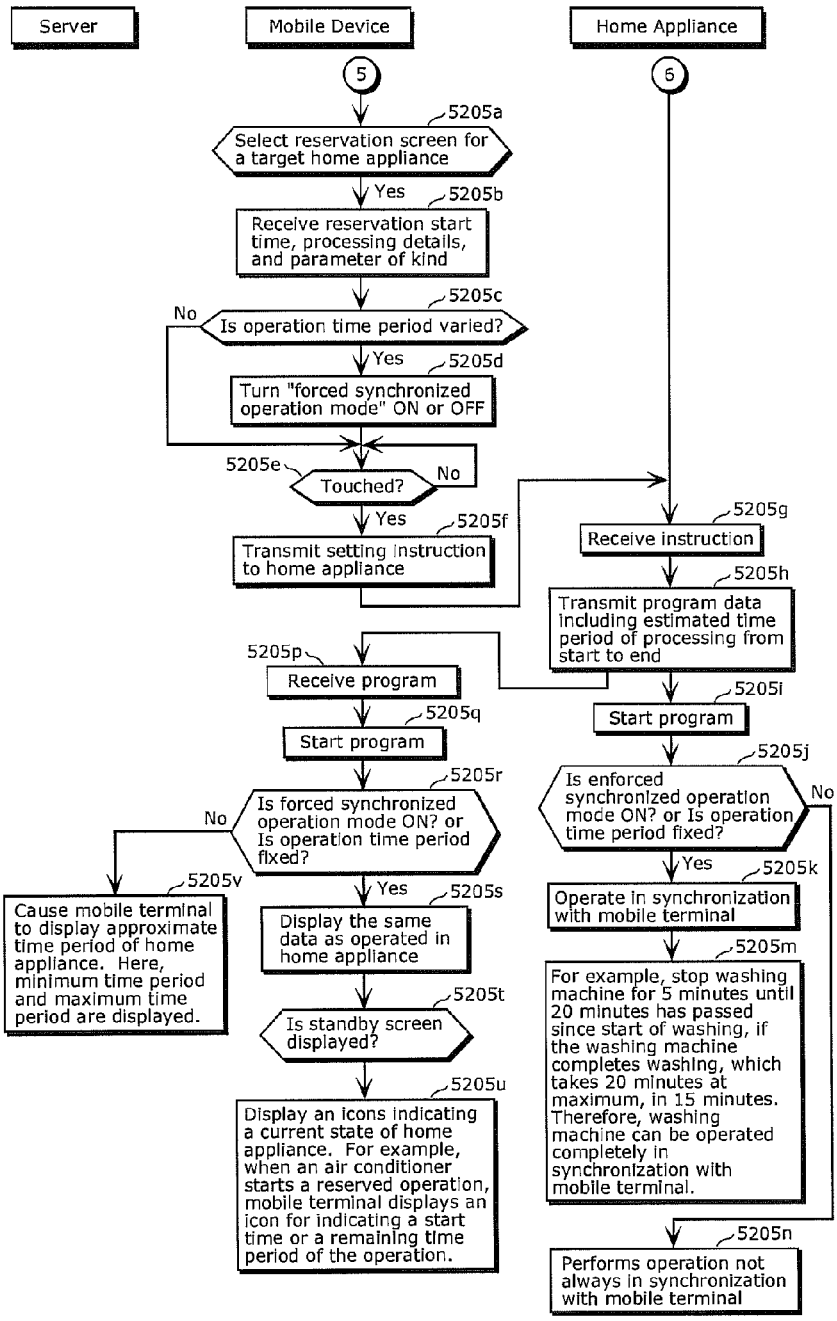

FIG. 277 is flowchart 5 according to the twenty-fifth embodiment of the present invention.

Figure 278:
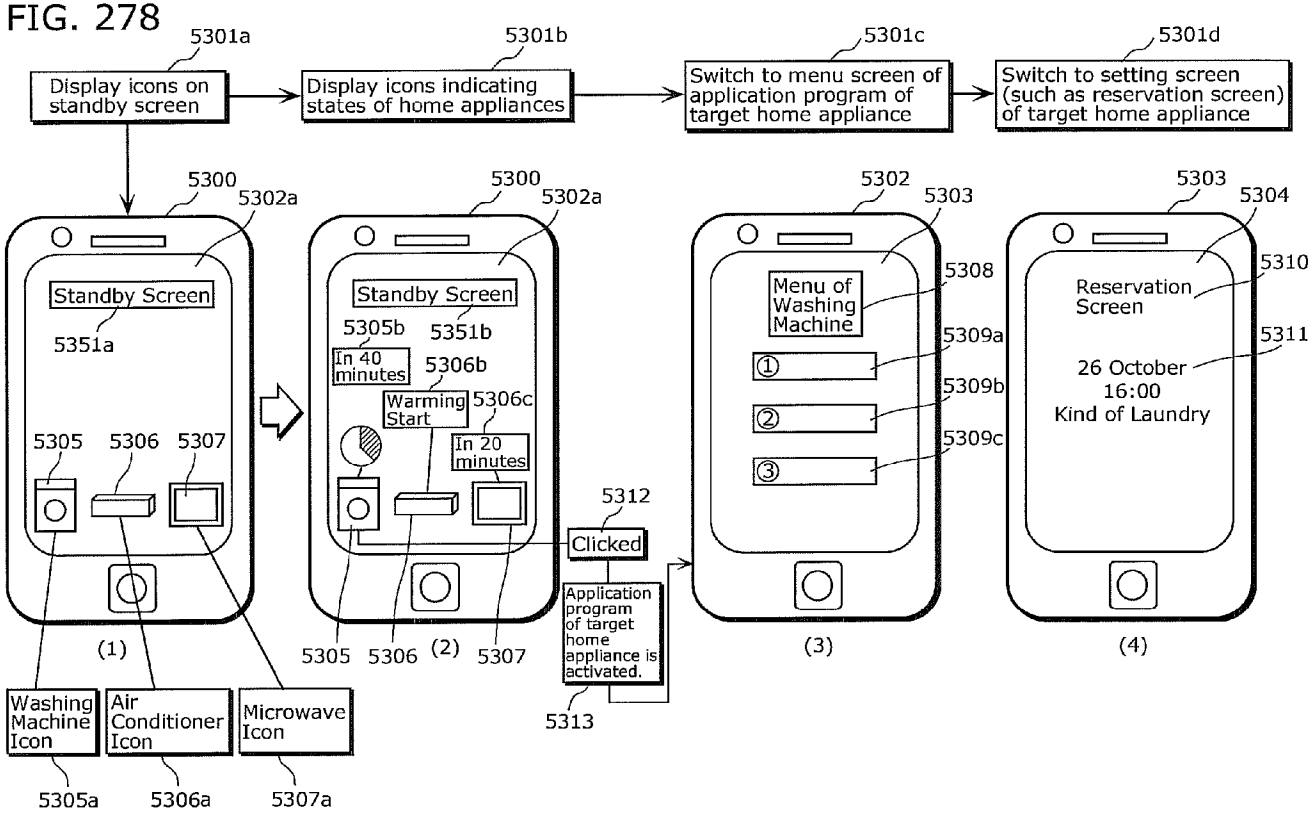

FIG. 278 is a diagram showing a display method of a standby screen of a terminal according to the twenty-fifth embodiment of the present invention.

BEST MODE FOR CARRYING OUT THE INVENTION

The following describes embodiments according to the present invention with reference to the drawings. In the following embodiments, various aspects of the communication device according to the present invention are described. Among them, the eighteenth embodiment is directly related to the claims appended in this application.

First Embodiment

Figure 1:
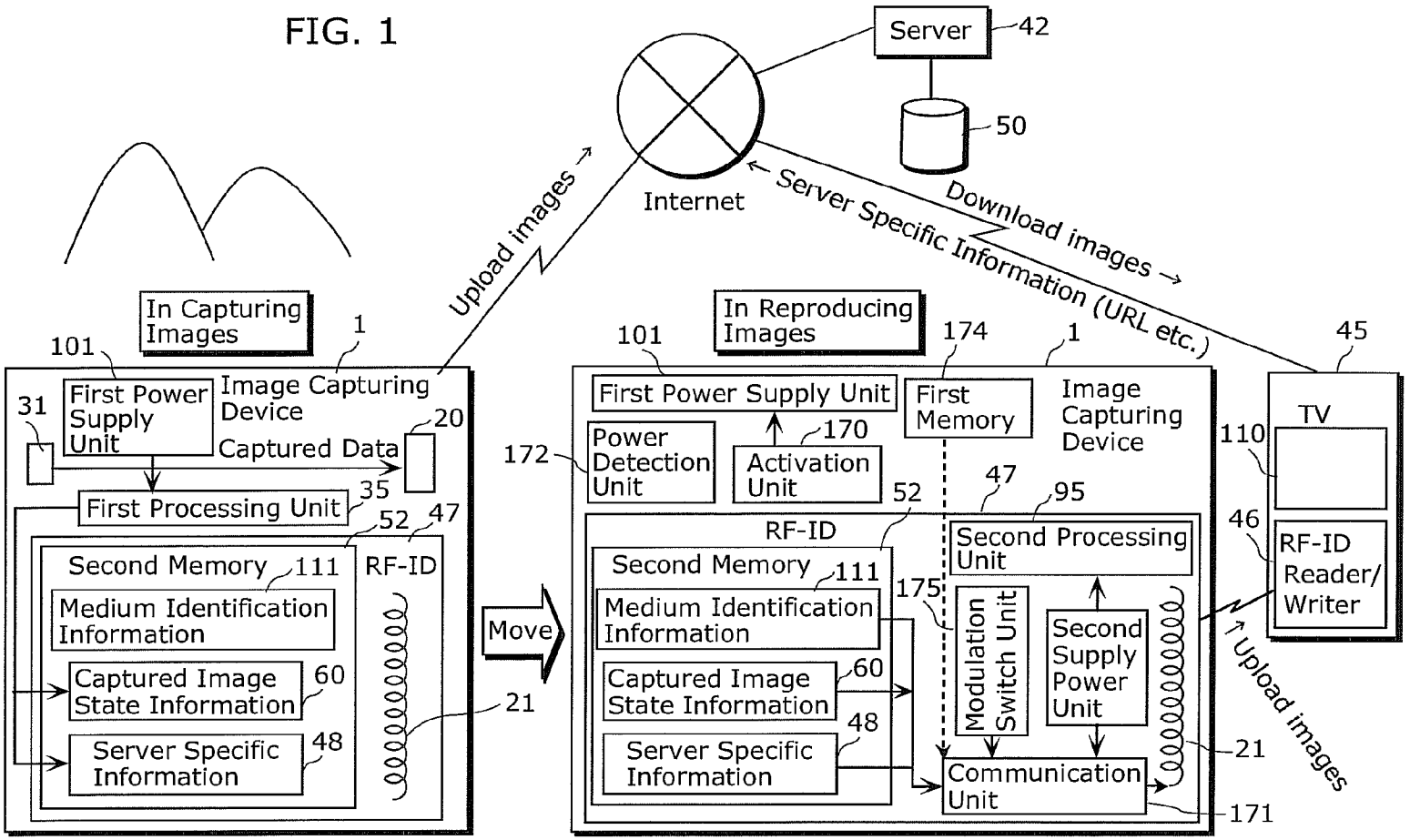
FIG. 1 illustrates an entire system of an image capturing device according to a first embodiment of the present invention.

The first embodiment according to the present invention is described below. FIG. 1 is a schematic diagram of the first embodiment of the present invention. Here, a communication system including an image capturing device (camera) 1, a TV 45, and a server 42 is illustrated. In FIG. 1, the image capturing device 1 capturing images is illustrated on a left-hand side, while the image capturing device 1 reproducing the captured images is illustrated on a right-hand side.

The image capturing device 1 is an example of the communication device according to the aspect of the present invention. Here, the image capturing device 1 is implemented as a digital camera. For units used in capturing images, the image capturing device 1 includes a first power supply unit 101, a video processing unit 31, a first antenna 20, a first processing unit 35, a second memory 52, and a RF-ID antenna (second antenna) 21. The second memory 52 holds medium identification information 111, captured image state information 60, and server specific information 48. The RF-ID antenna 21 is used for a RF-ID unit. For units used in reproducing images, the image capturing device 1 includes the first power supply unit 101, a first memory 174, a power detection unit 172, an activation unit 170, the second memory 52, a second processing unit 95, a modulation unit switch 179, a communication unit 171, a second power supply unit 91, and the RF-ID antenna 21. The second memory 52 holds medium identification information 111, captured image state information 60, and the server specific information 48.

The TV 45 is an example of an apparatus (device) connected to a reader via a communication path. In more detail, the TV 45 is a television receiving apparatus used to display image data captured by the image capturing device 1. The TV 45 includes a display unit 110 and a RF-ID reader/writer 46.

The server 42 is a computer that holds image data uploaded from the image capturing device 1 and that downloads the image data to the TV 45. The server 42 has a storage device in which data 50 is stored.

When images of objects such as scenery are captured, the images are converted to captured data (image data) by the video processing unit 31 data. Then, in communicable conditions, the image data is transmitted to an access point using the first antenna 20 for a wireless Local Area Network (LAN)

or Worldwide Interoperability for Microwave Access (WiMAX), and eventually recorded as the data 50 via the Internet to the predetermined server 42.

Here, the first processing unit 35 records the captured image state information 60 regarding the captured image data onto the second memory 52 in a RF-ID unit 47. The captured image state information 60 indicates at least one of (a) date of time of capturing each of the images, (b) the number of the captured images, (c) date and time of finally transmitting (uploading) an image, (d) the number of transmitted (uploaded) images, and (e) date and time of finally capturing an image. In addition, the captured image state information 60 includes (f) serial numbers of images that have already been uploaded or images that have not yet been uploaded; (g) a serial number of a finally captured image; and the like.

In addition, the first processing unit 35 generates a Uniform Resource Locator (URL) of the data 50 that is uploaded to the server 42. The first processing unit 35 records the server specific information 48 onto the second memory 52. The server specific information 48 is used to access the image data. The medium identification information 111 is also recorded on the second memory 52. The medium identification information 111 is used to determine whether the device embedded with the RF-ID (RF-ID unit) is a camera, a card, or a post card.

When a main power of the camera (the first power supply unit 101 such as a battery) is ON, the second memory 52 receives power from the main power. Even if the main power of the camera is OFF, the external RF-ID reader/writer is located outside supplies power to the RF-ID antenna 21. This enables the passive second power supply unit 91 without any power like a battery to adjust a voltage to provide power to respective units in a RF-ID circuit unit including the second memory. Thereby, it is possible to supply power to the second memory 52 so that the data is exchanged between the second memory 52 and the external device to be recorded and reproduced. Here, the second power supply unit 91 is a circuit generating power from radio waves received by the second antenna (RF-ID antenna) 21. The second power supply unit 91 includes a rectifier circuit and the like. Whenever the main power is ON or OFF, the data in the second memory 52 is read and written by the second processing unit 95. When the main power is ON, the data in the second memory 52 can be read and written also by the first processing unit 35. In other words, the second memory 52 is implemented as a nonvolatile memory, and both the first processing unit 35 and the second processing unit 95 can read and write data from and to the second memory 52.

When the image capturing device 1 completes capturing images of a trip or the like and then the captured images are to be reproduced, the image capturing device 1 is moved into proximity of the RF-ID reader/writer 46 of the TV 45, as illustrated on the right side of FIG. 1 as being the situation of reproducing images. Then, the RF-ID reader/writer 46 supplies power to the RF-ID unit 47 via the second antenna 21, and thereby the second power supply unit 91 provides power to the units in the RF-ID unit 47, even if the main power (the first power supply unit 101) of the image capturing device 1 is OFF. The captured image state information 60 and the server specific information 48 are read by the second processing unit 95 from the second memory 52, and transmitted to the TV 45 via the second antenna 21. The TV 45 generates a URL based on the server specific information 48, then downloads the image data of the data 50 from the server 42, and eventually displays, on the display unit 110, thumbnails or the like of images in the image data. If it is determined based on the captured image state information 60 that there is any captured image not yet been uploaded to the server 42, the determination result is displayed on the display unit 110. If necessary, the image capturing device 1 is activated to upload, to the server 42, image data of the captured image not yet been uploaded.

Figure 2:
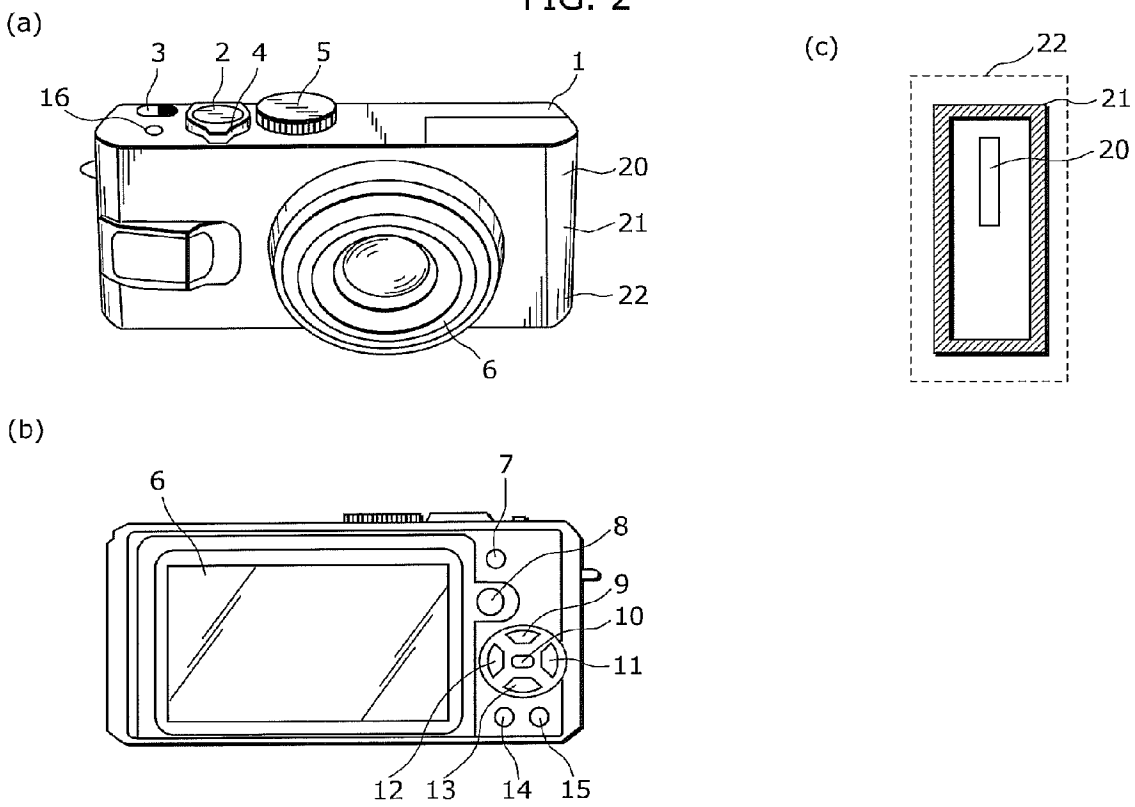
FIG. 2 illustrates external views of the image capturing device according to the first embodiment of the present invention.

(a), (b), and (c) in FIG. 2 are an external front view, an external back view, and an external right side view, respectively, of the image capturing device 1 according to the first embodiment of the present invention.

As illustrated in (c) in FIG. 2, the first antenna 20 used for a wireless LAN and the second antenna 21 used for the RF-ID unit are embedded in a right side of the image capturing device 1. The antennas are covered with an antenna cover 22 made of a material not shielding radio waves. The RF-ID unit operates at a frequency of 13.5 MHz, while the wireless LAN operates at a frequency of 2.5 GHz. The significant difference in frequency prevents interference between them. Therefore, the two antennas 20 and 21 are seen overlapping with each other from the outside, as illustrated in (c) in FIG. 2. The structure decreases an installation area of the antennas, eventually reducing a size of the image capturing device 1. The structure also enables the single antenna cover 22 to cover both of the two antennas as illustrated in (c) in FIG. 2, so that the part made of the material not shielding radio waves is minimized. The material not shielding radio waves, such as plastic, has a strength lower than that of a metal. Therefore, the minimization of the material can reduce a decrease in a strength of a body of the image capturing device 1. The image capturing device 1 further includes a lens 6 and a power switch 3. The units assigned with numeral references 2 to 16 will be described later.

Figure 3:
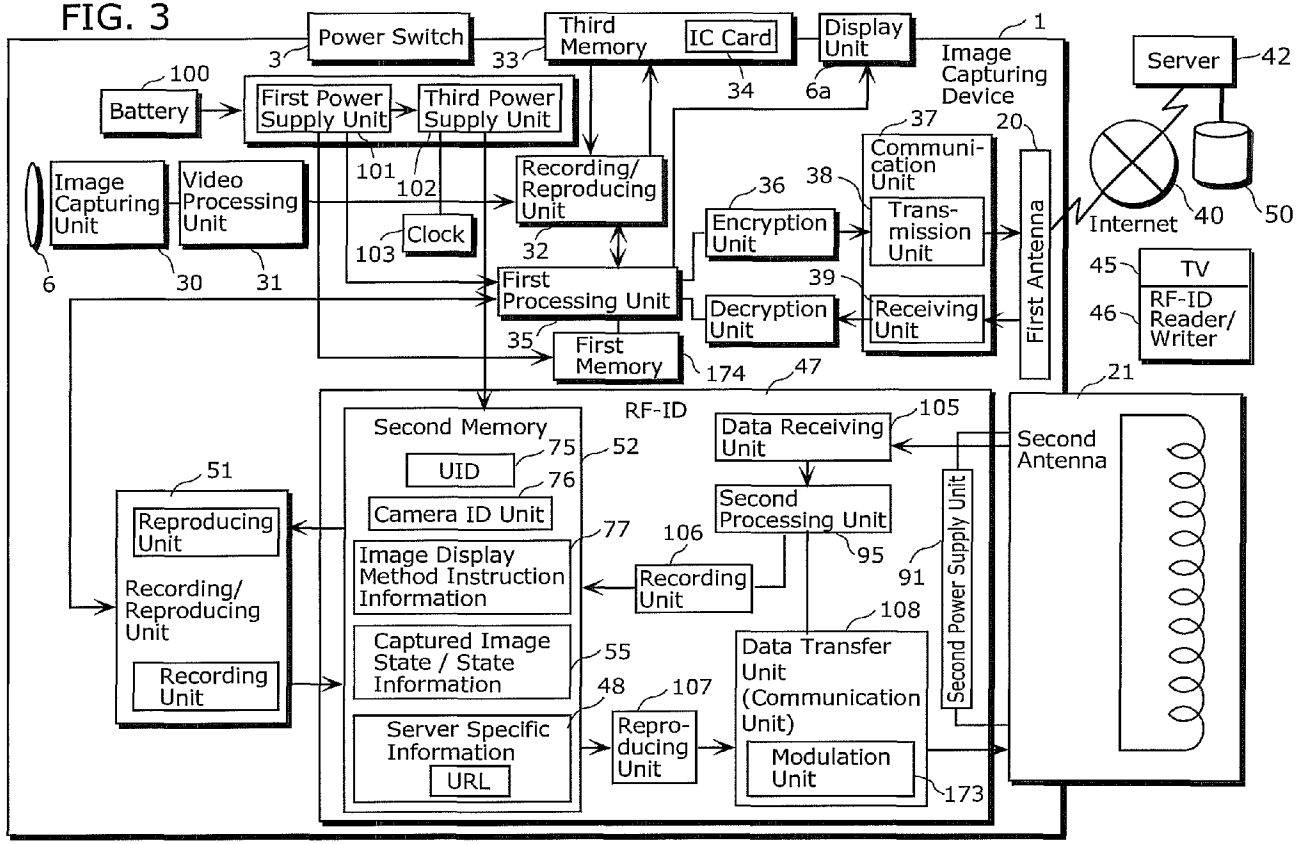
FIG. 3 is a block diagram of the image capturing device according to the first embodiment of the present invention.

FIG. 3 is a detailed block diagram of the image capturing device 1.

Image data captured by an image capturing unit 30 is provided to a recording/reproducing unit 32 via the video processing unit 31 and then recorded onto a third memory 33. The image data is eventually recorded onto an Integrated Circuit (IC) card 34 that is removable from the image capturing device 1.

The above processing is instructed by the first processing unit 35 that is, for example, a Central Processing Unit (CPU). The image data, such as captured photographs or video, is provided to an encryption unit 36, a transmission unit 38 in a communication unit 37, and then the first antenna 20, in order to be transmitted to an access point or the like by radio via a wireless LAN, WiMAX, or the like. From the access point or the like, the image data is transmitted to the server 42 via the Internet 40. In the above manner, the image data such as photographs is uploaded.

There is a situation where a part of the image data fails to be uploaded because, for example, the communication state is not good or there is no nearby access point or base station. In the situation, some images have already been uploaded to the server 42, and the other images have not yet been uploaded. Therefore, the image data in the server 42 is different from the image data captured by the image capturing device 1. In the first embodiment of the present invention, the RF-ID reader/writer 46 of the TV 45 or the like reads the server specific information 48 and the like from the second memory 52 in the RF-ID unit 47 of the image capturing device 1. Then, based on the readout information, a URL or the like of the server 42 is generated. According to the URL, the TV 45 accesses the server 42 to access the data 50 such as a file, folder, or the like uploaded by the image capturing device 1. Then, the TV 45 downloads the uploaded images from among the images captured by the image capturing device 1, and displays the downloaded images. The above method will be described in more detail later.

If a part or all of the captured images is not uploaded as image data of the data 50 in the server 42, a problem would occur that a user downloading the images to the TV 45 cannot watch a part of the images on the TV 45.

In order to solve the problem, in the first embodiment of the present invention, the first processing unit 35 causes a recording/reproducing unit 51 to indicate information regarding a state of captured images, such as information of uploading state, to the captured image state information 55 in the second memory 52.

The above is described in more detail with reference to FIG. 4. In the second memory 52, synchronization information 56 is recorded. The synchronization information 56 indicates whether or not image data in the server 42 matches image data captured by the camera, in other words, whether or not the image data in the server 42 is in synchronization with the image data captured by the camera. In the first embodiment of the present invention, the TV 45 reads the captured image state information 55 from the second memory 52 via the second antenna 21. The captured image state information 55 makes it possible to instantly determine whether or not the data 50 in the server lacks any image. If the determination is made that there is any image that has not yet been uploaded, then the determination result is displayed on the display unit of the TV 45. Here, the TV 45 also displays a message of "Please upload images" to a viewer. Or, the TV 45 issues an instruction to the camera via the RF-ID antenna 21 to transmit an activation signal to the activation unit 170, thereby supplying power to the first power supply unit 101 of the image capturing device 1. Thereby, the TV 45 causes the image capturing device 1 to upload, to the server 42, the images in the first memory 174 or the like of the image capturing device 1, which have not yet been uploaded, via a wireless LAN, a wired LAN, the second antenna (RF-ID antenna) 21, or the like.

Since transmission via the RF-ID antenna 21 has a small transfer amount, transmission of the image data as originally captured takes a considerable time to upload and display the image data. This causes a user to feel unpleasant. In order to avoid this, according to the first embodiment of the present invention, when the image data is transmitted via the RF-ID antenna 21, thumbnails of the images not yet been uploaded are transmitted instead. The thumbnails can shorten apparent upload time and display time, suppressing unpleasant feeling of the user. Most of current RF-ID having a high communication ability has a transfer amount of several hundreds kbps. However, development of RF-ID having a quad-speed has been examined. The quad-speed RF-ID has a possibility of achieving a transfer amount of several Mbps. If thumbnails of images not yet been uploaded are transmitted, it is possible to transmit several dozens of thumbnails in one second. If thumbnails are displayed in a list, thumbnails of all images including images not yet been uploaded can be displayed on the TV within a time period a general user can tolerate. The above is one of practical solutions.

If the image capturing device is forced to be activated to upload images not yet been uploaded as described above, the most speedy and stable path is selected from a wireless LAN, the RF-ID antenna 21, and a wired LAN, to be used for uploading and displaying on the TV. In the situation where the image capturing device 1 receives power from the outside via the second antenna 21, the communication unit 171 transmitting signals to the second antenna 21 performs communication with the outside by a low-speed modulation method. On the other hand, in the situation where the image capturing device 1 can receive power from the first power supply unit 101 or the like, the communication unit 171 switches the modulation method to a modulation method having a large signal point, such as Quadrature Phase Shift Keying (QPSK), 16-Quadrature Amplitude Modulation (QAM), or 64-QAM, as needed, in order to achieve high-speed transfer to upload the image data not yet been uploaded in a short time. Furthermore, when the power detection unit 172 detects, for example, that the first power supply unit 101 or the like does not have enough power or that the image capturing device 1 is not connected to an external power, the first power supply unit 101 stops supplying power and a modulation switch unit 175 switches the modulation method employed by the communication unit 171 to a modulation method having a smaller signal point or less transfer rate. As a result, it is possible to prevent that the capacity of the first power supply unit 101 is reduced to be equal to or less than a set value.

There is another solution for power. When power is not enough, the second processing unit 95, the communication unit 171, or the like sends a power increase request signal to the RF-ID reader/writer 46 of the TV 45 via the second antenna 21, to request for power support. In response to the request, the RF-ID reader/writer 46 increases providing power to have a value greater than the set value for the power used in reading data from the RF-ID unit. Since the RF-ID unit receives more power via the second antenna 21, the RF-ID unit can provide power to the communication unit 171 or the first processing unit 35. Thereby, a power amount of a battery 100 for the first power supply unit 101 is not reduced. Or, without the battery 100, the image capturing device 1 can practically and unlimitedly continue transmission.

As still another method, uploaded-image-data information 60 in FIG. 3 can be used. In uploaded-image-data information 60, uploaded-image information 61 such as serial numbers of photographs, is recorded. It is also possible to use hashed information 62 generated by hashing the information 61. As a result, a data amount is reduced.

The TV 45 can read the above information to be compared to information of images captured by the camera, thereby obtaining information of images not yet been uploaded.

As still another method, not-yet-uploaded image data existence identification information 63 can be used. The not-yet-uploaded image data existence identification information 63 includes an existence identifier 64 indicating whether or not there is any image not yet been uploaded. Since existence of images has not yet been uploaded is notified, data in the second memory 52 can be significantly reduced.

It is also possible to use not-yet-uploaded-image number 65 indicating the number of images not yet been uploaded. Since the image capturing device 1 allows the TV 45 to read the information, a viewer can be informed of the number of images to be uploaded. In this case, a data capacity in addition to the number is recorded as the captured image state information 55. Thereby, the image capturing device 1 enables the TV 45 to display a more exact prediction time required to upload images not yet been uploaded.

It is also possible to use not-yet-uploaded image information hashed information 67 that is generated by hashing information regarding images not yet been uploaded.

In addition, it is also possible to record a final capturing time (final capturing date/time) 68 in the second memory 52. Later, the TV 45 reads the final capturing time 68. The TV 45 is connected to the server 42 to compare the final capturing time 68 to a capturing date of an image that has been finally uploaded to the server 42. Thereby, it is possible to easily determine whether or not there is any image not yet been uploaded. If images are captured and assigned with serial numbers sequentially from an older image, it is possible to record only a final image serial number 69. The final image serial number 69 is compared to a serial number of an image that has been finally uploaded to the server 42. Thereby, it is possible to determine whether or not there is any image not yet been uploaded. It is also possible to record, onto the second memory 52, captured image information 70 that is, for example, serial numbers of all captured images. Thereby, the TV 45 later accesses the server 42 to match the serial numbers to images uploaded to the server 42. As a result, it is possible to determine whether or not there is any image not yet uploaded. When the captured image information 70 is used, use of hashed information 71 generated by hashing the captured image information 70 can compress the captured image information 70.

Figure 22A:
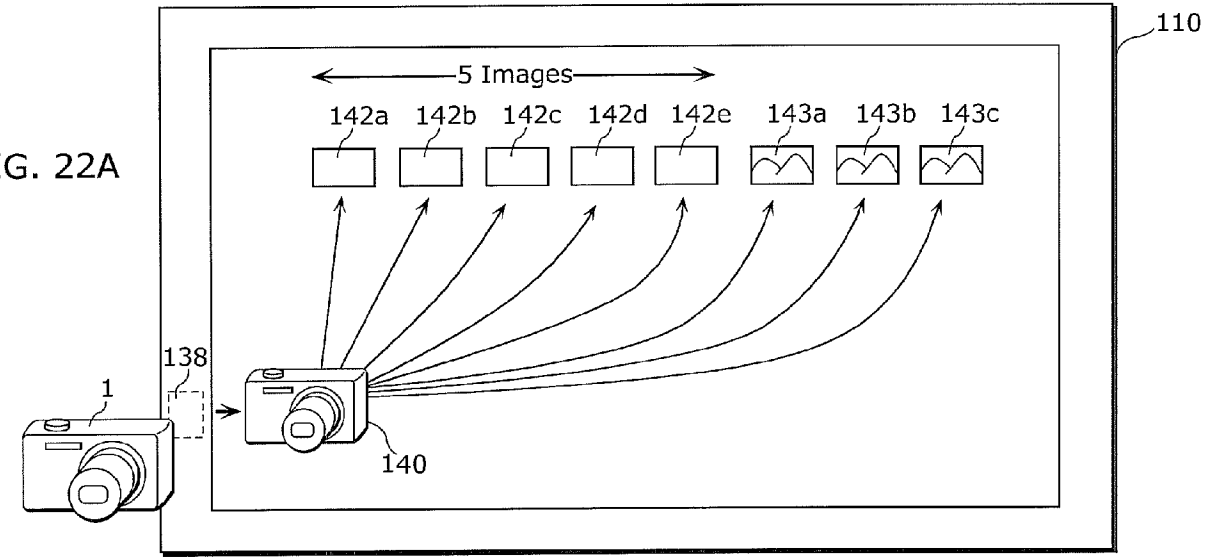
FIG. 22A is a diagram presenting a display method of the image capturing device and the TV, according to the first embodiment of the present invention.
Figure 22B:
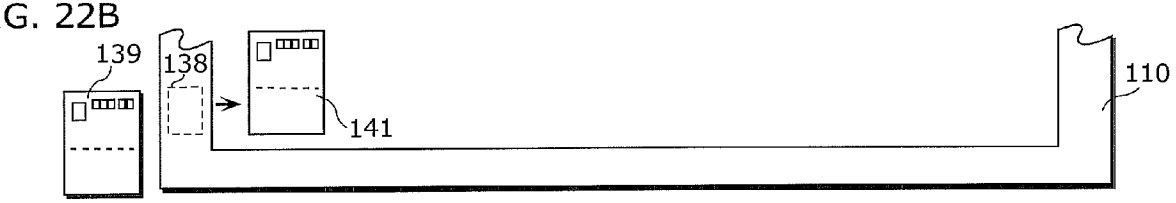
FIG. 22B is a diagram presenting a display method of the image capturing device and the TV, according to the first embodiment of the present invention.

The second memory 52 further stores Unique IDentification (UID) 75 of the RF-ID unit, camera ID 76, and the medium identification information 111. Even if the main power of the camera (except a sub-power for backup etc. of a clock) is OFF, these pieces of information can be read by the TV 45 via the second antenna 21 to be used for identifying the camera or the user or authenticating a device (apparatus). When the user comes back from an overseas trip or the like, the camera is likely to have a small charge amount of the battery. However, according to the first embodiment of the present invention, the camera can be operated to transmit information without battery, which is highly convenient for the user. The medium identification information 111 includes an identifier or the like indicating whether the medium or device embedded with the RF-ID unit is a camera, a camcorder, a post card, a card, or a mobile phone. The identifier enables the TV 45 to identify the medium or device. Thereby, the TV 45 can display a mark or icon of the camera or postcard on a screen as illustrated in FIGS. 22A and 22B, as will be described. The TV 45 can also change processing depending on the identifier.

Figure 5:
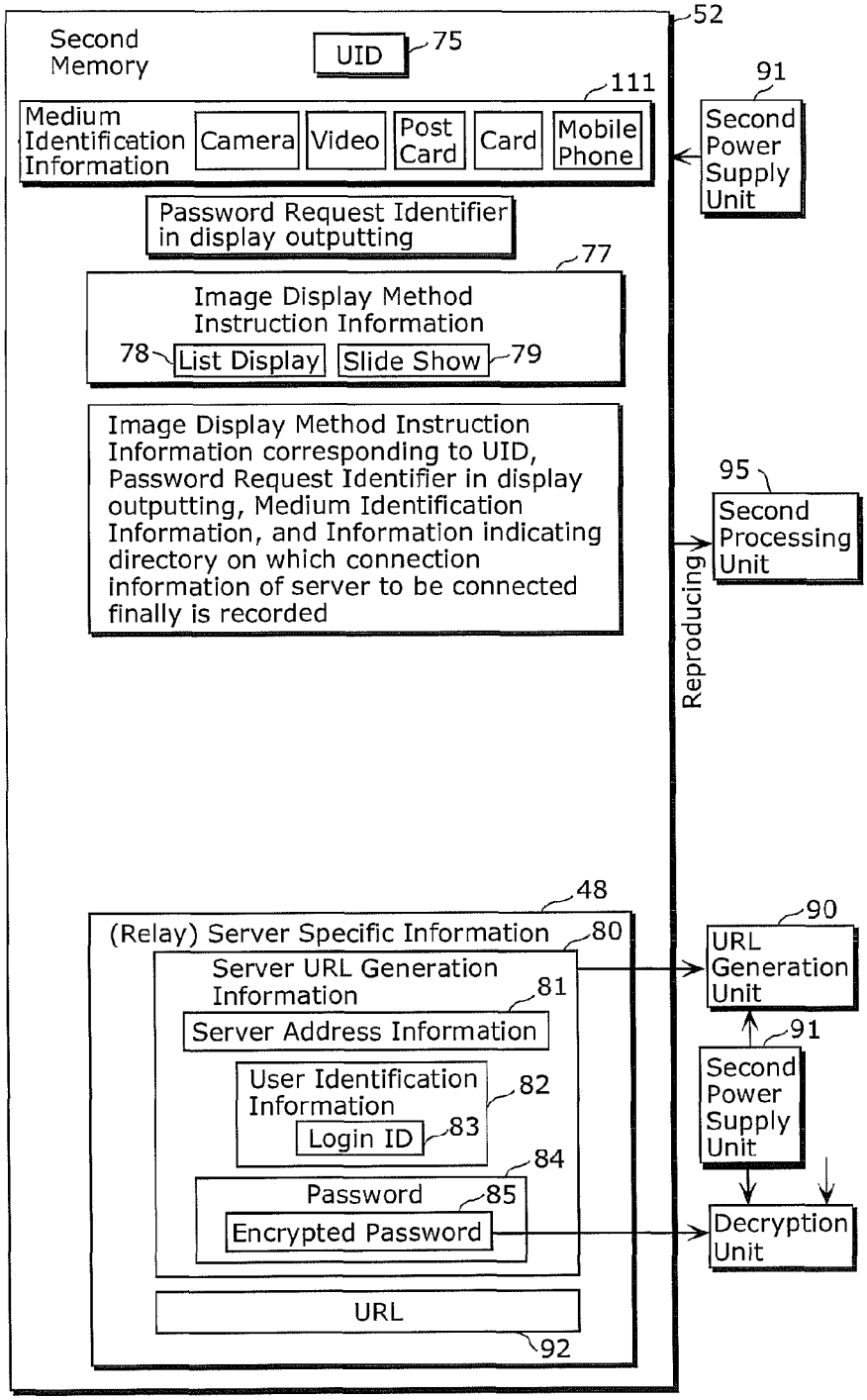
FIG. 5 is a block diagram of the second memory in the image capturing device according to the first embodiment of the present invention.

The second memory 52 also stores image display method instruction information 77. For example, in the situation where a list display 78 in FIG. 5 is selected, when the second antenna 21 is moved into proximity of the RF-ID reader/writer 46 of the TV 45, the image capturing device 1 (camera) causes the TV 45 to display a list of thumbnails of images, such as photographs.

In the situation where slide show 79 is selected, the image capturing device 1 causes the TV 45 to sequentially display images from a newer one or an older one.

Figure 4:
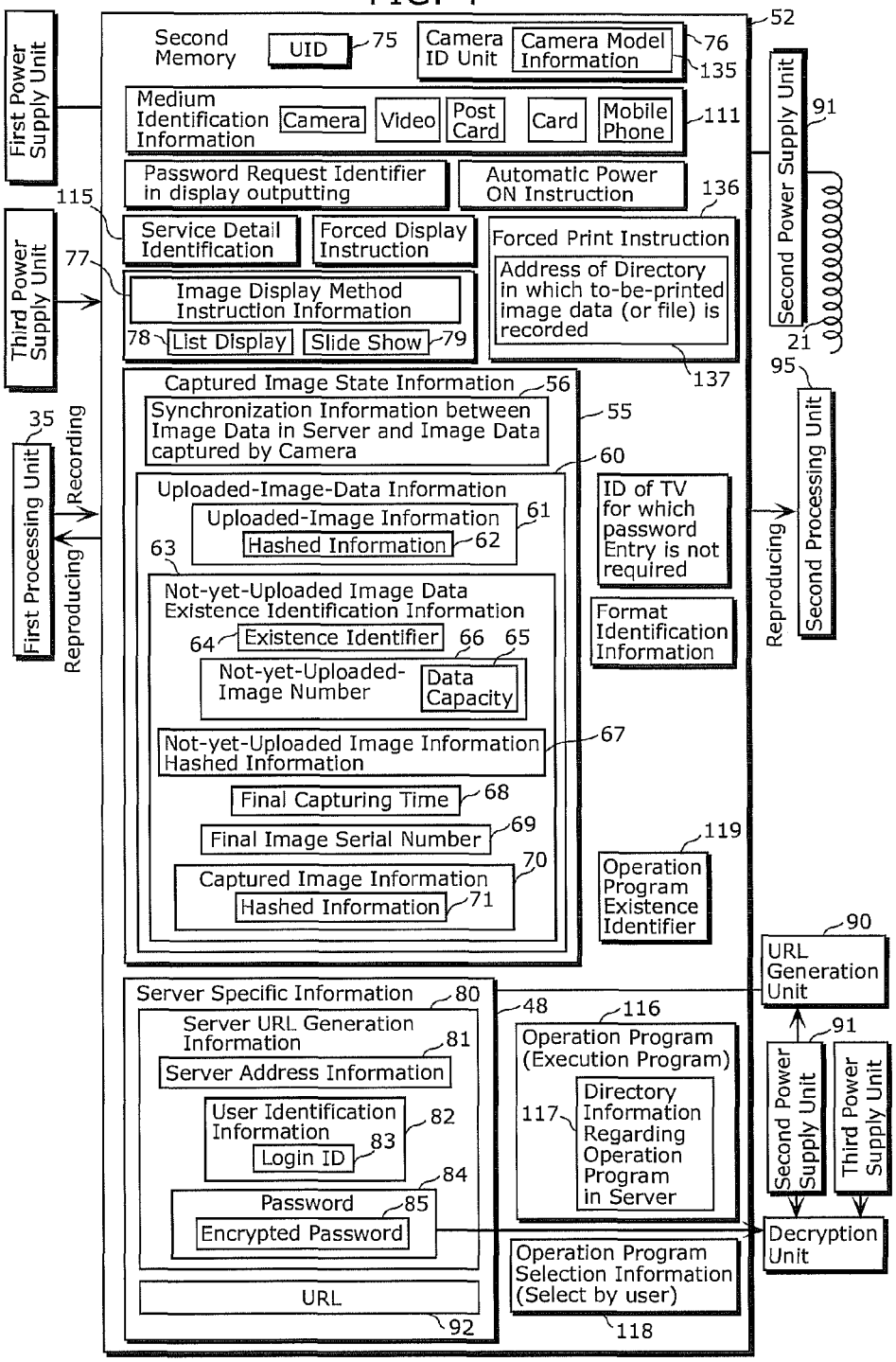
FIG. 4 is a block diagram of a second memory in the image capturing device according to the first embodiment of the present invention.

In a lower part of the second memory 52 in FIG. 4, there is a region for recording the server specific information 48.

The server specific information 48 allows a camera operator to display images on the TV screen by a preferred method.

The server specific information 48 includes server URL generation information 80 that is source information from which a server URL is generated. An example of the server URL generation information 80 is login ID 83. The server specific information 48 has a region in which server address information 81 and user identification information 82 are recorded. In practical, login ID 83 and the like are recorded. In addition, there is a region for storing a password 84. An encrypted password 85 may be stored in the region. The above pieces of information are used to generate an URL by a URL generation unit 90 that is provided in the image capturing device 1, the RF-ID unit 47, the camera function used for capturing images in the image capturing device 1, or the TV 45. The URL is used for accessing a group of images corresponding to the image capturing device 1 or the user in the server 42. If the URL generation unit 90 is provided in the RF-ID unit 47, the URL generation unit 90 receives power from the second power supply unit 91.

It is also possible to generate URL 92 without using the above pieces of information and store the generated URL 92 directly to the second memory 52.

It is characterized in that the above-described pieces of information stored in the second memory 52 can be read by both the second processing unit 95 in the RF-ID unit and the first processing unit 35 in the camera function.

The above structure allows the TV 45 reading the RF-ID unit 47 in the camera to instantly obtain the pieces of information regarding uploading state, the sever address information, the login ID, the password, and the like. Thereby, the TV 45 can download image data corresponding to the camera from the server 42, and display the image data at a high speed.

In the above situation, even if the main power of the image capturing device 1 is OFF, the RF-ID reader/writer supplies power to the second power supply unit 91 to activate (operate) the image capturing device 1. Therefore, power of the battery 100 in the image capturing device 1 is not reduced.

Referring back to FIG. 3, the first power supply unit 101 receives power from the battery 100 to provide power to the units in the camera. In a quiescent state, however, a third power supply unit 102 provides weak power to the clock 103 and the like. In some cases, the third power supply unit 102 supplies backup power to a part of the second memory 52.

The RF-ID unit 47 receives power from the second antenna to provide power to the second power supply unit 91, thereby operating the second processing unit 95, or operating a data receiving unit 105, a recording unit 106, a reproducing unit 107, a data transfer unit 108 (the communication unit 171), and the second memory 52.

Therefore, in a quiescent state of the camera, no power is consumed. As a result, it is possible to keep the battery 100 of the camera longer.

The processing performed by the image capturing device 1 (referred to also as a "medium" such as a camera or card) and the processing performed by the TV and the RF-ID reader/writer are explained with reference to a flowchart of FIG. 7.

Figure 7:
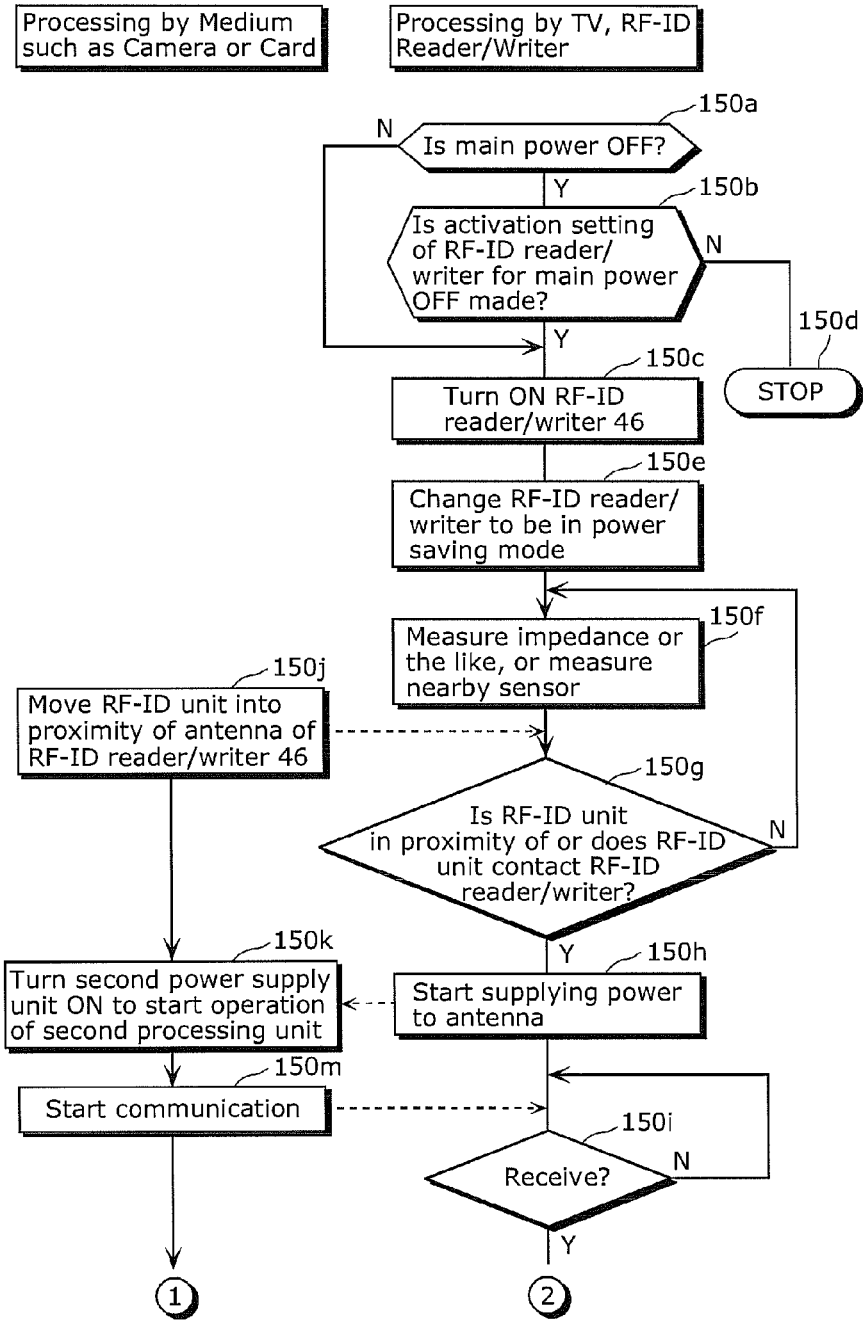
FIG. 7 is a flowchart of processing performed by the image capturing device and a TV, according to the first embodiment of the present invention.

If the main power is OFF at Step 150a in FIG. 7, it is determined at Step 150b whether or not activation setting of the RF-ID reader/writer for the main power OFF is made. If the activation setting is made, then the RF-ID reader/writer 46 is turned ON at Step 150c and changed to be in a power saving mode at Step 150e.

At Step 150f, impedance or the like of an antenna unit is measured, or a nearby sensor is measured. When the RF-ID unit is moved into proximity of an antenna of the RF-ID reader/writer 46 at Step 150j, it is detected at Step 150g whether or not the RF-ID unit is in proximity of or contacts the antenna. If it is detected that the RF-ID unit is in proximity of or contacts the antenna, then the RF-ID reader/writer 46 starts supplying power to the antenna of the medium at Step 150h. At Step 150k, in the medium, the second power supply unit is turned ON and thereby the second processing unit starts operating. As Step 150m, communication between the medium (camera or card) and the RF-ID reader/writer 46 starts.

When at Step 150i, the TV determines whether or not the RF-ID reader/writer 46 receives communication from the medium. If the RF-ID reader/writer 46 receives communication, then mutual authentication starts at Steps 151a and 151f in FIG. 8. If it is determined at Steps 151b and 151g that the mutual authentication is successful, information is read out from the second memory at Step 151d. At Step 151e, the readout information is transmitted to the RF-ID reader/writer 46. At Step 151i, the RF-ID reader/writer 46 receives the information. At Step 151j, the TV 45 side makes a determination as to whether or not the identification information or the like of the second memory is correct. If the identification information or the like is correct, then it is determined at Step 151p whether or not the TV 45 has identification information indicating automatic power ON. If the TV 45 has identification information, then it is determined at Step 151r whether or not a main power of the TV is OFF. If the main power of the TV is OFF, the main power of the TV is turned ON at Step 152a of FIG. 9. At Step 152b, the TV 45 side makes a determination as to whether or not the second memory 52 has forced display instruction. If the second memory 52 has the forced display instruction, then the TV 45 side changes an input signal of the TV to a screen display signal for displaying the RF-ID at Step 152d. At Step 152e, the RF-ID reader/writer 46 reads format identification information. At Step 152f, the RF-ID reader/writer 46 reads information from the second memory by changing a format of the information to a format according to the format identification information. At Step 152g, the TV 45 side makes a determination as to whether or the second memory has a "password request flag". If the second memory has the "password request flag", then the RF-ID reader/writer 46 reads an "ID of TV not requesting password entry" from the second memory at Step 152h. At Step 152i, the TV 45 side makes a determination as to whether or not ID of the TV 45 matches the "ID of TV not requesting password entry". If the ID of the TV 45 does not match the "ID of TV not requesting password entry", then the medium reads out a password from the second memory at Step 152q. At Step 152v, the medium decrypts the password that has been encrypted. At Step 152s, the medium transmits the decrypted password to the TV 45 side. Here, at Steps 152q, 152r, and 152s, it is also possible to store the password in a storage device in the server 42 as the data 50 in the server 42.

At Step 152j, the RF-ID reader/writer 46 receives the password. At Step 152k, the TV 45 displays a password entry screen. At Step 152m, the TV 45 determines whether or not the input password is correct. The determination may be made by the server 42. If the determination is made that the input password is correct, then the TV 45 performs display based on the information and program read from the second memory in the RF-ID unit at Step 152p.

Figure 10:
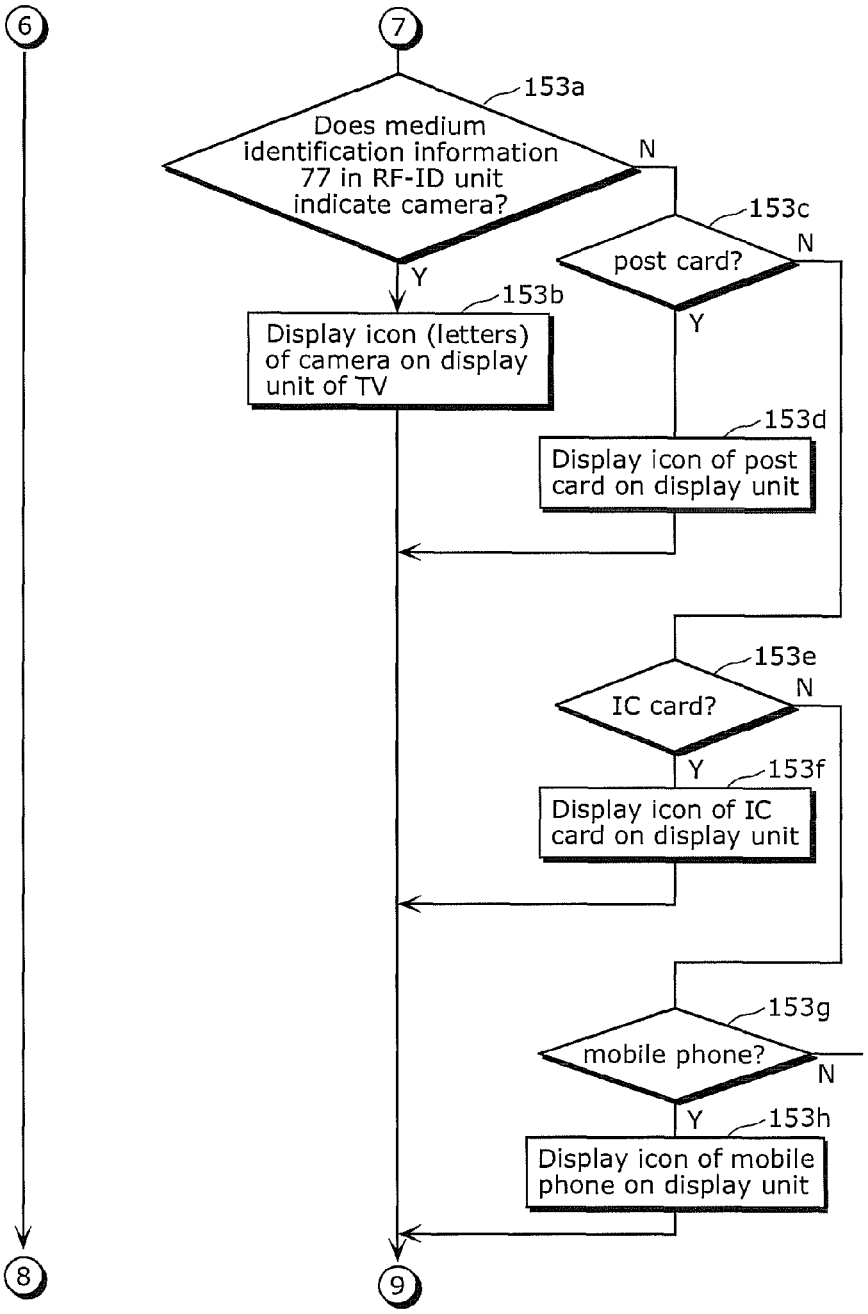
FIG. 10 is a flowchart of the processing performed by the image capturing device and the TV, according to the first embodiment of the present invention.

At Step 153a of FIG. 10, the TV 45 side determines whether or not the medium identification information 111 in the RF-ID unit in the second memory indicates that the medium is a camera. If the medium identification information 111 indicates a camera, then the TV 45 displays an icon (characters) of a camera (camera icon) on the display unit at Step 153b. On the other hand, if the medium identification information 111 does not indicate a camera, then it is determined at Step 153c whether or not the medium identification information 111 indicates a post card. If the medium identification information 111 indicates a post card, then the TV 45 displays an icon of a post card (post-card icon) at Step 153d. On the other hand, if the medium identification information 111 does not indicate a post card, the TV 45 further determines at Step 153e whether or not the medium identification information 111 indicates an IC card. If the medium identification information 111 indicates an IC card, then the TV 45 displays an icon of an IC card at Step 153f. On the other hand, if the medium identification information 111 does not indicate an IC card, the TV 45 still further determines at Step 153g whether or not the medium identification information 111 indicates a mobile phone. If the medium identification information 111 indicates a mobile phone, then the TV 45 displays an icon of a mobile phone on a corner of the TV screen.

Figure 11:
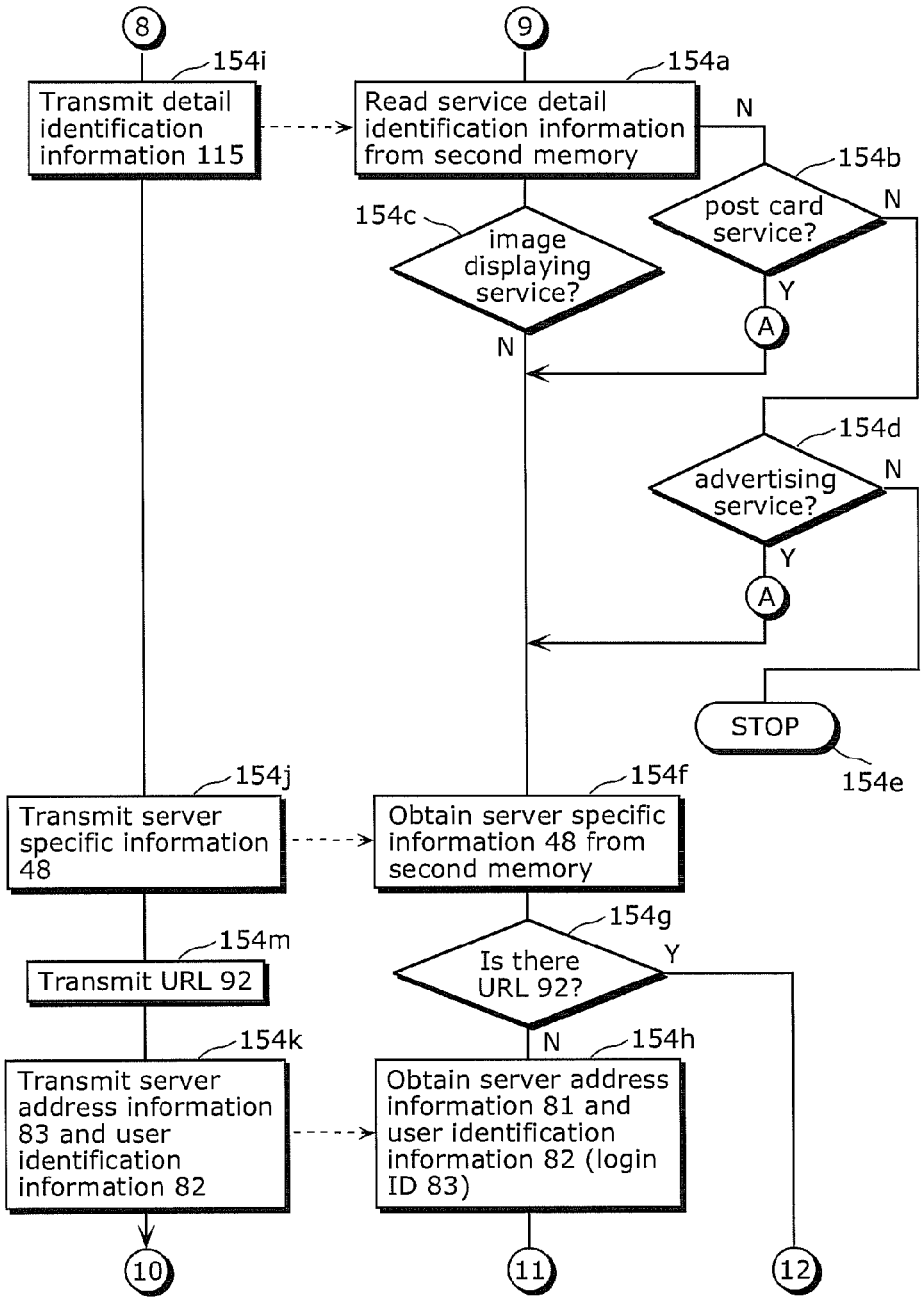
FIG. 11 is a flowchart of the processing performed by the image capturing device and the TV, according to the first embodiment of the present invention.
Figure 12:
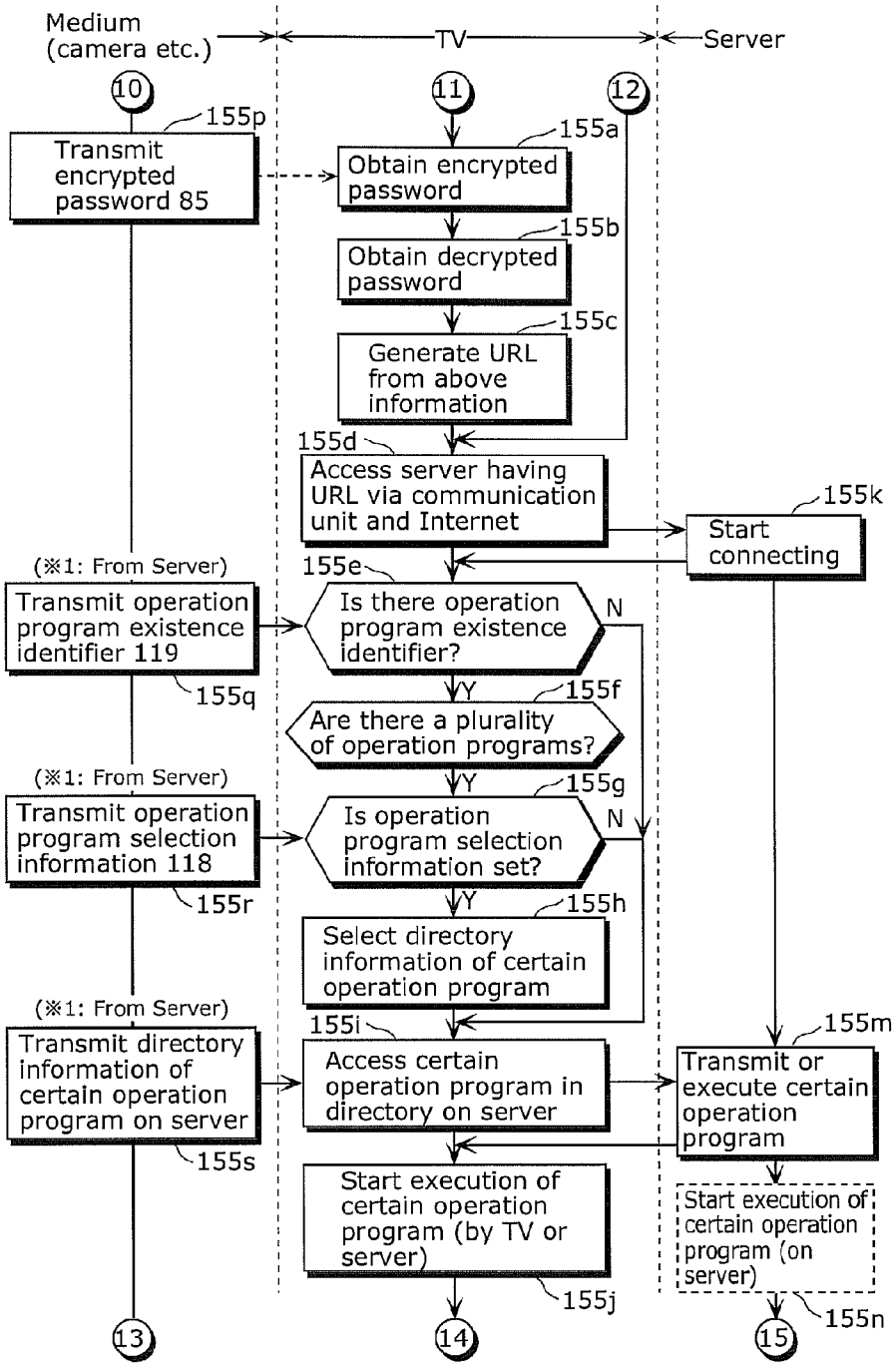
FIG. 12 is a flowchart of the processing performed by the image capturing device and the TV, according to the first embodiment of the present invention.
Figure 13:
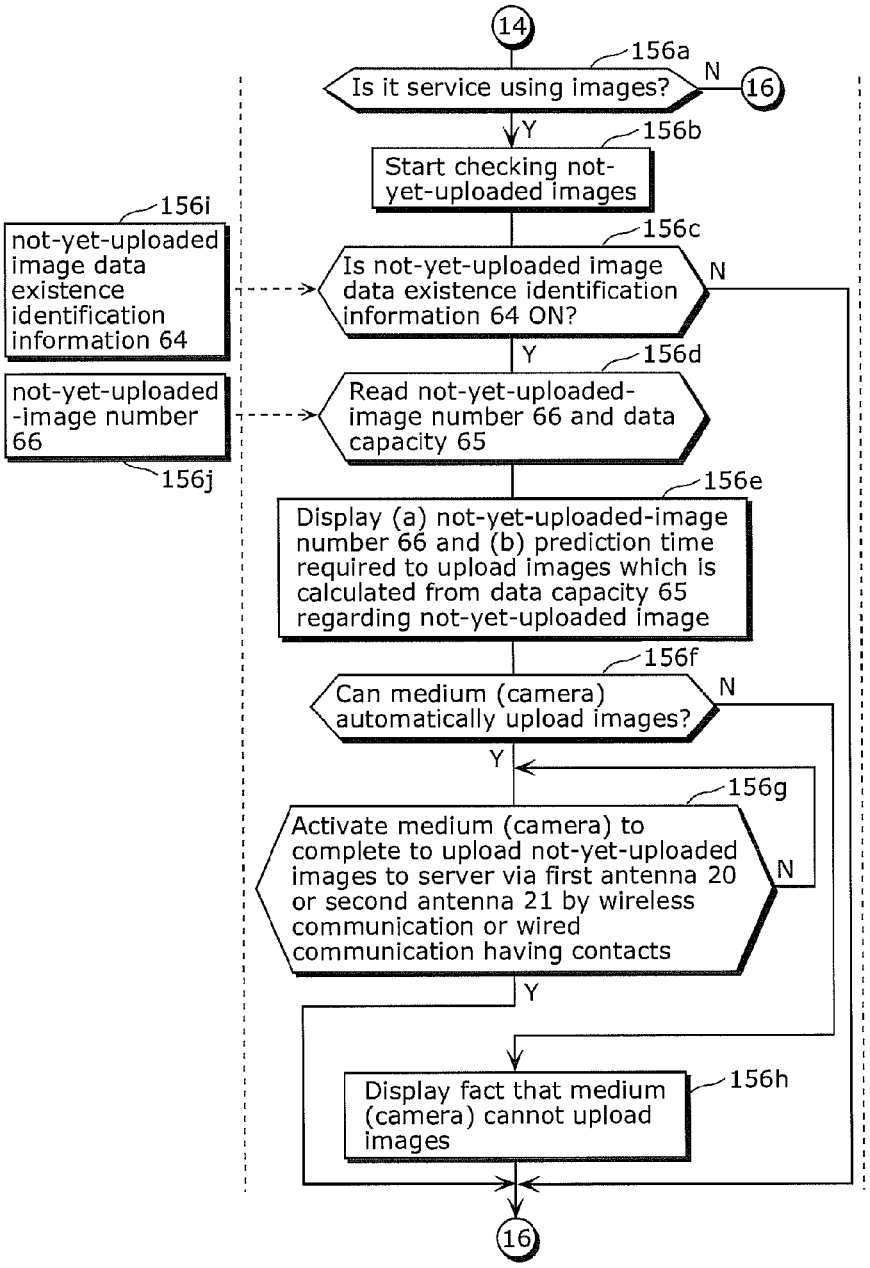
FIG. 13 is a flowchart of the processing performed by the image capturing device and the TV, according to the first embodiment of the present invention.

At Steps 154a and 154i of FIG. 11, the RF-ID reader/writer 46 reads service detail identification information from the server or the second memory. At Step 154c, the TV 45 side determines whether or not the service detail identification information indicates image display service. At Step 154b, the TV 45 side determines whether or not the service detail identification information indicates a post card service such as direct mail. At Step 154d, the TV 45 side determines whether or not the service detail identification information indicates advertising service. At Steps 154f and 154j, the RF-ID reader/writer 46 obtains the server specific information 48 from the second memory of the medium. At Step 154g, the TV 45 side determines whether or not the second memory stores the URL 92. If the second memory does not store the URL 92, then the processing proceeds to Steps 154h and 154k at which the TV 45 obtains the server address information 81 and the user identification information 82 from the second memory. At Steps 155a and 155p, the TV obtains an encrypted password from the second memory. At Steps 155b, the TV decrypts the encrypted password. At Step 155c, the TV generates URL from the above pieces of information. At Step 155d, even if the second memory stores the URL 92, the TV accesses the server having the URL via the communication unit and the Internet. At Step 155k, the TV starts being connected to the server 42. At Step 155q, the medium reads out operation program existence identifier 119 from the second memory. At Step 155e, the TV determines whether or not the TV has any operation program existence identifier. If the TV has any operation program existence identifier, it is further determined at Step 155f whether or not there are plurality of operation programs. If there are a plurality of operation programs, then the TV reads operation program selection information 118 from the second memory at Step 155r. At Step 155g, the TV determines whether or not the operation program selection information 118 is set. If the operation program selection information 118 is set, the TV selects directory information of a specific operation program at Step 155h. At Step 155s, the medium reads out directory information 117 of the specific operation program from the server and provides the directory information 117 to the TV. At Step 155i, the TV accesses the specific operation program in the directory on the server. At Step 155m, the server provides the specific operation program to the TV or executes the specific operation program on the server at Step 155n. At Step 155j, the TV (or the server) starts execution of the specific operation program. At Step 156a of FIG. 13, the TV determines whether or not the specific operation program is service using images. If the specific operation program is service using images, then the TV starts checking images not yet been uploaded at Step 156b.

Figure 6:
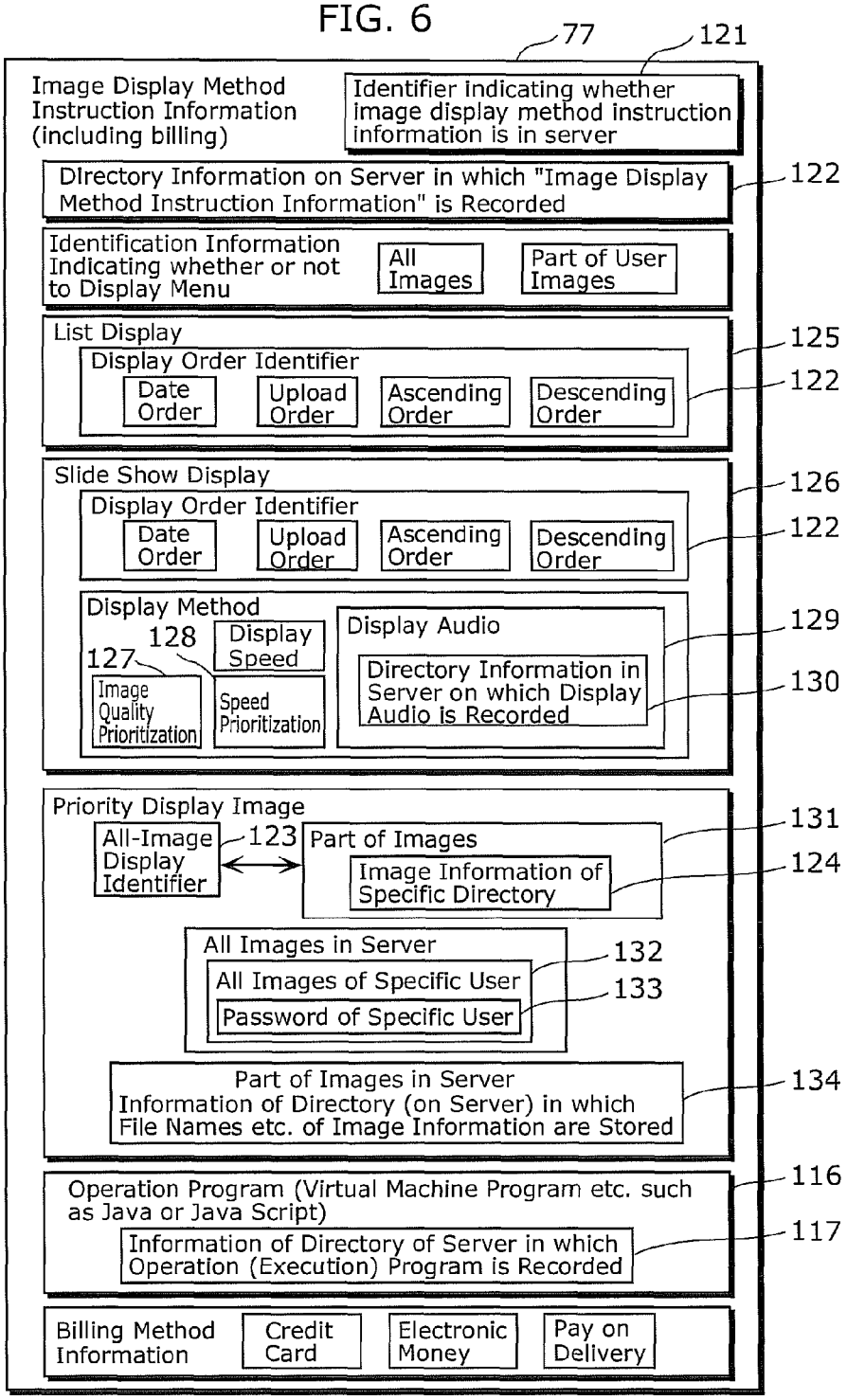
FIG. 6 is a block diagram of image display method instruction information of the image capturing device according to the first embodiment of the present invention.

At Step 156i, the TV reads the not-yet-uploaded image data existence identification information 64 from the medium. At Step 156c, the TV determines whether or not the not-yet-uploaded image data existence identification information 64 indicates that there is any image not yet been uploaded. If there is any image not yet been uploaded, the TV reads the not-yet-uploaded-image number 66 and the data capacity 65 from the medium at Step 156d. At Step 156e, the TV displays (a) the not-yet-uploaded-image number 66 and (b) a prediction time required to upload images which is calculated from the data capacity 65 regarding image not yet been uploaded. At Step 156f, the TV determines whether or not the medium (camera) is in a state where the medium can automatically upload images. If the medium can automatically upload images, then at Step 156g, the TV activates the medium (camera) to upload images not yet been uploaded to the server via the first antenna 20 or the second antenna 21 by wireless communication or wired communication having contacts. When Step 156g is completed, the processing proceeds to Step 157a of FIG. 14. At Step 157a, the TV determines whether or not there is a billing program. If there is no billing program, then at Step 157n, the TV reads identifier 121 regarding the image display method instruction information which is shown in FIG. 6. At Step 157b, the TV determines whether or not the server has the image display method instruction information. If the server has image display method instruction information, then at Step 157p, the TV reads, from the medium, directory information 120 regarding a directory in which image display method instruction information is stored on the server. At Step 157c, the TV reads, from the medium, the directory information 120 in which the image display method instruction information corresponding to UID or the like is stored. At step 157d, the TV obtains the image display method instruction information from the server. Then, the processing proceeds to Step 157f.

On the other hand, if the determination is made at Step 157b that the server does not have the image display method instruction information, then the processing proceeds to Step 157e. At Step 157e, the TV obtains the image display method instruction information from the medium (such as a camera). Then, the processing proceeds to Step 157f.

Figure 15:
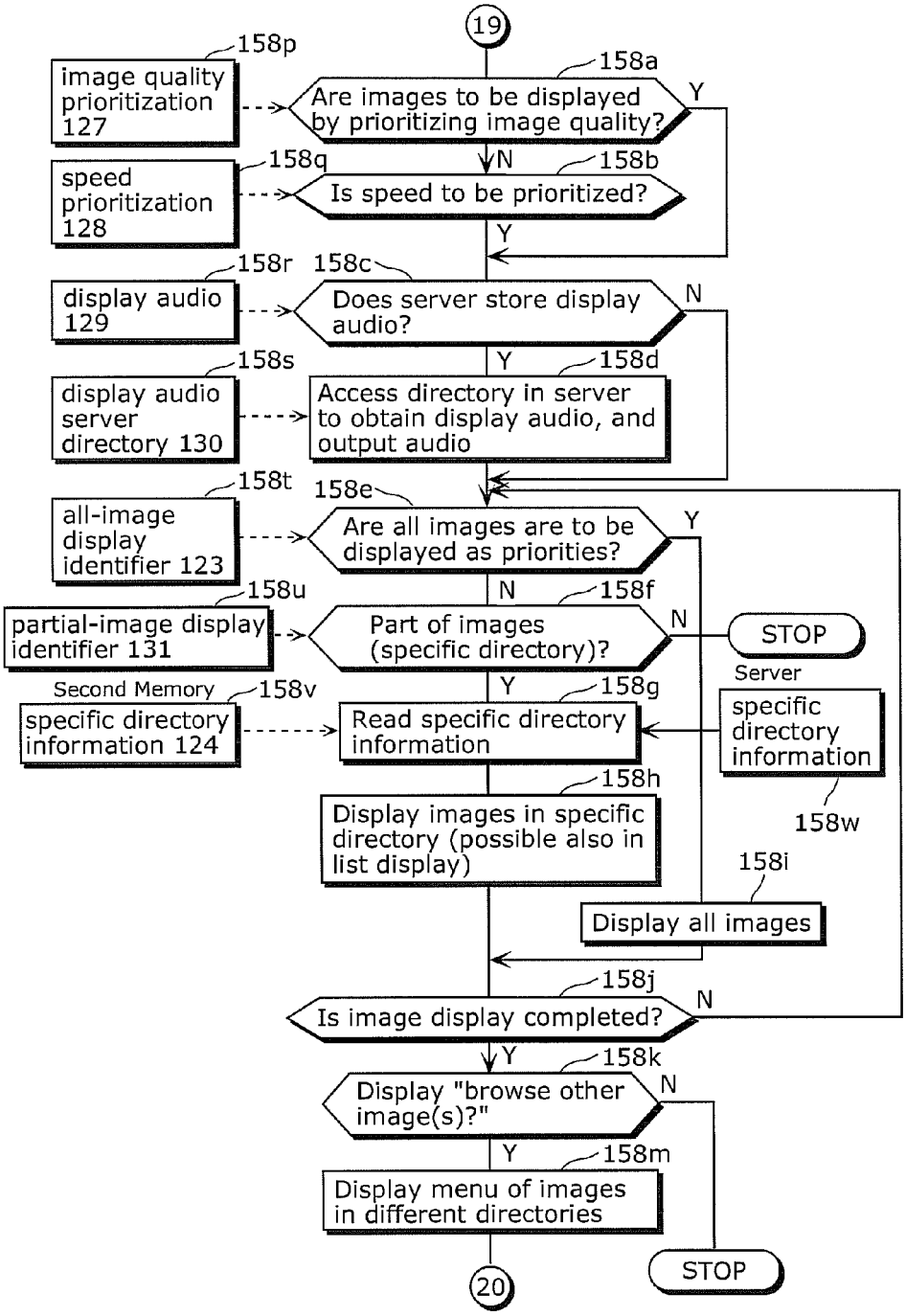
FIG. 15 is a flowchart of the processing performed by the image capturing device and the TV, according to the first embodiment of the present invention.

At Step 157f, the TV starts display of images based on the image display method instruction information. At Step 157g, the TV reads an all-image display identifier 123 from the medium. At Step 157g, the TV determines whether or not the all-image display identifier 123 indicates that all images are to be displayed. If all images are to be displayed, the TV displays all images at Step 157r. On the other hand, if all images are not to be displayed, then at Step 157h, the TV displays a part of images in a specific directory identified by the directory information 124 that is read at Step 157s from the medium. At Step 157i, the TV determines whether or not a list display identifier 125 indicates that images to be displayed in a list. If the images are to be displayed in a list, then the TV reads a display order identifier 122 at Step 157t. At Step 157j, the TV displays the images in a list in a date order or an upload order based on the display order identifier. At Step 157v, the TV reads a slide show identifier 126 from the medium. At Step 157k, the TV determines whether or not the slide show identifier 126 indicates that images are to be displayed as slide show. If the images are to be displayed as a slide show, then at Step 157m, the TV displays the images as slide show based on the display order identifier 122. Then, the TV reads image quality prioritization 127 from the second memory of the medium. At Step 158a of FIG. 15, the TV determines whether or not the image quality prioritization 127 indicates that the images are to be displayed by prioritizing image quality. If the images are not to be displayed by prioritizing image quality, the TV reads speed prioritization 128 from the medium at Step 158q and further determines at Step 158b whether or not the speed prioritization 128 indicates that the images are to be displayed by prioritizing a speed. If a speed is to be prioritized, then the TV determines at Step 158c whether or not the server stores display audio. At Step 158s, the TV reads and checks display audio server directory 130 from the medium. At Step 158d, the TV accesses the directory in the server to obtain the display audio and outputs the audio.

At Step 158e, the TV determines whether or not all images are to be displayed as priorities. If all images are not to be displayed as priorities, then at Step 158f, the TV selects a part of the images. At Steps 158g, the TV reads specific directory information 124 from the medium at Step 158v, and receives images in the specific directory from the server at Step 158w. At Step 158h, the TV displays the images in the specific directory. On the other hand, if it is determined at Step 158e that all images are to be displayed as priorities, then the TV may display all images at Step 158i. At Step 158j, the TV determines whether or not the image display is completed. If the image display is completed, then the TV displays a message "view other image(s)?" at Step 158k. If the user agrees, then the TV displays a menu of images in different directories at Step 158m.

Figure 16:
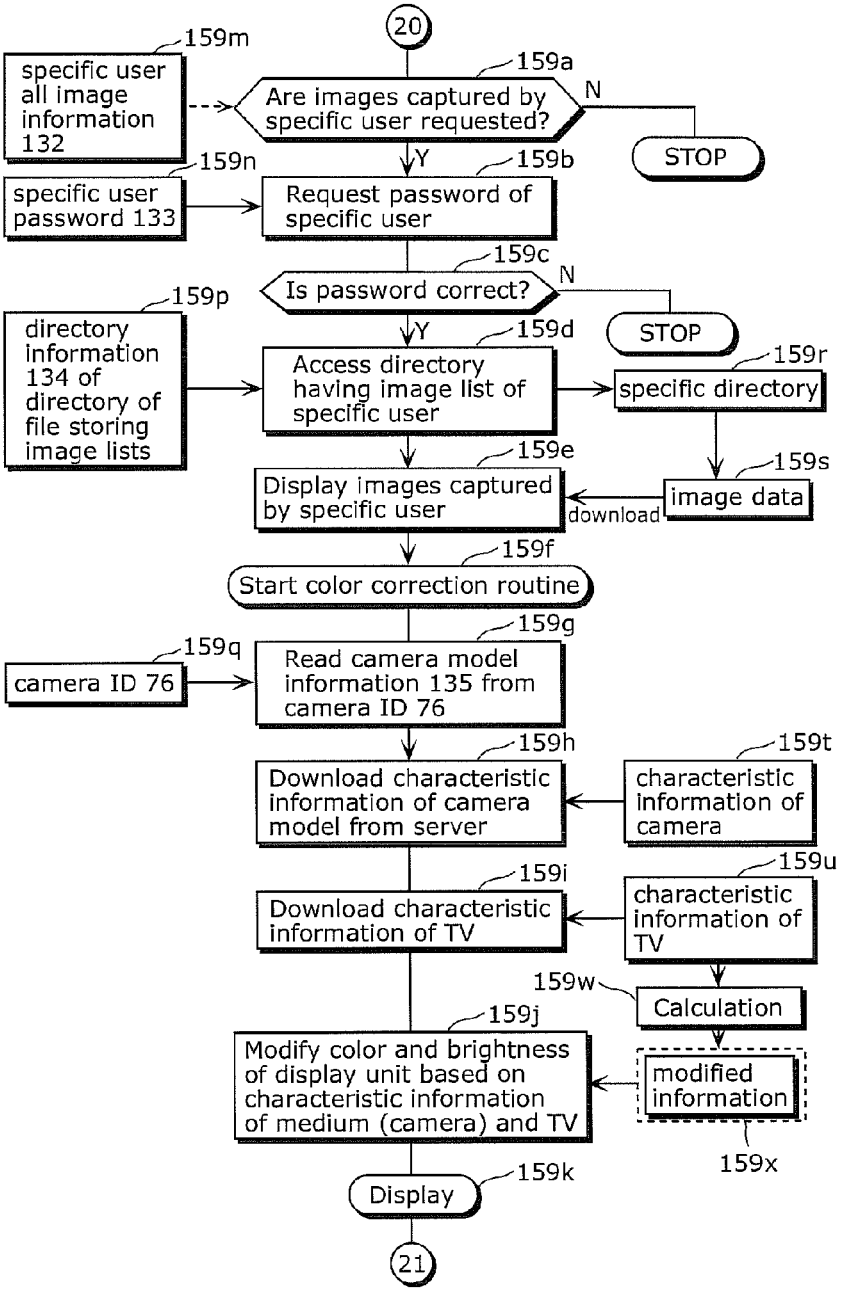
FIG. 16 is a flowchart of the processing performed by the image capturing device and the TV, according to the first embodiment of the present invention.

At Step 159a of FIG. 16, the TV determines whether or not images captured by a specific user are requested. If images captured by a specific user are requested, then at Step 159b, the TV requests the medium to provide (a) specific user all image information 132 at Step 159m and (b) a specific user password 133 that is a password of the specific user. At Step 159c, the TV determines whether or not the password is correct. If the password is correct, then at Step 159p, the TV reads directory information 134 of a directory of a file storing an image list from the medium. At Step 159d, the TV accesses the server to access a directory having an image list of the specific user. At Step 159r, the TV downloads image data in the directory from the server. At Step 159e, the TV displays the images captured by the specific user.

At Step 159f, the TV starts color correction routine. At Step 159g, the TV reads camera model information from the camera ID 76. At Steps 159h and 159t, the TV downloads characteristic information of the camera model from the server. Then, at Steps 159i and 159u, the TV downloads characteristic information of the TV from the server. At Step 159w, the server calculates the characteristic information to generate modified information. At Step 159j, the TV modifies color and brightness of the display unit based on the pieces of characteristic information of the medium (camera) and the TV. At Step 159k, the TV displays the images with the modified color and brightness.

Figure 17:
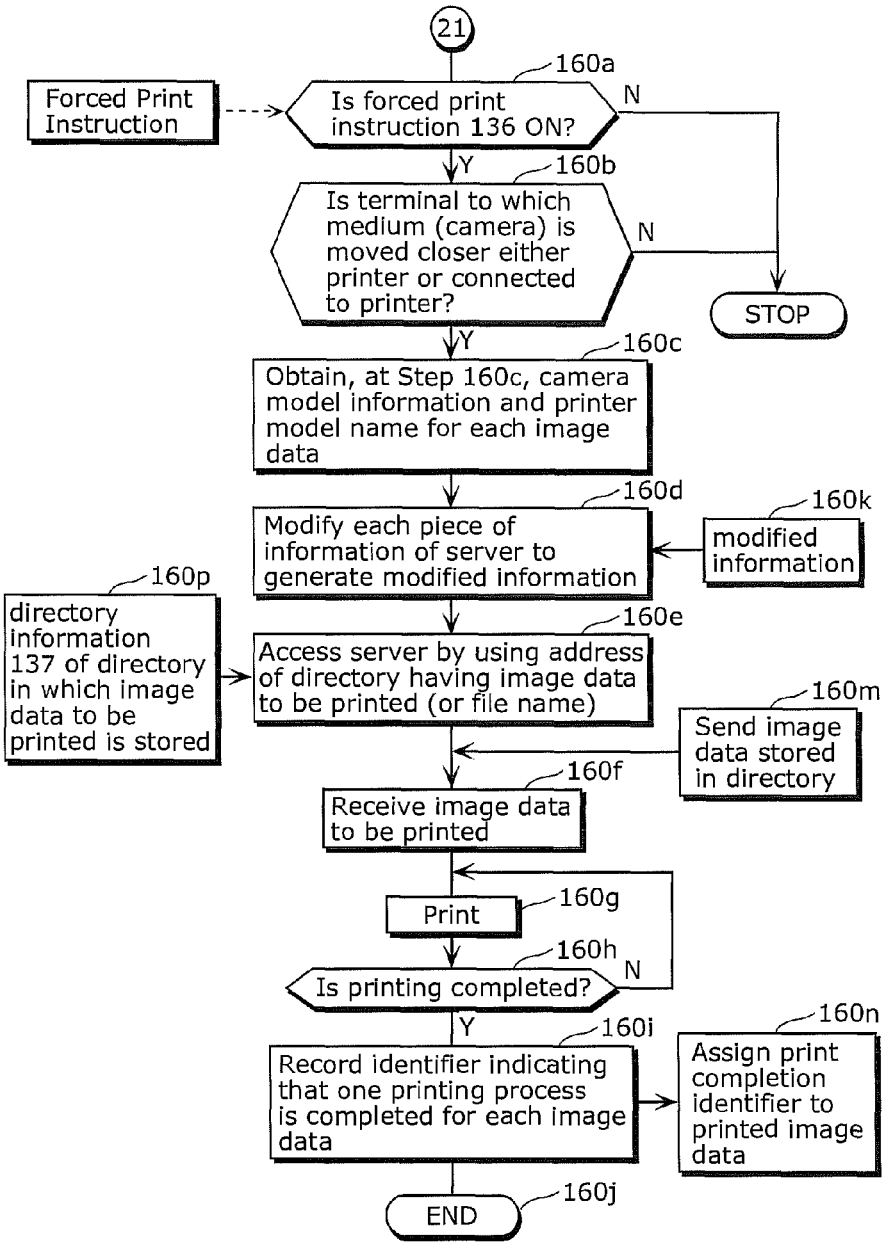
FIG. 17 is a flowchart of the processing performed by the image capturing device and the TV, according to the first embodiment of the present invention.

At Step 160a of FIG. 17, the TV determines whether or not forced print instruction is selected. Here, if forced print instruction is selected, it is determined at Step 160b whether or not the terminal (the TV in the above example) to which the medium (camera) is moved closer is a printer or a terminal connected to the printer. If the terminal is a printer or a terminal connected to the printer, then the terminal obtains, at Step 160c, camera model information of the medium (camera) and a model name of the printer for each image data. At Step 160d, the terminal modifies each piece of information of the server to generate modified information. At Step 160p, the terminal receives directory information 137 of a directory in which the image data to be printed is stored. At 160e, the terminal accesses the server by using an address of the directory having the image data to be printed (or file name). At Step 160m, the server sends the image data stored in the directory to the terminal. At Step 160f, the TV receives the image data to be printed. At Step 160g, the terminal prints the image data. At Step 160h, the printing is completed. At Step 160i, for each image data, the terminal records, onto the server, an identifier indicating that one printing process is completed. At Step 160n, the server assigns a print completion identifier to the image data that is stored in the server and has been printed.

Next, the following describes the situation where the medium such as a camera or a post card does not have a memory for storing data.

Figure 8:
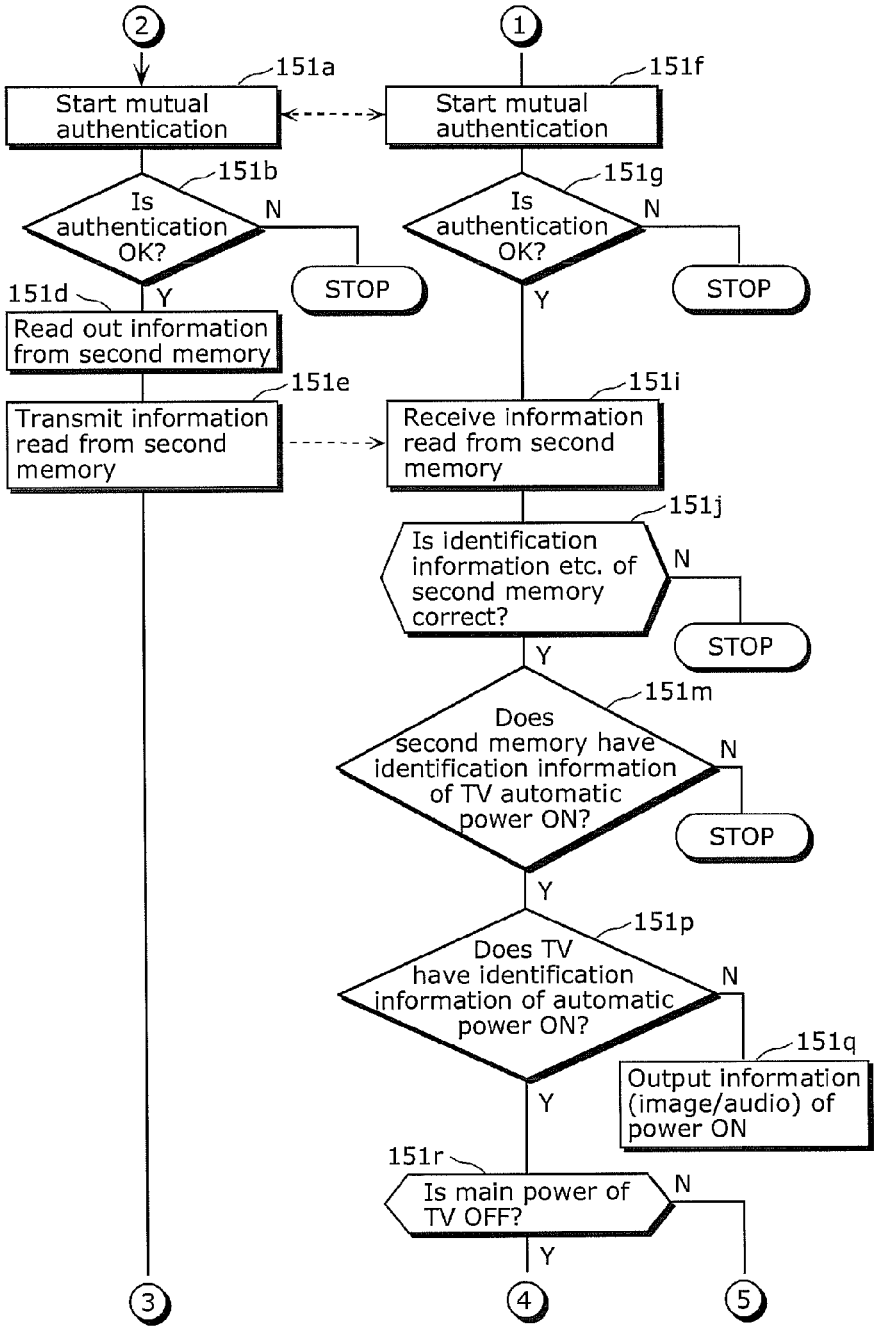
FIG. 8 is a flowchart of the processing performed by the image capturing device and the TV, according to the first embodiment of the present invention.
Figure 9:
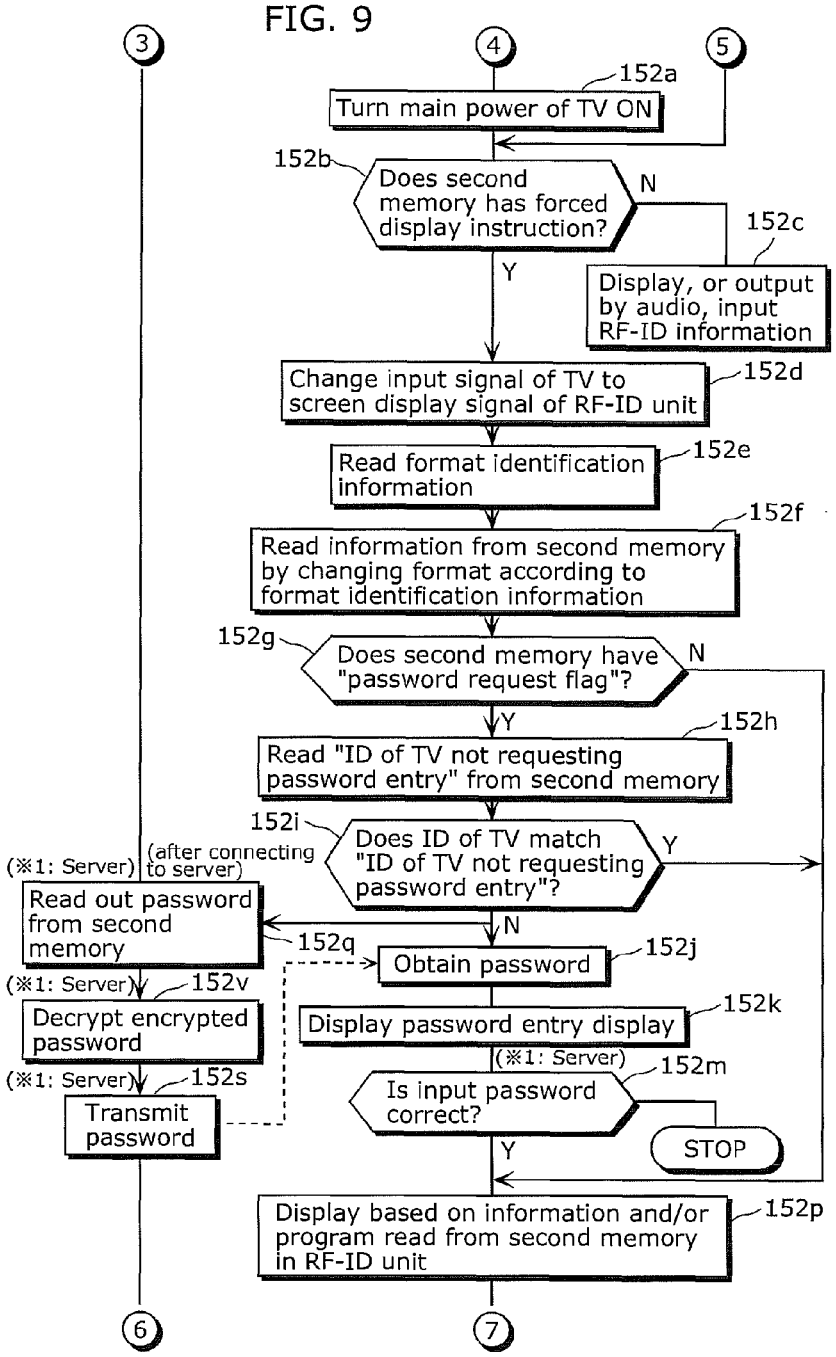
FIG. 9 is a flowchart of the processing performed by the image capturing device and the TV, according to the first embodiment of the present invention.
Figure 18:
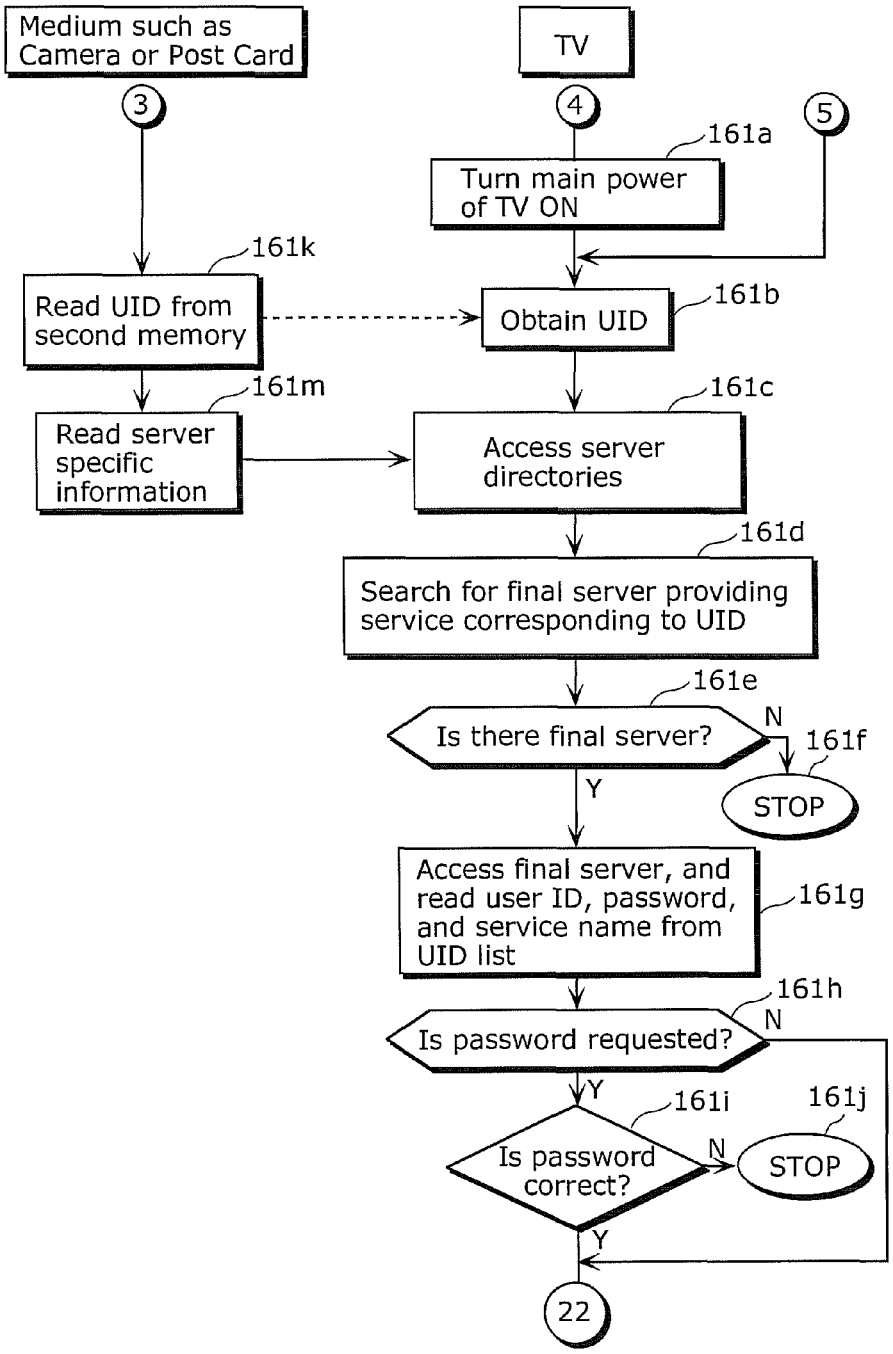
FIG. 18 is a flowchart of the processing performed by the image capturing device and the TV, according to the first embodiment of the present invention.

Steps of FIG. 18 follow the numbers 3, 4, and 5 in circles in FIG. 8. At Step 161a of FIG. 18, a main power of the TV is turned ON. At Step 161k, the TV reads UID of the RF-ID unit from the second memory. At Step 161b, the TV obtains the UID. At Step 161m, the TV reads the server specific information 48 from the second memory. At Step 161c, the TV accesses a server directory. At Step 161d, the TV searches the server directories for a final server providing service corresponding to the UID. At Step 161e, the TV determines whether or not such a final server exists. If there is such a final server, then at Step 161g, the TV accesses the final server and reads a user ID, a password, and a service name from a UID list. At Step 161h, the TV determines whether or not a password is requested. If the password is requested, then the TV determines at Step 161i whether or not the readout password is correct. At Step 162a of FIG. 19, the TV determines whether or not the service is regarding photographs or video. If the service is regarding photographs or video, then at Step 162b, the TV reads (i) reads, from a specific directory in the server associated with the UID, (a) a corresponding program such as a billing program, (b) a list including an address or a file name of image data to be displayed, (c) image display instruction information, (d) forced display instruction, (e) forced print instruction, and (f) camera ID, and (ii) automatically displays the image data or causes the image data to be printed, based on the above pieces of information and procedure.

Figure 20A:
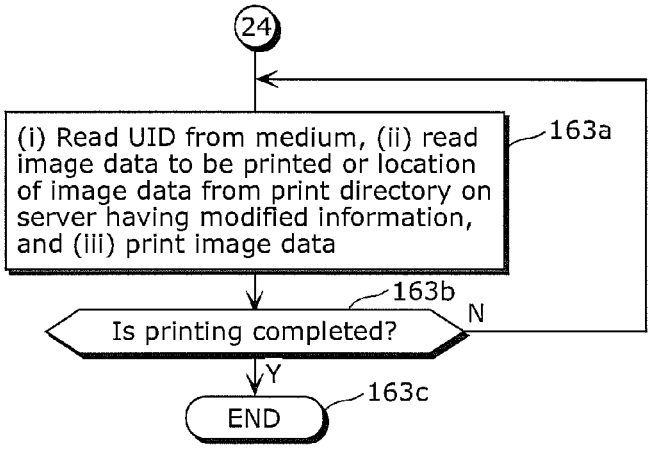
FIG. 20A is a flowchart of the processing performed by the image capturing device and the TV, according to the first embodiment of the present invention.

If needed, password entry is requested at Step 162b. At Step 162c, the TV determines whether or not the user desires to print a specific image. If the user desires to print a specific image, then at Step 162d, the TV adds data of the specific image to the server associated with the UID or to a print directory of the TV. At Step 162e, the TV determines whether or not the TV is connected to a printer and there is an independent printer. If so, then, at Step 162f, the RF-ID unit of the medium such as a post card is moved into proximity of a RF-ID reader/writer of the printer. At Step 163a of FIG. 20A, the printer (i) reads UID of the RF-ID from the medium, (ii) thereby reads image data to be printed or a location of the image data from the print directory on the server having the modified information, and (iii) prints the image data. At Step 163b, the printing is completed. Thereby, the above processing is completed.

Figure 19:
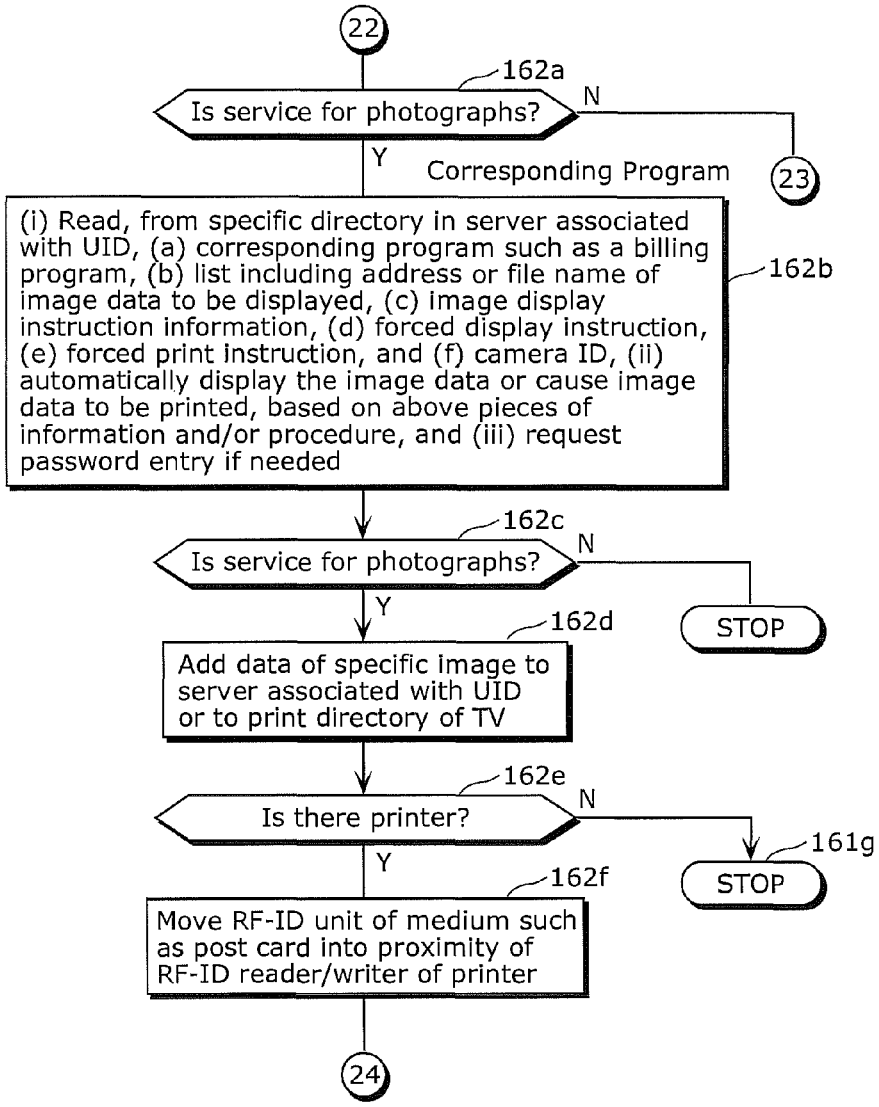
FIG. 19 is a flowchart of the processing performed by the image capturing device and the TV, according to the first embodiment of the present invention.
Figure 20B:
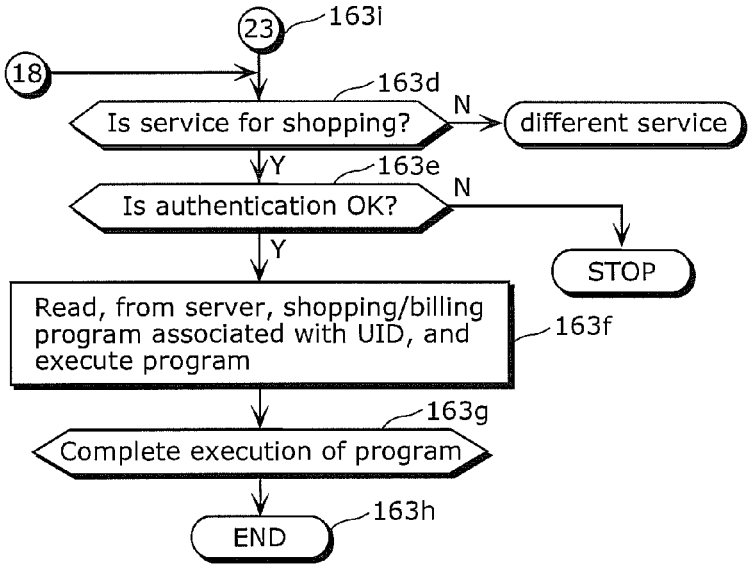
FIG. 20B is a flowchart of the processing performed by the image capturing device and the TV, according to the first embodiment of the present invention.

Step 163i of FIG. 20B is the number 23 in FIG. 19. At Step 163d, the TV determines whether or not the service is for shopping. If the service is for shopping, then the TV determines at Step 163e whether or not authentication is successful. If the authentication is successful, then at Step 163f, the TV reads, from the server, a shopping/billing program associated with the UID, and executes the program. At Step 163g, the execution of the program is completed. Thereby, the above processing is completed.

Next, the following describes a method of reading information from a RF-ID unit embedded in a postcard without a RF-ID reader.

Figure 21A:
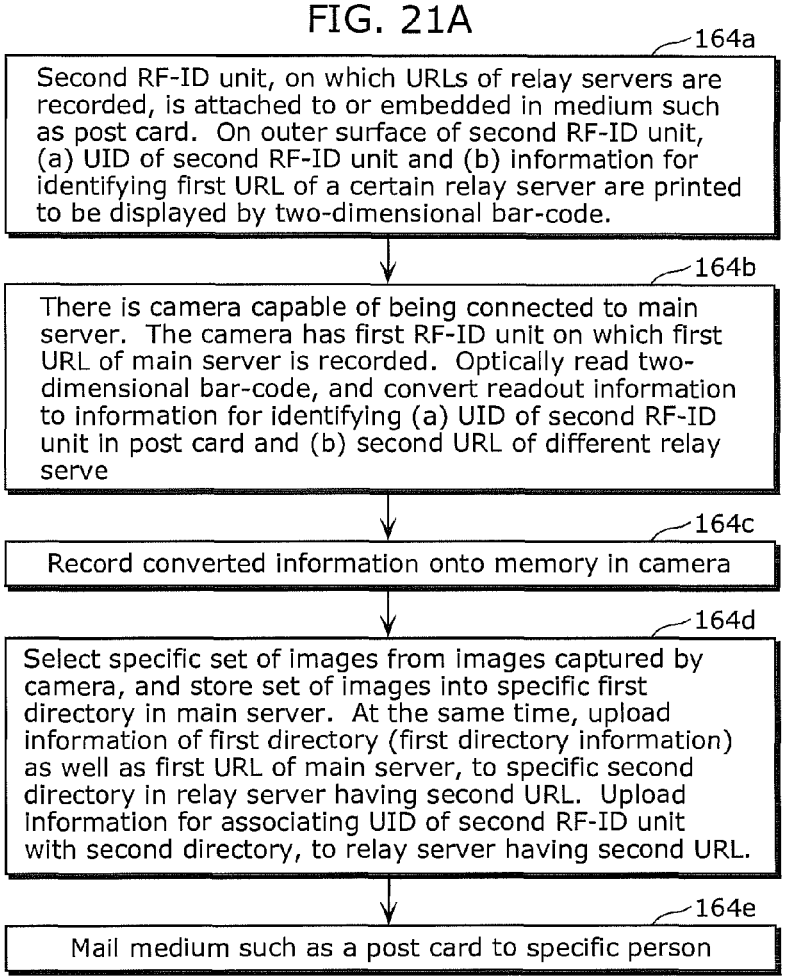
FIG. 21A is a flowchart of the processing performed by the image capturing device and the TV, according to the first embodiment of the present invention.
Figure 21B:
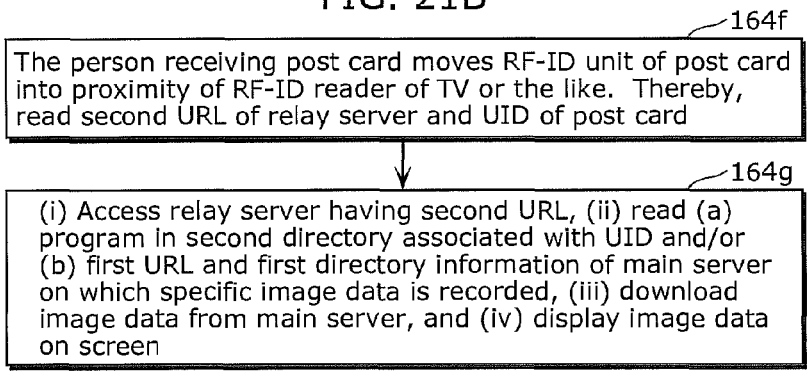
FIG. 21B is a flowchart of the processing performed by the image capturing device and the TV, according to the first embodiment of the present invention.

At Step 164a in FIG. 21A, a second RF-ID unit, on which URLs of relay servers are recorded, is attached to or embedded in the medium such as a post card. On the outer surface of the second RF-ID unit, (a) UID of the second RF-ID unit and (b) information for identifying a first URL of a certain relay server are printed to be displayed by a two-dimensional barcode.

At Step 164b, there is a camera capable of being connected to a main server. The camera has a first RF-ID unit on which a first URL of the main server is recorded. An image capturing unit in the camera optically reads the two-dimensional barcode, and converts the readout information to information for identifying (a) the UID of a second RF-ID unit in the post card and (b) a second URL of a relay server.

At Step 164c, the converted information is recorded onto a memory in the camera.

At Step 164d, the camera selects a specific set of images from images captured by the camera, and stores the set of images into a specific first directory in the main server. At the same time, the camera uploads information of first directory (first directory information) as well as the first URL of the main server, a specific second directory in the relay server having the second URL. The camera uploads information for associating the UID of the second RF-ID unit with the second directory, to the relay server having the second URL. At Step 164e, the medium such as a post card is mailed to a specific person.

At Step 164f, the person receiving the post card moves the RF-ID unit of the post card into proximity of a RF-ID reader of a TV or the like. Thereby, the TV reads, from the RF-ID unit, the second URL of the relay server and the UID of the post card.

At Step 164g, the TV accesses the relay server having the second URL. Then, the TV reads, from the relay server, (a) a program in the second directory associated with the UID and/or (b) the first URL and the first directory information of the main server on which specific image data is recorded. The TV downloads the image data from the main server. The TV displays the image data on a screen. In the above case, the image capturing unit in the image capturing device according to the first embodiment of the present invention reads information from the two-dimensional bar-code that is generally printed in a product or post card to record server information. Then, the image capturing device records the information read from the two-dimensional bar-code, as digital information, onto the second memory of the RF-ID unit. Thereby, the image capturing device allows a RF-ID reader of a TV to read the information. As a result, even a TV without an optical sensor for two-dimensional bar-codes can indirectly read information of two-dimensional bar-codes and automatically access a server or the like.

FIG. 22A illustrates the situation where display is presented when the image capturing device 1 is moved into proximity of a RF-ID antenna 138 of the TV 45.

When the image capturing device 1 is moved into proximity of the antenna 138, the TV 45 displays a camera icon 140 for notifying of that the medium is a camera in the manner described previously.

Next, since the number (for example, five) of images not yet been uploaded is detected, the TV 45 displays five blank images 142a, 142b, 142c, 142d, and 142e as if these images were taken out from the camera icon 140.

Thereby, the TV 45 displays "tangible" information of images by changing "materials to information". As a result, the user can perceive the information of images by more natural sense.

Regarding images that have been already uploaded to the server, actual images 143a, 143b, and 143c are displayed as tangible data in the same manner as described above.

FIG. 22B illustrates the situation where RF-ID is embedded in a post card 139. Since the RF-ID reader/writer 46 of the TV 45 reads attribute information of the post card from the RF-ID. Thereby, the TV 45 displays a post-card icon 141 at a bottom left corner of the display unit of the TV 45 as illustrated in FIG. 22B. The TV 45 also displays images stored in the server or a menu screen as tangible data in the same manner as described with reference to FIG. 22A.

Next, the following processing is described in detail. By the processing, an operation program 116 illustrated in FIG. 4 is transmitted to the TV 45 illustrated in FIG. 3 that is an apparatus (device) communicating with the RF-ID unit 47 of the image capturing device 1. The communicating device (TV 45) executes the transmitted program.

Figure 23:
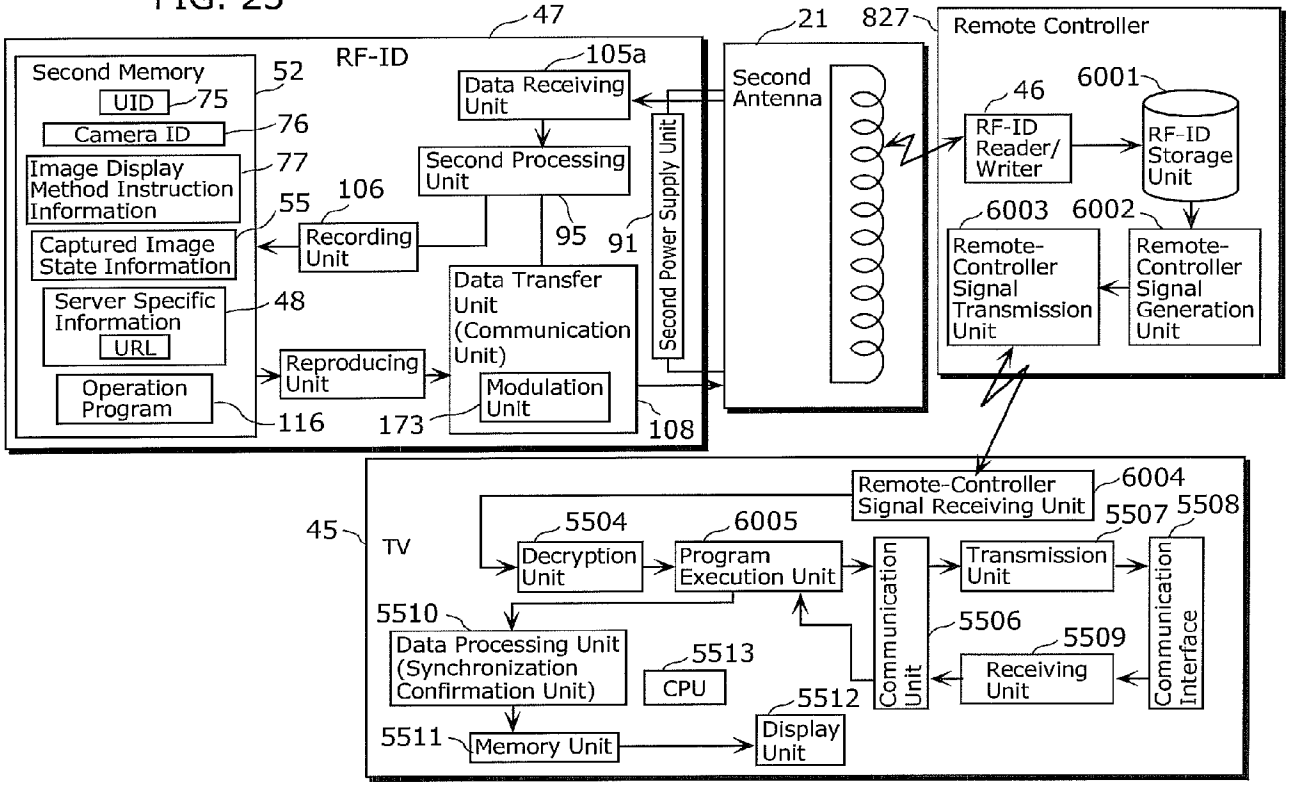
FIG. 23 is a block diagram of a RF-ID unit in the image capturing device for storing an operation program, a remote controller of the TV, and the TV.

FIG. 23 is a block diagram of a configuration in which the apparatus communicating with the RF-ID unit 47 in the image capturing device 1 executes the transmitted program. FIG. 23 illustrates a communication system including a part of the image capturing device 1 (the RF-ID 47 and the second antenna 21), the TV 45, and a remote controller 827 of the TV 45. Here, the image capturing device 1 is implemented as a camera which has the RF-ID unit 47 to perform proximity wireless communication with the RF-ID reader/writer 46. The RF-ID reader/writer 46 is connected to the TV 45 by an infrared communication path. The camera includes the second antenna 21, the data receiving unit 105, the second memory 52, and the data transfer unit 108. The second antenna 21 is used for the proximity wireless communication. The data receiving unit 105 receives, via the second antenna 21, an input signal provided from the RF-ID reader/writer 46. The second memory 52 is a nonvolatile memory holding at least (a) the UID unit 75 that is identification information for identifying the image capturing device 1, and (b) the operation program 116 that is to be executed by the TV 45 with reference to the UID unit 75. The data transfer unit 108 transmits the UID unit 75 and the operation program 116 stored in the second memory 52 to the RF-ID reader/writer 46 via the second antenna 21, according to the input signal received by the data receiving unit 105. The UID unit 75 and the operation program 116 transmitted from the data transfer unit 108 are transmitted to the TV 45 via the data transfer unit 108, the second antenna 21, the RF-ID reader/writer 46, and then the infrared communication path. The following explains the above units in more detail.

The RF-ID unit 47 in the image capturing device 1 has the second memory 52. The second memory 52 holds the operation program 116. The operation program 116 can be executed by the TV 45 communicating with the RF-ID unit. In more detail, the operation program 116 is an example of the program executed by the TV 45 with reference to the identification information of the image capturing device 1. The operation program 116 is, for example, an execution program such as Java™ program, a virtual-machine script program such as Javascript™ program, or the like.

The reproducing unit in the RF-ID unit 47 reads necessary information and the operation program 116 from the second memory 52. The necessary information is required to execute the operation program 116. The necessary information includes the UID unique to the image capturing device 1, the server specific information including the URL of the server, and the like. The necessary information and the operation program 116 are transmitted to the RF-ID reader/writer 46 in the remote controller 827 via the data transfer unit 108 and the second antenna 21. The remote controller 827 remotely controls the TV 45.

The RF-ID reader/writer 46 of the remote controller 827 receives the necessary information and the operation program from the RF-ID unit 47 of the image capturing device 1 and stores them into a RF-ID storage unit 6001.

A remote-controller signal generation unit 6002 in the remote controller 827 converts the necessary information and the operation program, which are transmitted from the RF-ID unit 47 of the image capturing device 1 and stored in the RF-ID storage unit 6001, to remote-controller signals. The remote-controller signals, such as infrared signals, are widely used in communication for present remote controllers.

To the TV 45, a remote-controller signal transmission unit 6003 transmits the remote-controller signals including the operation program which are generated by the remote-controller signal generation unit 6002.

A remote-controller signal receiving unit 6004 in the TV 45 receives the remote-controller signals from the remote controller 827. A program execution unit 6005, such as a Java™ virtual machine, retrieves the necessary information and the operation program in the RF-ID unit 47 of the image capturing device 1, from the remote-controller signals by using a decryption unit 5504. Thereby, the program execution unit 6005 executes the operation program.

Figure 24:
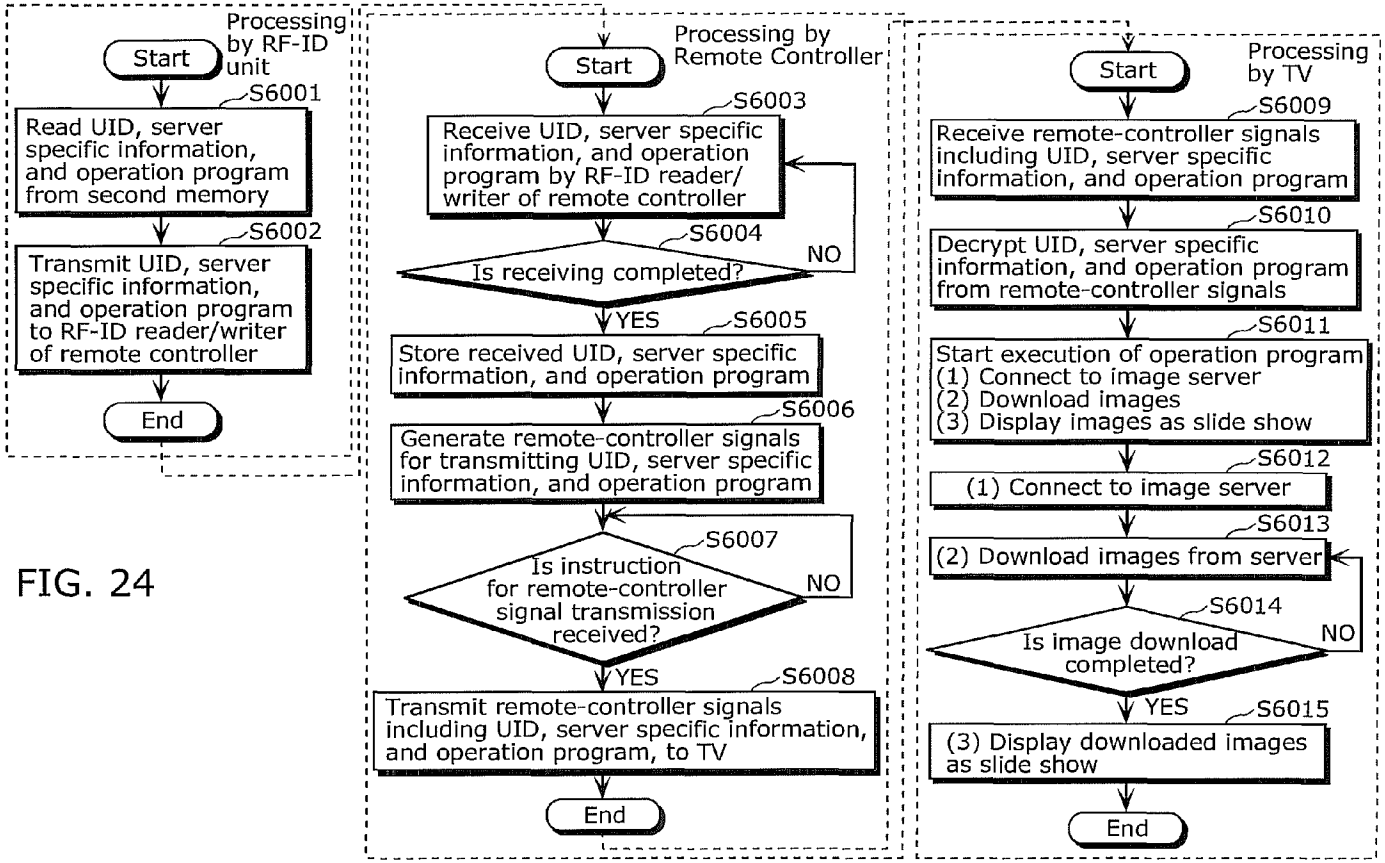
FIG. 24 is a flowchart of processing for transferring and executing the operation program stored in the RF-ID unit.

FIG. 24 is a flowchart of execution of the operation program for "downloading data of images from an image server with reference to identification information (UID in this example) of the image capturing device 1, and displaying the images as a slide show".

When the remote controller is moved into proximity of the image capturing device 1, the RF-ID reader/writer 46 of the remote controller provides power to the RF-ID unit 47 in the image capturing device 1 via RF-ID communication. Thereby, the UID 75 unique to the image capturing device 1, the URL 48 of the image server (image server URL), and the operation program 116 are read from the second memory 52 (S6001). The readout UID, image server URL, and operation program are transmitted to the remote controller 827 via the data transfer unit 108 and the second antenna 21 (S6002). Here, as presented in FIG. 25, the operation program includes server connection instruction 6006, download instruction 6008, slide show display instruction 6010, download-completion-time processing set instruction 6007, and download-completion-time instruction 6009. The remote controller 827 receives the UID, the image server URL, and the operation program from the image capturing device 1 via the RF-ID reader/writer 46 (S6003). A determination is made as to whether or not receiving is completed (S6004). If receiving is completed, then the UID, the image server URL, and the operation program are stored in the RF-ID storage unit 6001 (S6005). Then, the UID, the image server URL, and the operation program are converted to remote-controller signals transmittable by infrared ray (S6006). A determination is made as to whether or not the user performs a predetermined input operation by the remote controller 827 to instruct to transmit the remote-controller signals to the TV 45 (S6007). If the instruction is received by from user, then the remote-controller signal transmission unit 6003 transmits the remote-controller signals including the image server URL and the operation program to the TV 45 (S6008). In other words, serving as a common remote controller, the remote controller 827 serves also as a relay device that transfers the UID, the image server URL, and the operation program from the image capturing device 1 to the TV 45 by using the embedded RF-ID reader/writer 46.

Next, the TV 45 receives the remote-controller signals from the remote controller 827 (S6009). The decryption unit 5504 in the TV 45 retrieves (decrypts) the UID, the image server URL, and the operation program from the remote-controller signals (S6010). Then, the program execution unit 6005 executes the operation program with reference to the image server URL (S6011 to S6015). More specifically, by the operation program, connection between the TV 45 and the image server 42 on a communication network is established with reference to the image server URL (S6012, and 6006 in FIG. 25). Then, with reference to the UID unique to a corresponding image capturing unit, image data captured by a specific image capturing unit is selected from the image data 50 stored in the storage device of the image server 42, and the selected image data is downloaded to the TV 45 (S6013, and 6008 in FIG. 25). In other words, the UID is used to select image data associated with the image capturing device 1 indicated by the UID, from among pieces of image data stored in the image server 42. A determination is made as to whether or not the image download is completed (S6014). If the image download is completed, the downloaded images are sequentially displayed as a slide show (S6015, and 6007, 6009, and 6010 in FIG. 25). The download-completion-time processing set instruction 6007 in FIG. 25 is instruction for setting processing to be performed when image downloading is completed. In the example of FIG. 25, the download-completion-time processing set instruction 6007 instructs the download-completion-time instruction 6009 as the processing to be performed when image downloading is completed. Moreover, the download-completion-time instruction 6009 calls the slide show display instruction 6010 for performing a slide show of the images.

It should be noted that, referring to FIGS. 23 and 24, it has been described that the operation program and the necessary information for the operation program are transferred from the image capturing device 1 to the TV 45 via the remote controller 827. However, the RF-ID reader/writer 46 of the remote controller 827 may be provided to the TV 45. In other words, the RF-ID reader/writer 46 may be embedded in the TV 45. Furthermore, the communication path connecting the reader (RF-ID reader/writer 46) to the apparatus may be a wireless communication path such as infrared communication path, or a wired signal cable.

It should also be noted that, in the above-described execution example, the UID is used to select image data associated with the image capturing device 1 from among pieces of image data stored in the image server 42. However, it is also possible to use the UID to identify the image server storing the image data. Here, it is assumed that, in a communication system including a plurality of image servers, UID is associated with an image server storing image data captured by an image capturing device identified by the UID. Under the assumption, if the operation program is created so that a URL of the image server can be identified with reference to the UID, the TV 45 executing the operation program can identify, by using the UID, the image server associated with the UID from the plurality of image servers and thereby download the image data from the identified image server.

It should also be noted that the identification information for identifying the image capturing device 1 is not limited to UID. The identification information maybe any other information regarding the image capturing device 1, such as a serial number, a product serial number, a Media Access Control (MAC) address, or information equivalent to the MAC address, for example, an Internet Protocol (IP) address. Moreover, if the image capturing device 1 serves as an access point on a wireless LAN, the identification information maybe a Service Set Identifier (SSID) or any information equivalent to SSID. It should also be noted that, in the above-described second memory 52, the identification information (UID unit 75) for identifying the image capturing device 1 has been described to be stored separately from the operation program 116. However, the identification information may be stored (described) in the operation program 116.

It should also be noted that the remote-controller signals (in other words, the communication path connecting the reader to the apparatus) are described to employ infrared ray. However, the remote-controller signals are limited to the above, but may employ a wireless communication method such as Bluetooth. The use of wireless communication that is generally speedier than infrared communication can shorten a time required to transfer an operation program and/or the like.

It should be noted that the operation program is not limited to the program in the format presented in FIG. 25. The operation program may be described in any other programming language. For example, the operation program described in Java™ can be easily executed by various apparatuses (devices), because the program execution circumstances called JavaVM™ have broad versatility. The operation program may be described in a compact programming language in a script format represented by Javascript™ so as to be stored in a small storage capacity. The operation program in such a compact programming language can be stored in the RF-ID unit 47 in the second memory 52 even if the RF-ID unit 47 has a small storage capacity. Moreover, the operation program may be in an executable format applied with processing such as compiling, rather than a source code presented in FIG. 25. The program can reduce a processing load on apparatuses having program execution environments.

Figure 26:
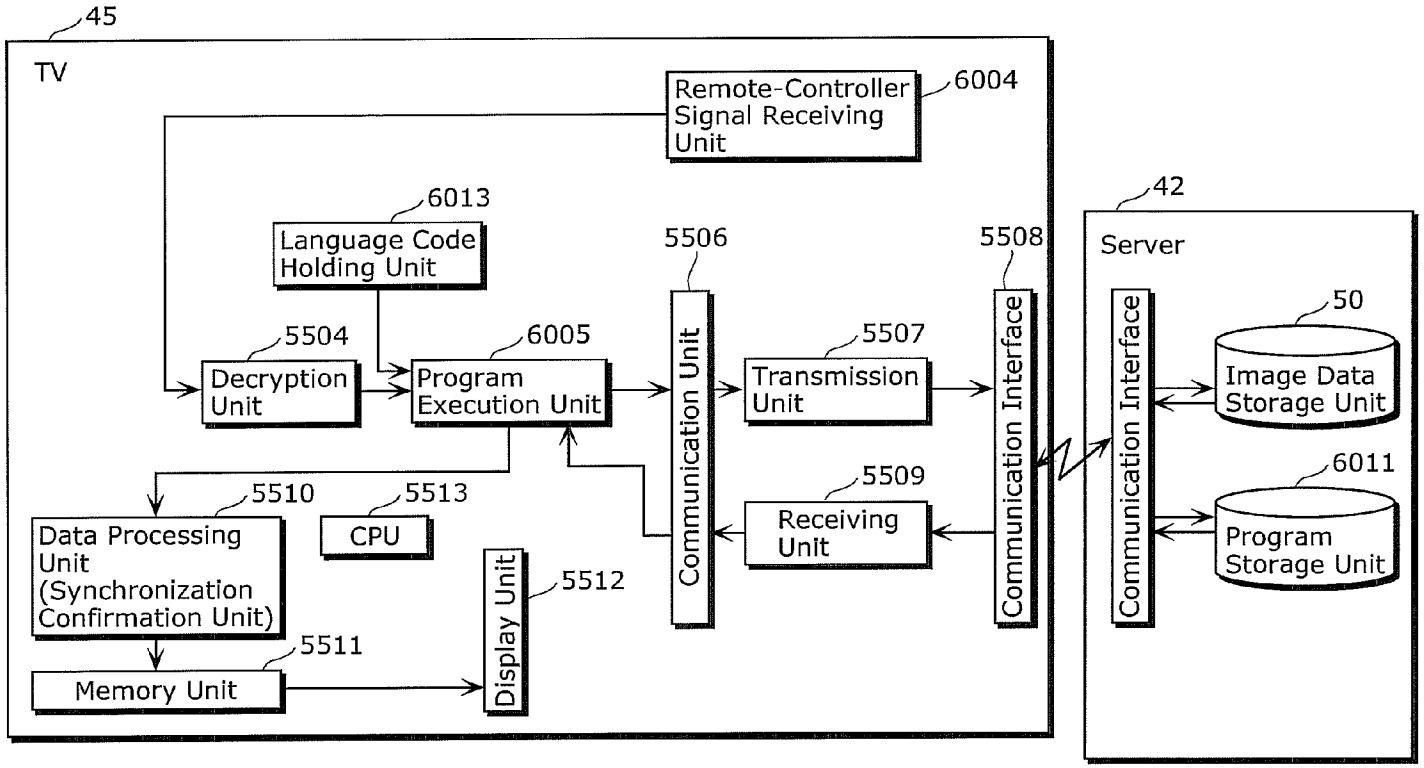
FIG. 26 is a block diagram of (a) the TV changing processing of the operation program according to a language code, and (b) a server storing the program.
Figure 27:
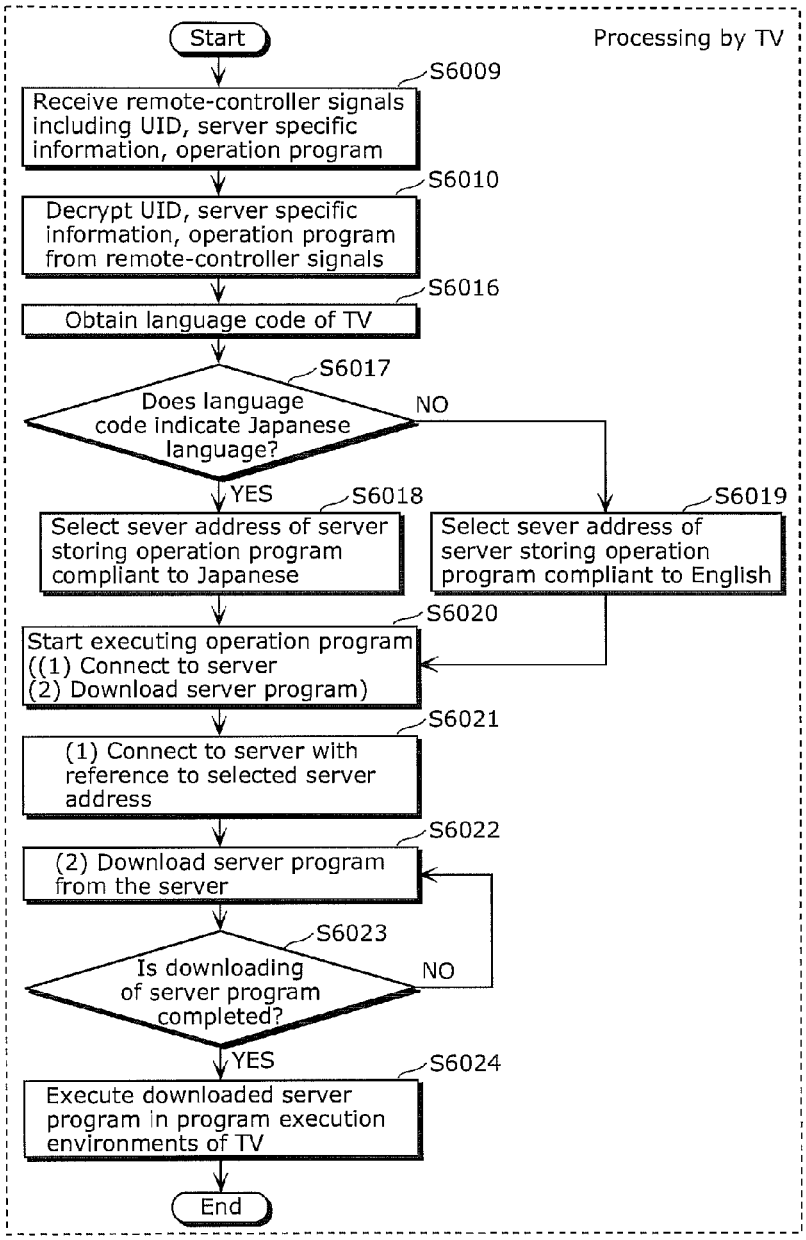
FIG. 27 is a flowchart of processing for changing processing of the operation program according to a language code.

The following describes, in detail, the processing of changing execution of a program depending on information unique to a display device (such as the TV 45) having a RF-ID reader, with reference to FIGS. 26 and 27.

The TV 45 illustrated in FIG. 26 further includes a language code holding unit 6013. When the operation program received as remote-controller signals is executed to connect the TV 45 to the server 42, the program execution unit 6005 reads a language code from the language code holding unit 6013 to connect the TV 45 to the server 42 compliant to the language code. Then, the operation program is executed to download a server program from the server 42, and executes the downloaded server program. For example, if the language code indicates Japanese language, the TV 45 is connected to the server 42 having a program storage unit 6011 in which a server program compliant to Japanese language is stored, and then the server program is obtained from the program storage unit 6011 to be executed in the TV 45. More specifically, the operation program stored in the RF-ID unit 47 of the image capturing device 1 as illustrated in FIG. 23 executes only connection to the server 42, while other processing such as image display is executed by the server program downloaded from the server 42.

The steps in the above processing are described with reference to FIG. 27. The processing by which the TV 45 receives the operation program and the necessary information for the operation program from the RF-ID unit 47 of the image capturing device 1 is the same as the processing described previously with reference to FIG. 24. In FIG. 27, it is assumed that the server specific information which the TV 45 receives as remote-controller signals includes two different server addresses which are (a) a sever address of a server 42 compliant to English and (a) a server address of a different server 42 compliant to Japanese. It is also assumed that the operation program which the TV 45 receives as remote-controller signals includes instruction for connecting the TV 45 to a server indicated by the server connection instruction 6006 in FIG. 25.

In the execution environments, the TV 45 obtains a language code of the TV 45 (S6016). The TV 45 determines whether or not the language code indicates Japanese language (S6017). If the language code indicates Japanese language, then the TV 45 selects, from the server specific information, a sever address of a server having a program storage unit 6011 storing an operation program for processing compliant to Japanese (S6018). On the other hand, if the language code does not indicate Japanese language, then the TV 45 selects, from the server specific information, a server address of a server having a program storage unit 6011 storing an operation program for processing compliant to English (S6019). Next, the TV 45 is connected to the server 42 with reference to the selected server address (S6021). The TV 45 downloads a server program from the server 42 (S6022, S6023). The TV 45 executes the downloaded server program in the program execution environments (for example, a virtual machine) of the TV 45 (S6024).

It should be noted that the use of the language code has been described in FIGS. 26 and 27, but the language code may be replaced by other information. Examples are a product serial number, a serial number of the display device (TV 45), and the like each of which indicates a country where the display device is on the market or equipped.

Figure 28:
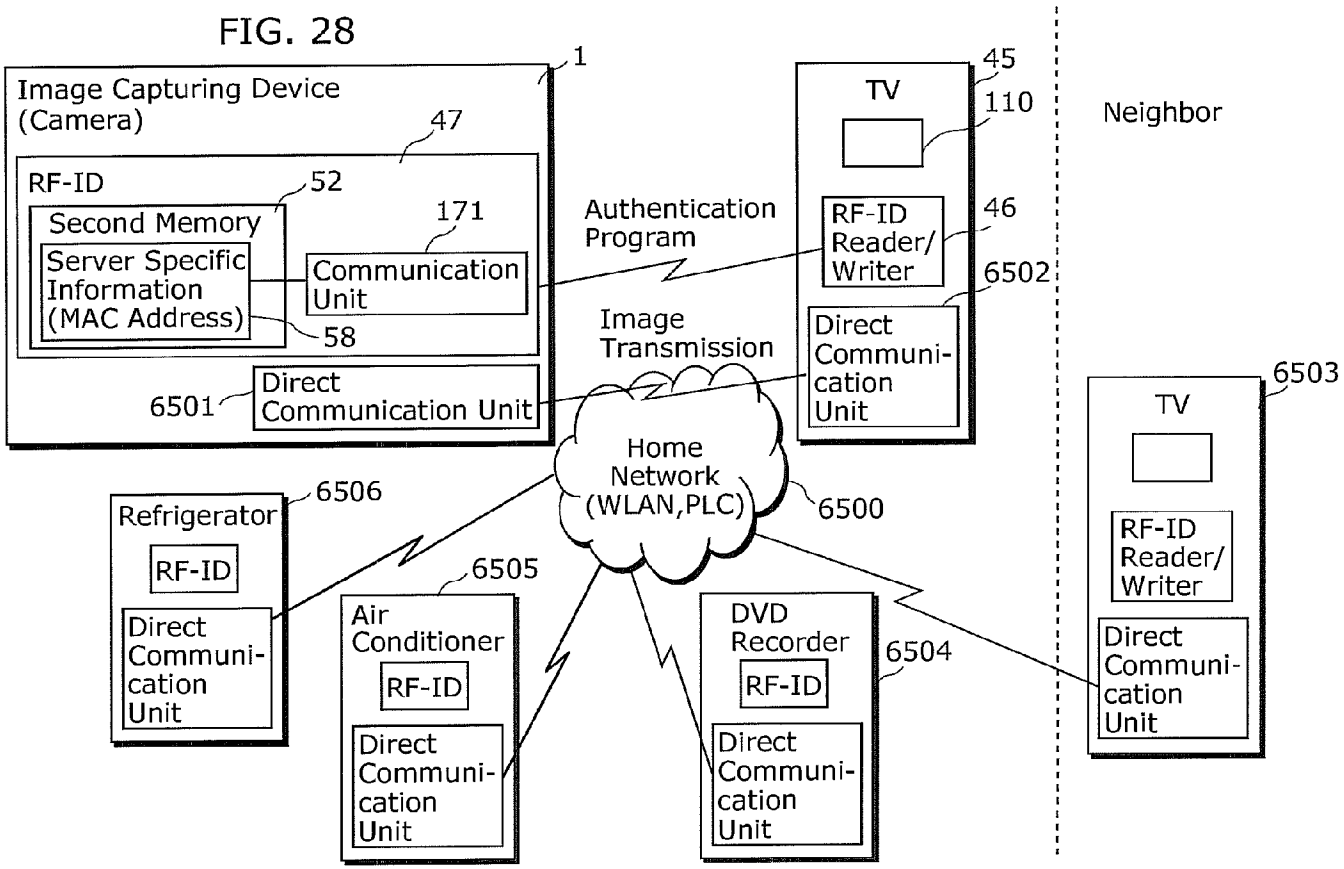
FIG. 28 is a block diagram of a home network 6500 connecting the image capturing device 1 to the TV 45 by a wireless LAN.

FIG. 28 illustrates a configuration of a home network 6500 in which the image capturing device 1 and the TV 45 are connected to each other via a wireless LAN or Power Line Communication (PLC). When the image capturing device 1 has a direct communication unit 6501 and the TV 45 has a direct communication unit 6502 so that the image capturing device 1 and the TV 45 can communicate directly with each other via the wireless LAN, the image capturing device 1 can transmit images to the TV 45 without using the server on the Internet. In other words, the image capturing device 1 serves also as a server. In this case, however, some communication mediums such as the wireless LAN used in the home network 6500 is easily intercepted by others. Therefore, safe data communication requires mutual authentication and exchange of encrypted data. For example, for existing wireless-LAN terminals (devices), access points serve as authentication terminals. If such an existing terminal is to authenticate its communication party, the terminal displays all connectable access points on its screen. The user selects one of the displayed access points from the screen. Then, the user presses a Wired Equivalent Privacy (WEP) key to perform encrypted communication. However, the above processing bothers general users. In addition, if a wireless LAN is embedded in home appliances such as a TV, there are so many terminals with which the existing terminal can communicate with authentication. If the user lives in an apartment house, the user can communicate even with terminals in neighbors. As a result, it is difficult for the user to select a terminal to be authenticated. For instance, if a neighbor has a TV 6503 that is the same model of the user's TV 45, the user has difficulty in distinguishing the TV 45 in the user's house from the TV 6503 based on the information displayed on the screen of the existing device.

The first embodiment of the present invention can solve the above problem. In the first embodiment of the present invention, RF-ID is used to perform authentication. In more detail, an authentication program including a MAC address 58 is recorded, as an operation program, in the second memory 52 in the RF-ID unit 47 of the image capturing device 1. When the image capturing device 1 is moved into proximity of the RF-ID reader/writer 46 of the TV 45, the image capturing device 1 provides the authentication program to the TV 45. The authentication program includes not only the MAC address but also a cryptography key for authentication (hereinafter, "authentication cryptography key") and an authentication command When the TV 45 recognizes that the information provided from the RF-ID unit 47 includes the authentication command, the TV 45 performs authentication processing. The communication unit 171 in the RF-ID unit 47 cannot communicate with the TV 45, until the image capturing device 1 is physically located in proximity of the RF-ID reader/writer 46. Therefore, it is extremely difficult to intercept the communication between the image capturing device 1 and the TV 45 which is performed in a house. In addition, since the image capturing device 1 is moved into proximity of the TV 45 to exchange data, it is possible to prevent that the image capturing device 1 authenticates a wrong device (apparatus), such as the TV 6503 in a neighbor or a DVD recorder 6504 in the user's house.

Figure 29:
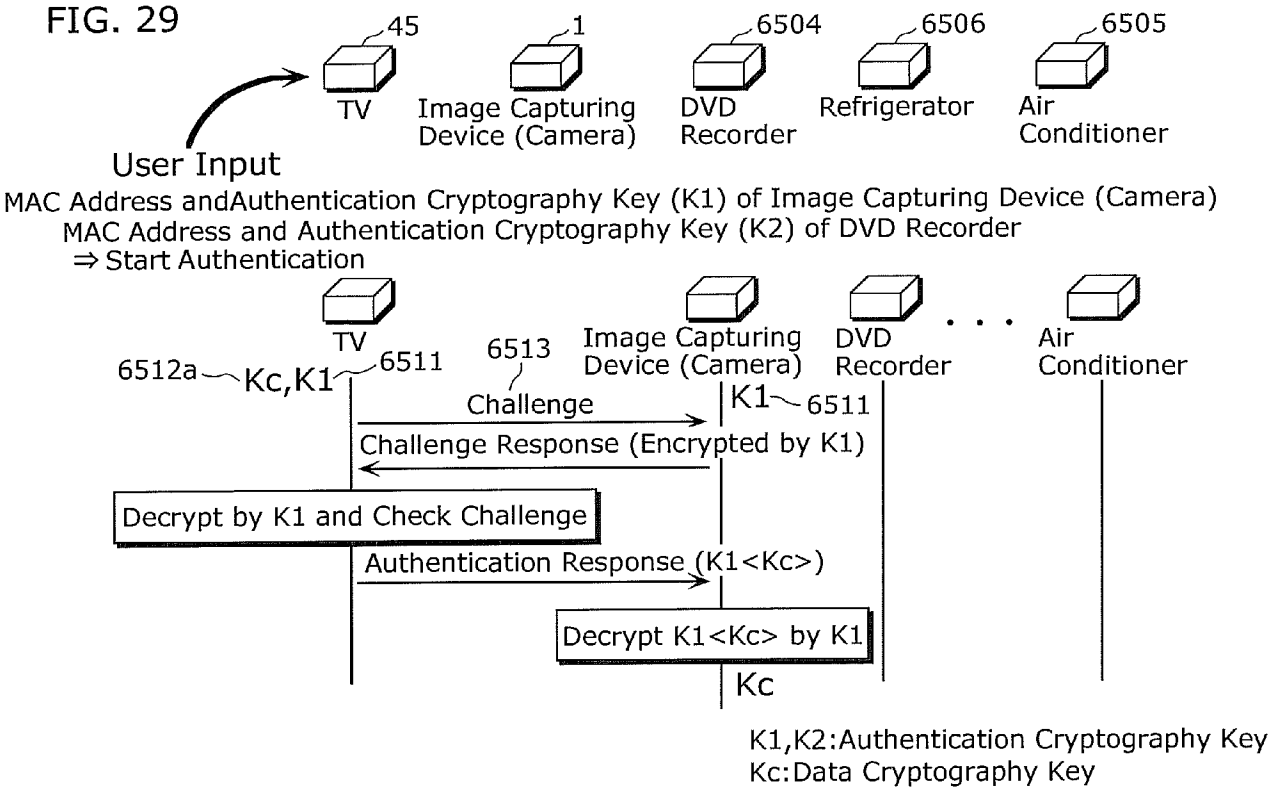
FIG. 29 presents an example of an authentication method without using RF-ID unit.

The following is an example of an authentication method without using RF-ID with reference to FIG. 29. A user inputs, to the TV 45, (a) MAC addresses of terminals to be authenticated, such as the camera (the image capturing device 1) and the DVD recorder 6504, which the user intends to authenticate for communication, and (b) authentication cryptography keys 6511 for the terminals. The TV 45 receiving the inputs transmits an appropriate message called a challenge 6513, to a target terminal having the MAC address. When the image capturing device 1 receives the challenge 6513, the image capturing device 1 encrypts the challenge 6513 using the authentication cryptography key 6511, and returns the encrypted challenge 6513 to the TV 45 that is a terminal from which the challenge 6513 has been provided. In receiving the encrypted challenge 6513, the TV 45 decrypts the encrypted challenge 6513 using the authentication cryptography key 6511. Thereby, the TV 45 can authenticate the authentication cryptography key 6511 to prevent user's error and intervention of other malicious users. Next, the TV 45 encrypts a cryptography key 6512a for data (hereinafter, a "data cryptography key 6512a") using the authentication cryptography key 6511. Then, the TV 45 transmits the encrypted data cryptography key 6512a to the image capturing device 1. Thereby, it is possible to perform the encrypted data communication between the TV 45 and the image capturing device 1. The TV 45 performs the above-described processing also with the DVD recorder 6504 and other apparatuses (terminals) 6505 and 6506 in order to share the data cryptography key 6512a among them. Thereby, the TV 45 can perform encrypted communication with all terminals (devices, apparatuses, or the like) connected in the home network.

Figure 30:
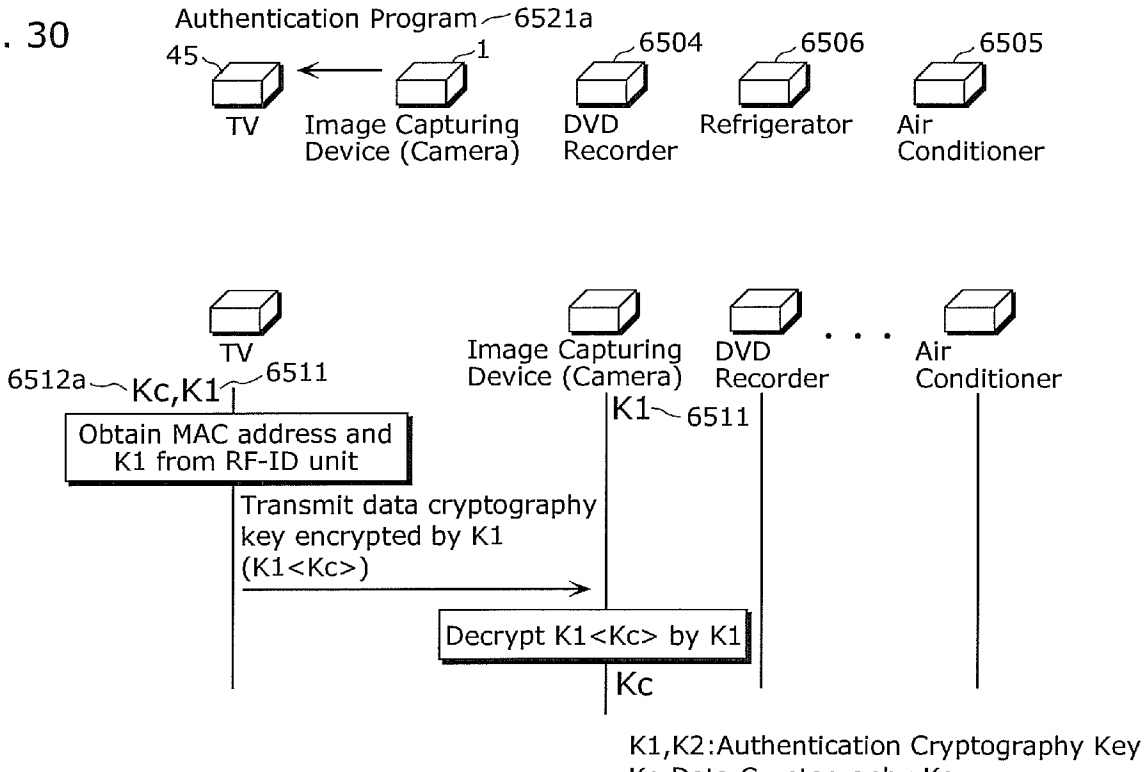
FIG. 30 presents an example of an authentication method using RF-ID unit.

On the other hand, FIG. 30 illustrates an authentication method using RF-ID. In the authentication method using RF-ID, the image capturing device 1 (camera) generates an authentication program 6521a. The camera provides the generated authentication program 6521a from the RF-ID unit 47 in the camera to a RF-ID unit 46 in the TV 45. The authentication program 6521a includes an authentication command, a MAC address of the camera, and an authentication cryptography key 6511 for the camera. When the TV 45 receives the authentication program 6521a with the authentication command, the TV 45 retrieves the MAC address and the authentication cryptography key 6511 from the RF-ID unit 46. The TV 45 encrypts a data cryptography key 6512a using the retrieved authentication cryptography key 6511 and transmits the encrypted data cryptography key 6512a to the retrieved MAC address. The transmission is performed by a wireless-LAN device (terminal). In the authentication method using RF-ID, the authentication is performed automatically without any user's input. Therefore, there is no problem caused by user's input errors. In addition, since the image capturing device 1 (camera) needs to moved into proximity of the TV 45, it is possible to prevent intervention of other malicious users. This authentication method using RF-ID can eliminate pre-processing such as the above-described challenge. Moreover, the action of physically moving the image capturing device 1 (camera) into proximity of the TV 45 enables the user to easily recognize which terminals the camera has authenticated. Furthermore, if the authentication cryptography key 6511 is not included in the authentication program, the authentication may be performed by a technique of general public key authentication. In addition, the communication device (medium) is not limited to a wireless LAN, but may be any medium, such as PLC or Ethernet™ included in the home network. Moreover, the MAC address may be any identification information for uniquely identifying a communication terminal in the home network.

Figure 31:
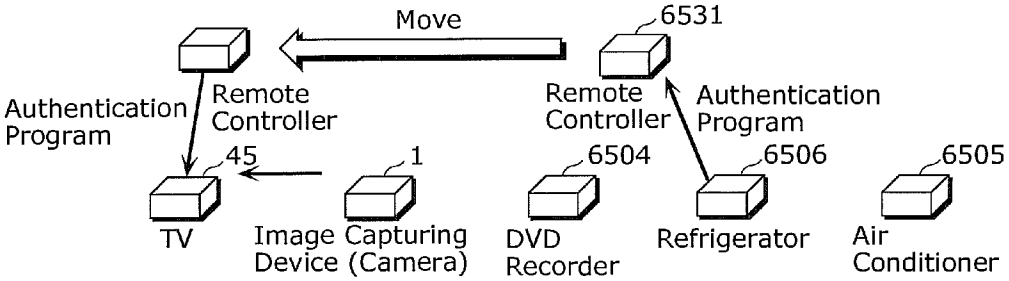
FIG. 31 presents an example of an authentication method used when it is difficult to move a terminal into proximity of another terminal.

FIG. 31 illustrates an authentication method using RF-ID when it is difficult to move a terminal into proximity of another terminal. For example, when the terminals are a refrigerator and a TV which are difficult to move, it is almost impossible to directly exchange an authentication program between the terminals using RF-ID. In such a situation, the first embodiment of the present invention can be implemented by relaying the authentication program between the terminals using a device (such as a remote controller 6531) that is an accessory of the terminal. In more detail, a RF-ID reader/writer embedded in the remote controller 6531 reads the authentication program from a RF-ID unit in the refrigerator. Thereby, the authentication program is stored in a memory in the remote controller 6531. A user moves the remote controller 6531 that is mobile. When the remote controller 6531 is moved into proximity of the TV 45, the remote controller 6531 transfers the authentication program from the memory of the remote controller 6531, to the RF-ID unit of the TV 45. It should be noted that the transfer from the remote controller 6531 to the TV 45 is not limited to use RF-ID technology. Other communication means, such as infrared ray or ZigBee, that is previously set in the remote controller 6531 can be used. Any medium for which security in communication has already been established may be used.

Figure 32:
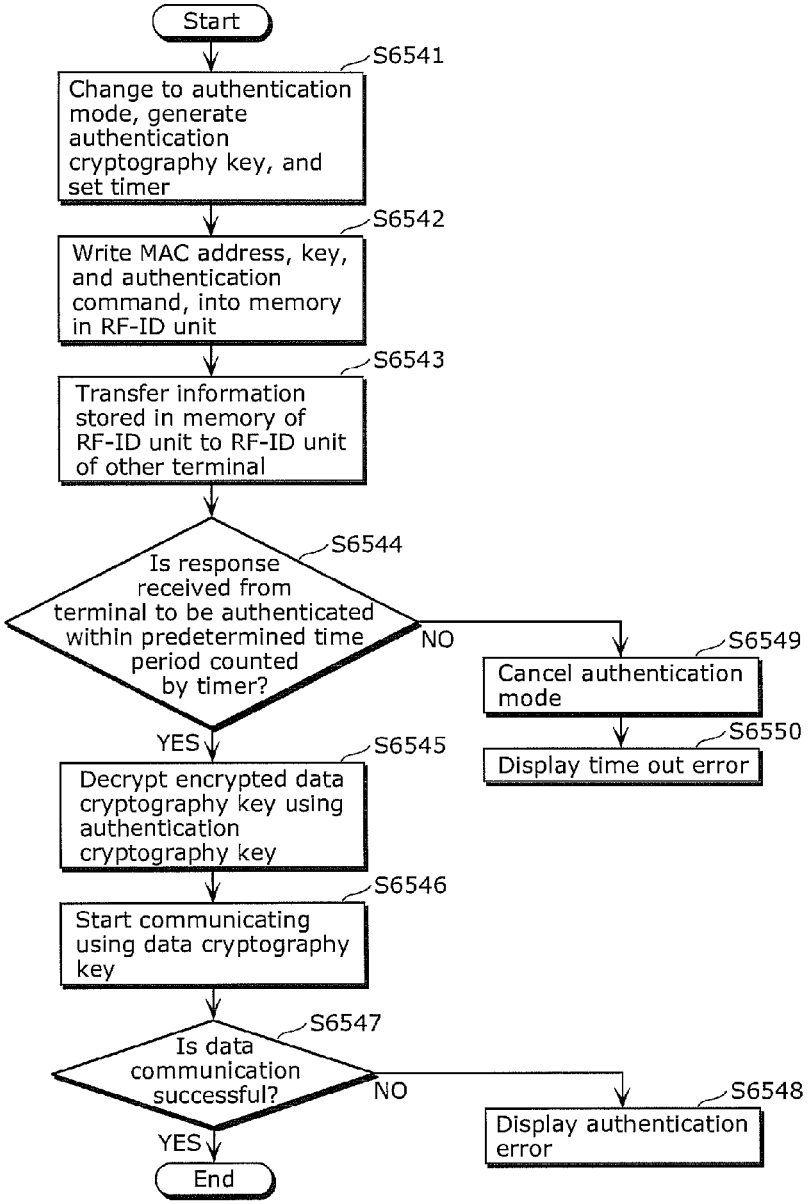
FIG. 32 is a flowchart of an example of processing performed by a camera.

FIG. 32 is a flowchart of authentication performed by the camera (image capturing device 1) side. In an authentication mode, the camera generates an authentication cryptography key and sets a timer (S6541). The camera writes a MAC address of the camera, the generated authentication cryptography key, and an authentication command, into a memory in the RF-ID unit (S6542). When the user moves the camera to bring the RF-ID unit of the camera into proximity of the RF-ID unit of the TV, the camera transfers the information stored in the memory of the RF-ID unit of the camera to the RF-ID unit of the TV (S6543). The camera determines whether or not a response of the transfer is received from the TV within a predetermined time period counted by the timer (S6544). If the response is received within the predetermined time period, then the camera decrypts, by using the authentication cryptography key, encrypted data cryptography key included in the response (S6545). The camera starts communicating with the other device (apparatus) using the data cryptography key (S6546). The camera determines whether or not data communication with the TV is successful (S6547). If the data communication is successful, then the authentication is completed. On the other hand, if data cannot be correctly decrypted (in other words, data communication is not successful), then a notification of authentication error is displayed and the authentication is terminated (S6548). Referring back to Step S6544, if there is no response within the predetermined time period, then the camera cancels the authentication mode (S6549) and then displays a notification of time out error (S6550).

Figure 33:
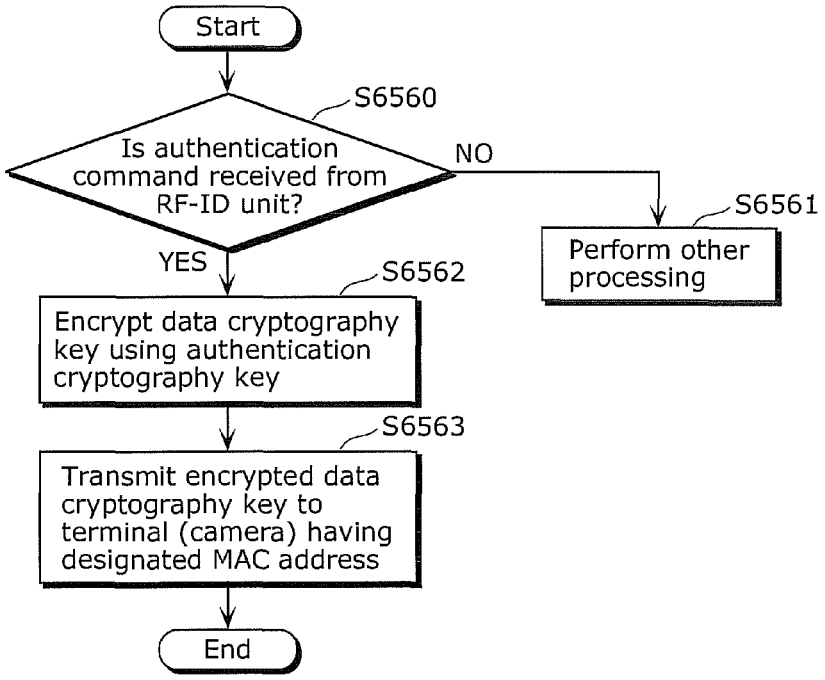
FIG. 33 is a flowchart of an example of processing performed by the TV.

FIG. 33 is a flowchart of authentication performed by the TV 45 side. The TV 45 determines whether or not received information, which is provided from the RF-ID unit of the camera to the RF-ID unit of the TV 45, includes an authentication command (S6560). If the received information does not include the authentication command, then the TV 45 performs other processing according to the received information (S6561). On the other hand, if the received information includes the authentication command, the TV 45 determines that the information received from the RF-ID unit of the camera is an authentication program, and therefore encrypts a data cryptography key in the TV 45 using an authentication cryptography key in the authentication program (S6562). Then, the TV 45 transmits the encrypted data cryptography key to the terminal (the camera) having the MAC address designated in the authentication program (S6563).

Next, the following situation is described in detail with reference to figures. Here, the image capturing device 1 described with reference to FIG. 3 generates or updates a program executable by the TV 45. Then, the image capturing device 1 transmits the program to the TV 45 via the data transmission unit 173. Thereby, the TV 45 executes the program.

Figure 34:
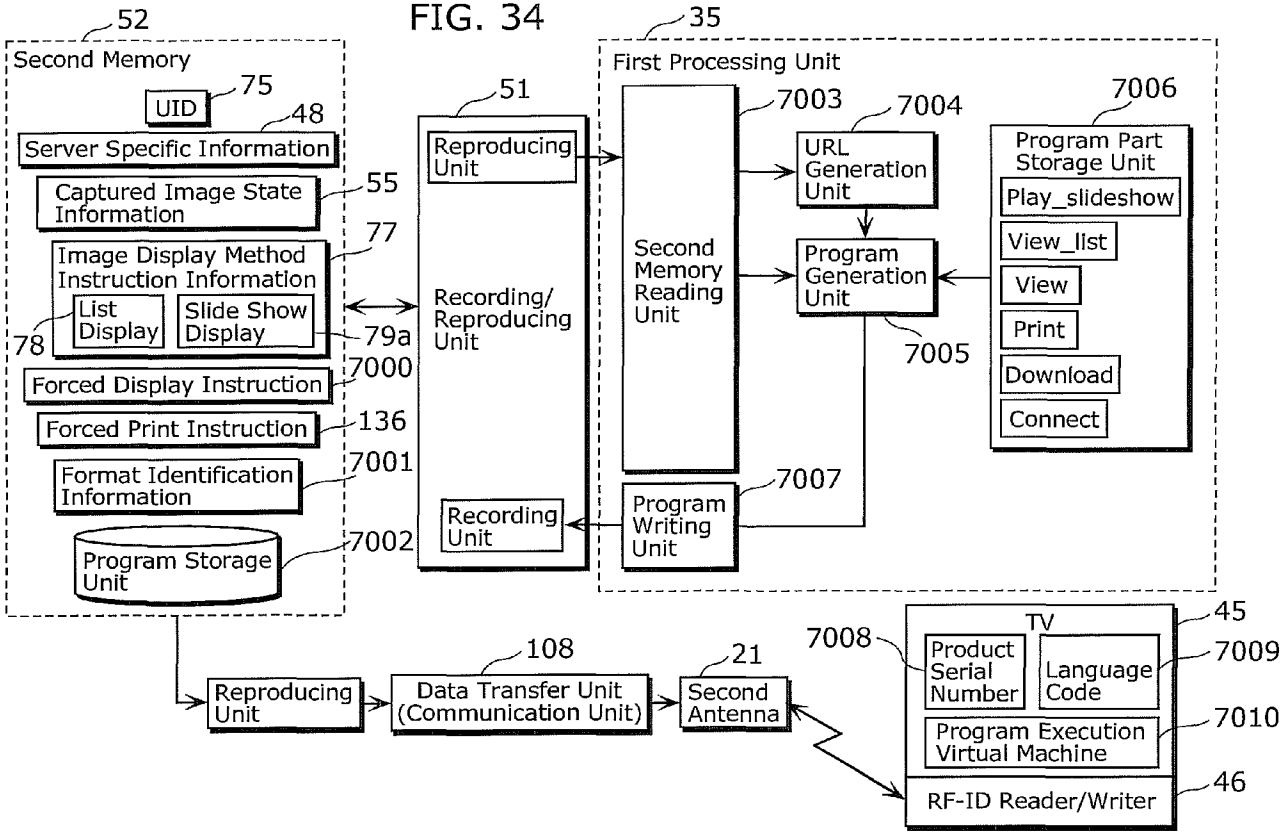
FIG. 34 is a block diagram of (a) a first processing unit generating the operation program in the image capturing device 1 to be executed by the TV, and (b) a second memory unit.

FIG. 34 is a block diagram of the first processing unit 35 and the second memory 52 of the image capturing device 1 according to the first embodiment of the present invention. The first processing unit 35 includes a second memory reading unit 7003, a URL generation unit 7004, a program generation unit 7005, a program part storage unit 7006, and a program writing unit 7007.

The second memory reading unit 7003 reads information from the second memory 52 via the recording/reproducing unit 51. The URL generation unit 7004 reads the UID 75, the server specific information 48, the captured image state information 55, and the image display method instruction information 77 from the second memory 52 via the second memory reading unit 7003. From the above pieces of information, the URL generation unit 7004 generates a URL that is an address of the server 42 to which images have been uploaded from the image capturing device 1.

The UID 75 is identification information for identifying the image capturing device 1. The UID 75 is unique to each image capturing device 1. The URL generated by the URL generation unit 7004 includes UID. For instance, the image server 42, to which images are uploaded, has an image file in a directory unique to each UID. Thereby, a URL address can be generated for each image capturing device 1.

The server specific information 48 is a server name for identifying the server to which the images are uploaded. Via a Domain Name Server (DNS), an IP address of the server 42 is determined to connect the image capturing device 1 to the server 42. Therefore, the server specific information 48 is included in the generated URL.

The image display method instruction information 77 is information for enabling the user to optionally select the list display 78, the slide show display 79, or the like. The URL generation unit 7004 generates the URL based on the image display method instruction information 77. In other words, since the generated URL includes information indicating the list display 78 or the slide show display 79, the image server (the server 42) can determine based on the URL whether the images are to be displayed as the list display or the slide show display.

As described above, based on the UID 75, the server specific information 48, the captured image state information 55, the image display method instruction information 77, and the like which are stored in the second memory 52, the URL generation unit 7004 generates a URL of the image server in which images to be watched are stored. Then, the URL generation unit 7004 provides the generated URL to the program generation unit 7005.

The program generation unit 7005 generates a program executable by the TV 45, based on (a) the URI generated by the URL generation unit 7004, and (b) forced display instruction 7000, forced print instruction 136, and format identification information 7001 stored in the second memory 52. It should be noted that the program generation unit 7005 can generate a new operation program based on the above-described information, which is a method of generating a new operation program. The program generation unit 7005 can also generate such a new operation program by updating an operation program that has been already generated.

The program generated by the program generation unit 7005 is executable by the TV 45. The program should be compiled into a machine language used in a system controller (not shown) of the TV 45, so that the system controller can execute the program. In this case, the program generation unit 7005 has a compiler to convert the generated program to a program in an executable format.

However, the above-described compiler is not necessary if the program in a text format (script) (for example, a general Java™ script) is executed by a browser in the TV 45.

The URL provided to the program generation unit 7005 is used to connect the TV 45 to the image server (server 42) in which images are stored. By using the URL, the program generation unit 7005 generates or updates a connection program (hereinafter, referred to also as a "server connection program" or "connection program") for connecting the TV 45 to the image server.

The forced display instruction 7000 is optional and used in the following situation. For example, there is the situation where, while the user watches on the TV 45 a TV program provided by general broadcast waves, the RF-ID reader/writer 46 of the TV 45 becomes communicable with the image capturing device 1 via the second antenna 21. In the situation, the forced display instruction 7000 is used to automatically set the TV 45 into a browser watching mode so that image data provided from the image server is displayed on the TV 45. If this option is selected, the program generation unit 7005 generates a program for forcing the TV 45 to display image data.

The forced print instruction 136 is optional and used in the following situation. For example, there is the situation where, while the user watches on the TV 45 a TV program provided by general broadcast waves, the RF-ID reader/writer 46 of the TV 45 becomes communicable with the image capturing device 1 via the second antenna 21. In the situation, the forced print instruction 136 is used to automatically print image data stored in the image server by a printer (not shown) connected to the TV 45. If this option is selected, the program generation unit 7005 generates a program for forcing the TV 45 to print image data by the printer.

The format identification information 7001 is information of a format by which image data is to be displayed. When an option of language code optimization selection in the format identification information 7001 is selected, the program generation unit 7005 generates a program for selecting a URL to be connected, based on the language code set in the TV 45. The following is an example in the situation where the option of language code optimization selection in the format identification information 7001 is selected. If the language code of the TV 45 indicates Japanese language, the program generation unit 7005 selects a Japanese site as the URL to be connected. On the other hand, if the language code of the TV 45 does not indicate Japanese language, the program generation unit 7005 selects an English site as the URL to be connected. Or, the URL generation unit 7004 may generate two URLs for the Japanese site and the English site, and provide the two URLs to the program generation unit 7005.

The program part storage unit 7006 holds program command information used by the program generation unit 7005 to generate a program. A program part stored in the program part storage unit 7006 may be a general library or an Application Programming Interface (API). In order to generate a connection command for connecting the TV 45 to the server, the program generation unit 7005 combines a server connection command "Connect" in the program part storage unit 7006 with the URL generated by the URL generation unit 7004. Thereby, the program generation unit 7005 generates or updates a connection program for connecting the TV 45 to the server indicated by the URL.

The program writing unit 7007 is an interface used to write the program generated by the program generation unit 7005 to the second memory 52.

The program provided from the program writing unit 7007 is stored into a program storage unit 7002 in the second memory 52 via the recording/reproducing unit 51.

When the image capturing device 1 is moved to bring the RF-ID unit of the image capturing device 1 into proximity of the RF-ID reader/writer 46 connected to the TV 45, the reproducing unit reads out the program from the program storage unit 7002 in the second memory 52. Then, transmission signals indicating the program are transmitted to the RF-ID reader/writer 46 via the data transfer unit 108 and the second antenna 21. The TV 45 receives the transmission signals via the RF-ID reader/writer 46. The TV 45 executes the receives program.

The TV 45 has the product serial number 7008, the language code 7009, and a program execution virtual machine 7010.

The product serial number 7008 is a product serial number of the TV 45. From the product serial number 7008, it is possible to learn a manufacture date/time, a manufacture location, a manufacturing line, and a manufacturer of the TV 45.

The language code 7009 is predetermined in the TV 45 to be used in displaying a menu, for example. The language code 7009 is not limited to be predetermined, but can be switched to another by the user.

The program execution virtual machine 7010 is a virtual machine that executes a received program. The program execution virtual machine 7010 may be implemented as hardware or software. For example, the program execution virtual machine 7010 may be a Java™ virtual machine. The Java™ virtual machine is a stack or interpreter virtual machine that executes defined instruction sets. If the image capturing device 1 has the virtual machine, the program generated by the program generation unit 7005 in the image capturing device 1 is compliant to any execution platforms. As a result, the program generation unit 7005 can generate a program executable in any platforms.

Figure 35:
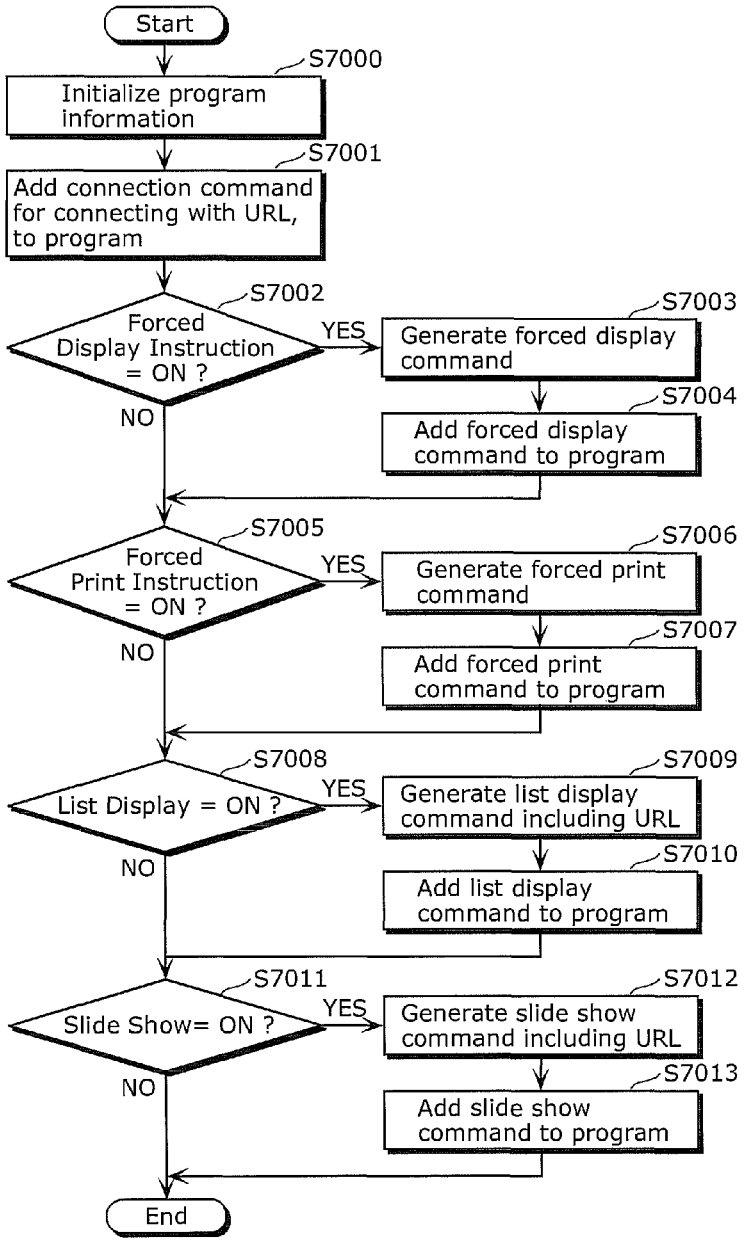
FIG. 35 is a flowchart of processing performed by a program generation unit 7005 in the first processing unit.

FIG. 35 is a flowchart of processing performed by the program generation unit 7005 of the image capturing device 1.

First, the program generation unit 7005 initializes information used to generate a program (S7000).

Next, based on the server specific information 48 stored in the second memory 52, the program generation unit 7005 generates a connection command for connecting the TV 45 to the server 42, by using the URL generated by the URL generation unit 7004. In order to generate the connection command, the program generation unit 7005 selects an instruction set (for example, "Connect" in FIG. 25) for a server connection command from the program part storage unit 7006, and combines the selected instruction set with the URL. Thereby, a server connection program (for example, "Connect (URL)") is generated.

Then, the program generation unit 7005 examines the forced display instruction 7000 in the second memory 52 so as to determine whether or not the forced display instruction 7000 is selected (S7002). If the forced display instruction 7000 is selected, then the program generation unit 7005 calls an instruction set for a forced display program from the program part storage unit 7006, and thereby generates a forced display command (S7003). The generated forced display command is added to the program (S7004).

On the other hand, if the forced display instruction 7000 is not selected, then the program generation unit 7005 does not generate the forced display command, but proceeds to S7005.

Next, the program generation unit 7005 makes a determination as to whether the forced print instruction in the second memory 52 is selected (S7005). If the forced print instruction is selected, then the program generation unit 7005 generates a forced print command for forcing the TV 45 to print, by a printer, an image file stored in the server 42 (S7006). The generated print command is added to the program (S7007).

Then, the program generation unit 7005 examines the image display method instruction information 77 in the second memory 52 so as to determine whether or not the list display 78 is selected (S7008). If the list display 78 is selected, then the program generation unit 7005 generates a list display command for causing the TV 45 to display a list of the image file stored in the server 42 (S7009). The generated list display command is added to the program (S7010).

After that, the program generation unit 7005 examines the image display method instruction information 77 in the second memory 52 so as to determine whether or not the slide show 79 is selected (S7011). If the slide show 79 is selected, then the program generation unit 7005 generates a slide show command for causing the TV 45 to display a slide show of the image file stored in the server 42 (S7012). The generated slide show command is added to the program (S7013).

As described above, based on the information set in the second memory 52, the program generation unit 7005 in the image capturing device 1 generates a program used to display images on the TV 45, by using an instruction command set that is stored in the program part storage unit 7006 to generate the program.

It should be noted that, in the first embodiment, there are commands for the forced display instruction, the forced print instruction, the list display, and the slide show display. However, the commands (programs) are not limited to the above. For example, if a command for the forced display instruction is to be generated as a program, the program generation unit 7005 can also generate a determination command for determining whether or not the apparatus (device) executing the program has a display device or display function, and adds the generated determination command to the program. Thereby, the command for the forced display instruction is executed only if the apparatus executing the program has a display device or display function. As a result, the determination command can prevent confusion in the apparatus executing the program. The same goes for a command for the forced print instruction. It is preferable that the program generation unit 7005 also generates a determination command for determining whether or not the apparatus executing the program has or is connected to a printing function, and adds the generated determination command to the program. Thereby, the command for the forced print instruction is executed only if the apparatus executing the program has or is connected to a printing function.

The following describes execution of the program generated or updated by the program generation unit 7005 in the image capturing device 1.

Figure 36:
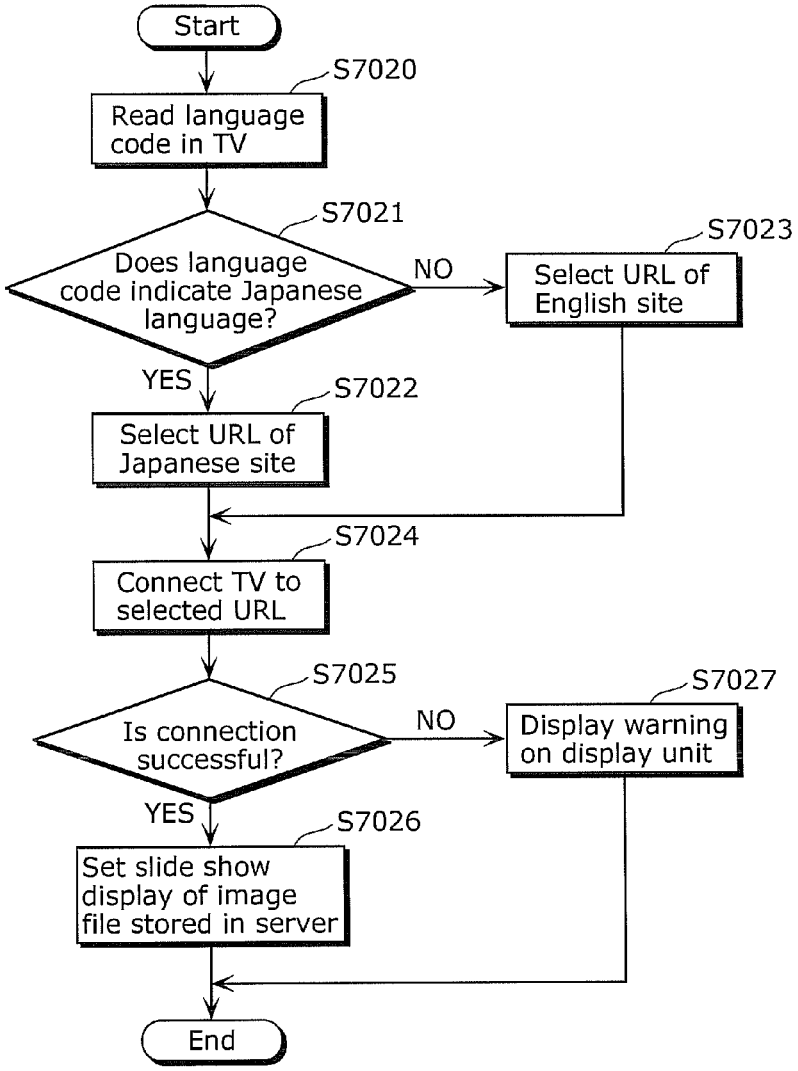
FIG. 36 is a flowchart of an example of a program generated by the program generation unit 7005.

FIG. 36 is a flowchart of execution of the program generated or updated by the program generation unit 7005. The program is transmitted from the image capturing device 1 to a device (apparatus) different from the image capturing device 1 via the second antenna 21 of the image capturing device 1. Then, the program is executed by the different device. In the first embodiment, the different device is the TV 45. The TV 45 receives the program via the RF-ID reader/writer 46 and executes the received program by a controller or virtual machine (not shown) in the TV 45.

First, the program is executed to read the language code set in the TV 45, as unique information of the TV 45 (S7020). The language code is predetermined by the user to be used in displaying a menu and the like on the TV 45.

Next, the program is executed to determine a language indicated in the language code. First, a determination is made as to whether or not the language code indicates Japanese language (S7021). If the determination is made that the language code indicates Japanese language, then a connection command for a Japanese site is selected from the connection commands in the program (S7022). On the other hand, if the determination is made that the language code does not indicate Japanese language, then a connection command for an English site is selected from the connection commands in the program (S7023). It should be noted that it has been described in the first embodiment that a determination is made as to whether or not the language code indicates Japanese language, and thereby a connection command is selected from the connection command for connecting to a Japanese site and the connection command for connecting to an English command. However, it is also possible that the program includes a plurality of connection programs compliant to various language codes. Thereby, the program can be compliant to two or more language codes. As a result, usability is improved. Next, according to the selected connection command, the program is executed to connect the TV 45 to the URL indicted in the connection command (S7024).

Then, a determination is made as to whether or not the connection to the URL indicted in the connection command is successful (S7025). If the connection is failed, then the display unit of the TV 45 displays warning indicating the connection failure (S7027). On the other hand, if the connection is successful, then a command for displaying a slide show of an image file stored in the server is executed to display the slide show (S7026).

It should be noted that the above is the situation where the operation program is for displaying images as a slide show. However, the operation program is not limited to the above. The program may be used for performing list display, forced display, or forced printing. If the operation program is for forced display, a step (command) of automatically changing setting of the TV 45 to setting of displaying an image file stored in the server is added to the program. Thereby, the user does not need to change the setting of the TV 45 by manual in order to display images provided from the image server. In the case of the forced printing, a command for automatically changing setting of the TV 45 to a printable mode is added to the program. Moreover, in the case of each of the forced printing and forced display, a determination command for determining whether or not the TV 45 has a printing function or a displaying function is added to the program. Thereby, the forced print command is not executed in an apparatus (device) without a printing function. Furthermore, the operation program in the first embodiment of the present invention may be a connection program for leading other programs. For example, the operation program may be a loader program, such as a boot-loader for loading other programs to be executed.

As described above, the first embodiment of the present invention is characterized in that the program generation unit 7005 is included in the first processing unit 35 of the image capturing device 1 that is a device having RF-ID communication means (such as the data transfer unit 108 and the second antenna 21). It is also characterized in that the program generated or updated by the program generation unit 7005 is executed by a different device (apparatus) except the image capturing device 1 according to the first embodiment of the present invention that is a communication device having RF-ID.

Conventionally, a device having RF-ID needs to transfer ID information (tag information), which the device has, from a RF-ID communication unit to another device (for example, the TV 45 according to the first embodiment of the present invention). The device (apparatus) receiving the ID information should previously hold operation programs each unique to a corresponding device having RF-ID. Therefore, if new products having RF-ID technology appear, the receiving device needs to install an operation program corresponding to the new products and execute the program. Otherwise, the receiving device is excluded as not being compliant to the new products. The installation of operation programs requires technical knowledge. Not everyone can perform the installation. Therefore, if various new devices having RF-ID are produced, other devices such as the TV 45 of the first embodiment of the present invention become obsolete. As a result, property values of user's devices are damaged.

According to the disclosure of the first embodiment of the present invention, the device having RF-ID technology has the program generation unit 7005 and sends not ID information (tag information) but a program to another device (apparatus) such as the TV 45. The apparatus such as the TV 45 receives and executes the program. Therefore, the receiving apparatus does not need to previously have operation programs for various devices having RF-ID. Even if a new device having RF-ID technology appears, the receiving apparatus does not need to install a new program for the device. Therefore, usability is significantly improved.

Therefore, the terminal such as a TV does not need to previously have application programs for respective items, kinds, or application systems of various objects having RF-ID. Thereby, the terminal such as a TV does not need to previously have a storage device, either, for holding various application programs. In addition, maintenance such as version-up of the programs in the terminal is not necessary.

The program generated by the program generation unit 7005 is useful if it is executable in any execution platforms such as a Java™ language. Therefore, if the device (apparatus) such as the TV 45 executing programs has a Java™ virtual machine, programs generated by any devices (apparatuses) can be executed.

It should be noted that the program generation unit 7005 according to the first embodiment of the present invention may has a function of updating the program previously stored in the program storage unit 7003 of the second memory 52. The situation of updating a program produces the same advantages as that in the situation of generating a program. The generating or updating performed by the program generation unit 7005 may be generating or updating data used in executing a program by the TV 45. In general, the program includes additional initialization setting data. The additional data is used to switch an execution mode or to set a flag. Therefore, generating or updating of the additional data is equivalent to generating or updating of the program, without deviating from the inventive concepts of the present invention. This is because, for execution of a program, it depends on design whether a parameter for mode switching or the like is to be hold and read as data, or is to be included in the program to be executed. Therefore, when the program generation unit 7005 according to the first embodiment of the present invention generates or updates a program, the program generation unit 7005 can also generate data such a parameter sequence used by the program. The parameter is generated based on the forced display instruction 7000, the forced print instruction 136, the image display method instruction information 77, the format identification information 7001, or the like stored in the second memory 52.

The following describes characteristic structures and processing of the second memory 52 and the first processing unit 35 in the image capturing device 1 that is a communication device having RF-ID according to the first embodiment of the present invention. In the first embodiment of the present invention, the image capturing device 1 that is a communication device having RF-ID has a use status detection unit in the first processing unit 35. The use status detection unit detects a trouble related to operation, a power consumption status, or the like. The image capturing device 1 generates a program for displaying the result of the detection (use status) on the TV 45 that is a device (apparatus) different from the image capturing device 1.

Figure 37:
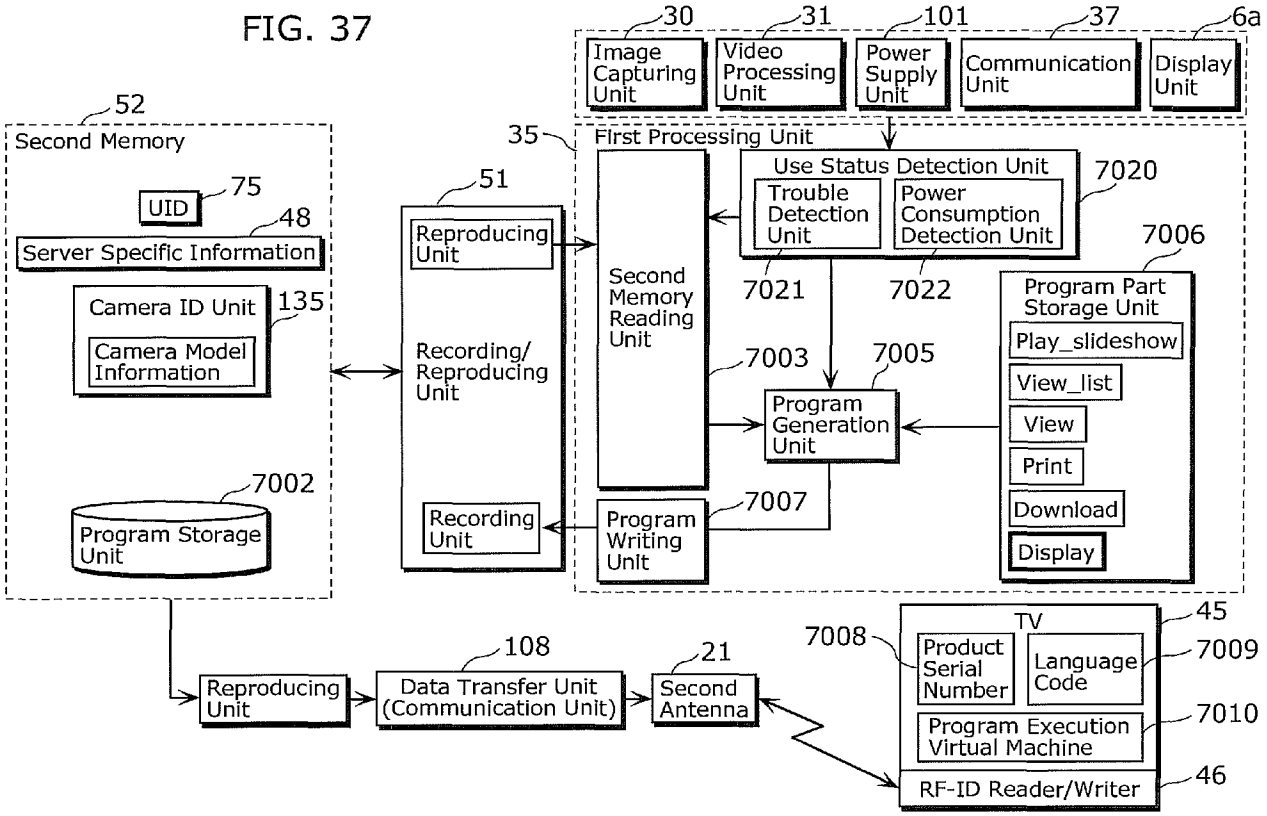
FIG. 37 is a block diagram of (a) the first processing unit generating the operation program in the image capturing device 1 to display a use status of the image capturing device 1, and (b) the second memory unit.

FIG. 37 is a block diagram of characteristic structures of the second memory 52 and the first processing unit 35 in the image capturing device 1 according to the first embodiment of the present invention.

The second memory 52 includes the UID 75, the server specific information 48, the camera ID 135, and the program storage unit 7002.

The UID 75 is a serial number unique to the image capturing device 1, and used to identify the single image capturing device 1.

The server specific information 48 is information for identifying the server 42 to which image data captured by the image capturing device 1 is transmitted by the communication unit 37. The server specific information 48 includes a sever address, a storing directory, a login account, a login passwords, and the like.

The camera ID 135 includes a product serial number, a manufacturing year/month/date, a manufacturer, a manufacturing line, a manufactured location, and the like of the image capturing device 1. The camera ID 135 also includes camera model information for identifying a model of the image capturing device 1.

The first processing unit 35 includes the second memory reading unit 7003, a use status detection unit 7020, the program generation unit 7005, the program part storage unit 7006, and the program writing unit 7007.

The second memory reading unit 7003 reads information from the second memory 52 via the recording/reproducing unit 51. In the first embodiment of the present invention, the second memory reading unit 7002 reads the UID 75, the server specific information 48, and the camera ID 135 from the second memory 52, and provides the pieces of information to the program generation unit 7005. Reading of the pieces of information from the second memory 52 is performed when a readout signal is provided from a use status detection unit 7020 that is described later.

The use status detection unit 7020 detects a use status of each unit included in the image capturing device 1. The use status detection unit 7020 includes sensors each detecting a trouble in operation of a corresponding unit included in the image capturing device 1. Results of the detection of the sensors in respective units are provided to the use status detection unit 7020. The sensors for the respective units provide the use status detection unit 7020 with trouble information, battery duration, a power consumption amount, and the like. For example, the image capturing unit 30 provides the use status detection unit 7020 with information indicating whether or not an image capturing operation of the image capturing unit 30 has any trouble (whether or not the image capturing unit 30 functions correctly, and whether or not the image capturing unit 30 responds to a call from the use status detection unit 7020). The video processing unit 31 provides the use status detection unit 7020 with information indicating whether or not data processing for image data captured by the image capturing unit 30 has any trouble (whether or not the video processing unit 31 functions correctly, and whether or not the video processing unit 31 responds to a call from the use status detection unit 7020). The first power supply unit 101 provides the use status detection unit 7020 with a voltage level of the battery and a total power consumption amount. The communication unit 37 provides the use status detection unit 7020 with information indicating whether or not the communication unit 37 is successfully connected to the server or the Internet (whether or not the communication unit 37 functions correctly, and whether or not the communication unit 37 responds to a call from the use status detection unit 7020). The display unit 6a provides the use status detection unit 7020 with information indicating whether or not display processing has any trouble, whether or not the display unit 6a correctly responds to a call from the use status detection unit 7020, and the display unit 6a functions correctly. Based on the above pieces of status information provided regarding the respective units, the internal trouble detection unit 7021 in the use status detection unit 7020 determines whether or not each of the units has any trouble in its functional operation. If there is a trouble, then the use status detection unit 7020 provides the program generation unit 7005 with information for specifying the trouble. The use status detection unit 7020 has a power consumption detection unit 7022. The power consumption detection unit 7022 generates power consumption information based on the total power consumption information provided form the power supply unit, and then provides the power consumption information to the program generation unit 7005.

The program generation unit 7005 generates a program for displaying, on the TV 45, the information for specifying a trouble or the power consumption information which is provided from the use state detection unit 7020. For generation of a program, instruction sets to be included in the program are previously stored in the program part storage unit 7006. Therefore, the program generation unit 7005 generates (a) a display command ("display" in FIG. 37) for displaying a trouble or a power consumption amount, and (b) a program for displaying information for specifying a location of the trouble and information for specifying the trouble in detail. It should be noted that the power consumption amount may be converted to a carbon dioxide emission amount, and therefore a program may be generated to display the carbon dioxide emission amount.

The program generated by the program generation unit 7005 is stored in the program storage unit 7002 in the second memory 52 via the program writing unit 7007.

The program stored in the program storage unit 7002 in the second memory 52 is transmitted to the RF-ID reader/writer 46 of the TV 45 via the data transfer unit 108 and then the second antenna 21.

The TV 45 executes the received program by the program execution virtual machine 7010.

With the above-described structure, the program generation unit 7005 in the first processing unit 35 generates a program for displaying, on the TV 45, trouble information or use status information detected by the use status detection unit 7020 regarding use of the image capturing device 1. The program is transmitted to the TV 45 that displays the trouble information or the use status information of the image capturing device 1. Thereby, the TV 45 can present the trouble information or the use status information to the user, without installing a plurality of programs compliant to various devices including the image capturing device 1.

In conventional systems, each of devices such as an image capturing device, a camcorder, an electric toothbrush, and a weight scale is provided with a simple display function such as a liquid crystal device, so as to display the trouble information or the use status information on the corresponding display function. Therefore, the display function has a low display capability for merely displaying the trouble information as a symbol sequence or an error code. When the trouble information is presented, the user needs to read instruction manual to check what kind of trouble it is. Some users have lost instruction manual and therefore obtain more information from a website on the Internet.

In the system according to the first embodiment of the present invention, however, a program for displaying trouble information can be executed by the TV 45 not by the image capturing device 1. The TV 45, which displays the trouble information detected by each device such as the image capturing device 1, has a display capability higher than that of the conventional systems. Therefore, the system according to the first embodiment of the present invention can solve the above conventional problem.

The following describes, in detail with reference to figures, the situation where a program generated by the image capturing device 1 described with reference to FIG. 3 is executed by a plurality of apparatuses (devices) including the TV 45.

Figure 38:
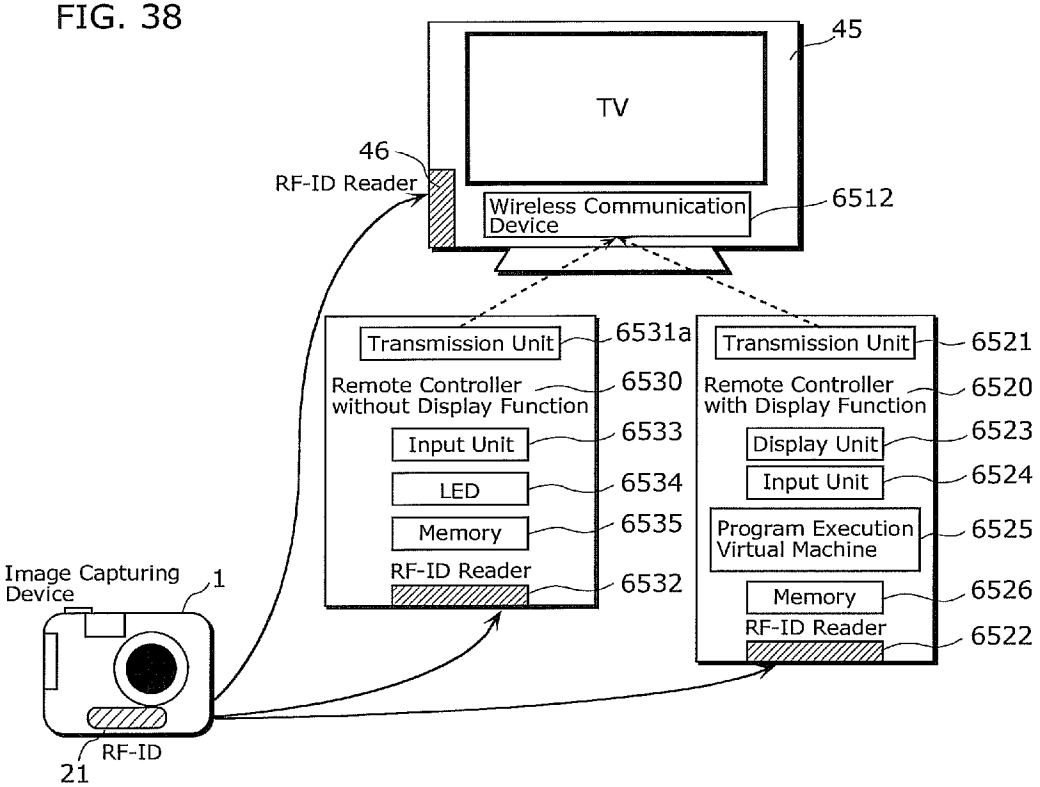
FIG. 38 illustrates a use example where the program generated by the image capturing device 1 is executed by an external device (apparatus).

FIG. 38 illustrates a system in which a program generated by the image capturing device 1 is executed by a plurality of apparatuses. The system includes the image capturing device 1, the TV 45, a remote controller (with display function) 6520, and a remote controller (without display function) 6530.

The TV 45 includes the RF-ID reader/writer 46 and a wireless communication device 6512. The wireless communication device 6512 is, for example, a general infrared communication device currently used as many remote controllers of home appliances, or a short-range wireless communication device used for home appliances using radio waves, such as Bluetooth and ZigBee.

The remote controller (with display function) 6520 includes a transmission unit 6521, a display unit 6523, an input unit 6524, a RF-ID reader 6522, a memory 6526, and a program execution virtual machine 6525. The transmission unit 6521 transmits signals to the wireless communication device 6512 of the TV 45. The display unit 6523 displays video. The input unit 6524 receives key inputs from a user. The RF-ID reader 6522 communicates with the RF-ID unit 47. The memory 6526 stores a program received by the RF-ID reader 6522. The program execution virtual machine 6525 is a virtual machine that executes the program received by the RF-ID reader 6522. For instance, recent mobile phones are example of the remote controller (with display function) 6520, having an infrared communication function, Bluetooth, a RF-ID reader, a liquid crystal display, a key input unit, a Java™ virtual machine, and the like. The display unit 6523 and the input unit 6524 may be a liquid crystal display and a plurality of character input buttons, or may be integrated into a liquid-crystal touch panel, for example.

The remote controller (without display function) 6530 includes a transmission unit 6531, an input unit 6533, a RF-ID reader 6532, and a memory 6535. The transmission unit 6531 transmits signals to the wireless communication device 6512 of the TV 45. The input unit 6533 such as buttons receives key inputs from a user. The RF-ID reader 6532 communicates with the RF-ID unit 47. The memory 6535 temporarily stores data received by the RF-ID reader 6532.

The remote controller (without display function) 6530 is, for example, a general remote controller having a RF-ID reader. Remote controllers are common accessory devices of TVs.

In the first embodiment of the present invention, there are the following four possible situations from which the user selects a preferred one. In the first situation, the program generated by the image capturing device 1 is transmitted directly to the TV 45 via the RF-ID reader/writer 46 of the TV 45, and executed by the TV 45. In the second situation, the program generated by the image capturing device 1 is transmitted indirectly to the TV 45 via the remote controller (without display function) 6530, and executed by the TV 45. In the third situation, the program generated by the image capturing device 1 is transmitted indirectly to the TV 45 via the remote controller (with display function) 6520, and executed by the TV 45. In the fourth situation, the program generated by the image capturing device 1 is transmitted to the remote controller (with display function) 6520, and executed by the remote controller (with display function) 6520.

The first situation has been already described above in the first embodiment. Therefore, the first situation is not described again below.

The following describes the above second to fourth situations.

In the second situation, a program generated by the image capturing device 1 is executed by the TV 45, via the remote controller (without display function) 6530, such as general TV remote controllers, that does not have a graphical display device such as a liquid crystal panel.

When the user moves the image capturing device 1 to bring the RF-ID unit 47 to the RF-ID reader 6532, the RF-ID reader 6532 reads the program generated by the image capturing device 1 to store the program in the memory 6535.

Then, when the user presses the input unit 6533, the program held in the memory 6535 is transmitted from the transmission unit 6531 to the wireless communication device 6512 of the TV 45. The program execution virtual machine 7010 in the TV 45 executes the program. If the wireless communication device 6512 is a directional infrared communication device, the user presses the input unit 6533, facing the remote controller (without display function) 6530 to the TV 45. If the wireless communication device 6512 is a non-directional short-range wireless communication device, such as devices using Bluetooth or ZigBee, the program is transmitted to the TV 45 that is previously paired with the remote controller (without display function) 6530. In the case of the short-range wireless communication device, it is also possible that the program is automatically transmitted to the paired TV 45 when the RF-ID reader 6532 reads the program from the RF-ID unit 47, without user's pressing of the input unit 6533.

The remote controller (without display function) 6530 may have a display unit, such as a LED 6534, for notifying the user of that data read by the RF-ID reader 6532 is stored in the memory 6535. The LED 6534 is lit up to encourage the user to press the input unit 6533, when the program is read by the RF-ID reader 6532 and stored in the memory 6535. The LED 6534 is lit out when the transmission of the program to the TV 45 is completed. Thereby, it is possible to clearly notify the user of that the remote controller (without display function) holds the program. The LED 6534 may be an independent LED or integrated into the input unit 6533.

In the second situation, even if the user is far from the TV 45, the program can be executed by the TV 45 by using the remote controller (without display function) 6530 in the user's hand.

In the third and fourth situations, if the remote controller (with display function) 6520 has a program execution virtual machine as high-function mobile phones called smart phones do, the user can select whether the program generated by the image capturing device 1 is executed on the remote controller (with display function) 6520 or the program is transmitted to the TV 45 to be executed on the TV 45.

When the user moves the image capturing device 1 to bring the RF-ID unit 47 to the RF-ID reader 6522, the RF-ID reader 6522 reads the program generated by the image capturing device 1 to store the program in the memory 6535.

Figure 39:
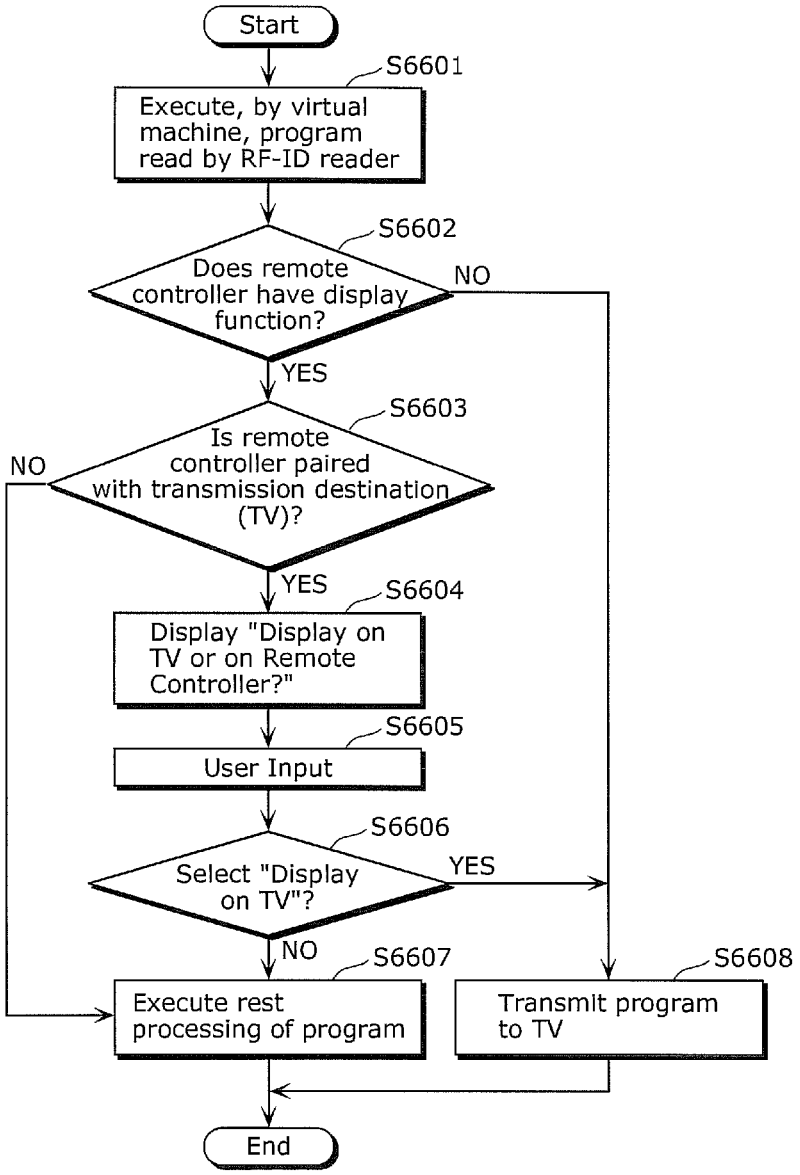
FIG. 39 is a sequence where the program generated by the image capturing device 1 is executed by a remote controller with display function.

The following describes the processing performed by the remote controller (with display function) 6520 in more detail with reference to a flowchart of FIG. 39.

First, a program read by the RF-ID reader 6522 is transmitted to the program execution virtual machine 6525 and executed by the program execution virtual machine 6525 (S6601).

Next, a determination is made as to whether or not the remote controller 6520 has a display function (S6602). If the remote controller 6520 does not have any display function (N at S6602), then the program is transmitted to the TV 45 via the transmission unit 6521 and then the processing is completed. In this situation, the program is executed by the TV 45.

If the remote controller 6520 has a display function (Y at S6602), then a further determination is made as to whether or not the remote controller 6520 is paired with the TV 45 that is a transmission destination (S6603). If the remote controller 6520 is not paired with the TV 45 (N at S6603), then a rest processing of the program is executed by the display unit 6523 of the remote controller 6520. On the other hand, if the remote controller 6520 is paired with the TV 45 (Y at S6603), then the display unit 6523 displays a dialog message "Display on TV or on Remote Controller?" to encourage the user to select one of the options (S6604).

Then, the remote controller 6520 receives user's entry by the input unit 6524 (S6605). A determination is made as to whether or the user selects to display data on the TV 45 (S6606). If the user selects the TV 45 to display data (Y at S6606), then the program is transmitted to the TV 45 via the transmission unit 6521 and thereby the processing is completed. In this situation, the program is executed by the TV 45. On the other hand, if the user selects the remote controller to display data (N at S6606), then a rest processing of the program is executed by the remote controller 6520 using the display unit 6523 (S6607).

It should be noted that the "rest processing of the program" refers to displaying of a status of a battery, a trouble status, or an instruction manual regarding the image capturing device 1, but, of course, not limited to those described in the first embodiment.

With the above structure, a program generated by the image capturing device 1 is transmitted to the remote controller with display function, then a capability of the remote controller with display function is examined, and a determination is made by the remote controller as to which apparatus (device) is to execute rest processing of the program. Thereby, the remote controller does not need to previously install various programs compliant to a plurality of apparatuses. The user can execute the program in his/her preferred manner.

It should be noted that it has been described in the first embodiment that the determination is made based on whether or not the remote controller has a display function and based on a pairing status of the remote controller. However, it is not limited to the above. A program may execute any determination based on a capability of the apparatus, such as a communication capability, an audio-video reproduction capability, a capability of an input unit, a capability of an output device, and the like.

As described above, the storage region of the RF-ID unit holds not only information but also a program describing operations of an apparatus (device). This considerably simplify changing or updating of a program, which has been necessary for conventional techniques to change operations of apparatuses. In addition, it is possible to deal with addition of various new functions and an increase of cooperative apparatuses. Moreover, proximity communication using RF-ID technology is a simple operation achieved by simply bringing a device into proximity of an apparatus, which the user can easily understand. Therefore, conventional bothersome device operations by using buttons and a menu are simplified. As a result, the complicated device operations are changed to be convenient.

Second Embodiment

The following describes the second embodiment of the present invention. In the second embodiment, actual operations of the communication system are described. In the communication system, images captured by a camera are uploaded to a server, and then downloaded by a simple operation to a TV to be displayed. The whole configuration of the communication system according to the second embodiment is the same as that of the communication system according to the first embodiment.

Figure 40A:
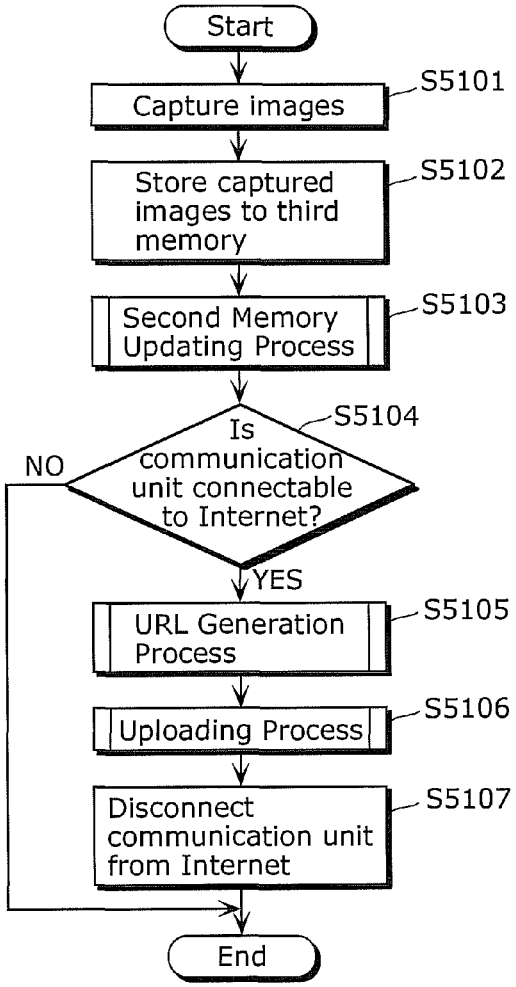
FIG. 40A shows a flowchart of uploading steps in a camera according to a second embodiment of the present invention.

FIGS. 40A to 40C are flowcharts of processing performed by a camera (the image capturing device 1) to upload photographs (images). First, the camera captures images (Step S5101). Then, the captured images are stored into the third memory (Step S5102). Then, the camera updates information stored in the second memory (Step S5103). The second memory updating process will be described later. Next, the camera determines whether or not the communication unit is connectable to the Internet (Step S5104). If connectable, then the camera generates a URL (Step S5105). The URL generation process will be described in more detail later. After generating the URL, the camera uploads the captured images (Step S5106). In completing the uploading process, the camera disconnects the communication unit from the Internet (Step S5107). As a result, the processing is completed. The uploading process will be described in more detail later.

The second memory updating process of Step S5103 enables the server 42 and the camera to share identification information for distinguishing photographs that have already been uploaded to the server 42 from photographs that have not yet been uploaded to the server 42. Examples of the uploading process at Step S5106 are given as following cases 1 to 4.

In case 1, the final capturing time (final capturing date/time) 68 is previously stored in the second memory, and then updated after the captured images are stored into the third memory (Step S5111).

Comparison of a time of uploading the captured images to the final capturing time 68 of the camera allows the server 42 and the camera to share identification information of the uploaded photographs.

In case 2, the above advantages can be produced also by generating existence identifiers 64 of images not yet been uploaded to the server 42, with reference to images uploaded to the server 42 among the captured images, and storing the generated existence identifiers 64 into the second memory (Step S5121).

In case 3, it is also possible that the not-yet-uploaded image information hashed information 67 is stored in the second memory (Step S5131). Thereby, an amount of the information stored in the second memory is reduced, thereby saving a capacity of the second memory.

In case 4, it is further possible that image serial numbers are chronologically generated for captured images, and thereby the final image serial number 69 in the second memory is updated (Step S5141). Thereby, even if a time counted by the camera is not correct, it is possible to synchronize information of uploaded photographs between the server 42 and the camera.

Figure 41:
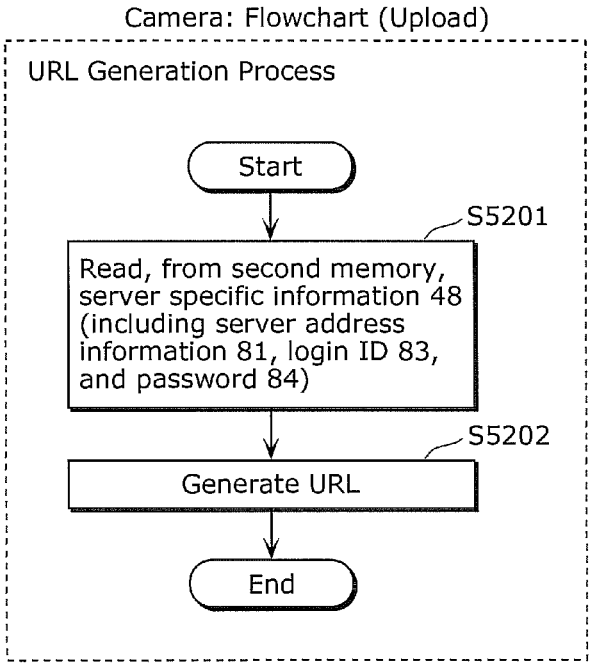
FIG. 41 is a flowchart of uploading steps in the camera according to the second embodiment of the present invention.
Figure 42A:
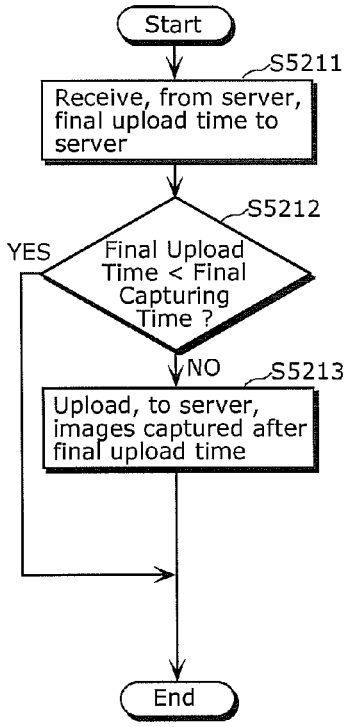
FIG. 42A is a flowchart of uploading steps in the camera according to the first embodiment of the present invention.
Figure 42B:
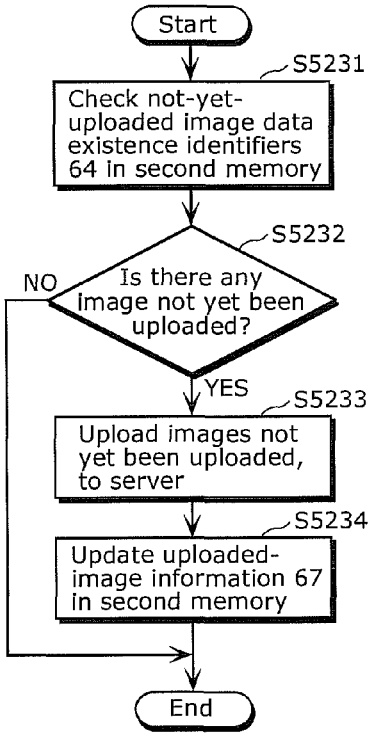
FIG. 42B is a flowchart of uploading steps in the camera according to the first embodiment of the present invention.
Figure 42C:
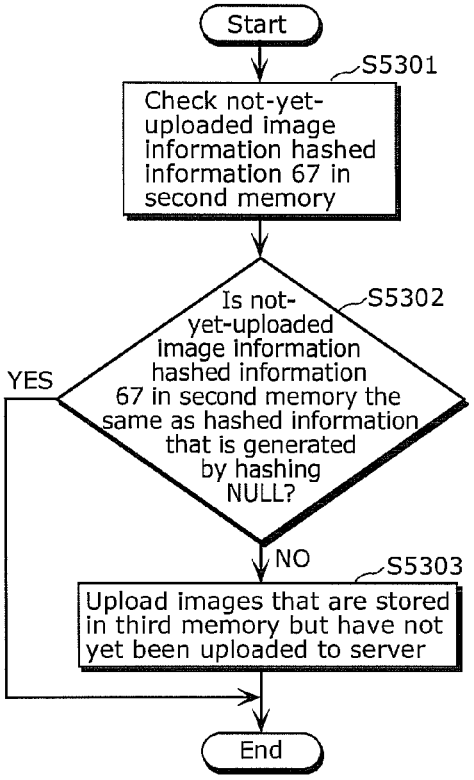
FIG. 42C is a flowchart of uploading steps in the camera according to the first embodiment of the present invention.
Figure 42D:
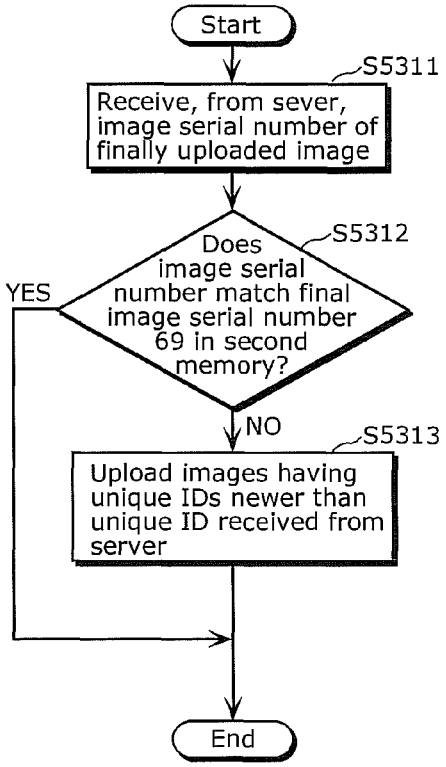
FIG. 42D is a flowchart of uploading steps in the camera according to the first embodiment of the present invention.

FIG. 41 depicts details of the URL generation process at Step S5105. The camera reads, from the second memory, the server specific information 48 including the server address information 81, the login ID 83, and the password 84 (Step S5201). Based on the server specific information 48, the camera generates a URL (Step S5202).

FIGS. 42A to 42D depict details of the uploading process at Step S5106.

The cases 1 to 4 in FIGS. 42A to 42D correspond to the above-described cases 1 to 4 of the second memory updating process in FIGS. 40B to 40C, respectively.

In case 1, the camera receives, from the server 42, a final upload time (final upload date/time) that is a time of finally uploading to the server 42 (Step S5211). Then, the camera compares the final upload time to the final capturing time (Step S5212). If the final capturing time is later than the final upload time (in other words, if there is any image captured after final uploading), then the camera uploads, to the server 42, any images captured after the final upload time (Step S5213).

In case 2, the camera checks not-yet-uploaded image data existence identifiers 64 in the second memory (Step S5231). Thereby, the camera determines whether or not there is any image not yet been uploaded (Step S5232). If there is any image not yet been uploaded, then the camera uploads images not yet been uploaded, to the server 42 (Step S5233). Then, the camera updates the uploaded-image information 61 in the second memory (Step S5234).

In case 3, the camera checks the not-yet-uploaded image information hashed information 67 in the second memory (Step S5301). Thereby, the camera determines whether or not the not-yet-uploaded image information hashed information 67 in the second memory is the same as hashed information that is generated by hashing NULL (Step S5302). If the not-yet-uploaded image information hashed information 67 is not the same as the hashed information regarding NULL, then the camera determines that there is an image not yet been uploaded to the server 42 and therefore uploads, to the server 42, any images that are stored in the third memory but have not yet been uploaded to the server 42 (Step S5303).

In case 4, the camera receives, from the server 42, an image serial number of a finally uploaded image (Step S5311). Then, the camera determines whether or not the image serial number matches the final image serial number 69 in the second memory (Step S5312). If the image serial number does not match the final image serial number 69, then the camera uploads any images having UIDs that are newer than UID of the final image serial number 69 that is received from the server 42 (Step S5313).

Figure 43:
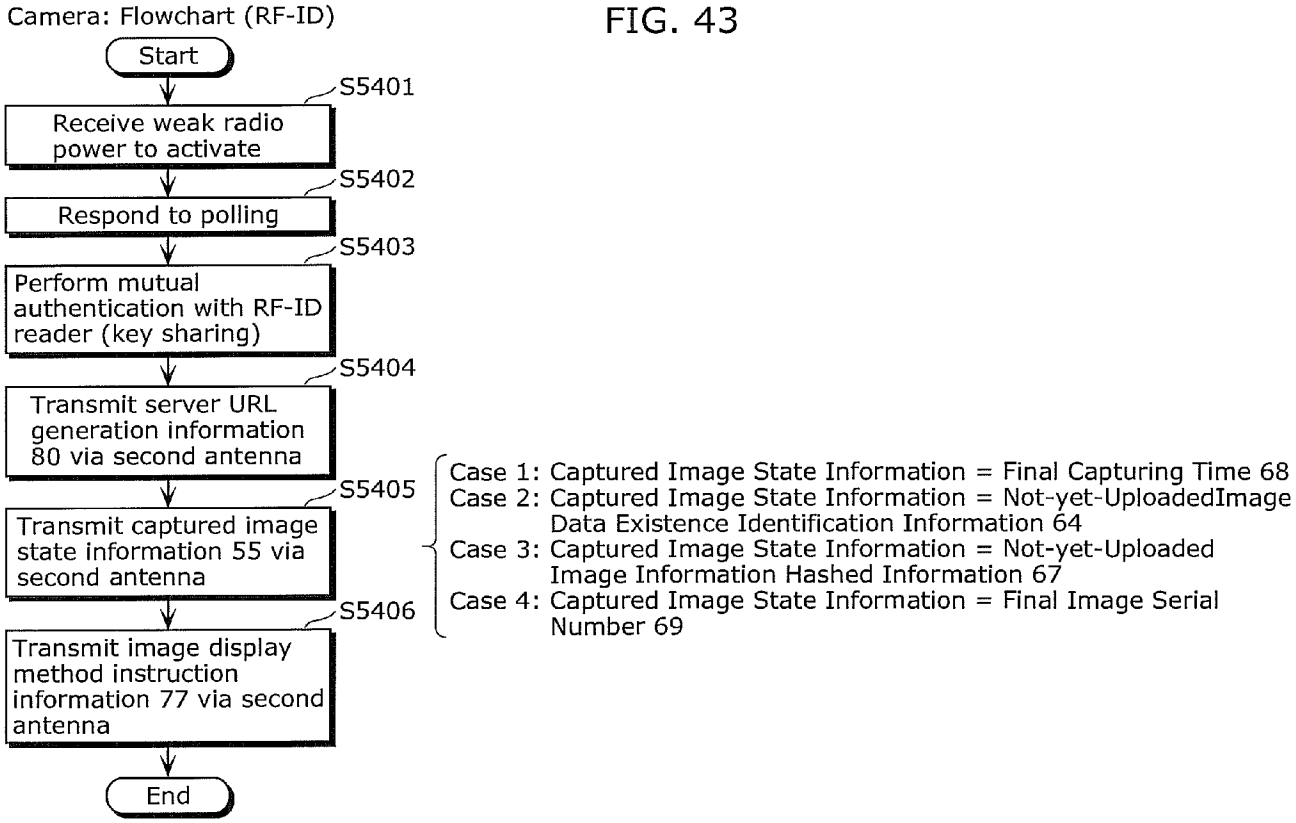
FIG. 43 is a flowchart of operation steps of a RF-ID unit in the camera according to the second embodiment of the present invention.

FIG. 43 is a flowchart of RF-ID proximity communication between the image capturing device 1 and the TV 45.

First, the second antenna 21 embedded in the image capturing device 1 receives weak radio power from polling of the RF-ID reader/writer 46 of the TV 45, and thereby activates the RF-ID unit 47 operated under the second power supply unit 91 (S5401).

The RF-ID unit 47 of the image capturing device 1, which is activated by receiving weak power at Step S5401, responds to the polling of the RF-ID reader/writer 46 of the TV 45 (Step S5402).

After responding to the polling at Step S5402, mutual authentication is performed to determine whether or not the RF-ID unit 47 of the image capturing device 1 and the RF-ID reader/writer 46 of the TV 45 are legitimate devices, and also to share a cryptography key used for secure information communication between the image capturing device 1 and the TV 45 (Step S5403). The mutual authentication employs a public key cryptography algorism such as elliptic curve cryptography. In general, the employed method for the mutual authentication is the same as that of mutual authentication used in communication via High Definition Multimedia Interface (HDMI) or IEEE1394.

As described earlier, at Step S5403, the mutual authentication is performed between the RF-ID unit 47 of the image capturing device 1 and the RF-ID reader/writer 46 of the TV 45 to generate a common cryptography key. After that, the server URL generation information 80 is read from the server specific information 48 stored in the second memory 52 readable from the RF-ID unit 47. The server URL generation information 80 is transmitted to the RF-ID reader/writer 46 of the TV 45 via the second antenna 21 (Step S5404). The server URL generation information 80 includes: the server address information 81 indicating address information of the server 42; the user identification information 82 that is the login ID 83 to the server 42; and the password 84 that is a login password to the server 42. The password 84 is important information for preventing unauthorized acts of a malicious third person. Therefore, the password 84 is sometimes encrypted beforehand as the encrypted password 85 to be stored, and then transmitted to the TV 45.

After the server URL generation information 80 is transmitted to the RF-ID reader/writer 46 of the TV 45 at Step S5404, the captured image state information 55 stored in the second memory 52 is also transmitted to the RF-ID reader/writer 46 of the TV 45 via the second antenna 21 (Step S5405). The captured image state information 55 is: the final capturing time 68 (case 1); the existence identifiers 64 which are existence identification information regarding images not yet been uploaded and each of which is assigned to a corresponding one of the captured images so that it is possible to determine whether the image has not yet been uploaded (case 2); the not-yet-uploaded image information hashed information 67 (case 3); or the final image serial number 69 from among image serial numbers chronologically assigned to captured images (case 4). The captured image state information 55 is important for examining synchronization between captured images in the image capturing device 1 and captured images in the server 42.

In case 1, the final capturing time 68 is used as the captured image state information 55. Therefore, the TV 45 compares the final capturing time 68 to the final upload time. If the final capturing time 68 is temporally later than the final upload time that is a time of finally uploading to the server 42, then it is determined that the image data in the image capturing device 1 is not in synchronization with the image data in the server 42. Therefore, warning information regarding the synchronization failure is displayed on the display unit of the TV 45.

In case 2, the captured image state information 55 is the existence identifiers 64 each of which is assigned to a corresponding one of the captured images so that it is possible to determine whether the image has not yet been uploaded. Therefore, the TV 45 examines the existence identifiers 64 to determine whether or not there is any image not yet been uploaded. If there is any image not yet been uploaded, then it is determined that the image data in the image capturing device 1 is not in synchronization with the image data in the server 42. Therefore, warning information regarding the synchronization failure is displayed on the display unit of the TV 45.

In case 3, the not-yet-uploaded image information hashed information 67 is employed as the captured image state information 55. Therefore, the TV 45 examines the not-yet-uploaded image information hashed information 67 to determine whether or not there is any image not yet been uploaded. If there is any image not yet been uploaded, then it is determined that the image data in the image capturing device 1 is not in synchronization with the image data in the server 42. Therefore, warning information regarding the synchronization failure is displayed on the display unit of the TV 45.

In case 4, the captured image state information 55 is the final image serial number 69 from among image serial numbers chronologically assigned to the captured images. Therefore, the TV 45 compares (a) the final image serial number 69 from among image serial numbers chronologically assigned to the captured images to (b) an image serial number of an image finally uploaded to the server 42. Here, the final image serial number 69 is provided from the image capturing device 1, while the image serial number is provided from the server 42. Based on the comparison, the TV 45 can determine whether or not there is any image not yet been uploaded. If there is any image not yet been uploaded, then it is determined that the image data in the image capturing device 1 is not in synchronization with the image data in the server 42. Therefore, warning information regarding the synchronization failure is displayed on the display unit of the TV 45.

After transmitting the captured image state information 55 from the second antenna 21 of the image capturing device 1 to the RF-ID reader/writer 46 of the TV 45 at Step S5405, the image display method instruction information 77 is also transmitted from the second memory 52 of the image capturing device 1 to the RF-ID reader/writer 46 of the TV 45 via the second antenna 21 (Step S5406). The image display method instruction information 77 is identification information indicating how the display unit of the TV 45 is to display the images downloaded from the server 42. The image display method instruction information 77 includes the list display (indicator) 78 indicating that the images are to be displayed in a list, and the slide show (indicator) 79 indicating that the images are to be displayed as a slide show.

As described above, at Steps S5401 to S5406, the image capturing device 1 transmits the server URL generation information 80, the captured image state information 55, and the image display method instruction information 77, which are stored in the second memory 52 of the image capturing device 1, from the second antenna 21 of the image capturing device 1 to the RF-ID reader/writer 46 of the TV 45. Here, it is desirable to encrypt all of the above pieces of information to be transmitted, by using the cryptography key information shared between the image capturing device 1 and the TV 45 at the mutual authentication. The encryption achieves secure information communication between the image capturing device 1 and the TV 45. As a result, intervention of a malicious third person can be prevented.

Since the server URL generation information 80 is transmitted to the TV 45, the server 42 (and directory) to which the first antenna 20 of the image capturing device 1 transmits data is the same as the server (and directory) from which the TV 45 downloads the data. Therefore, the TV 45 can display the images that have been captured by the image capturing device 1 and then uploaded to the server 42.

In addition, the transmission of the captured image state information 55 to the TV 45 makes it possible to examine synchronization between the captured images stored in the third memory 33 of the image capturing device 1 and the images uploaded from the first antenna 20 to the server 42. Therefore, the TV 45 can detect a failure of the synchronization. The display of the warning information indicating the synchronization failure on the TV 45 can prevent unnecessary confusion of the user.

Moreover, the transmission of the image display method instruction information 77 to the TV 45 enables the user to view images by a set image viewing method without designating the image viewing method on the TV 45. The user merely needs to move the image capturing device 1 into proximity of the TV 45. The complicated operations using a remote controller or the like of the TV 45 are not necessary. The images can be automatically displayed by the set viewing method.

Figure 44:
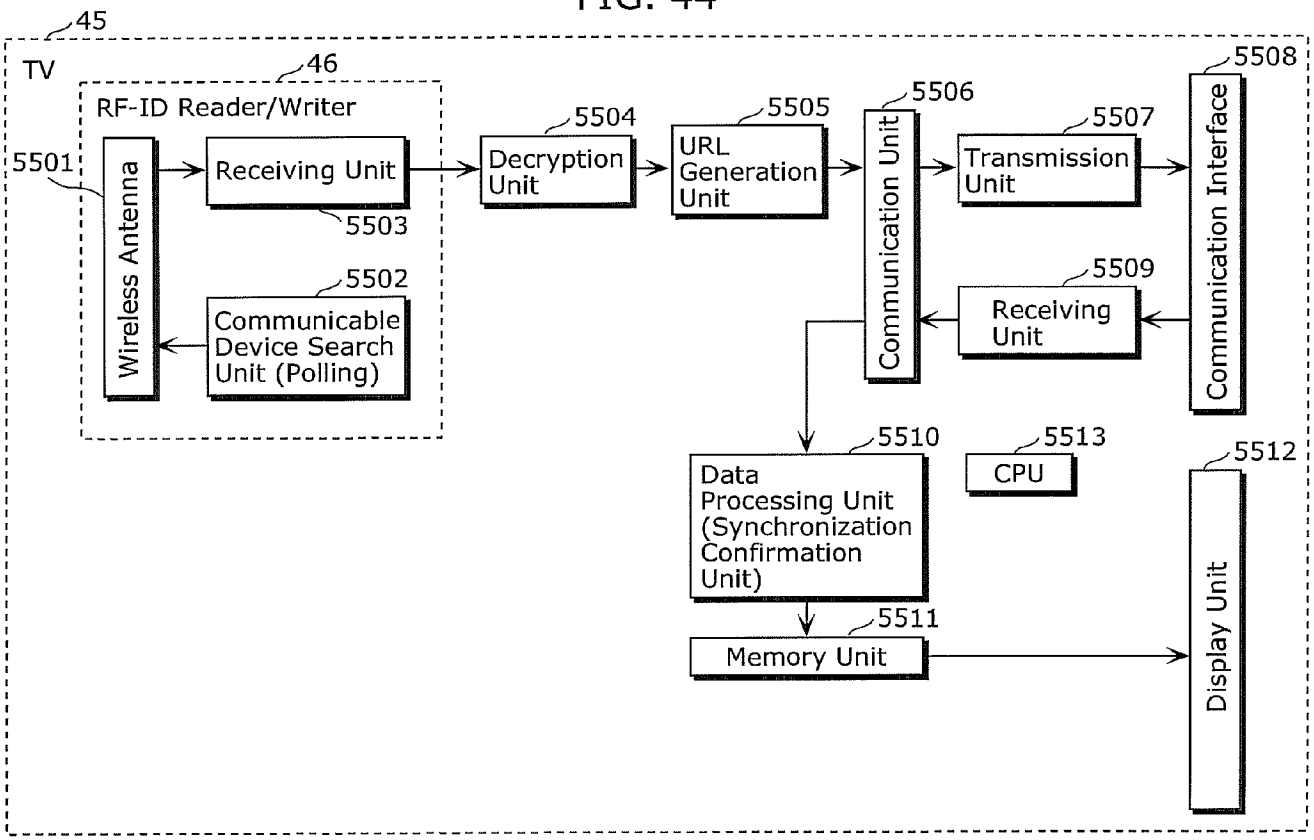
FIG. 44 is a block diagram of a TV according to the second embodiment of the present invention.

FIG. 44 is a block diagram of characteristic functions of a TV system according to the second embodiment of the present invention.

The TV 45 according to the second embodiment includes the RF-ID reader/writer 46, the decryption unit 5504, a URL generation unit 5505, a communication unit 5506, a transmission unit 5507, a communication interface 5508, a receiving unit 5509, a data processing unit 5510, a memory unit 5511, a display unit 5512, and a CPU 5513.

The RF-ID reader/writer 46 communicates with the RF-ID unit 47 of the image capturing device 1 via the second antenna 21. The RF-ID reader/writer 46 includes a wireless antenna 5501, a receiving unit 5503, and a communicable device search unit (polling unit) 5502.

The wireless antenna 5501 performs proximity wireless communication with the second antenna 21 of the image capturing device 1. The wireless antenna 5501 has the same structure as that of wireless antennas of general-purpose RF-ID reader/writers.

The communicable device search unit (polling unit) 5502 performs polling to check a RF-ID unit of each of plural cameras in order to examine whether to have any transmission request (or processing request). If the communicable device search unit 5502 receives a response of the polling from the RF-ID unit 47 of the image capturing device 1 (the corresponding camera), then the mutual authentication is performed to share a common cryptography key between the TV 45 and the image capturing device 1.

When the mutual authentication is completed after receiving the polling response, the receiving unit 5503 receives the server URL generation information 80, the captured image state information 55, and the image display method instruction information 77 from the second memory 52 via the second antenna 21 of the image capturing device 1.

The decryption unit 5504 decrypts the server URL generation information 80, the captured image state information 55, and the image display method instruction information 77 which are received by the receiving unit 5503. The decryption of the server URL generation information 80, the captured image state information 55, and the image display method instruction information 77 which have been encrypted is performed using the cryptography key shared between the image capturing device 1 and the TV 45 after the mutual authentication by the communicable device search unit (polling unit) 5502.

The URL generation unit 5505 generates, based on the server URL generation information 80, a URL to access the server 42, and then transmits the generated URL to the communication unit. The URL includes not only the server specific information, but also the login ID 83 and the password 85 used to login to the server.

The communication unit 5506 communicates with the server 42 via a general-purpose network using the communication interface 5508.

The transmission unit 5507 transmits the URL generated by the URL generation unit 5505 via the communication interface 5508 in order to connect the TV 45 to the server 42.

The communication interface 5508 is a communication interface for connecting the TV 45 to the server 42 via a general-purpose network. The communication interface 5508 is, for example, a wired/wireless LAN interface.

The receiving unit 5509 receives (downloads) image data and an image display cascading style sheet (CSS) from the server 42 connected by the communication interface 5508.

The data processing unit 5510 performs data processing for the image data downloaded by the receiving unit 5509. If the image data to be downloaded is compressed data, the data processing unit 5510 de-compresses the image data. If the image data is encrypted, the data processing unit 5510 decrypts the image data. In addition, the data processing unit 5510 can arrange the downloaded image data by an image display style based on the image display CSS. If it is determined, based on the captured image state information 55 obtained, if necessary, by decryption of the decryption unit, that the image data in the image capturing device 1 is not in synchronization with the image data in the server 42, then the data processing unit 5510 causes the display unit 5512 to display warning information regarding the synchronization failure. Thereby, unnecessary confusion of the user can be prevented. Moreover, the data processing unit 5510 sets a mode of displaying the downloaded image data, according to the image display method instruction information 77 provided from the decryption unit 5504. For example, if the list display (flag) 78 in the image display method instruction information 77 is ON, then the data processing unit 5510 generates a list of the downloaded images and provides the list to the memory unit 5511. If the slide show (flag) 79 in the image display method instruction information 77 is ON, then the data processing unit 5510 generates a slide show of the downloaded images and provides the slide show to the memory unit 5511.

The memory unit 5511 is a memory that temporarily holds the image data processed by the data processing unit 5510.

The display unit 5512 displays the image data stored in the memory unit 5511. The image data has been downloaded from the server 42 and applied with data processing by the data processing unit 5510 as described earlier.

As descried above, based on the server URL generation information 80, the captured image state information 55, and the image display method instruction information 77 which are received from the RF-ID unit 47 of the image capturing device 1, the TV 45 according to the second embodiment of the present invention can be connected to the server 42, then download the uploaded image data from the server 42, and display the downloaded image data on the display unit 5512. Thereby, the user does not need to do complicated processes of removing the third memory 33 such as a Secure Digital (SD) card or a flash memory from the image capturing device 1 and equipping the third memory 33 to a card reader of the TV 45 in order to view captured images. In the second embodiment of the present invention, the user can display and view captured image data, by simple operations of simply presenting the RF-ID unit 47 of the image capturing device 1 to the RF-ID reader/writer 46 of the TV 45 for proximity communication. The second embodiment of the present invention can provide a captured image viewing system by which even users who are not familiar with operations of digital devices can easily view image data.

Figure 45:
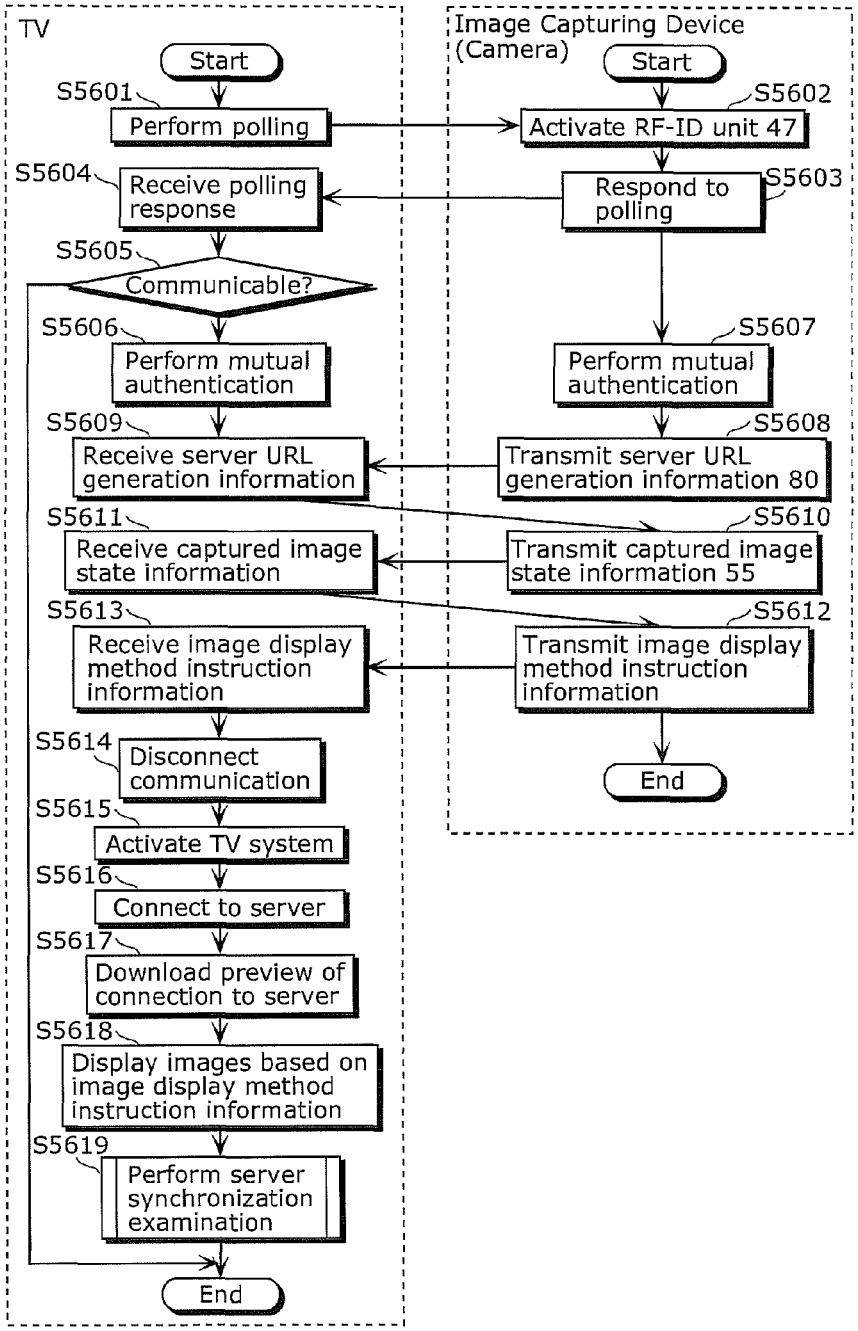
FIG. 45 is a flowchart of RF-ID communication between the camera and the TV, according to the second embodiment of the present invention.

FIG. 45 is a flowchart of RF-ID wireless proximity communication between the image capturing device 1 and the TV 45.

First, the communicable device search unit 5502 in the RF-ID reader/writer 46 of the TV 45 transmits a polling signal to search for the RF-ID unit 47 of the communicable image capturing device 1 (Step S5601).

When the image capturing device 1 receives the polling signal from the communicable device search unit 5502 in the RF-ID reader/writer 46 of the TV 45, the second power supply unit 91 is supplied with power to activate (operate) the RF-ID unit 47 (Step S5602). Here, at least the RF-ID unit 47, which can be operated under the second power supply unit 91, is activated. It is not necessary to activate all functions in the image capturing device 1.

When the activation of the RF-ID unit 47 of the image capturing device 1 is completed at Step S5602, the image capturing device 1 transmits a polling response for the polling to the RF-ID reader/writer 46 of the TV 45 via the second antenna 21 (Step S5603).

After the image capturing device 1 responds to the polling at Step S5603, the TV 45 receives the polling response by the wireless antenna 5501 of the RF-ID reader/writer 46 (Step S5604).

After receiving the polling response at Step S5604, the TV 45 determines whether or not the image capturing device 1 transmitting the polling response is a device mutually communicable with the TV 45 (Step S5605). If the determination is made that the image capturing device 1 cannot mutually communicate with the TV 45, then the processing is completed. On the other hand, if the determination is made that the image capturing device 1 is mutually communicable with the TV 45, then the processing proceeds to Step S5606.

If the determination is made that the image capturing device 1 is mutually communicable with the TV 45 at Step S6505, then the TV 45 performs mutual authentication to determine whether or not the image capturing device 1 and the TV 45 are legitimate devices for communication (Step S5606). The mutual authentication is the same as general mutual authentication using HDMI or IEEE1394. In the mutual authentication, issuing of challenge data and checking of response data are performed plural times between the TV 45 and the image capturing device 1 to eventually generate a common cryptography key. If one of the TV 45 and the image capturing device 1 is not legitimate, the common cryptography key is not generated, thereby disabling future mutual communication.

The image capturing device 1 also performs the same mutual authentication in the RF-ID unit 47. Generation and transmission of challenge data and receiving and checking of response data are performed plural times between the TV 45 and the image capturing device 1 to eventually generate a cryptography key identical to the cryptography key generated by the TV 45 (Step S5607).

When the mutual authentication is completed at Step S5607, the image capturing device 1 reads the server URL generation information 80 as the server specific information 48 from the second memory 52, then encrypts the server URL generation information 80 using the common cryptography key generated at the mutual authentication, and transmits the encrypted server URL generation information 80 to the RF-ID reader/writer 46 of the TV 45 (Step S5608).

The TV 45 receives the encrypted server URL generation information 80 transmitted at Step S5608, by the receiving unit 5503 in the RF-ID reader/writer 46. Then, the decryption unit 5504 decrypts the encrypted server URL generation information 80 using the common cryptography key. Based on the server URL generation information 80, the URL generation unit 5505 generates a URL to access the server 42. Then, the TV 45 transmits, to the image capturing device 1, a notification of completion of receiving the server URL generation information 80 (Step S5609).

After the notification of the receiving completion is transmitted at Step S5609, the image capturing device 1 receives the notification by the second antenna 21. Then, the image capturing device 1 reads the captured image state information 55 from the second memory 52 to transmit the captured image state information 55 to the TV 45 (Step S5610). The captured image state information 55 is: the final capturing time 68 (case 1); the existence identifiers 64 which are existence identification information regarding images not yet been uploaded and each of which is assigned to a corresponding one of the captured images so that it is possible to determine whether the image has not yet been uploaded (case 2); the not-yet-uploaded image information hashed information 67 (case 3); or the final image serial number 69 from among image serial numbers chronologically assigned to captured images (case 4). The captured image state information 55 is important for examining synchronization between captured images in the image capturing device 1 and captured images in the server 42.

After the image capturing device 1 transmits the captured image state information 55 at Step S5610, the TV 45 receives the captured image state information 55 by the RF-ID reader/writer 46 and then transmits, to the image capturing device 1, a notification of completion of receiving the captured image state information 55 (Step S5611). Here, the CPU 5513 in the TV 45 performs the following processing depending on kinds of the received captured image state information 55.

In case 1, the final capturing time 68 is used as the captured image state information 55. Therefore, the TV 45 compares the final capturing time 68 to the final upload time that is a time of finally uploading to the server 42. If the final capturing time 68 is temporally later than the final upload time, then it is determined that the image data in the image capturing device 1 is not in synchronization with the image data in the server 42. Therefore, warning information regarding the synchronization failure is displayed on the display unit of the TV 45.

In case 2, the captured image state information 55 is the existence identifiers 64 each of which is assigned to a corresponding one of the captured images so that it is possible to determine whether the image has not yet been uploaded. Therefore, the TV 45 examines the existence identifiers 64 to determine whether or not there is any image not yet been uploaded. If there is any image not yet been uploaded, then it is determined that the image data in the image capturing device 1 is not in synchronization with the image data in the server 42. Therefore, warning information regarding the synchronization failure is displayed on the display unit of the TV 45.

In case 3, the not-yet-uploaded image information hashed information 67 is employed as the captured image state information 55. Therefore, the TV 45 examines the not-yet-uploaded image information hashed information 67 to determine whether or not there is any image not yet been uploaded. If there is any image not yet been uploaded, then it is determined that the image data in the image capturing device 1 is not in synchronization with the image data in the server 42. Therefore, warning information regarding the synchronization failure is displayed on the display unit of the TV 45.

In case 4, the captured image state information 55 is the final image serial number 69 from among image serial numbers chronologically assigned to the captured images. Therefore, the TV 45 compares (a) the final image serial number 69 from among image serial numbers chronologically assigned to the captured images to (b) an image serial number of an image finally uploaded to the server 42. Here, the final image serial number 69 is provided from the image capturing device 1, while the image serial number is provided from the server 42. Based on the comparison, the TV 45 can determine whether or not there is any image not yet been uploaded. If there is any image not yet been uploaded, then it is determined that the image data in the image capturing device 1 is not in synchronization with the image data in the server 42. Therefore, warning information regarding the synchronization failure is displayed on the display unit of the TV 45.

After the TV 45 completes receiving of the captured image state information 55 and transmits the notification of the receipt to the image capturing device 1 at Step S5611, the image capturing device 1 reads the image display method instruction information 77 from the second memory 52 and transmits the image display method instruction information 77 to the TV 45 (Step S5612). The image display method instruction information 77 includes the list display (flag) 78 and the slide show (flag) 79.

After the image display method instruction information 77 is transmitted at Step S5612, the TV 45 receives the image display method instruction information 77 by the RF-ID reader/writer 46 of the TV 45 and transmits a notification of completion of receiving the image display method instruction information 77 to the image capturing device 1 (Step S5613). The data processing unit 5510 of the TV 45 generates a mode of displaying images downloaded from the server 42, based on the received image display method instruction information 77. For example, if the list display flag in the image display method instruction information 77 is ON, the data processing unit 5510 generates a list of the downloaded images and stores the generated list in the memory unit 5511 and causes the display unit 5512 to display the list. On the other hand, if the slide show flag in the image display method instruction information 77 is ON, the data processing unit 5510 generates a slide show of the downloaded images and stores the generated slide show in the memory unit 5511 and causes the display unit 5512 to display the slide show.

After receiving the image display method instruction information 77 at Step S5613, the TV 45 disconnects communication from the RF-ID unit 47 of the image capturing device 1 (Step S5614).

Next, the TV 45 activates a TV system (Step S5615). The activation of the TV system refers to turning the main power of the TV 45 ON to display the downloaded image data on the display unit 5512. Prior to the activation of the TV system at Step S5615, at least the RF-ID reader/writer 46 of the TV 45 is activated and the display unit 5512 may be turned OFF.

Then, the communication unit 5506 is activated to connect the TV 45 to the server 42 based on the URL generated by the URL generation unit 5505 (Step S5616).

After connecting to the server 42 at Step S5616, the TV 45 downloads uploaded image data from the server 42 (Step S5617).

The data processing unit 5510 generates to-be-displayed image data from the images downloaded at the Step S5617, based on the image display method instruction information 77 obtained from the camera (the image capturing device 1), then stores the generated image data into the memory unit 5511, and displays the image data on the display unit 5512 (Step S5618). The data processing unit 5510 of the TV 45 generates a mode of displaying the images (image data) downloaded from the server 42, based on the received image display method instruction information 77. For example, if the list display flag 78 in the image display method instruction information 77 is ON, the data processing unit 5510 generates a list of the downloaded images and stores the generated list in the memory unit 5511 and causes the display unit 5512 to display the list. On the other hand, if the slide show flag 79 in the image display method instruction information 77 is ON, the data processing unit 5510 generates a slide show of the downloaded images and stores the generated slide show in the memory unit 5511 and causes the display unit 5512 to display the slide show.

After displaying of the images downloaded from the server 42 is completed at Step S5617, the TV 45 performs synchronization examination to determine whether or not the captured images recorded in the third memory 33 of the image capturing device 1 are in synchronization with the images downloaded from the server 42 (Step S5619). The synchronization examination is performed based on the captured image state information provided at Step S5611 from the image capturing device 1. The captured image state information 55 is: the final capturing time 68 (case 1); the existence identifiers 64 which are existence identification information regarding images not yet been uploaded and each of which is assigned to a corresponding one of the captured images so that it is possible to determine whether the image has not yet been uploaded (case 2); the not-yet-uploaded image information hashed information 67 (case 3); or the final image serial number 69 from among image serial numbers chronologically assigned to captured images (case 4). The captured image state information 55 is important for examining synchronization between captured images in the image capturing device 1 and captured images in the server 42.

FIGS. 46A and 46B are flowcharts of details of the server synchronization examination (Step S5619) of FIG. 45 when the captured image state information 55 are cases 1 to 4, respectively.

(a) in FIG. 46A is a flowchart of case 1 where the captured image state information 55 is the final capturing time 68.

First, the communication unit 5506 of the 45 receives, from the server 42, date/time of finally uploading to the server 42 (hereinafter, referred to also as a "final upload date/time" that may be date/time of capturing a final image among uploaded images to produce the same advantages) (Step S5701).

Next, the TV 45 compares the final upload date/time to a final capturing date/time 68 (Step S5702). The final capturing date/time 68, which is date/time of final capturing of the image capturing device 1, is indicated in the captured image state information 55 provided from the image capturing device 1 to the RF-ID reader/writer 46. If the final upload date/time is prior to the final capturing date/time 68, it is determined that there is an image captured after the final upload and not yet been uploaded to the server 42. Therefore, a determination is made that the images in the image capturing device 1 are not in synchronization with the images in the server 42. Then, warning information is displayed at Step S5703. On the other hand, if the final upload date/time is equal to the final capturing date/time 68, it is determined that the images in the image capturing device 1 are in synchronization with the images in the server 42. Then, the synchronization examination is completed without displaying warning information.

If it is determined at Step S5702 that the images in the image capturing device 1 are not in synchronization with the images in the server 42, the display unit 5512 displays warning information indicating the synchronization failure. Here, if time information is generated by comparing the final upload date/time to the final capturing date/time 68 in order to indicate from when captured images are not uploaded, and the generated time information is presented as a message together with the warning information, the warning information is convenient for the user.

(b) in FIG. 46A is a flowchart of case 2 where the captured image state information 55 is the existence identifiers 64 each of which is assigned to a corresponding one of the captured images so that it is possible to determine whether the image has not yet been uploaded.

First, it is determined, based on the existence identifiers of the not-yet-uploaded image existence identification information, whether or not there is any image not yet been uploaded to the server 42 from among the captured images stored in the third memory 33 of the image capturing device 1 (Step S5711). Here, the existence identifiers are indicated in the captured image state information 55 provided from the image capturing device 1 to the RF-ID reader/writer 46. If it is determined that there is an image not yet been uploaded to the server 42 at Step S5711, then the processing proceed to Step S5712 to display warning information. On the other hand, if there is not image not yet been uploaded, it is determined that the images in the image capturing device 1 are in synchronization with the images in the server 42. Then, the synchronization examination is completed without displaying warning information.

If it is determined that the images in the image capturing device 1 are not in synchronization with the images in the server 42, the display unit 5512 displays warning information indicating the synchronization failure at Step S5712.

(c) in FIG. 46B is a flowchart of case 3 where the captured image state information 55 is the not-yet-uploaded image information hashed information 67.

First, it is determined, based on the not-yet-uploaded image information hashed information 67, whether or not there is any image not yet been uploaded to the server 42 from among the captured images stored in the third memory 33 of the image capturing device 1 (Step S5721). Here, the not-yet-uploaded image information hashed information 67 is indicated in the captured image state information 55 provided from the image capturing device 1 to the RF-ID reader/writer 46. The determination of Step S5721 is performed by comparing the not-yet-uploaded image information hashed information 67 to a hashed value generated by hashing NULL generated in the TV 45. If it is determined that there is an image not yet been uploaded at Step S5721, then the processing proceed to Step S5722 to display warning information. On the other hand, if there is no image not yet been uploaded, it is determined that the images in the image capturing device 1 are in synchronization with the images in the server 42. Then, the synchronization examination is completed without displaying warning information.

If it is determined that the images in the image capturing device 1 are not in synchronization with the images in the server 42, the display unit 5512 displays warning information indicating the synchronization failure at Step S5722.

(d) in FIG. 46B is a flowchart of case 4 where the captured image state information 55 is a final image serial number from among image serial numbers assigned to captured images.

First, the communication unit 5506 of the TV 45 receives, from the server 42, an image serial number of an image finally uploaded to the server 42 (Step S5731).

Next, the TV 45 compares (a) the image serial number 69 of the image finally uploaded which is provided form the server 42 to (b) a final image serial number 69 of an image finally captured which is indicated in the captured image state information 55 provided from the image capturing device 1 by the RF-ID reader/writer 46 (Step S5732). If the mage serial number 69 of the image finally uploaded is smaller than the mage serial number 69 of the image finally captured, it is determined that there is an image captured after the final upload and not yet been uploaded to the server 42. Therefore, a determination is made that the images in the image capturing device 1 are not in synchronization with the images in the server 42. Then, the processing proceeds to Step S5733 to display warning information. On the other hand, if the mage serial number 69 of the image finally uploaded is identical to the mage serial number 69 of the image finally captured, it is determined that the images in the image capturing device 1 are in synchronization with the images in the server 42. Then, the synchronization examination is completed without displaying warning information.

If it is determined at Step S5732 that the images in the image capturing device 1 are not in synchronization with the images in the server 42, the display unit 5512 displays warning information indicating the synchronization failure.

When all of images captured by the image capturing device 1 are not uploaded to the serve 42 (in other words, when images captured by the image capturing device 1 are not in synchronization with images uploaded to the server 42), any of above cases 1 to 4 makes it possible to detect the synchronization failure. Thereby, although all of the captured images cannot be displayed on the display unit 5512, a convenient message can be displayed to the user to inform the synchronization failure. As a result, unnecessary confusion of the user can be prevented.

FIG. 47A is (1) a data format used in uploading captured images from the image capturing device 1 to the server 42. FIG. 47B is (2) a data format used in RF-ID communication between the image capturing device 1 and the TV 45.

First, (1) a data format 5940 in uploading captured images from the image capturing device 1 to the server 42 is described. The data format 5940 includes camera ID 5901, a sever address 5902, a server login ID 5903, a server login password 5904, an image directory 5905, and an uploading-image number 5906.

The camera ID 5901 is camera UID uniquely assigned to each camera (image capturing device 1). The camera ID 5901 is ID information recorded in the camera ID 76 in the second memory 52 of the image capturing device 1. Use of the camera ID 5901 as login ID to the server 42 can provide a server address unique to each image capturing device 1 so that the image capturing device 1 can access the server 42 without user's entry of login ID. In addition, the camera ID 5901 enables the server 42 to manage captured images for each capturing camera.

The sever address 5902 is included in the server address information 81 in the server specific information 48 stored in the second memory 52 of the image capturing device 1. The sever address 5902 enables the TV 45 to identify the server to which target image data is uploaded.

The server login ID 5903 is included in the login ID 83 in the user identification information 82 in the server specific information 48 stored in the second memory 52 of the image capturing device 1. The server login ID 5903 allows the TV 45 to login, by using the same account, to the server to which the image capturing device 1 uploads image data.

The server login password 5904 is included in the password 84 in the server specific information 48 stored in the second memory 52 of the image capturing device 1. The server login password 5904 allows the TV 45 to login, by using the same account, to the server to which the image capturing device 1 uploads image data.

The uploading-image number 5906 is the number of images to be uploaded to the server. The uploading-image number 5906 is equal to the number of images which is stored as the not-yet-uploaded-image number 65 in the second memory 52 of the image capturing device 1. After capturing images, the number of images not yet been uploaded is indicated in the uploading-image number 5906.

After transmitting the data format 5940, the image capturing device 1 uploads, to the server 42, the images that are stored in the third memory 33 of the image capturing device 1 but not yet been uploaded to the server 42.

Next, (2) a data format 5950 used in RF-ID communication between the image capturing device 1 and the TV 45 is described. The data format 5950 includes camera ID 5911, a sever address 5912, a server login ID 5913, a server login password 5914, a final capturing date/time (final capturing time) 5915, and not-yet-uploaded image data existence identifiers 5916, not-yet-uploaded image information hashed information 5917, a final image serial number 5918, and image display method instruction information 5919.

The camera ID 5911 is a camera UID uniquely assigned to each camera (image capturing device 1). The camera ID 5911 is ID information recorded in the camera ID 76 in the second memory 52 of the image capturing device 1. Use of the camera ID 5911 as login ID to the server 42 from the TV 45 can provide a server address unique to each image capturing device 1 so that the TV 45 can access the server 42 without user's entry of login ID. The camera ID 5901 may be used in the mutual authentication between the RF-ID unit 47 of the image capturing device 1 and the RF-ID reader/writer 46 of the TV 45.

The sever address 5912 is included in the server address information 81 in the server specific information 48 stored in the second memory 52 of the image capturing device 1. The sever address 5912 enables the TV 45 to identify the server to which target image data is uploaded.

The server login ID 5913 is included in the login ID 83 in the user identification information 82 in the server specific information 48 stored in the second memory 52 of the image capturing device 1. The server login ID 5913 allows the TV 45 to login, by using the same account, to the server to which the image capturing device 1 uploads image data.

The server login password 5914 is included in the password 84 in the server specific information 48 stored in the second memory 52 of the image capturing device 1. The server login password 5914 allows the TV 45 to login, by using the same account, to the server to which the image capturing device 1 uploads image data.

The final capturing date/time 5915 corresponds to the final capturing time 68 in the captured image state information 55 stored in the second memory 52 of the image capturing device 1. The TV 45 uses the final capturing date/time 5915 for the synchronization examination between captured images in the image capturing device 1 and captured images in the server 42.

The not-yet-uploaded image data existence identifiers 5916 correspond to the not-yet-uploaded image data existence identification information in the captured image state information 55 stored in the second memory 52 of the image capturing device 1. TV 45 uses the not-yet-uploaded image data existence identifiers 5916 for the synchronization examination between captured images in the image capturing device 1 and captured images in the server 42. In order to implement each of the not-yet-uploaded image data existence identifiers 5916, each image ID 5928 for identifying a corresponding one of captured images is assigned with an upload flag 5926 indicating whether or not the corresponding image has been uploaded to the server 42. Thereby, it is possible to determine whether or not each of the captured images has been uploaded to the server 42.

The not-yet-uploaded image information hashed information 5917 corresponds to the not-yet-uploaded image information hashed information 67 in the captured image state information 55 stored in the second memory 52 of the image capturing device 1. The TV 45 uses the not-yet-uploaded image information hashed information 5917 for the synchronization examination between captured images in the image capturing device 1 and captured images in the server 42.

The final image serial number 5918 corresponds to the final image serial number 69 in the captured image state information 55 stored in the second memory 52 of the image capturing device 1. The TV 45 uses the final image serial number 5918 for the synchronization examination between captured images in the image capturing device 1 and captured images in the server 42.

The image display method instruction information 5919 corresponds to the image display method instruction information 77 in the captured image state information 55 stored in the second memory 52 of the image capturing device 1. The image display method instruction information 5919 includes identification information by which the TV 45 designates a method of viewing images downloaded from the server 42.

For each image ID 5927, the image display method instruction information 5919 includes a list display flag 5920, a slide show flag 5921, a print flag 5922, a video reproduction flag 5923, a download flag 5924, and a security password 5925.

The image ID 5927 is information unique to a captured image. The pieces of image ID 5927 are chronologically assigned to captured images by the image capturing device 1 in capturing the images.

The list display flag 5920 corresponds to the list display (flag) 78 stored in the second memory 52 of the image capturing device 1. The TV 45 uses the list display flag 5920 to determine whether or not image data downloaded from the server 42 is to be displayed in a list format. If the list display flag 5920 indicates "yes", the data processing unit 5510 of the TV 45 generates a list of the downloaded images, stores the list to the memory unit 5511, and then displays the list on the display unit 5512.

The slide show flag 5921 corresponds to the slide show (flag) 79 stored in the second memory 52 of the image capturing device 1. The TV 45 uses the slide show flag 5921 to determine whether or not image data downloaded from the server 42 is to be displayed as a slide show. If the slide show flag 5921 indicates "automatic", the data processing unit 5510 of the TV 45 generates a slide show of the downloaded images, stores the slide show to the memory unit 5511, and then displays the slide show on the display unit 5512. If the slide show flag 5921 indicates "manual", the TV 45 permits execution of the slide show according to instructions from the user. If the slide show flag 5921 indicates "disable", the TV 45 inhibits display of the slide show.

The print flag 5922 indicates whether or not images to be downloaded to the TV 45 and then displayed on the display unit 5512 are permitted to be printed by a printer (not shown) connected to the TV 45. The print flag 5922 is not shown in the image display method instruction information 77 stored in the second memory 52 of the image capturing device 1. However, if the print flag 5922 is added, it is possible to set whether or not image data is printable. As a result, usability related to use of images can be improved.

The video reproduction flag 5923 indicates whether or not video data captured by the image capturing device 1 and then uploaded to the server 42 is permitted to be downloaded by the TV 45 and then viewed. If the image capturing device 1 has a video capturing function, addition of the video reproduction flag 5923 to the image display method instruction information 77 stored in the second memory 52 can add setting of whether or not video reproduction is permitted. As a result, the video reproduction can be managed without complicated operations by the user.

The download flag 5924 is an identifier indicating whether or not image or video uploaded to the server 42 is permitted to be downloaded (copied) to a memory in the TV 45. The download flag 5924 can prevent that the image or video is copied by the third person to which image capturing is not permitted. Thereby, copy-right protection is also achieved.

The security password 5925 is password information that permits only the authorized user to perform the above-described image viewing, printing, and downloading processes. In the second embodiment, the same password is set for each of the above-described image viewing, printing, and downloading processes. It is preferable, however, to set a different password to each of image viewing, printing, and downloading processes, so that a level of security can be set independently.

As described above, in the system according to the second embodiment of the present invention, the image capturing device 1 uploads captured images to the server connected to the image capturing device 1 via the first antenna. When the image capturing device 1 is prevented to the RF-ID reader/writer 46 of the TV 45, the image capturing device 1 transmits the server URL generation information 80, the captured image state information 55, and the image display method instruction information 77 from the RF-ID unit 47 to the TV 45 by the RF-ID communication. Then, the TV 45 connects to the server to which the image capturing device 1 has uploaded the captured images, then downloads the captured images from the server, and displays the captured images. Here, it is determined whether or not the captured images in the server 42 are in synchronization with the captured images in the image capturing device 1. If the synchronization is failure, the TV 45 displays notification of the synchronization failure on the display unit 5512. Thereby, the user can display the captured images only by presenting the image capturing device 1 to the TV 45, although the user conventionally has to remove a recording memory from the camera (the image capturing device 1) to be equipped to the TV 45 in order to view the images. Thereby, even the user who is not familiar with operations of digital devices can easily display the images on the TV 45.

Third Embodiment

The third embodiment according to the present invention is described below.

Figure 48:
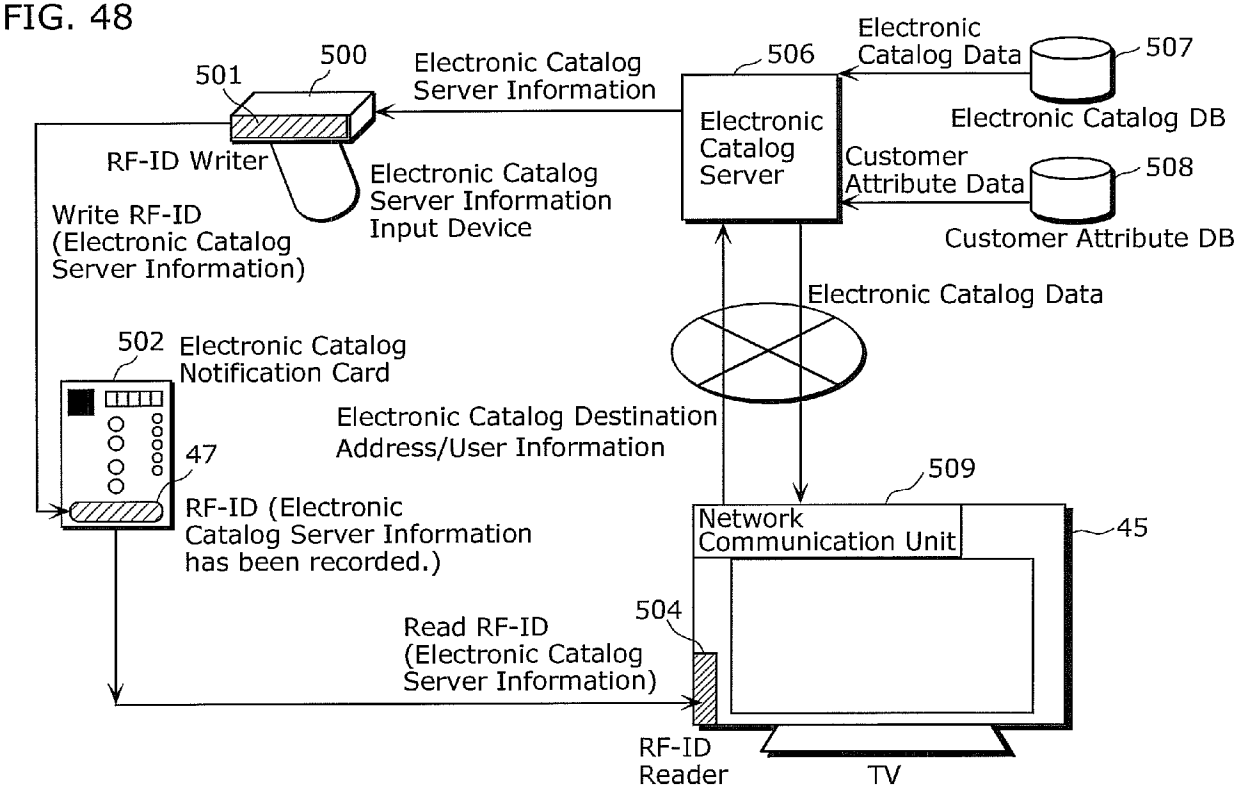
FIG. 48 is a schematic diagram of an electronic catalog display system.

First, the third embodiment is explained in summary. FIG. 48 is a schematic block diagram of an electronic catalog display system according to the third embodiment. The electronic catalog display system according to the third embodiment includes an electronic catalog server information input device 500, an electronic catalog notification card 502, the TV 45, and an electronic catalog server 506. The electronic catalog server information input device 500 includes a RF-ID writer 501. The electronic catalog notification card 502 includes a RF-ID unit 47. The TV 45 includes a RF-ID reader 504 and a network communication unit 509. The electronic catalog server 506 includes an electronic catalog database 507 and a customer attribute database 508.

The electronic catalog server information input device 500 writes electronic catalog server information from the RF-ID writer 501 to the RF-ID unit 47 attached to the electronic catalog notification card 502. The electronic catalog server information is provided from a user who provides services of an electronic catalog (hereinafter, referred to as a "provider user"). When a user who receives the services of the electronic catalog (hereinafter, referred to as a "customer user") brings the electronic catalog notification card 502, in which the electronic catalog server information is written, into proximity of the TV 45, the RF-ID reader 504 in the TV 45 reads the electronic catalog server information from the RF-ID unit 47. In addition, the TV 45 transmits, based on the readout electronic catalog server information, a request for obtaining an electronic catalog to the electronic catalog server 506 set on a network via the network communication unit 509. Furthermore, when transmitting the request to the electronic catalog server, the TV 45 transmits also user information, which is previously inputted in the TV 45, to the electronic catalog server 506. The electronic catalog server 506 receives the request for the electronic catalog and the user information from the TV 45. First, the electronic catalog server 506 obtains customer attribute data from the customer attribute database 508 based on the user information. Next, from the electronic catalog database 507, the electronic catalog server 506 obtains electronic catalog data associated with the customer attribute data. Then, the electronic catalog server 506 transmits the obtained electronic catalog data to the TV 45 from which the request for the electronic catalog has been transmitted. The TV 45 displays the electronic catalog data received from the electronic catalog server 506, and thereby receives purchase operations from the customer user to purchase products in the electronic catalog data.

The following describes the electronic catalog display system according to the third embodiment in more detail.

Figure 49:
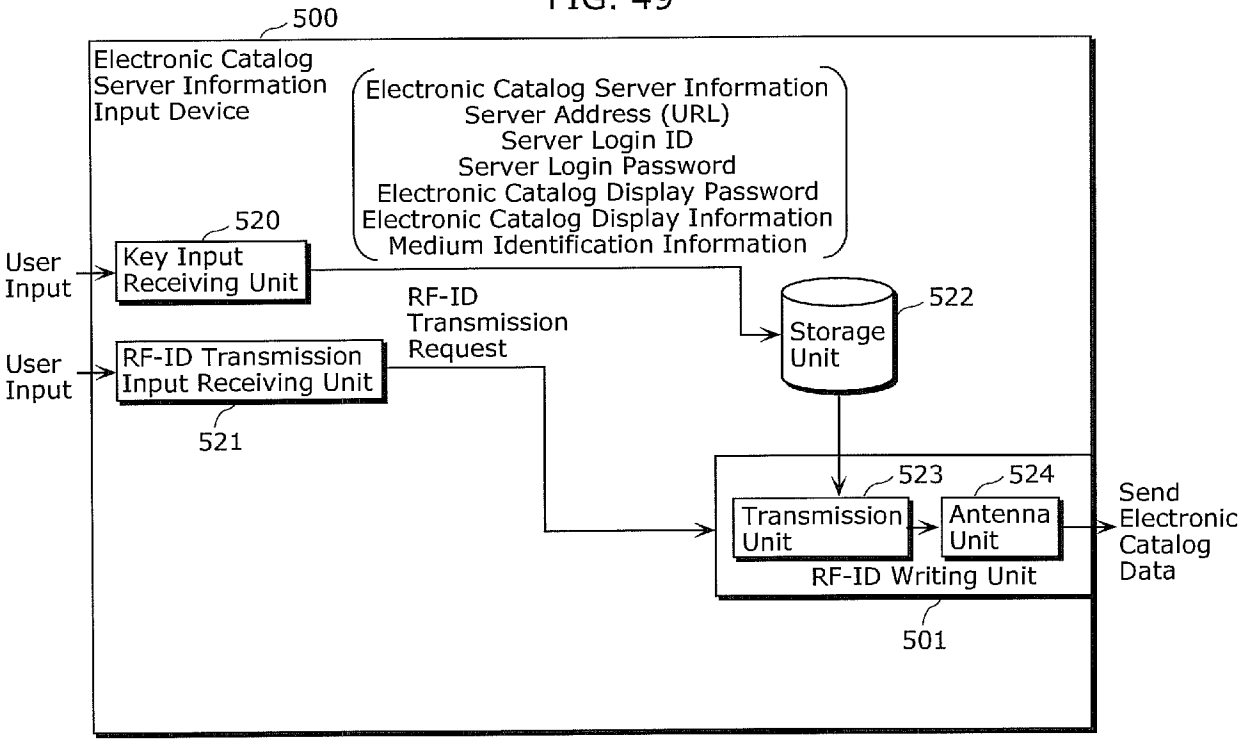
FIG. 49 is a block diagram of an electronic catalog server information input device.
Figure 50:
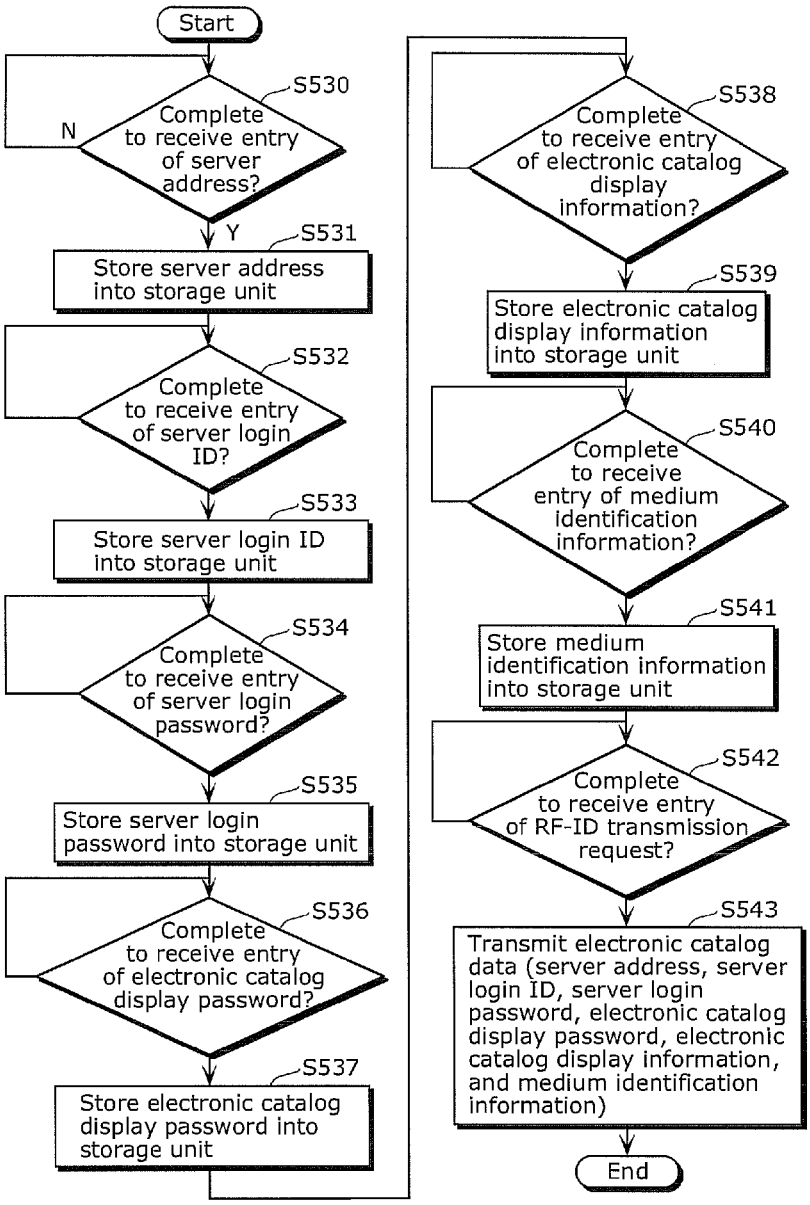
FIG. 50 is a flowchart of steps of processing performed by the electronic catalog server information input device.

FIG. 49 is a functional block diagram illustrating a structure of the electronic catalog server information input device according to the third embodiment. First, a key input receiving unit 520 receives an input by input keys operated by the provider user, in order to obtain the electronic catalog server information. The electronic catalog server information obtained by the key input receiving unit 520 includes: a sever address such as a URL; server login ID; a server login password; an electronic catalog display password; electronic catalog display information; and a medium identification information. The electronic catalog display information indicates whether images of products/services in the electronic catalog are to be displayed in a list (as thumbnails) or sequentially (as a slide show). The medium identification information is used for identifying a medium such as a card or a postcard to which RF-ID is attached. The electronic catalog server information obtained by the key input receiving unit 520 is stored into a storage unit 522. Next, when a RF-ID transmission key and the like are received after receiving of the electronic catalog server information, a RF-ID transmission input receiving unit 521 notifies a transmission unit 523 of a transmission request. Then, the transmission unit 523 reads the electronic catalog server information from the storage unit 522. An antenna unit 524 transmits the electronic catalog server information. The processing performed by the electronic catalog server information input device is presented in more detail with reference to a flowchart of FIG. 50.

Figure 51:
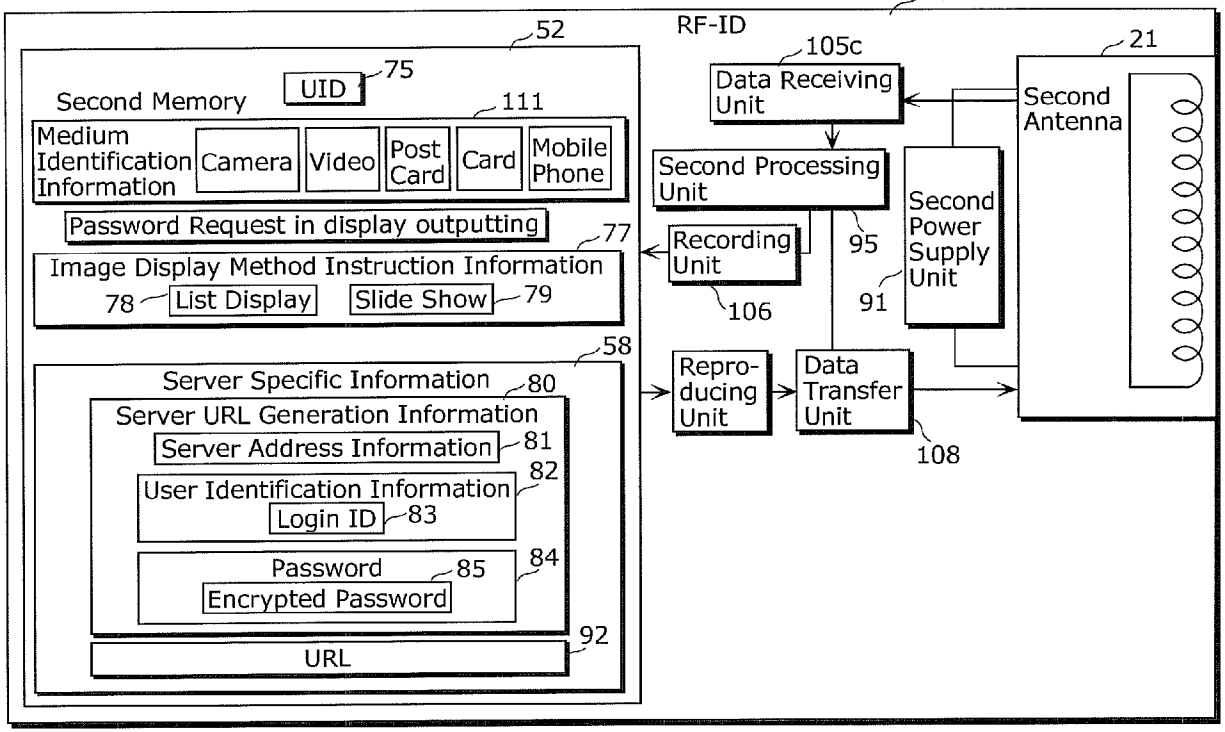
FIG. 51 is a block diagram of a RF-ID unit of an electronic catalog notification card.

FIG. 51 is a block diagram of a structure of the RF-ID unit 47 included in the electronic catalog notification card 502. A structure and processing of the RF-ID unit 47 are the same as those described in the first and second embodiments. The second power supply unit 91 obtains current from signals received by the second antenna 21, and provides power to each unit in the electronic catalog notification card 502. Received information is recorded into the second memory 52 via the data receiving unit 105, the second processing unit 95, and the recording unit 106.

Figure 52:
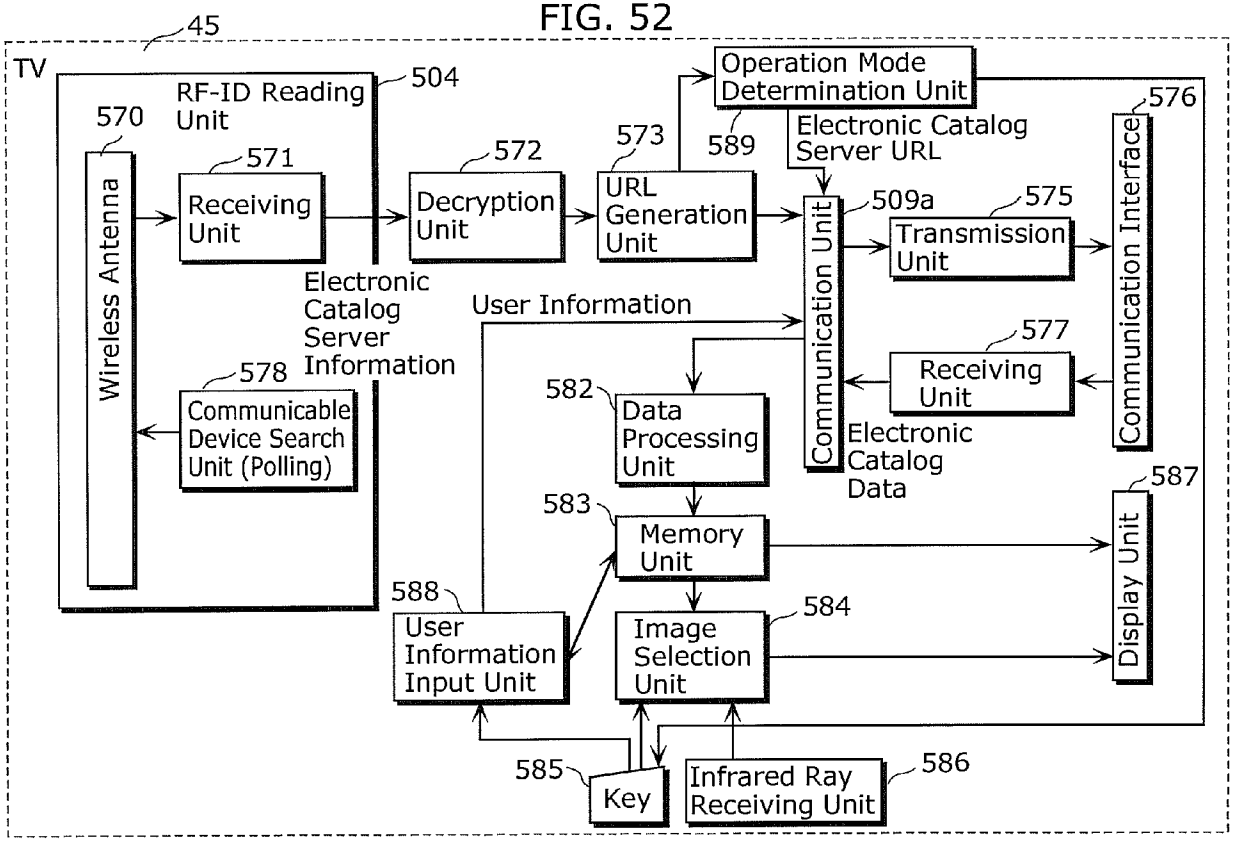
FIG. 52 is a block diagram of a TV displaying an electronic catalog.

FIG. 52 is a functional block diagram of a structure of the TV 45. The structure of the TV 45 according to the third embodiment differs from the structure of the TV 45 according to the second embodiment in that a user information input unit 588 is added. The user information input unit 588 receives the user information and stores the user information into a memory unit 583 temporarily. The user information is an attribute of the customer user and previously inputted by the customer user himself/herself. The user information is preferably gender or age information of the customer user. The user information may be other information, such as a residence or a family structure, which is private information for selecting product/service data in the electronic catalog. The user information is transmitted to the electronic catalog server via the communication unit 509, together with the URL of the electronic catalog server generated by the URL generation unit. In the same manner as described in the first embodiment, in the third embodiment, when the customer user moves the electronic catalog notification card 502 into proximity of a RF-ID reader 504 of the TV 45, the TV 45 receives the electronic catalog server information and thereby generates a URL of the server to connect to the server. The details of this processing are the same as those described in the first embodiment with reference to FIGS. 7 to 20.

Figure 53:
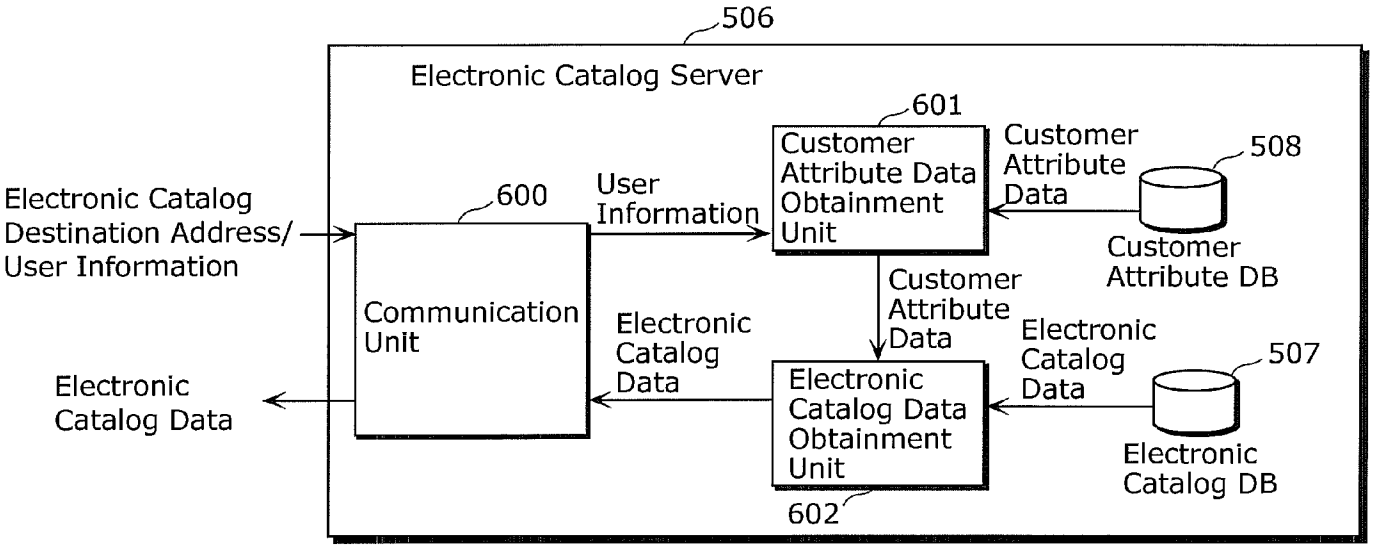
FIG. 53 is a block diagram of an electronic catalog server.
Figure 54:
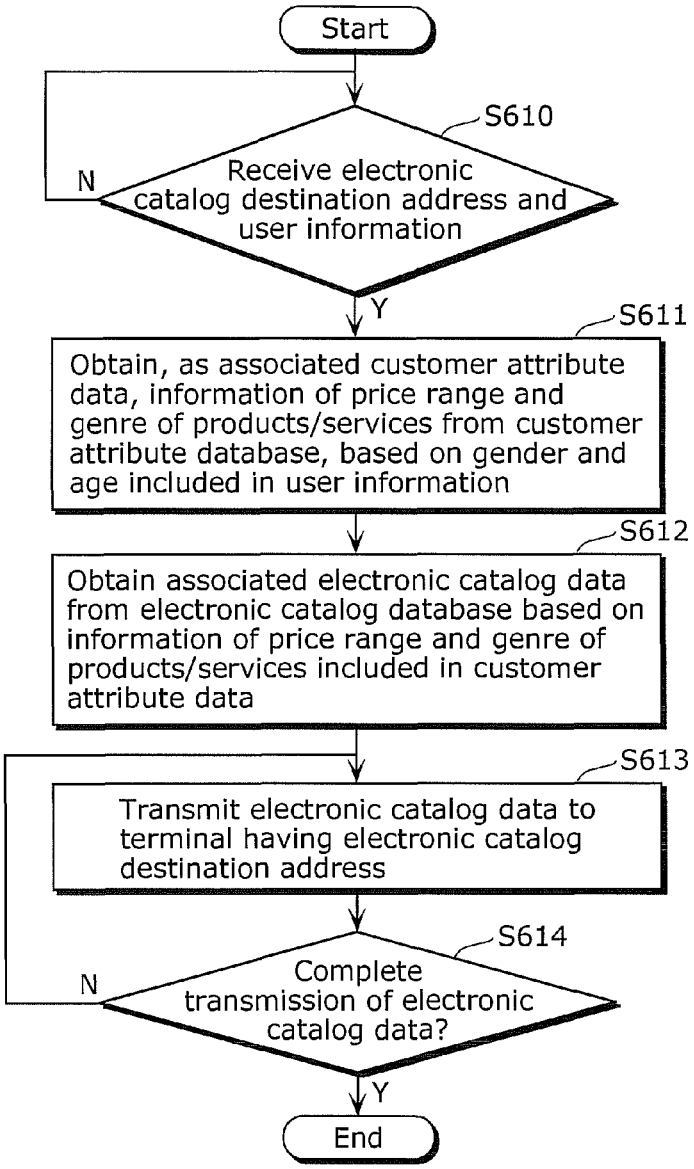
FIG. 54 is a flowchart of steps of processing performed by the electronic catalog server.

FIG. 53 is a functional block diagram of a structure of the electronic catalog server 506. The electronic catalog server 506 receives an electronic catalog destination address and the user information from the TV 45 via a communication unit 600. The electronic catalog destination address is a network address of the TV 45 on a network to which the TV 45 and the electronic catalog server 506 belong. Next, based on the user information received by the customer attribute data obtainment unit, the electronic catalog server 506 obtains customer attribute data from the customer attribute database 508. For instance, if the user information includes a gender and an age of the customer user using the TV 45, the electronic catalog server 506 obtains, as the customer attribute data, information of a product/service genre and a product/service price range which are in association with the age and gender of the customer user, based on the customer attribute database 508 having a data structure illustrated in FIG. 57. Then, the electronic catalog data obtainment unit 602 obtains the electronic catalog data from the electronic catalog database 507 based on customer attribute data. For example, if the customer attribute data includes product/service genres and product/service price ranges, the electronic catalog server 506 obtains, as the electronic catalog data, all of product/service data corresponding to the product/service genres and the product/service price ranges, from the electronic catalog database 507 having a data structure illustrated in FIG. 58. The electronic catalog server 506 transmits the electronic catalog data obtained by the electronic catalog data obtainment unit 602 to the TV 45 having the electronic catalog destination address, via a communication unit 600. The processing performed by the electronic catalog server 506 is presented in more detail in a flowchart of FIG. 54.

Figure 55:
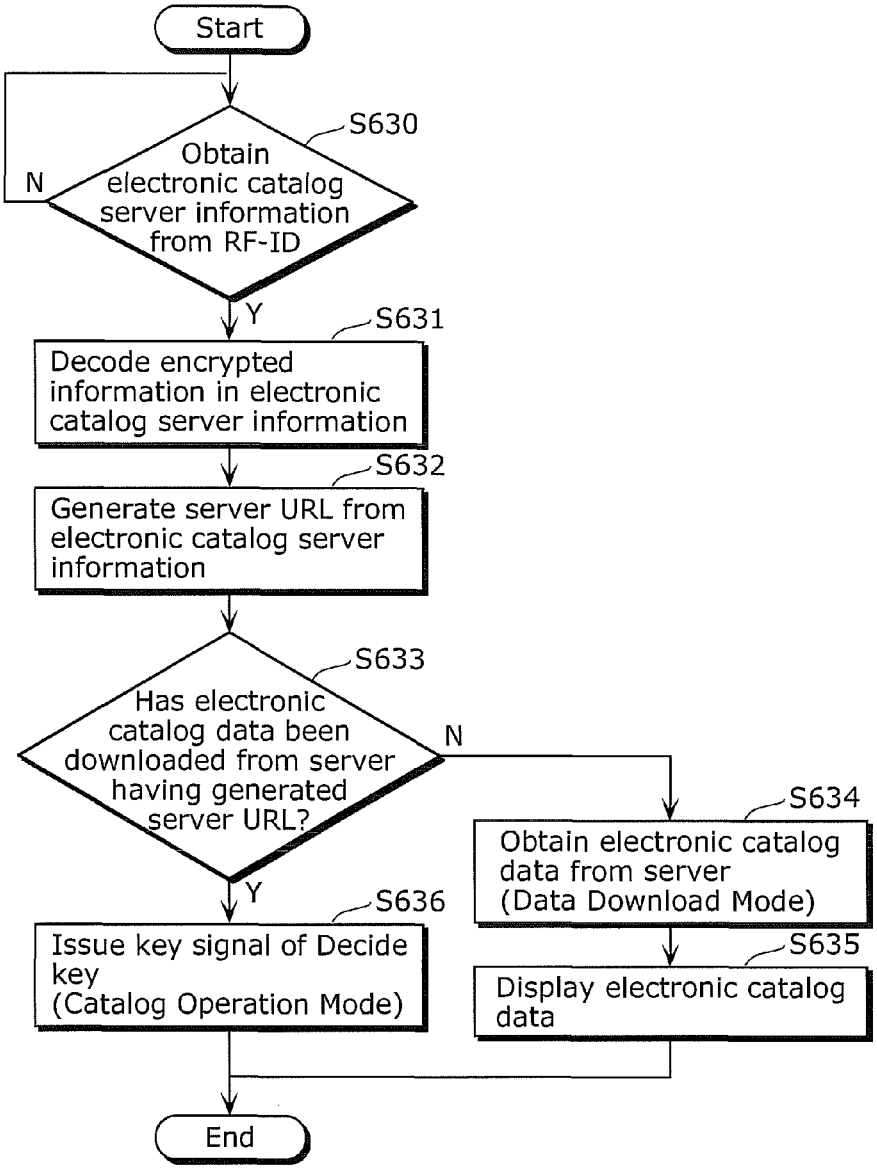
FIG. 55 is a flowchart of steps of processing performed by a TV displaying the electronic catalog.

The following describes processing of the TV 45 after downloading the electronic catalog data, with reference to a flowchart of FIG. 55. The processing regarding obtaining of the electronic catalog server information from the RF-ID unit at Steps S630 to S632 is the same whichever the electronic catalog data is downloaded or not. At S633, it is determined whether or not the electronic catalog data associated with the electronic catalog server information received from the RF-ID unit has already been downloaded and displayed. If the electronic catalog data has not yet been downloaded, then the TV 45 downloads the electronic catalog data from the server at S634 and displays the electronic catalog data at S635. The download processing is the same as the download processing described in the first embodiment.

Figure 56:
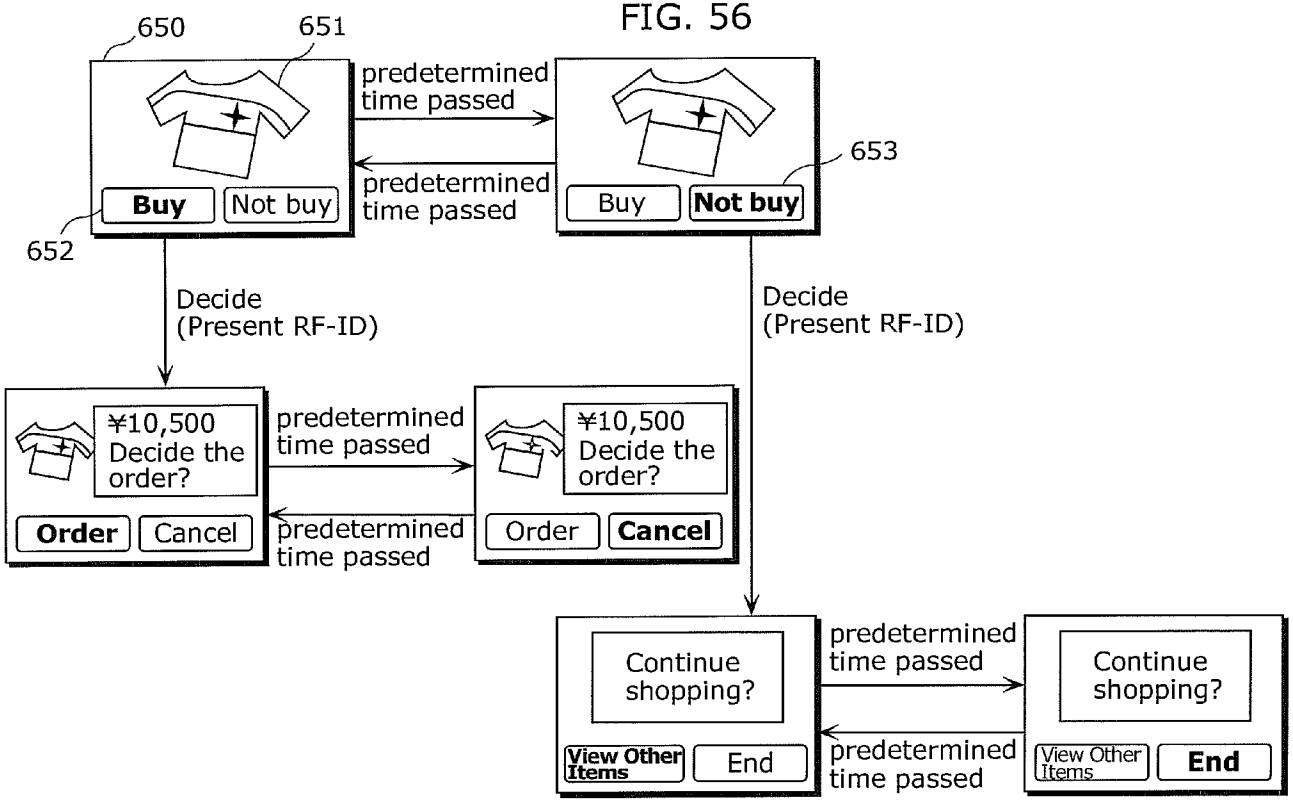
FIG. 56 is a diagram illustrating screen display of the electronic catalog.

If it is determined at S633 that the electronic catalog data has already been downloaded, then the TV 45 issues a signal of a predetermined key (for example, a signal of a Decide key) to execute operations for the displayed electronic catalog data (S636). Here, as illustrated in an example of a screen display of the electronic catalog data in FIG. 56, a screen presents the customer user with a few of options for a next operation to be executed by the customer user for the displayed electronic catalog data. Then, a focus circulates among the options on the screen (as illustrated as options 652 and 653 in FIG. 56) to indicate one of them as a selection candidate every time a predetermined time period passes. This allows the customer user to execute an operation for selecting or purchasing each product in the electronic catalog data, for example, only by presenting the electronic catalog notification card 502 having the RF-ID unit 47 to the TV 45, when the focus indicates a desired option of the customer user.

The second memory 52 according to the third embodiment, which is embedded in the RF-ID unit 47 on the electronic catalog notification card 502, may be a Read Only Memory (ROM). In this aspect, the electronic catalog server information input device 500 serves as a RF-ID memory data input unit in manufacturing the RF-ID unit, or a RF-ID memory data input means in a RF-ID manufacturing system. In general, a RF-ID unit having a ROM unit is inexpensive more than a RF-ID unit having a rewritable memory. Therefore, the RF-ID unit having a ROM allows the provider user sending a great number of electronic catalog notification cards to reduce a cost.

It should be noted that it has been described in the third embodiment that a focus circulates among the options on the screen of the TV 45 (as illustrated as options 652 and 653 in FIG. 56) to indicate one of them as a selection candidate every time a predetermined time period passes. However, the method of operating the electronic catalog data displayed on the screen by using the electronic catalog notification card 502 having the RF-ID unit 47 is not limited to the above. For example, it is also possible that the receiving unit 571 of the TV 45 sequentially receive pieces of information from the RF-ID unit and counts the sequential receiving processes, then thereby calculates a time period (RF-ID proximity time period) during which the RF-ID unit is in proximity of the TV 45, and eventually moves a focus indicating a selection candidate displayed on the screen based on the RF-ID proximity time period. With the above structure, the following operation for the electronic catalog is possible. Only when the RF-ID unit is in proximity of the TV, the focus displayed on the screen is circulated to change the selection candidate. If the RF-ID unit is away from the TV, the focus is stopped. After a predetermined time period after stopping of the focus, the selection candidate on which the focus is stopped is decided as selection. In this operation for the electronic catalog, the customer user can actively operate the electronic catalog by using the RF-ID unit, without waiting for the focus, which automatically circulates among options every predetermined time period, to arrive at a user's desired option.

It should also be noted that it has been described in the third embodiment that the electronic catalog server information input device 500 has the key input receiving unit 520 which receives inputs by the input keys operated by the provider user in order to obtain the electronic catalog server information. However, the following configuration is also possible. That is, the electronic catalog server information input device 500 has a communication interface to communicate with the image server. The image server holds the server information to be transmitted to the electronic catalog server information input device 500. The electronic catalog server information input device 500 receives the server information from the image server, in order to obtain the server information. This configuration in which the server information is stored in the image server allows the electronic catalog server information input device 500 to eliminate inputting to the image server. Especially, when a plurality of the electronic catalog server information input devices 500 are operated for a single image server, this configuration is highly convenient.

The conventional techniques have a program that users who are not familiar with operations of digital devices such as personal computers should learn operations of the devices to do online shopping. However, the system according to the third embodiment enables users using electronic catalogs to do online shopping and the like, simply by bringing received cards or post cards into proximity of TVs. Therefore, even users who are not familiar with online terminals such as personal computers and mobile phones can easily enjoy shopping on TV screens.

Fourth Embodiment

The fourth embodiment according to the present invention is described below.

Figure 59:
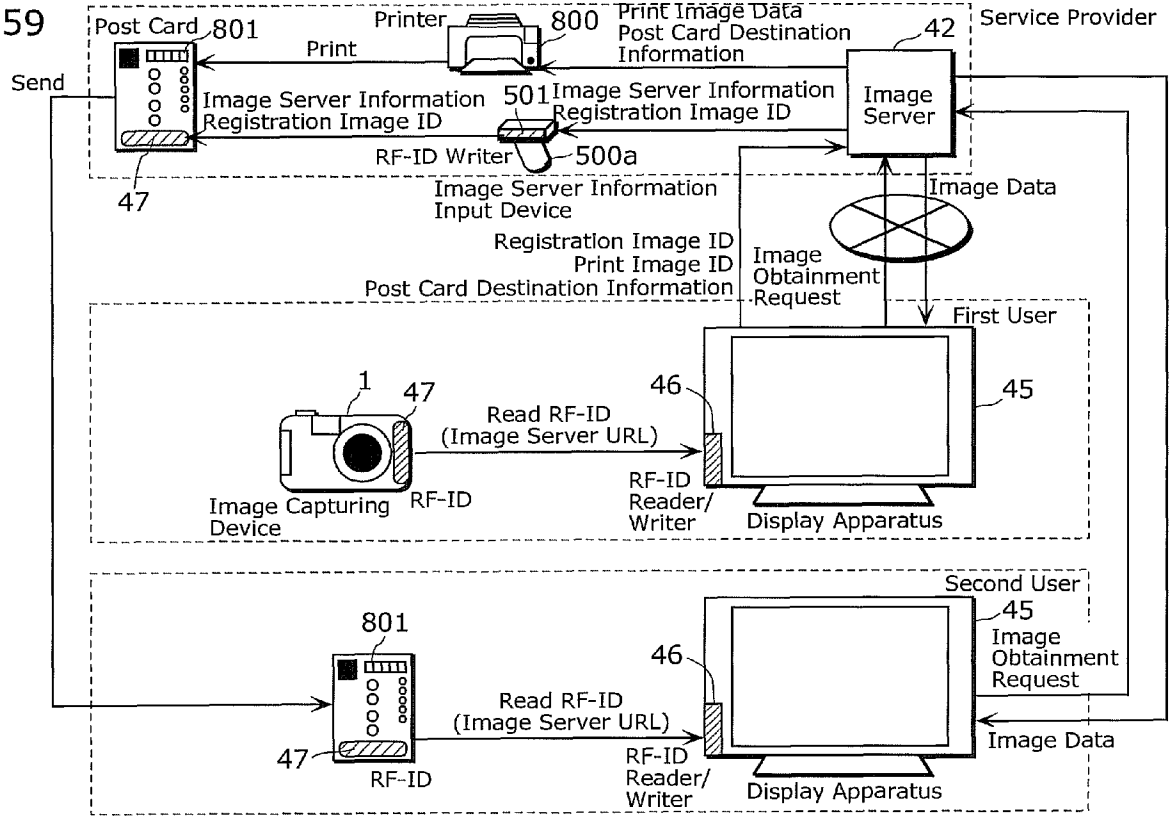
FIG. 59 is a schematic diagram of a RF-ID-attached post card mailing system.

FIG. 59 is a schematic diagram of the fourth embodiment. In the fourth embodiment, it is described a method of sending, to a remote location, a post card attached with RF-ID used to access an image server. First, a first user, who is a sender of a post card, brings the image capturing device 1 having the RF-ID unit 47 into proximity of the RF-ID reader/writer 46 of the TV 45. Thereby, the TV 45 generates a server URL used to connect the TV 45 to the image server 42, thereby obtains image data from the image server 42, and eventually displays the image data on a screen. This processing is the same as described in the first embodiment. Next, by using an input means such as a remote controller of the TV 45, the first user selects an image(s) to be printed on a post card and images to be registered in association with the post card (in other words, images to be shown to a second user living in a remote location), from among the image data displayed by the TV 45. In addition, the first user inputs address information such as a destination address of the post card by using the remote controller or the like. The TV 45 transmits, to the image server 42, ID of the image selected by the first user to be printed on the post card (hereinafter, referred to as "print image ID"), ID of the images to be registered for the post card (hereinafter, referred to as "registration image ID"), and the destination information of the post card (hereinafter, referred to as "post card destination information"). The image server 42 retrieves the image data identified by the print image ID and then transmits the image data and the post card destination information to a printer 800. The printer 800 prints the image data and the post card destination information on the post card. In addition, to the image server information input unit 500, the image server 42 transmits the registration image ID received from the TV 45, together with image server information. The image server information includes: a sever address such as a URL; server login ID; a server login password; an image display password, image display information indicating whether the image data (images) is to be displayed in a list (as thumbnails) or sequentially (as a slide show); and medium identification information indicating a medium, such as a card or post card, to which RF-ID is to be attached. The image server information input device 500 writes the image server information and the registration image ID to the RF-ID unit 47 of the post card on which the image and the destination information are printed by the printer 800. The post card 801 applied with printing and RF-ID writing is mailed to the printed destination. Thereby, the second user, who is designated by the first user as being the destination, receives the post card 801. When the second user brings the mailed post card 801 into proximity of a RF-ID reader/writer 46 of a TV 45 of the second user, the TV 45 of the second user obtains the image server information and the registration image ID from the RF-ID unit 47, downloads the images identified by the registration image ID, and displays the downloaded images.

The structure and processing of the image capturing device 1 according to the fourth embodiment are the same as described in the first embodiment.

Figure 60:
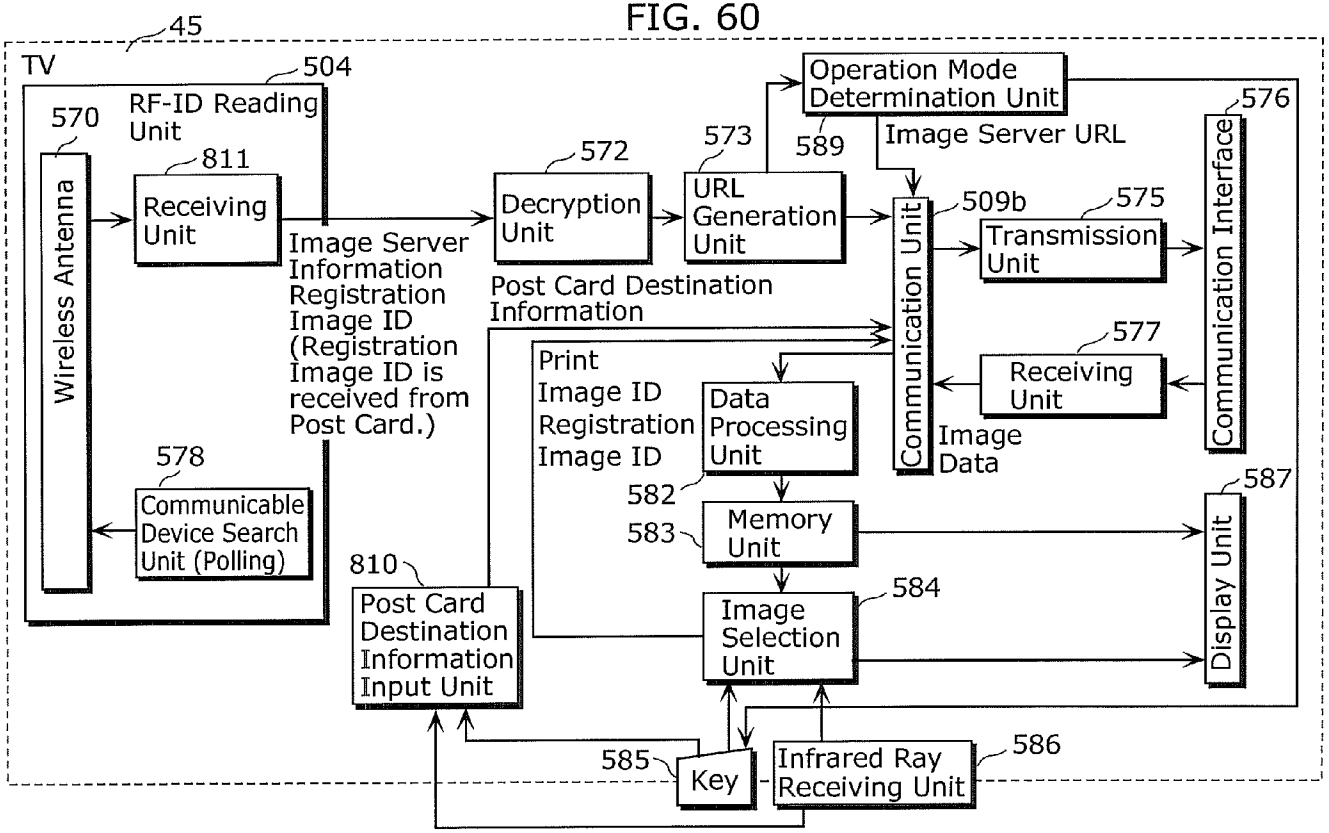
FIG. 60 is a block diagram of a TV in the RF-ID-attached post card mailing system.
Figure 61:
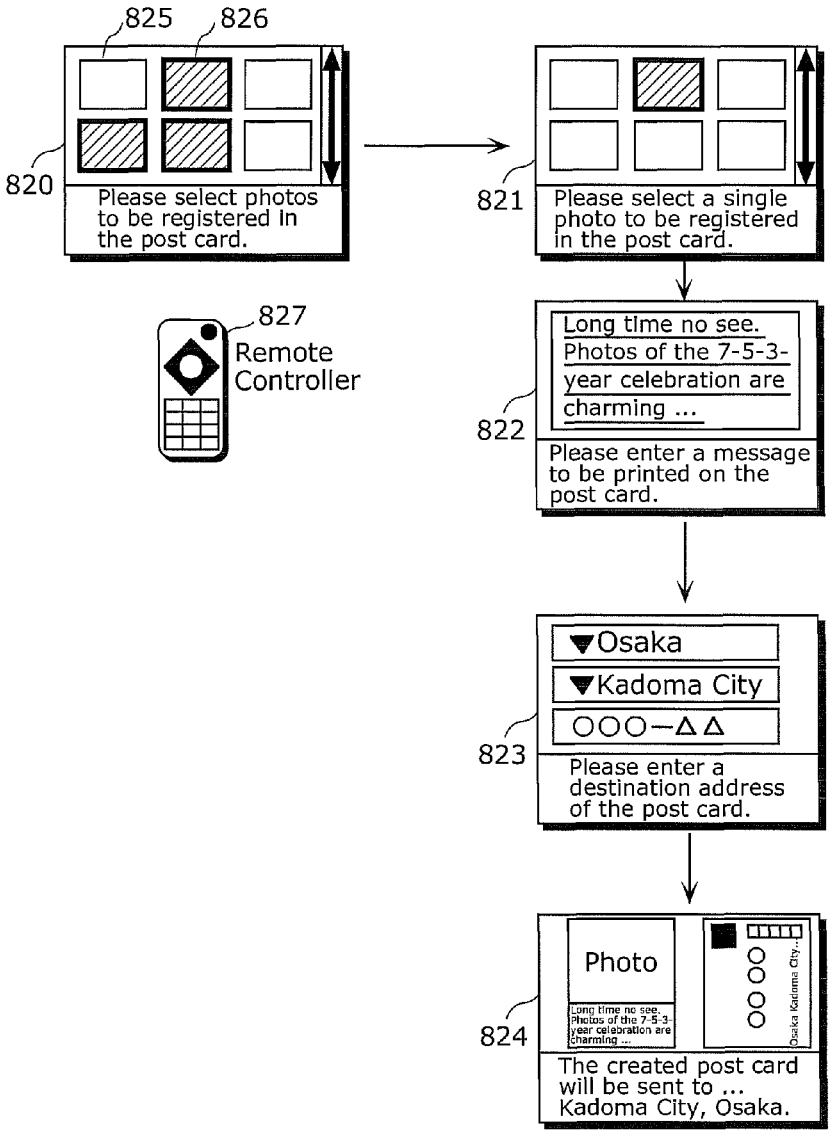
FIG. 61 is a diagram illustrating screen display in image selection operation by the RF-ID-attached post card mailing system.

FIG. 60 is a block diagram of a structure of the TV 45 according to the fourth embodiment. A receiving unit 811 receives the image server information from the RF-ID unit 47 of the image capturing device 1 or the post card 801 via a wireless antenna 570. If the RF-ID unit 47 of the post card 801 holds the registration image ID, the receiving unit 811 receives also the registration image ID. An image selection unit 584 receives an image selection operation from the user via a key unit 585 and an infrared ray receiving unit 586, and thereby obtains ID of an image which the first user has selected to be printed on the post card (namely, the print image ID) and ID of images which the first user has selected to be registered for the post card (namely, the registration image ID). Then, the image selection unit 584 provides the obtained IDs to the communication unit 509 (the network communication unit 509). FIG. 61 illustrates an example of a screen display on the TV 45 in the image selection operation. In FIG. 61, 821 is a screen display from which the first user selects an image to be printed on the post card. 820 in FIG. 61 is a screen display from which the first user selects images to be registered for the post card. A post card destination information input unit 810 receives a character input operation of the first user via the key unit 585 and the infrared ray receiving unit 586. Thereby, the post card destination information input unit 810 obtains the post card destination information including an address and a name of the destination of the post card. Then, the post card destination information input unit 810 provides the post card destination information to the communication unit 509. 823 in FIG. 61 is an example of a screen display on which the post card destination information is inputted. The communication unit 509 transmits the post card destination information, the print image ID, and the registration ID to the image server via a transmission unit 575 and a communication interface 576.

Figure 62:
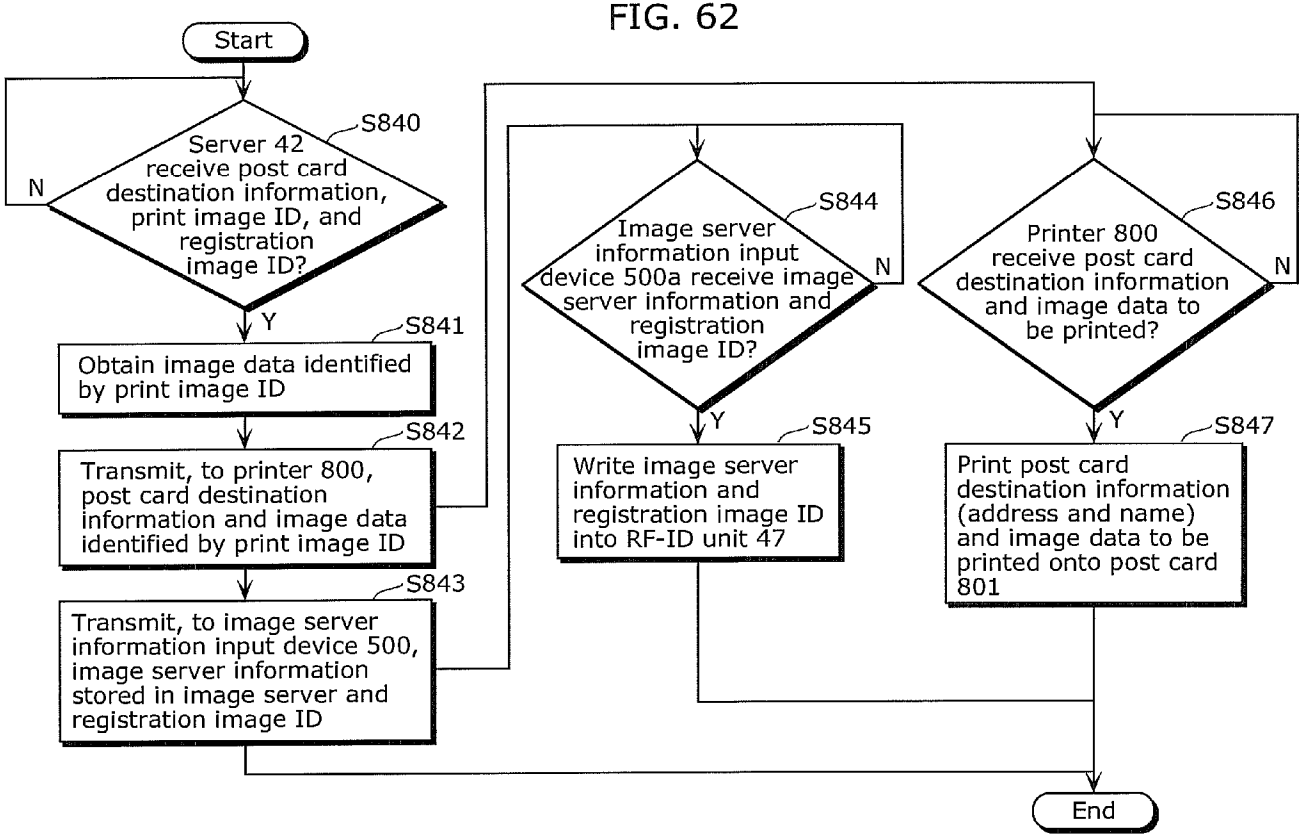
FIG. 62 is a flowchart of steps of processing performed by an image server in the RF-ID-attached post card mailing system.

FIG. 62 is a flowchart of processing performed prior to mailing of the post card 801, by the image server 42, the printer 800, and the image server information input device 500. When the post card 801 is applied with printing and RF-ID writing, the post card 801 is mailed to the printed destination. The second user, who is designated by the first user as being the destination, receives the post card 801. When the second user presents the received post card 801 to the TV 45, the receiving unit 811 receives the image server information and the registration image ID from the RF-ID unit 47 via the wireless antenna 570. A decryption unit 572 decrypts encrypted information in the image server information and the registration image ID. Next, the URL generation unit 573 generates a URL from which only images identified by the registration image ID from among images stored in the image server 42 are downloaded to the TV 45. More specifically, the URL generation unit 573 may designate an internal directory of the server in the generated URL or may use a method of embedding the registration image ID to the URL as a URL option. By using the URL generated by the URL generation unit 573 to designate the server, the TV 45 accesses the image server to obtain the images, which is the same as described in more detail in the first embodiment.

It should be noted that it has been described in the fourth embodiment that the user inputs the destination information to the TV 45, but the user may input not only the destination information such as an address and a name but also a message to be printed with an image on a post card. The TV 45 receives the input message together with the destination information and provides them to the image server 42. The printer 800 prints them on the post card. 822 in FIG. 61 illustrates an example of a screen of the TV 45 on which a message to be printed is inputted. If the user can select an image to be printed on the post card and also input an message added to the image, a flexibility in generating a post card with RF-ID is increased.

It should also be noted that the TV 45 according to the fourth embodiment may allow the user to perform operations for images displayed on the TV 45 by using the post card with RF-ID, in the same manner as described in the third embodiment for the processing in which the user operates an electronic catalog displayed on a screen by using RF-ID.

As described above, the system according to the fourth embodiment enables the user to mail a post card with RF-ID to a person living in a distant location, without creating a post card attached with RF-ID by the user himself/herself. In addition, when the user wishes to print the image(s) stored in the image server onto the post card to be mailed, the system allows the user to perform operation on a TV screen to select an image(s) to be printed. As a result, high usability is achieved.

Conventionally, if the user intends to show images, on a large screen display device, to a different user living in a remote location, the user in the remote location needs to learn operations of the device (apparatus), an operation acquirer has to go to the remote location to operate the device, or the display device in the remote location should be remotely controlled. The system according to the fourth embodiment, however, enables such a user in a remote location to easily view images by a simple operation, for example, by bringing a physical medium such as a post card with RF-ID into proximity of a display device.

Fifth Embodiment

Figure 63:
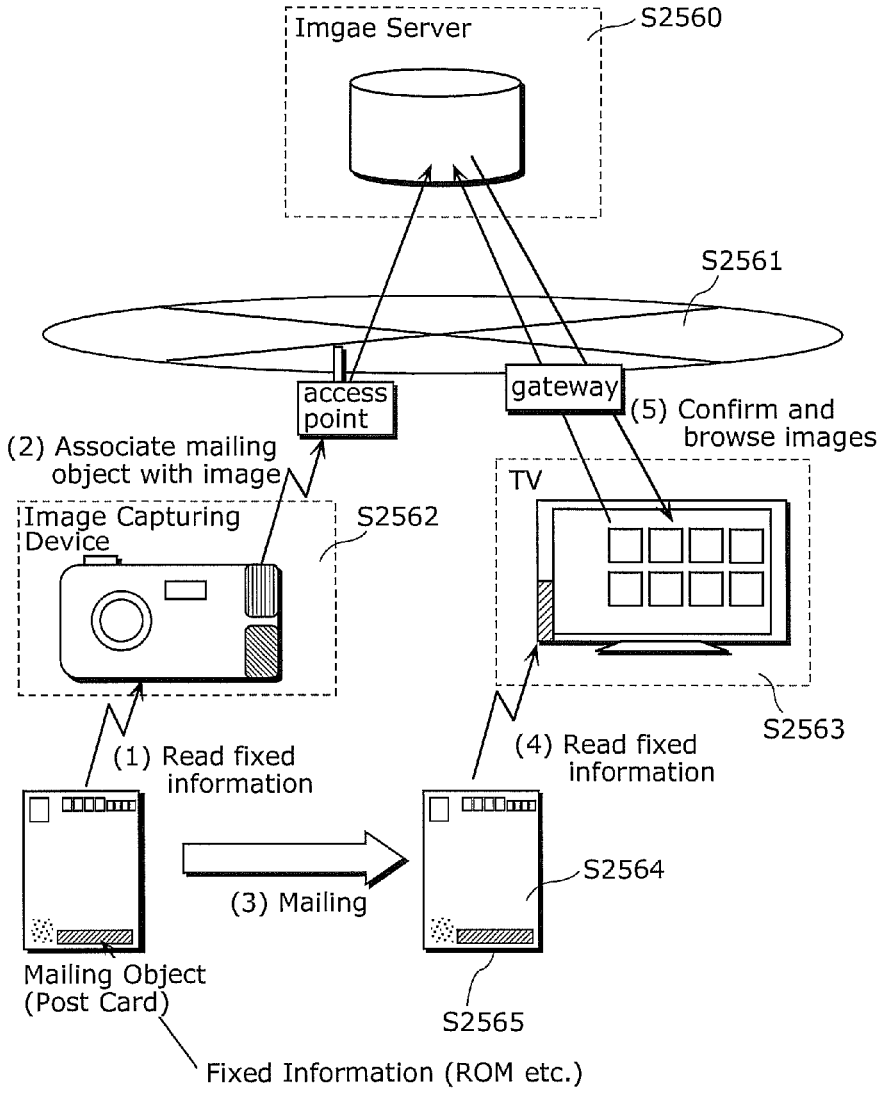
FIG. 63 is a block diagram of a system according to a fifth embodiment of the present invention.

The fifth embodiment of the present invention has the following configuration. A mailing object such as a post card is written with fixed information. The image capturing device associates the fixed information with an image or a group of images (image data) stored in the server. A reproduction side reads the fixed information from the RF-ID attached to the post card or the like in order to display the image data associated with the fixed information. The configuration is illustrated in FIG. 63. Referring to FIG. 63, first, the image capturing device reads the fixed information from the mailing object, then associates the fixed information with an image(s), and registers information of the association (hereinafter, referred to as "association information) into the server. When the user receives the mailing object for which the registration is completed, the user brings the mailing object into proximity of a RF-ID reader of a TV to read the fixed information from the mailing object. The TV queries the server using the fixed information, and thereby displays the image(s) associated with the mailing object.

The fifth embodiment is characterized in that the RF-ID information in the mailing object is not rewritable (ROM) or in non-rewritable environments so that image data in the server is associated with the mailing object without rewriting the fixed information in the mailing object.

<Image Uploading and Mailing Object Associating by Image Capturing Device>

The images captured by the image capturing device are uploaded to the server using the method described in the prior embodiments. Here, an identifier is assigned to an uploaded image or image group. The identifier makes it possible to identify the image or an group of images stored in the server.

Figure 64:
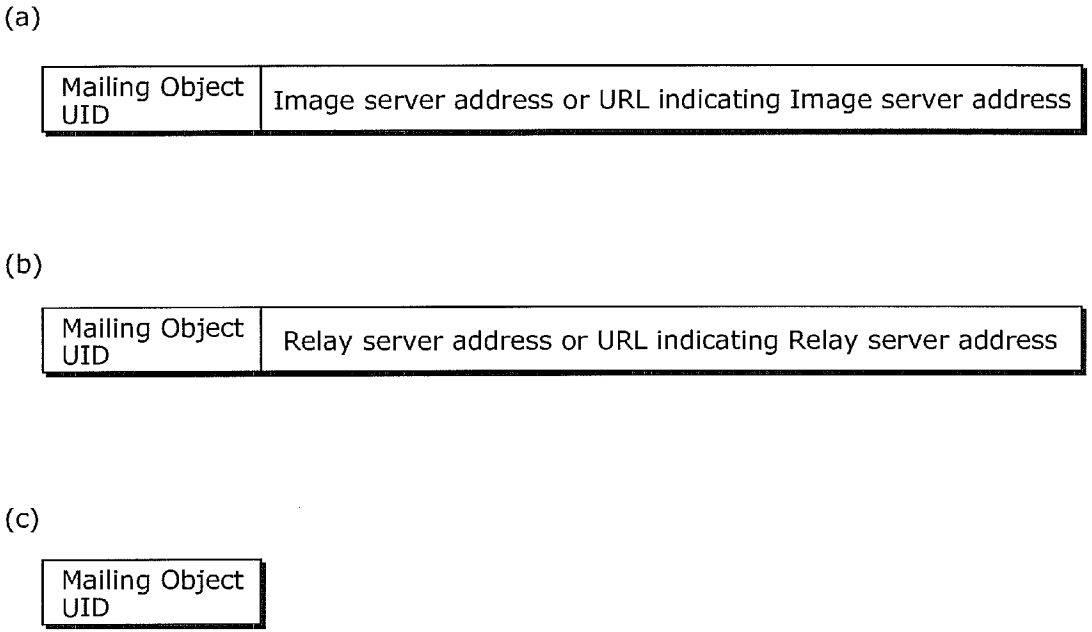
FIG. 64 is a diagram illustrating examples of fixed information of a mailing object according to the fifth embodiment of the present invention.

The following describes a method of associating (i) an image or image group which is captured and uploaded to the server by the image capturing device with (ii) fixed information recorded in a RF-ID tag of a mailing object. FIG. 64 illustrates examples of the fixed information recorded in the RF-ID tag of the mailing object.

(a) in FIG. 64 illustrates fixed information including: mailing object UID unique to the mailing object; and information such as an address for accessing the image server. (b) in FIG. 64 illustrates fixed information including: the mailing object UID; and information such as an address for accessing a relay server. (c) in FIG. 64 illustrates fixed information including the mailing object UID only. The fixed information may also include a login ID, password information, and the like for accessing the server. It is assumed in the fifth embodiment that such information necessary to access the server is included in a URL including the address information.

Figure 65:
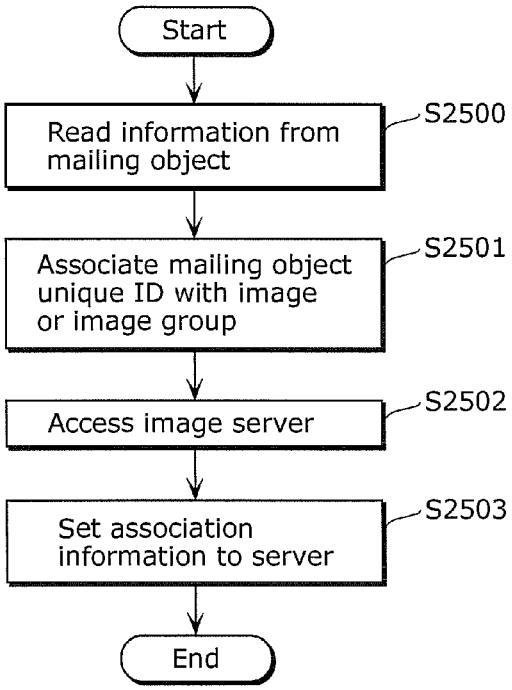
FIG. 65 is a flowchart of processing for associating an image capturing device with an image server, according to the fifth embodiment of the present invention.

FIG. 65 is a flowchart of processing performed by the image capturing device to associate the RF-ID with image data stored in the server, when the image capturing device has a RF-ID reader function.

First, the image capturing device reads information from the RF-ID of the mailing object by using the RF-ID reader (S2500). In more detail, the second antenna 21 illustrated in FIG. 3 communicates with the RF-ID of the mailing object, and thereby the data receiving unit 105 receives the fixed information from mailing object. Then, the second processing unit 95 performs processing to provide the fixed information of the mailing object to the first processing unit 35 via the recording unit 106, the second memory 52, and the recording/reproducing unit 51. The first processing unit 35 associates the mailing object UID read from the mailing object with an image or image group, according to designation from the user (S2501). Then, the image capturing device accesses the server 42 via the first antenna 20 (S2502). Thereby, the image capturing device registers, to the server 42, the association information regarding the association between the mailing object UID and the image data stored in the server 42 (S2503).

Figure 66:
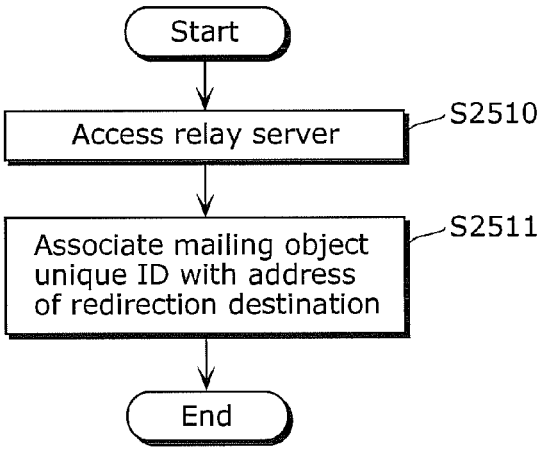
FIG. 66 is a flowchart of processing for registering the image capturing device with a relay server, according to the fifth embodiment of the present invention.

If the fixed information read from the mailing object includes an address of the image server or a URL including the address, then the processing is completed. On the other hand, if the fixed information read from the mailing object does not include an address of the image server or a URL including the address, the image capturing device sets a relay server (FIG. 66).

In order to set a relay server, the image capturing device accesses the relay server (S2510). In more detail, if the fixed information read from the mailing object includes an address of a relay server or a URL including the address, then the image capturing device accesses the relay server. Otherwise, the image capturing device accesses a relay server that is previously set for the image capturing device.

After accessing the relay server, the image capturing device sets, in a database of the relay server, association information regarding association between the mailing object UID and the server that is a redirection destination (transfer destination) (S2511). Thereby, association between the mailing object UID and an address of the transfer destination is registered in the database of the relay server.

If the image capturing device does not have a RF-ID reader function and the mailing object is printed with a two-dimensional code or the like indicating information of the RF-ID reader, the image capturing device captures an image of the two-dimensional code using an image capturing unit to read information from the code so that the image capturing device can obtain the same information as the fixed information recorded in the RF-ID unit of the mailing object. The two-dimensional code may be a QR Code™, a PDF417, Veri Code, Maxi Code, or the like. Any other code can be used if the image capturing device can read information from the code by capturing an image of the code. In addition, the same advantages as described in the fifth embodiment can be produced by using a bar-code in a one-dimensional direction only, although a printing area is increased.

Figure 67:
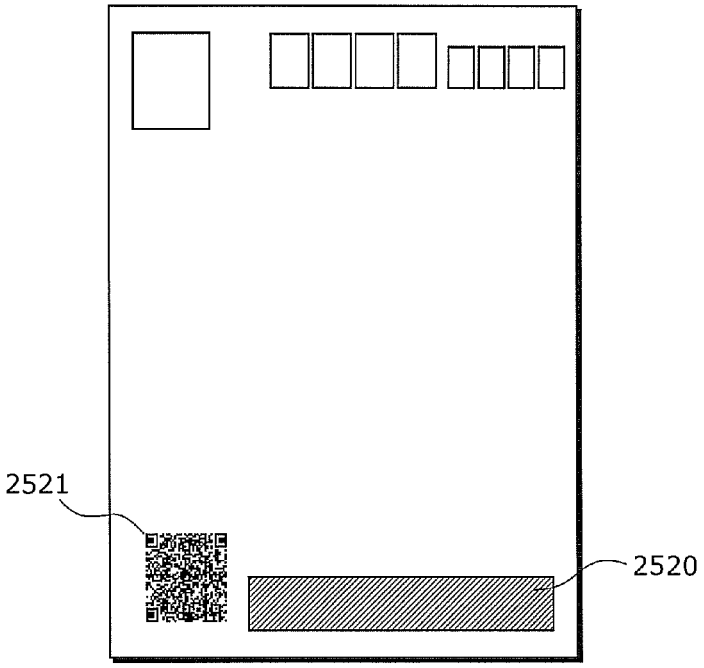
FIG. 67 is a diagram illustrating an example of a mailing object attached with a 2-dimensional code.

FIG. 67 is an example of the mailing object attached with a RF-ID unit 2520 and printed with a two-dimensional code 2521 indicating the same information as that recorded on the RF-ID unit 2520. A flow of processing data when the two-dimensional code is read by the image capturing device is described with reference to the block diagram of FIG. 3. The two-dimensional code printed on the mailing object is captured by the image capturing unit 30, then converted into an imaged by the video processing unit 31, and provided to the first processing unit 35 via the recording/reproducing unit 32. The first processing unit 35 analyzes the captured two-dimensional code and retrieves the information from the two-dimensional code. The information indicated by the two-dimensional code is basically the same as the information recorded in the RF-ID unit. The information indicated by the two-dimensional code includes at least the mailing object UID.

Figure 68:
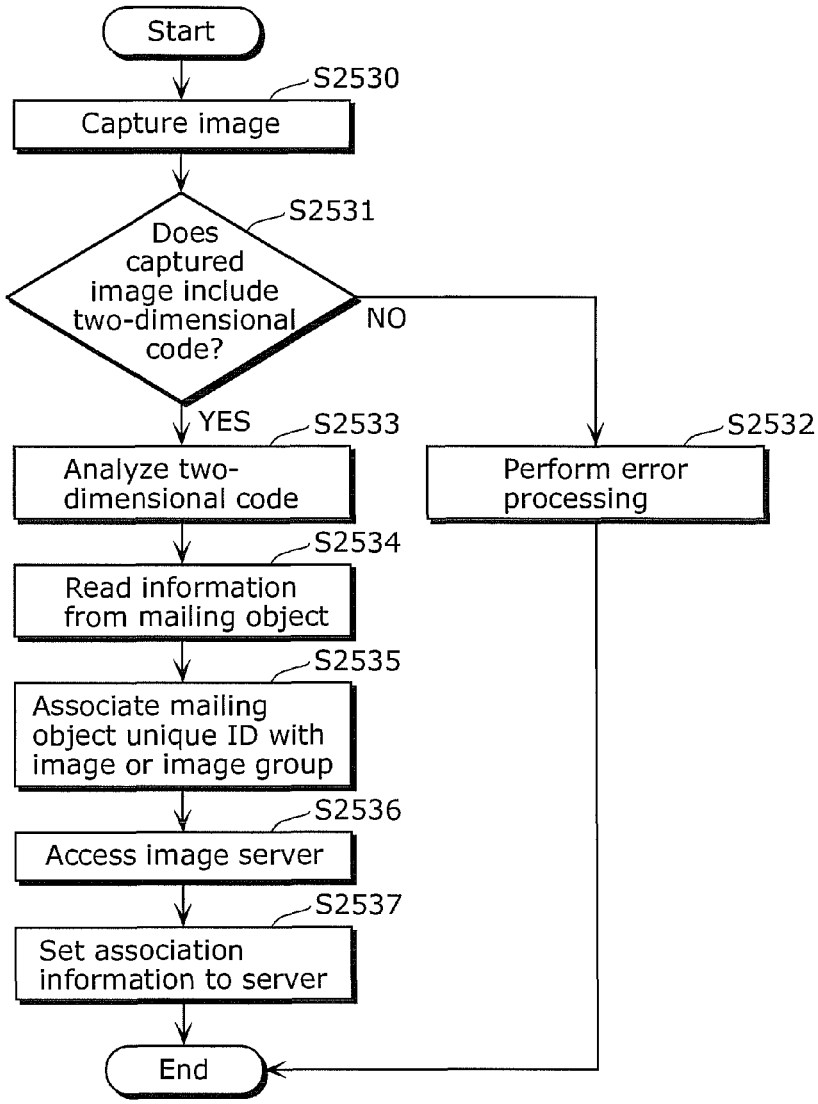
FIG. 68 is a flowchart of processing using a 2-dimensional bar-code of the image capturing device according to the fifth embodiment of the present invention.

The following describes a flow of the processing from reading the information of the two-dimensional code to associating the information with an image or image group in the server with reference to FIG. 68.

Firstly, the image capturing unit captures an image of the two-dimensional code (S2530). Then, it is determined whether or not the captured image is a two-dimensional code (S2531). If the captured image is not a two-dimensional code, then error processing is performed (S2532). Or, normal image capturing processing may be performed. On the other hand, if the captured image is a two-dimensional code, then the two-dimensional code is analyzed (S2533). Thereby, information is read from the mailing object based on the result of the analysis (S2534). After reading the fixed information from the mailing object, the image capturing device associates the mailing object UID with image data stored in the server (S2535). Then, the image capturing device accesses the server (S2536). Then, the image capturing device sets the association information to the server (S2537). The Steps S2535 to S2537 are the same as the Steps S2501 to S2503 in FIG. 65. Here, if the readout information does not include an address of the image server or a URL including the address, then the image capturing device performs transfer setting to a relay server. The transfer setting to the relay server has been previously described with reference to FIG. 66.

As described above, by reading information from the two-dimensional bar-code printed on the mailing object, it is possible to complete to associate the information recorded on the RF-ID unit with image data stored in the server.

If the image capturing device does not have a RF-ID reader function and the mailing object is not printed with a code such as a two-dimensional code, the image capturing device can read information from the mailing object if the user manually inputs, to the image capturing device, the mailing object UID and the URL such as a sever address which are printed on the mailing object. The user inputs the information using buttons 7 to 15 illustrated in FIG. 2. In this aspect, the URL and the mailing object UID may be printed directly as a plane text or coded to be a code which the user easily inputs.

As described above, even if the image capturing device does not have a RF-ID reader function and the mailing object is not printed with a two-dimensional code, it is possible to associate the mailing object with image data stored in the server.

<Image Reproducing and Viewing by Using RF-ID on Mailing Object>

Next, the steps for viewing images stored in the server on the TV using the mailing object for which association is completed.

Figure 69:
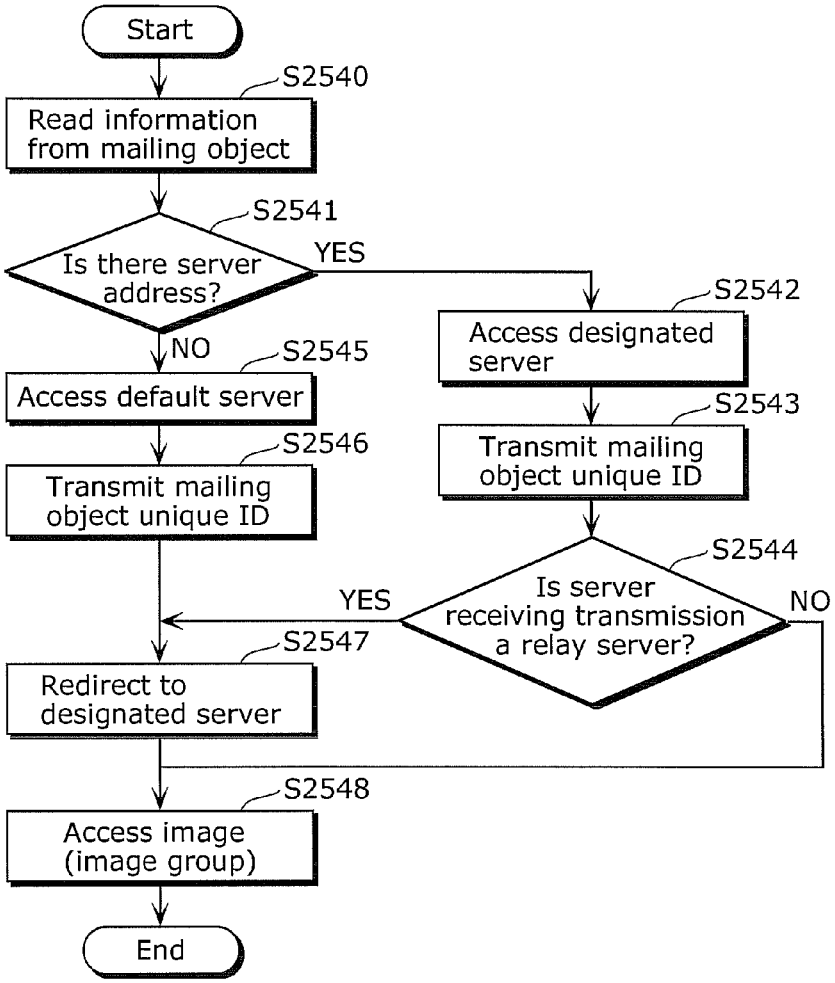
FIG. 69 is a flowchart of processing performed by a TV according to the fifth embodiment of the present invention.

FIG. 69 is a flowchart of processing performed by the TV to read RF-ID from the mailing object and eventually access the image server.

When the user brings the mailing object into proximity of the RF-ID reader of the TV, the TV reads information of the RF-ID on the mailing object (S2540). Then, a determination is made as to whether or not the readout information includes a sever address or a URL including the server address (S2541). If the readout information includes a sever address or a URL including the sever address, then the TV accesses the designated server (S2542). Then, the TV transmits the mailing object UID (S2543). Then, a determination is made as to whether or not the server receiving the transmission is a relay server (S2544). If the server is a relay server, then the relay server redirects to a server (the image sever) designated in the relay server (S2547). Thereby, the TV accesses an image or image group in the image server (S2548). On the other hand, if it is determined at S2544 that the server receiving the transmission is the image server, then redirecting is not performed and access to the image server is performed (S2548). Moreover, if it is determined at S2541 that the readout information does not include a sever address, then the TV accesses a server set by a predetermined default (S2545). Then, the TV transmits the mailing object UID to the default server (S2546). The default server redirects to a server (the image server) designated in the default server (S2547) to access the image server.

Figure 70:
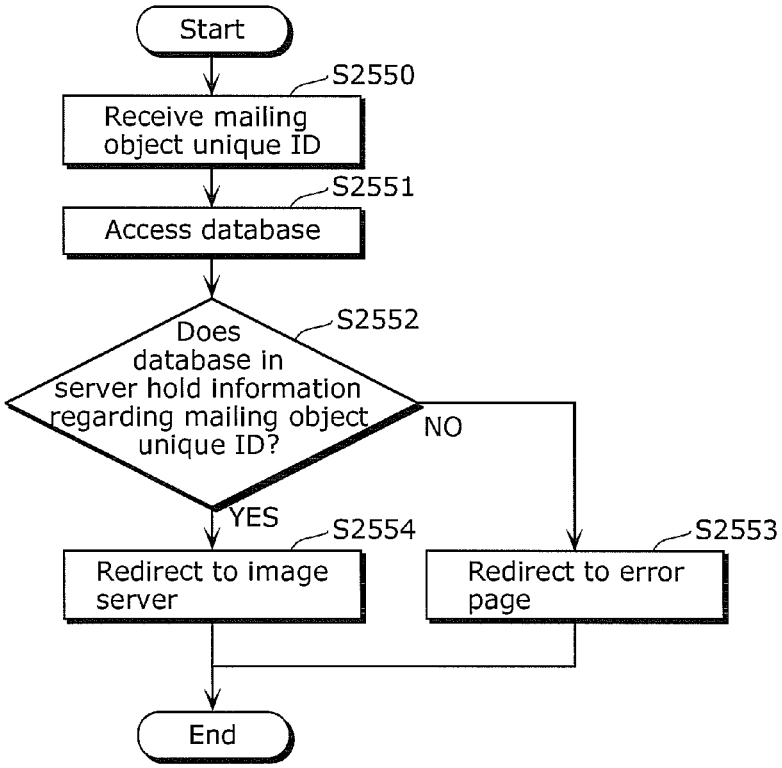
FIG. 70 is a flowchart of processing performed by the relay server according to the fifth embodiment of the present invention.

Here, if association between the mailing object UID and the designated server as a destination of the relay is not registered in a database of the relay or default server, the relay or default server redirects to an error page. FIG. 70 is a flowchart of processing performed by the relay or default server after receiving the mailing object UID. When the relay or default server receives the mailing object UID (S2550), the server searches its database for information regarding the mailing object UID (S2551). Then, the relay or default server determines whether or not the database holds information regarding the mailing object UID (S2552). If the database holds the information, then the relay or default server redirects to a server associated with the mailing object UID in the database (S2554). On the other hand, if the database does not hold the information (in other words, if there is no association), then the relay or default server redirects to an error page (S2553).

As described above, the mailing object having fixed information in the RF-ID is previously associated with image data stored in the image server. Thereby, when the mailing object with the association is presented to the TV, the user can view an image or image group in the server which is associated with the mailing object UID, without rewriting of the RF-ID of the mailing object. Therefore, even if the user is away from home and cannot rewrite the RF-ID of the mailing object, or even if the RF-ID of the mailing object is not rewritable, the user can associate images in the server with the mailing object. As a result, the user allows a person receiving the mailing object to view the images associated with the mailing object.

It should be noted that it has been described in the fifth embodiment that the mailing object UID is transmitted after accessing the server. However, it is also possible to generate a URL from the mailing object UID and the sever address recorded on the mailing object in order to access the server. In this aspect, it is possible to perform the access to the server and the transmission of the mailing object UID at the same time.

According to the fifth embodiment, even in an environment where the RF-ID cannot be rewritten, such as in a sight-seeing location, for example, the user can associate captured images with a post card and send the post card to a friend. Thereby, the friend receiving the post card presents the post card to a TV to view the images the user captured in the sight-seeing location. As explained above, even in an environment where the RF-ID cannot be rewritten, the user can create a mailing object associated with images in the server and then send the mailing object to a person to which the user desires to show the images.

If the image capturing device has a RF-ID writer function to rewrite the RF-ID of the mailing object, the processing is the same as processing performed by the TV for associating the mailing object with image data in the server, which will be described below in the sixth embodiment. Therefore, the processing is not described in the fifth embodiment.

Sixth Embodiment

In the sixth embodiment, the following configuration is described. The image capturing device captures images and uploads the images to the image server. Then, a user transmitting the images (hereinafter, referred to as a "sending user") selects an image group from the images in the server. Information for accessing the selected image group is recorded in the RF-ID on the mailing object. The mailing object is mailed to a user receiving the images (hereinafter, referred to as a "receiving user"). The receiving user accesses the image group in the image server by using the RF-ID on the mailing object.

Figure 71:
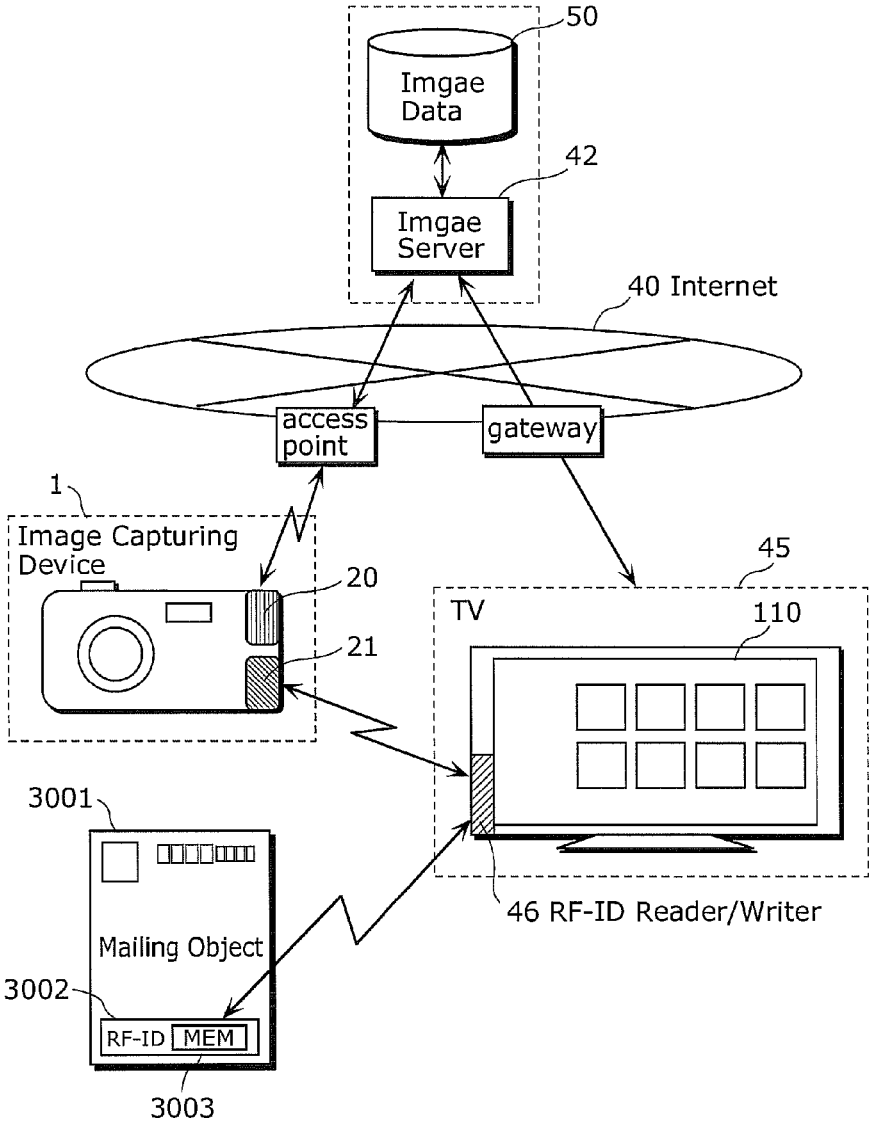
FIG. 71 is a schematic diagram of an image transmitting side according to a sixth embodiment of the present invention.
Figure 72:
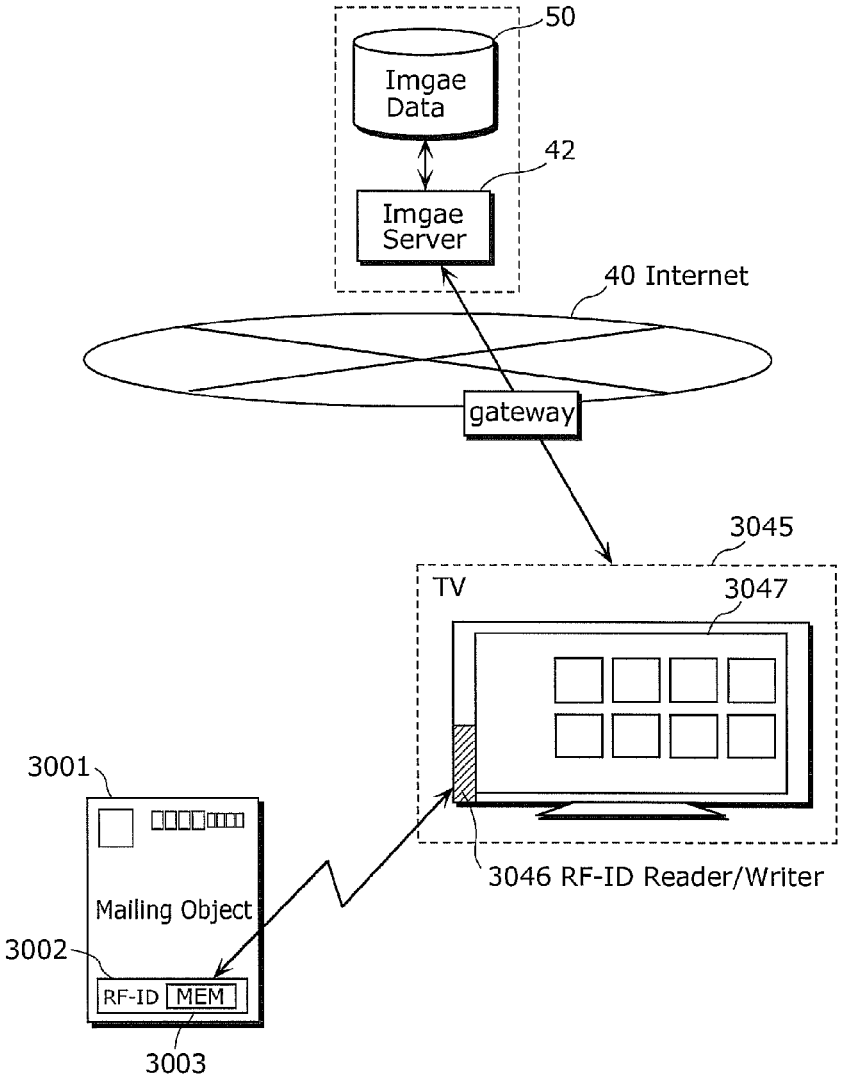
FIG. 72 is a schematic diagram of an image receiving side according to the sixth embodiment of the present invention.

FIG. 71 is a schematic diagram of a configuration of an image transmission side according to the sixth embodiment of the present invention. FIG. 72 is a schematic diagram of a configuration of an image receiving side according to the sixth embodiment of the present invention. Here, the same reference numerals of FIGS. 1 and 3 are assigned to the identical elements of FIGS. 71 and 72, so that the identical elements are not explained again below.

In FIGS. 71 and 72, a mailing object 3001 is a post card, envelope, or letter paper which is mailed from the image transmission side to the image receiving side. A RF-ID unit 3002 is a rewritable RF-ID. At least part of the RF-ID unit 302 is a rewritable memory unit 3003. The RF-ID unit 3002 is attached to or incorporated into the mailing object 3001 in order to be sent to the image receiving side together with the mailing object.

As described in the prior embodiments, the memory unit 3003 in the RF-ID unit 3002 holds the medium identification information for identifying that the medium having the RF-ID unit 3002 is a mailing object.

Referring to FIG. 72, a TV 3045 is a TV display device provided in the image receiving side. The TV 3045 has the same function as that of the TV 45 in FIG. 71 described in the prior embodiments. Like the TV 45 in FIG. 71, the TV 3045 includes a RF-ID reader/writer 3046 (corresponding to the RF-ID reader/writer 46 in FIG. 71) and a display unit 3047 (corresponding to the display unit 110 in FIG. 71). The TV 3045 is connected to the Internet 40 via a network connection means not shown.

Next, the processing performed by the above configuration is described.

<Image Group Selecting and Mailing Object Writing by Image Transmission Side>

In the image transmission side in FIG. 71, images captured by the image capturing device 1 are transmitted to a wireless access point via the second antenna 20 in the image capturing device 1 used for wireless communication, such as a wireless LAN or WiMAX. The images are recorded as the image data 50 onto the image server 42 via the internet 40. Then, the image capturing device 1 is moved into proximity of the RF-ID reader/writer 46 of the TV 45 in order to establish connection with the TV 45 by wireless communication via the first antenna 21 of the image capturing device 1 used for RF-ID. The TV 45 obtains, from the image capturing device 1, information for accessing the image data 50 in the image server 42. Then, the TV 45 downloads the images of the image data 50 to be displayed on the display unit 110. The above processing is the same as described in the prior embodiments. The above is just a summary.

Next, the sending user checks the images displayed on the display unit 110 of the TV 45 in order to set transmission image selection information indicating whether or not each of the images is to be transmitted to the receiving user (in other words, whether or not each of the images is to be permitted to be viewed by the receiving user). The sending user can set also restriction on display for the receiving user, utility form information such as a slide show and printing, which is described in the prior embodiments. The transmission image selection information and the utility form information are transmitted to and recorded onto the image server. The image server manages, as an image group, a set of images selected as transmission images in the transmission image selection information.

Figure 73:
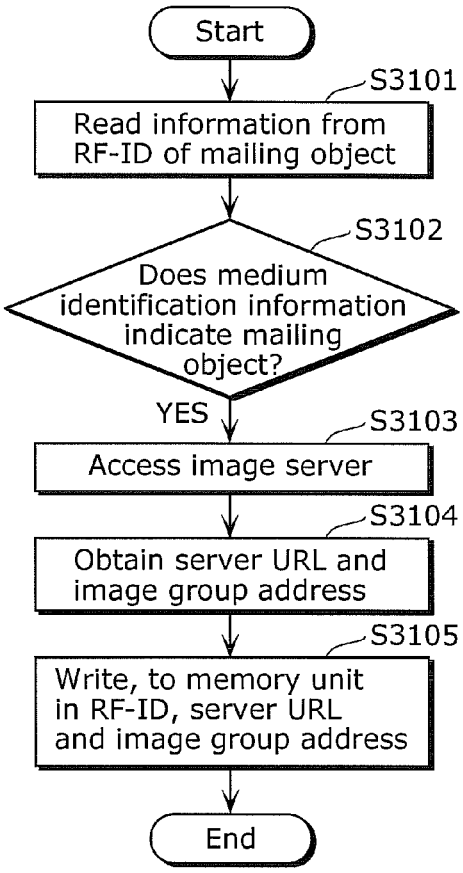
FIG. 73 is a flowchart of processing performed by a TV transmitting image according to the sixth embodiment of the present invention.

The following describes steps performed by the TV 45 for recording, onto the mailing object 3001, information regarding the image group selected by the sending use, with reference to a flowchart of FIG. 73.

It is assumed that transmission images have been selected and an image group set with the utility form information has been generated. Under the assumption, the sending user brings the mailing object 3001 having the RF-ID unit 3002 into proximity of the RF-ID reader/writer 46 of the TV 45 in order to establish wireless communication between the RF-ID unit 3002 and the RF-ID reader/writer 46.

When the TV 45 becomes able to communicate with the RF-ID unit 3002 on the mailing object 3001 via the RF-ID reader/writer 46, the TV 45 reads information from the memory unit 3003 (S3101). Then, the TV 45 determines whether or not the medium identification information indicates that the current communication partner is a mailing object (S3102). If the current communication partner is a mailing object, then the TV 45 proceeds to steps for writing to the mailing object. Here, if it is determined at Step S3102 that the current communication partner is not a mailing object, then the subsequent steps are not described here but the TV 45 proceeds to steps depending on a medium indicated by the medium identification information.

In order to write to the mailing object 3001, first, the TV accesses the image server 42 via the internet 40 (S3103). Thereby, the TV 45 obtains, from the image server 42, image group designation information, such as a server URL and an image group address, for allowing the image receiving side to access the image group in the image server 42 (S3104).

The TV 45 transmits the obtained image group designation information to the RF-ID unit 3002 on the mailing object 3001 via the RF-ID reader/writer 46 of the TV 45 in order to write the image group designation information to the memory unit 3003 in the mailing object 3001, and the RF-ID unit 3002 on the mailing object 3001 records the image group designation information to a rewritable region of the memory unit 3003 (S3105).

As described above, the mailing object 3001 on which the image group designation information is recorded is mailed by the sending user to a user of the image receiving side.

<Image Reproducing and Viewing by Image Receiving Side>

Figure 74:
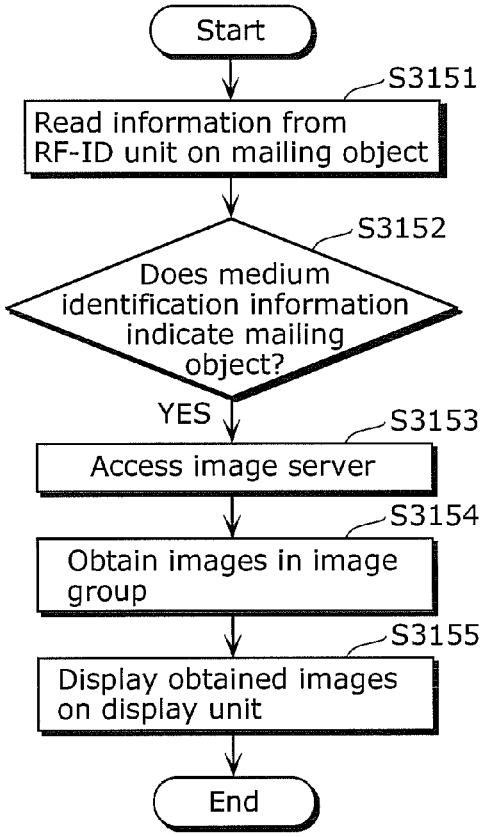
FIG. 74 is a flowchart of processing performed by a TV receiving image according to the sixth embodiment of the present invention.

Next, the image receiving side is described with reference to FIG. 72 illustrating the schematic block diagram of the image receiving side and FIG. 74 illustrating a flowchart of processing performed by the TV in the image receiving side.

Referring to FIG. 72, the receiving user receives the mailing object 3001 from the sending user. Then, the receiving user checks the RF-ID unit 3002 or characters or design indicated on the mailing object 3001 to determine whether the mailing object is incorporated with a means for accessing images. Here, the receiving user needs only to understand that the receiving user can access to the images by using the mailing object 3001. The receiving user does not need to care about the image group designation information and the like in the RF-ID unit 3002.

In order to reproduce and view the images, the receiving user brings the mailing object 3001 into proximity of the RF-ID reader/writer 3046 of the TV 3045 in the image receiving side so as to start viewing of the images.

If the RF-ID unit 3002 on the mailing object 3001 is in enough proximity of the RF-ID reader/writer 3046 of the TV 3045, the RF-ID reader/writer 3046 supplies power to the RF-ID unit 3002 of the mailing object 3001 via antennas (not shown) of both the RF-ID reader/writer 3046 and the RF-ID unit 3002 in order to activate the RF-ID unit 3002. Thereby, wireless communication between the TV 3045 and the RF-ID unit 3002 of the mailing object 3001 starts. When the wireless communication starts, the TV 3045 reads information from the memory unit 3003 of the RF-ID unit 3002 (S3151).

A determination is made as to whether or not the medium identification information in the readout information indicates that the current communication partner is a mailing object (S3152). If the current communication partner is a mailing object, then the TV 3045 proceeds to processing of reading the image group designated by the sending user from the image server 42.

The access to the image server 42 makes it possible to generate an URL for accessing the image group in the image server 42 by using the image group designation information in the information read by the RF-ID unit 3002 at Step S3151, such as an image group address, and thereby to access the image server 42 via the internet 40 (S3153).

The TV 3045 connected to the image server 42 at the above step obtains the images (the image group) which are permitted to be displayed, from among the image data 50 in the image server 42, based on the transmission image selection information indicating the image group managed by the image server 42 (S3154). Then, the TV 3045 displays the images on the display unit 110 (S3155).

Furthermore, according to the transmission image selection information indicating the image group managed by the image server 42 and the utility form information, the receiving user can use functions of, for example, reproducing the images as a slide show, printing the images, and downloading the images to a recording medium (not shown) attached to the TV 3045 or connected to the outside.

In addition, for image printing, the user can print the images by the printer on a LAN (not shown), and also ask, via the internet 40, a photograph print service provider to print the images.

As described above, with the above configuration according to the sixth embodiment of the present invention, the image group designation information is provided from the RF-ID unit 3002 on the mailing object 3001 to the TV 3045 in the image receiving side. Therefore, the receiving user does not need to input characters of a network access destination to obtain images, for example. In other words, the intuitive and simple operation of simply bringing the mailing object 3001 into proximity of the TV 3045 enables the receiving user to access the image data 50 stored in the image server 42. As a result, the receiving user can obtain images from the image server, without knowledge of complicated operations such as menu selection and character inputs.

It should be noted that it has been described in the sixth embodiment that the mailing object 3001 is previously attached or incorporated with the RF-ID unit 3002. However, the mailing object may be a general post card or letter paper attached with an independent RF-ID unit 3002 that is provided separately. In this aspect, the above effect can be produced by later attaching the RF-ID unit to the mailing object. This produces further advantages that the sending user can use the sixth embodiment for any desired mailing object.

It should also be noted that, if the access to the image server 42 requires a login operation, a server login ID and a server login password may also be written at Step S3105 into the rewritable region of the memory unit 3003 in the RF-ID unit 3002 on the mailing object 3001. Here, it is desirable that the login ID and the login password are not plane texts but are written in an encrypted format for security.

It should also be noted that it has been described in the sixth embodiment that the TV 45 in the image transmission side performs selection of transmission images, setting of the utility form information, and writing of the image group designation information to the RF-ID unit 3002 on the mailing object 3001. However, it is also possible that the image capturing device 1 having a RF-ID reader/writer function performs setting of the transmission image selection information and the utility form information and writing of the image group designation information, in order to produce the same effect as described above for obtaining images by the simple operation of the receiving user.

Variation of Sixth Embodiment

Figure 75A:
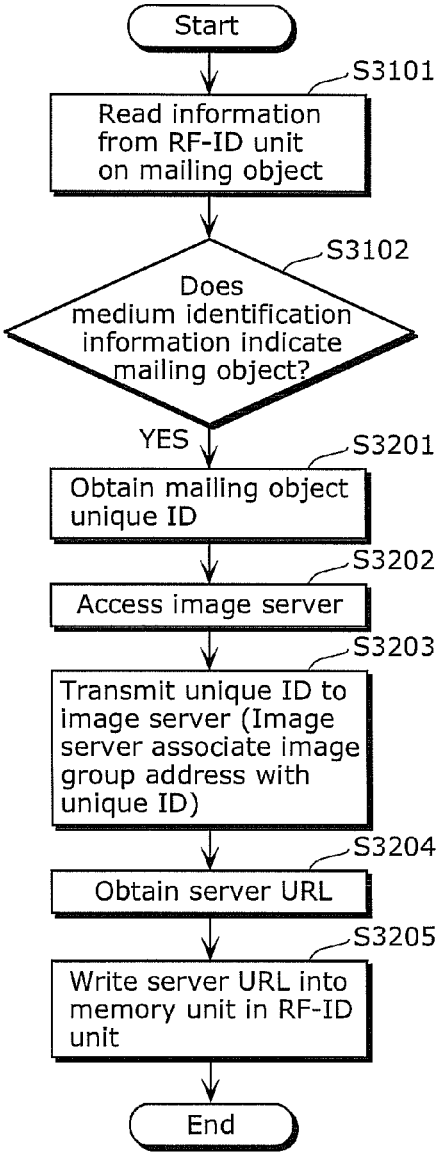
FIG. 75A is a flowchart of another example of processing performed by the TV transmitting image according to the sixth embodiment of the present invention.
Figure 75B:
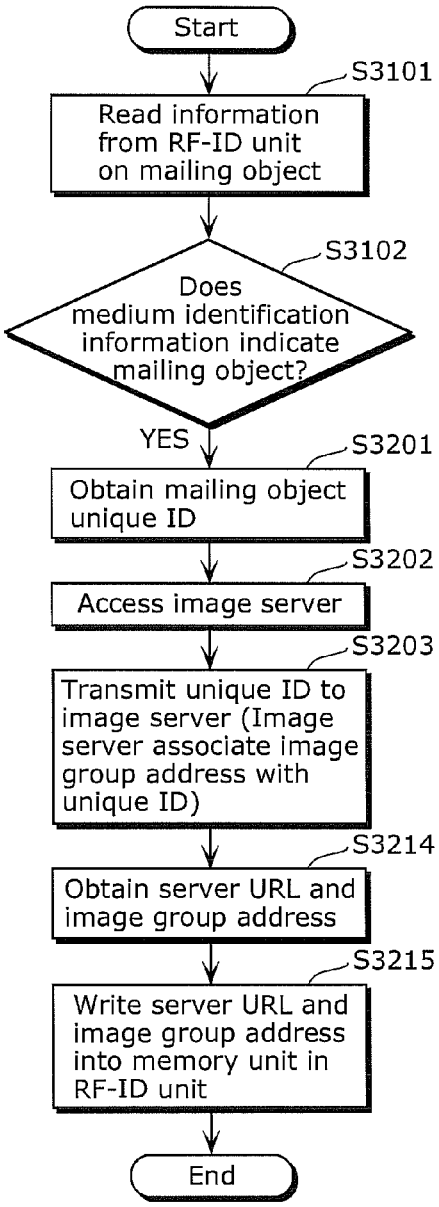
FIG. 75B is a flowchart of another example of processing performed by the TV transmitting image according to the sixth embodiment of the present invention.

FIGS. 75A and 75B are flowcharts of processing performed by the TV 45 in the image transmission side according to a variation of the sixth embodiment of the present invention. Here, the same step numerals of FIG. 73 are assigned to the identical steps of FIGS. 75A and 75B, so that the identical steps are not explained again below.

Figure 76:
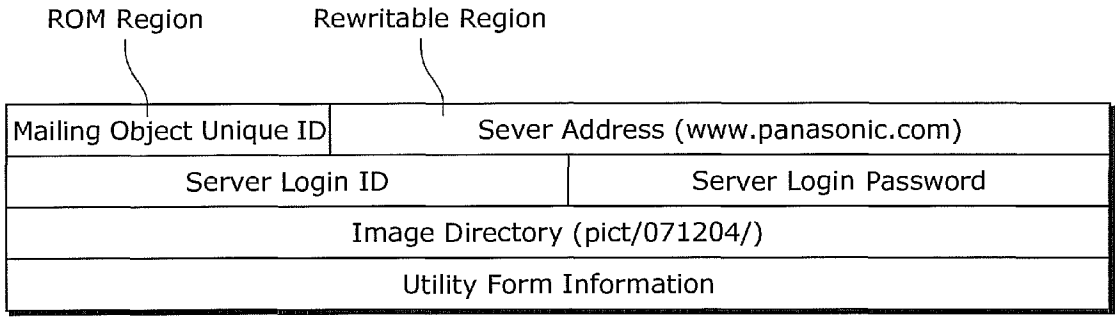
FIG. 76 is a table of an example of information recorded in a mailing object memory unit according to the sixth embodiment of the present invention.

According to the variation of the sixth embodiment, the mailing object UID is previously recorded on the memory unit 3003 of the RF-ID unit 3002 on the mailing object 3001. Here, it is desirable to record the mailing object UID on a ROM region of the memory unit 3003 in order to reduce risks of data damages or data manipulation caused by accidental operations. FIG. 76 illustrates a diagram of an example of a data structure of the memory unit 3003.

The TV 45 in the image transmission side sets the transmission image selection information and the utility form information into the above-described RF-ID unit in order to designate an image group in the image serve 42. In this situation, the TV 45 performs processing according to the flowchart of FIG. 75A.

The TV 45 reads information from the RF-ID unit 3002 on the mailing object 3001 (S3101) and determines based on the medium identification information that the communication partner is a mailing object (S3102). After that, the TV 45 obtains the mailing object UID (S3201). The mailing object UID may be the information read at Step S3101 or be newly obtained from the RF-ID unit 3002. Next, the TV 45 accesses the image server 42 via the Internet 40 (S3202). The TV 45 transmits the mailing object UID to the image server 42, and thereby the image server 42 associates with the transmitted mailing object UID with an address of the image group and then stores the manages information of the association (association information) (S3203).

The TV 45 obtains, from the image server 42, the server URL enabling the image receiving side to access the image server 42 (S3204). The obtained server URL is written into the rewritable region of the memory unit 3003 in the RF-ID unit 3002 on the mailing object 3001 via the RF-ID reader/writer 46 (S3205).

As described above, if the image server associates the image group with the mailing object UID and then stores and manages the association information, the utility form information can be managed separately for each mailing object UID. Therefore, in the situation where there are a plurality of the mailing objects 3001, it is possible to change an operation for receiving images for each mailing object, namely, for each different receiving user.

If, in the configuration described in the sixth embodiment, the image receiving side designates an image group for each mailing object, generates a different image group address for each designated image group, and writes the image group address into a corresponding RF-ID unit, the image transmission side needs complicated operations for designating image groups separately although the same advantages as those of the sixth embodiment can be obtained.

Therefore, when the sending user selects the same transmission image group for a plurality of mailing objects, it is preferable that the sending user records and manages different utility form information for each mailing object by using the mailing object UID as described earlier. Thereby, it is possible to reduce operations of the sending user, and to reduce a memory capacity of the image server because it is not necessary to hold pieces of the transmission image selection information separately, thereby producing further advantages.

The processing of FIG. 75B differs from the processing of FIG. 75A in that Steps S3204 and S3205 are replaced by Steps S3214 and 3215. At Step 3214, the TV 45 obtains an image group address in addition to the server URL. At Step S3215, the TV 45 writes the image group address together with the server URL into the memory unit 3003 of the RF-ID unit 3002.

Thereby, when the image receiving side is to receive images, the image receiving side accesses the designated image group in the image server 42. Here, the access is permitted only when the mailing object UID of the image group stored and managed in the image server matches the mailing object UID used by the receiving server requesting the access. Thereby, security is increased.

Conventionally, if the user intends to show images, on a large screen display device (apparatus), to a different user living in a remote location, the user in the remote location needs to learn operations of the device, an operation acquirer has to go to the remote location to operate the device, or the display device in the remote location should be remotely controlled. However, like the fourth embodiment, the system according to the sixth embodiment enables such a user in a remote location to easily view images by a simple operation, for example, by bringing a physical medium such as a post card with RF-ID into proximity of a display device. In the fourth embodiment, generation of the post card with RF-ID and writing of data into the RF-ID is not performed by the user (who captures and sends images or who views the images), but by a service provider. In the sixth embodiment, however, the sending user in the image transmission side performs generation of the post card with RF-ID and writing of data into the RF-ID.

Seventh Embodiment

In the seventh embodiment of the present invention, a method of changing setting for a device (apparatus) by using a RF-ID card according to the seventh embodiment of the present invention is described.

Figure 77:
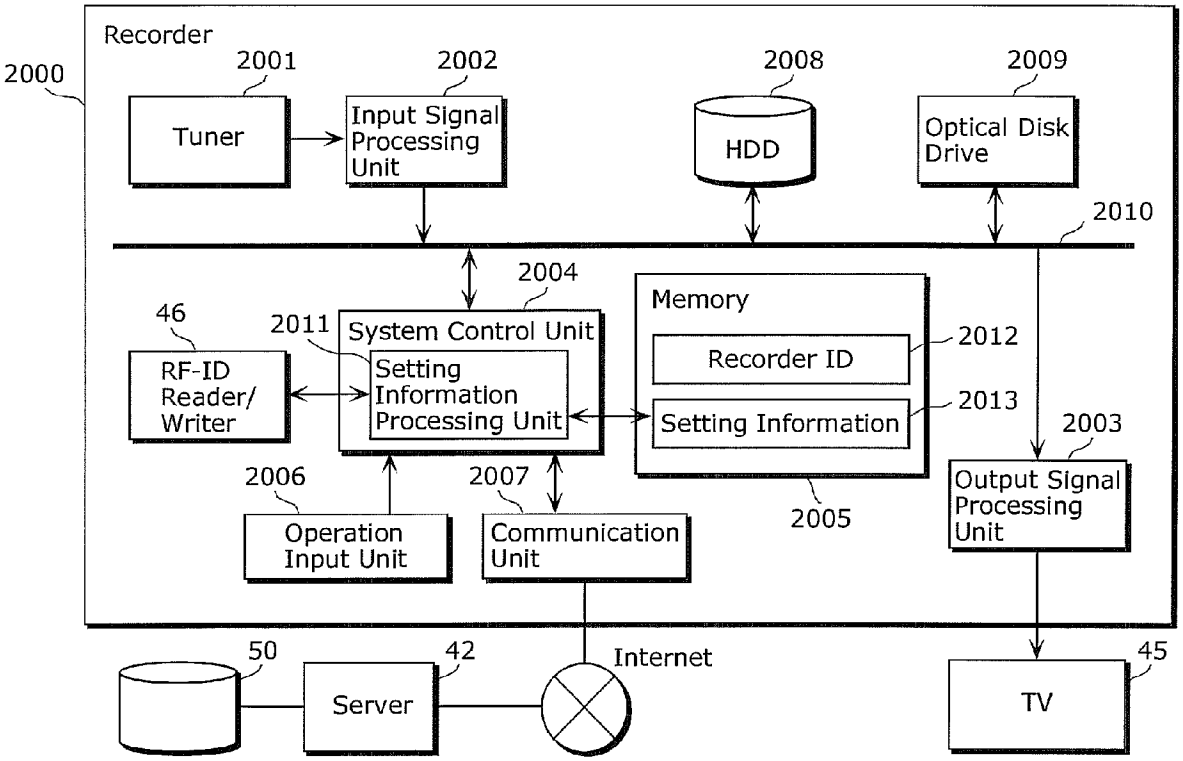
FIG. 77 is a block diagram of a recorder according to a seventh embodiment of the present invention.
Figure 78:
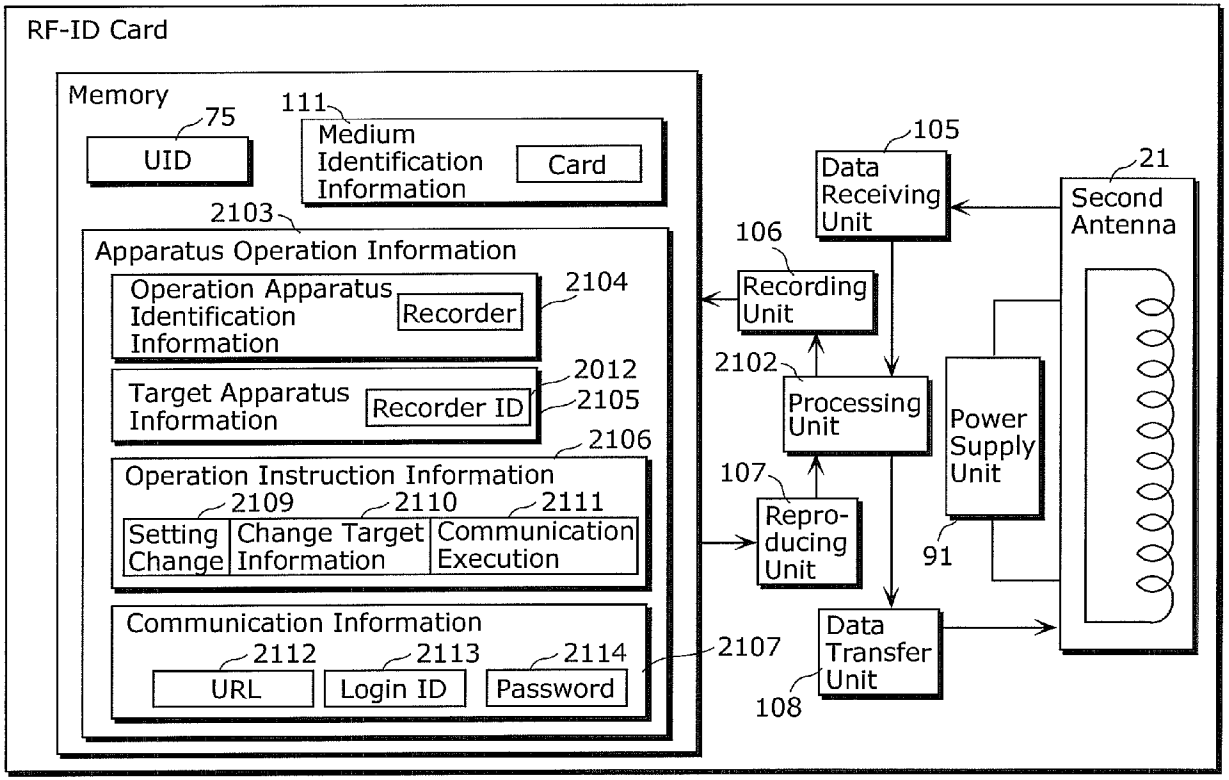
FIG. 78 is a block diagram of a RF-ID card according to the seventh embodiment of the present invention.

The following describes a method of changing setting for a recorder by using a RF-ID card with reference to FIGS. 77 and 78.

FIG. 77 is a block diagram of a structure of a recorder according to the seventh embodiment.

A recorder 2000 records broadcast contents obtained by a tuner 2001, onto a Hard Disk Drive (HDD) 2008 or an optical disk drive 2009. In addition, the recorder 200 reproduces, on the TV 45, the recorded contents or video/audio contents ready by the optical disk drive 2009.

An input signal processing unit 2002 includes an Analog/Digital (A/D) converter, a decoder, and an encoder, in order to convert input video/audio signals into data in a predetermined video/audio format. The A/D converter converts analog signals obtained by the tuner 2001 into digital signals. The decoder decodes scrambled contents. The encoder converts data into data in a video format according to MPEG-2, for example.

An output signal processing unit 2003 includes a Digital/Analog (D/A) converter and a decoder in order to provide video and audio to the TV 45. The D/A converter converts digital signals to analog signals. The decoder decodes data in a data format according to MPEG-2, for example.

A system control unit 2004 controls operations of the recorder 2000. The system control unit 2004 includes a setting information processing unit 2011 that switches setting for the recorder 2000. The setting information processing unit 2011 will be described in detail later.

A memory 2005 holds recorder ID 2012 for identifying the recorder 2000, and setting information 2013 for the recorder 2000.

An operation input unit 2006 receives inputs from a user using buttons of a remote controller, a front panel, or the like (not shown).

A communication unit 2007 connects the recorder 2000 to the server 42 via the internet or a LAN.

The HDD 2008 has an area in which recorded contents and content lists provided from the input signal processing unit 2002 are stored.

The optical disk drive 2009 is a disk drive that performs recording or reproducing for an optical disk such as a Digital Versatile Disc (DVD) or a Blue-ray Disc. The optical disk drive 2009 records recorded contents and content lists provided from the input signal processing unit 2002 onto the optical disc, and reproduces video/audio contents in the optical disk.

The input signal processing unit 2002, the output signal processing unit 2003, the system control unit 2004, the HDD 2008, and the optical disk drive 2009 of the recorder 2000 are connected one another via a bus 2010.

Here, the setting information processing unit 2011 is described in more detail below.

According to the setting information 2013 stored in the memory 2005, the setting information processing unit 2011 sets displaying of a menu screen, a recording/reproducing mode, chapters of recorded contents, TV program recommendation based on user's preference, and the like regarding the recorder 2000. In more detail, the setting information processing unit 2011 reads an identifier indicating, for example, "menu screen background color: Black" from the setting information 2013, and thereby issues a request for menu screen display to the output signal processing unit 2003 together with an instruction for displaying a background of a menu screen in black.

Here, the setting information 2013 may be stored in an external storage unit such as a SD card not shown. Especially, it is efficient to store, in the HDD 2008, the setting information regarding chapters of recorded contents stored in the HDD 2008, information having a large size, and the like.

Conventionally, the setting information 2013 has been set prior to purchase of the recorder 2000, or set by operations of the user using the operation input unit 2006. In the seventh embodiment of the present invention, however, the setting information 2013 can be changed based on information obtained from the RF-ID reader/writer 46.

FIG. 78 is a block diagram of a structure of the RF-ID card from which information is read by the RF-ID reader/writer 46 of the recorder 2000 to be used to change the settings of the recorder 2000.

The RF-ID card 2100 includes a memory 2101, the antenna (second antenna) 21, the power supply unit (second power supply unit) 91, the data receiving unit 105, the data transfer unit 108, a processing unit 2102, the recording unit 106, and the reproducing unit 107.

When the RF-ID card 2100 is moved to bring the antenna 21 into proximity of the RF-ID reader/writer 46 of the recorder 2000, the RF-ID reader/writer 46 supplies power to the power supply unit 91 via the antenna 21 in order to provide power to the respective units in the RF-ID card 2100.

Information regarding data recording/reproducing is read from the RF-ID card 2100 to the recorder 2000 via the RF-ID reader/writer 46. In the recorder 2000, the information is received by the data receiving unit 105 and then provided to the processing unit 2102.

In the RF-ID card 2100, the processing unit 2102 causes the recording unit 106 to record information onto the memory 2101, and causes the reproducing unit 107 to reproduce the information stored in the memory 2101.

The data transfer unit 108 transmits the information provided from the processing unit 2102 to the RF-ID reader/writer 46 of the recorder 2000 via the antenna 21.

The memory 2101 in the RF-ID card 2100 stores the UID 75, the medium identification information 111, and apparatus operation information 2103.

The UID 75 and the medium identification information 111 are used to identify the RF-ID card 2100.

The UID 75 is identification unique to the RF-ID card 2100.

The medium identification information 111 holds an identifier indicating that the RF-ID card 2100 is a card.

The apparatus operation information 2103 holds pieces of information regarding an apparatus (device) to perform an operation using the RF-ID card 2100 and regarding the operation. The following describes the pieces of information included in the apparatus operation information 2103.

Operation apparatus identification information 2104 indicates a type of the apparatus (device) to perform the operation using the RF-ID card 2100. The operation apparatus identification information 2104 indicates the type by an identifier in the similar manner as described for the medium identification information 111. In FIG. 78, the operation apparatus identification information 2104 holds an identifier indicating that a type of the apparatus to perform the operation is a recorder.

Target apparatus information 2105 holds information so that only a specific apparatus (device) can perform the operation using the RF-ID card 2100. In the example of FIG. 78, the target apparatus information 2105 holds recorder ID 2012 for identifying the recorder 2000. It should be noted that, if an apparatus that can use the RF-ID card 2100 according to the seventh embodiment of the present invention is limited, for instance, if only recorders can use the RF-ID card 2100, the operation apparatus identification information 2104 and the target apparatus information 2105 may not be included in the apparatus operation information 2103. In addition, if the setting information processing unit 2011 in the recorder 2000 has a structure to change settings of the recorder 2000 by using the information in cards, the medium identification information 111 may not be included in the memory 2101.

Operation instruction information 2106 indicates details of the operation to be performed by the apparatus designated in the apparatus operation information 2103. In the example of FIG. 78, the operation instruction information 2106 includes information 2109 indicating that setting is to be changed (setting change), information 2110 indicating a target for which the setting change is to be performed (change target information), and information 2111 indicating that communication is to be executed in obtaining the setting information (communication execution).

It should be noted that the operation instruction information 2106 is not limited for a single operation, but may include plural pieces of information for plural operations, or may be a program in which the plural operations are combined.

Communication information 2107 is information regarding a server or the like. When the recorder 2000 is instructed based on the operation instruction information 2106 to access the server or the like to obtain data, the recorder 2000 accesses the server or the like using the communication information 2107. In the example of FIG. 78, the communication information 2107 includes a URL 2112, login ID 2113, and a password 2114 of the server or the like. The URL 2112 may be replaced by an IP address. If the recorder 2000 is to access a different apparatus (device) via an office or home network, the URL 2112 may be information for identifying the apparatus, such as a MAC address.

Figure 79:
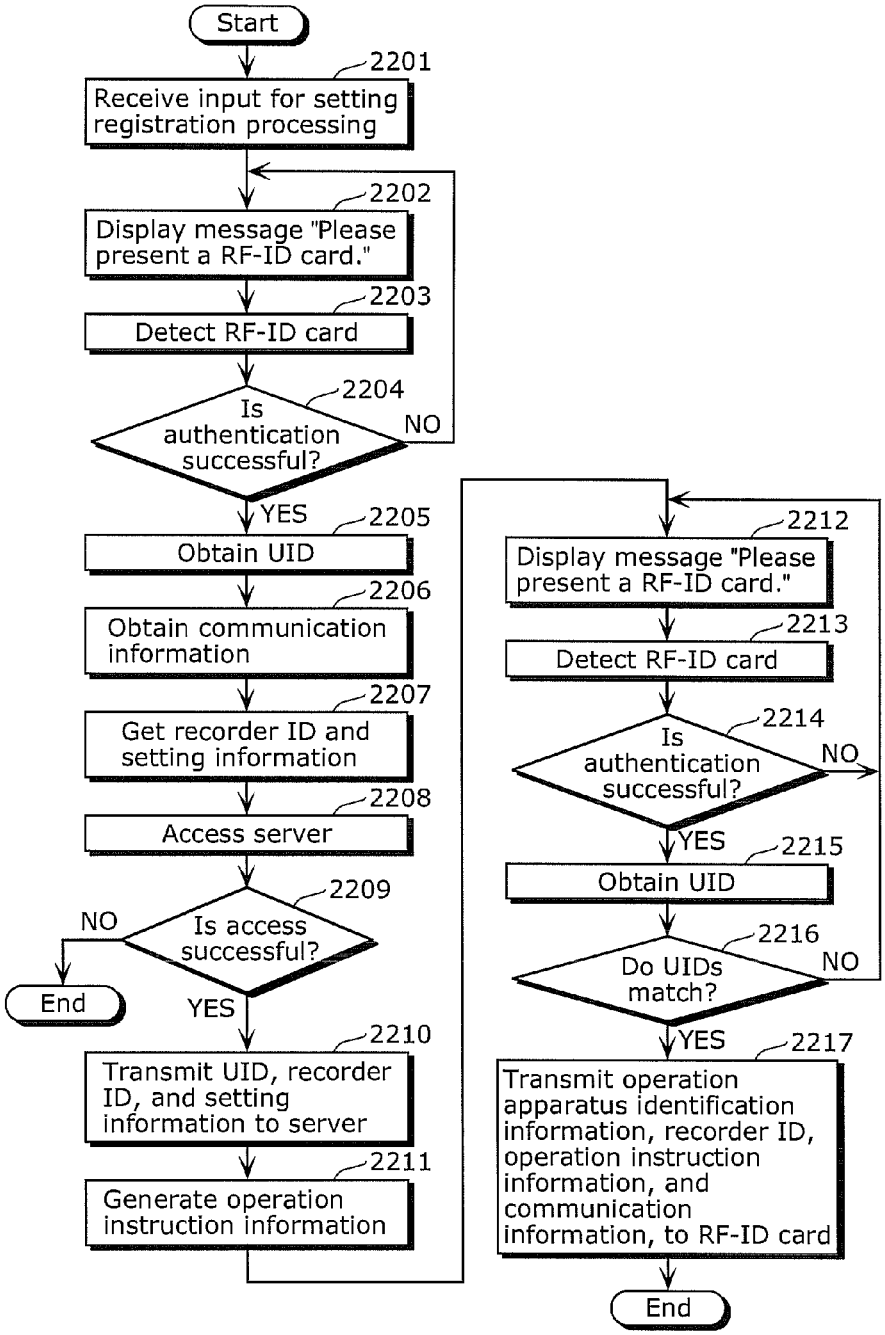
FIG. 79 is a flowchart of steps of registering setting information to a server.

The following describes processing by which the recorder 2000 registers the setting information from the recorder 2000 to a server by using the RF-ID card 2100 with reference to FIG. 79.

At Step 2201, when the recorder 2000 receives an input from the user using the operation input unit 2006, the setting information processing unit 2011 causes the output signal processing unit 2003 to issue, to the TV 45, a request for message display. In response to the request, the TV 45 displays a message "Please present a RF-ID card" on its screen at Step 2202. The message may be displayed on a console (not shown) of the recorder 2000. It is also possible that the recorder 2000 requests the user for authentication such as a password or biometric authentication when the user performs the input operation, and after the authentication, proceeds to the setting registration processing. It is further possible that the recorder 2000 does not request the TV 45 for the message display, but the user needs to present the RF-ID card 2100 to the RF-ID reader/writer 46 when using the recorder 2000 in order to perform steps of and after 2203. It is still further possible that an inquiry message is displayed to enquire where the setting information 2013 is to be registered, and the setting information 2013 is registered into the location the user designates. For example, the setting information 2013 may be registered into the RF-ID card 2200, or into a sever different from the server 42.

At Step 2203, the recorder 2000 detects the RF-ID card. After that, mutual authentication between the recorder 2000 and the RF-ID card 2100 is performed at Step 2204.

If the mutual authentication at Step 2204 is successful, then the processing proceeds to Step 2205. Otherwise, the processing returns to Step 2202 to repeat the detection of the RF-ID card.

At Step 2205, the recorder 2000 obtains the UID 75 from the memory 2101 in the RF-ID card 2100.

At Step 2206, the recorder 2000 obtains the communication information 2107 from the memory 2101 in the RF-ID card 2100. If the memory 2101 in the RF-ID card 2100 does not hold the communication information, the recorder 2000 may issue, to the user, a request for providing the communication information. Moreover, if the user instructs at Step 2201 the recorder 2000 to register the setting information 2013 into a location that is not designated in the RF-ID card 2100, Step 2206 is not performed. If plural pieces of the communication information 2107 are stored in the RF-ID card 2100, it is possible to display a list of the plural pieces of the communication information 2107 from which the user can select a desired one.

At Step 2207, the recorder 2000 gets the recorder ID 2012 and the setting information 2013 from the memory 2005. The setting information 2013 is not limited to information currently stored, but may be information inputted by the user in the setting registration processing.

At Step 2208, in the recorder 2000, the setting information processing unit 2011 issues, to the communication unit 2007, a request for access to a server or the like having the URL 2112 included in the obtained communication information 2107. The communication unit 2007 accesses the server using the login ID 2113 and the password 2114.

At Step 2209, it is determined whether or not the access to the server 42 is successful. If the access is successful, then the processing proceeds to Step 2210. Otherwise, the setting registration processing is terminated.

At Step 2210, the recorder 2000 transmits, to the server 42, the UID 75, and the recorder ID 2012 and the setting information 2013 which are obtained from the memory 2005, thereby registering the setting information 2013 into the server 42.

At Step 2211, the recorder 2000 generates the operation instruction information 2106, using (a) the operation designated at Step 2201 or a storage location of the setting information 2013 selected at Step 2201, (b) the setting information 2013 obtained at Step 2207, and (c) the communication information 2107 obtained at Step 2206.

At Step 2212, the recorder 2000 performs the same step as Step 2202 to cause the TV 45 to displays a message "Please present a RF-ID card" on its screen.

At Step 2213, the recorder 2000 detects the RF-ID card. After that, mutual authentication between the recorder 2000 and the RF-ID card 2100 is performed at Step 2214.

If the mutual authentication at Step 2214 is successful, then the processing proceeds to Step 2215. Otherwise, the processing returns to Step 2212 to repeat the detection of the RF-ID card 2100.

At Step 2215, the recorder 2000 obtains the UID from the memory 2101 in the RF-ID card 2100.

At Step 2216, it is determined whether or not the UID 75 obtained at Step 2205 matches the UID obtained at Step 2215. If the UIDs match, then the processing proceeds to Step 2217. Otherwise, the processing returns to Step 2211 to repeat the detection of the RF-ID card 2100.

At Step 2217, the recorder 2000 transmits, to the RF-ID card 2100, the operation apparatus identification information 2104 (not shown in FIG. 77) stored in the memory 2005, the recorder ID 2012, the operation instruction information 2106 generated at Step 2211, and the communication information 2107, in order to record (register) these pieces of information onto the memory 2101 of the RF-ID card 2100. As a result, the setting registration processing is completed.

Referring to FIG. 80, the setting information registered into the server 42 by the above-described processing of FIG. 79 is described.

Each of the setting information registered in the server 42 is hereinafter referred to as setting information 2250. Each setting information 2250 is registered in association with a corresponding one of the UID 75 and a corresponding one of the target apparatus information 2105. In more detail, the setting information 2250 holds an identifier indicating, for example, "menu screen background color: Black". In the example of FIG. 80, a letter "A" or "B" at the end of pieces of the setting information 2250 indicates that the setting is different from another.

It is also possible that plural pieces of setting information are registered for a single UID such as UID0001 in FIG. 80. It is further possible that a single piece of the target apparatus information 2105, such as REC-0001, is registered for plural pieces of setting information associated with different UID. Here, the setting information may include the change target information 2110.

Next, referring to FIG. 81, the apparatus operation information 2103 registered in the memory 2101 of the RF-ID card 2100 by the above-described processing of FIG. 79 is described.

It is assumed in the example of FIG. 81 that the UID 75 designates "UID0001" and the medium identification information 111 designates a "card".

The apparatus operation information 2103 includes sets each including the operation apparatus identification information 2104, the target apparatus information 2105, the operation instruction information 2106, and the communication information 2107. Here, it is possible that the communication information 2107 is not registered as being information not related to the other pieces of information. For instance, it is possible that only a piece of the communication information 2107 is registered to always access the same server in using the RF-ID card 2100.

The operation instruction information 2106 includes instruction detail information 2260, instruction target information 2261, and communication execution information 2262. The instruction detail information 2260 holds an identifier indicating an operation to be performed by the device designated by the target apparatus information 2105. The instruction target information 2261 holds an identifier indicating a setting, such as a menu screen mode or recording mode, of the apparatus to perform the operation, such as REC-0001. The communication execution information 2262 holds an identifier indicating whether or not communication is to be executed in performing the operation indicated in the instruction detail information 2260. It should be noted that the apparatus operation information 2103 may include only the communication information 2107 if the operating to be performed using the RF-ID card 2100 is limited to changing of setting.

The communication information 2107 holds a URL, login ID, a password, and the like for accessing a server that is a partner of communication, if the communication execution information 2262 indicates that the communication is to be executed.

Figure 82:
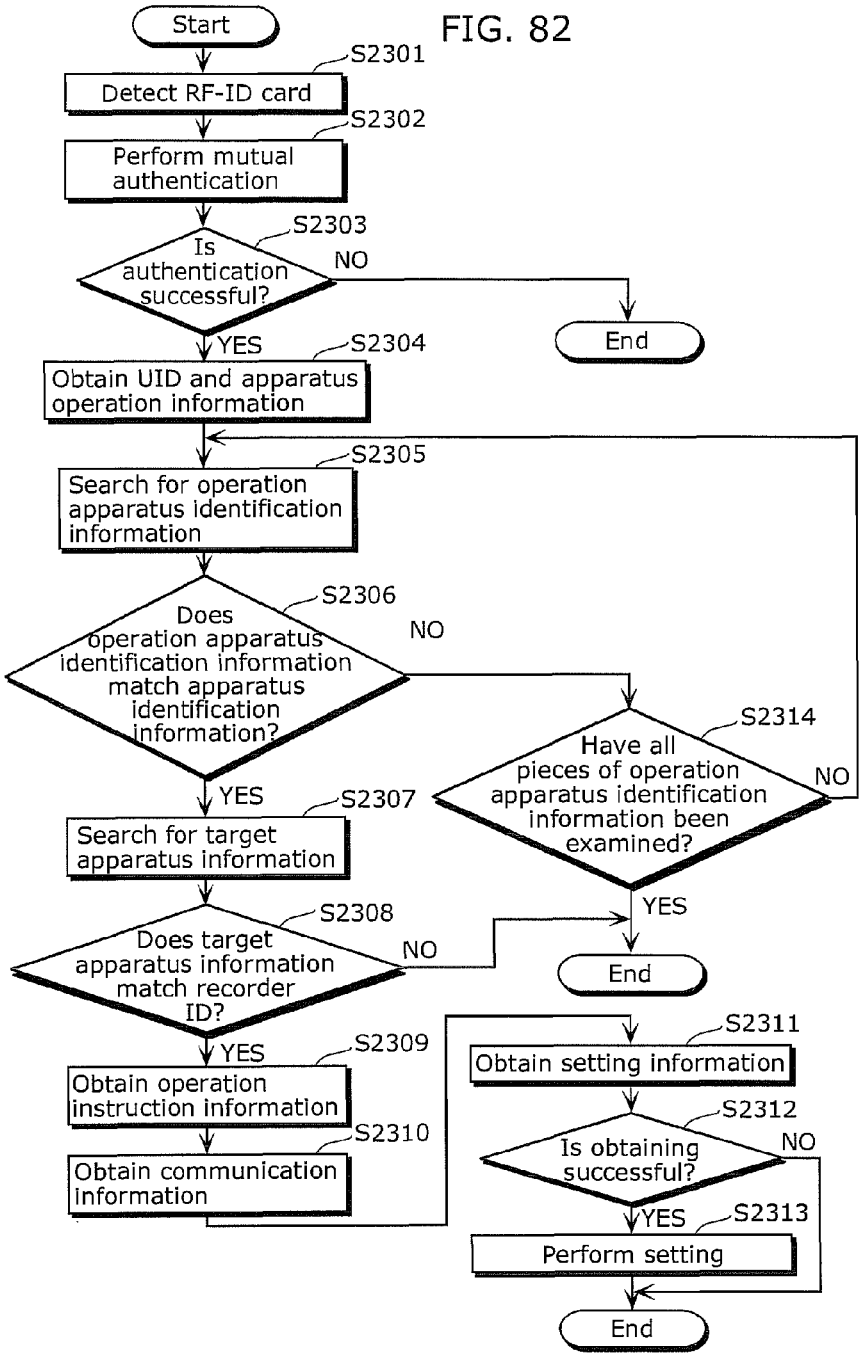
FIG. 82 is a flowchart of steps of updating setting information of a recorder by the RF-ID card.

Next, the description is given for processing of changing the setting of the recorder 2000 by using the RF-ID card 2100 with reference to FIG. 82. FIG. 82 is a flowchart of processing by which the setting information processing unit 2011 in the recorder 2000 updates the setting information 2013 by using the RF-ID card 2100.

First, at Step 2301, the recorder 2000 detects the RF-ID card 2100. After that, at Step 2302, the recorder 2000 performs mutual authentication with the RF-ID card 2100.

At Step 2303, the recorder 2000 determines whether or not the mutual authentication is successful. If the mutual authentication is successful, then the processing proceeds to Step 2304. Otherwise, the setting update processing is terminated.

At Step 2304, the recorder 2000 obtains the UID 75 and the apparatus operation information 2103 from the memory 2101 of the RF-ID card 2100.

At Step 2305, the recorder 2000 searches the apparatus operation information 2103 for the operation apparatus identification information 2104. At Step 2306, the recorder 2000 compares the searched-out operation apparatus identification information 2104 to apparatus identification information (not shown) in the memory 2005 of the recorder 2000.

If it is determined at Step 2306 that the operation device identification information 2104 matches the device identification information, then the processing proceeds to Step 2307. Otherwise, the processing proceeds to Step 2314.

At Step 2314, the recorder 2000 determines whether or not all pieces of the operation apparatus identification information 2104 in the apparatus operation information 2103 have been examined. If all pieces of the operation apparatus identification information 2104 have been examined, then the setting update processing is terminated.

At Step 2307, the recorder 2000 searches the device operation information 2103 for the target apparatus information 2105. At Step 2308, the recorder 2000 compares the searched-out target apparatus information 2105 to the recorder ID 2012 in the memory 2005 of the recorder 2000.

If it is determined at Step 2308 that the target device information 2105 matches the recorder ID 2012, then the processing proceeds to Step 2309. Otherwise, the setting update processing is terminated.

At Step 2309, the recorder 2000 obtains the operation instruction information 2106 associated with the target device information 2105 from the apparatus operation information 2103.

At Step 2310, the recorder 2000 obtains the operation instruction information 2107 associated with the target apparatus information 2105 from the apparatus operation information 2103.

At Step 2311, the recorder 2000 determines, based on the instruction detail information 2260 in the operation instruction information 2106 in the device operation information 2103, that an operation to be performed is updating of setting, and thereby accesses the server 42 to obtain the setting information 2250 from the server 42. The step will be described in more detail with reference to FIG. 83.

At Step 2312, the recorder 2000 determines whether or not the obtainment of the setting information 2250 is successful. If the obtainment of the setting information 2250 is successful, then the processing proceeds to Step 2313. At Step 2313, the setting information processing unit 2011 in the recorder 2000 updates the setting information 2013 in the memory 2005 of the recorder 2000 by the setting information 2250. On the other hand, if the obtainment of the setting information 2250 fails, then the setting update processing is terminated.

Figure 83:
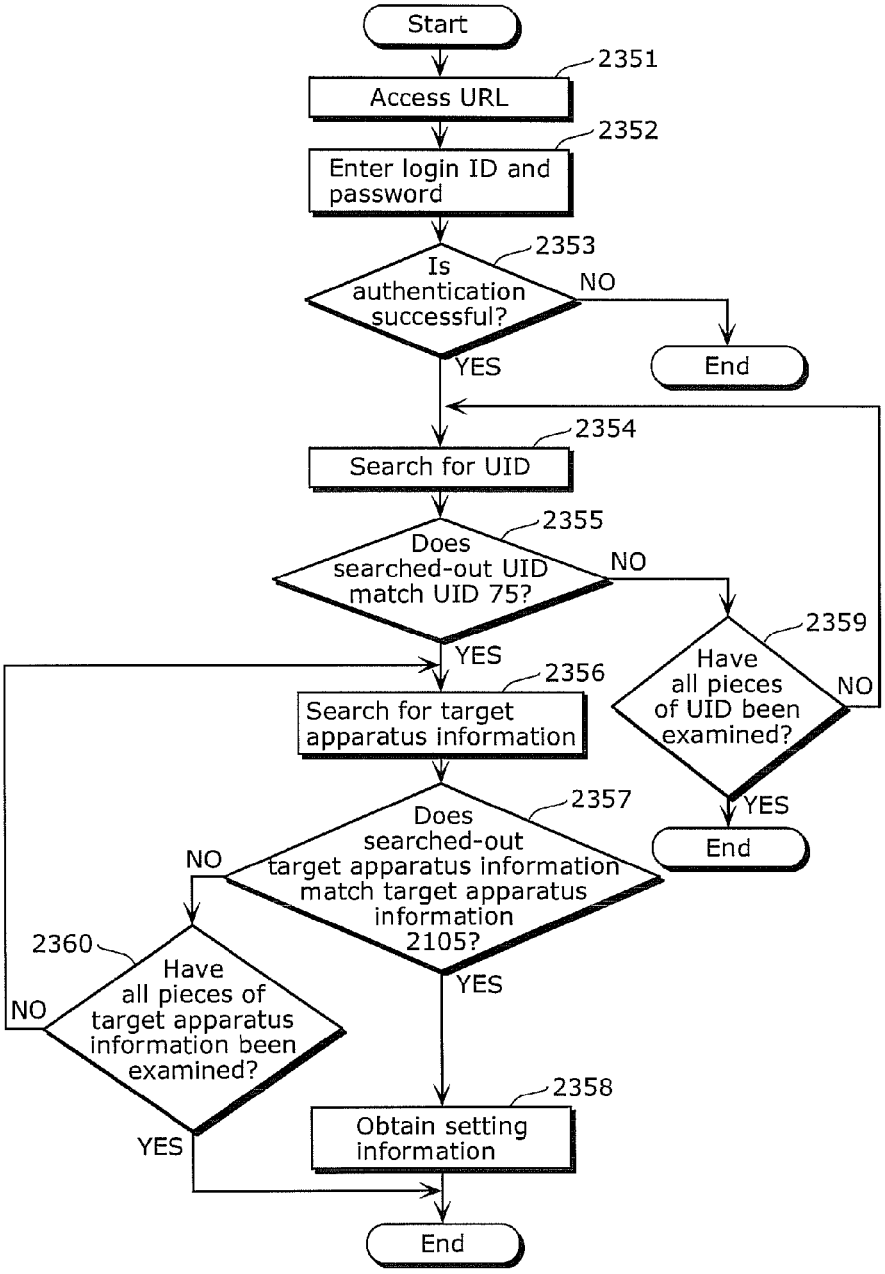
FIG. 83 is a flowchart of steps of obtaining the setting information from the server.

The following describes Step 2311 in FIG. 82 in more detail with reference to FIG. 83. FIG. 82 is a flowchart of processing by which the setting information processing unit 2011 in the recorder 2000 accesses the server 42 to obtain the setting information 2250 from the server 42.

At Step 2351, the communication unit 2007 in the recorder 2000 accesses the server 42 having the URL 2112 included in the communication information 2107.

At Step 2352, the setting information processing unit 2011 provides the communication unit 2007 with the login ID 2113 and the password 2114 which are included in the communication information 2107, and thereby the communication unit 2007 logins to the server 42.

At Step 2353, it is determined whether or not authentication (namely, the login) is successful. If the authentication is successful, then the processing proceeds to Step 2354. Otherwise, the processing is terminated as being failure of obtaining the setting information 2250.

At Step 2354, the recorder 2000 searches the server 42 for UID. At Step 2355, the recorder 2000 determines whether or not the searched-out UID matches the UID 75 obtained at Step 2304 in FIG. 82. If the searched-out UID matches the UID 75, then the processing proceeds to Step 2356. Otherwise, the processing returns to Step 2354 to repeat the search for UID until it is determined at Step 2359 that all pieces of UID in the server 42 have been examined. If it is determined at Step 2359 that all pieces of UID in the server 42 have been examined, then the processing is terminated as being failure of obtaining the setting information 2250.

At Step 2356, the recorder 2000 searches the server 42 for the target apparatus information associated with the UID 75. At Step 2357, the recorder 2000 determines whether or not the searched-out target apparatus information matches the target apparatus information 2105 obtained at Step 2305 in FIG. 82. If the searched-out target apparatus information matches the target apparatus information 2105, then the processing proceeds to Step 2358. On the other hand, if the searched-out target apparatus information does not match the target apparatus information 2105, then the processing proceeds to Step 2358, then the processing returns to Step 2354 to repeat the search for the target apparatus information until it is determined at Step 2360 that all pieces of the target apparatus information in the server 42 have been examined. If it is determined at Step 2360 that all pieces of the target apparatus information have been examined, then the processing is terminated as being failure of obtaining the setting information 2250.

At Step 2258, the recorder 2000 obtains, from the server 42, the setting information 2250 associated with the UID 75 and the target apparatus information 2105.

As described above, the use of the RF-ID card 2100 enables the user to perform setting of the recorder 2000 without complicated operations. Even if the user is not familiar with operations of apparatuses (devices) the user can easily change the setting of the recorder 2000 by using the RF-ID card 2100. Moreover, the operation executable for the recorder 2000 by using the RF-ID card 2100 is not limited to the setting change. For example, the instruction detail information can designate an operation of obtaining a list of recorded contents in the recorder. In this case, the list is registered in the RF-ID card or the server. Thereby, the user can check the list on a different apparatus (device) other than the recorder by using the RF-ID card.

In addition, the RF-ID card holding information illustrated in the FIG. 84 allows the user to perform timer recording in the recorder simply by presenting the RF-ID card to the recorder. In more detail, if the change target information associated with Index 1 in FIG. 84 is applied, the recorder can perform timer recording according to setting of "TV program ID" and "recording mode" designated in the instruction target information, simply by presenting the RF-ID card to the recorder. Thereby, the timer recording can be performed without accessing the server. In addition, if the change target information associated with Index 2 in FIG. 84 is applied, the recorder can perform timer recording according to "TV program code" designated in the instruction target information, simply by presenting the RF-ID card to the recorder. Here, the recorder can obtain, from the server, (a) program ID or a start time and end time, and (b) channel information. As a result, the time recording can be performed according to the setting of the "recording mode".

Furthermore, it is also possible that "recommended TV program" is designated in the instruction target information in the RF-ID card. After presenting the RF-ID card to the recorder, the recorder obtains ID of the recommended TV program from the server. Thereby, the recorder can obtain a content of the recommended TV program from the server and performs timer recording of the content. The above functions may be used as service for providing the RF-ID card as being a supplement of a TV program guide magazine, for example. This RF-ID card can reduce user's bothersome procedures for timer recording. For another service, it is also possible in the RF-ID card that the instruction detail information designates a download operation, the instruction target information designates video or software in a version where a function is restricted, and the communication information designates a URL of a download website. Such RF-ID cards are provided for free to users. The users can use the video or software as trial, and purchase it if the user likes it.

It should be noted that the description in the seventh embodiment has been given for the recorder, but the present invention is not limited to the recorder.

For example, the seventh embodiment of the present invention may be implemented as a TV having a reader/writer for the RF-ID card and the setting information processing unit. The TV can register, as the change target information, (a) setting of an initial display channel or initial sound volume immediately after power-on, (b) setting of child lock for excluding adult broadcasts and violence scenes, (c) setting of zapping for favorite channels, (d) setting of contrast and brightness of a screen, (e) setting of a language, (f) setting of a continuous use time, and the like, simply by presenting the RF-ID card to the TV. Thereby, the TV can perform settings according to usability. Furthermore, the seventh embodiment may be implemented also as a vehicle navigation system having a reader/writer for the RF-ID card and the setting information processing unit. In this aspect, the instruction detail information designates "highlighted display" and the instruction target information designates "landmark information". Thereby, by using the RF-ID card, the vehicle navigation system can display the designated landmark as being highlighted, by changing a character font, character size, or color. The landmark information may be obtained from a server. In this case, the RF-ID cards, on which the apparatus operation information illustrated in FIG. 85 is recorded, are offered to users at rest areas or interchanges on expressways, sightseeing spots, and the like. Thereby, the RF-ID cards allow vehicle navigation systems of the users to display a recommended landmark, where an even is currently held for example, as highlighted display. In addition, the seventh embodiment may be implemented as a laptop having a reader/writer for the RF-ID card and the setting information processing unit. The laptop can designate (a) setting of a resolution of a screen, (b) setting of a position of an icon or the like on a display, (c) setting of a wallpaper, (d) setting of a screen saver, (e) setting of start-up of resident software, (f) setting of employed peripheral devices, (g) setting of a dominant hand for a mouse or the like, and the like, by simply by presenting the RF-ID card to the laptop. Therefore, if the user brings the RF-ID card in a business trip, the user can operate a different personal computer at the business trip location, with the same settings as those the user usually uses. The seventh embodiment may be implemented further as a game machine having a reader/writer for the RF-ID card and the setting information processing unit. The user visiting a friend's house uses a RF-ID card in which the instruction detail information designates setting change. By presenting the RF-ID card to the game machine at the friend's house, the user can change (a) setting of positions of keys on a remote controller and (b) setting of a structure of a menu screen. In addition, the user can save data in the game machine by using the RF-ID card. Moreover, the following service using the RF-ID card is also possible. The RF-ID card holds the instruction detail information designating a download operation. Such RF-ID cards are offered to users as supplements of magazines or the like. The users can use the RF-ID cards to download an additional scenario, a rare item, or the like.

The RF-ID card according to the seventh embodiment of the present invention can be also applied to home appliances connected to one another via a network. In this aspect, the RF-ID card previously holds (a) setting of a temperature of an air conditioner, (b) setting for a temperature of hot water in a bus tab, and the like, depending of the user's preference. Thereby, the user presents the RF-ID card to RF-ID reader/writers in the user's house so as to manage settings of the home appliances at once. In addition, the RF-ID card may designate an operation for checking foods stored in a refrigerator. Here, information of the foods which is registered in the refrigerator is obtained by using RF-ID tags previously attached to the foods. Or, video of the inside of the refrigerator is captured by using camcorder. Thereby, the user can check a list of the foods on a TV by using a RF-ID reader/writer to obtain information from the RF-ID card. As described above, the RF-ID card according to the seventh embodiment of the present invention can be applied for various usages. It is also possible to combine (a) RF-ID cards for designating apparatuses (such as four different cards indicating "heating appliance", "cooling appliance", "stove", and "fan", respectively) and (b) RF-ID cards for designating setting of the apparatuses (such as three different cards indicating "weak", "medium", and "strong", respectively). It is further possible that such RF-ID cards having the apparatus-designating and setting-designating functions are integrated into a single RF-ID card. And, the settings of the apparatuses can be customized.

Although only some exemplary embodiments of the present invention have been described in detail above, those skilled in the art will be readily appreciate that many modifications are possible in the exemplary embodiments without materially departing from the novel teachings and advantages of the present invention. Accordingly, all such modifications are intended to be included within the scope of the present invention.

For example, if two users (hereinafter, referred to as a user A and a user B) exchanges photographs between them, the user B can view photographs taken by the user A by the following method. The user B has a TV having an apparatus ID and a relay server having a URL. The apparatus ID and the URL are previously stored in a RF-ID (hereinafter, referred to as a RF tag B). The user B generates information (hereinafter, referred to as device generation information B) from the information in the RF tag B and stores the generated device generation information B into the RF tag B. The user B transmits the device generation information B to the user A via e-mail or the like. The user A stores a URL of a server holding the photographs into the relay server, in association with the received device generation information B. Thereby, the user B simply presents the RF tab B to a RF-ID reader/writer of the TV in order to view the photographs taken by the user A. Here, it is assumed that the RF tag B previously holds an e-mail address of the user A. When the user B simply presents the RF tag B to the RF-ID reader/writer of the TV, the device generation information B may be automatically written into the TV and a notification of the device generation information B may be automatically transmitted to the e-mail address of the user A. Thereby, even if the user B is not familiar with operations of the devices, the user B can exchange photographs with the user A. Furthermore, it is also possible that the user A encrypts at least one of a URL, login ID, and a password by using the device generation information B and sends, to the user B, a post card with RF-ID on which the encrypted information is recorded. This makes it possible to restrict an apparatus permitted to display the photographs, only to the TV of the user B. It is further possible that the user A sends, to the user B, a post card with two RF-IDs that are a RF-ID for sending and a RF-ID for returning. In this aspect, the user A records, onto the RF-ID for returning, device generation information A that is previously generated by a TV or the like of the user A. This can restrict an apparatus permitted to display photographs stored by the user B. More specifically, when the user B receives the post card with the two RF-IDs and returns the post card to the user A, the user B encrypts, by using the device generation information A, a URL, a login ID, or a password of a server storing the photographs of the user B, and then records the encrypted data onto the RF-ID for returning. Or, when the user B stores the photographs, the user B associates the photographs with the device generation information A. Therefore, an apparatus permitted to display photographs stored by the user B can be restricted.

Moreover, the mailing object UID of the RF-ID on the mailing object may be a combination of (a) a group ID that is common among a plurality of mailing objects and (b) a UID unique that is unique to each mailing object. Thereby, image data in the server is associated not with every mailing object UID but with the group ID. Therefore, when post cards with RF-ID on which the image data is associated with a plurality of targets are mailed, it is possible to eliminate user's bothersome procedures for performing registration for each of the UIDs. It is also possible that the image data stored in the server in association with the group ID is switched to be permitted or inhibited to be viewed for each of the UID. Thereby, if, for example, a printer prints destination addresses on the mailing objects, the printer having a RF-ID reader/writer reads the UIDs on the mailing objects and thereby associates the UIDs with addresses in an address list, respectively. Thereby, the address list can be used to manage the permission/inhibition of viewing the images stored in the server.

It is also possible that a post card or card is provided with a plurality of RF-ID tags having various different functions. In this aspect, the single post card or card can switch the functions by disconnecting communication of a part of the RF-ID tags which are not currently used. For example, a post card has (a) an upper portion on which a RF-ID tag having a function of displaying a slide show of photographs is attached and (b) a lower portion on which a RF-ID tag having a function of reproducing video. A user can switch the display function or the reproduction function, by selecting the upper portion or the lower portion to be brought into proximity of a RF-ID reader/writer. The RF-ID tags having different functions can be provided to a front side and a back side of the post card. It is also possible that covers made of a material blocking communications are applied on the RF-ID tags so that the user can select a RF-ID tag to be used by opening the cover on it.

It is further possible that photographs are stored in a plurality of servers, and a RF-ID tag holds URLs of the servers. Thereby, a user can access the servers to obtain the photographs to display them in a list.

Moreover, the RF-ID reader/writer may be provided not only to an apparatus (device) such as the TV or the recorder but also to the input means such as a remote controller for operating the apparatus. For instance, if a plurality of apparatuses are connected to one another via a network, an input means for collectively operating the apparatuses may be provided with a RF-ID reader/writer to operate the respective apparatuses. Furthermore, an input means such as a remote controller may be provided with an individual authentication means for biometric authentication such as fingerprint authentication or face authentication, password, or the like. In this aspect, the input means having a RF-ID reader/writer exchanges data with a RF-ID tag, only when the individual authentication is successful. It is also possible that the individual authentication information is previously stored in the RF-ID tag, and individual authentication is performed by the apparatus or the remote controller using the RF-ID tag.

It should be noted that the definition of the term "RF-ID" frequently used in the description of the present invention is not limited to narrow meaning. In general, the term "RF-ID" narrowly refers to a "tag having a nonvolatile memory on which identification information is recorded". RF-ID having a dual interface function or a security function seems commonly called as a "IC card" or the like. However, in the embodiments of the present invention, the "RF-ID" widely refers to an "electronic circuit which has a nonvolatile memory on which individual identification information is recorded and which can transmit the individual identification information to the outside via an antenna".

Conventionally, if a user who is not familiar with operations of an apparatus (device) wishes to perform complicated settings for the apparatus, it is necessary that a seller, repairer, or serviceperson of the apparatus visits a location of the apparatus to perform the settings or controls the apparatus remotely. Even in remotely controlling the apparatus, the seller, repairer, or serviceperson has to visit the location for setting of the remote control. In the seventh embodiment of the present invention, however, the RF-ID card 2100 enables the user to perform the settings of the apparatus (the recorder 2000) without complicated operations. Therefore, even the user not familiar with operations of the recorder can easily change the settings of the recorder.

The present invention can be implemented also as an image presentation method of presenting image related to a communication device on an apparatus (device) having a display screen, in a communication system having (a) the apparatus having the display screen, (b) a reader device connected to the apparatus via a communication path, and (c) the communication device performing proximity wireless communication with the reader device. The present invention can be implemented further as a program stored in the communication device with identification information of the communication device, the program being described by codes executed by a virtual machine included in a device performing proximity wireless communication with the communication device, and being for executing: accessing a server connected via a communication network; downloading, form the server, image associated with the identification information from among image stored in the accessed server; and displaying the downloaded image. In addition, the present invention can be implemented as a computer-readable recording medium such as a CD-ROM on which the above program is recorded.

The communication device according to the present invention may be used, of course, as various devices having a RF-ID unit in which identification information and a virtual machine program are stored. For example, the communication device may be electronic devices such as a camera, home appliances such as a rice cooker and a refrigerator, and daily commodities such as a toothbrush.

Here, an embodiment in which a RF-ID reader is provided to a remote controller of a TV or the like is described with reference to diagrams (a) and (b) in FIG. 86, a flowchart (c) in FIG. 86, and a flowchart of FIG. 87.

First, as described earlier, a child device (or child communicator) 5050 such as a camera has the memory (second memory) 52 and the antenna (second antenna) 21. When an antenna 5063 of a remote controller 5051 is moved into proximity of the antenna 21, the antenna 5063 supplies power to the antenna 21. Thereby, data in the memory 52 is transmitted from the antenna 21 to the antenna 5063. The remote controller 5051 converts the received data into digital data by a communication circuit 5064, and then stores the digital data into a memory 5061 (Step 5001a in FIG. 87). Then, a transmission unit of the remote controller 5051 is faced to the TV 45 and a transmission switch 6065 on the remote controller 5051 is pressed (Step 5001b). Thereby, the data in the memory 5061 is transmitted as light to a light receiving unit 5058 of the parent device (apparatus) 45 (the TV 45) via a light emitting unit 5062 (Step 5001c). The communication may be not light but wireless.

Figure 86:
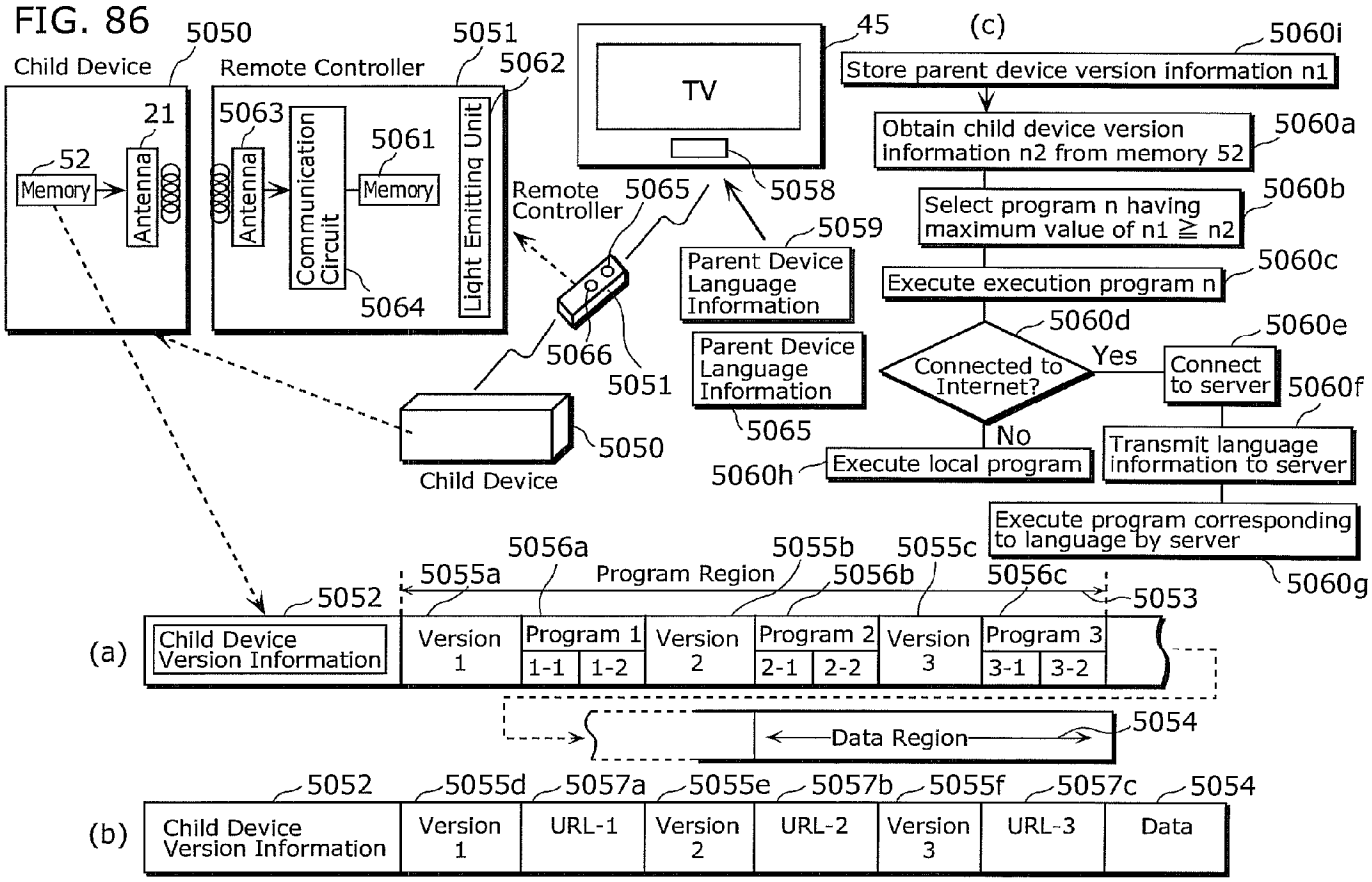
FIG. 86 is a block diagram of a configuration where a remote controller of a TV or the like has a RF-ID reader, according to the seventh embodiment of the present invention.

Referring back to a flowchart (c) in FIG. 86, the embodiment of the present invention used in social systems should be applicable even in twenty or thirty years. An example of the program described in a virtual machine language or the like is known Java™. However, such programs are expected to be extended or replaced by totally different programs described in more efficient languages. In order to address the above situation, in the embodiment of the present invention, the parent device 45 such as the TV holds parent device version information 5059 (or parent device version information $n_1$) that indicates a language type or version of a virtual machine language or the like (Step 5060i in (c) of FIG. 86). In the beginning of the memory 52 of the child device 5050, child device version information 5052 (or child device version information $n_2$) indicating a version of a program language or the like for the child device is recorded ((a) in FIG. 86). Following to the child device version information 5052, a program region 5053 is recorded in the memory 52. The program region 5053 stores a program 5056a in a version 5055a, a program 5056b in a version 5055b, and a program 5056c in a version 5055c. Following to the program region 5053, a data region 5054 is recorded in the memory 52.

At Step 5060i in the flowchart of FIG. 86, the parent device 45 stores the parent device version information $n_1$ of the parent device 45 is stored. Then, the parent device 45 obtains the child device version information $n_2$ from the memory of the child device (Step 5060a). Then, the parent device 45 selects an execution program n having a maximum value of $n_1 \geq n_2$ (Step 5060b). The parent device 45 executes the selected execution program (Step 5060c). Then, it is determined whether or not the parent device 45 is connected to the Internet (Step 5060d). If the parent device 45 is connected to the Internet, then the parent device 45 is connected to the server via the Internet (Step 5060e). The parent device 45 thereby transmits language information 5065, which is set in the parent device 45, to the server (Step 5060f). The server provides the parent device 45 with a program in the language indicated in the transmitted language information 5065, for example in French, and causes the parent device 45 to execute the program. Alternatively, the server may execute the program on the server itself.

On the other hand, if it is determined at Step 5060d that the parent device 45 is not connected to the Internet, then the processing proceeds to Step 5060h. At Step 5060h, the parent device 45 executes a local program in order to display, on a screen of the parent device 45, attribute information of the child device 5050. The attribute information is, for example, information for notifying a trouble or information regarding the number of stored photographs. As described above, the memory 52 in the child device 5050 holds the child device version information 5052. The memory 52 stores a program, procedure, URL, or the like of each generation. The program, procedure, URL, or the like will be developed every 10 years. Such data format on which information is recorded for each generation can be kept being used even in twenty or thirty years in order to operate the parent device 45. (a) of FIG. 86 illustrates an example of information on which versions or generations of a program are recorded. However, the same advantages are also offered in another example illustrated in (b) of FIG. 86. In (b) of FIG. 86, addresses of data stored in the server are recorded in associated with respective different versions. In this example, a URL 5057a in a version 5055d, a URL 5057b in a version 5055e, and a URL 5057c in a version 5055f are recorded. The above can achieve backward compatibility for many years. For example, it is assumed that a user purchases a product (the parent device 45) in version 1 this year and the product has RF-ID. Under the assumption, it is expected that, in twenty or thirty years, programs described in virtual machine languages or the like such as Java™, which are compliant to versions 1, 2, and 3, will be installed into the parent device 45. In the situation, the child device 5050 can provide the parent device 45 with the child device version information 5052. Based on the child device version information 5052, the parent device 45 can select a program to be compliant to an appropriate version. It is also expected that, in thirty years, the child device will hold information of programs in all versions 1, 2, and 3. Therefore, a different parent device 45 in version 3 employs the best function of a version among them. On the other hand, the former parent device 45 in version 1 employs a rather limited function of a version older than the version employed by the parent device 45 in version 3. As a result, perfect compatibility can be achieved.

Figure 87:
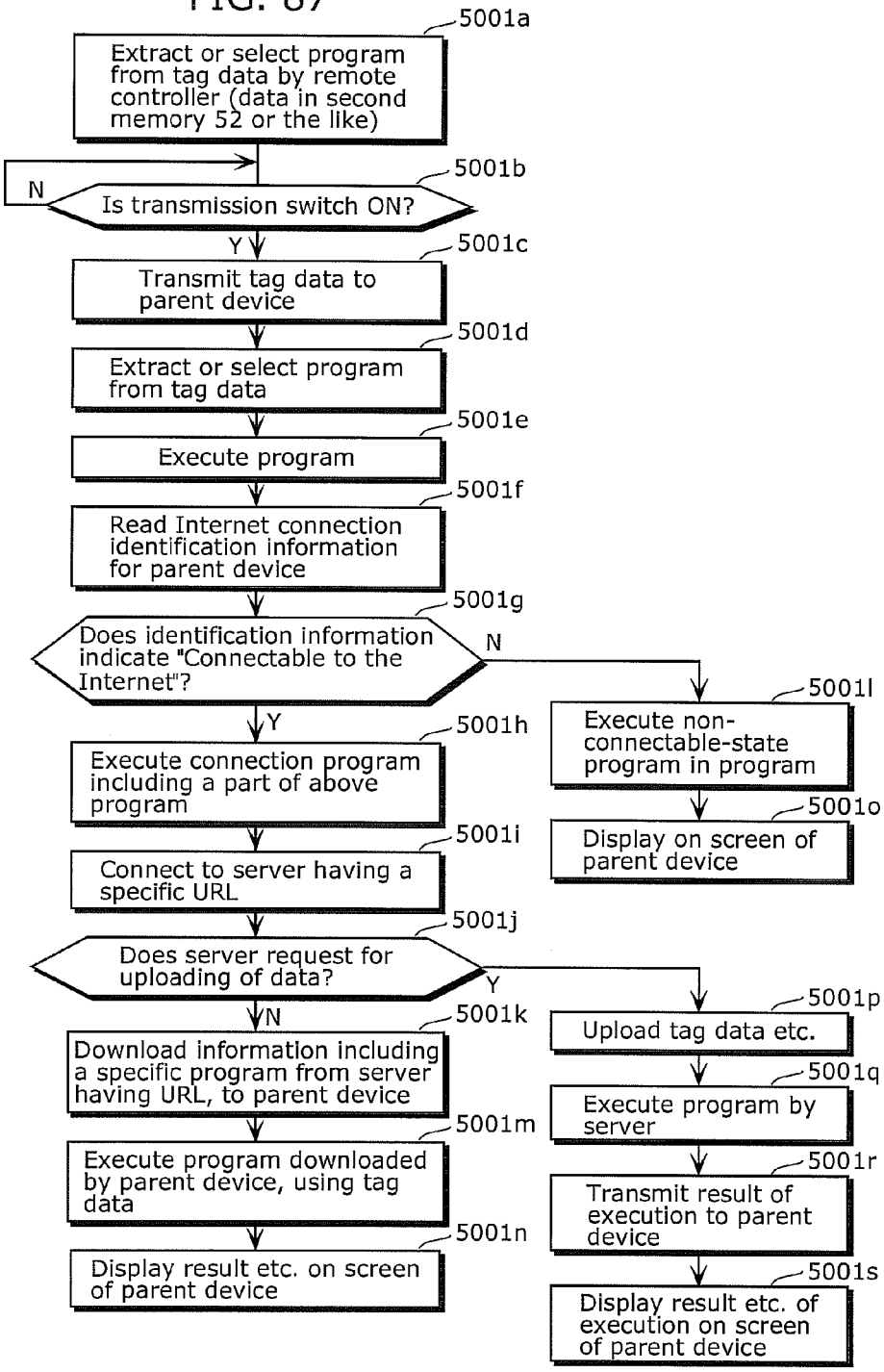
FIG. 87 is a flowchart of processing performed by the above configuration according to the seventh embodiment of the present invention.

The flowchart of FIG. 87 is explained below. At Step 5001a, pressing a read switch 6066 on the remote controller 5051, a user brings the remote controller 5051 into proximity of the antenna 21 of the child device 5050. Thereby, data in the memory 52 of the child device 5050 is transmitted to the memory 5061 of the remote controller 5051. Next, at Step 5001b, facing the remote controller 5051 to the parent device 45 such as a TV, the user presses a transmission switch 6065 (Step 5001b). Thereby, the data in the memory 5061 is transmitted as light to the parent device 45 (Step 5001c). In the embodiment of the present invention, the data is referred to as "tag data" for convenience. The parent device 45 extracts or selects an execution program from the tag data (Step 5001d). The parent device 45 executes the extracted or selected execution program by a virtual machine language set in the parent device 45 (Step 5001e). The parent device 45 reads Internet connection identification information for the parent device 45 (Step 5001f). At Step 5001g, it is determined whether or not the identification information does not indicate "Connectable to the Internet" (in other words, it is determined based on the identification information whether or not the parent device 45 is connectable to the Internet. If the identification information does not indicate "Connectable to the Internet" until Step 5001g, then the parent device 45 executes a non-connectable-state program in the execution program (Step 5001t). The non-connectable-state program is to be executed when the parent device 45 is not connectable to the Internet. Then, the parent device 45 displays a result of the execution on its screen (Step 5001u). In the embodiment of the present invention, the memory 52 stores not only the information regarding connection to the Internet, but also the non-connectable-state program to be executed when the parent device 45 is not connectable to the Internet. Therefore, the parent device 45 can display a result of a minimum required operation when the parent device 45 is not connectable to the Internet.

On the other hand, if it is determined at Step 5001g that the identification information indicates "Connectable to the Internet", then the parent device 45 executes a connection program (Step 5001h). The connection program includes a part of the above execution program.

The connection program may be generated by adding, into the execution program in the tag data, data such as a URL of the server, user ID, and a password. More specifically, the added such as a URL of the server, user ID, and a password are added in the data region 5054 illustrated in (a) of FIG. 86. Such connection program can extend the execution program in the tag data, and also reduce a capacity of the nonvolatile memory in the memory 52. In this case, it is also possible that the connection program in the memory 52 is recorded onto a memory such as a non-rewritable ROM in the program region 5053, while the URL of the server and the like are recorded onto the data region 5054 that is rewritable. As a result, a tip area and a cost can be reduced.

At Step 5001i, the parent device 45 connects to a server having a specific URL. At Step 5001j, it is determined whether or not the server requests the parent device 45 to upload data to the server. If the server requests for uploading of data, then at Step 5001p, the parent device 45 uploads data and/or a program to the server. The server executes a program using the data (Step 5001q). The server provides a result of the execution to the parent device 45 (Step 5001r). The parent device 45 displays the result and the like of the execution on its screen (Step 5001s).

On the other hand, if it is determined at Step 5001j that the server does not request for uploading of data, then, the parent device 45 downloads information including a specific program from the server having the URL (Step 5001k). The parent device 45 executes the downloaded program (Step 5001m). Then, the parent device 45 displays the result of the execution on its screen (S5001n).

The memory in the RF-ID unit or the child device has a limited capacity due to restriction on power consumption, a volume, or a cost. Therefore, a common program cannot be stored in the memory. However, the use of the connection program and the server as described in the embodiment of the present invention allows an infinitely large program to be executed.

A huge program may be executed on the server. Or, such a program may be downloaded from the server to be executed. These aspects are in the scope of the present invention.

The embodiment described with reference to FIG. 86 has been described to use a remote controller of a TV. In this example, the remote controller has a battery, buttons for switching TV channels, an antenna for reading RF-ID, a communication circuit, and an infrared light emitting unit. The remote controller can be replaced by a mobile phone to produce the same effects as described above. Since mobile phones generally have an infrared light emitting unit, they are easily used instead of remote controllers. In addition, mobile phones have a communication line. Therefore, mobile phones can offer the same capability of that of remote controller, being directly connected to the server. However, a communication cost of a mobile phone is burden of a user. A display screen of a mobile phone is significantly smaller than that of a TV. Therefore, a mobile phone may have the transmission switch 6065 as illustrated in FIG. 86. Thereby, if there is a TV near the mobile phone, the user faces the light emitting unit of the mobile phone to the TV to transmit tag data in the memory 52 of the mobile phone directly to the TV. As a result, the user can view data on a large screen of the TV having a high resolution. The above method does not incur a cost, which is greatly advantageous for the user. The communication using the readout tag data via the mobile phone line is stopped in cooperation with the transmission switch.

In this case, in the same manner as described for as the remote controller with reference to FIG. 86, the mobile phone has at least a reader for RF-ID or a Near Field Communication (NFC) unit. In the future, mobile phones are expected to have a reader function for reading RF-ID or the like. If RF-ID readers are provided to mobile phones, the present invention can be implemented with a much lower additional cost, which is greatly advantageous for the user. Moreover, the present invention can be easily implemented not only as a remote controller or a mobile phone, but also as a Personal Digital Assistance (PDA) terminal, a laptop, or a mobile media player.

Eighth Embodiment

Figure 88:
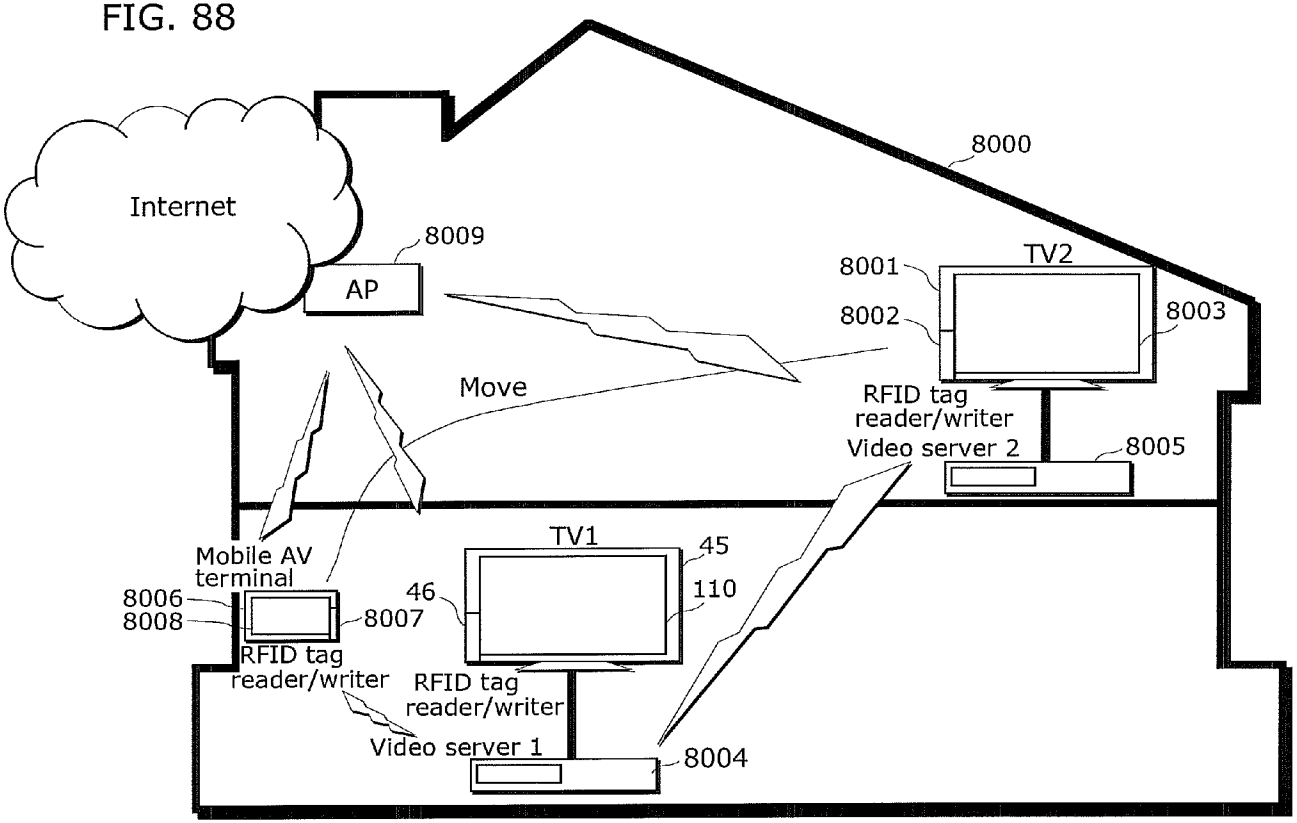
FIG. 88 is a diagram of a network environment.

FIG. 88 illustrates a home network environment assumed in the eighth embodiment. It is assumed that two TVs 45 and 8001 are present in one house, where the TVs 45 and 8001 respectively have RFID tag reader/writers and screen display units 110 and 8003. The TVs 45 and 8001 are respectively connected with video servers 8004 and 8005, enabling video data to be transmitted from the video server to the TV wiredly or wirelessly and displayed by the TV. The video server mentioned here is a storage device such as a NAS unit, or a recording device such as a BD recorder. The TVs 45 and 8001 can also access a video server outside the house via the Internet. It is further assumed that the user of the home network has a mobile AV terminal 8006 that is portable and capable of displaying video. Like the TVs, the mobile AV terminal 8006 has a RFID tag 8007 and a video display unit 8008, and can access a video server wirelessly.

In the eight embodiment, consider a situation where, under the above-mentioned environment, the user who is watching video on the TV 1 (45) wants to watch it on the TV 2 (8001) upstairs. In the case of moving to another place to watch the video, it is desirable that the user can watch the video seamlessly from the point up to which the user has already watched. However, in order to seamlessly move the video while maintaining security, user authentication and timing synchronization are necessary, and the user is required to perform complex operations. This is because a highly versatile apparatus (device) such as a TV or a mobile terminal can be used in various applications, so that the user wishes to operate the apparatus depending on circumstances.

In this embodiment of the present invention, the mobile AV terminal transmits a program according to a status of the mobile AV terminal, and generates a video display destination change command using a status of the TV received as a response. In this way, by an extremely simple operation of causing the mobile AV terminal and the TV touch each other, video passing according to the statuses of both terminals can be achieved, with it being possible to significantly improve user-friendliness. Though the following describes video passing, the same advantageous effects can be attained even in the case of continuously displaying still images by a slide show or the like.

In this embodiment of the present invention, according to the above structure, video passing can be performed by an extremely simple operation of causing the mobile AV terminal and the TV touch each other, thereby significantly improving user-friendliness.

Figure 89:
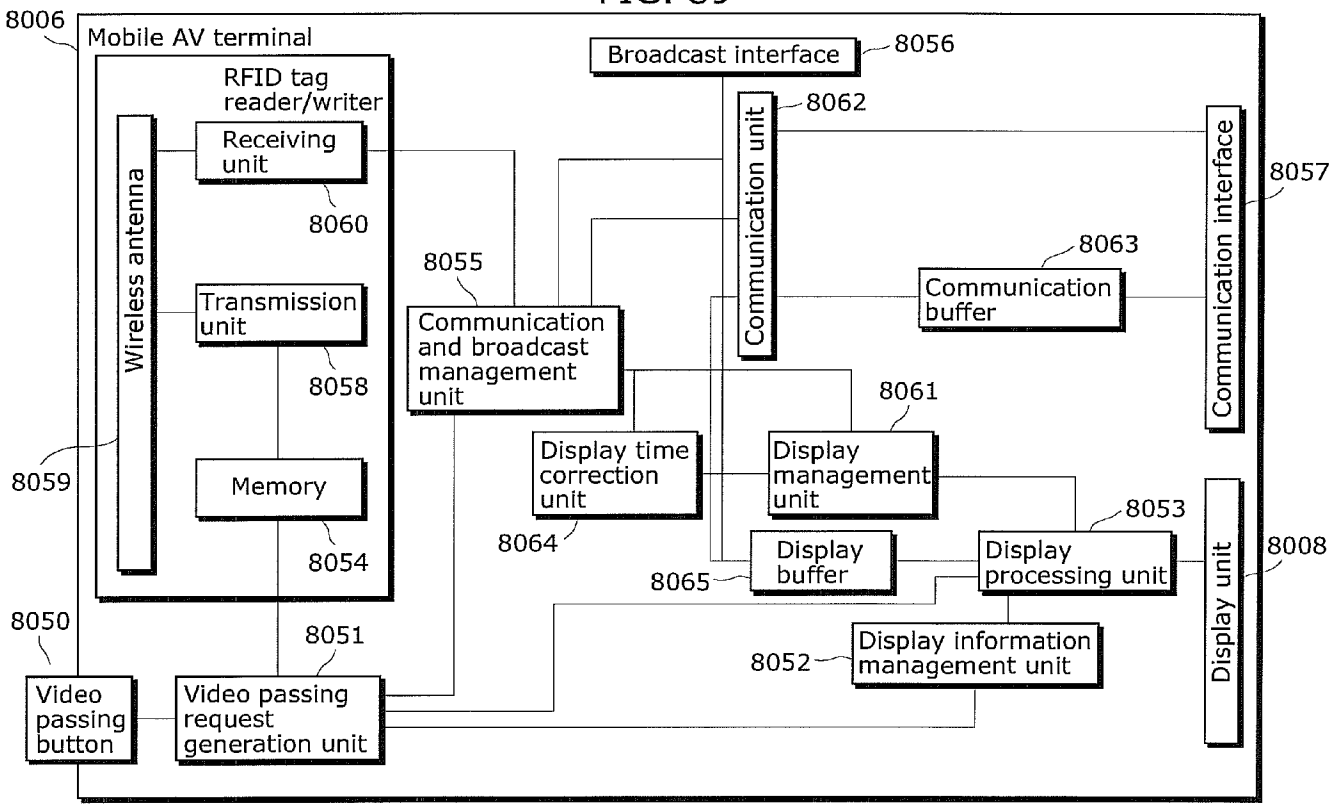
FIG. 89 is a functional block diagram of a mobile AV terminal.

FIG. 89 is a functional block diagram of each function executed by the mobile AV terminal 8006. To perform video passing, the user presses a video passing button 8050. When the video passing button 8050 is pressed, a video passing request generation unit 8051 obtains video information currently displayed by the display unit 8008 from a display information management unit 8052, generates a video passing request, and writes the video passing request in a memory 8054 of the RFID unit. In the case where no video is being displayed, the video passing request generation unit 8051 enters a video get mode, and generates the video passing request including a video get command. In the case where video is being displayed, the video passing request generation unit 8051 enters a video give mode, and generates the video passing request including a video give command and video information. The video information mentioned here includes video display time information managed in the display information management unit 8052 and connection destination information managed in a communication and broadcast management unit 8055. When receiving video via a broadcast interface 8056, the communication and broadcast management unit 8055 manages channel information. When receiving video via a communication interface 8057, the communication and broadcast management unit 8055 manages an identifier of a video server and an identifier of video. The identifier of the video server and the identifier of the video may be any identifiers uniquely identifying the video server and the video, such as an IP address and a URL. Note that the video passing button may be provided separately as a video get button and a video give button. Moreover, selection of whether to get or give video may be displayed on the screen when the video passing button is pressed. When another RFID tag is brought into proximity, information stored in the memory 8054 in the RFID unit is transmitted from a transmission unit 8058 via a wireless antenna 8059. In the case where no transmission is made within a predetermined time after the generation of the video passing command, the video passing mode is cancelled, and the information in the memory is discarded. A receiving unit 8060 in the RFID unit receives a video passing response. The video passing response is a response indicating whether or not the video get command or the video give command is accepted. In the case where the video passing response indicates that the video get command is accepted, the video passing response includes video information. The video passing response is outputted to the communication and broadcast management unit 8055, and the communication and broadcast management unit 8055 performs processing according to the video passing response. In the case where the video passing response indicates that the video get command is accepted, the communication and broadcast management unit 8055 performs video get processing. In the case where the video information included in the video passing response is channel information, the communication and broadcast management unit 8055 notifies the broadcast interface 8056 of the channel information, to receive data of a channel designated by the channel information. The communication and broadcast management unit 8055 also instructs a display management unit 8061 to display the data of the channel. In the case where the channel information designates a channel (a channel of BS, CS, or cable TV) that is not receivable by the broadcast interface 8056 of the mobile AV terminal 8006, the communication and broadcast management unit 8055 requests a communication unit 8062 to search for a terminal that is capable of receiving data of the channel and transferring it to the communication interface 8057. Note that the search for the terminal that serves to transfer the data of the channel may be performed beforehand. Even when the data of the channel is received by the communication interface 8057, the data of the channel is displayed by the display unit 8008 in the same way as in the normal case. In the case where the video information included in the video passing response is connection destination information, the communication and broadcast management unit 8055 notifies the communication unit 8062 of the connection destination information, to transmit a video transmission request to a connection destination. The video transmission request includes a video display time, and data transmission is requested according to this time. Note that, unlike video reception by the broadcast interface 8056, video reception by the communication interface 8057 may take some time. This depends on preprocessing for receiving video data by the communication interface 8057 and a time period during which video data is temporarily stored in a communication buffer 8063. In the method of this embodiment, unnecessary data transmission and a waiting time associated with it may be reduced by predicting such a time beforehand and issuing the video transmission request from the communication unit 8062 on the basis of the predicted time. In this case, a display time correction unit 8064 performs correction so that video can be displayed seamlessly. This is possible because data of digital video is typically stored in a display buffer 8065 and displayed by the display unit 8008 while being processed by a display processing unit 8053. On the other hand, in the case where the video passing response indicates that the video give command is accepted, screen display is cleared. Note that the screen display may be automatically cleared, or whether or not to clear the screen display may be selected by the user. Alternatively, the screen display may be cleared upon receiving a screen display clearing instruction from the terminal to which video is passed. Moreover, a timer may be provided so that the screen display is cleared after a predetermined time has elapsed.

Figure 90:
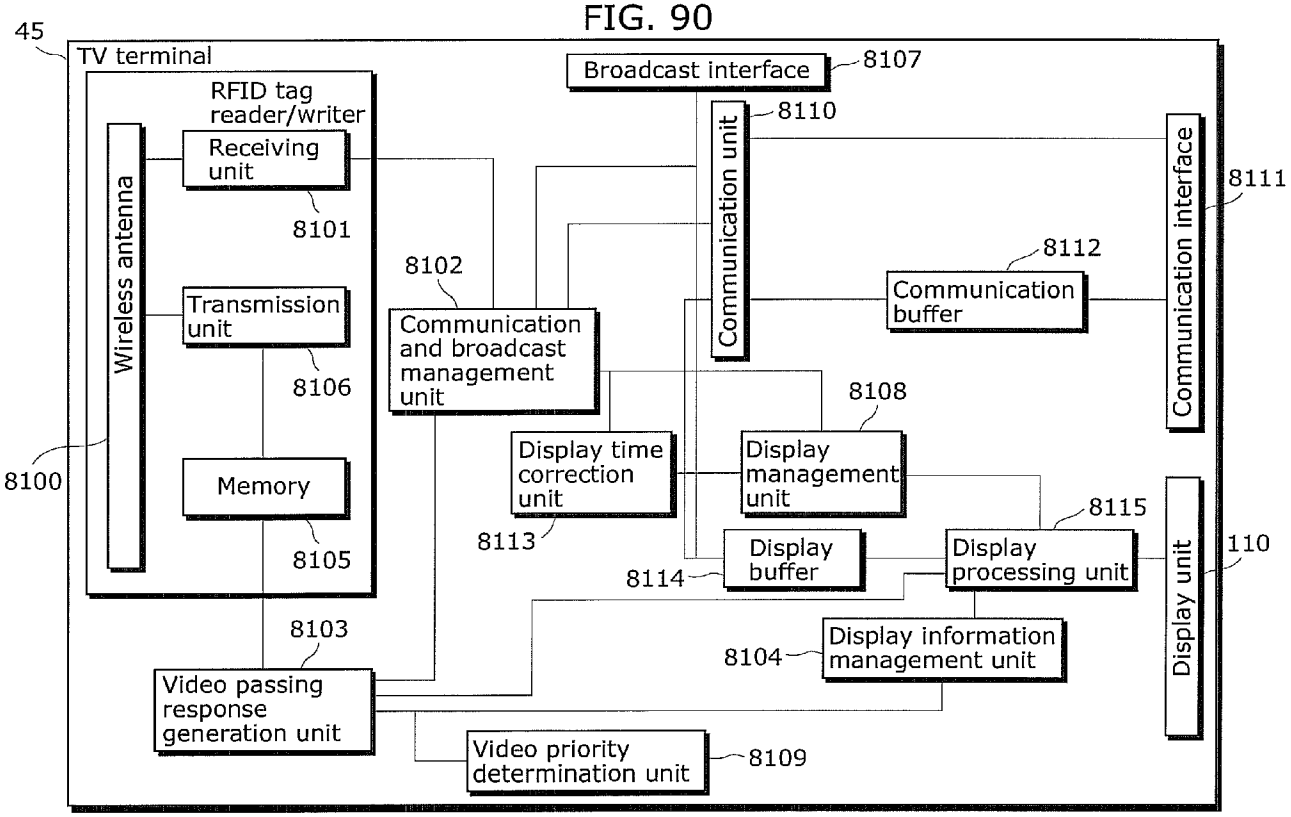
FIG. 90 is a functional block diagram of a TV.

FIG. 90 is a functional block diagram of each function executed by the TV. A receiving unit 8101, upon receiving a video passing request from an antenna 8100 of a RFID tag, outputs the video passing request to a communication and broadcast management unit 8102. In the case where the received video passing request is a video get command, the communication and broadcast management unit 8102 outputs managed connection destination information of displayed video, to a video passing response generation unit 8103. Upon receiving the connection destination information, the video passing response generation unit 8103 obtains display time information from a display information management unit 8104, generates a video passing response, and writes the video passing response in a memory 8105 in the RFID unit. Here, when the video passing response generation unit 8103 cannot obtain desired information, the video passing response generation unit 8103 generates the video passing response indicating that the video passing request is rejected. A transmission unit 8106 transmits the written video passing response to the RFID unit of the mobile AV terminal 8006. Video display termination processing after transmission is the same as in the mobile AV terminal 8006. In the case where the received video passing request is a video give command, on the other hand, the communication and broadcast management unit 8102 performs processing according to information included in the video passing request. In the case where channel information is included in the video passing request, the communication and broadcast management unit 8102 notifies a broadcast interface 8107 of the channel information, to receive data of a desired channel designated by the channel information. The communication and broadcast management unit 8102 then notifies a display management unit 8108 of the data of the channel, thereby changing the display. In the case where the video giving command is received while video is being displayed, determination of which video is to be prioritized may be made by a video priority determination unit 8109, or a selection command may be displayed. In the case where connection destination information is included in the video passing request, the communication and broadcast management unit 8102 notifies a communication unit 8110 of the connection destination information, to transmit a video transmission request. Subsequent processing is the same as in the mobile AV terminal. Moreover, the functions of the other units are the same as those in the mobile AV terminal.

Figure 91:
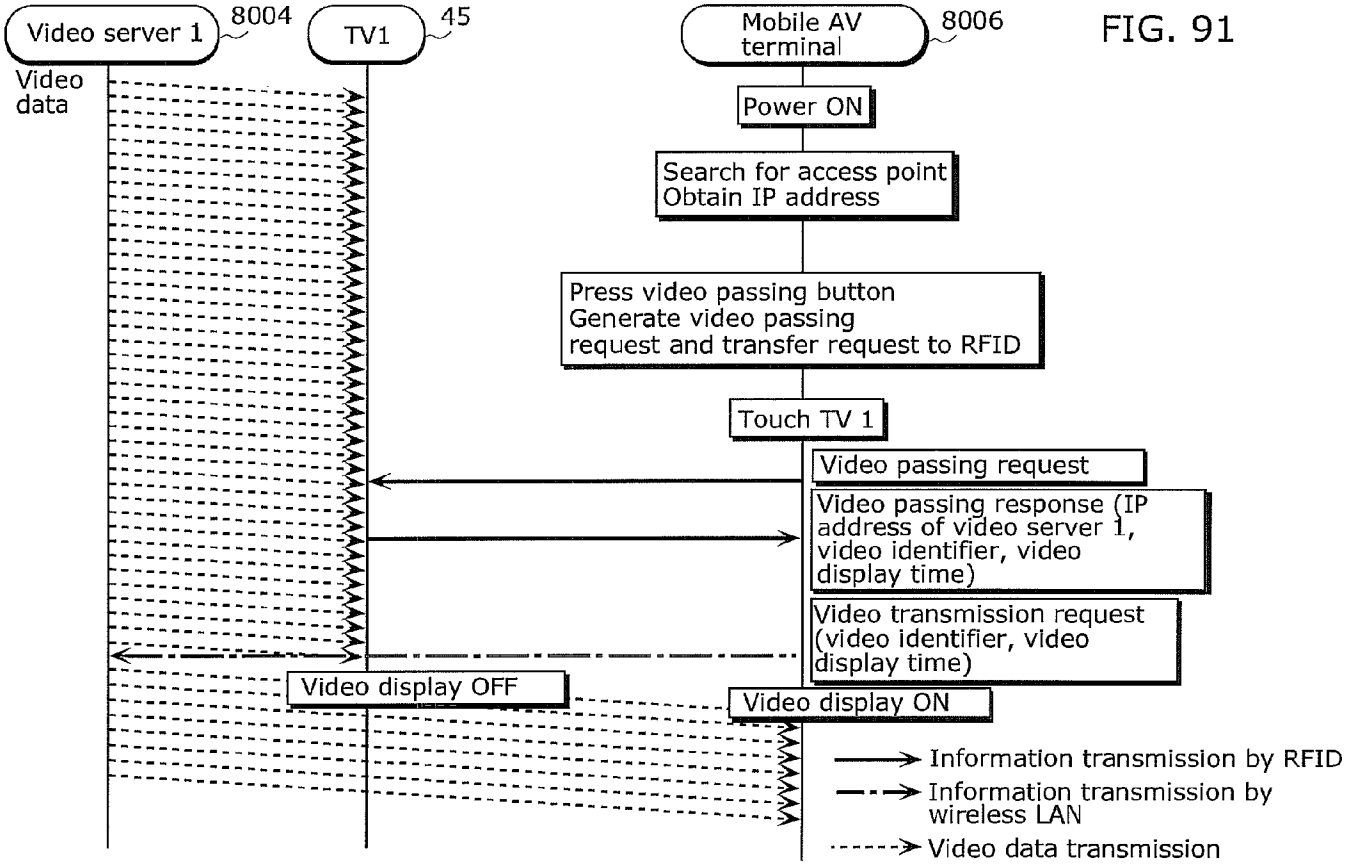
FIG. 91 is a sequence diagram in the case where the mobile AV terminal gets video (first half, control performed by get side).

FIG. 91 is a sequence diagram in the case where, when the TV 1 (45) is receiving video from the video server 1 (8004), the video is passed to the mobile AV terminal 8006. To perform video passing, the user powers on the mobile AV terminal 8006. The mobile AV terminal 8006 searches for an access point 8009 of the wireless LAN, and establishes wireless connection. The mobile AV terminal 8006 also obtains an IP address by DHCP or the like, and establishes IP connection. In the case where the mobile AV terminal 8006 is a DLNA terminal, DLNA terminal search processing such as M-SEARCH may be performed. The user presses the video passing button, to generate a video passing request in the memory in the RFID unit. The user further brings the RFID tag 8007 of the mobile AV terminal 8006 into proximity of the RFID tag reader/writer 46 of the TV 1, to transmit the video passing request to the TV 1. Upon receiving the video passing request, the TV 1 generates a video passing response (including an IP address of the video server 1, a video identifier, and a video display time), and returns the video passing response to the mobile AV terminal 8006. It is assumed here that the TV 1 obtains the IP address of the video server 1 beforehand, even when the video receiving means of the TV 1 has no IP connection such as a HDMI cable. In the case where the video is in encrypted form, necessary security-related information (such as a key) is exchanged at the same time. Upon receiving the video passing response, the mobile AV terminal 8006 transmits a video transmission request (including the video identifier and the video display time) to the IP address of the video server 1 included in the video passing response. Upon receiving the video transmission request, the video server 1 (8004) switches a video transmission destination to the mobile AV terminal 8006. Having no longer received the video data, the TV 1 (45) turns video display OFF.

Figure 92:
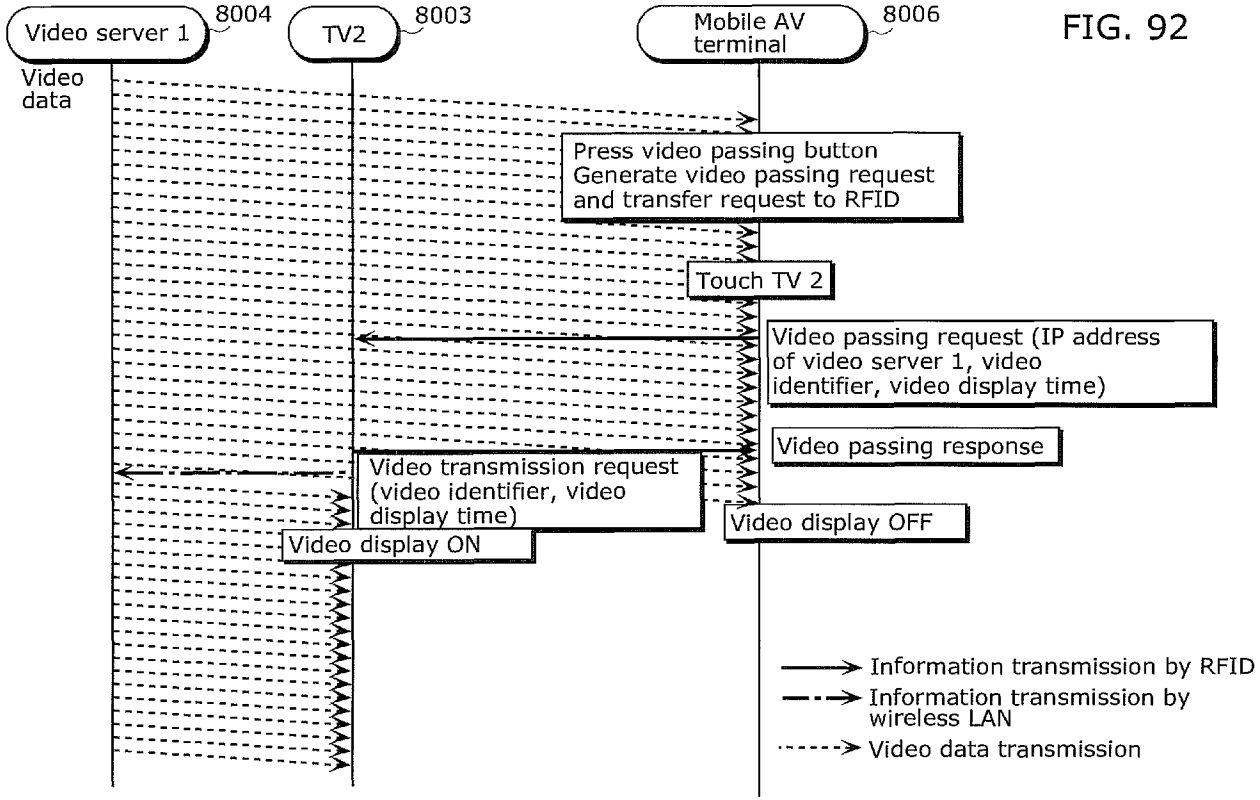
FIG. 92 is a sequence diagram in the case where the mobile AV terminal gives video (second half, control performed by get side).

FIG. 92 is a sequence diagram in the case where, when the mobile AV terminal 8006 is receiving the video from the video server 1 (8004), the video is passed to the TV 2 (8003). The user presses the video passing button of the mobile AV terminal 8006, to generate a video passing request (including the IP address of the video server 1, the video identifier, and the video display time). The user further brings the RFID tag 8007 of the mobile AV terminal 8006 into proximity of a RFID tag reader/writer 8002 of the TV 2, to transmit the video passing request to the TV 2. The TV 2 (8003) generates a video passing response indicating that the video passing request is accepted, and returns the video passing response to the mobile AV terminal 8006. The TV 2 (8003) transmits a video transmission request to the video server 1 (8004). Subsequent processing is the same as in FIG. 91.

Figure 93:
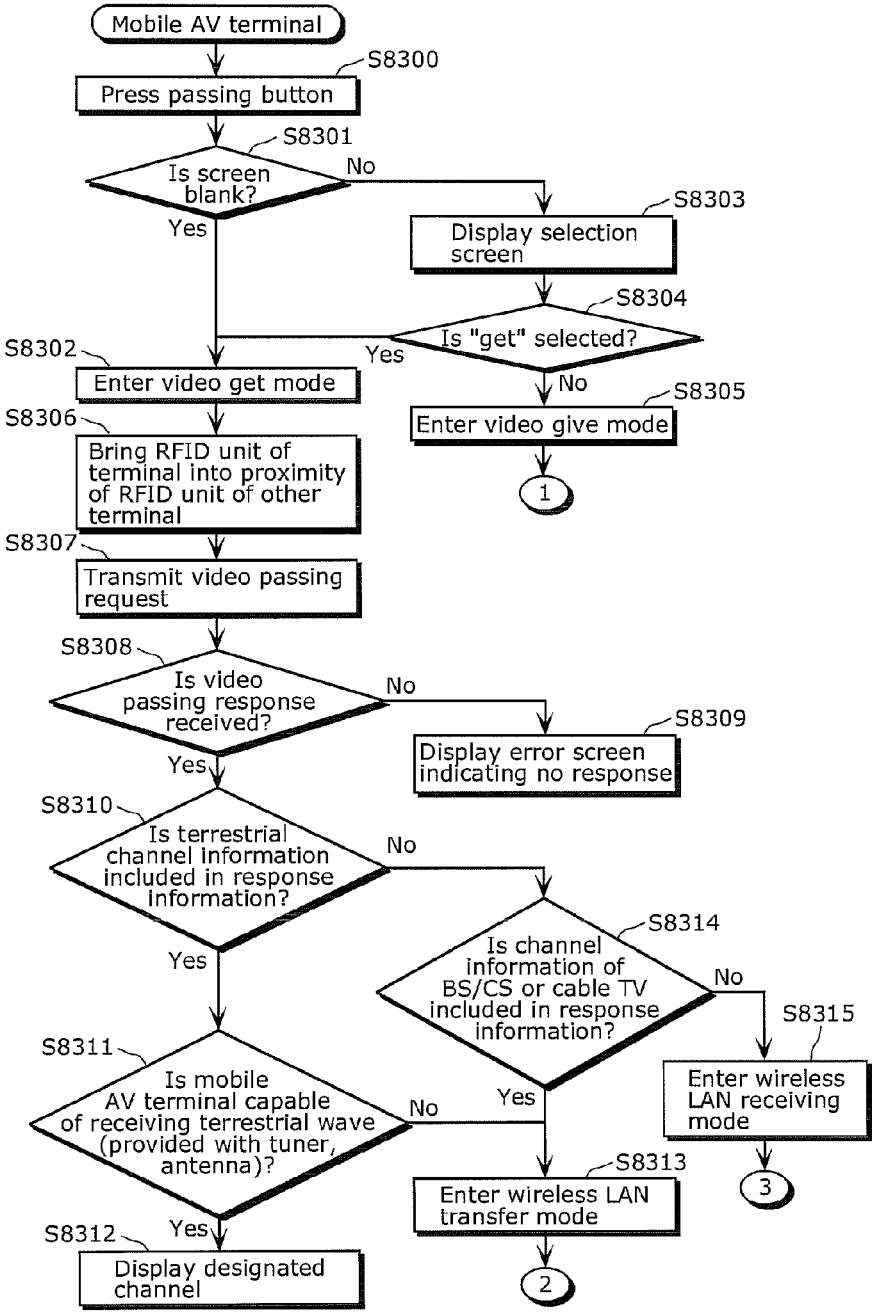
FIG. 93 is a basic flowchart of the mobile AV terminal.

FIG. 93 is a flowchart of processing of the mobile AV terminal 8006. When the user presses the video passing button (S8300), the mobile AV terminal 8006 enters a video get mode (S8302) in the case where the screen is blank (or has no video display) (S8301). In the case where the screen is not blank, a selection screen is displayed (S8303). When the user selects "get" (S8304), the mobile AV terminal 8006 equally enters the video get mode. When the user selects "give", the mobile AV terminal 8006 enters a video give mode (S8305). In the video get mode, the mobile AV terminal 8006 stores a video passing request including a video get command in the memory 8105 in the RFID unit. The user brings the RFID unit of the mobile AV terminal 8006 into proximity of the RFID unit of the other terminal (S8306), to transmit the video passing request to the other terminal (S8307). Upon receiving a video passing response from the other terminal (S8308), the mobile AV terminal 8006 performs processing according to information included in the video passing response. In the case where no response is obtained, the mobile AV terminal 8006 displays an error screen indicating no response, and ends processing (S8309). In the case where terrestrial channel information is included in the video passing response, the mobile AV terminal 8006 determines whether or not the mobile AV terminal 8006 is capable of receiving the corresponding channel (that is, whether nor not the mobile AV terminal 8006 has a tuner and an antenna and is in a terrestrial wave receivable range). In the case where the mobile AV terminal 8006 is capable of receiving the channel (S8311), the mobile AV terminal 8006 displays data of the designated channel. In the case where the mobile AV terminal 8006 is not capable of receiving the channel, the mobile AV terminal 8006 enters a wireless LAN transfer mode (S8313). Likewise, in the case where channel information of BS or the like, which is basically not receivable by the mobile AV terminal 8006, is included in the video passing response (S8314), the mobile AV terminal 8006 enters the wireless LAN transfer mode. On the other hand, in the case where no channel information is included in the video passing response, the mobile AV terminal 8006 enters a wireless LAN receiving mode (S8315).

Figure 94:
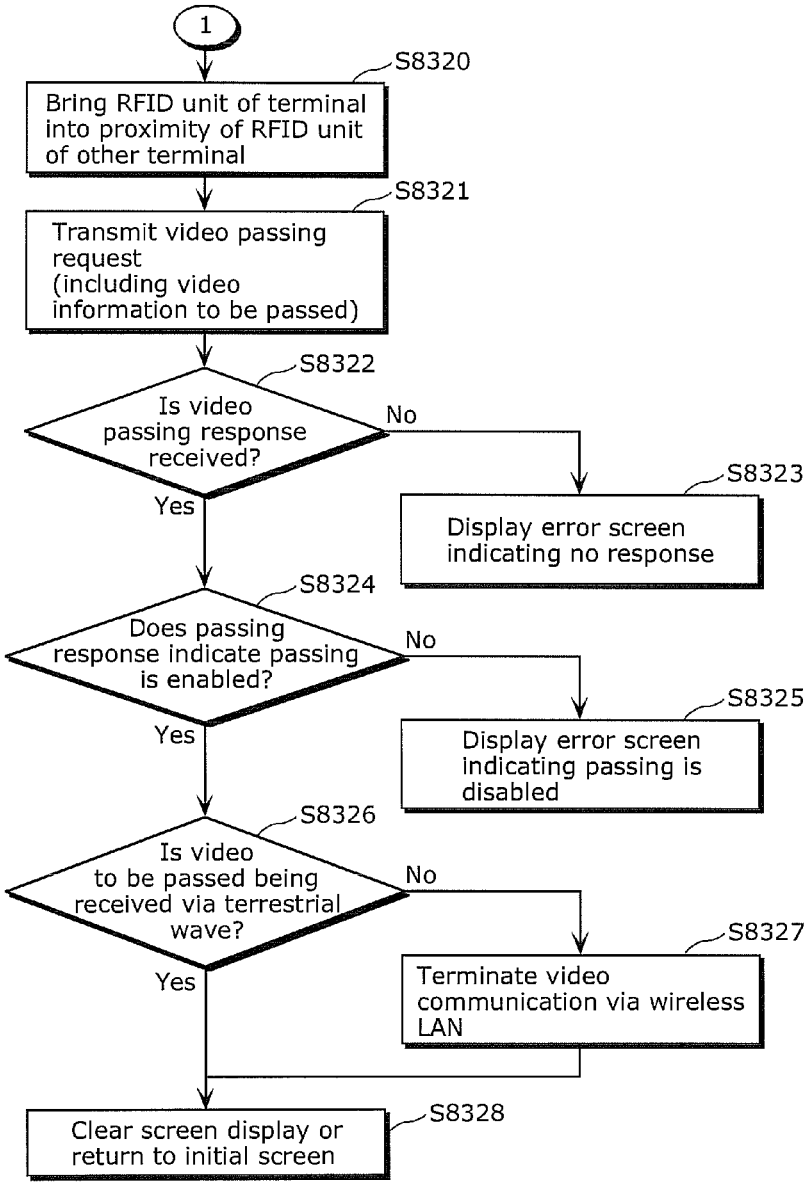
FIG. 94 is a flowchart of a give mode of the mobile AV terminal.

FIG. 94 is a flowchart of processing of the mobile AV terminal 8006 in the video give mode. In the video give mode, the mobile AV terminal 8006 stores a video passing request including a video give command and information of video to be given, in the memory 8054 in the RFID unit. The user brings the RFID unit of the mobile AV terminal 8006 into proximity of the RFID unit of the other terminal (S8320), to transmit the video passing request to the other terminal (S8321). Upon receiving a video passing response from the other terminal (S8322), the mobile AV terminal 8006 performs processing according to information included in the video passing response. In the case where no response is obtained, the mobile AV terminal 8006 displays an error screen indicating no response, and ends processing (S8323). In the case where the video passing response indicates that video passing is disabled (S8324), the mobile AV terminal 8006 displays an error screen indicating that video passing is disabled, and ends processing (S8325). In the case where video passing is enabled and video to be passed is being received via terrestrial wave (S8326), the mobile AV terminal 8006 stops screen display of terrestrial broadcasting. Otherwise, the mobile AV terminal 8006 performs termination processing of video that is being received via wireless LAN, according to a type of corresponding receiving system (S8327). The mobile AV terminal 8006 thereby stops screen display. Note that the screen display may be stopped according to an instruction from the terminal on the video give side, or the screen display may be switched to another screen such as an initial screen (S8328).

Figure 95:
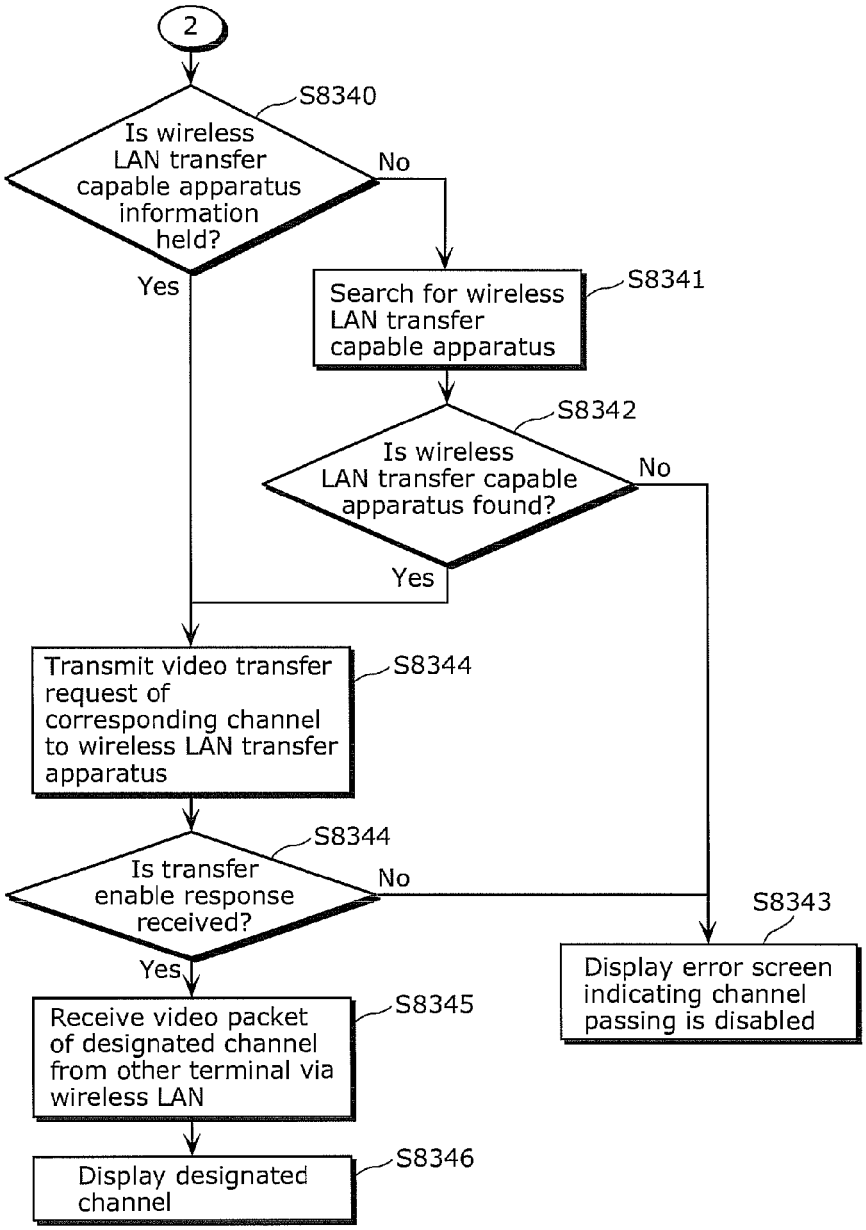
FIG. 95 is a flowchart of a get mode of the mobile AV terminal.

FIG. 95 is a flowchart of processing of the mobile AV terminal 8006 in the wireless LAN transfer mode. The mobile AV terminal 8006 is assumed to be a terminal that is capable of receiving terrestrial wave but is not capable of receiving satellite broadcasting and cable TV broadcasting. To receive such broadcast wave, the broadcast wave needs to be received by another terminal capable of receiving the broadcast wave, and transferred to the mobile AV terminal 8006 via wireless LAN. In the wireless LAN transfer mode, the mobile AV terminal 8006 calls information of a wireless LAN transfer capable apparatus. In the case where the information of the wireless LAN transfer capable apparatus is not held in the mobile AV terminal 8006 (S8340), the mobile AV terminal 8006 searches for the wireless LAN transfer capable apparatus (S8341). In the case where the wireless LAN transfer capable apparatus cannot be found in the house, the mobile AV terminal 8006 displays an error screen indicating that channel passing is disabled (S8343). In the case where the wireless LAN transfer capable apparatus is found or the information of the capable apparatus is held in the mobile AV terminal 8006, the mobile AV terminal 8006 transmits a video transfer request for the channel, to the wireless LAN transfer capable apparatus (S8344). In the case where a video transfer enable response is returned from the wireless LAN transfer capable apparatus, the mobile AV terminal 8006 receives video packets of the designated channel via wireless LAN (S8345), and displays the video of the designated channel (S8346).

Figure 96:
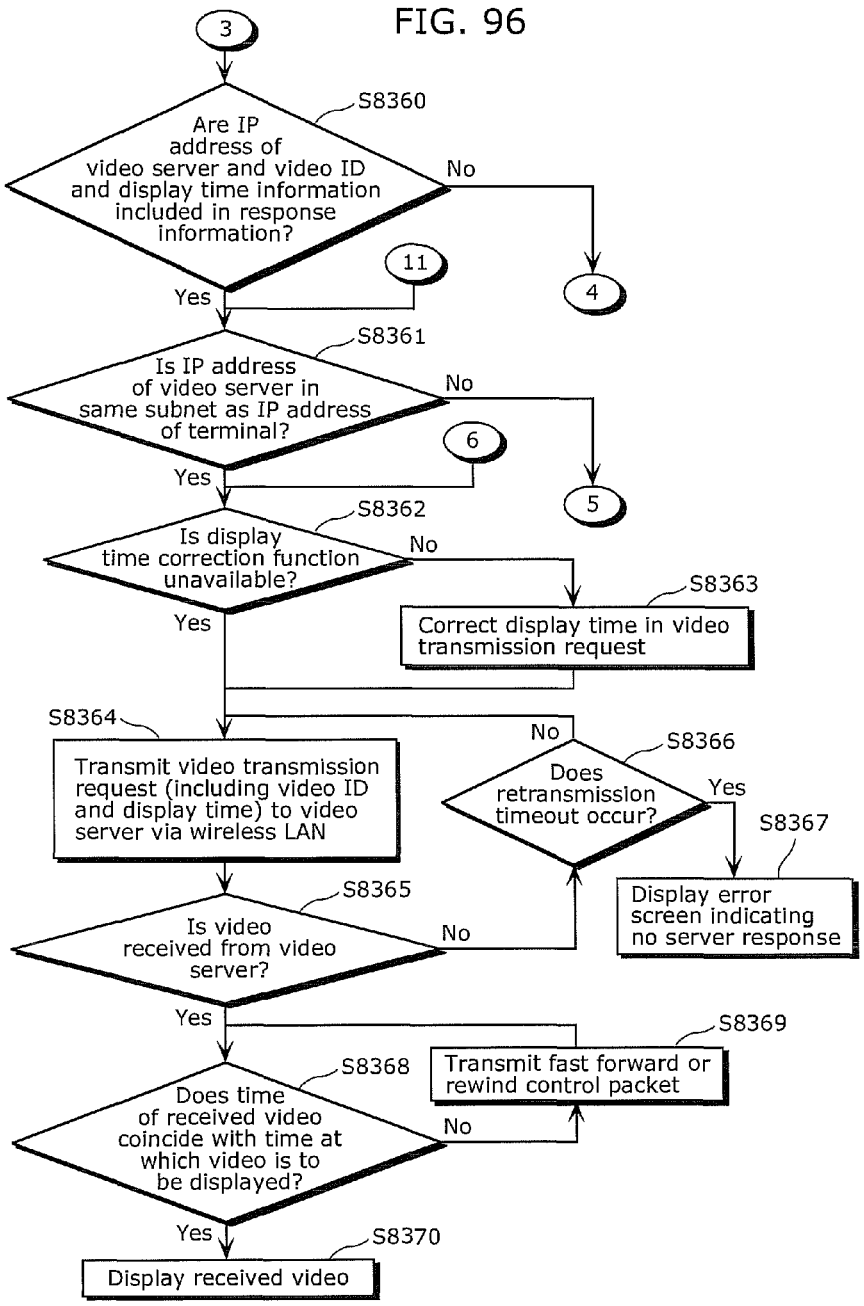
FIG. 96 is a flowchart of a wireless get mode of the mobile AV terminal.

FIG. 96 is a flowchart of processing of the mobile AV terminal 8006 in the wireless LAN receiving mode. In the wireless LAN receiving mode, in the case where the video passing response includes an IP address of a video server and an ID and display time information of video (S8360), the mobile AV terminal 8006 accesses the video server. First, the mobile AV terminal 8006 determines whether or not the IP address of the video server is in the same subnet as the IP address of the mobile AV terminal 8006 (S8361). In the case where the IP address of the video server is in the same subnet as the IP address of the mobile AV terminal 8006, the mobile AV terminal 8006 transmits a video transmission request including the video ID and display time, to the video server (S8364). Note that, in the case where a delay time correction function is available (S8362), the mobile AV terminal 8006 corrects the display time information in the video transmission request (S8363). Here, the display time correction function denotes a correction function that is executed to perform efficient video transfer in consideration of various delay in processing. In the case where video cannot be received from the video server (S8365), the mobile AV terminal 8006 may retransmit the video transmission request. In the case where there is no response even after a predetermined retransmission timeout occurs (S8366), the mobile AV terminal 8006 displays an error screen indicating no server response (S8367). In the case where the time of the received video data does not coincide with the time of display (S8368), the mobile AV terminal 8006 adjusts the time to the time of display using a control packet for fast-forward or rewind (S8369). The mobile AV terminal 8006 then displays video.

Figure 97:
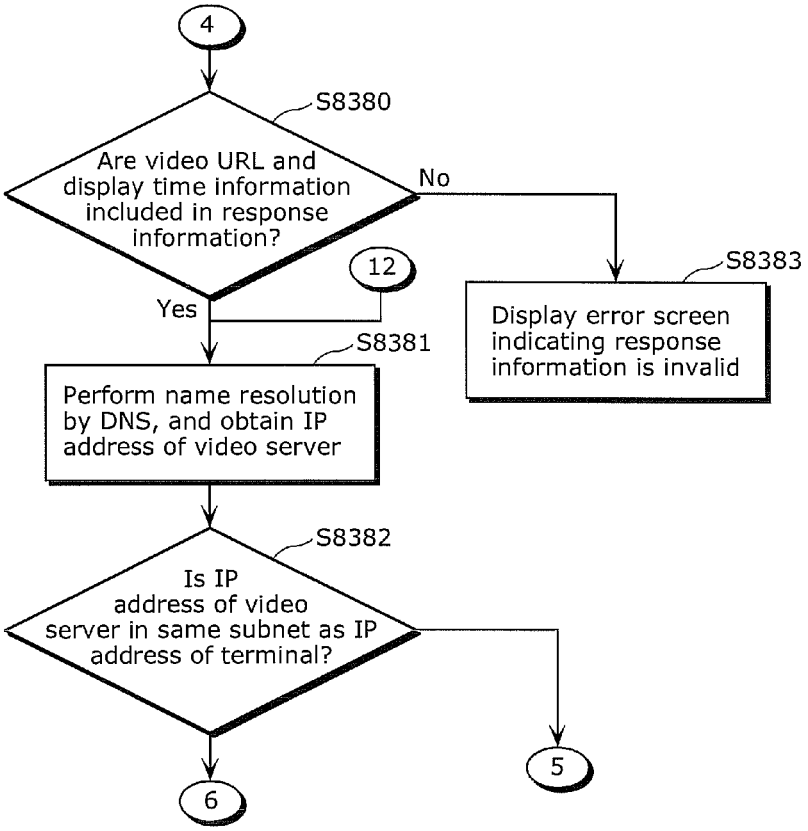
FIG. 97 is a flowchart of a URL get mode of the mobile AV terminal.

FIG. 97 is a flowchart of processing in the case where a URL is included in the video passing response. In the case where the URL is included (S8380), the mobile AV terminal 8006 performs name resolution by DNS, to obtain the IP address of the video server (S8381). Note that the URL for video may be any name assigned for video service. The name resolution also includes conversion from a service identifier to a terminal identifier other than DNS. In the case where the obtained IP address of the video server is in the same subnet as the IP address of the mobile AV terminal 8006 (S8382), the mobile AV terminal 8006 returns to the processing described in FIG. 96. In the case where the IP address of the video server is not in the same subnet as the IP address of the mobile AV terminal 8006, the mobile AV terminal 8006 proceeds to connection processing to a server outside the subnet. In the case where the desired information is not included in the video passing response, the mobile AV terminal 8006 displays an error screen indicating that the video passing response is invalid (S8383).

Figure 98:
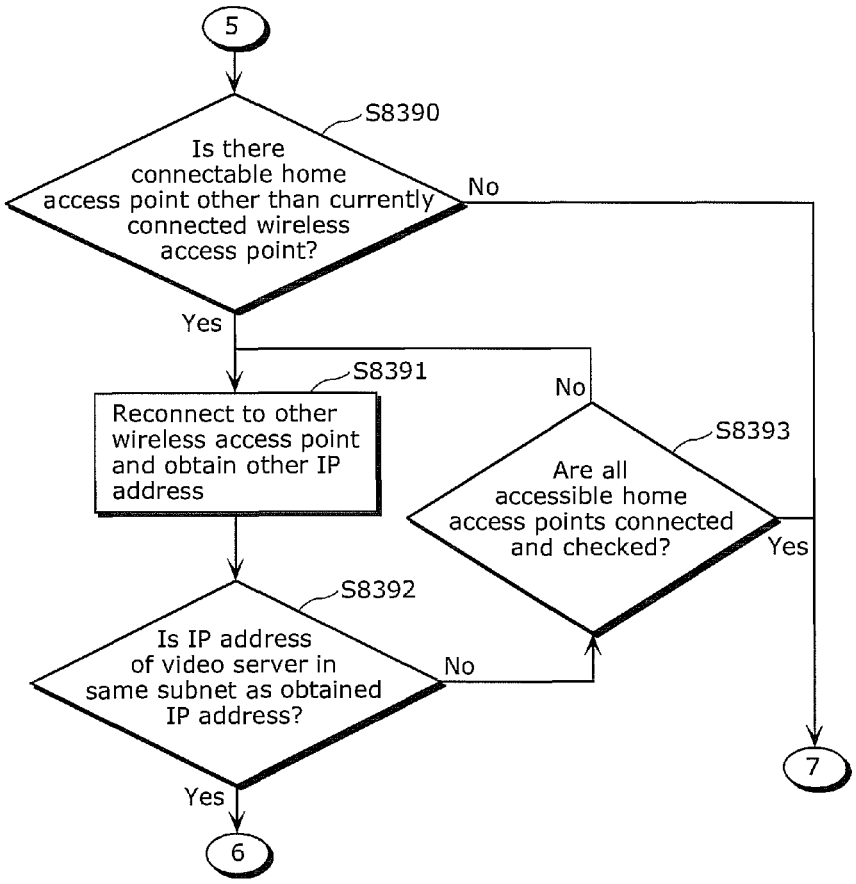
FIG. 98 is a flowchart of server position search by the mobile AV terminal.

FIG. 98 is a flowchart of processing in the case where the IP address of the video server is not in the same subnet as the IP address of the mobile AV terminal 8006. In the case where the IP address of the video server is in a different subnet, the mobile AV terminal 8006 searches for another wireless access point. In the case where there is no other access point in the house, the mobile AV terminal 8006 determines that the video server is an external server, and proceeds to external server connection processing. In the case where there is another access point (S8390), the mobile AV terminal 8006 performs reconnection to the access point, and obtains another IP address of a subnet (S8391). In the case where the subnet of the video server is the same as the subnet of the obtained IP address (S8392), the mobile AV terminal 8006 proceeds to home server processing. In the case where the subnet of the video server is not the same as the subnet of the IP address obtained by connecting to the accessible access point in the house (S8393), the mobile AV terminal 8006 proceeds to external server access processing. Note that the mobile AV terminal 8006 may perform IP address obtainment processing for all access points beforehand and manage the processing result therein.

Figure 99:
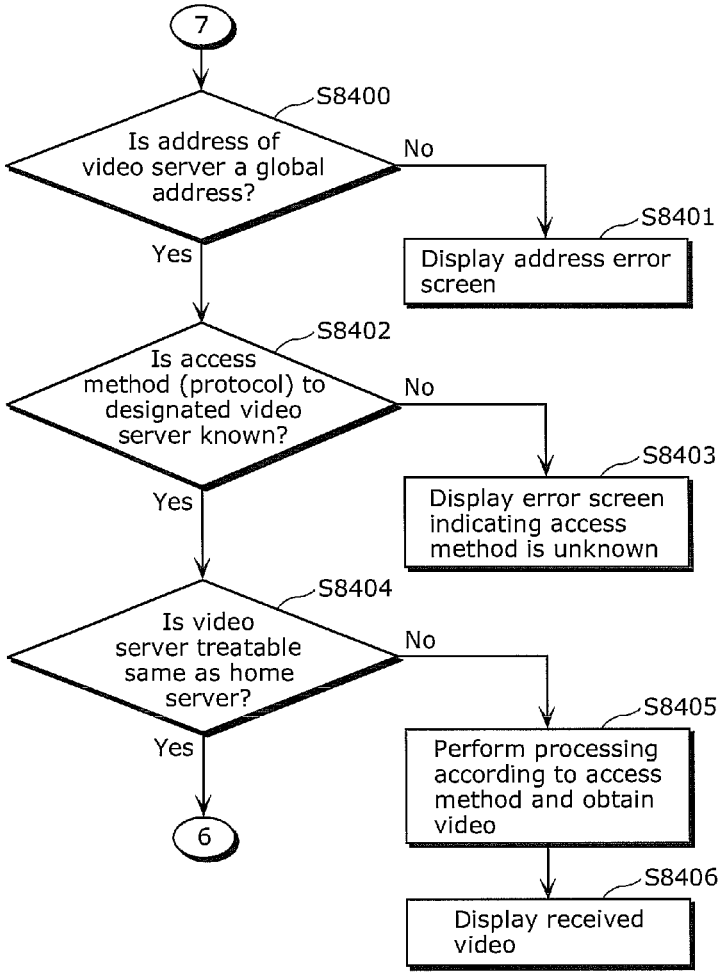
FIG. 99 is a flowchart of a mode in which the mobile AV terminal gets video from an external server.

FIG. 99 is a flowchart of processing in the case of accessing to an external server. In the case where the address of the video server is not a global address (S8400), the mobile AV terminal 8006 displays an error screen indicating an address error (S8401). In the case where an access method to the designated video server is unknown (S8402), the mobile AV terminal 8006 displays an error screen indicating that the access method is unknown (S8403). Note that a home video server and a home video appliance are assumed to be compliant with DLNA. In the case where the access method is known and also the video server has the same function as a home server, the mobile AV terminal 8006 performs the same processing as in the case of a home server (S8404). Otherwise, the mobile AV terminal 8006 performs processing according to the access method to obtain video (S8405), and displays the received video (S8406).

Figure 100:
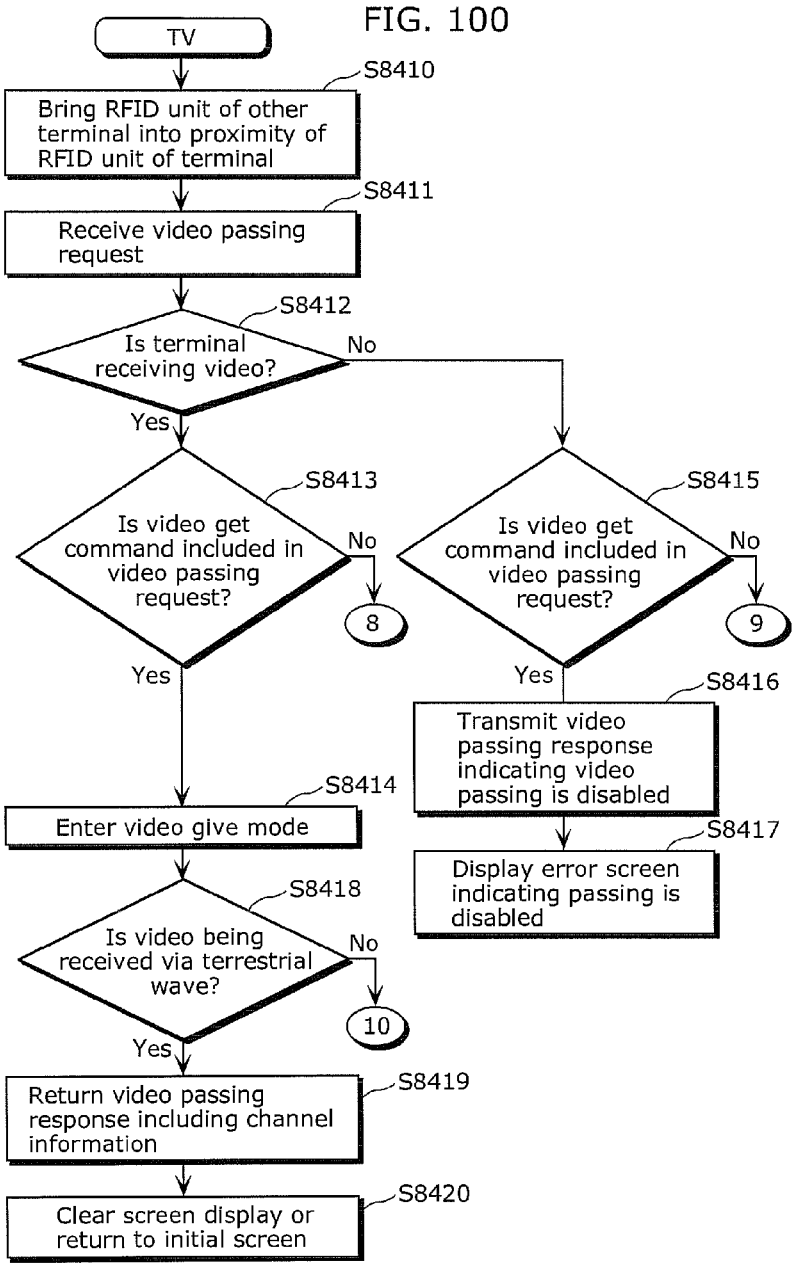
FIG. 100 is a basic flowchart of the TV.

FIG. 100 is a flowchart of processing of the TV. When the RFID unit of the other terminal is brought into proximity of the RFID unit of the TV (S8410), the TV receives a video passing request (S8411). In the case where the TV is receiving video (S8412) and also a video get command is included in the video passing request (S8413), the TV enters a video give mode (S8414). In the case where the TV is not receiving video but the video get command is included in the video passing request (S8415), the TV returns a video passing response indicating that video passing is disabled (S8416), and displays an error screen indicating that video passing is disabled (S8417). In the case where the video is being received via terrestrial wave (S8418), the TV returns the video passing response including channel information (S8419). The TV then clears screen display (S8420).

Figure 101:
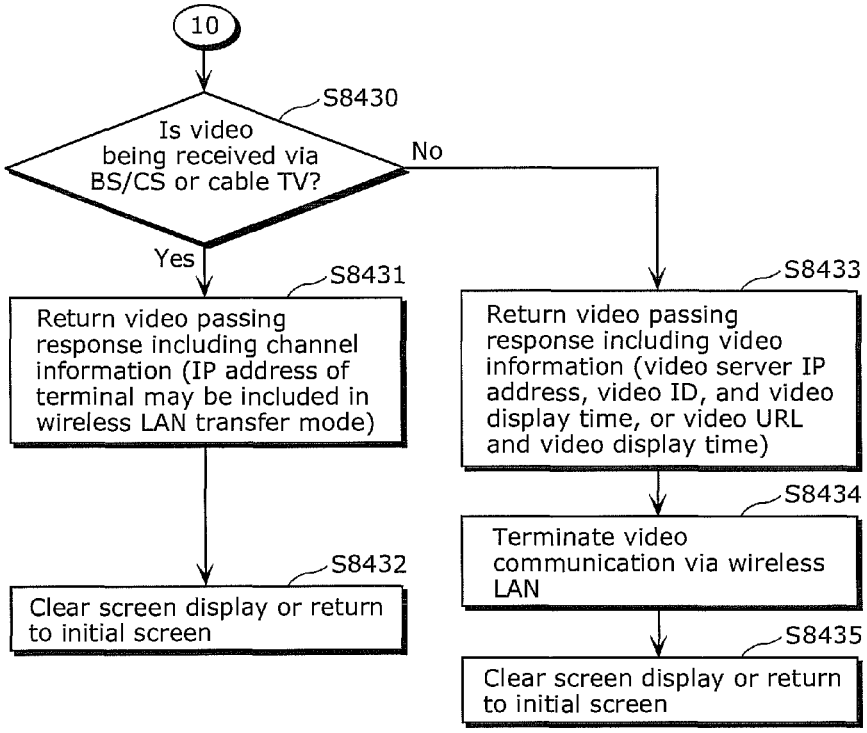
FIG. 101 is a flowchart of a give mode of the TV.

FIG. 101 is a flowchart of processing in the case where the video is being received not via terrestrial wave. In the case where the video being received is broadcast video other than terrestrial wave (S8430), the TV returns the video passing response including channel information. In the case of a wireless LAN transfer mode, the TV may include the IP address of the TV in the video passing response (S8431). After returning the response, the TV clears screen display (S8432). In the case of other video, the TV returns the video passing response including an IP address of a video server, a video ID, and a video display time, or including a video URL and a video display time (S8433). After this, the TV performs termination processing of video communication via wireless LAN (S8434), and clears screen display.

Figure 102:
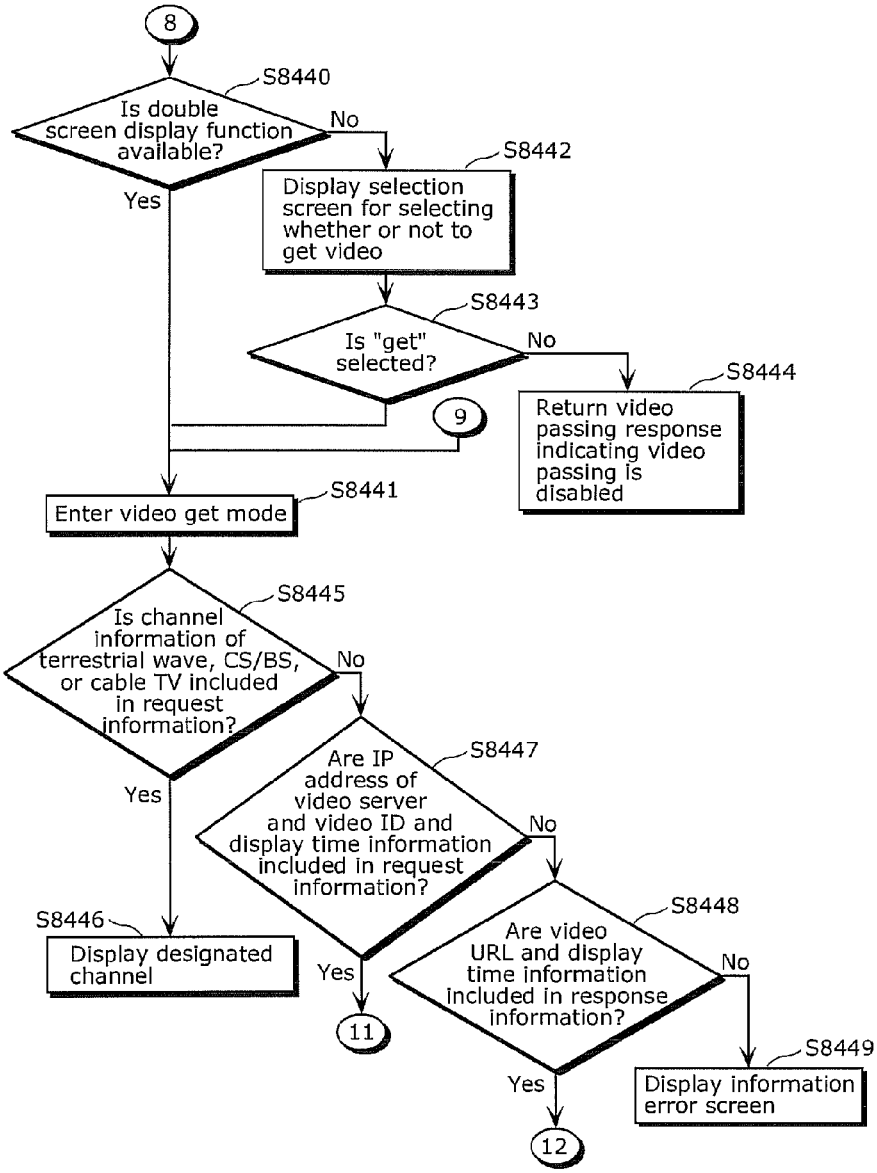
FIG. 102 is a flowchart of a get mode of the TV.

FIG. 102 is a flowchart of processing in the case where a video give command is included in the video passing request. When the TV receives the video give command while displaying video, the TV enters a video get mode (S8441) in the case where a double screen display function is available (S8440). In the case where the double screen display function is not available, the TV displays a selection screen of whether or not to get video (S8442). When the user selects to get video (S8443), the TV enters the video get mode. When the user selects not to get video, the TV returns a video passing response indicating that video passing is disabled (S8444). In the case where channel information is included in the video passing request (S8445), the TV displays data of a designated channel (S8446). In the case where an IP address of a video server or a URL is included in the video passing request (S8447, S8448), the TV performs the same processing as in the video get mode of the mobile AV terminal. In the case where such information is not included in the video passing request, the TV displays an information error screen (S8449).

Ninth Embodiment

Figure 103:
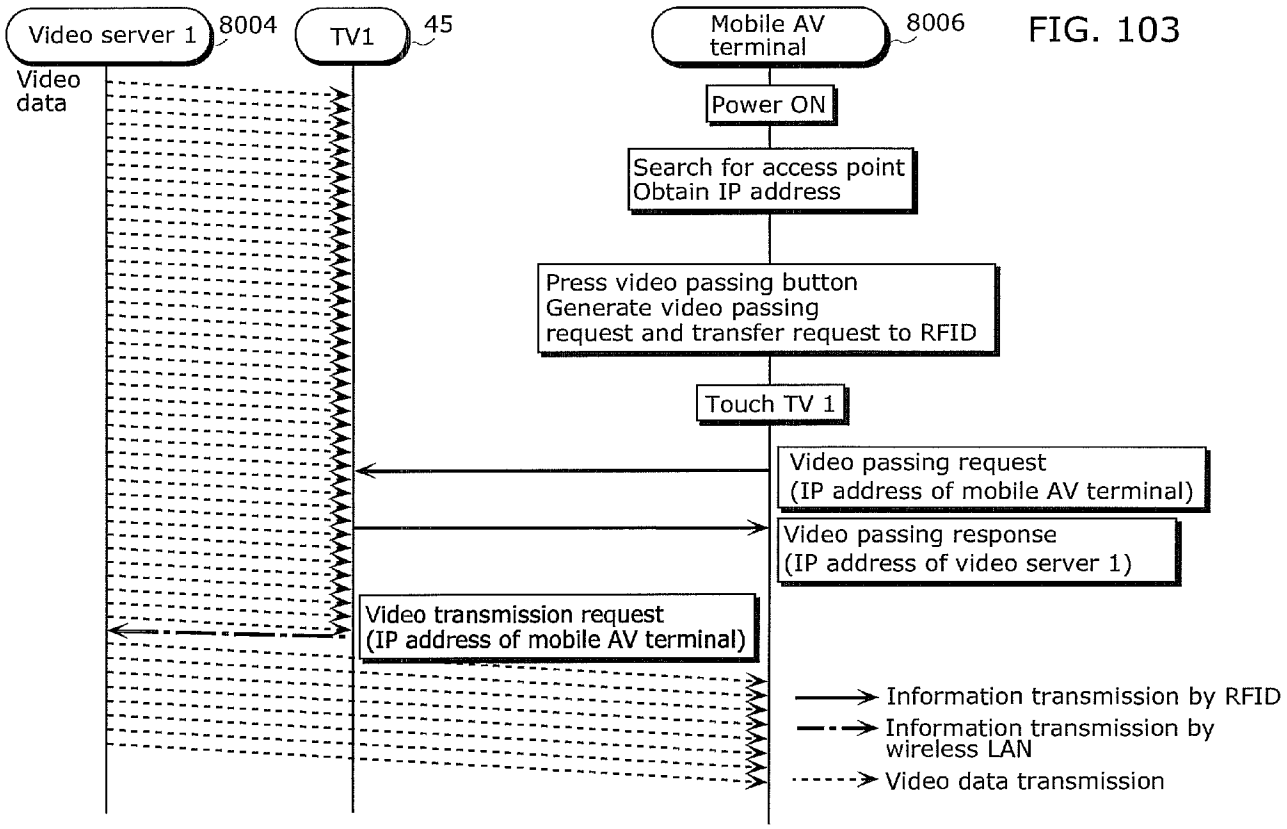
FIG. 103 is a sequence diagram in the case where the mobile AV terminal gets video.

FIG. 103 is a sequence diagram in the case where, when the TV 1 (45) is receiving video from the video server 1 (8004), the TV 1 (45) transmits a video transmission request so that the mobile AV terminal 8006 gets the video. As in FIG. 91, the user powers on the mobile AV terminal 8006 to pass the video. The mobile AV terminal 8006 searches for the access point 8009 of wireless LAN, and establishes wireless connection. The mobile AV terminal 8006 also obtains an IP address by DHCP or the like, and establishes IP connection. The user presses the video passing button, to generate a video passing request in the memory in the RFID unit. Here, the video passing request includes the IP address of the mobile AV terminal 8006. The user further brings the RFID tag 8007 of the mobile AV terminal 8006 into proximity of the RFID tag reader/writer 46 of the TV 1, to transmit the video passing request to the TV 1 (45). The TV 1 returns a video passing response including the IP address of the video server, to the mobile AV terminal 8006. This step is intended to enhance security (to prevent arbitrary access from an irrelevant terminal), and may be omitted. As in FIG. 91, in the case where video is in encrypted form, necessary security-related information (such as a key) is exchanged at the same time. Upon receiving the video passing request, the TV 1 (45) transmits a video transmission request including the IP address of the mobile AV terminal 8006, to the video server 1 (8004). Upon receiving the video transmission request, the video server 1 (8004) switches a video transmission destination to the mobile AV terminal 8006. Subsequent processing is the same as in FIG. 91.

Figure 104:
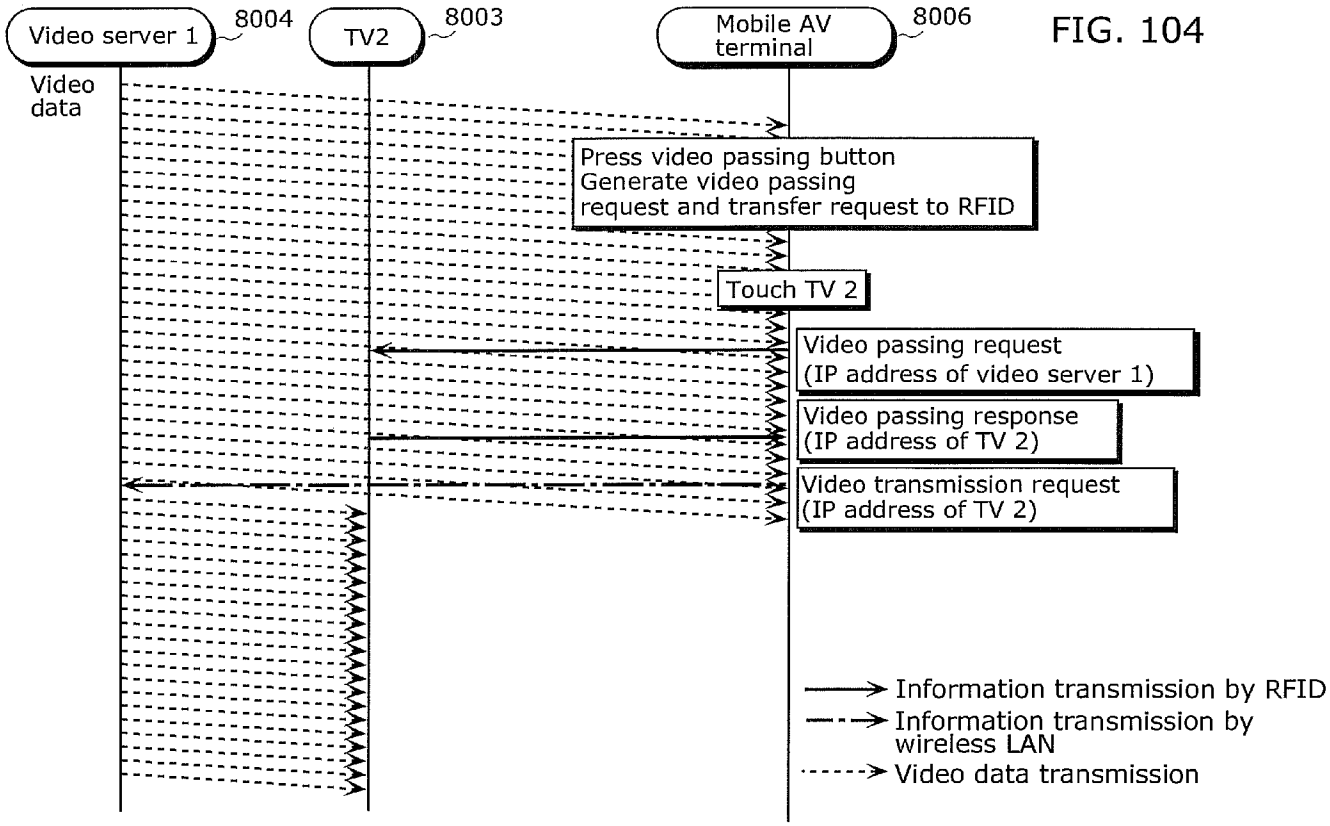
FIG. 104 is a sequence diagram in the case where the mobile AV terminal gives video.

FIG. 104 is a sequence diagram in the case where, in the same situation as in FIG. 92, the IP address of the video server 1 (8004) is included in a video passing request. This may be omitted as in FIG. 102. Upon receiving the video passing request, the TV 2 (8003) returns a video passing response including the IP address of the TV 2. Upon receiving the video passing response, the mobile AV terminal 8006 transmits a video transmission request including the IP address of the TV 2, to the video server 1 (8004). Upon receiving the video transmission request, the video server 1 (8004) changes the video transmission destination to the TV 2 (8003). Subsequent processing is the same as in FIG. 92.

Tenth Embodiment

Figure 105:
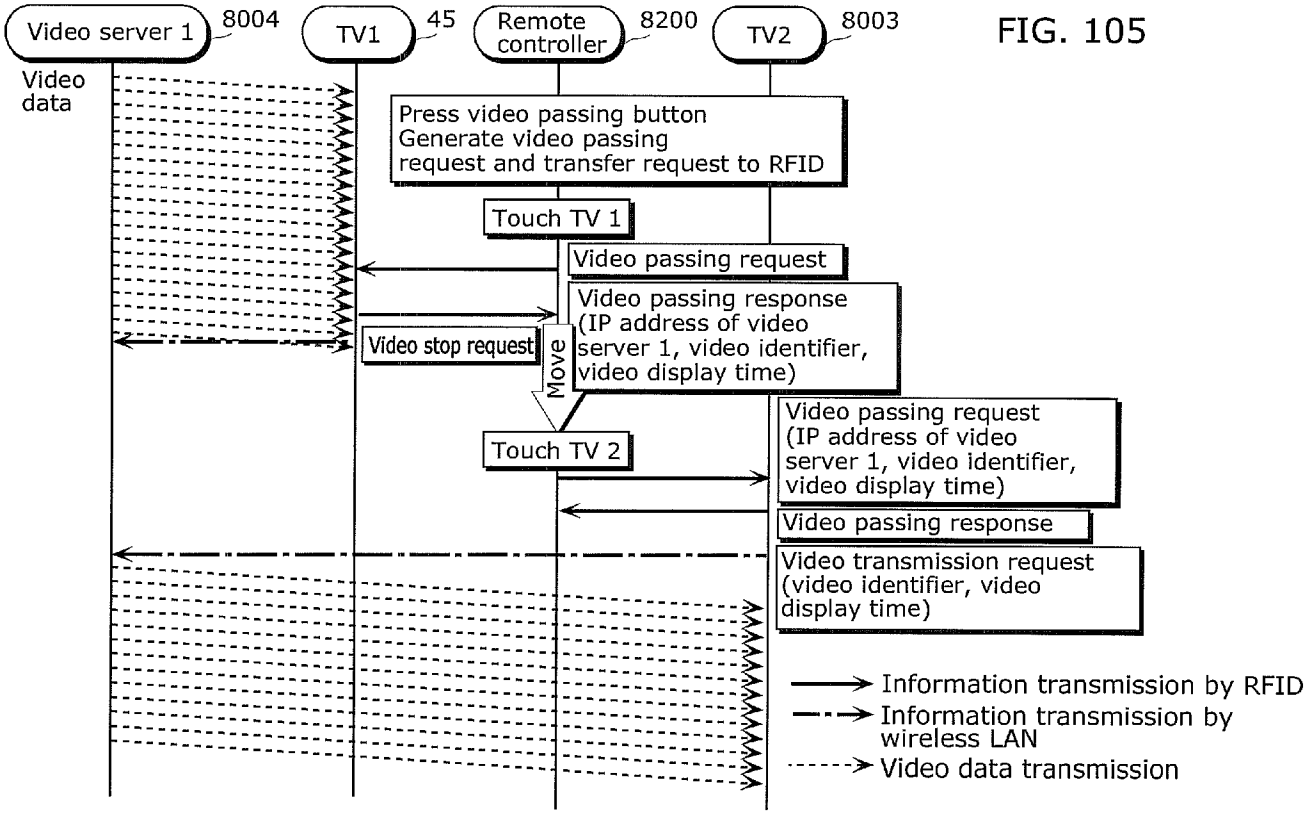
FIG. 105 is a sequence diagram in the case where passing is performed by a remote controller.

FIG. 105 is a sequence diagram in the case where a remote controller 8200 having a RFID unit is used instead of the mobile AV terminal 8006. Here, the remote controller is assumed to be a terminal that does not have a display unit but has a transmission and reception unit and a memory of a RFID unit. The user presses a video passing button, to generate a video passing request in the memory in the RFID unit. The user further brings the RFID unit of the remote controller 8200 into proximity of the RFID unit 46 of the TV 1, to transmit the video passing request to the TV 1. Upon receiving the video passing request, the TV 1 generates a video passing response (including the IP address of the video server 1, a video identifier, and a video display time), and returns the video passing response to the remote controller 8200. Moreover, upon receiving the video passing request from the remote controller 8200, the TV 1 (45) transmits a video stop request to the video server 1 (8004). After going upstairs, the user brings the RFID unit of the remote controller 8200 into proximity of the RFID unit of the TV 2, to transmit a video passing request (including the IP address of the video server 1, the video identifier, and the video display time). Upon receiving the video passing request, the TV 2 (8003) returns a video passing response, and transmits a video transmission request (including the video identifier and the video display time) to the video server 1. The video server 1 (8004) starts transmitting the designated video from the designated time.

Eleventh Embodiment

Figure 106:
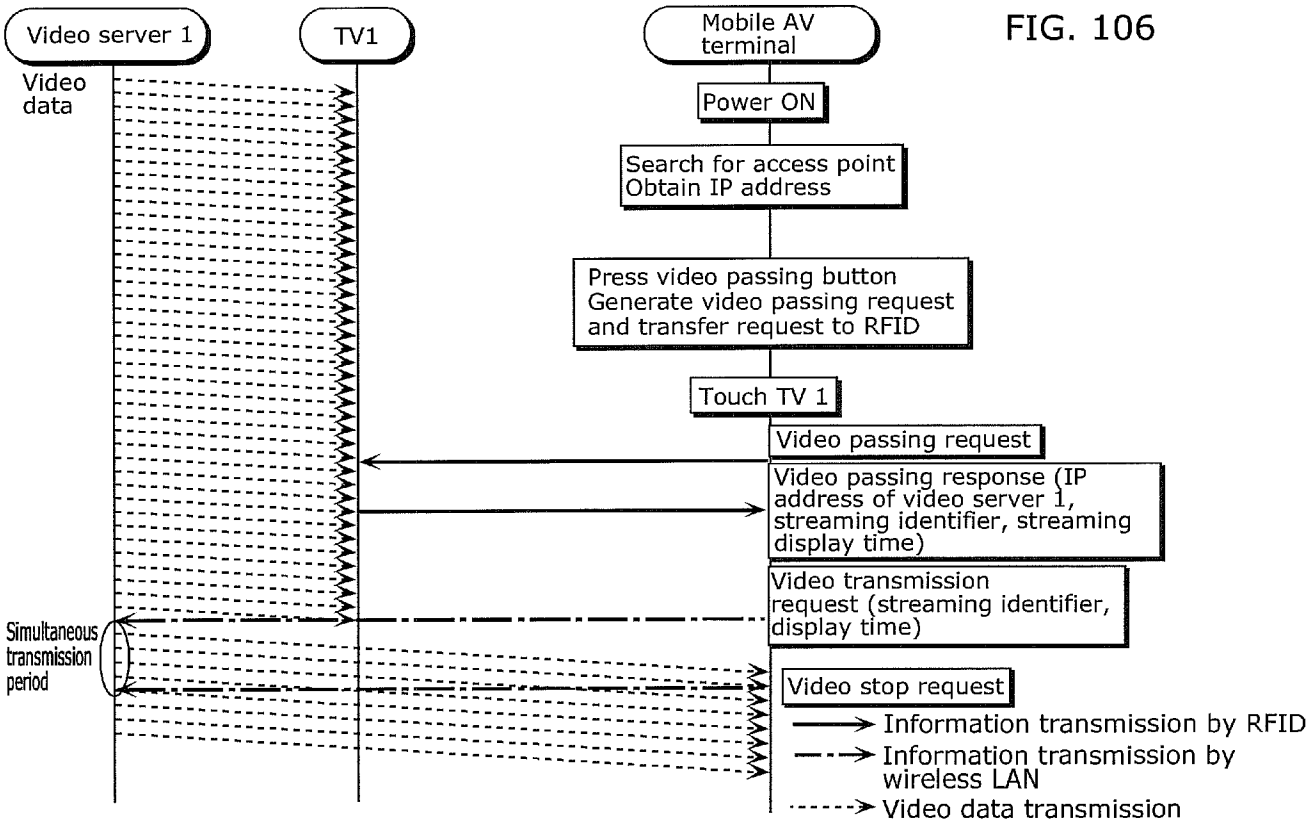
FIG. 106 is a sequence diagram in the case where a video server performs synchronous transmission.

FIG. 106 is a sequence diagram in the case where the video server 1 is capable of synchronous transmission. After conducting predetermined communication with the TV 1, the mobile AV terminal transmits a video transmission request to the video server 1. Upon receiving the video transmission request, the video server 1 (8004) temporarily transmits video data to both the TV 1 (45) and the mobile AV terminal (8006). This processing is intended to achieve complete seamlessness. The mobile AV terminal and the TV 1 may both display the video temporarily, or some kind of synchronization processing may be performed to achieve complete seamlessness. The video server 1 (8004) stops video data transfer to the TV 1, on the basis of a video stop request from the mobile AV terminal (8006). Note that the TV 1 (45) may transmit the stop request, or the video server 1 (8004) may automatically stop video data transfer.

Twelfth Embodiment

This embodiment relates to a best mode of a method for ensuring traceability in a distribution form from factory shipment to use environment of an apparatus (device) provided with a RFID tag as described in the first to tenth embodiments.

Recently, given a need to improve distribution efficiency and also an increase in number of accidents caused by aging of home electrical products, there has been debate for ensuring traceability, namely, an ability to trace from manufacture and distribution through to a use environment by a consumer.

As an example, an attempt has been made to enable management from manufacture to distribution to a retailer, by adding a passive RFID tag that uses a communication frequency in a band of 860 to 900 MHz, to a package, a returnable container, or the like. The band of 860 to 900 MHz is also called a UHF (UltraHigh Frequency) band. The RFID tag in the UHF band can exhibit a largest communication distance in the passive type (i.e., the type of tag to which power is supplied from outside), and is capable of communication of 2 to 3 m though depending on output magnitude. Accordingly, by simultaneously passing a plurality of products through a RFID reader gate during transportation, RFID information of the plurality of products can be instantly read with efficiency. Hence, the RFID tag is particularly expected to be used in the field of distribution.

However, such a RFID tag of the UHF band has the following problem. Though the RFID tag certainly has an advantage of long-distance communication, the apparatus cannot be traced once it has been delivered to the consumer because the RFID tag is added to the package or the returnable container. Besides, the long-distance feature is not particularly effective in an entity interface, an object interface, or an intuitive interface described in the first to tenth embodiments where apparatuses are brought into proximity of each other to trigger an action.

Meanwhile, the RFID tag (47) described in the first to tenth embodiments is assumed to be a HF-RFID tag in a band of 13.56 MHz (though this is not a limit for the present invention). HF-RFID has a feature of short-distance communication (within about several ten cm though depending on output). For instance, the HF-RFID tag is widely used in applications that intuitively trigger an action by bringing two terminals close to each other, such as electronic money and ticket gate systems. This being so, for example when the user wants to display photographs captured by a digital camera on a TV, the user brings the digital camera 1 close to the RFID reader/writer 46 of the TV, thereby realizing an entity interface where an entity (camera) and an entity (TV) operate in conjunction with each other or an intuitive interface where digital camera photographs are displayed on the TV.

In this embodiment, the HF-RFID tag is added to the apparatus (device) as in the first to tenth embodiments, and also the UHF-RFID tag is added to the package or the returnable container of the apparatus, to ensure product traceability even after the product is reached the use environment of the consumer.

Figure 107:
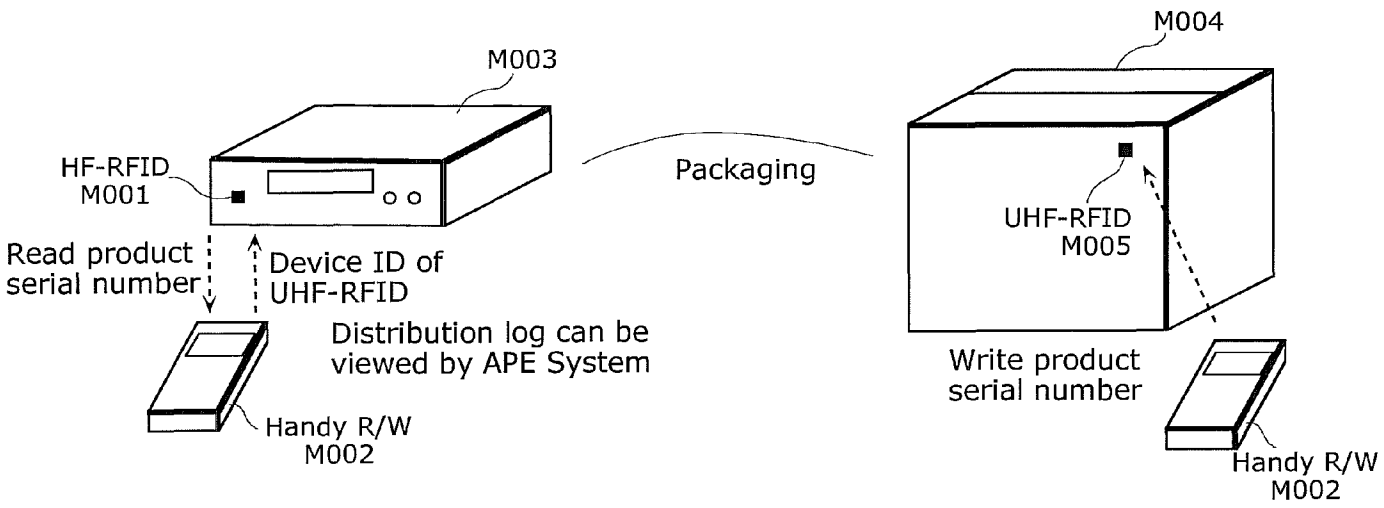
FIG. 107 is a schematic diagram illustrating processing of HF-RFID and UHF-RFID upon apparatus factory shipment.

FIG. 107 is a schematic diagram illustrating processing of HF-RFID and UHF-RFID upon apparatus factory shipment.

Though this embodiment describes the case where the apparatus is a recorder, the apparatus is not limited to such and may be any of a digital home appliance, a food, and the like.

An apparatus M003 assembled in a manufacturing line is provided with a HF-RFID tag M001. The HF-RFID tag M001 has a memory, which has a structure of a dual interface that is accessible from both the apparatus M003 and a communication unit of the RFID tag M001. A product serial number of the apparatus and a program (command) for copying the product serial number of the apparatus to the UHF-RFID tag are stored in the memory of the HF-RFID tag M001, in an assembly stage.

After the assembly of the apparatus M003 is completed, prior to packaging, a handy reader/writer M002 reads the product serial number from the memory of HF-RFID, and also records a device ID of UHF-RFID (UHF-RFID unique information) indicating that the UHF-RFID tag is added to the package or the like.

Next, having packaged the apparatus M003, a UHF-RFID tag M005 is added to a package M004. The UHF-RFID tag M005 may be directly added to the package, or may be added to a management table or the like. After adding the UHF-RFID tag M005, the handy reader/writer M002 records the product serial number and the like read from the HF-RFID tag M001 of the apparatus M003, to the UHF-RFID tag M005. In this embodiment, the handy reader/writer M002 is capable of accessing both HF-RFID and UHF-RFID.

Thus, the product serial number of the apparatus M003 is recorded on the HF-RFID tag M001, and the same information is also recorded on the UHF-RFID tag M005 of the package M004. Therefore, in distribution after packaging, there is no need to read the product serial number and the like from the HF-RFID tag that is capable of only short-distance access. By simultaneously passing a plurality of products through the gate, the information can be directly read from the UHF-RFID tag. This contributes to more efficient distribution.

Moreover, after the apparatus M003 reaches the use environment of the consumer, the HF-RFID tag can be read by a remote controller of a TV and the like. Hence, not only the distribution but also the apparatus reaching the consumer can be traced. As a result, overall traceability that contributes to improved distribution efficiency and prevents accidents caused by aged deterioration during apparatus use can be achieved.

Figure 108:
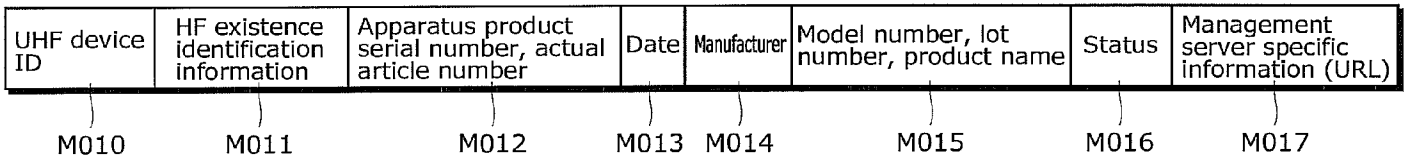
FIG. 108 is a schematic diagram illustrating a recording format of a memory accessible from a UHF-RFID tag M005.

FIG. 108 is a schematic diagram illustrating a recording format of a memory accessible from the UHF-RFID tag M005.

The memory of the UHF-RFID tag M005 stores a UHF device ID M010, HF existence identification information M011, an apparatus product serial number and actual article number M012, a date M013, a manufacturer M014, a model number, lot number, and product name M015, and a status M016.

The UHF device ID M010 is stored in a non-rewritable area of the memory, and is identification information for uniquely identifying the UHF-RFID tag. The UHF device ID M010 is read by the handy reader/writer before the apparatus M003 is packaged, and recorded in the HF-RFID tag M001. Hence, even when the correspondence relation between the package and the apparatus is wrong, the correspondence relation can be checked beforehand and appropriate processing can be performed.

The HF existence identification information M011 is identification information for determining whether or not the HF-RFID tag M001 is added to the apparatus M003. In the case where the HF-RFID tag M001 is added to the apparatus M003, when recording the product serial number and the like read from the HF-RFID tag M001 to the UHF-RFID tag M005 upon apparatus packaging, the HF-RFID existence identification information is changed to information indicating "exist". This makes it possible to determine whether or not to check the correspondence relation between UHF-RFID and HF-RFID, by referencing only the HF existence identification information M011.

The apparatus product serial number and actual article number M012 is at least one of the product serial number read from the HF-RFID tag M001 and an actual article number associated with the product serial number. The actual article number is a number of the apparatus used in the distribution process. It is possible to uniquely associate the actual article number with the product serial number, by equally managing the product serial number and the actual article number. Accordingly, in this embodiment, the product serial number and the actual article number are not clearly distinguished from each other but are described as the same information.

The date M013 corresponds to a manufacturing year/month/date, and information of a date and time of manufacture of the apparatus M003 is recorded as the date M013. This information may be recorded by the handy reader/writer M002 at the time of recording the product serial number to the UHF-RFID tag M005, or manufacturing year/month/date information stored in the HF-RFID tag M001 may be read and recorded to the UHF-RFID tag M005.

The manufacturer M014 is identification information of a manufacturer of the apparatus M003. This information may be recorded by the handy reader/writer M002 at the time of recording the product serial number to the UHF-RFID tag M005, or manufacturer information stored in the HF-RFID tag M001 may be read and recorded to the UHF-RFID tag M005.

The model number, lot number, and product name M015 may be recorded by the handy reader/writer M002, or the corresponding information may be read from the HF-RFID tag M001 and recorded, in the same way as the date M013 and the manufacturer M014. Regarding the lot number, in the case where lot management from manufacture to distribution can be conducted in a unified fashion, the information may be written by any of the two methods. However, in the case where unified management is not conducted and manufacturing line information is unclear upon packaging, reading the lot number from the HF-RFID tag M001 and recording it to the UHF-RFID tag M005 is more advantageous because stricter management can be achieved.

The status M016 is status information in the distribution form. That is, status information necessary for tracing the apparatus, such as factory storage, factory shipment, distribution center reception, distribution center shipment, and retailer reception, is recorded as the status M016. The status M016 is rewritable in each distribution process.

Moreover, the UHF-RFID tag M005 stores management server specific information M017. The management server specific information M017 is the same information as the server specific information 48 in the second memory 52 of the HF-RFID tag M001. When packaging the apparatus M003, the server specific information is read from the HF-RFID tag M001 and copied to the UHF-RFID tag M005. This enables unified management to be performed by the same management server for both of the management in the distribution stage using UHF-RFID and the management after the apparatus is delivered to the consumer.

Therefore, after the apparatus M003 is delivered to the consumer, by reading the management server address information from the HF-RFID tag M001, accessing the management server, and making an inquiry by the apparatus product serial number M012, trace information from manufacture to distribution managed by the management server can be visualized to the consumer. This enhances consumer assurance and safety.

Figure 109:
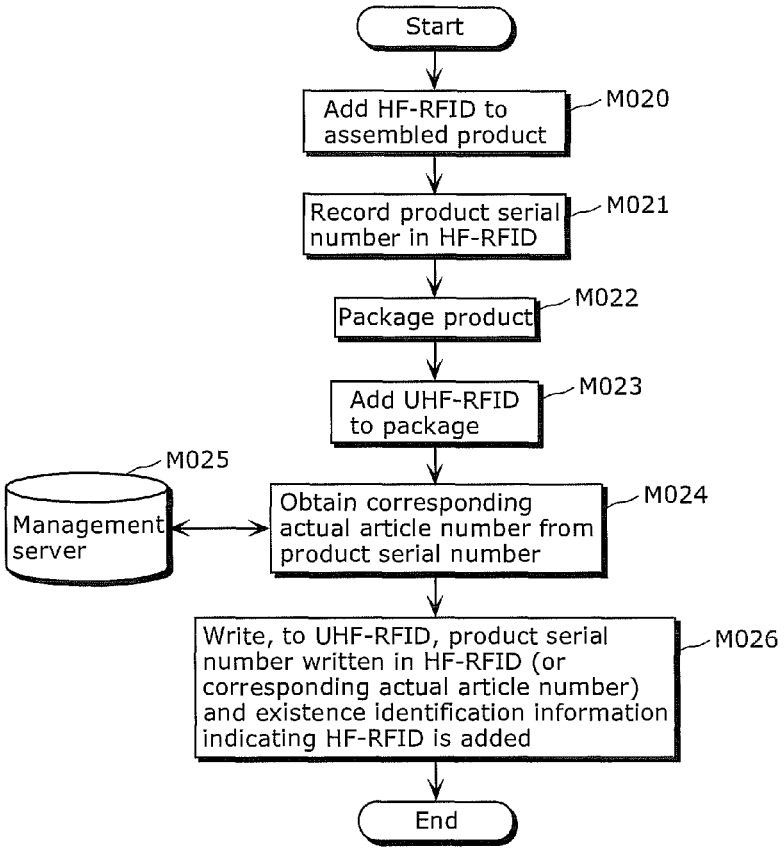

FIG. 109 is a flowchart illustrating a flow of processing of copying the product serial number and the like to the UHF-RFID tag M005 from the HF-RFID tag M001 upon factory shipment of the apparatus M003.

First, the HF-RFID tag M001 is added to the assembled product (the apparatus M003) (M020). This flowchart shows an example where the HF-RFID tag is added after the assembly of the apparatus M003. However, in the case of a structure of a dual interface where the apparatus and the HF-RFID tag can both access a shared memory, the HF-RFID tag M001 is added to the apparatus M003 during assembly of the apparatus M003.

Next, the product serial number of the apparatus M003 is recorded on the HF-RFID tag M001 (M021). This is a step of recording the product serial number on the HF-RFID tag M001 in the assembly process through the handy reader/writer M002. The product serial number is obtained from a management server of the manufacturing line using the handy reader/writer or the like, and recorded on the HF-RFID tag M001 by proximity wireless communication.

After the product serial number is recorded on the HF-RFID tag M001, the apparatus M003 is packaged (M022). The packaging mentioned here denotes packaging for distribution with a cushioning material and the like, or containment into a returnable container and the like.

After completing the packaging, the UHF-RFID tag M005 is added to the package (including a returnable container surface, a management label, and so on) (M023).

Following this, the handy reader/writer M002 communicates with a management server M025, thereby reading the actual article number associated with the product serial number read from the HF-RFID tag M001 (M024). The actual article number is a management number used in product distribution, and is issued by the management server. The actual article number is in a one-to-one correspondence with the product serial number.

After the actual article number is read from the management server M025, the product serial number or the actual article number, and the existence identification information indicating that the HF-RFID tag M001 is added to the apparatus M003, are recorded on the UHF-RFID tag M005 (M026).

As a result of the above processing, the product serial number recorded on the HF-RFID tag M001 which is added to the apparatus M003 is copied to the UHF-RFID tag M005 after apparatus packaging. Typically, the communicable distance of the HF-RFID tag is short, and so it is difficult to access the HF-RFID tag after packaging. In this embodiment, however, the product serial number or the actual article number is recorded on the UHF-RFID tag that has a longer communicable distance than the HF-RFID tag and is added to the package. This allows for apparatus distribution management after packaging.

Moreover, even if the package or the like is discarded after the apparatus is delivered to the consumer, the product serial number and the like can be read by accessing the HF-RFID tag added to the apparatus. Thus, unified management from distribution to consumer use can be achieved, which contributes to traceability over a wide range.

Figure 110:
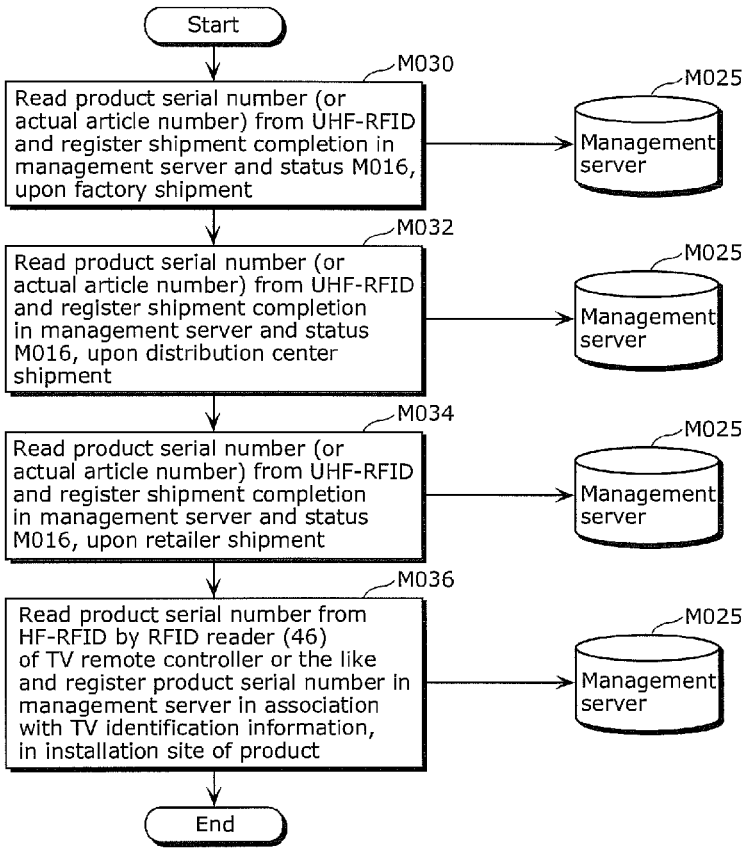

FIG. 110 is a flowchart illustrating a flow of processing in the distribution process of the apparatus M003.

First, upon factory shipment of the apparatus M003, the product serial number or the actual article number is read from the UHF-RFID tag M005 by using a handy reader/writer or passing the product through a UHF-RFID reader gate. Shipment completion is registered in the management server M025 that can communicate with the handy reader/writer or the UHF-RFID reader gate, and also the UHF-RFID tag M005 is accessed from the handy reader/writer or the UHF-RFID reader gate to rewrite the status (M016) in the memory of the UHF-RFID tag M005 to indicate shipment completion (M030).

After factory shipment, the product is retained in the distribution center or the like. Upon subsequent shipment from the distribution center, the product serial number or the actual article number is read from the UHF-RFID tag M005 by a handy reader/writer or a UHF-RFID reader gate, and distribution center shipment completion is registered in the management server M025 and also the status (M016) in the UHF-RFID tag M005 is rewritten to indicate distribution center shipment completion (M032).

Likewise, upon retailer shipment, retailer shipment completion is registered in the management server M025, and the status M016 in the UHF-RFID tag M005 is rewritten to indicate retailer shipment completion (M034).

Lastly, when the apparatus M003 reaches the consumer, the product serial number is read from the HF-RFID tag M001 by the reading unit of the RF-ID reader/writer 46 of the TV remote controller or the like, and registered in the management server M025 in association with TV identification information (M036). Accordingly, in this embodiment too, the server specific information 48 is recorded in the second memory 52 of HF-RFID beforehand. The server specific information 48 in this embodiment indicates the management server M025, and includes a URL for connecting to the management server M025. Hence, by reading the HF-RFID tag M001 of the apparatus M003 using the TV remote controller or the like having the RF reader/writer, management information from manufacture to distribution can be obtained from the management server M025. In addition, by managing the product serial number in association with the TV identification information in the management server M025, it is possible to store a list of apparatuses possessed by the user in the management server in association with the user's TV, without managing personal information of the user.

When the user's apparatus has a problem, a message warning the user is adequately displayed on the TV, with it being possible to prevent a serious accident.

As described above, according to this embodiment, in the manufacturing stage the apparatus and the package are respectively provided with the HF-RFID tag and the UHF-RFID tag, which each carry existence identification information of the other tag. Moreover, the product serial number and the management server specific information stored in the HF-RFID tag are copied to the UHF-RFID tag. As a result, it is possible to provide a system in which management can be performed even after the apparatus reaches the consumer while maintaining distribution management convenience, unlike a conventional system where traceability is attained only during distribution.

Though this embodiment describes management from manufacture to delivery to the user, the present invention has the same advantageous effects even when the user discards or recycles the apparatus. A procedure in this case can be realized in the same way as in this embodiment.

For example, in FIG. 107, upon factory shipment, the product serial number and the like recorded on the HF-RFID tag M001 added to the apparatus M003 are copied to the UHF-RFID tag M005 added to the package M004 after packaging. The same applies to shipment to a disposal facility or shipment to a recycling center, other than factory shipment. In the case of shipment to a disposal facility, after disposal completion, disposal completion is registered in the management server. This enables unified management to be performed while the product is manufactured, used by the consumer, and put into disposal. Recently, there is a problem of illegal disposal due to disposal cost. However, referencing HF-RFID or UHF-RFID of an illegally disposed apparatus makes it instantly clear in which part of the distribution stage the illegal disposal has been conducted. Thus, the problem of illegal disposal can be alleviated according to this embodiment.

In the case of shipment to a recycling center, since use status information, a problem detection status, a total use time, and the like detected by the use status detection unit 7020 are recorded in an area accessible from the HF-RFID tag, such information can be used for determination of whether or not the apparatus is recyclable, price determination, and so on. When the apparatus is determined as recyclable, information such as TV identification information or personal information managed in the management server M025 in association with the product serial number may be updated and put to use.

Thirteenth Embodiment

Figure 111:
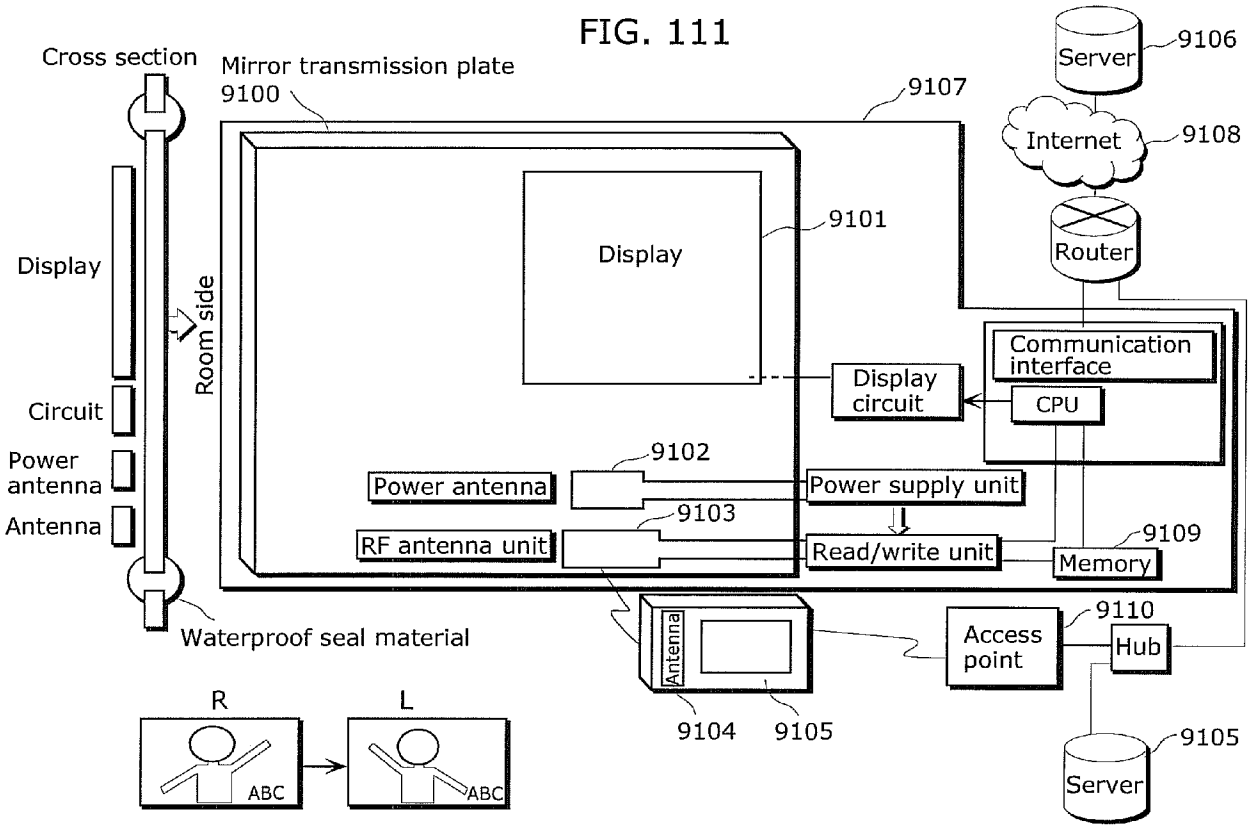
Figure 112:
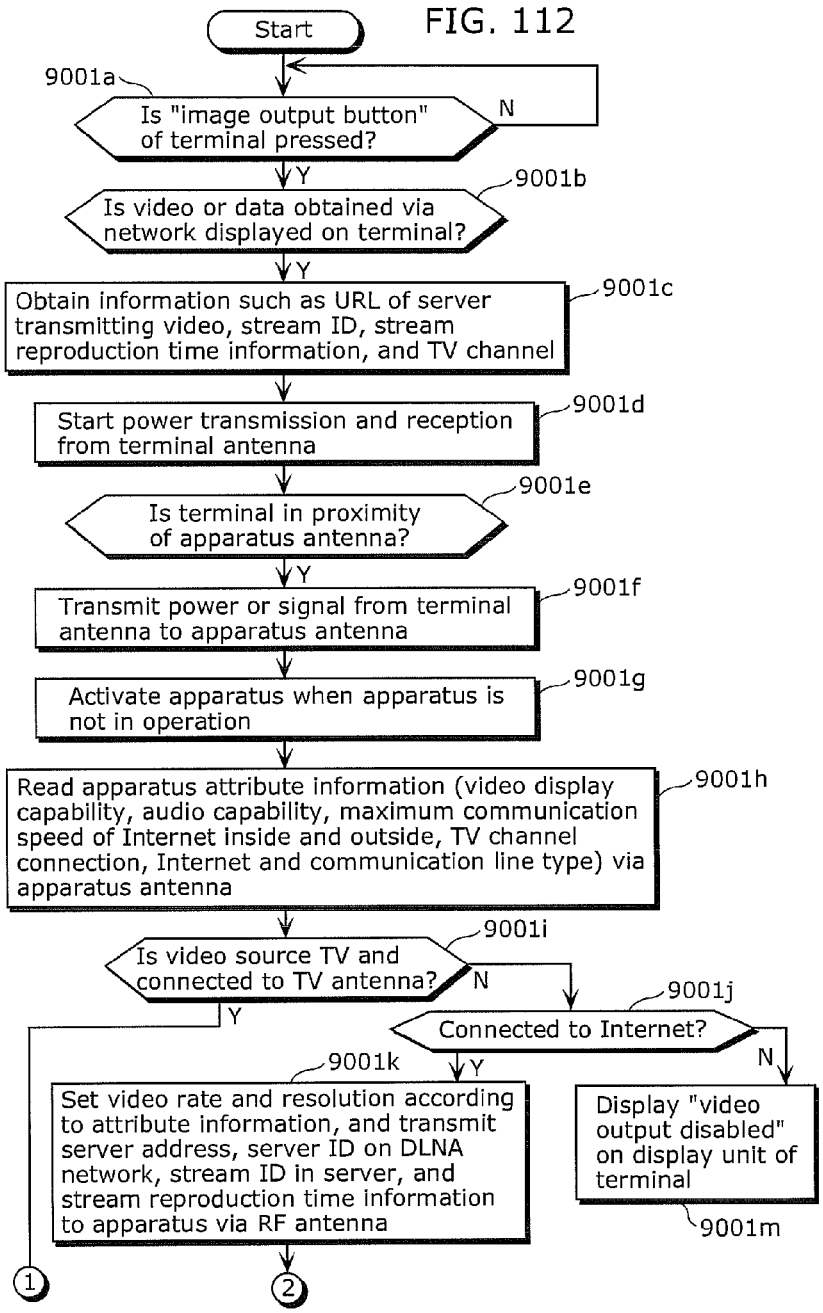

FIG. 111 is a diagram of an overall system structure. A semi-transmissive mirror transmission plate is attached to a mirror unit in a bathroom. A display, a power antenna, and a RF antenna unit are arranged on a back surface of the mirror transmission plate. The user has a mobile terminal with a RF antenna, and displays some kind of video information on the mobile terminal. A procedure of moving this video to the display of the mirror is described below. FIG. 112 is a flowchart of the procedure. First, an image output button of the mobile terminal is pressed (9001a). Whether or not information or data obtained via a network or a TV channel is being displayed on the terminal is determined (9001b). When such information or data is being displayed, a URL or an IP address of a server transmitting the video or data, a stream ID of the video being displayed, stream reproduction time information, and TV channel information are obtained (9001c). After this, power transmission/reception is started from the antenna of the mobile terminal (9001d). When the antenna of the mobile terminal is brought into proximity of the antenna on the apparatus (device) side (9001e), power or a signal is transmitted from the terminal antenna to the apparatus antenna (9001f). The mobile terminal then reads attribute information on the apparatus side (video display capability, audio capability, maximum (average) communication speed of Internet inside and outside the house, whether TV channel connection is available, Internet and communication line type), via the apparatus antenna (9001h).

In the case where a video source is a TV and the apparatus is connected to a TV antenna (9001i), TV channel information and a TV image reproduction display time are transmitted to the apparatus via the antenna (9002a). The apparatus displays video of the TV channel on the screen (9002b). The image is not horizontally flipped in the case of TV (9002c).

Upon receiving a power supply enable flag from the terminal (9002d), the apparatus supplies power to the terminal (9002e).

Referring back to the previous step, in the case where the apparatus is connected to the Internet (9001j), a video rate and resolution are set according to the attribute information of the apparatus, and a server address optimal for the settings, a server ID on a DLNA network, a stream ID in a server, and stream reproduction display time information are transmitted to the apparatus via the RF antenna (9001k).

Figure 113:
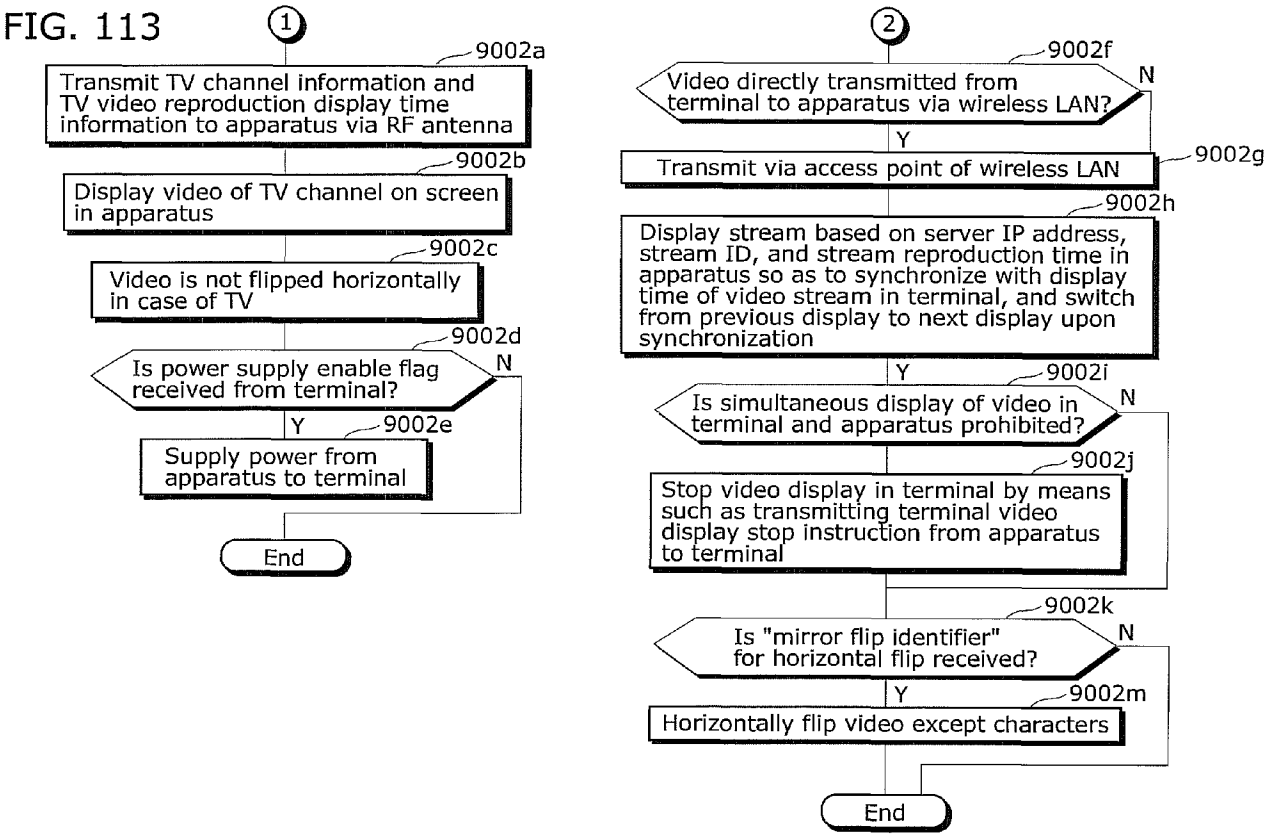

Referring to a flowchart of FIG. 113, the apparatus displays the stream so as to be synchronous with the display time of the video stream being displayed on the terminal, on the basis of the server IP address, the stream ID, and the stream reproduction display time. Once the synchronization has been established, the apparatus switches from the previous display to the next display, that is, the video on the terminal is seamlessly passed to the apparatus (9002h).

In the case where simultaneous display of the video on the terminal and the apparatus is prohibited for copyright protection (9002i), when the video display on the apparatus starts seamlessly, the video display on the terminal is stopped by means such as transmitting a video stop instruction from the apparatus to the terminal (9002j).

Moreover, when the apparatus receives, from the terminal, a "mirror flip identifier" for horizontally flipping the video on the mirror display (9002k), the apparatus horizontally flips the video in the next step. Meanwhile, horizontal flip of characters is not performed (9002m).

According to the above method, first, the terminal supplies power to the apparatus, and activates the apparatus when the apparatus is not in operation. This benefits power saving. After this, once the apparatus has started operation, then the apparatus supplies power to the terminal. In the case where the terminal receives video data from a server or the like and distributes the video to the apparatus via a network, the terminal needs to transmit the video for a long time via an access point by wireless LAN. When transmitting a large amount of data by wireless LAN, power consumption is high, and there is a possibility that the battery level of the terminal becomes 0. However, this embodiment provides an advantageous effect of preventing battery drain by supplying power from the apparatus to the terminal. Moreover, the mirror shows a reversed image of a human figure. For example, as in the case of a video instruction for toothbrushing, leaning effectiveness decreases because right and left are reversed. However, this embodiment facilitates leaning by horizontal flipping the image.

Fourteenth Embodiment

Figure 114:
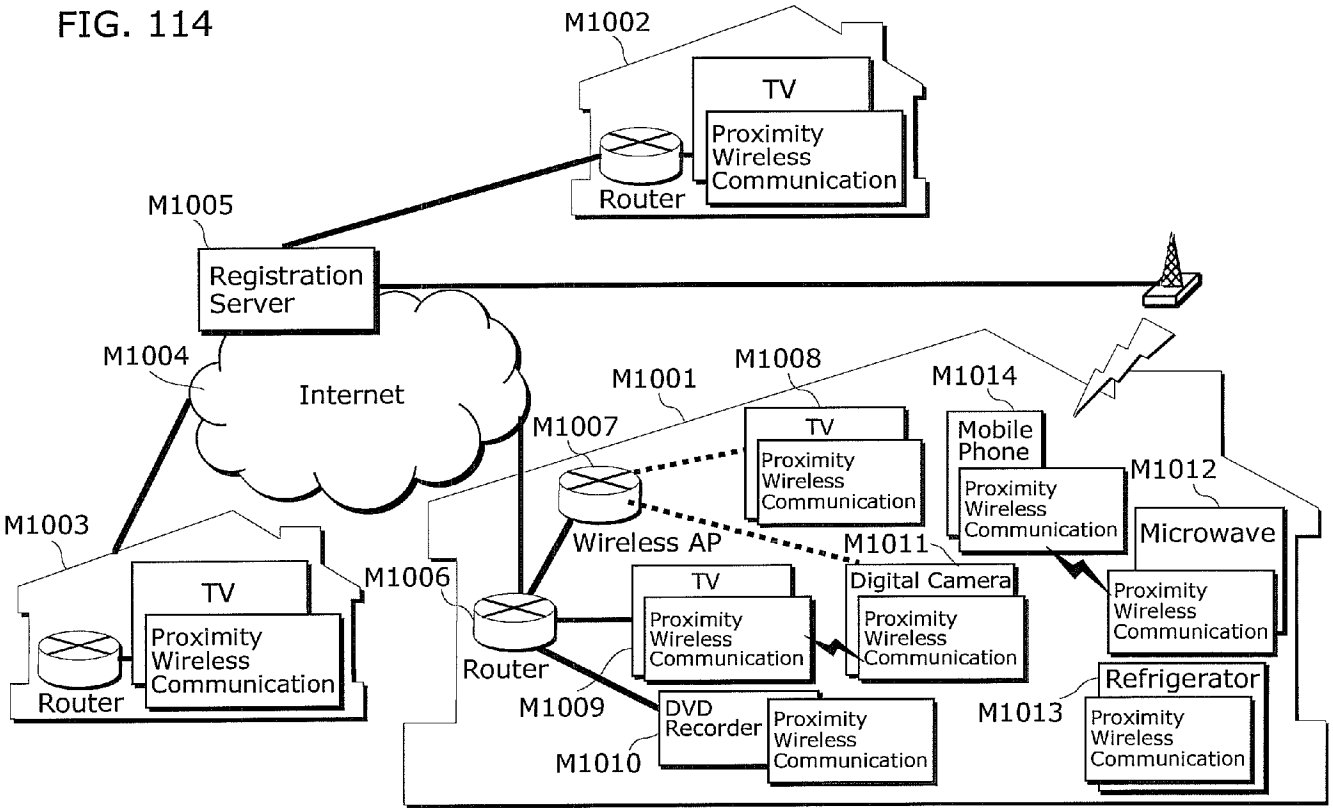

The following describes the fourteenth embodiment of the present invention. FIG. 114 illustrates environments of home networks assumed in the present embodiment. A home network is established in each of houses M1001, M1002, and M1003. Each of the home networks is connected to a registration server M1005 via the Internet M1004. If services provided via a home network are limited within a corresponding house, the registration server M1005 may exist in the house. It is also possible that a home network is divided into various places such as a vacation house and an office, and that a plurality of home networks are used in a single house such as a dormitory or a room-sharing house. It is assumed that, in a house, there are home appliances which are always connected to the Internet (hereinafter, referred to as "always-connected home appliances") and home appliances which are not always connected to the Internet (hereinafter, referred to as "non-always-connected home appliances"). The always-connected home appliances, such as TVs M1008 and M1009, a DVD recorder M1010, and the like, are connected to the Internet via a router M1006 or a wireless Access Point (wireless AP) M1007. The non-always-connected home appliances, such as a digital camera M1011, a microwave M1012, and a refrigerator M1013, are indirectly connected to the Internet as needed. In the present embodiment, a mobile terminal (mobile device) such as a mobile phone M1014 is also a terminal included in the home network. The devices in the present embodiment can perform simple data communication with other device each other by using a proximity wireless communication device. Each of the devices obtains information of other device using the proximity wireless communication device, and registers the obtained information into the registration server M1005 using a home network device.

Figure 115:
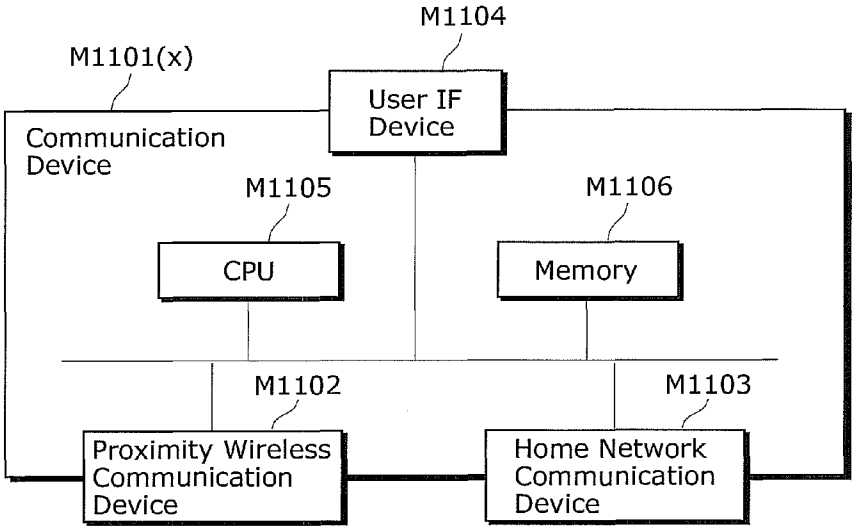

FIG. 115 is a hardware diagram of a communication device M1101 according to the present embodiment. The communication device M1101 is assumed to have two devices for communication. One of them is a proximity wireless communication device M1102. In general, examples of the proximity wireless communication device M1102 are a Near Field Communication (NFC) function or a Radio Frequency (RF) tag. The other device is a home network communication device M1103. Examples of the home network communication device M1103 are: a wireless communication device using a wireless Local Area Network (wireless LAN) or ZigBee, which is used in connecting home appliances to each other; a wired communication device using Ethernet™ or Power Line Communication (PLC); and a communication device using WiMax or Third Generation Partnership Project (3GPP), which is used in mobile phones. The communication device also includes a user interface (IF) device M1104. The user IF device is, for example, an input device such as buttons, a display, and an output device using a Light Emitting Diode (LED) or the like. For devices such as TVs and air conditioners, data input/output is generally performed by using a remote controller that is physically separated from the device. For convenience of the description, such a remote controller is also considered as the user IF device in the present embodiment.

Figure 116:
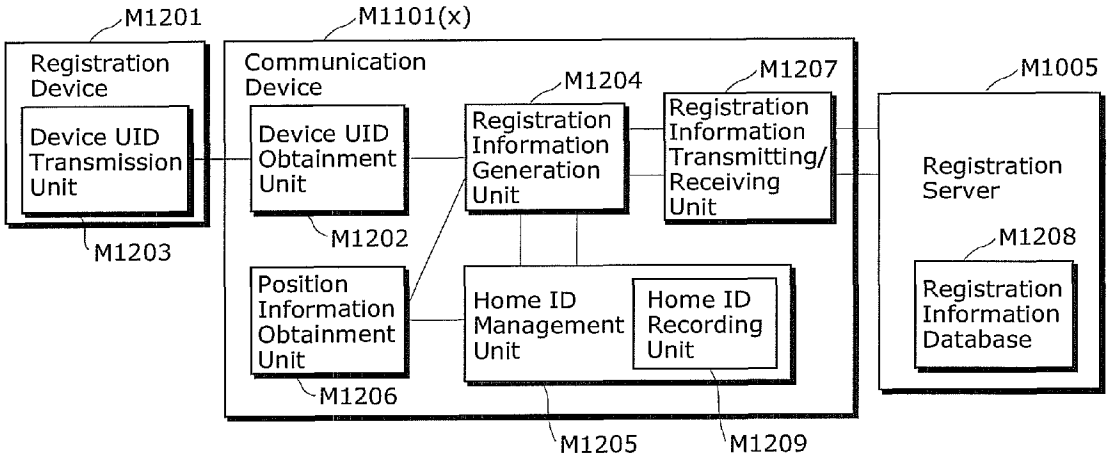

FIG. 116 is a functional block diagram for explaining a function of a CPU M1105 in the communication device M1101. A device UID obtainment unit M1202 in the communication device M1101 obtains information including device UID for identifying a registration device M1201 (that is a device to be registered). Here, the registration device M1201 transmits a registration command and registration information including device UID of the registration device M1201 to the communication device M1101, by using the proximity wireless communication device M1102. A registration information generation unit M1204 obtains the registration information including the device UID from the device UID obtainment unit M1202, and obtains home ID from a home ID management unit M1205. Then, the registration information generation unit M1204 adds the home ID to the registration information obtained from the registration device M1201 via the device UID obtainment unit M1202, to generate information-added registration information. If position information of the registration device M1201 or the like is to be added to the registration information, the registration information generation unit M1204 obtains the position information from a position information obtainment unit M1206. Examples of the position information are address information based on a post code inputted to a TV, geographical position information generated by a Global Positioning System (GPS) of a mobile phone, and the like. If position information of the registration device M1201 is registered, the registered position information can be used to easily provide services to improve home appliance traceability or the like. The registration information generation unit M1204 transmits the registration information added with the home ID to the registration information transmitting/receiving unit M1207. The home ID management unit manages home ID that is different from communication device ID used by the communication device included in the above-described home network. In conventional home networks, a master device of each communication device manages information for the communication device. The management method is different depending on a type of the corresponding communication device. Therefore, it is not possible to manage information on home-by-home basis. Although there is a situation where ID is inputted by a user for each service, this results in quite low usability. In the present embodiment, introduction of new different ID that is home ID makes it possible to manage pieces of information of devices included in a home network without using a communication device or services. When the home ID management unit registers information of a device to the server at the first time, the home ID management unit generates home ID. The home ID may be generated based on position information or UID of the communication device. It is also possible to generate home ID based on a random number to check whether or not the generated home ID does not overlap with any other ID in the registration server. It is further possible that a user sets the home ID. When a registration information transmitting/receiving unit M1207 in the communication device M1101 receives registration information from the registration information generation unit M1204, the registration information transmitting/receiving unit M1207 transmits the received registration information to the registration server M1005 using the home network communication device M1103. The registration server M1005 compares the received registration information to pieces of information stored in the registration database M1208 to determine whether or not the received registration information can be registered. Then, the registration server M1005 sends a registration response back to the communication device M1101. In receiving the registration response, the registration information transmitting/receiving unit M1207 notifies the user of a result of the determination by using the user IF device M1104. If the registration server M1005 determines that the received registration information cannot be registered, the registration information transmitting/receiving unit 1207 notifies the determination to the registration information generation unit M1204 in order to request change of the registration information. Thereby, it is possible to collectively manage devices in a home network including white goods that do not have user IF devices for communication.

Figure 117:
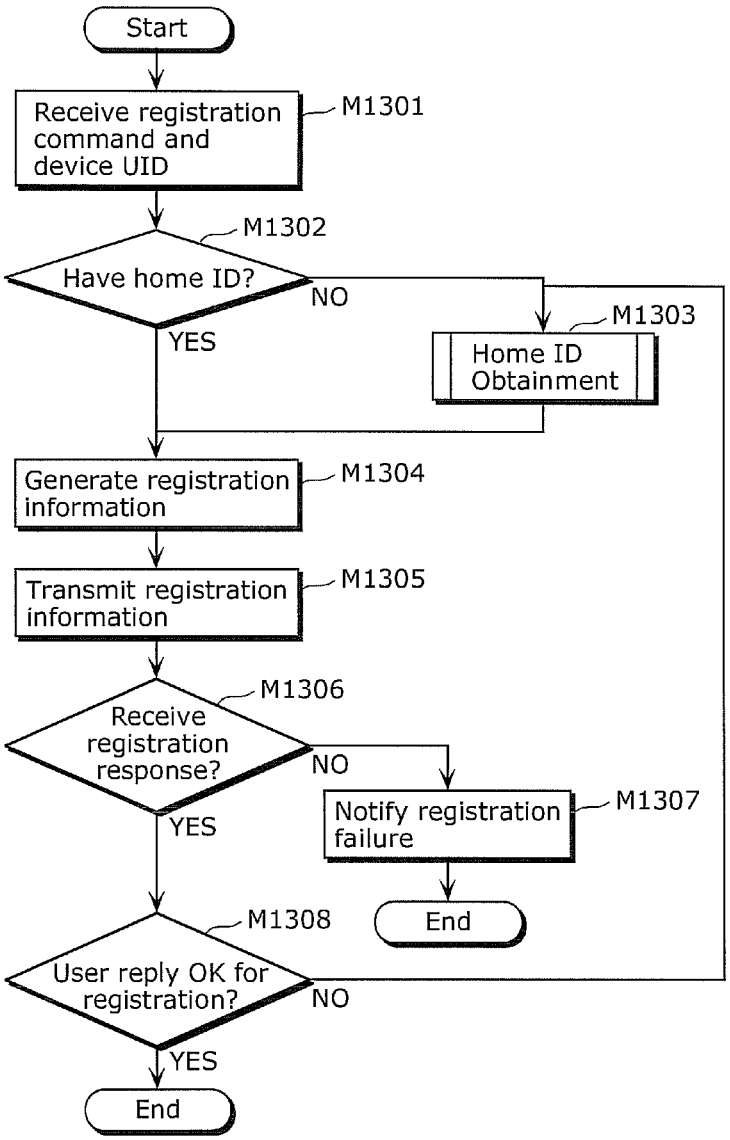

FIG. 117 is a flowchart of registering information of the communication device. The communication device M1101 receives the registration command and the device UID from the registration device M1201 by using the device UID obtainment unit M1202 (M1301). After receiving the registration command and the device UID, the communication device M1101 determines whether or not the communication device M1101 has home ID (M1302). If the communication device M1101 does not have the home ID (NO at M1302), then the communication device M1101 obtains home ID (the processing is referred to as "home ID obtainment") (M1303). On the other hand, if the communication device M1101 has the home ID (YES at M1302), the communication device M1101 generates information of the communication device to be registered into the communication device M1101 itself (hereinafter, referred to as "registration information" or "home ID") (M1304). Next, the communication device M1101 transmits the registration information to the registration server M1005 by using the registration information transmitting/receiving unit M1207 (M1305). The communication device M1101 determines whether or not the communication device M1101 receives a response (registration response) to the transmitted registration information from the registration server M1005 (M1306). If the response is not received, then the communication device M1101 presents a user with a registration failure notification for notifying a failure of the registration processing (M1307) and terminates the registration processing. On the other hand, if the communication device M1101 receives the response, then the communication device M1101 presents the user with an inquiry asking whether or not to register the generated information into the communication device M1101 (M1308). If the user replies OK, then the communication device M1101 completes the registration processing. If the user replies NO, the communication device M1101 returns to the home ID obtainment. When it is difficult to obtain home ID, the registration processing is terminated as a failure.

Figure 118:
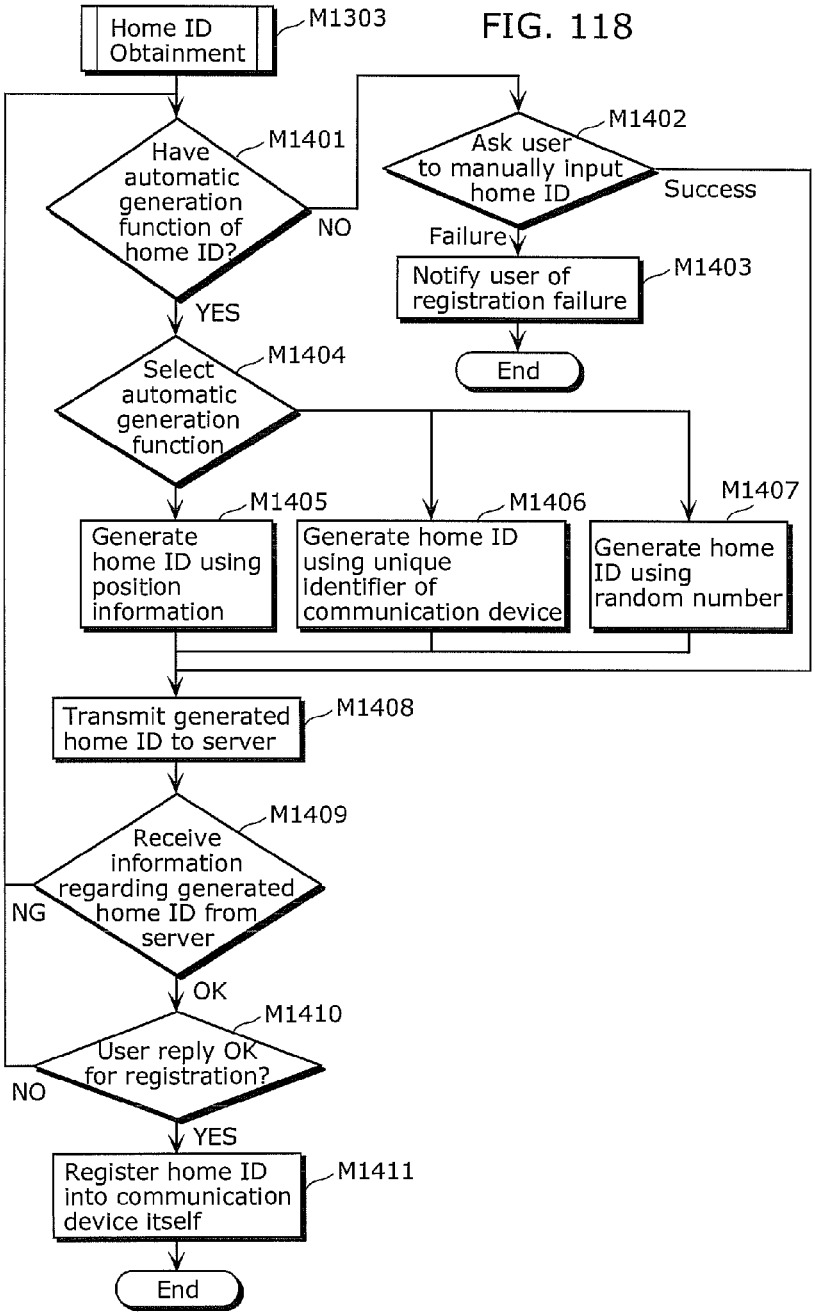

FIG. 118 is a flowchart of the home ID obtainment. The communication device M1101 determines whether or not the communication device M1101 has a function of automatically generating home ID (hereinafter, referred to also as an "automatic generation function") (M1401). If the communication device M1101 has the function, then the communication device M1101 automatically generates the home ID. On the other hand, if the communication device M1101 does not have the function, the communication device M1101 asks the user to manually input the home ID. If there is no method for manually inputting home ID or the user refuses to the manual input, then the communication device M1101 notifies the user of a failure of the registration processing (M1403) to persuade the user to obtain the home ID by any different method. When the communication device M1101 automatically generates home ID, the communication device M1101 selects an appropriate automatic generation function (M1404). If the communication device M1101 can obtain geographical position information by a GPS or the communication device M1101 is a terminal such as a TV for which an address as position information has been generally registered, the communication device M1101 generates the home ID using the position information (M1405). If the communication device M1101 is a terminal generally set in a house, the communication device M1101 generates the home ID using a unique identifier of the communication device M1101 (M1406). Especially if it is difficult to generate effective home ID, the communication device M1101 generates the home ID using a random number (M1407). After generating the home ID, the communication device M1101 transmits the home ID to the server (M1408). Then, the communication device M1101 receives information regarding the generated home ID from the server, and thereby determines whether or not the home ID can be used (M1409). If it is determined that the home ID cannot be used, then the communication device M1101 returns to the processing of generating the home ID. On the other hand, if the home ID can be used, then the communication device M1101 asks the user whether to not to register the generated home ID into the communication device M1101 itself (M1410). If the user replies OK, then the communication device M1101 registers the home ID into the communication device M1101 itself (M1411). Otherwise, the communication device M1101 returns to the processing of generating the home ID.

Figure 119:
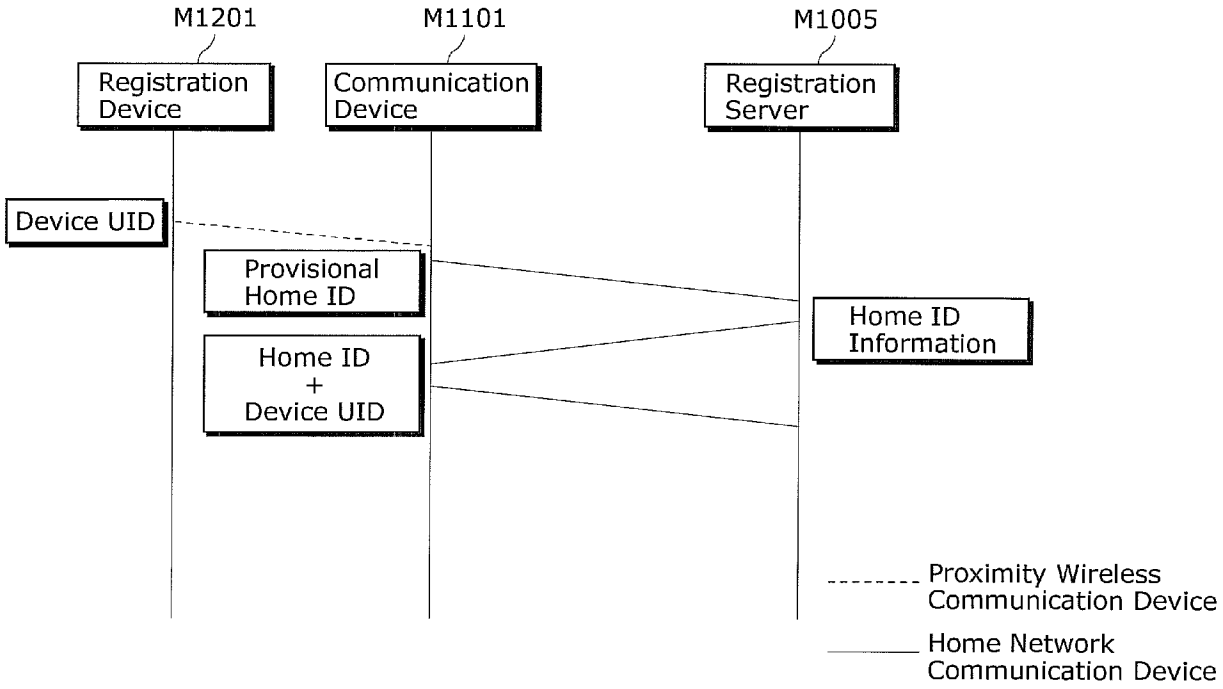

FIG. 119 is a flowchart of registering information of the registration device. The registration device M1201 transfers a registration command and information including device UID for identifying the registration device M1201, to the communication device M1101 via the proximity wireless communication device. If the communication device M1101 does not have home ID, the communication device M1101 generates provisional home ID and transmits the generated provisional home ID to the registration server M1005 via the home network communication device. The registration server M1005 sends a response with information regarding the provisional home ID to the communication device M1101. On the other hand, if the communication device M1101 has home ID or if the communication device M1101 receives, from the registration server M1005, home ID that is allowed by the registration server M1005 to be used, the communication device M1101 transmits the home ID and the registration information including the device UID to the registration server M1005, thereby completing the registration of information of the registration device M1201.

Fifteenth Embodiment

Figure 120:
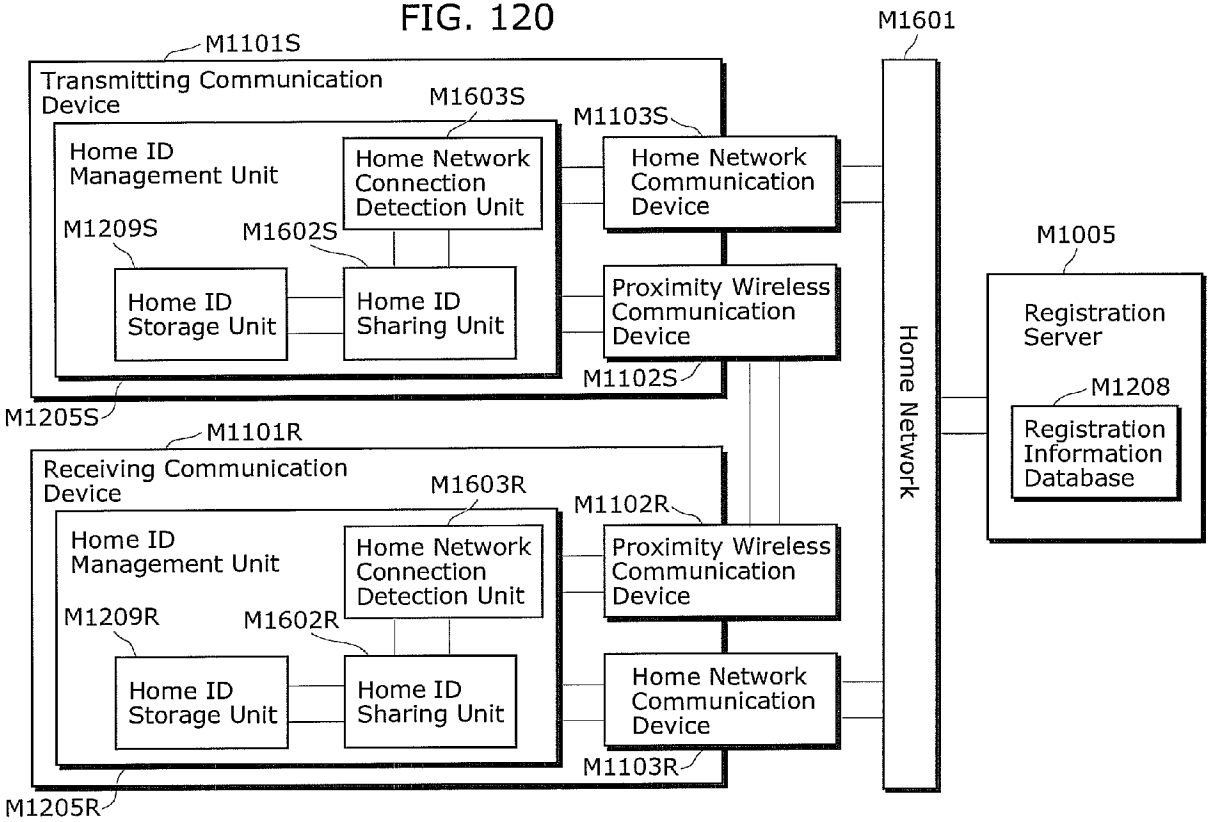

In the fifteenth embodiment of the present invention, a configuration in which the home ID is shared among communication terminals (communication devices) is described. FIG. 120 is a functional block diagram illustrating a function of sharing home ID between communication devices. Communication devices M1101S and M1101R included in a home network share the same home ID using a home network M1601 and the home network communication devices M1103. The communication devices M1101S and M1101R may share the home ID using the proximity wireless communication devices M1102. The communication device according to the present embodiment (hereinafter, referred to as a "transmitting communication device M1101S") can share the home ID with another communication device (hereinafter, referred to as a "receiving communication device M1101R") in the same house, by transferring a sharing command and home ID to the receiving communication device via the proximity wireless communication devices M1102. In the transmitting communication device M1101S, a home ID sharing unit M1602S in a home ID management unit M1205S provides the sharing command and the home ID that is held in a home ID storage unit M1209S, to a proximity wireless communication device M1102S. For example, when the proximity wireless communication device M1102S of the transmitting communication device M1101S is moved into proximity of a proximity wireless communication device M1102R of the receiving communication device M1101R, information is transferred between them. Thereby, the home ID in the transmitting communication device M1101S is stored into the proximity wireless communication device M1102R of the receiving communication device M1101R. If a home ID storage unit M1209R in the receiving communication device M1101 does not hold any home ID, a home ID sharing unit M1602R in the receiving communication device M1101R stores the received home ID into the receiving communication device M1101R itself. Thereby, it is possible to quite easily share the home ID between the communication devices. On the other hand, if the home ID storage unit M1209R already holds home ID, the receiving communication device M1101R transmits both the held home ID and the received home ID to the registration server M1005. In receiving both home IDs, the registration server M1005 manages both home IDs virtually as a single home ID. The registration server M1005 may notify both communication devices of one of the home IDs to unify them. Even in this case, the registration server M1005 manages both home IDs virtually as a single home ID since there are non-always-connected devices in the home network. It is possible that ID of a non-always-connected device is updated every time of being connected to the home network and the virtual management by the registration server M1005 ends when updating of all of the registration devices (namely, devices to be registered which are included in the home network) are completed. Thereby, it is possible to unify originally plural home networks into a single network.

The home ID sharing can be performed by using the home network. When a communication device is to be connected to the home network M1601 and a home network connection detection unit M1603S of the communication device detects that the communication device does not hold home ID, the communication device broadcasts a request for home ID sharing to terminals connected to the home network M1601. Terminals holding home ID among the terminals connected to the home network M1601 transmit the home ID to the communication device. Thereby, the home ID sharing is completed prior to start of communication. Here, if a master terminal to respond to requests for home ID sharing is previously selected from among terminals holding the home ID, it is possible to prevent that a device requesting home ID sharing receives responses from a plurality of terminals thereby overburdening the home network. If there is no response, the communication device terminal requesting home ID sharing may obtain home ID by itself.

FIG. 121 is a flowchart of processing performed by the receiving communication device M1101R when home ID is shared using the proximity wireless communication device M1102. When the receiving communication device M1101R receives a sharing command and home ID (M1701), the receiving communication device M1101R determines whether or not the receiving communication device M1101R holds home ID (M1702). If the receiving communication device M1101R does not hold home ID, then the receiving communication device M1101R registers the received home ID, as home ID, into the receiving communication device M1101R itself (M1703). On the other hand, if the receiving communication device M1101R holds home ID, the receiving communication device M1101R compares the held home ID to the received home ID. If the held home ID is identical to the received home ID, the receiving communication device M1101R terminates the processing without any further processes. On the other hand, if the held home ID is not identical to the received home ID, the receiving communication device M1101R selects home ID (M1705). The selection of home ID may be performed by the receiving communication device M1101R or the registration server. In the situation where the receiving communication device M1101R asks the registration server to perform the selection, the receiving communication device M1101R transmits the held home ID and the received home ID to the registration server as sharing information (M1706). Thereby, the receiving communication device M1101R receives, from the registration server, a sharing response including home ID selected by the registration server (M1707). Then, the communication device M1101R inquiries the user whether or not to share (register) the selected ID into the communication device M1101R (M1708). If the user replies OK, the registration processing is completed. If the user replies NO, the received ID receiving communication device M1101R returns to the processing for selecting home ID. In the case where the receiving communication device M1101R itself selects the held home ID, the receiving communication device M1101R transmits the held home ID as home ID and the received home ID as sharing home ID to the registration server (M1709). The registration server notifies updating of the home ID to other communication devices already sharing home ID. In the situation where the receiving communication device M1101R selects the received home ID, then the receiving communication device M1101R updates the held home ID by the received home ID (M1710). In addition, the receiving communication device M1101R transmits the previously held home ID as sharing home ID and the received home ID as home ID to the registration server (M1711). The registration server notifies updating of the home ID to other communication devices already sharing home ID.

FIG. 122 is a flowchart of processing performed by the transmitting communication device M1101S when home ID is shared using the proximity wireless communication device M1102. After transmitting a sharing command and home ID to the registration server, the transmitting communication device M1101S determines whether or not a response to the home ID sharing is received from the registration server (M1752). If there is no response, the transmitting communication device M1101S terminates the processing. On the other hand, if the response including a notification of updating home ID is received, the transmitting communication device M1101S updates the home ID by the notified home ID (M1753) and completes the processing.

FIG. 123 is a sequence diagram of the situation where the registration server selects home ID. The transmitting communication device M1101S transmits home ID_A to the receiving communication device M1101R by using the proximity wireless communication device. The receiving communication device M1101R transmits home ID_B that is held in the receiving communication device M1101R itself and the received home ID_A to the registration server M1005. The registration server selects the home ID_B from the received home IDs, and notifies the home ID_B to a communication device holding the home ID_A and the receiving communication device M1101R to cause the devices to register the home ID_B.

FIG. 124 is a flowchart of processing performed by the transmitting communication device M1101S when home ID is shared using the home network communication device M1103. The transmitting communication device M1101S detects connection to the home network (M1801), and broadcasts a request for home ID sharing to terminals in the home network (M1802). If a response to the request for home ID sharing is received, the transmitting communication device M1101S registers home ID received with the response into the transmitting communication device M1101S itself (M1804). On the other hand, if the response is not received, the transmitting communication device M1101S performs the home ID obtainment (M1303).

FIG. 125 is a flowchart of processing performed by the receiving communication device M1101R when home ID is shared using the home network communication device M1103. After receiving the request for home ID sharing (M1851), the receiving communication device M1101R determines whether or not the receiving communication device M1101R itself is a master terminal selected in the home network (M1852). If the receiving communication device M1101R is the master terminal, then the receiving communication device M1101R transmits home ID held in the receiving communication device M1101R itself in response to the request (M1853). On the other hand, if the receiving communication device M1101R is not the master terminal, then the receiving communication device M1101R does not perform any processes. Here, if a master terminal is not selected from terminals holding home ID, the receiving communication device M1101R responds to all requests for home ID sharing from any terminals without the determination regarding the master terminal.

FIG. 126 is a sequence diagram of the situation where the home ID is shared using the home network communication device M1103. When a communication device detects connection to a home network, the communication device broadcasts a request for home ID sharing to terminals in the home network. Only a communication device M1854 selected as the master terminal from among communication devices receiving the request responds to the request. The communication device receiving the response registers home ID received with the response, into the communication device itself.

Sixteenth Embodiment

A communication device according to the sixteenth embodiment of the present invention is described in detail with reference to the drawings. The communication device according to the present embodiment of the present invention reads terminal apparatus information regarding a terminal apparatus from the terminal apparatus by using a Near Field Communication (NFC) function, and transfers the terminal apparatus information to a server via a general-purpose network.

FIG. 127 illustrates a system according to the present embodiment. The system according to the present embodiment includes a terminal apparatus Y01, a communication device Y02, and a server Y04. The subject of the present embodiment is the communication device Y02.

The terminal apparatus Y01 is a device having a NFC function (RF-ID unit, IC tag, or NFC tag emulation). The terminal apparatus Y01 is, for example, an electronic terminal apparatus such as a refrigerator, a microwave, a washing machine, a TV, or a recording device. The terminal apparatus Y01 has an internal memory for holding, as terminal apparatus information, a product serial number that is ID for identifying the terminal apparatus Y01, use history information of the terminal apparatus Y01, error information, and the like.

The communication device Y02 has a NFC function for communicating with the NFC function of the terminal apparatus Y01 by proximity wireless communication. The communication device Y02 includes a reader/writer function of reading the terminal apparatus information from the terminal apparatus Y01. The communication device Y02 is, for example, a portable device such as a mobile phone or a remote controller terminal of a TV.

The server Y04 is a server connected to the communication device Y02 in order to communicate with the communication device Y02, via a general-purpose network such as the Internet. The server Y04 includes a database (DB) for accumulating the terminal apparatus information that is read from the terminal apparatus Y01 to the communication device Y02.

The terminal apparatus Y01 includes a Central Processing Unit (CPU) Y011, a failure sensor unit Y012, a use history logging unit Y013, a memory Y014, a modulation unit Y017, and an antenna Y018.

The CPU Y011 is a unit that controls a system of the terminal apparatus Y01. The CPU Y011 controls the failure sensor unit Y012, the use history logging unit Y013, the memory Y014, and the modulation unit Y017 which are units included in the terminal apparatus.

The failure sensor unit Y012 is a unit that detects a location and detail of a failure occurred in each unit included in the terminal apparatus Y01. A piece of failure information detected by the failure sensor unit Y012 is accumulated in a Random Access Memory (RAM) in the memory Y014. The detected failure information is represented by an error code that is uniquely defined depending on a location and condition of the failure.

The use history logging unit Y013 is a unit that performs logging for each piece of use history information every time the terminal apparatus Y01 is operated by the user. The use history information applied with logging is accumulated into the RAM Y016 in the memory Y014. In general, when use history information is used to examine how a failure has occurred, several pieces of use history information up to occurrence of the failure have high priorities of being examined. Therefore, it is desirable that the use history logging unit Y013 according to the present embodiment uses the RAM Y016 as First In First Out (FIFO) to chronologically accumulate new pieces of use history information into the RAM Y016. Moreover, when use history information is used to examine how a failure has occurred, it is desirable that several pieces of use history information up to a timing detected by the failure sensor unit Y012 are stored as priorities into the RAM. Therefore, if when five minor failures are detected in using the terminal apparatus Y01, several pieces of operation (use) history information up to the five failures are stored as priorities.

The memory Y014 includes a Read Only Memory (ROM) Y015 and the RAM Y016.

The ROM Y015 previously stores at least a product serial number for uniquely identifying the terminal apparatus Y01 when the terminal apparatus Y01 has been shipped. The user of the terminal apparatus Y01 cannot update the information previously held in the ROM Y05. The product serial number is desirably information by which a manufacturer, a manufacturing lot number, and a manufacturing date of the terminal apparatus Y01 can be determined. It is also desirable that the ROM Y015 is embedded in a semiconductor chip of the CPU Y011. This structure prevents information during memory access to be easily inspected. Therefore, secret key information for authentication and encrypted communication in proximity wireless communication with the communication device can be recorded on the ROMY015 when shipping.

The RAMY016 is a rewritable memory in which the failure information detected by the failure sensor unit Y012 and the use history information applied with logging of the use history logging unit Y013 are accumulated.

The modulation unit Y017 is a unit that modulates communication data for proximity wireless communication with the communication device Y02. The modulation method varies depending on employed NFC standard. For example, Amplitude Shift Keying (ASK), Frequency Shift Keying (FSK), Phase Shift Keying (PSK), and the like are used.

An example of the antenna Y018 is a loop antenna. The antenna Y018 generates electromagnetic induction from radio waves emitted from an antenna of the communication device Y02. The antenna Y018 performs at least processing of providing power to the modulation unit Y017 and the memory Y014 to be operated. In addition, the antenna Y018 overlaps reflected waves of the radio waves emitted from the communication device Y02 with signals modulated by the modulation unit Y017 to transmit the terminal apparatus information that is stored in the memory Y014 to the communication device Y02.

As described above, the terminal apparatus according to the present embodiment detects failures occurred in each unit included in the terminal apparatus. Then, the terminal apparatus performs logging for use histories to accumulate the use histories into the memory. Then, if the terminal apparatus is moved into proximity of the communication device Y02 to be capable of performing proximity wireless communication with the communication device Y02, the terminal apparatus can transmit the terminal apparatus information stored in the memory into the communication device Y02.

Next, the communication device Y02 according to the present embodiment is described. It should be noted that the subject of the present embodiment is the communication device Y02.

The communication device Y02 includes an antenna Y021, a CPU Y022, a demodulation unit Y023, a memory Y024, a position information determination unit Y027, a GPS antenna Y031, a communication memory Y032, an information adding unit Y035, and a communication unit Y036.

The antenna Y021 performs polling for calling any terminal apparatuses in order to search for a terminal apparatus communicable with the communication device Y02 by proximity wireless communication. In receiving a response to the polling, the antenna Y021 establishes proximity wireless communication with the responding terminal apparatus Y01 to receive modulated terminal apparatus information from the terminal apparatus Y01, and provides the modulated terminal apparatus information to the demodulation unit Y023. In general, the polling processing is always necessary even if there is no terminal apparatus communicable with the communication device Y02 by proximity wireless communication. This consumes power. Therefore, the communication device Y02 is provided with a switch (not shown) for controlling a timing of start of polling, so that polling processing is performed when the switch is turned ON. This structure can significantly shorten a time period of the polling. As a result, the power consumption amount of the communication device Y02 can be considerably reduced. This is especially efficient when the communication device Y02 operates by a limited power source such as a battery.

The CPU Y022 is a unit that controls a system of the communication device Y02. The CPU Y022 controls operations of each unit included in the communication device Y02.

The modulation unit Y023 is a unit that demodulates data modulated by the modulation unit Y017 of the terminal apparatus Y01. The demodulated terminal apparatus information is temporarily stored into the memory Y024.

The memory Y024 includes a ROM Y025 and a RAM Y026.

The ROM Y025 is a memory that cannot be rewritten by the outside. The ROMY025 previously holds a product serial number for uniquely identifying the communication device Y02 when the communication device Y02 has been shipped. The product serial number is desirably information by which a manufacturer, a manufacturing lot number, and a manufacturing date of the communication device Y02 can be determined. It is also desirable that the ROMY025 is embedded in a semiconductor chip of the CPU Y022. This structure prevents information during memory access from being easily inspected. Therefore, secret key information for authentication and encrypted communication in proximity wireless communication with the terminal apparatus Y01 can be recorded on the ROM Y025 when shipping.

The RAM Y026 holds the terminal apparatus information of the terminal apparatus Y01 which is received by the antenna Y021 and demodulated by the demodulation unit Y023. As described earlier, the terminal apparatus information includes the product serial number for uniquely identifying the terminal apparatus Y01, the use history information of the terminal apparatus Y01, and failure codes.

The position information determination unit Y027 is a group of sensors for determining a location of the communication device Y02. The position information determination unit Y027 includes a latitude/longitude positioning unit (GPS) Y028, an altitude positioning unit Y029, and a position correction unit Y030. The position information determination unit Y027 does not need to always determine a location of the communication device Y02 (location information) if the location information is generated at a timing where the communication device Y02 becomes communicable with the terminal apparatus Y01 using the antenna Y021. As a result, power consumption of the communication device Y02 can be reduced.

The latitude/longitude positioning unit Y028 is a general Global Positioning System (GPS) that receives radio waves from satellites to perform 3-dimensional (3D) positioning of the earth.

The altitude positioning unit Y029 is a general altimeter. The altitude positioning unit Y029 may be any various altimeters, such as an altimeter receiving radio waves to extract an altitude, an altimeter detecting an air pressure to measure an altitude, and the like. The altitude positioning unit Y029 is provide to the communication device Y02 so that an altitude can be detected even in a building where GPS cannot receive radio waves.

The position correction unit Y030 is a unit that corrects a value measured by the GPS to generate more accurate position information. In general, when radio waves from satellites cannot be received in a room or the like, the GPS cannot generate correct position information. Therefore, the position correction unit Y030 includes an electronic compass and a 6-axis acceleration sensor. The electronic compass is used to detect a direction in which the communication device Y02 moves and the acceleration sensor is used to detect a speed of the movement. Thereby, it is possible to correct position information generated by the GPS in a location where the GPS is difficult.

Regarding the information adding unit Y035, when the terminal apparatus information that has been provided from the terminal apparatus Y01 and stored into the memory Y024 is to be transmitted to the server Y04, the information adding unit Y035 adds (a) the product serial number of the communication device Y02 that is stored in the ROM Y025 in the memory Y024 and (b) the position information measured by the position information determination unit Y027, to the terminal apparatus information. This enables the server Y04 to determine which communication device transmits the terminal apparatus information, where the transmitting terminal apparatus is located, for example, and then manage the results of the determination. For example, if a manufacturer of the terminal apparatus finds that the terminal apparatus has a possibility of causing serious accidents, the information in the database of the server Y04 allows the manufacturer to determine where the terminal apparatus is. Thereby, the possibility of causing serious accidents can be reduced. As a result, it is possible to increase sense of safety and security of the user using the terminal apparatus. Furthermore, when the communication device Y02 has a display function as mobile phone terminals have, the above-described terminal apparatus information generated by the information adding unit Y035 makes it possible to determine with which communication device the terminal apparatus having a possibility of accidents can perform proximity wireless communication, and thereby display a notification of the possibility of accidents in the terminal apparatus on the communication device Y02. Thereby, even if such a terminal apparatus generally does not have any display function and is not connected to a general-purpose network, it is possible to transmit a notification of the accident possibility of the terminal apparatus to the communication device Y02 in order to warn the user using the terminal apparatus. As a result, it is also possible to provide a terminal apparatus that can increase sense of safety and security of the user using the terminal apparatus.

The communication unit Y036 is a unit that communicates with the server Y04 via the Internet by using general LAN, wireless LAN, or mobile phone network. Thereby, the communication unit Y036 transmits, to the server Y04, the terminal apparatus information added with the product serial number and the position information of the communication device Y02 as the communication device information. Here, the added terminal apparatus information is further added with a MAC address and an Internet Protocol (IP) address to be transmitted to the server Y04.

The server Y04 is connected to the communication device Y02 via a general-purpose network such as the Internet. The server Y04 includes a device management database (DB) for managing the terminal apparatus information.

The device management DB Y041 stores the terminal apparatus information in association with the communication device information. In the device management DB Y041 according to the present embodiment, the communication device information is managed as parent device information, and the terminal apparatus information is managed as child device information in association with the parent device information. The child device information is added with the position information generated by the communication device in order to manage further information indicating where the terminal apparatus is.

As described above, in the system according to the present embodiment, the terminal apparatus information is read from the terminal apparatus by the communication device using proximity wireless communication. The communication device is touched to the terminal apparatus to communicate with the terminal apparatus to obtain the terminal apparatus information. The communication device adds a product serial number and position information of the communication device to the obtained terminal apparatus information, and transmits the generated information to the server. Thereby, the server can manage the communication device information as parent device information in association with the terminal apparatus information as child device information. Therefore, if a manufacturer of the terminal apparatus finds that the terminal apparatus would cause serious accidents, the manufacture can easily recall the terminal apparatus or display a notification of a possibility of the serious accident on a display unit of the communication device. As a result, it is possible to achieve traceability of the products and to provide the users of the products with safety and security.

FIG. 128 is a sequence diagram of processing performed by the units included in the system described with reference to FIG. 127.

First, the communication device Y02 performs polling to the terminal apparatus Y01 to establish proximity wireless communication. In terms of power consumption amount of the communication device, it is desirable as described earlier that a switch operated by a user is provided so that the polling is performed while the switch is being pressed or the polling starts when the switch is pressed (SY01).

Next, the terminal apparatus Y01 sends a response to the polling to the communication device Y02 in order to establish proximity wireless communication with the communication device Y02 (SY02). At this timing, the position information determination unit Y027 of the communication device Y02 generates position information of a current position to be used as position information of the terminal apparatus Y01. The generation of the position information is not limited to be performed only in completion of the polling. The position information may be generated any time while the proximity wireless communication is established after the response to the polling. It is important to determine the position of the terminal apparatus at a high accuracy, by generating position information of the position where proximity wireless communication, which can be performed when a distance between communicating devices is only several centimeters, is established.

After the establishment of the proximity wireless communication at SY02, mutual authentication between the terminal apparatus Y01 and the communication device Y02 is performed using general public key cryptography, and also key sharing is temporarily performed to share cryptography keys generated by the terminal apparatus Y01 and the communication device Y02 between the devices (SY03). After that, while the proximity wireless communication is established, data on the communication path is encrypted using the cryptography keys to communicate between the devices. As a result, tapping of the data can be prevented.

After completing the key sharing, the terminal apparatus Y01 transmits the terminal apparatus information recorded on the memory Y014 of the terminal apparatus Y01, to the communication device Y02 (SY04).

When the communication device Y02 receives the terminal apparatus information from the terminal apparatus Y01, the communication device Y02 stores the received terminal apparatus information into the memory Y024 of the communication device Y02 (SY05).

When the communication device Y02 completes receiving of the terminal apparatus information from the terminal apparatus Y01, the communication device Y02 issues a connection request to the server Y04 (SY06).

The server Y04 responds to the connection request of SY06 to establish communication with the communication device Y02 (SY07).

After establishing communication between the communication device Y02 and the server Y04, the communication device Y02 adds the communication device information of the communication device Y02 to the terminal apparatus information of the terminal apparatus Y01 to be transmitted to the server Y04 (SY08). Here, the communication device information includes, for example, a product serial number of the communication device Y02, position information of the communication device Y02 when proximity wireless communication with the terminal apparatus Y01 is established, an e-mail address of the user registered in the communication device Y02 (if any), a connection account to the server Y04 registered in the communication device Y02 (if any), and the like.

After adding the communication device information to the terminal apparatus information at SY08, then the communication device Y02 transmits the terminal apparatus information added with the communication device information to the server Y04 (SY09).

The server Y04 registers the terminal apparatus information added with the communication device information received from the communication device Y02, into the device management DB Y041. Thereby, the processing is completed.

Thereby, the server Y04 can manage pieces of information regarding devices for each house, by managing information of each terminal apparatus Y01, which establishes proximity wireless communication with the communication device Y02 touching the terminal apparatus Y01, in association with identification information (product serial number or the like) of the communication device Y02. In addition, for the position information registered as information of a position at which the terminal apparatus is equipped, position information indicating a position where proximity wireless communication is established between the communication device Y02 and the terminal apparatus Y01 is used. Since the proximity wireless communication according to the present embodiment is performed at common High Frequency (HF) band of 13.56 MHz, the communication is possible when a distance between communicating devices is within several centimeters. Therefore, if the position information detected in establishing proximity wireless communication is set to be position information of the terminal apparatus, a maximum error is several centimeters which results in assuring an enough accuracy to achieve traceability of the products.

FIG. 129 is a schematic diagram illustrating a group of pieces of information of terminal apparatuses managed in association with information of the communication device Y02 in the device management DB Y041 of the server Y04.

When the user intends to perform user registration or the like for a terminal apparatus using the communication device Y02 in purchasing the terminal apparatus, the following processing is performed. The user equips the terminal apparatus and touches the terminal apparatus by the communication device Y02. Thereby, terminal apparatus information of the terminal information is provided to the communication device Y02 using proximity wireless communication. The communication device Y02 adds the communication device information of the communication device Y02 to the terminal apparatus information in order to be transmitted to the server Y04. In receiving the terminal apparatus information added with the communication device information, the server Y04 manages the terminal apparatus information as child device information and the communication device information as parent device information in association with each other in the device management DB. For example, in the device management DB, terminal apparatus information of a terminal apparatus 1 (for example, a microwave Y052), terminal apparatus information of a terminal apparatus 2 (for example, a washing machine Y053), and terminal apparatus information of a terminal apparatus 3 (for example, a TV Y054), all of which are touched by a communication device Y051, are managed in association with a product serial number of the communication device Y051. Each of the terminal apparatus information includes whereabout information (longitude, latitude, altitude, and the like) and use status information (use histories, error codes, use time periods, and the like). Thereby, the server Y04 can manage pieces of information of devices for each house, because the communication device Y051 touches these terminal apparatuses. As a result, traceability of the terminal apparatuses can be achieved.

Furthermore, the communication device generates position information when proximity wireless communication with the terminal apparatus is established and uses the generated position information as position information of the terminal apparatus. Therefore, it is possible to register a position of the terminal apparatus with an error of several centimeters which is a distance capable for proximity wireless communication between devices. Since the GPS in the communication device is used to generate the position information of the terminal apparatus, each terminal apparatus does not have a GPS, thereby reducing a cost.

FIG. 130 is a schematic diagram illustrating display screens of the display unit of the communication device Y02 when the communication device Y02 touches the terminal apparatus Y01.

First, the description is given for the situation where the communication device Y02 touches the terminal apparatus Y01 to register information of the terminal apparatus Y01 into the server Y04.

When the user operates the communication device Y02 to start up a reader/writer application program of the communication device Y02, the communication device Y02 displays, on a display screen, a message persuading the user to make the communication device Y02 touch the terminal apparatus Y01 for proximity wireless communication (Y060).

When the communication device Y02 touches the terminal apparatus Y01, proximity wireless communication is established between the devices. The communication device Y02 reads terminal apparatus information of the terminal apparatus Y01 from the terminal apparatus Y01, generates position information of a current position, and provides the pieces of information to the memory in which the pieces of information are temporarily stored. Then, the communication device Y02 establishes communication with the server Y04 and transmits the terminal apparatus information added with communication device information of the communication device Y02 to the server Y04. The server Y04 determines whether or not the terminal apparatus information has already been registered in the device management DB. If it is determined that the terminal apparatus information has not yet been registered in the device management DB, then the server Y04 causes the communication device Y02 to display, on the display unit of the communication device Y02, a message asking the user whether or not to register information of the terminal apparatus Y01 (Y061).

Next, when the user selects to register the information of the terminal apparatus Y01, the server Y04 causes the communication device Y02 to display a message asking the user whether or not to register position information of the terminal apparatus. When the user selects to register the position information, the server Y04 registers the position information associated with the terminal apparatus information transmitted from the communication device Y02 to the server Y04, into the device management DB of the server Y04 as position information of the terminal apparatus Y01 (Y062).

Next, the description is given for the situation where the position information of the terminal apparatus Y01 is different from the position information registered in the device management DB of the server Y04.

When the user operates the communication device Y02 to start up a reader/writer application program of the communication device Y02, the communication device Y02 displays, on the display screen, a message persuading the user to make the communication device Y02 to touch the terminal apparatus Y01 by the communication device Y02 to perform proximity wireless communication (Y063).

When the communication device Y02 touches the terminal apparatus Y01, proximity wireless communication is established between the devices. The communication device Y02 reads terminal apparatus information of the terminal apparatus Y01 from the terminal apparatus Y01, generates position information, and transmits the terminal apparatus information added with communication device information of the communication device Y02 to the server Y04. The server Y04 compares (a) a product serial number of the terminal apparatus which is included in the received terminal apparatus information to (b) a product serial number registered in the device management DB, in order to examine whether or not information of the touched terminal apparatus is already registered in the server Y04. In addition, the server Y04 extracts the position information from the received communication device information, and examines whether or not the extracted position information is identical to the position information registered in the device management DB. Since the position information has an error, of course, the determination is made to compare the position information to a threshold value that has the order of several centimeters (in other words, the threshold value is a value corresponding to a distance between devices capable for proximity wireless communication). If it is determined that the extracted position information is different from the registered position information, the server Y04 causes the communication device Y02 to display, on the display unit, a message notifying the user of the result of the determination (Y064).

Then, the communication device Y02 displays, on the display unit, a message asking the user whether or not to update the position information of the terminal apparatus Y01 to information of a current position of the terminal apparatus Y01 (Y065).

If the user selects to update the position information, the communication device Y02 registers the position information generated by touching the terminal apparatus Y01 by the communication device Y02, into the device management DB of the server Y04 as new position information of the terminal apparatus Y01.

Therefore, according to the present embodiment, even if the position information that has been registered is changed because the terminal apparatus Y01 is moved and equipped at a different location, it is possible to update the position information to new position information that is generated by touching the terminal apparatus Y01 by the communication device Y02. Thereby, an accuracy of traceability of the terminal apparatus Y01 can be improved.

Seventeenth Embodiment

FIG. 131 is a functional block diagram of the RF-ID unit N10 according to the seventeenth embodiment of the present invention.

Referring to FIG. 131, the RF-ID unit N10 includes an antenna N11, a power supply unit N12, a memory N13, a reproducing unit N14, and a data transfer unit N15. The antenna N11 is used for proximity wireless communication. The power supply unit N12 is supplied with power via the antenna N11. The memory N13 is a nonvolatile memory in which pieces of individual identification information are stored. The reproducing unit N14 reproduces data registered in the memory N13. The data transfer unit N15 transmits the data registered in the memory N13 into the outside via the antenna N11.

The memory N13 stores UID N13A, a part number N13B, server specific information N13C, and an operation program N13D. The UID N13A is used to identify a product having the RF-ID unit N10. The part number N13B is used to identify a part number of the product having the RF-ID unit N10. The server specific information N13C is used to specify the registration server N40. The operation program N13D is to be executed by the mobile device N20.

FIG. 132 is a functional block diagram of the mobile device N20 according to the present embodiment.

Referring to FIG. 132, the mobile device N20 includes a RF-ID reader/writer N21, a RF-ID storage unit N22, a program execution unit N23, a data processing unit N24, a memory unit N25, a display unit N26, a communication I/F unit N27, a transmission unit N28, a receiving unit N29, a communication unit N30, a GPS N31, a 6-axis sensor N32, a position information storage unit N33, and a CPU N34. The RF-ID reader/writer N21 receives data from the RF-ID unit N10. The RF-ID storage unit N22 holds the data provided from the RF-ID reader/writer N21. The program execution unit N23 executes a program included in the data. The data processing unit N24 performs data processing for image data included in the data. The memory unit N25 holds the image data processed by the data processing unit N24. The display unit N26 displays the image temporarily stored in the memory unit N25. The communication I/F unit N27 connects the mobile device N20 to other device via a general-purpose network. The transmission unit N28 transmits data to the outside via the communication I/F unit N27. The receiving unit N29 receives data from the outside via the communication I/F unit N27. The communication unit N30 communicates with other device via a general-purpose network by using the communication I/F unit N27. The GPS N31 measures a position of the mobile device N20 to generate absolute position information of the mobile device N20. The 6-axis sensor N32 measures a position of the mobile device N20 to generate relative position information of the mobile device N20. The position information storage unit N33 holds results of the measurement of the GPS N31 and the 6-axis sensor N32. The CPU N 34 analyzes the position information stored in the position information storage unit N33.

FIG. 133 is a functional block diagram of the registration server N40 according to the present embodiment.

Referring to FIG. 133, the registration server N40 includes a communication I/F unit N41, a transmission unit N42, a receiving unit N43, a communication unit N44, a product information management unit N45, an image data storage unit N46, a program storage unit N47, a position information generation unit N48, and a product control unit N49. The communication I/F unit N41 connects the registration server N40 to other device via a general-purpose network. The transmission unit N42 transmits data to the outside via the communication I/F unit N41. The receiving unit N43 receives data from the outside via the communication I/F unit N41. The communication unit N44 communicates with other device via a general-purpose network by using the communication I/F unit N41. The product information management unit N45 manages product information received from the communication I/F unit N41. The image data storage unit N46 holds image data to be transmitted to the mobile device N20. The program storage unit N47 holds a program to be transmitted to the mobile device N20. The position information generation unit N48 generates a map indicating position relationships among the products having the RF-ID unit N10, by combining the pieces of product information stored in the product information management unit N45. The product control unit N49 controls the products having the RF-ID units N10 by using the pieces of product information stored in the product information management unit N45 and information of a current position of the mobile device N20.

The present embodiment differs from the other embodiments in that the products in the house are controlled based on a product map generated from (a) the position information of the mobile device N20 and (b) pieces of position information of the products having the RF-ID units N10.

FIG. 134 is a diagram illustrating an example of an arrangement of the networked products according to the present embodiment.

Referring to the arrangement diagram of FIG. 134, in the house, there are: a TV N10A, a BD recorder N10B, an air conditioner N10C, and a FF heater N10K in a living room on the first floor; an air conditioner N10D and a fire alarm N10E in an European-style room on the first floor; an air conditioner N10F and a fire alarm N10G in a Japanese-style room on the first floor; a TV N10I and an air conditioner N10J on the second floor; and a solar panel N10H on a roof.

As described earlier, FIG. 135 is the diagram illustrating an example of the system according to the present embodiment. FIG. 135 is a configuration of home appliances in the arrangement of FIG. 134.

This system includes: products from the TV N10A to the FF heater N10K; the mobile device N20 illustrated in FIG. 132; the registration server N40 illustrated in FIG. 133; a home network N100; and an external network N101. Each of the products N10A to N10K has (a) the RF-ID unit N10 illustrated in FIG. 131 and (b) a communication I/F unit N18 used to communicate with other products and devices via a general-purpose network. The home network N100 connects the products N10A to N10K to the mobile device N20. The external network N101 connects the home network N100 to the registration server N40.

The following describes an example of a method of registering information regarding a product having the RF-ID unit N10 into the registration server N40 with reference to FIGS. 136 to 141.

FIG. 136 is a sequence diagram for registering information of the TV N10A into the registration server N40.

First, when a user moves the mobile device N20 to bring the RF-ID reader/writer N21 of the mobile device N20 to proximity of an antenna N11 of the TV N10A, the RF-ID reader/writer N21 supplies power to a power supply unit N12 of the TV N10A via the antenna N11 to provide power to each unit in the RF-ID unit N10 ((1) in FIG. 136).

The reproducing unit N14 in the RF-ID unit N10 generates product information. The product information includes the UID N13A, the part number ID N13B, the server specific information N13C, and the operation program N13D stored in the memory N13.

FIG. 137A is a table illustrating examples of a structure of the product information. The product information illustrated in FIG. 137A includes: part number ID that is a part number of the TV N10A (including color information); UID that is a product serial number of the TV N10A; server specific information including an address, a login ID, and a password regarding the registration server N40; and an operation program to be executed by the program execution unit N23 in the mobile device N20.

The data transfer unit N15 in the RF-ID unit N10 modulates the product information and transmits the modulated product information to the RF-ID reader/writer N21 of the mobile device N20 via the antenna N11 ((2) in FIG. 136).

The RF-ID reader/writer N21 in the mobile device N20 receives the product information and stores the received product information into the RF-ID storage unit N22.

The program execution unit N23 executes the operation program included in the product information stored in the RF-ID storage unit N22.

Here, the program execution unit N23 executes the operation program to "generate server registration information to be transmitted to the address of the registration server N40 which is designated in the product information".

FIG. 137B is a table illustrating another example of a structure of the product information. The server registration information illustrated in FIG. 137B includes: part number ID that is a part number of the TV N10A (including color information); UID that is a product serial number of the TV N10A; server specific information including a login ID and a password regarding the registration server N40; and position information of the mobile device N20.

Next, the position information of the mobile device N20 is explained.

The GPS N31 in the mobile device N20 constantly operates while the mobile device N20 is active. Detected results of the GPS N31 are stored in the position information storage unit N33.

The 6-axis sensor N32 operates when the mobile device N20 is outside an area in which the GPS N31 can perform positioning. The 6-axis sensor N32 stores detected results into the position information storage unit N33.

The program execution unit N23 generates position information to be included in the server registration information, from the results detected by the GPS N31 and the 6-axis sensor N32 which are stored in the position information storage unit N33.

From the generated position information and information stored in the RF-ID storage unit N22, the program execution unit N23 generates the server registration information as illustrated in FIG. 137B.

Next, the communication unit N30 designates an address of the registration server N40 which is recorded on the RF-ID storage unit N22, to be a destination address of the server registration information.

The transmission unit N28 transmits the generated server registration information via the communication I/F unit N27 ((3) in FIG. 136).

The receiving unit N43 of the registration server N40 receives the server registration information via the communication I/F unit N41.

The communication unit N44 confirms the login ID and the password in the server registration information.

If the login ID and the password are correct, the registration server N40 stores, into the product information management unit N45, the part number ID, the UID, and the position information included in the server registration information.

FIG. 138A is a table illustrating an example of a structure of product information regarding the TV N10A which is registered on the product information management unit N45. The product information includes the part number ID, the UID, and the position information. The position information includes latitude, longitude, and altitude.

Next, when the registration of the product information of the TV N10A is completed, the communication unit N44 in the registration server N40 generates a server registration completion notification. The server registration completion notification includes (a) image data that is previously stored in the image data storage unit N46 and (b) the operation program stored in the program storage unit N47. Then, the communication unit N44 designates an address of the mobile device N20 to be a destination of the server registration completion notification.

The transmission unit N42 transmits the generated server registration completion notification via the communication I/F unit N41((4) in FIG. 136).

The receiving unit N29 of the registration server N20 receives the server registration completion notification via the communication I/F unit N27.

The communication unit N30 in the mobile device N20 confirms the destination address of the server registration completion notification, and provides the received server registration completion notification to the program execution unit N23.

The program execution unit N23 executes the operation program included in the server registration completion notification. Here, the program execution unit N23 executes the operation program to "display image data on the display unit N26."

In more detail, the program execution unit N23 instructs the data processing unit N24 to perform processing for the image data.

The data processing unit N24 thereby performs data processing for the image data. For example, if downloaded image data is compressed, the data processing unit N24 decompresses the image data. If the image data is encrypted, the data processing unit N24 decrypts the image data. The data processing unit N24 may also arrange the downloaded image data in an image display style based on an image display style sheet.

In completing the data processing, the data processing unit N24 provides the processed image data to the memory unit N25 in which the processed image data is temporarily stored.

The display unit N26 displays the image data stored in the memory unit N25. In this example, the image data accumulated in the memory unit N25 is used to notify a user of that registration of information of a corresponding product is completed without any problem.

FIG. 138B is a table illustrating an example of pieces of product information managed in the product information management unit N45 of the registration server N40, after pieces of information regarding the other products from the BD recorder N10B to the FF heater N10K are registered in the registration server N40 in the same manner as described for the TV N10A. Pieces of product information for which registration processing is performed in the house of FIG. 134 are managed in the same table. In this example, products registered using the same mobile device N20 are determined as products for which registration processing is performed in the same house.

FIG. 139 is a flowchart of an example of processing performed by the RF-ID unit N10 to perform product registration.

First, the RF-ID unit N10 of a target product waits for power supply from the mobile device N20 (N001).

If the RF-ID unit N10 receives power from the mobile device N20, then the processing proceeds to N002. Otherwise, the processing returns to N001.

At N002, the RF-ID unit N10 generates product information including information stored in the memory N13. Then, at N003, the RF-ID unit N10 transmits the product information from the antenna N11 to the mobile device N20. Thereby, the processing is completed.

FIG. 140 is a flowchart of an example of processing performed by the mobile device N20 to perform product registration.

First, at N001, the RF-ID reader/writer N21 of the mobile device N20 supplies power to the RF-ID unit N10 of the target product.

Next, the mobile device N20 waits for product information from the RF-ID unit N10 of the target product (N005).

If the mobile device N20 receives product information from the RF-ID unit N10, then the processing proceeds to N006. Otherwise, the processing returns to N004 to supply power to the RF-ID unit N10 again.

At N006, the mobile device N20 analyzes the received product information and thereby executes an operation program included in the product information.

At N007, the mobile device N20 determines a position of the mobile device N20 itself.

At N008, the mobile device N20 generates server registration information including information of the determined position. At N009, the mobile device N20 transmits the generated server registration information to the registration server N40 via the communication I/F unit N27.

Next, the mobile device N20 waits for a server registration completion notification from the registration server N40 (N010).

If the mobile device N20 receives the server registration completion notification from the registration server N40, then the processing proceeds to N011.

At N011, the mobile device N20 analyzes the server registration completion notification. Then, at N012, the mobile device N20 displays, on the display unit N26, image data included in the server registration completion notification. Thereby, the processing is completed.

FIG. 141 is a flowchart of an example of processing performed by the registration server N40 to perform product registration.

First, the registration server N40 waits for server registration information from the mobile device N20 (N013).

If the registration server N40 receives the server registration information from the mobile device N20, then the processing proceeds to N014. Otherwise, the processing returns to N013.

At N014, the registration server N40 analyzes the received server registration information to determine whether or not a login name and a password included in the server registration information are correct. If the login name and the password are correct, then, at N015, the registration server N40 stores the product information into the product information management unit N45.

At N016, the registration server N40 generates a server registration completion notification that includes an operation program and image data. At N017, the registration server N40 transmits the generated server registration completion notification from the communication I/F unit N41 to the mobile device N20. Thereby, the processing is completed.

Next, the following describes an example of a method of controlling a product having the RF-ID unit N10 by using the position information of the mobile device N20, with reference to FIGS. 142, 143A, 143B, and 143C.

FIG. 142 is a sequence diagram illustrating an example of controlling power for the air conditioner N10J and the TV N10A, when the mobile device N20 is moved from the first floor to the second floor.

The CPU N34 in the mobile device N20 monitors the position information stored in the position information storage unit N33 to determine whether or not predetermined conditions are satisfied. If the predetermined conditions are satisfied, then the CPU N34 generates positional information including position information that is information of a current position of the mobile device N20 (hereinafter, referred to as "current position information".

FIG. 143A is a table illustrating an example of a structure of the positional information.

The positional information includes (a) second server login ID and a second server login password which are regarding the registration server N40 and (b) the current position information of the mobile device N20. The second server login ID and the second server login password are previously obtained in purchasing the product and stored in a memory (not shown). The current position information is obtained from the position information storage unit N33.

The communication unit N30 designates, as a destination of the positional information, an address of the registration server N40 in which information of the product is registered.

The transmission unit N28 transmits the positional information to the registration server N40 via the communication I/F unit N27 ((1) in FIG. 142).

The receiving unit N43 in the registration server N40 receives the positional information via the communication I/F unit N41.

The communication unit N44 in the registration server N40 confirms the second server login ID and the second server login password in the received positional information.

If the second server login ID and the second server login password are correct, then the communication unit N44 provides the positional information to the product control unit N49.

The product control unit N49 provides the second server login ID to the position information generation unit N48.

According to instructions from the product control unit N49, the position information generation unit N48 obtains pieces of product information as illustrated in FIG. 138B from the product information management unit N45 based on the second server login ID. Then, the position information generation unit N48 generates a product map from pieces of position information of the respective products. The product map shows positions of the products in the house illustrated in FIG. 134. The position information generation unit N48 provides the generated product map to the product control unit N49.

FIG. 144 illustrates an example of the product map generated by the position information generation unit N48.

The product map is a 3D map (or 3D product map) in which illustrations of the products are arranged at positions based on the respective pieces of position information.

The product control unit N49 controls the products from the TV N10A to the FF heater N10K, by using (a) the current position information of the mobile device N20 included in the positional information and (b) the product map (or home appliance map) generated by the position information generation unit N48. In this example, the product control unit N49 turns ON a product located most close to the current position information received from the mobile device N20. Here, the product control unit N49 generates product control information including an instruction for turning ON the air conditioner N10J.

FIG. 143B is a table illustrating an example of a structure of first product control information.

The first product control information includes: part number ID of the air conditioner N10J; UID of the air conditioner N10J; and a product control command for turning ON the air conditioner N10J.

The communication unit N44 designates an address of the mobile device N20 to be a designation of the first product control information.

The transmission unit N42 transmits the first product control information to the mobile device N20 via the communication I/F unit N41 ((2) in FIG. 142).

After receiving the first product control information, the mobile device N20 transfers the first product control information to the air conditioner N10J based on the part number ID and the UID in the first product control information ((2)' in FIG. 142).

When the air conditioner N10J receives the first product control information from the communication I/F unit N18, the air conditioner N10J turns ON a power source of the air conditioner N10J if the power source is OFF.

Next, the product control unit N49 turns OFF a product located the farthest from the current position information received from the mobile device N20. Here, the product control unit N49 generates product control information including an instruction for turning OFF the TV N10A.

FIG. 143C is a table illustrating an example of a structure of second product control information.

The second product control information includes: part number ID of the TV N10A; UID of the TV N10A; and a product control command for turning OFF the TV N10A.

The communication unit N44 designates an address of the mobile device N20 to be a designation of the second product control information.

The transmission unit N42 transmits the second product control information to the mobile device N20 via the communication I/F unit N41 ((2) in FIG. 142).

After receiving the second product control information, the mobile device N20 transfers the second product control information to the TV N10A based on the part number ID and the UID in the second product control information ((3)' in FIG. 142).

When the TV N10A receives the second product control information from the communication I/F unit N18, the TV N10A turns OFF a power source of the TV N10A if the power source is ON.

As described above, according to the present embodiment, near field communication of RF-ID technology and position information are used to manage, in the registration server N40, positions of products each having the RF-ID unit N10. Thereby, it is possible to automatically control the products according to a current position of the mobile device N20.

Regarding the position information, information detected by the 6-axis sensor N32 (motion sensor) that measures relative position information is used as position information. Therefore, it is possible to update the position information by using the detected results of the 6-axis sensor N32 when the mobile device N20 is outside an area in which the GPS N31 can perform positioning. As a result, correct position information can be obtained even outside the area.

It should be noted that the mobile device N20 according to the present embodiment has been described to have the GPS N31 and the 6-axis sensor N32, but the mobile device N20 is not limited to the above-described structure. For example, the mobile device N20 may have only the 6-axis sensor N32. In this aspect, the product information management unit N45 in the registration server N40 stores pieces of relative position information of products which are with respect to a reference point (position information) of the TV N10A which is first registered as illustrated in FIG. 145. Here, a product map generated by the position information generation unit N48 has axes of an x-coordinate, a y-coordinate, and a z-coordinate as illustrated in FIG. 146.

It should also be noted that it has been described in the present embodiment that (a) part number ID and UID of a target product which are stored in the RF-ID unit N10 of the target product and (b) position information of the mobile device N20 are registered to the registration server N40, but the present invention is not limited to the above. For example, if the registration server N40 receives again server registration information regarding a product for which registration has already been completed, the registration server N40 may perform processing as illustrated in FIG. 147.

The following describes FIG. 147. Referring to FIG. 147, the table includes: (a) accuracy identifiers for identifying an accuracy of position information; (b) part number ID in association with each accuracy identifier; and (c) processing to be performed when position information in re-received server registration information is different from position information registered in the product information management unit N45.

If the registration server N40 determines, based on the part number ID and the UID included in the re-received server registration information, that the position information has already been registered in the product information management unit N45, then the registration server N40 checks the part number ID. If the registration server N40 determines, based on the part number ID and the UID included in the re-received server registration information, that the position information has already been registered in the product information management unit N45, then the registration server N40 checks the part number ID.

If the part number ID indicates an air conditioner, a solar panel, or a fire alarm, then the registration server N40 notifies the mobile device N20 of the position information stored in the product information management unit N45. The mobile device N20 thereby corrects current position information of the mobile device N20 based on the position information received from the registration server N40.

It should also be noted that FIG. 147 shows the two kinds of accuracy identifiers, but the accuracy identifiers are not limited to the two kinds. It is possible to set more than two kinds of accuracy identifiers for respective different processing.

It should also be noted that the product control unit N49 in the present embodiment is included in the registration server N40, but the present invention is not limited to the structure. For example, the product control unit N49 may be included in the mobile device N20 so that the product control unit N49 obtains a product map from the registration server N40 to control products. Besides in the mobile device N20, the product control unit N49 may also be included in a home server (not illustrated) that is connected to the home network N100. In this aspect, the mobile device N20 transmits position information to the home server and obtains a product map from the home server.

It should be noted that the mobile device N20 according to the present embodiment is connected to the registration server N40 via the home network N100 and the external network N101 by using the communication I/F unit (general-purpose I/F unit) N27, but the present invention is not limited to the above. For example, the mobile device N20 may have a function of serving as a mobile phone so that the mobile device N20 can be connected to the registration server N40 via at least a mobile phone network (for example, Long Term Evolution (LTE)) by using an interface connectable to the mobile phone network, in stead of the communication I/F unit N27 (see FIG. 148). Furthermore, the mobile device N20 may have an interface connectable to a circuit network such as WiMAX so as to be connected to the registration server N40 via at least the WiMAX network. Any other networks can be used to connect the mobile device N20 to the registration server N40.

It should also be noted that, in the present embodiment, the product map generated by the position information generation unit N48 is used to determine how to control products, but the present invention is not limited to the structure. For example, image data of the product map generated by the position information generation unit N48 is transmitted to the mobile device N20 that displays the image data on the display unit N26.

It should also be noted that, in the present embodiment, the position information generation unit N48 generates the product map based on the information illustrated in FIG. 138B, but the present invention is not limited to the above. For example, pieces product information of products located near the position information of the mobile device N20 in the same house are detected from the product information management unit N45, and then used to generate a product map regarding nearby products in the house. In this aspect, the product control unit N49 performs product control by combining the product map of FIG. 144 and the product map of nearby products. For instance, it is assumed in the present embodiment that the TV N10A, which is the farthest from the mobile device N20, is turned OFF but there is a solar panel near the mobile device N20 in the house. Under the assumption, the product control unit N49 controls the TV N10A to be turned ON, for example.

It should also be noted that, in the present embodiment, the product information management unit N45 in the registration server N40 stores part number ID, UID, and position information of each product, but the present invention is not limited to the above. For example, it is also possible that a power state (ON or OFF) is obtained in real time from each product via the communication I/F unit N18 of the product, and then managed in the product information management unit N45. The product control unit N49 thereby controls power of the TV N10A located the farthest from the mobile device N20 to be kept ON when the predetermined number of products are powered OFF, although it has been described n the above description that the product control unit N49 turns OFF the TV N10A.

It should also be noted that, in the present embodiment, the product control unit N49 turns OFF a product located the farthest from the mobile device N20 and turns ON a product closest to the mobile device N20. However, the present invention is not limited to the above.

The product control unit N49 may control power to be turned ON or OFF for a plurality of products based on the position information of the mobile device N20.

It should also be noted that, in the present embodiment, the product control unit N49 turns OFF a product located the farthest from the mobile device N20 and turns ON a product closest to the mobile device N20. However, the present invention is not limited to the above. For example, it is also possible that the CPU N34 in the mobile device N20 stores position information as a movement history into a memory (not illustrated), and regularly provides the movement history to the registration server N40. In this aspect, the registration server N40 estimates, from the movement histories of the mobile device N20, which product is located in which room or which floor, and manages results of the estimation. It is further possible that the product control unit N49 controls power to be turned ON or OFF for each product in the same house based on the estimation results. For example, if it is estimated from the movement histories that the TV N10A and the air conditioner N10C are located in the same room, the product control unit N49 turns OFF the air conditioner N10C when the TV N10A is turned OFF.

In addition to the moving histories, it is also possible to obtain a time of switching ON or OFF each product, thereby estimating which product is in the same room or the same floor.

It should also be noted that, in the present embodiment, the product information management unit N45 manages the product information illustrated in FIG. 138A, 138B, or 145, and the position information generation unit N48 generates the product map illustrated in FIG. 144 or 146. However, the present invention is not limited to the above. For example, it is also possible that image data of a room arrangement created by the user is transmitted from the mobile device N20 to the registration server N40, and therefore managed by the product information management unit N45. In this aspect, the position information generation unit N48 generates a product map as illustrated in FIG. 134, by combining (a) product information illustrated in FIG. 138A, 138B, or 145 and (b) the image data of the room arrangement.

Here, private information such as the image data of room arrangement may be applied with encryption different from encryption employed for the product information, and then transmitted from the mobile device N20 to the registration server N40.

It is also possible that private information such as the image data of room arrangement is transmitted to a server different from the server receiving the product information, and a product map is generated with reference to the different server when the registration server N40 generates the product map.

It should also be noted that the present embodiment may be combined with any other embodiments. For example, it is possible that the function of the terminal apparatus Y01 according to the sixteenth embodiment is provided to the RF-ID unit N10 according to the present embodiment and the function of the communication device Y02 according to the sixteenth embodiment is provided to the mobile device N20 according to the present embodiment. Thereby, the series of processes including the polling, the mutual authentication, and the key sharing illustrated in FIG. 128 can be performed prior to the product registration processing of FIG. 136. Any combination of the embodiments is within a scope of the present invention.

It should also be noted that the units in the above-described embodiments may be typically implemented into a Large Scale Integration (LSI) which is an integrated circuit. These may be integrated separately, or a part or all of them may be integrated into a single chip. Here, the integrated circuit is referred to as a LSI, but the integrated circuit can be called an IC, a system LSI, a super LSI or an ultra LSI depending on their degrees of integration. The technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the functional blocks as an integrated circuit. For example, biotechnology and the like can be applied to the above implementation.

Eighteenth Embodiment

The following describes a communication system according to the eighteenth embodiment of the present invention. The communication system according to the present embodiment includes a terminal apparatus, a communication device, and a server device. The terminal apparatus has a proximity wireless communication function. The communication device, such as a mobile device, performs proximity wireless communication with the terminal apparatus. The server device is connected to the communication device via a general-purpose network such as the Internet or a mobile telephone communication network. In this communication system, when the communication device points the terminal apparatus, the communication device becomes capable of operating the terminal apparatus based on sensor information or the like detected by the communication device. The configuration is described in more detail with reference to corresponding figures.

(System Configuration)

FIG. 149 is a schematic diagram showing the communication system according to the present embodiment. As shown in FIG. 149, the communication system 100 includes a terminal apparatus 101, a communication device 102, and a server device 104.

The terminal apparatus 101 and the communication device 102 can communicate with each other by using proximity wireless communication. Here, the proximity wireless communication in the present embodiment is assumed to be (1) communication between a Radio Frequency Identification (RF-ID) tag (ISO1443) and a reader/writer, which is performed by electromagnetic induction of 13.56 MHz band (High Frequency (HF) band), radio waves between 52 MHz to 954 MHz band (Super High Frequency (UHF) band), or the like, or (2) communication of Near Field Communication (NFC) (ISO/IEC 21481) of 13.56 MHz band. A distance (communication distance) available for the proximity wireless communication is generally limited to several dozens of centimeters in the HF band, or several centimeters in the UHF band. Therefore, the communication device 102 is presented to (or touches) the terminal apparatus 101 to establish the communication (the proximity wireless communication).

In the present embodiment, the description is given for the configuration in which the communication device 102 side has a reader/writer function and the terminal apparatus 101 has an IC tag function. However, the present embodiment is characterized in that the terminal apparatus 101 and the communication device 102 can exchange information by using proximity wireless communication. In other words, the present embodiment is not limited to the above combination. For example, it is also possible in the present embodiment that the communication device 102 side has the IC tag function and the terminal apparatus 101 side has the reader/writer function. Moreover, for the NFC, a peer-to-peer (P2P) communication function, a card emulation, and a reader/writer emulation have been standardized. These functions make no difference which device/apparatus should have an IC tag or a reader/writer. Therefore, for the sake of simplicity in the description, it is assumed in the present embodiment that the communication device 102 side has a reader/writer function and the terminal apparatus 101 has an IC tag function.

The terminal apparatus 101, such as an air conditioner or a TV, is a target home appliance to be operated by the communication device 102. The terminal apparatus 101 includes a controller 105, a memory 106, a proximity wireless communication unit 107, and an antenna 108.

The controller 105 is a system controller of the terminal apparatus 101. An example of the controller 105 is a Central Processing Unit (CPU). The controller 105 performs at least system control for processing units in the terminal apparatus 101 except the proximity wireless communication unit 107.

The memory 106 is a memory that is capable of holding control software for operating the terminal apparatus 101 by the controller 105, and various data detected by the terminal apparatus 101. Examples of the memory 106 are a Random Access Memory (RAM), a non-volatile memory, and the like. The memory 106 is generally embedded in a Large-Scale Integration (LSI) of the controller 105. However, the memory 106 may be outside the terminal apparatus 101.

The proximity wireless communication unit 107 performs communication with the reader/writer function unit (hereinafter, referred to as a "reader/writer") in the communication device 102. The proximity wireless communication unit 107 modulates data to be transmitted to the reader/writer, and demodulates data transmitted from the reader/writer.

In addition, the proximity wireless communication unit 107 generates power from radio waves received from the reader/writer, in order to establish at least proximity wireless communication, and also extracts clock signals from the received radio waves. At least the proximity wireless communication unit 107 is thereby operated by the power and clock generated from the radio waves from the reader/writer. Therefore, the proximity wireless communication unit 107 can perform proximity wireless communication with the communication device 102 even if a main power of the terminal apparatus 101 is OFF.

The antenna 108 is a loop antenna for the proximity wireless communication with the reader/writer in the communication device 102.

Thus, the terminal apparatus 101 has the above-described structure.

The communication device 102 includes an antenna 109, a display unit 110, and keys 111. An example of the communication device 102 is a mobile device.

The antenna 109 is an antenna for the proximity wireless communication with the terminal apparatus 101. The communication device 102 performs polling towards the IC tag on the terminal apparatus 101. When the communication with the terminal apparatus 101 is established, the communication device 102 reads information from the terminal apparatus 101 or writes information into the terminal apparatus 101.

The display unit 110 is, for example, a liquid crystal display. The display unit 110 displays a result of the proximity wireless communication between the communication device 102 and the terminal apparatus 101, or data transmitted from the server device 104.

The set of keys 111 is an interface that enables the user to operate the communication device 102. It should be noted that the keys 111 are not limited to the structure separated from the display unit 110 as shown in FIG. 149. For example, it is also possible that the display unit 110 is a touch panel displaying the keys 111 to implement the functions of the keys 111. In short, the display unit 110 may serve as the keys 111.

The communication device 102 having the above-described structure activates the proximity wireless communication unit in the communication device 102 according to a user's input by the keys 111. After the activation, the communication device 102 starts polling to the terminal apparatus 101 for proximity wireless communication. In general, polling keeps emitting radio waves to unspecified receivers. Therefore, the communication device 102 driven by a battery is under load in terms of battery duration. Therefore, the communication device 102 may be provided with a button dedicated for polling. This structure is preferable because the communication device 102 can avoid unnecessary polling and the user needs merely to press the dedicated button without having operation load.

The server device 104 is a server having a database. The server device 104 is implemented as, for example, a web server having a database. The server device 104 is connected to the communication device 102 via the Internet 103. The server device 104 registers, onto the database, information transferred from the communication device 102, and transfers, to the communication device 102, information indicating completion of the registration completion or the like. Then, the display unit 110 of the communication device 102 displays information indicating the registration completion.

Thus, the communication system 100 has the above-described configuration. In the system configuration, the communication device 102 can obtain information from the terminal apparatus 101, and register the obtained information onto the database in the server device 104. More specifically, by using proximity wireless communication, the communication device 102 obtains, from the terminal apparatus 101, information, such as a product serial number, a model number, or manufacturer identification information, each of which is used to uniquely identify the terminal apparatus 101. Then, the communication device 102 transfers, to the server device 104, (a) information received (obtained) from the terminal apparatus 101 via the proximity wireless communication, (b) information for identifying the user or the mobile device (communication device) itself, which is stored in the communication device 102 (for example, an e-mail address, a telephone number, a mobile terminal identification number, or a Subscriber Identity Module (SIM) card ID), and (c) information for determining a position of the communication device 102 if the communication device 102 can detect position information (for example, GPS information, Assisted-GPS information, or position information estimated based on a base station in a mobile network). The server device 104 registers these pieces of information onto the database.

The above-described series of processes can eliminate user's load for inputting various pieces of information. In other words, in practice, the user merely presents the communication device 102 to the terminal apparatus 101 in order to register various pieces of information such as user registration information for the terminal apparatus 101.

Furthermore, the communication device 102 can obtain, from the terminal apparatus, a trouble occurrence state or use history information which is detected by the terminal apparatus 101, and transmits such information to the server device 104. In this case, a manufacturer of the terminal apparatus 101 can handle the trouble of the terminal apparatus 101 by speedily determining an initial failure of a specific lot based on the trouble occurrence state. Moreover, the structure offers advantages to the manufacturer that can specify functions used by each user from the use history information and use the specified information for next product development.

(Structure of Communication Device)

The following describes the communication device 102 according to the present embodiment in more detail with reference to corresponding figures.

FIG. 150 is a block diagram showing a structure of the communication device 120 according to the present embodiment.

The communication device 102, such as a mobile device, includes the antenna 109, the display unit 110, and the keys 111 as shown in FIG. 149. The communication device 102 further includes a proximity wireless communication unit 201, a proximity wireless detection unit 202, an apparatus information obtainment unit 203, an external communication unit 204, a sensor unit 205, a position information obtainment unit 206, a direction sensor unit 207, a directional space calculation unit 208, a selection unit 209a, a move determination unit 210, an operation information obtainment unit 212, a storage unit 213, a display information decision unit 214, an operation information transmission unit 215, an operation history obtainment unit 216, and a sound sensor 217.

The proximity wireless communication unit 201 demodulates information received by the antenna 109 and modulates information to be transmitted via the antenna 109. For example, via the antenna 109, the proximity wireless communication unit 201 transmits polling waves that are signals for calling unspecified receivers, transmits a request for providing apparatus information of the terminal apparatus 101, and receives information including the apparatus information from the terminal apparatus 101.

The proximity wireless detection unit 202 determines whether or not a response to the polling (polling response) from the terminal apparatus 101 is detected. In addition, the proximity wireless detection unit 202 detects information demodulated by the proximity wireless communication unit 201.

The apparatus information obtainment unit 203 obtains, from the terminal apparatus 101, the apparatus information for uniquely identifying the terminal apparatus 101. More specifically, the apparatus information obtainment unit 203 obtains the apparatus information regarding the terminal apparatus 101 from the information detected by the proximity wireless detection unit 202. Furthermore, the apparatus information obtainment unit 203 determines whether or not a position of the terminal apparatus 101 (apparatus position information) can be obtained from the obtained apparatus information.

The external communication unit 204 is used to communicate with external devices/apparatuses including the server device 104 outside the communication device 102. The external communication unit 204 includes a communication antenna 219, a receiving unit 220, a transmission unit 221, and a communication control unit 222. More specifically, the communication antenna 219 is connected to a general-purpose network such as the Internet. The transmission unit 221 modulates data to be transmitted to the outside via the general-purpose network such as the Internet 103. The receiving unit 220 demodulates data received via the general-purpose network such as the Internet 103. The communication control unit 222 generates and analyzes data exchanged or to-be-exchanged with external devices/apparatuses via the general-purpose network such as the Internet 103.

The sensor unit 205 detects a position of the communication device 102 itself. The sensor unit 205 includes an acceleration sensor 223, a Global Positioning System (GPS) sensor 224, an angular velocity sensor 225, and an orientation sensor 226. The acceleration sensor 223 measures an acceleration of the communication device 102. The GPS sensor 224 obtains GPS information, and thereby calculates position information of the communication device 102. The angular velocity sensor 225 measures an angular velocity of the communication device 102. The orientation sensor 226 measures an orientation of the position of the communication device 102.

The position information obtainment unit 206 generates (obtains) position information indicating a position (current position) of the communication device 102. The position information obtainment unit 206 includes an absolute position obtainment unit 227, a relative position obtainment unit 228, and a position information calculation unit 229. The absolute position obtainment unit 227 obtains, as an absolute position of the communication device 102, (a) the position information generated by the GPS sensor 224 or (b) position information provided from the server device 104 via the external communication unit 204. The relative position obtainment unit 228 integrates the acceleration measured by the acceleration sensor 223 and the angular velocity measured by the angular velocity sensor 225, thereby calculating a relative position of the communication device 102 with respect to an initial setting value. The position information calculation unit 229 calculates a current position of the communication device 102 based on the absolute position obtained by the absolute position obtainment unit 227 and the relative position generated by the relative position obtainment unit 228. For example, if the communication device 102 determines that apparatus position information of the terminal apparatus 101 (a current position of the terminal apparatus 101) can be retrieved from the apparatus information obtained by the apparatus information obtainment unit 203, in the communication device 102, the absolute position obtainment unit 227 stores the apparatus position information into the storage unit 213 as absolute position information of the communication device 102, and the relative position obtainment unit 228 initializes the relative position information. On the other hand, if the communication device 102 determines that the apparatus position information cannot be retrieved from the apparatus information obtained by the apparatus information obtainment unit 203, the communication device 102 activates the GPS sensor 224 to generate absolute position information of the communication device 102, and causes the relative position obtainment unit 228 to initialize the relative position information.

The direction sensor unit 207 generates direction information indicating a direction to which the communication device 102 faces. More specifically, based on the angular velocity measured by the angular velocity sensor 225 and the orientation measured by the orientation sensor 226, the direction sensor unit 207 calculates an oriented direction that is a direction which the communication device 102 faces, namely, a direction to which the communication device 102 is pointed.

The directional space calculation unit 208 calculates a directional space (directional space information) based on the position information generated (obtained) by the position information obtainment unit 206 and the direction information generated by the direction sensor unit 207. The directional space is a space which the communication device 102 faces, namely, a space to which the communication device 102 is pointed. More specifically, the directional space calculation unit 208 calculates a space pointed by the communication device 102 as the directional space information, based on (a) the position information of the communication device 102 which is calculated by the position information obtainment unit 206 and (b) the oriented direction calculated by the direction sensor unit 207.

The operation information obtainment unit 212 obtains operation information, such as remote control information for controlling the terminal apparatus 101, from the server device 104 via the external communication unit 204.

The storage unit 213 stores (a) the operation information of the terminal apparatus 101 which is obtained by the operation information obtaining unit 212 and (b) position information of the communication device 102 which is generated when the apparatus information obtainment unit 203 obtains the apparatus information, in association with each other. Here, the stored position information of the communication device 102 is considered as position information of the terminal apparatus 101. Here, in other words, the position information which is obtained when the apparatus information obtainment unit 203 obtains the apparatus information is position information which is generated (obtained) by the position information obtainment unit 206 when proximity wireless communication with the terminal apparatus 101 is detected. Here, the position information which is generated (obtained) by the position information obtainment unit 206 when proximity wireless communication with the terminal apparatus 101 is detected indicates a position (current position) of the communication device 102. However, since the communication device 102 performs proximity wireless communication with the terminal apparatus 101, the position information of the communication device 102 can be considered as position information of the terminal apparatus 101 (hereinafter, referred to as "apparatus position information"). In other words, the communication device 102 can handle, as the apparatus position information of the terminal apparatus 101, the position information of the communication device 102 that is generated (obtained) by the position information obtainment unit 206 when the proximity wireless communication with the terminal apparatus 101 is detected.

The move determination unit 210 determines, based on the sensor information detected by the sensor unit 205, whether or not the communication device 102 is still.

The selection unit 209a includes an apparatus specification unit 209 and an operation information setting unit 211. The selection unit 209a specifies an apparatus (terminal apparatus 101) existing in the directional space, based on the apparatus position information stored in the storage unit 213, and selects a piece of operation information corresponding to the specified apparatus (terminal apparatus 101) from among pieces of operation information stored in the storage unit 213. The apparatus specification unit 209 specifies an apparatus (terminal apparatus 101) existing in the directional space, based on the apparatus position information stored in the storage unit 213. More specifically, based on the directional space information which is generated by the directional space calculation unit 208 and the apparatus position information of the terminal apparatus 101 which is stored in the storage unit 213, the apparatus specification unit 209 specifies (determines) which terminal apparatus 101 is the apparatus located in the direction pointed by the communication device 102. The operation information setting unit 211 selects a piece of operation information corresponding to the determined apparatus (terminal apparatus 101) from among pieces of operation information stored in the storage unit 213. In other words, the operation information setting unit 211 obtains, from the storage unit 213, the operation information of the terminal apparatus 101 specified (determined) by the apparatus specification unit 209, and sets the operation information into the communication device 102. Thereby, the operation information setting unit 211 selects the operation information corresponding to the specified (determined) apparatus (terminal apparatus 101).

The display information decision unit 214 decides a remote control interface to be displayed on the display unit 110, based on the operation information set (selected) by the operation information setting unit 211.

The operation information transmission unit 215 transmits, to the apparatus, a control signal for operating the apparatus, based on the operation information set (selected) by the operation information setting unit 211. More specifically, when a user of the communication device 102 presses one of the keys 111, the operation information transmission unit 215 transmits, to the terminal apparatus 101, a control signal, such as a remote control command, which corresponds to the pressed key to operate the terminal apparatus 101.

The operation history obtainment unit 216 obtains information of the control signal such as the remote control command which has been transmitted by the operation information transmission unit 215, thereby obtaining a user's operation history regarding the terminal apparatus 101.

The sound sensor 217, such as a microphone, detects sound around the communication device 102.

Thus, the communication device 102 has the above-described structure.

With the above structure, the communication device 102 can easily serve as an extended user interface, such as a remote controller, of a target apparatus, without causing any complicated operations to the user.

It should be noted in the above description that the communication device 102 according to the present embodiment includes the antenna 109, the display unit 110, the keys 111, the proximity wireless communication unit 201, the proximity wireless detection unit 202, the apparatus information obtainment unit 203, the external communication unit 204, the sensor unit 205, the position information obtainment unit 206, the direction sensor unit 207, the directional space calculation unit 208, the selection unit 209a, the move determination unit 210, the operation information obtaining unit 212, the storage unit 213, the display information decision unit 214, the operation information transmission unit 215, the operation history obtainment unit 216, and the sound sensor 217. However, the communication device 102 according to the present embodiment is not limited to have the above structure. As shown in FIG. 151, the communication device 102 may have, as a minimum structure, at least a minimum structure part 102a that includes the apparatus information obtainment unit 203, the external communication unit 204, the position information obtainment unit 206, the direction sensor unit 207, the directional space calculation unit 208, the selection unit 209a, the operation information obtainment unit 212, the storage unit 213, and the operation information transmission unit 215. Here, FIG. 151 is a block diagram showing the minimum structure of the communication device according to the present embodiment. With the minimum structure part 102a, the communication device 102 can easily serve as an extended user interface, such as a remote controller, of a target apparatus, without causing any complicated operations to the user.

(Details of Apparatus Specification Unit 209)

The following describes the apparatus specification unit 209 according to the present embodiment in more detail.

Each of FIGS. 152A to 152C is a block diagram showing an example of a detailed structure of the apparatus specification unit according to the present embodiment.

As shown in FIG. 152A, the apparatus specification unit 209 includes an apparatus direction calculation unit 2092, a difference calculation unit 2093, and an apparatus decision unit 2094.

If there are a plurality of apparatuses in the directional space, the apparatus direction calculation unit 2092 calculates plural pieces of apparatus direction information each indicating a direction from the communication device 102 to a corresponding one of the apparatuses, based on using the position information of the communication device 102 and the plural pieces of apparatus position information stored in the storage unit 213 regarding the apparatuses in the directional space. More specifically, the apparatus direction calculation unit 2092 calculates a direction angle between the communication device 102 and each of the apparatuses (terminal apparatuses 101), based on a distance between the communication device 102 and each of the terminal apparatuses 101.

The difference calculation unit 2093 calculates a difference between the direction information of the communication device 102 and each of pieces of the apparatus direction information of the terminal apparatuses. More specifically, the difference calculation unit 2093 calculates a difference between (a) the direction angle calculated for each of the terminal apparatuses 101 by the apparatus direction calculation unit 2092 and (b) a directional angle indicating a direction (oriented direction) pointed by the communication device 102.

From among the apparatuses, the apparatus decision unit 2094 eventually decides, as an apparatus to be specified as existing in the directional space, an apparatus having a difference calculated by the difference calculation unit 2093 which is smaller than a predetermined value. For example, the apparatus decision unit 2094 eventually decides (specifies) the terminal apparatus 101 having a minimum difference calculated by the difference calculation unit 2093, as a target terminal apparatus 101 for which operation information is to be set in the communication device 102 to operate the target terminal apparatus 101.

Thus, the apparatus specification unit 209 having the above-described structure specifies a target apparatus (terminal apparatus 101) existing in the directional space. More specifically, when there are a plurality of the terminal apparatuses 101 in the directional space calculated by the directional space calculation unit 208, the communication device 102 can select, as an apparatus to be specified as existing in the directional space (in other words, as an apparatus to which the user intends to point), a terminal apparatus 101 that is determined by the different calculation unit 2093 as being the closest in the direction pointed by the communication device 102 from among the terminal apparatuses 101.

It should be noted that the apparatus specification unit 209 may further include an apparatus number determination unit at a stage prior to the apparatus direction calculation unit 2092 so that the apparatus number determination unit determines whether or not there are a plurality of apparatuses in the directional space. With the above structure, the apparatus number determination unit may determine the number of the terminal apparatuses 101 existing in the directional space, based on (a) the oriented direction of the communication device 102 which is calculated by the directional space calculation unit 208 and (b) the pieces of apparatus position information of the terminal apparatuses 101 which are stored in the storage unit 213.

An apparatus specification unit 309 shown in FIG. 152B includes a space information storage unit 3095 and an apparatus decision unit 3096.

The space information storage unit 3095 stores space information indicating a space and an arrangement of apparatuses in the space. More specifically, the space information storage unit 3095 holds (a) room arrangement or layout information of the target building in which the terminal apparatuses 101 exist and (b) coordinate information of the terminal apparatuses 101 on the room arrangement or layout information.

If there are a plurality of the terminal apparatuses 101 in the directional space, the apparatus decision unit 3096 obtains, from the space information storage unit 3095, the space information including information of a space where the communication device 102 exists, based on the position information of the communication device 102. Then, based on the space information, the apparatus decision unit 3096 determines (decides) an apparatus existing in the space where the communication device 102 exists, as an apparatus to be specified as existing in the directional space. In other words, the apparatus decision unit 3096 determines (decides) a target terminal apparatus 101 which a user of the communication device 102 wishes to operate, based on the room arrangement information or the like obtained from the space information storage unit 3095. Here, when there is only one terminal apparatus 101 in the same room where the communication device 102 exists, the apparatus decision unit 3096 determines the terminal apparatus 101 as a target terminal apparatus 101 for which operation information is to be set in the communication device 102 to operate the target apparatus.

Thus, the apparatus specification unit 309 having the above-described structure specifies a target apparatus (terminal apparatus 101) existing in the directional space. More specifically, when there are a plurality of the terminal apparatuses 101 in the directional space calculated by the directional space calculation unit 208, the communication device 102 can obtain room arrangement information of the building, and narrows down a terminal apparatus 101 for which operation information is to be set from among terminal apparatuses 101 in the space where the communication device 102 exists.

It should be noted that the apparatus specification unit 309 may further include an apparatus number determination unit at a stage prior to the apparatus decision unit 3096 so that the apparatus number determination unit determines whether or not there are a plurality of apparatuses in the directional space. With the above structure, the apparatus number determination unit may determine the number of the terminal apparatuses 101 existing in the directional space, based on (a) the oriented direction of the communication device 102 which is calculated by the directional space calculation unit 208 and (b) the pieces of apparatus position information of the terminal apparatuses 101 which are stored in the storage unit 213.

An apparatus specification unit 409 shown in FIG. 152C includes an apparatus number determination unit 4091, an apparatus candidate output unit 4092, a user input receiving unit 4093, an apparatus decision unit 4094, an apparatus pitch angle detection unit 4095, and an apparatus pitch angle storage unit 4096.

The apparatus number determination unit 4091 determines whether or not there are a plurality of apparatuses (terminal apparatuses 101) in the directional space, based on (a) the oriented direction of the communication device 102 which is calculated by the directional space calculation unit 208 and (b) the pieces of apparatus position information of the terminal apparatuses 101 which are stored in the storage unit 213. More specifically, the apparatus number determination unit 4091 determines the number of apparatuses (terminal apparatuses 101) in the directional space.

The apparatus candidate output unit 4092 generates an apparatus candidate list indicating at least one apparatus (terminal apparatus 101) existing in the directional space, based on (a) the pieces of apparatus position information stored in the storage unit 213 and (b) pitch angle information stored in the apparatus pitch angle storage unit 4096, and provides the apparatus candidate list to the display unit 110. More specifically, the apparatus candidate output unit 4092 generates an apparatus candidate list indicating the terminal apparatuses 101 determined by the apparatus number determination unit 4091, based on the results of the apparatus pitch angle detection unit 4095, and provides the apparatus candidate list to the display unit 110. Then, the display unit 110 displays the apparatus candidate list.

The user input receiving unit 4093 receives user's selection of an apparatus (terminal apparatus 101) which is selected by the user using the keys 111 from the apparatus candidate list that is generated by the apparatus candidate output unit 4092 and displayed on the display unit 110.

The apparatus decision unit 4094 determines (decides) the apparatus selected by the user from the apparatuses in the apparatus candidate list displayed on the display unit 110, as an apparatus to be specified as existing in the directional space. More specifically, the apparatus decision unit 4094 determines the terminal apparatus 101 obtained by the user input receiving unit 4093, as a target terminal apparatus 101 which is to be specified as existing in the directional space and for which operation information is to be set.

The apparatus pitch angle detection unit 4095 detects an angle in a pitch direction of the communication device 102 to generate pitch angle information indicating the pitch angle. More specifically, the apparatus pitch angle detection unit 4095 generates pitch angle information indicating an angle in a pitch direction of the communication device 102, when the apparatus (terminal apparatus 101) which is in the directional space and for which operation information is to be set is to be specified. In addition, the apparatus pitch angle detection unit 4095 stores the generated pitch angle information into the apparatus pitch angle storage unit 4096 in association with the apparatus (terminal apparatus 101) determined by the apparatus decision unit 4094.

In the apparatus pitch angle storage unit 4096, the pitch angle information and the apparatus information are stored in association with each other. More specifically, in the apparatus pitch angle storage unit 4096, a pitch angle detected by the apparatus pitch angle detection unit 4095 and the terminal apparatus 101 determined by the apparatus decision unit 4094 are stored in association with each other.

Thus, the apparatus specification unit 409 having the above-described structure specifies a target apparatus (terminal apparatus 101) existing in the directional space. More specifically, the target terminal apparatus 101 selected by the user and the pitch angle information are stored in association with each other, so that the communication device 102 can use the pitch angle information to narrow down the target terminal apparatus 101 from the apparatus candidate list generated by the apparatus candidate output unit 4092, even if there are a plurality of the terminal apparatuses 101 in the directional space calculated by the directional space calculation unit 208. In addition, the above structure can offer the following advantages. If the pitch angle detected by the apparatus pitch angle detection unit 4095 and the terminal apparatus 101 determined by the apparatus decision unit 4094 are stored in association with each other in the apparatus pitch angle storage unit 4096 after the apparatus decision unit 4094 determines the terminal apparatus 101, it is possible to learn, from the accumulated pitch angles, habits of the user pointing the communication device 102 to the determined terminal apparatus 101.

(Storage Unit 213 in Communication Device 102)

The following describes an example of a data structure stored in the storage unit 213.

FIG. 153 is a table showing an example of the data structure stored in the storage unit 213 according to the present embodiment.

As shown in FIG. 153, the storage unit 213 stores, for example, a product serial number, a product number, position information, and remote control information in association with one another. Here, the storage unit 213 has regions for holding the above pieces of information, such as a product serial number storage region, a product number storage region, a position information storage region, and a remote control information storage region. These regions may form a table as well as a data structure.

The product serial number storage region is a region for holding a product serial number for uniquely identifying a registered terminal apparatus 101.

The product number storage region is a region for holding a product number for identifying a product type of the terminal apparatus 101.

The position information storage region is a region for holding position information corresponding to the terminal apparatus 101. For example, the position information storage region holds longitude and latitude of a position of the terminal apparatus 101, and room information, such as a living room or a kitchen, where the terminal apparatus 101 exists.

The remote control information storage region is a region for holding remote control information corresponding to the terminal apparatus 101. Here, the remote control information includes (a) operation information corresponding to the terminal apparatus 101 and (b) display information in which each of the keys 111 is in association with a corresponding operation command in the operation information. The operation information includes (a) operations of the terminal apparatus 101, such as power ON and power OFF, and (b) operation commands each of which is to be transmitted from the communication device 102 to execute a corresponding one of the operations, in association with each other. It should be noted that the operation indicated in the operation information may include a plurality of operations, not only one kind of operation of the terminal apparatus 101. More specifically, for example, one operation indicated in the operation information may be a series of operations of the terminal apparatus 101, such as powering ON, opening of a recording list, selection of a specific TV program, and reproduction of the selected TV program.

(Method of Calculating Directional Space by Communication Device 102)

The following describes an example of a method of calculating a directional space by the directional space calculation unit 208.

FIG. 154 is a graph showing an example of the method of calculating a directional space by the directional space calculating unit 208 according to the present embodiment.

In FIG. 154, coordinates x0 and coordinates y0 indicate a coordinate position of the communication device 102. In other words, the coordinate position is the position information which the position information obtainment unit 206 in the communication device 102 can generate (obtain). In the coordinate axises, "N" represents "the North", "S" represents "the South", "E" represents "the East", and "W" represents "the West", which are calculated (measured) by the orientation sensor 226 in the communication device 102. An angle $\theta$ represents a directional angle of the communication device 102 with respect to the coordinate axis is measured by the angular velocity sensor 225 in the communication device 102.

The angle $\alpha$ is a threshold value for defining a range (region) of a directional space. More specifically, the greater angle $\alpha$ results in the larger directional space, while the smaller angle $\alpha$ results in the smaller directional space. In more detail, the range (region) of the directional space is defined as a range (region d) which is surrounded by a dotted line b and a dotted line c to indicate a range having an angle$\pm\alpha$ with respect to an oriented direction a that is a direction having a directional angle $\theta$. The angle $\alpha$ may be predetermined set in the communication device 102, or inputted by the user. The angle $\alpha$ may be set based on a size of a building, a size of a room, a distance between a wall and the communication device 102, or the like.

In FIG. 153, the range (region) of the directional space is expressed by $(x-x0)*\tan(\theta-\alpha)+y0<y<(x-x0)*\tan(\theta+\alpha)+y0$. The communication device 102 selects a terminal apparatus 101 existing in the above-expressed directional space, based on the apparatus position information stored in the storage unit 213.

The following describes a summary of processing performed by the communication device 102 having the above structure.

FIG. 155 is a flowchart of the summary of processing performed by the communication device 102 according to the present embodiment.

The processing performed by the communication device 102 is mainly divided into Step S1 and Step S2. At Step S1, the communication device 102 holds apparatus position information and operation information. At Step S2, based on the stored apparatus position information and operation information, the communication device 102 operates a target terminal apparatus 101 by serving as a remote controller or the like.

At Step S1, the apparatus information obtainment unit 203 obtains, from a target terminal apparatus 101, apparatus information for uniquely identifying the terminal apparatus 101 (S11).

Next, the position information obtainment unit 206 generates (obtains) position information indicating a current position of the communication device 102 (S12).

Next, based on the obtained apparatus information, the operation information obtaining unit 212 obtains the operation information for operating the terminal apparatus 101 from the server device 104 via the external communication unit 204 (S13).

Next, the communication device 102 stores, into the storage unit 213, the obtained operation information and the generated position information in association with each other (S14). Here, the stored position information is considered as apparatus position information indicating a position of the terminal apparatus 101.

By performing Steps S11 to S14, the communication device 102 performs Step 51 for storing the apparatus position information and the operation information.

Next, at Step S2, at the beginning, the direction sensor unit 207 detects a direction to which the communication device 102 faces, thereby generating direction information (S21).

Next, the directional space calculation unit 208 calculates a directional space which is a space pointed by the communication device 102 facing the space, based on the position information generated (obtained) by the position information obtainment unit 206 and the direction information generated by the direction sensor unit 207 (S22).

Next, the selection unit 209a specifies an apparatus (terminal apparatus 101) existing in the directional space based on the apparatus position information stored in the storage unit 213 (S23), and then selects operation information corresponding to the specified apparatus from among pieces of operation information stored in the storage unit 213 (S24).

Finally, the operation information transmission unit 215 transmits, to the specified apparatus (terminal apparatus 101), a control signal for operating the apparatus based on the selected operation information (S25).

By performing Steps S21 to S25, based on the stored operation information and apparatus position information, the communication device 102 performs Step S2 for operating the target terminal apparatus 101 by serving as a remote controller or the like.

The following describes the processing performed by the communication device 102 in more detail.

(Registration Flow of Remote Control Information)

First, the description is given for a flow of registering operation information onto the storage unit 213 of the communication device 102 according to the present embodiment.

FIG. 156 is a flowchart of registering operation information onto the storage unit 213 of the communication device 102 according to the present embodiment.

At the beginning, the user activates a reader/writer application program for performing proximity wireless communication (S101).

Next, the communication device 102 transmits, via the antenna 109, polling waves which are signal calling unspecified receivers (S102). Then, the communication device 102 determines whether or not a response to the polling has been detected (S103). If it is determined that a response to the polling has not detected (N at S103), then the communication device 102 re-transmits polling waves.

On the other hand, if it is determined that a response to the polling has been detected (Y at S103), then the communication device 102 transmits a request for apparatus information in order to obtain apparatus information of the terminal apparatus 101 (S104).

Next, the communication device 102 receives the requested apparatus information from the terminal apparatus 101 (S105).

Next, the communication device 102 determines whether or not apparatus position information of the terminal apparatus 101 can be retrieved from the apparatus information (S106).

If it is determined that the apparatus position information can be retrieved (Y at S106), then, in the communication device 102, the absolute position obtainment unit 227 holds the apparatus position information as absolute position information of the communication device 102, and the relative position obtainment unit 228 initializes relative position information (S107).

On the other hand, if it is determined that the apparatus position information cannot be retrieved from the apparatus information (N at S106), then the communication device 102 activates the GPS sensor 224 (S108) to generate absolute position information, and initializes relative position information generated by the relative position obtainment unit 228 (S109).

Next, the communication device 102 determines whether or not operation information in association with the apparatus information obtained at S106 is stored in the storage unit 213 (S110).

If it is determined that the operation information is stored in the storage unit 213 (Y at S110), then the communication device 102 completes the registration processing.

On the other hand, if it is determined that the operation information is not stored in the storage unit 213 (N at S110), then the communication device 102 transmits a request for operation information associated with the apparatus information to the server device 104 via the external communication unit 204 (S111).

Next, the communication device 102 receives the operation information from the server device 104 (S112).

Next, the communication device 102 stores the received operation information in association with the apparatus position information into the storage unit 213 (S113).

As described above, the communication device 102 performs the registration of the operation information onto the storage unit 213.

(Setting Operation Flow of Remote Control Information)

The following describes processing of setting remote control information into the communication device 102 to serve as a remote controller of a target apparatus, according to the present embodiment.

Each of FIGS. 157 and 158 is a flowchart of setting operation information into the communication device 102 according to the present embodiment to operate a target apparatus. FIG. 157 shows a flow in which the user operates the communication device 102 to activate a remote control application program. FIG. 158 shows a flow in which the remote control application program is automatically activated without user's operation using the keys 111.

First, FIG. 157 is explained.

At the beginning, the user operates the keys 111 to activate a remote control application program in the communication device 102 (S201). Subsequently, the user selects a target terminal apparatus 101 by using the keys 111 on the communication device 102 (S202). Therefore, the communication device 102 sets operation information associated with the terminal apparatus selected at S202 (S203).

Here, under the assumption that the operation information is expressly set in the communication device 102 by Steps S201 to S203, the subsequence steps performed by the communication device 102 will be described.

After setting the operation information of the target terminal apparatus 101, such as a TV, into the communication device 102 as described above, the communication device 102 then activates the sensor unit 205 and starts detection of the position information obtainment unit 206 and the direction sensor unit 207 (S204). Then, the communication device 102 causes the relative position obtainment unit 228 to calculate a relative position (S205).

Next, based on the remote control operation inputted by the user using the keys 111, the communication device 102 transmits a remote control command for operating the terminal apparatus 101 for which the operation information is set at S203. This means that it is seemed for the user that Steps S202, S203, and S204 are a series of steps performed by the communication device 102, but the communication device 102 also starts Steps S204 and S205 which the user does not notice.

Next, the move determination unit 210 in the communication device 102 determines whether or not the communication device 102 is still (S207).

If it is determined that the communication device 102 is not still (N at S207), then the communication device 102 returns to S205 to re-calculate relative position information.

On the other hand, if it is determined that the communication device 102 is still (Y at S207), then the position information obtainment unit 206 and the direction sensor unit 207 generates position information and oriented direction information, respectively (S208).

Next, the communication device 102 specifies the target terminal apparatus 101 existing in a direction pointed by the communication device 102, and sets operation information of the terminal apparatus 101.

Then, the processing returns to S202 to continue the processing.

As described above, the communication device 102 firstly performs Steps S201 to S203 to set operation information, and then performs Steps S204, S205, and S207 to S209 to finally set (for example, narrow down) the operation information.

Next, FIG. 158 is explained.

Firstly, the communication device 102 activates the sensor unit 205 to start detection of the position information obtainment unit 206 and the direction sensor unit 207 (S301). Then, the communication device 102 causes the relative position obtainment unit 228 to calculate a relative position (S302).

Next, the move determination unit 210 in the communication device 102 determines whether or not the communication device 102 is still (S303).

If it is determined that the communication device 102 is not still (N at S303), then the communication device 102 returns to S302 to re-calculate relative position information.

On the other hand, if it is determined that the communication device 102 is still (Y at S303), then the communication device 102 activates the remote control application program (S304).

Next, the position information obtainment unit 206 and the direction sensor unit 207 in the communication device 102 generate position information and oriented direction information, respectively (S305).

Next, the communication device 102 specifies the target terminal apparatus 101 existing in a direction pointed by the communication device 102, and sets operation information of the terminal apparatus 101 (S306).

Next, at S307, the communication device 102 transmits a remote control command for operating the terminal apparatus 101 based on the remote control operation inputted by the user using the keys 111, for example (details of the step will be described later).

Then, the processing returns to S301 to continue the processing.

As described above, the communication device 102 performs the setting of operation information without (without trigger of) user's key operation.

(Setting Operation Flow of Remote Control Information)

Next, the description is given for a detailed example of Steps S209 and S307, namely, a flow of specifying a target terminal apparatus 101 existing in a direction pointed by the communication device 102.

FIG. 159 is a flowchart of an example of processing of specifying a target terminal apparatus 101 existing in a direction pointed by the communication device 102 according to the present embodiment.

Firstly, a search range is set, where a represents a search range angle that is an angle for defining a range (region) of a directional space to be searched out (S401).

Next, the communication device 102 determines whether or not the terminal apparatus 101 exists in a range (region) of a directional space satisfying $(x-x0)*\tan(\theta-\alpha)+y0<y<(x-x0)*\tan(\theta+\alpha)+y0$, based on the position information (x0, y0) of the communication device 102 and the directional angle (oriented direction information) θ which have been described with reference to FIG. 154 (S402).

If it is determined that a terminal apparatus 101 exists in the directional space (Y at S402), then the communication device 102 further determines whether or not there is one terminal apparatus 101 in the directional space (S403).

If it is determined that there is one terminal apparatus 101 in the directional space (Y at S403), then the communication device 102 proceeds to S409 described later to set operation information associated with the terminal apparatus 101, and completes the processing. On the other hand, if it is determined that there is not only one terminal apparatus 101 in the directional space, in other words, there are two or more terminal apparatuses 101 in the directional space (N at S403), then the communication device 102 obtains room arrangement information from, for example, the space information storage unit 3095 in the apparatus specification unit 309 (S404).

Next, based on the obtained room arrangement information and the directional space obtained at S402, the communication device 102 determines whether or not there is one terminal apparatus 101 satisfying conditions that the terminal apparatus 101 exists (i) in a room where the communication device 102 exists and (ii) in the directional space (S405).

If there is one terminal apparatus 101 satisfying the conditions (Y at S405), then the communication device 102 proceeds to S409 described later to set operation information associated with the terminal apparatus 101 and completes the processing. On the other hand, if there is not only one terminal apparatus 101 satisfying the conditions (N at S405), then the communication device 102 displays, on the display unit 110, a list of the terminal apparatuses 101 satisfying the conditions at S405 (hereinafter, referred to as an "apparatus candidate list") (S406).

Next, the communication device 102 receives selection of a terminal apparatus 101 from the apparatus candidate list which is made by the user using the keys 111 (S407).

Next, the communication device 102 obtains, for example, the pitch angle information from the apparatus pitch angle detection unit 4095 in the apparatus specification unit 309, and stores the obtained pitch angle information in association with the terminal apparatus 101 selected at S407 into the apparatus pitch angle storage unit 4096 (S408). In addition, the communication device 102 specifies a terminal apparatus 101 from among terminal apparatuses 101 existing in a direction pointed by the communication device 102, and sets operation information of the specified terminal apparatus 101 (S409).

Referring back to S402, if it is determined that there is no terminal apparatus 101 in the directional space (N at S402), then the communication device 102 further determines, based on the obtained position information, whether or not the communication device 102 exists in a target space, such as a user's home, where a target terminal apparatus 101 which the user wishes to operate exists (S410). It should be noted that it has been described above that the target space where the target terminal apparatus 101 to be operated exists is the user's home, but the space is not limited to the user's home.

If it is determined that the communication device 102 exists in the target space where the target terminal apparatus 101 to be operated exists (N at S410), then the communication device 102 displays a notice on the display unit 110 to persuade the user to register the terminal apparatus 101, for example, by displaying a notice "Not Registered. Please touch the home appliance." (S411).

On the other hand, if it is determined that the communication device 102 does not exist in the target space where the target terminal apparatus 101 to be operated exists (Y at S410), then the communication device 102 obtains position information of the communication device 102, such as latitude and longitude of the user's home (S412).

Next, the communication device 102 determines whether or not the communication device 102 faces the user's home, based on home position information of the user's home and the oriented direction information and the position information of the communication device 102 (S413).

If it is determined that the communication device 102 does not face the user's home (Y at S413), then the communication device 102 terminates the processing. On the other hand, if it is determined that the communication device 102 faces the user's home (N at S413), then the communication device 102 displays, on the display unit 110, an operable apparatus list of operable terminal apparatuses 101, such as terminal apparatuses 101 connected to an external network, which the communication device 102 can operate via the internet (S414).

Next, the user uses the keys 111 to select the target terminal apparatus to be operated from the operable apparatus list displayed by the communication device 102 (S415). Then, the communication device 102 decides the terminal apparatus 101 selected by the user, and sets operation information associated with the decided terminal apparatus 101 into the communication device 102 (S409), and completes the processing.

As described above, the communication device 102 specifies the target terminal apparatus 101 existing in the direction pointed by the communication device 102.

(Detailed Flow of Remote Control Operation)

The following describes a detailed example of S206 and S307, in other words, a flow of operating a target terminal apparatus 101 to be operated, by using the communication device 102 as a remote controller.

FIG. 160 is a flowchart of an example of processing of operating a target terminal apparatus 101 to be operated, by using, as a remote controller, the communication device 102 according to the present embodiment.

At the beginning, the communication device 102 determines whether or not there is a command input from the user using the keys 111 (S501).

If it is determined that there is no command input from the user (N at S501), then the communication device 102 terminates the processing.

On the other hand, if it is determined that there is a command input from the user (Y at S501), then the communication device 102 further determines whether or not the input command is a quit command of the application program (S502). If it is determined that the input command from the user is a quit command of the application program (Y at S502), then the communication device 102 terminates the processing. On the other hand, if it is determined that the input command from the user is not a quit command of the application program (N at S502), then the communication device 102 transmits a command signal indicating an operation command to the terminal apparatus 101 (S503).

Next, the communication device 102 determines, by using the sound sensor 217, whether or not the terminal apparatus 101 has appropriately received the operation command (S504). More specifically, the communication device 102 receives audio information emitted from the terminal apparatus 101 to notify that the terminal apparatus 101 has appropriately received the operation command. Therefore, based on the obtained audio information, the communication device 102 examines the appropriate receipt. Here, for example, in the case where the terminal apparatus 101 is a TV, the audio information may be a sound caused when the TV changes channels. Furthermore, for example, in the case where the terminal apparatus 101 is an air conditioner or the like, the audio information may be a reaction sound for notifying the user of appropriate receipt of remote control information.

If it is determined that the terminal apparatus 101 has appropriately received the operation command (Y at S504), then the communication device 102 transmits an operation history of the terminal apparatus 101 to the server device 104 via the external communication unit 204 (S505). Here, it is also possible that the communication device 102 stores the operation history into the storage unit 213.

Next, the communication device 102 switches a display on the display unit 110 according to the operation command. For example, when a list of recorded TV programs is to be displayed on the terminal apparatus 101 that is a TV, the communication device 102 held by the user also displays the same list on the display unit 110 of the communication device 102.

Referring back to S504, if it is determined that the terminal apparatus 101 has not appropriately received the operation command (N at S504), then the communication device 102 re-transmits the operation command and determines whether or not the number of the re-transmissions exceeds a predetermined value (S506).

If it is determined that the number of the re-transmissions exceeds the predetermined value (Y at S506), then the communication device 102 displays, on the display unit 110, a notice for persuading the user to input the command by the keys again, for example, by displaying a notice "Please once more".

As described above, the communication device 102 performs processing as a remote controller for operating the target terminal apparatus 101 to be operated.

(Remote Control Registration Sequence)

The following describes data exchange between the terminal apparatus 101 and the server device 104, which is performed when the communication device 102 is to register operation information.

FIG. 161 is a sequence of data flow in registration of operation information which is performed by the communication device 102 according to the present embodiment.

At the beginning, the user activates an application program in the communication device 102 to perform proximity wireless communication (to activate a reader/writer), so that the communication device 102 starts polling (S601).

Next, the user makes the communication device 102, which starts polling, touch a region of the terminal apparatus 101 where an antenna of the terminal apparatus 101 for proximity wireless communication is provided (S602), so that the communication device 102 transmits polling waves to the terminal apparatus 101 (S603). Next, the terminal apparatus 101 receives the polling waves from the communication device 102, and transmits a polling response signal to the communication device 102 (S604). As described above, proximity wireless communication is established between the terminal apparatus 101 and the communication device 102. Then, when the communication device 102 receives the polling response signal from the terminal apparatus 101, the communication device 102 generates a read command for reading apparatus information from the terminal apparatus 101, and transmits the read command to the terminal apparatus 101 (S605). When the terminal apparatus 101 receives the read command, the terminal apparatus 101 transmits, to the communication device 102, information including apparatus information of the terminal apparatus 101 (S606).

Next, the communication device 102 extracts the apparatus information from the information received from the terminal apparatus 101 (S607).

Here, by using various sensors such as the GPS sensor, the communication device 102 generates (obtains) position information of the communication device 102 at the timing where the communication device 102 touches the terminal apparatus 101 at S602 (S608). Here, the communication device 102 generates (obtains) the position information at the timing of S602, by using the situation where the communication device 102 needs to be close to the terminal apparatus 101 within several centimeters in order to establish the proximity wireless communication. In other words, the position information generated by the communication device 102 in the establishment of the proximity wireless communication can be considered as apparatus position information of the terminal apparatus 101.

Next, the communication device 102 transmits, to the server device 104, a request command for requesting operation information associated with the extracted terminal information of the terminal apparatus 101 from the server device 104 (S609).

Next, when the server device 104 receives the request command for requesting the operation information, the server device 104 obtains the operation information associated with the terminal apparatus from an operation information management database, and transmits the obtained operation information to the communication device 102 (S610).

Finally, the communication device 102 stores the received operation information, the position information, and the apparatus information, in association with one another, into the storage unit 213 (S610).

By the above sequence, the communication device 102 performs the registration of operation information.

(Remote Control Operation Sequence)

The following describes data exchange between the terminal apparatus 101 and the server device 104, which is performed when the communication device 102 serves as a remote controller to operate the terminal apparatus 101.

FIG. 162 is a sequence of data flow where the communication device 102 serves as a remote controller to operate the terminal apparatus 101, according to the present embodiment.

At the beginning, the user inputs an operation command to the communication device 102 via the keys 111 based on a remote controller interface displayed on the display unit 110 (S701).

Next, the communication device 102 transmits the operation command inputted by the user, to the terminal apparatus 101 via the operation information transmission unit 215 (S702).

Next, the terminal apparatus 101 executes a program according to the received operation command (S704). For example, the terminal apparatus 101 executes a program corresponding to the operation command, such as a command for switching power, a command for changing a sound volume, a command for changing a temperature, a command for reproduction, a command for changing TV channels, or the like.

Next, the terminal apparatus 101 emits audio (audio information) for notifying appropriate receipt of the operation command (S704). For example, in the case where the terminal apparatus 101 is a TV, the audio is sound emitted when a TV channel is changed to another. In the case where the terminal apparatus 101 is an air conditioner or the like, the audio is reaction sound emitted to notify the user of appropriate receipt of the operation information.

Next, the communication device 102 recognizes the audio emitted from the terminal apparatus 101, by using the sound sensor 217 (S705). Then, if the communication device 102 recognizes that the audio has been emitted by the terminal apparatus 101 to notify appropriate receipt of the operation command, then the communication device 102 transmits an operation history of the terminal apparatus 101 to the server device 104 (S706). Here, as described earlier, the communication device 102 switches a display on the display unit 110 according to the operation command (S707).

Subsequently, for example, the user inputs an operation command again, by using the keys 111 based on a remote control interface displayed on the display unit 110 (S708). In this case, as described earlier, the communication device 102 transmits the operation command inputted by the user, to the terminal apparatus 101 via the operation information transmission unit 215 (S709).

Here, if the terminal apparatus 101 cannot receive the operation command appropriately, the communication device 102 cannot recognize audio emitted from the terminal apparatus 101 (S710). Then, the communication device 102 re-transmits the operation command (S711). As described above, the communication device 102 can recognize that the terminal apparatus 101 has not received the operation command, without exchanging a specific feedback signal indicating appropriate receipt of the signal by the terminal apparatus 101. As a result, the communication device 102 can perform re-transmission or the like for the operation command.

If it is determined that the number of re-transmissions of the operation command exceeds a predetermined number (S712), then the communication device 102 displays, on the display unit 110, a notice for persuading the user to input the operation command again by using the keys, such as a notice "Please once more", and waits for an input operation command from the user (S713).

By the above-described sequence, the communication device 102 serves as a remote controller for operating the terminal apparatus 101.

Thereby, the present embodiment of the present invention can provide a communication device that can easily serve as an extended user interface, such as a remote controller, of a target apparatus, without causing any complicated operations to the user.

More specifically, the communication device 102 can store, in the storage unit 213, terminal apparatus information, position information (apparatus position information) of the terminal apparatus 101, and operation information of the terminal apparatus 101, in association with one another. Thereby, a direction pointed by the communication device 102 is calculated based on sensor information detected by the sensor unit 205. Therefore, the operation information of the terminal apparatus 101 existing in the calculated directional space is called from the storage unit 213. As a result, the communication device 102 can serve as a remote controller of the terminal apparatus 101. In other words, the communication device 102 can set a remote controller command (control signal) of the communication device 102, based on the operation information of the terminal apparatus 101. For example, merely by pointing the communication device 102 to a home appliance (terminal apparatus 101) or the like, such as an air conditioner or a TV, which the user of the communication device 102 intends to operate, the communication device 102 can operate the home appliance or the like pointed by the user.

Furthermore, the move determination unit 210 determines whether or not the communication device 102 is still. Thereby, by using the stillness of the communication device 102 as a trigger, the communication device 102 can serve as a remote controller of the terminal apparatus 101 in a direction pointed by the communication device 102. In other words, the communication device 102 can serve as a remote controller for a new terminal apparatus 101 when the communication device 102 becomes still as a trigger, without user's key operation.

Furthermore, the communication device 102 obtains an oriented direction detected by the direction sensor unit 207. Thereby, if the oriented direction of infrared communication or the like turns away from the terminal apparatus 101 operated by the communication device 102 using the infrared communication, the communication device 102 can present the user with a notice message such as "Please turn it slightly to the right".

In addition, the communication device 102 can obtain sound information of the terminal apparatus 101 by the sound sensor 217. More specifically, in the case where the terminal apparatus 101 is a TV, the communication device 102 can obtain sound caused by channel switching, and in the case where the terminal apparatus 101 is an air conditioner or the like, the communication device 102 can obtain reaction sound notifying the user of that the terminal apparatus 101 has appropriately received the operation information. Thereby, without transmitting a certain feedback signal indicating that the terminal apparatus 101 has received a signal, the communication device 102 can determine whether or not the operation command has been appropriately transmitted. Therefore, it is possible to collect an operation history of a proper terminal apparatus 101 via the communication device 102, even if the terminal apparatus 101 is not connected to a general-purpose network.

Moreover, by using, as a trigger, the detection of the terminal apparatus 101 by the proximity wireless detection unit 202, in the communication device 102, the relative position obtainment unit 228 initializes relative position information, and the absolute position obtainment unit 227 sets the apparatus position information obtained via the GPS sensor 224 or the external communication unit 204 to be absolute position information of the communication device 102. Thereby, the communication device 102 can reduce accumulation errors of the apparatus position information which are occurred when the acceleration sensor 223 corrects the apparatus position information.

It should be noted that it has been described in the present embodiment that the communication device 102 obtains apparatus information of the terminal apparatus 101 by using proximity wireless communication. However, the present embodiment is not limited to the above. For example, it is also possible that the terminal apparatus 101 is provided with a bar-code having apparatus information, and the communication device 102 includes a scanner, such as a digital camera function, to read the apparatus information. Here, FIG. 163A is a diagram showing the case where a 2D bar-code is provided as apparatus information of the terminal apparatus 101, according to the present embodiment. FIG. 163B is a diagram showing an example of the case where the apparatus information of the terminal apparatus 101 is read from the 2D bar-code, according to the present embodiment. Each of FIGS. 163A and 163B shows an air conditioner 1201 as an example of the terminal apparatus 101. The communication device 102 shown in FIG. 14B further includes a scanner. The structure of the communication device 102 shown in FIG. 14B is the same as the structure of the communication device shown in FIG. 150 (or FIG. 151) except the scanner. As shown in FIG. 163A, the air conditioner 1201 is provided with a 2D bar-code 1203 including apparatus information. Then, as shown in FIG. 163B, the scanner in the communication device 102 is used to obtain the apparatus information from the 2D bar-code 1203. With the above structure, it is possible to obtain apparatus information of a terminal apparatus 101 that does not have a proximity wireless communication function. For example, even if the air conditioner is equipped at a high place and it is therefore difficult to perform action for establishing proximity wireless communication with the air conditioner, in other words, it is difficult to touch the terminal apparatus 101 by the communication device 102, the communication device 102 can obtain the apparatus information.

It should be noted that it has been described in the present embodiment that the communication device 102 selects one terminal apparatus 101 for which the communication device 102 serves as a remote controller. However, the present embodiment is not limited to the above.

For example, if a plurality of the terminal apparatuses 101 are located close to each other so that the apparatus specification unit 209 has difficulty in detecting a certain terminal apparatus 101 among them, or if the plurality of terminal apparatuses 101 are to be operated at the same time, the communication device 102 may operate the terminal apparatuses 101 simultaneously. In other words, the communication device 102 may serve as a remote controller for the plurality of terminal apparatuses 101. Each of FIGS. 164A and 164B is a diagram showing a display example of the display unit in the case where a plurality of illumination apparatuses are operated. More specifically, it is shown that the communication device 102 is pointed to an illumination switch board for operating the illumination apparatuses, not to the illumination apparatuses, so that illumination switches operable on the illumination switch board can be operated together on the display unit 110. In other words, as shown in FIG. 164A, the communication device 102 may simultaneously set plural pieces of operation information of a plurality of apparatuses, which are a kitchen illumination and a dining illumination, and simultaneously operate the apparatuses. Or, as shown in FIG. 164B, if an illumination intensity of a light-Emitting Diode (LED) illumination or the like can be changed by analog, the display unit 110 may present a display on which the illumination intensity can be changed by analog.

Furthermore, for example, if the terminal apparatuses 101 such as a TV and a recorder are closely located, it is difficult to display, on the display unit 110 of the communication device 102, all of remote control commands of the terminal apparatuses 101, since each of the TV and the recorder has a great number of remote control commands for operation. Therefore, if there are a great number of remote control commands, it is possible as shown in FIG. 165A that the display unit 110 presents a display so that the user can select, on the display, a terminal apparatus 101 for which the communication device 102 is to serve as a remote controller. Here, FIG. 165A is a diagram showing a display example in the case where the user is persuaded to select which apparatus among the plurality of apparatuses should be operated by the communication device 102 as a remote controller. In an example of FIG. 165A, the communication device 102 serves as a remote controller for the TV when setting of TV remote control is "ON", while the communication device 102 serves as a remote controller for the recorder when setting of recorder remote control is "ON".

It should be noted that it has been described in the present embodiment that the communication device 102 obtains apparatus information of the terminal apparatus 101. However, the present embodiment is not limited to the above. For example, the communication device 102 may obtain a current operating status, such as powered ON or OFF, of the terminal apparatus 101 from the terminal apparatus 101. In this case, the communication device 102 may set operation information according to the current operating status of the terminal apparatus 101. Thereby, it is not necessary to display all of the remote control commands on the display unit 110. As a result, the user interface can be simplified. For example, in the case where the terminal apparatus 101 is a TV or the like, the communication device 102 can obtain the current operating status of the terminal apparatus 101 by using a general-purpose network such as the Internet. FIG. 165B is a diagram showing an example in the case where the communication device 102 sets operation information according to a current operating status of the terminal apparatus 101. It is assumed in the example of FIG. 165B that the TV is ON, the recorder is OFF, and the communication device 102 knows these current operating statuses. Under the assumption, since it is not necessary to use at least a "Power ON" command for TV operation, the display unit 110 of the communication device 102 does not need to display the command. In addition, since the recorder is OFF, the first operation selected by the user would be operation for powering the recorder ON. Therefore, it is necessary to display operation information for powering the recorder ON. As described above, the communication device 102 may narrow down the remote control commands to be presented to the user, according to the operating status of the terminal apparatus 101.

It should be noted that it has been described in the present embodiment that the communication device 102 calculates directional space information of the communication device 102, and thereby specifies a target terminal apparatus 101 existing in the oriented direction. However, the server device 104 may perform the specification of the terminal apparatus 101. In this case, for example, the communication device 102 transmits angular velocity information, acceleration information, and position information to the server device 104 via the external communication unit 204. Then, based on the angular velocity information, the acceleration information, and the position information received from the communication device 102, the server device 104 may specify a terminal apparatus 101 existing in the oriented direction of the communication device 102, and transmit the operation information of the specified terminal apparatus 101 to the communication device 102.

It should be noted that the communication device 102 according to the present embodiment may use altitude information. In this case, it is possible to generate (detect) the altitude information of the communication device 102 by a barometer, for example.

In the present embodiment, it is possible to change a detection range of a remote controller for a terminal apparatus 101 such as a TV or an air conditioner, depending on a degree of mobility, a degree of operation urgency, a size of the apparatus, or the like. For example, the reduction of a detection range for detecting a terminal apparatus 101, such as an air conditioner, which is unlikely to move, can prevent false operation during operation of another terminal apparatus 101. On the other hand, the increase of a detection range of a remote controller for detecting a terminal apparatus 101, such as a fan, which is likely to move, makes it possible to operate the terminal apparatus 101 even if the position of the terminal apparatus is changed to some extent.

Moreover, if the terminal apparatus 101 is far from the communication device 102, a range in which the communication device 102 can operate the apparatus is reduced. Therefore, it is possible to vary a threshold value $\alpha$ for defining a directional space range, depending on a distance between the terminal apparatus 101 and the communication device 102.

Furthermore, of course, as shown in FIG. 166, the user on the first floor of a building can operate a terminal apparatus 101 on the second floor. Here, FIG. 166 is a schematic diagram of remote control operation for the second floor, according to the present embodiment. As shown in FIG. 166, if the user holding the communication device 102 exists in a room or floor that is different from a room or floor where the terminal apparatus 101 to be operated exists, or if the communication device 102 is far from the terminal apparatus 101 to be operated by a predetermined distance or more, the user may point the communication device 102 to a direction so that a list of terminal apparatuses 101 in a room in the pointed direction are displayed. Thereby, even if the user does not exactly remember a location of a terminal apparatus 101 in a next room, it is possible to operate the terminal apparatus 101 in the far location.

Nineteenth Embodiment

FIG. 167 is a diagram illustrating an entire system according to the nineteenth embodiment of the present invention.

Referring to FIG. 167, the system according to the present embodiment includes a RF-ID device O50, a mobile device O60, a first server O101, and a second server O103.

The RF-ID device O50 is a device having a NFC function. The RF-ID device O50 is included in electronic products such as refrigerators, microwaves, washing machines, TVs, and recording apparatuses. The RF-ID device O50 stores, as product information of a corresponding product, (a) a product serial number that is ID for identifying the product, (b) use history information of the product, (d) error information, and the like into a memory of the product. Thereby, the RF-ID device O50 has the same function as that included in the terminal apparatus 101 according to the eighteenth embodiment.

The mobile device O060 has a NFC function communicable with the NFC function of the RF-ID unit O50 by proximity wireless communication. The mobile device O60 also has a reader/writer function of reading product information from the RF-ID device O50. In addition, the mobile device O60 is a portable device such as a mobile phone terminal and a remote controller terminal for TV. Furthermore, the mobile device O60 has the same function as that of the communication device 102 according to the eighteenth embodiment.

The first server O101 is a server connected to the mobile device O60 via a general-purpose network such as the Internet in order to communicate with the mobile device O60. The first server O101 has an internal database (DB) in which pieces of RF-ID information read from the RF-ID devices O50 to the mobile device O60 are accumulated.

The second server O103 is a server connected to the first server O101 via a general-purpose network such as the Internet in order to communicate with the first server O101. The second server O103 has an internal database (DB) in which pieces of building information regarding the RF-ID devices O50 are accumulated. Each of the building information is coordinates of a building in which the corresponding RF-ID device O50 is located.

The RF-ID device O50 includes product ID O50, a first server URL O52, service ID O53, and an accuracy identifier O54.

Here, the server device 104 according to the eighteenth embodiment has functions of the first server O101 and the second server O103.

The product ID O51 is ID for identifying a product having the RF-ID device O50. For example, the product ID O51 is a part number (including color information) or a product serial number of the product.

The first server URL O52 is address information of the first server O101.

The service ID O53 is ID for identifying a product classification such as a TV, an air conditioner, or a refrigerator.

The accuracy identifier O54 is information indicating reliability of position information provided from a product with the RF-ID device 10 which has the product ID.

As described above, if the RF-ID device O50 according to the present embodiment is moved into proximity of the mobile device O60 to be able to perform proximity wireless communication, the RF-ID device O50 can transmit, to the mobile device O60, the product serial number, the first server URL, the service ID, and the accuracy identifier which are stored in the memory.

Next, the mobile device O60 according to the present embodiment is described.

The mobile device O60 includes an antenna O61, a RF-ID reader/writer O62, a coordinate accuracy identification information O63, a CPU O64, a program execution unit O65, a data processing unit O66, a memory unit O67, a display unit O68d, a communication antenna O68, a transmission unit O70, a receiving unit O71, a communication unit O72, a position information storage unit O73, a RF-ID storage unit O74, a RF-ID detection unit O75, a URL unit O76, a reproducing unit O77, a relative position calculation unit O78, a coordinate information sending unit O79, a recording unit O80, a building coordinate information output unit O81, a registered-coordinate unit O82, a determination unit O83, a reference coordinate unit O84, a position information output unit O85, a position information unit O86, a direction information unit O87, a magnetic compass O88, a geomagnetism correction unit O89, a satellite antenna O90, a position information calculation unit O91, position information O92, position information correction unit O93, a direction information correction unit O94, an angular velocity sensor O95, an angular velocity sensor O96, an angular velocity sensor O97, an acceleration sensor O98, an acceleration sensor O99, an acceleration sensor O100, an integrator O105, an integrator O106, and an absolute coordinate calculation unit O107.

The antenna O61 supplies power towards any RF-ID devices so as to search for a RF-ID device with which the mobile device O60 can perform proximity wireless communication. In receiving a response, the antenna O61 establishes proximity wireless communication with the responding RF-ID device O50 to receive modulated information from the RF-ID device O50.

The RF-ID reader/writer O62 demodulates the received modulated information.

Here, the proximity wireless communication unit 201 according to the eighteenth embodiment has functions of the antenna O61 and the RF-ID reader/writer O62.

The coordinate accuracy identification information O63 extracts an accuracy identifier from the received information.

The CPU O64 controls a system of the mobile device O60. The CPU O64 controls operations of each unit included in the mobile device O60.

The program execution unit O65 executes a program based on the service ID included in the received information.

The data processing unit O66 performs data processing for information transmitted from the first server O101.

The memory unit O67 temporarily stores the information processed by the data processing unit O66.

The display unit O68d displays the information stored in the memory unit O67.

The communication antenna O68 is connected to a general-purpose network such as the Internet. The communication antenna O68 has the same function as that of the communication antenna 219 according to the eighteenth embodiment.

The transmission unit O70 modulates information to be transmitted to the general-purpose network such as the Internet. The transmission unit O70 has the same function as that of the transmission unit 221 according to the eighteenth embodiment.

The receiving unit O71 demodulates information received via the general-purpose network such as the Internet. The receiving unit O71 has the same function as that of the receiving unit 220 according to the eighteenth embodiment.

The communication unit O72 generates and analyzes information to be exchanged (transmitted and received) in communication with other devices via the general-purpose network such as the Internet. The communication unit O72 has the same function as that of the communication control unit 222 according to the eighteenth embodiment.

The position information storage unit O73 stores position information generated by the mobile device O60.

The RF-ID storage unit O74 holds product ID and service ID which are obtained from the RF-ID device O50.

The RF-ID detection unit O75 detects a response from the RF-ID device O10.

The URL O76 extracts the first server URL from the information received from the RF-ID device O50.

The reproducing unit O77 reproduces the position information stored in the position information storage unit O73.

The relative position calculation unit O78 calculates relative position information from (a) the position information which is obtained from the position information storage unit O73 and then reproduced and (b) position information of a current position (current position information) of the mobile device O60.

The coordinate information sending unit O79 provides other units with the position information of the mobile device O60 which is generated at a timing of receiving a trigger from the RF-ID detection unit O75.

The recording unit O80 writes the position information provided from the coordinate information sending unit O79, into the position information storage unit O73.

The building coordinate information output unit O81 extracts building coordinate information from the information received by the communication antenna O68.

The registered-coordinate unit O82 extracts registered coordinate information from the information received by the communication antenna O68.

The determination unit O83 examines (determines) an accuracy of the registered coordinate information extracted by the registered-coordinate unit O82.

If the determination unit O83 determines that the registered coordinate information is reliable, then the reference coordinate unit O84 sets the registered coordinate information to be reference coordinate information and provides the reference coordinate information to the position information correction unit O93.

The position information output unit O85 generates position information using direction information provided from the direction information unit O87 and position information provided from the position information unit O86, and provides the generated position information to another unit. The position information provided from the position information unit O86 and the direction information provided from the direction information unit O87 are position information of the mobile device O60 which is provided form the absolute coordinate calculation unit O107 that includes the position information correction unit O93 and the direction information correction unit O94.

The magnetic compass O88 determines a direction.

The direction information unit O89 generates direction information from information detected by the magnetic compass O88.

Here, the direction sensor 226 according to the eighteenth embodiment includes the functions of the magnetic compass O88 and the direction information unit O89.

The satellite antenna O90 communicates with satellites.

The position information calculation unit O91 calculates position information of the mobile device O60 from a result of the communication with the satellites. For example, the position information calculation unit O91 calculates longitude, latitude, and altitude of the position of the mobile device O60.

The position information unit O92 generates position information from the position information generated by the position information calculation unit O91.

Here, the GPS sensor 224 according to the eighteenth embodiment includes the functions of the satellite antenna O90, the position information calculation unit O91, and the position information unit O92.

The position information correction unit O93 corrects a result of position information obtained from the integrators O105 and O106, by using pieces of information provided from the position information O92, the reference coordinate unit O84, and the building coordinate information output unit O81.

The direction information correction unit O94 corrects a result of direction information obtained from the integrators O105 and O106, by using the information provided from the direction information unit O89.

The angular velocity sensor O95 measures an angular velocity in the x-axis direction of the mobile device O60.

The angular velocity sensor O96 measures an angular velocity in the y-axis direction of the mobile device O60.

The angular velocity sensor O97 measures an angular velocity in the z-axis direction of the mobile device O60.

Here, the angular velocity sensor 225 according to the eighteenth embodiment includes the functions of the angular velocity sensor O95, the angular velocity sensor O96, and the angular velocity sensor O97.

The acceleration sensor O98 measures an acceleration in the x-axis direction of the mobile device O60.

The acceleration sensor O99 measures an acceleration in the y-axis direction of the mobile device O60.

The acceleration sensor O100 measures an acceleration in the z-axis direction of the mobile device O60.

Here, the acceleration sensor 223 according to the eighteenth embodiment includes the functions of the acceleration sensor O98, the acceleration sensor O99, and the acceleration sensor O100.

The integrator O105 integrates results of the measurement of the angular velocity sensors O95, O96, and O97.

The integrator O106 integrates results of the measurement of the acceleration sensors O98, O99, and O100.

The absolute coordinate calculation unit O107 includes the position information correction unit O93 and the direction information correction unit O94, in order to calculate absolute coordinates of the mobile device O60.

As described above, the mobile device O60 according to the present embodiment can determine a position of the mobile device O60 when the mobile device O60 receives the product information from the RF-ID device O50, thereby generating position information of the mobile device O60. Thereby, the mobile device O60 transmits, to the first server O10, the position information and the product information of the product having the RF-ID device O50 in association with each other. In addition, (a) the reference coordinates and the building coordinate information which are generated from the registered coordinates received from the RF-ID device O50, (b) the position information generated by the position information unit O92, and (c) the information generated by the direction information unit O89 allow the current position information of the mobile device O60 to be corrected. In addition, combination of the registered coordinate information in the first server O101 and the building coordinate information in the second server O103 makes it possible to generate a 3D product map of a building in which a product having the RF-ID device 10 registered by using the mobile device O60 is located. It is also possible to display the generated 3D product map on the display unit O68d.

Next, the first server O101 according to the present embodiment is described.

The first server O101 is a server connected to the mobile device O60 via a general-purpose network such as the Internet. The first server O101 includes a registered-coordinate information unit O102 in which pieces of information regarding products having the RF-ID devices O50 are managed.

The registered-coordinate information unit O102 receives the information of the RF-ID device O10 and the information of the mobile device O60 which are in association with each other. The registered-coordinate information unit O102 manages the information of the mobile device O60 as parent device information and the RF-ID device O50 as child device information in association with each other. The child device information is added with the position information generated by the mobile device O60 so as to manage also information indicating whether the terminal device (product having the RF-ID device O50) exists. In addition, combination of the building coordinate information received from the second server O103 and the information in the registered-coordinate information unit O102 makes it possible to generate a 3D product map of products including the mobile device O60 arranged in the corresponding building.

Next, the second server O103 according to the present embodiment is described.

The second server O101 is a server connected to the first server O103 via the general-purpose network such as the Internet. The second server O103 includes a building coordinate database O104 in which a room arrangement and coordinates of each existing building (for example, longitude, latitude, and altitude) are managed in association with each other.

The room arrangement and coordinates of each existing building stored in the building coordinate database O104 can be combined with the registered coordinate information registered in the first server O103 in order to generate a 3D product map of products including the mobile device O60 arranged in the corresponding building. The building coordinate database O104 may be managed as private information in a server having security higher than that of the first server O101 (for example, a server having setting of preventing the server from directly communicating with the mobile device O60). In this aspect, it is possible reduce leakage of the private information.

As described above, in the system according to the present embodiment, the product information of the product having the RF-ID device O50 is read by the mobile device O60 using proximity wireless communication. Then, the mobile device O60 transmits, to the first server O103, (a) the product information received from the RF-ID device O50 and (b) the position information generated by touching the RF-ID device O50 by the mobile device O60 to perform proximity wireless communication, which are in association with each other. The first server O103 can manage the information of the mobile device O60 as parent device information and the information of the product having the RF-ID device O50 as child device information, in association with each other. In addition, if relative positions of such products having the RF-ID devices O50 are calculated using pieces of the position information of the products, the relative positions can be used to generate a 3D map of the products.

In addition, the system includes the second server O103 having a database in which a room arrangement and coordinates of each building are managed. The room arrangement and coordinates are combined with pieces of position information of products which are managed in the first server O101. Thereby, it is possible to generate a 3D map (3D product map) of the products having the RF-ID devices O50 arranged in each building.

Moreover, the mobile device O60 can correct the current position information of the mobile device O60 by using (a) the reference coordinates and the building coordinate information which are generated from the registered coordinates received from the RF-ID device O50, (b) the position information generated by the position information unit O92, and (c) the information generated by the direction information unit O89.

The following describes processing of registering the product information of the product having the RF-ID device O50 into the first server O101.

If the mobile device O60 touches the RF-ID device O50 to be able to perform proximity wireless communication with the RF-ID device O50, the mobile device O60 supplies power and clock to the RF-ID device O50 that thereby starts operating.

With the power supply, the RF-ID device O50 modulates the product ID O51, the first server URL O52, the service ID O53, and the accuracy identifier O54 which are stored, and transmits these pieces of data to the mobile device O60.

In receiving the product ID O51, the first server URL O52, the service ID O53, and the accuracy identifier O54 by the antenna O61, the mobile device O60 demodulates the received pieces of information in the RF-ID device O62.

The URL unit O76 extracts the first server URL O52 and provides the extracted first server URL O52 to the communication unit O72.

The RF-ID storage unit O74 stores the product ID O51 and the service ID O53.

The coordinate accuracy identification information O63 extracts the accuracy identifier O54 and provides the extracted accuracy identifier O54 to the determination unit O83.

The RF-ID detection unit O75 provides the coordinate information sending unit O79 and the reference coordinate unit O84 with a trigger for notifying of the receipt of the pieces of information from the RF-ID device O50.

In receiving the trigger, the coordinate information sending unit O79 provides the communication unit O72 with the position information of the mobile device N60 which is received from the position information output unit O85.

Here, the description is given for the position information of the mobile device O60 outputted by the position information output unit O85.

First, the absolute coordinate calculation unit O107 receives (a) a result of integrating, by the integrator O105, results detected by the angular velocity sensors O95 to O97 and (b) a result of integrating, by the integrator O106, results detected by the acceleration sensors O98 to O100. Here, in the absolute coordinate calculation unit O107, the direction information correction unit O94 and the position information correction unit O93 correct the results of the integrators O105 and O106, based on (a) the information of the position information unit O92 storing the calculation result of the position information calculation unit O91 using the satellite antenna O90 and (b) information of the direction information unit O89 storing the results of the orientation indicated by the magnetic compass O88.

Next, the absolute coordinate calculation unit O107 provides the corrected direction information in the direction information unit O87 and the corrected position information in the position information unit O86 to the position information output unit O85. The position information output unit O85 generates position information from the corrected direction information in the direction information unit O87 and the corrected position information in the position information unit O86.

By the above-described processing, the mobile device O60 eventually generates position information (current position information) of the mobile device O60.

Then, the program execution unit O65 provides the product ID and the service ID, which are stored in the RF-ID storage unit O74, to the communication unit O72.

The communication unit O72 generates data (information) including (a) the position information provided from the coordinate information sending unit O79 and (b) the product ID and the service ID provided from the program execution unit O65. The communication unit O72 designates the first server URL notified from the URL unit O76 to be a destination address of the data, and provides the data and the address to the transmission unit O70. The transmission unit O70 modulates the data and transmits the modulated data to the first server O101 via the communication antenna O68.

In receiving the data from the mobile device O60, the first server O101 demodulates the modulated data.

The registered-coordinate information unit O102 stores the information of the mobile device O60 as parent device information and the information of the RF-ID device O50 as child device information in association with each other. In more detail, the product ID O51 and the service ID O53 which are information of the product having the RF-ID device O50 (child device) are managed in association with the position information of a position at which the mobile device O60 (parent device) receives the product ID O51 and the service ID O53 from the RF-ID device O50.

The following describes processing performed by the mobile device O60 to generate a 3D map of products (a 3D product map). Each of the products has the RF-ID device O50 and has been registered by the mobile device O60 onto the first server O101.

FIG. 168 is a diagram illustrating an example of an arrangement of the products having the RF-ID units O50 according to the present embodiment.

In a living room on the first floor, a TV O50A, a BD recorder O50B, and an air conditioner O50C are arranged. In a Japanese room on the first floor, an air conditioner O50D is arranged. On the second floor, a TV O50E and an air conditioner O50F are arranged. Each of the above products is embedded with the RF-ID device O50. It is assumed that coordinates of a position of each product have already been registered to the registered-coordinate information unit O102 connected to the first server O101, by using the mobile device O60 employing the above-described processing for registering product information stored in the RF-ID device O50.

First, the communication unit O72 in the mobile device O60 generates product information request data to be used to request the first server O101 to provide the product information registered by using the mobile device O60.

The transmission unit O70 modulates the product information request data and transmits the modulated data to the first server O101 via the communication antenna O68.

In receiving the product information request data, the first server O101 generates product information response data and transmits the generated data to the mobile device O60. The product information response data includes the child product information that managed in association with the mobile device O60 as its parent device. In this example, the product information response data includes the product ID O51, the service ID, and the position information regarding each of the TV O50A, the BD recorder O50B, the air conditioner O50C, the air conditioner O50D, the TV O50E, and the air conditioner O50F.

Next, the first server O101 transmits the same product information response data to the second server O103.

Based on the position information of each product included in the product information response data, the second server O103 extracts, from the building coordinate database O104, image data including position (coordinate) information of a building (hereinafter, "building coordinate information") located at the same position as that of each product. FIG. 169 illustrates the building coordinate information extracted from the building coordinate database O104. The building coordinate information includes an image of a room arrangement and position information of a building.

The second server O103 transmits the extracted building coordinate information to the mobile device O60.

The receiving unit O71 in the mobile device O60 receives the product information response data via the communication antenna O68, then modulates the received information, and provides the modulated information to the communication unit O72.

The communication unit O72 provides the modulated information to the program execution unit O65.

The program execution unit O65 generates image data of a 3D map of products as illustrated in FIG. 170, using the position information of each of the products which is information included in the product information response data. In the 3D map, the products are mapped as different icons on respective coordinates based on the corresponding position information, so that the user can learn the arrangement of the products at a glance.

The program execution unit O65 provides the generated image data to the data processing unit O66.

The data processing unit O66 provides the image data to the memory unit O67 in which the image data is temporarily stored.

The display unit O68d displays image data of the 3D map of products illustrated in FIG. 169 which is stored in the memory unit O67.

Next, in receiving the building coordinate information from the second server O103 via the communication antenna O68, the receiving unit O71 in the mobile device O60 demodulates the received building coordinate information, and provides the demodulated information to the building coordinate information output unit O81.

The building coordinate information output unit O81 analyzes the building coordinate information and provides the building coordinate information to the display unit O68d. The display unit O68d displays image data of a 3D product map as illustrated in FIG. 170. The displayed image data is a combination of the image data of FIG. 169 and the already-displayed image data of FIG. 170.

As described above, it is possible to generate a 3D product map which the user having the mobile device O60 can see an arrangement of products at a glance.

Next, the description is given for the processing performed by the mobile device O60 to correct the position information of the mobile device O60 by using the building coordinate information.

It is assumed in this example that product information of the air conditioner O50D in FIG. 168 is to be registered to the first server O101.

Here, the processing until when the first server O101 receives data including product ID and service ID from the mobile device O60 is the same as the processing described previously, and therefore is not explained again below.

In receiving the product information of the air conditioner O50D, the first server O101 transmits the position information of the air conditioner D50D to the second server O103.

The second server O103 extracts, from the building coordinate database O104, the building coordinate information of FIG. 169 corresponding to the position information of the air conditioner O50D. Then, the second server O103 transmits the extracted building coordinate information to the first server O101.

If the product to be registered is a product usually fixed to a wall or somewhere, such as an air conditioner, the first server O101 compares (a) the position information of the air conditioner that is indicated in the building coordinate information to (b) the position information of the air conditioner that is generated by the mobile device O60. If the position information of the air conditioner that is generated by the mobile device O60 is not close to a wall, the first server O101 transmits, to the mobile device O60, the position information (hereinafter, referred to also as "building coordinate information) of the air conditioner that is indicated in the building coordinate information.

In receiving the building coordinate information, the receiving unit O71 in the mobile device O60 demodulates the building coordinate information and provides the demodulated information to the building coordinate information output unit O81. The building coordinate information output unit 081 determines, based on the building coordinate information and the position information of the air conditioner, that the current position information of the mobile device O60 is to be corrected. Then, the building coordinate information output unit O81 provides the building coordinate information to the position information correction unit O93.

The position information correction unit O93 corrects the current position information of the mobile device O60 based on the building coordinate information provided from the building coordinate information output unit O81.

Next, the mobile device O60 registers information of the air conditioner O50D into the first server O101 in association with the corrected current position information of the mobile device O60.

As described above, (a) the position information of the air conditioner that is indicated in the building coordinate information is compared to (b) the position information of the air conditioner that is generated by the mobile device O60. Thereby, it is possible to determine whether or not (b) the position information of the air conditioner that is generated by the mobile device O60 is deviated from a correct position. As a result, the position information of the mobile device O60 can be corrected.

It should be noted that it has been described that the first server O101 receives the building coordinate information from the second server O103 for the determination. However, the present invention is not limited to the above. For example, it is also possible that the mobile device O60 obtains the building coordinate information from the second server O103 before transmitting information to be registered to the first server O101 and that the mobile device O60 compares the building coordinate information to the position information of the air conditioner O50D to determine whether or not the position information of the mobile device O60 is to be corrected.

Next, the description is given for the processing performed by the mobile device O60 to correct the position information of the mobile device O60 by using the accuracy identifier.

It is assumed that the product information of the air conditioner O50C has already been registered to the first server O101 and the mobile device O60 touches the air conditioner O50C.

When the mobile device O60 receives, via the antenna O61, the product ID O51, the first server URL O52, the service ID O53, and the accuracy identifier O54 from the RF-ID device O50 of the air conditioner O50C, the RF-ID unit O62 in the mobile device O60 demodulates these pieces of information.

At this stage, the mobile device O60 does not know whether the product information of the air conditioner O50C has already been registered in the first server O101. Therefore, the mobile device O60 transmits, to the first server O101, data including the position information of the mobile device O60, the product ID, and the service ID by the product registration processing as described previously.

In receiving the data from the mobile device O60, the first server O101 demodulates the received data.

If the registered-coordinate information unit O102 determines that the product information of the air conditioner O50C has already been registered, then the first server O101 generates data including the position information of the air conditioner O50C that is registered in the registered-coordinate information unit O102, and then transmits the generated data to the mobile device O60.

When the receiving unit O71 in the mobile device O60 receives the position information of the air conditioner O50C via the communication antenna O68, the receiving unit O71 demodulates the received position information and provides the demodulated information to the registered-coordinate unit O82.

The registered-coordinate unit O82 extracts the position information from the data including the position information of the air conditioner O50C, and provides the extracted position information to the determination unit O83.

The determination unit O83 determines whether or not the position information received from the registered-coordinate unit O82 is to be reference coordinates, based on the accuracy identifier O54 of the RF-ID device O50 received from the coordinate accuracy identification information O63.

FIG. 172 illustrates processing performed by the determination unit O83 based on each accuracy identifier.

Regarding the accuracy identifier O54, the RF-ID device O50 is previously assigned with an accuracy identifier for identifying each different product as illustrated in FIG. 172.

Here, the air conditioner O50C is assigned with the accuracy identifier O54 representing a "high" accuracy. If the determination unit O83 determines that the position information of the mobile device O60 is to be corrected, then the determination unit O83 provides the position information received from the registered-coordinate unit O82 to the reference coordinate unit O84.

Here, if the accuracy identifier O54 represents a "low" accuracy, then the mobile device O60 determines that it is not necessary to correct the position information of the mobile device O60. Then, the mobile device O60 notifies the determination result to the first server O101. The first server stores the new position information of the air conditioner O50C into the registered-coordinate information unit. Thereby, the processing is completed.

If there is a trigger from the RF-ID detection unit O75, the reference coordinate unit O84 provides the position information received from the registered-coordinate unit O82 to the position information correction unit O93.

The position information correction unit O93 corrects the current position information of the mobile device O60 based on the position information received from the reference coordinate unit O84.

Next, the mobile device O60 notifies the first server O101 of that the position information is completed. Thereby, the processing is completed.

As described above, (a) the position information indicated in the building coordinate information is compared to (b) the position information generated by the mobile device O60. Thereby, it is possible to determine whether or not (b) the position information generated by the mobile device O60 is deviated from a correct position. As a result, the position information of the mobile device O60 can be corrected, thereby preventing unnecessary updating of the position information.

Furthermore, products which are usually not moved from an initial equipped location are designated in a group of products having a high accuracy of the position coordinates. Thereby, reliability of the accuracy can be improved.

If even position information of a product in the group having a high accuracy is deviated from a correct position more than predetermined times, it is possible not to correct the position information newly generated by the mobile device O60, but to correct the position information registered in the registered-coordinate information unit O102.

It should be noted that it has been described that the mobile device O60 determines, based on the accuracy identifier, whether or not the position information is to be corrected. However, the accuracy identifier may be transmitted to the first server O101 so that the first server O101 determines the necessity of the correction.

Next, the description is given for processing performed by the mobile device O60 to manage relative positions of the products.

Here, product registration is first performed for the TV O50A. Then, with reference to the position information of the TV O50A as a reference point, relative position information is generated for the BD recorder O50B that is registered next.

When the mobile device O60 receives, via the antenna O61, the product ID O51, the first server URL O52, the service ID O53, and the accuracy identifier O54 from the RF-ID device O50 of the TV O50A, the RF-ID unit O62 in the mobile device O60 demodulates these pieces of information. The coordinate information sending unit O79 in the mobile device O60 provides the recording unit O80 with the position information determined in detecting the RF-ID device O50.

In receiving the position information, the recording unit O80 records the received position information onto the position information storage unit O73.

After that, in the same product registration processing as described earlier, the mobile device O60 registers the product information of the TV O50A into the first server O101.

Next, the mobile device O60 registers product information of the BD recorder O50B.

When the mobile device O60 receives, via the antenna O61, the product ID O51, the first server URL O52, the service ID O53, and the accuracy identifier O54 from the RF-ID device O50 of the BD recorder O50B, the RF-ID unit O62 in the mobile device O60 demodulates these pieces of information.

The coordinate information sending unit O79 in the mobile device O60 provides the recording unit O80 with the position information determined in detecting the RF-ID device O50 of the BD recorder O50B.

The recording unit O80 does not record the position information of the BD recorder O50B onto the position information storage unit O73, because the position information of the TV O50A has already been recorded.

In receiving the position information from the coordinate information sending unit O79, the relative position calculation unit O78 obtains the position information of the TV O50A from the position information storage unit O73 via the reproducing unit O77.

Next, the relative position calculation unit O78 calculates relative position information of the BD recorder O50B which is with respect to a reference position (or a reference point) that is the position information of the TV O50A obtained via the reproducing unit O77. Then, the relative position calculation unit O78 stores the calculation result into the position information recording unit.

By the above-described processing, it is possible to generate relative position information of a product with reference to a position of a different certain product.

It should be noted that it has been described that relative position information is stored in the mobile device (position information storage unit O73). However, the present invention is not limited to the above. It is also possible that the mobile device O60 transmits relative position information to the first server O101 that manages the received relative position information in the registered-coordinate information unit O102.

It should also be noted that it has been described that the position information of the TV O50A for which product registration is performed at the first time is set to be the reference position. However, the present invention is not limited to the above.

For example, a position predetermined by the user may be set to be the reference point (reference position). For instance, the reference point may be a position of an entrance of a building. If the mobile device O60 is a remote controller terminal of a TV, a position of the TV may be the reference point.

FIGS. 173 and 174 illustrate examples of processing of a 3D map according to the present embodiment.

In the present embodiment, the position information storage unit O73 in the mobile device O60 holds relative position information. However, the present invention in not limited to the above. For example, the following aspect is also possible. The coordinate information sending unit O79 in the mobile device O60 provides position information generated by the mobile device O60 to the recording unit O80 every time the position information is generated. The recording unit O80 thereby records the position information onto the position information storage unit O73. The position information storage unit O73 accumulates the position information generated by the mobile device O60. In this aspect, the program execution unit O65 generates trajectory information of the mobile device O60 from pieces of the position information accumulated in the position information storage unit O73. Thereby, a travel of the mobile device O60 can be estimated form the trajectory information.

It should be noted that it has been described in the present embodiment that the processing of the determination unit O83 is performed based on the two kinds of accuracy identifiers in FIG. 172. However, the present invention is not limited to the above. For example, the following is also possible. Two or more kinds of product classification are set. A threshold value is defined for each kind of the classification to represent a different size of deviation from the position information. Based on the threshold value, the determination unit O83 determines whether or not to correct the position information of the mobile device O60.

It should also be noted that the present embodiment may be combined with any other embodiments of the present invention. For example, it is also possible that the function of the communication device M1101S according to the eighteenth embodiment is provided to a product having the RF-ID device O50, and the 3D map (3D product map) as well as home ID are shared among products within the same house. In this aspect, each product obtains the 3D map beforehand from the mobile device O60 using the NFC function.

It should also be noted that it has been described in the present embodiment that the RF-ID device O50 is provided to TVs, BD recorders, air conditioners, and the like. FIG. 176 illustrates a system including products O50G to O50N each having the RF-ID device O50. Each of the products O50G to O50N also includes a specific small power wireless communication device (for example, ZigBee), which enables the products to directly communicate with each other within a range in which radio waves can be received. It is assumed that each of the products O50G to O50N has already obtained a 3D map from the mobile device O60 via the RF-ID device O50. The 3D map shows an arrangement of the products O50G to O50N. Or, for another method, each of the products O50G to O50N may have the communication antenna O68 in order to obtain, via the interne, the 3D map showing the product arrangement.

The following describes the situation where a product O50H transmits data to a product O50K by using the specific small power wireless communication device. The specific small power wireless communication device usually operates at a sleep mode in terms of power saving. At the sleep mode, a power source of the specific small power wireless communication device is switched ON or OFF at regular intervals. Here, timings of switching ON or OFF for the products are in synchronization with each other. When the product O50H needs to transmit data, the specific small power wireless communication device in the product O50H is switched to an awake mode. At the awake mode, the power source of the specific small power wireless communication device is always ON. The product O50H examines the 3D map showing the arrangement of the products O50G to O50N, which has previously been obtained. From the 3D map of the product arrangement, the product O50H determines products located between the product O50H and the product O50K. In this example, a product O50J is determined from the 3D map to be a relay product to relay data.

The product O50H instructs the product O50J to switch to the awake mode. The product O50H transmits, to the product O50J, data addressed to the product O50K. When the product O50J receives the data addressed to the product O50K, the product O50J transfers the data to the O50K. Then, the product O50J is switched to the sleep mode.

As described above, using the 3D map, the product O50H determines a relay product in order to transmit data, and causes only the determined relay product (product O50J) to be switched to the awake mode. Thereby, other products, which do not need to be at the awake mode, do not need to be switched to the awake mode. Without the 3D map, in order to establish a path to the product O50K, the product O50H needs to cause all products to be switched to search for the path.

It should also be noted that the units included in each of the above-described embodiments may be implemented into a Large Scale Integration (LSI) that is typically an integrated circuit. These units may be integrated separately, or a part or all of them may be integrated into a single chip. Here, the integrated circuit is referred to as a LSI, but the integrated circuit can be called an IC, a system LSI, a super LSI or an ultra LSI depending on their degrees of integration. The technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the functional blocks as an integrated circuit. For example, biotechnology and the like can be applied to the above implementation.

Twentieth Embodiment

The following describes the twentieth embodiment of the present invention.

FIG. 176 is a configuration of network environment for apparatus connection setting according to the present embodiment of the present invention. As shown in FIG. 176, the present embodiment is home network environment in which various home appliances are connected to a home appliance control device 5000 via a wireless communication device. Here, the various home appliances are, for example, a TV N10A, a BD recorder N10B, an air conditioner N10C, an air conditioner N10D, a fire alarm N10E, an air conditioner N10F, a fire alarm N10G, a solar panel H10H, a TV N10I, and an FF heater 10K.

FIG. 177 is a diagram showing a structure of a network module of an apparatus (home appliance) according to the present embodiment. FIG. 177 shows a structure of a network module embedded in each of the home appliances shown in FIG. 176. This network module includes at least: a first wireless communication unit 5011 capable of performing proximity wireless communication such as the NFC unit; and a second wireless communication unit 5012 capable of performing near field communication such as ZigBee. The first wireless communication unit 5011 includes an antenna unit, an interface unit, a power supply unit, a communication unit, a clock unit, a nonvolatile memory, and the like. The second wireless communication unit 5012 includes an antenna unit, a wireless communication unit, an interface, and the like. The functions of these units are the same as those described earlier. Therefore, they will not be described again below. It should be noted that the network module may further include a CPU, a thermistor, a power supply unit, and the like.

FIG. 178 is a functional block diagram of a structure of a home appliance control device 5000 according to the present embodiment. Likewise each of the home appliances as described above, the home appliance control device 5000 includes at least the first wireless communication unit 5021 and the second wireless communication unit 5022. Furthermore, the home appliance control device 5000 has protocols corresponding to various different manufacturers, such as manufacturers A, B, and C, or various different apparatuses.

This is because the home appliances sometimes employ various different protocols at an upper layer 5025 higher than a physical layer 5023 and a MAC layer 5024, although they employ a standardized common protocol at the physical layer 5023 and the MAC layer 5024. For example, an apparatus 5026 performs authentication by using NFC, while an apparatus 5027 performs authentication by using buttons. Moreover, the home appliances would employ various near field communication methods, such as BlueTooth and wireless LAN (802.11). In this case, the home appliances employ different protocols even for the physical layer and the MAC layer. Therefore, the home appliances perform operation at these layers in the same manner as the situation where they have different protocols for the upper layer. Therefore, the home appliance control device 5000 can cope with the above situations, if the home appliance control device 5000 has protocols corresponding to various manufacturers and apparatuses as described previously.

FIG. 179 is a diagram for explaining a user action for setting a solar panel according to the present embodiment. The solar panel N10H according to the present embodiment includes a plurality of panels each of which is capable of communicating with the home appliance control device 5000. Here, the user is a person who establishes communication connection between the home appliance control device 5000 and the solar panel N10H, such as an engineer for setting the solar panel N10H or an engineer for setting the home appliance control device 5000. Hereinafter, the communication device 102 described in the eighteenth embodiment is referred to as a mobile terminal.

As shown in (a) in FIG. 179, at the beginning, the user near the home appliance control device 5000 switches a mode of the mobile terminal to an apparatus connection mode, and causes the mobile terminal to touch the home appliance control device 5000 (Step "1"). Here, in the description, "touching" refers to establishing of short-distance communication to perform near field communication. When the user makes the mobile terminal touch the home appliance control device 5000, the mobile terminal establishes near field communication with the home appliance control device 5000, and obtains, from the home appliance control device 5000, a communication ID (such as a MAC address), an apparatus ID (such as a product serial number), and an available communication protocol, information of a server connecting with the home appliance control device 5000, a cryptography key for a wireless communication path, and the like ((a) in FIG. 179). Here, the communication ID is provided to target home appliance(s) so that the target home appliance(s) can be connected to the home appliance control device 5000. The apparatus ID is identification necessary for the mobile terminal to perform inquiry to the server.

As described above, the home appliance control device 5000 and the mobile terminal exchange information via proximity wireless communication, and establish a safety path between them via the server for a predetermined time period. Here, the safely path is an encrypted communication path including another wireless path such as a path for cellular phones. The safety path via the server is used to update a secret key between the home appliance control device 5000 and the mobile terminal in order to provide the secret key to the home appliance.

However, if the effective secret key is issued, for example, on a day-to-day basis, a security strength of the secret key is decreased. Furthermore, if consecutive setting processes are to be performed for the apparatus (home appliance), such as the solar panel N10H in FIG. 179, which is far from the home appliance control device 5000, the security strength is further decreased. However, in the present embodiment, a new secret key can be issued merely by pressing a button on the mobile terminal. As a result, it is possible to shorten an effective time period of the secret key, and keep the security strength. In addition, when the mobile terminal keeps issuing new secret keys and also touches a plurality of home appliances to provide them with the secret keys, it is possible to sequentially perform authentication processes between (a) each of the home appliances far from the home appliance control device 5000 and (b) the home appliance control device 5000.

Here, the use of the above method is not limited to the wireless communication paring within a user's home. For example, the above method can also be used to perform paring between a home appliance in the user's home and a home appliance in a home of a user's relative or friend. Thereby, the user can easily perform pairing processing even if the target apparatuses are not in the home.

Furthermore, when moving, the mobile terminal can generate position information of the mobile terminal itself by using a six-axis sensor or a GPS. Therefore, the user makes the mobile terminal touch the home appliance control device 5000 (Step "1"), and moves to the location of the solar panel N10H (Steps "2" to "6"), and makes the mobile terminal touch the solar panel N10H (Step "7") and the same time transmits position information of the mobile terminal to the server. Thereby, the server can manage three-dimensional (3D) relative position information of the home appliance control device 5000 (hereinafter, referred to also as a "Smart Energy Gateway (SEG)") and the solar panel N10H.

FIG. 180 is a diagram of switching of a mobile terminal screen in setting the solar panel according to the present embodiment. FIG. 180 shows an example of switching of a mobile terminal screen when the user makes the mobile terminal touch the first panel of the solar panel N10H.

As shown in FIG. 180, at the beginning, when the user makes the mobile terminal touch the first panel (solar panel No. 1) of the solar panel N10H (Step "1"), the mobile terminal starts connecting the first panel (solar panel No. 1) to the home appliance control device 5000 (SEG) or the server. More specifically, from the first panel (solar panel No. 1), the mobile terminal obtains information such as an apparatus ID of the solar panel N10H or a communication protocol, or a product sever address of a manufacturer of the solar panel N10H. Based on the obtained information, the mobile terminal determines whether or not the first panel (solar panel No. 1) is capable of communicating with the home appliance control device 5000 or the server. The information may be sent to the server and the determination may be made by any one of the server and the mobile terminal. If the obtained communication protocol enables communication between the first panel (solar panel No. 1) and the home appliance control device 5000 or the server, then the mobile terminal performs setting for connection between the first panel (solar panel No. 1) and the home appliance control device 5000 or the server by using the communication ID. On the other hand, if the obtained communication protocol does not enable the communication, then the mobile terminal may download firmware from the server to update the firmware by proximity wireless communication, or may instruct the home appliance control device 5000 (SEG) to update the firmware.

As described above, the mobile terminal performs authentication between the first panel (solar panel No. 1) and the home appliance control device 5000 (SEG) or the server. For example, as shown in FIG. 180, the first panel (solar panel No. 1) obtains a net ID (for example, 0019) to perform authentication with the home appliance control device 5000 (SEG) or the server.

If the solar panel is an apparatus (home appliance) that cannot be set automatically by proximity wireless communication, the user performs the setting for the solar panel by hands, and requests the home appliance control device 5000 to transmit a signal of setting completion to the mobile terminal, so that the mobile terminal can confirm the setting completion. Furthermore, if the solar panel N10H is an apparatus (home appliance) that can be set by simultaneously pressing a setting button of a terminal and a button of the home appliance control device 5000, the setting button of the mobile terminal and the button of the home appliance control device 5000 are cooperated with each other via a safety path to perform the setting by the simultaneous button pressing. It is assumed that these setting methods are assumed to be automatically downloaded to the mobile terminal from both the home appliance control device 5000 (SEG) and the home appliance. Thereby, the user can instantly complete the setting by using an optimum method among them.

FIG. 181 is a diagram of switching of a mobile terminal screen in subsequent authentication of the solar panel according to the present embodiment. The other solar panels subsequent to the first solar panel can basically perform the authentication in the same manner employed by the first solar panel. For example, the secret key is re-issued for the other solar panels, so that the other solar panels can sequentially perform the authentication. In addition, registration of relative positions of the respective solar panels onto the server makes it possible to display, on a screen of the mobile terminal (remote controller) or TV via the server, video by which the user can see actions for the panels at once.

FIG. 182 is a diagram of a screen of the mobile terminal in checking energy production of a target solar panel according to the present embodiment. As shown in FIG. 182, the mobile terminal can display an energy state of a target solar panel on a screen of the mobile terminal. The mobile terminal displays positions and energy production of the respective panels of the solar panel N10H simultaneously or alternately. Therefore, the user can lean how much energy is produced by each of the panels.

FIG. 183 is a diagram of a screen of the mobile terminal in checking a trouble of a solar panel according to the present embodiment. For example, in the case where the mobile terminal displays a temperature of each panel of the solar panel, a temperature is generally abnormal if a panel is in a trouble. Therefore, combination of such temperature information and position information of each panel allows the user to instantly learn a panel in trouble. As a result, it is possible to promptly repair the panel in trouble. In addition, if the trouble is notified to a repair shop via the server, it is possible to automatically request the repair.

FIGS. 184 to 188 are a flowchart of processing performed by the mobile terminal in setting the solar panel.

At the beginning, when the solar panel is to be set, the user sets an apparatus connection mode of the mobile terminal (Step S5081).

Next, the mobile terminal displays "Please make the mobile terminal touch (be close to) the home appliance control device" (Step S5082), and starts polling by proximity wireless communication. Then, the user makes the mobile terminal touch the home appliance control device 5000 (a parent device or a solar panel controller) (Step S5083). Here, the mobile terminal repeats the polling until the user makes the mobile terminal touch the home appliance control device 5000. The repeating times out when a predetermined time period has passed without the touch. Furthermore, if the home appliance control device 5000 is at a sleep mode so that a part of circuits in the home appliance control device 5000 is not activated, the touch of the mobile terminal activates the home appliance control device 5000.

Next, the mobile terminal changes a current mode to a mode for "setting of connection to another apparatus", and downloads a connection setting program corresponding to the home appliance control device 5000 from the server (Step S5085).

More specifically, the mobile terminal performs (1) cryptographic communication, and (2) obtainment of an apparatus ID, a communication ID (MAC address, NFC-ID, or the like), an available communication protocol, a version of the communication protocol, and a sever address regarding the home appliance control device 5000, by the proximity wireless communication (NFC) or the like. Next, the mobile terminal connects to the server having the obtained sever address, and performs cryptographic communication with the server. More specifically, the mobile terminal is connected to the server, changes a current mode to a mode for "setting of connection to another apparatus", and downloads a connection setting program corresponding to the home appliance control device 5000 from the server. Here, if the version of the communication protocol is old, a new version of the communication protocol is downloaded from the server to perform version-up.

Next, the mobile terminal displays "Please touch a target apparatus to be connected within one hour" (Step S5086). More specifically, since the setting mode at Step S5085 is effective for a predetermined time period, the mobile terminal displays a notice to request the user to perform the touching within the predetermined time period.

Next, the mobile terminal measures a distance between the mobile terminal and the home appliance control device 5000 (SEG) (S5087).

More specifically, the user having seen the display at S5086 brings the mobile terminal to a location of a target apparatus to be connected. Here, the mobile terminal measures a position (relative position) of the mobile terminal with respect to the position of the home appliance control device 5000 on a 3D space by using the angular velocity sensor, the acceleration sensor, the geomagnetic sensor, the GPS, and the like, and thereby calculates a 3D movement locus and coordinates of the moved position of the mobile terminal. Thereby, the mobile terminal can measure a distance from the home appliance control device 5000 (SEG). Here, the calculation may be performed by the server, not by the mobile terminal. In this case, the mobile terminal transmits the measured data to the server. Then, the server uses the data to calculate a 3D movement locus and coordinates of the moved position of the mobile terminal, and thereby measures a distance between the mobile terminal and the home appliance control device 5000 (SEG).

Here, the mobile terminal determines whether or not the traveling time or the distance is long for the user (Step S5088). If it is determined that the traveling time or the distance is short (No at Step S5088), then the mobile terminal provides a secret key issued by the home appliance control device 5000 to the target home appliance when the mobile terminal touches the home appliance.

On the other hand, if it is determined that the traveling time or the distance is long (Yes at Step S5088), then the mobile terminal temporarily turns the setting mode OFF (Step S5089). Then, when the position information of the mobile terminal becomes close to the position information of the apparatus, the mobile terminal turns the setting mode ON again (Step S5091) and is connected to the server to request the home appliance control device 5000 to re-issue the secrete key.

Next, the mobile terminal communicates with the home appliance control device 5000, and thereby records (a) the number of home appliances for which the mobile terminal has provided pieces of setting information to the home appliance control device 5000, (b) the number of setting completions actually performed by the home appliance control device 5000 based on the pieces of setting information, and (c) numeral numbers assigned to the respective setting completions (Step S5092, Step S5093). Thereby, the home appliance control device 5000 can confirm whether or not unconformity occurs after authorization with the plurality of mobile terminals.

Next, the mobile terminal performs proximity wireless communication with the n-th apparatus (solar panel, for example) (Step S5094). More specifically, the user makes the antenna unit of the mobile terminal touch an antenna unit of the n-th apparatus to perform proximity wireless communication with the n-th apparatus.

Then, the mobile terminal reads information from the memory of the n-th apparatus via NFC (Step S5095). More specifically, the mobile terminal reads, from the memory of the n-th apparatus, NFC-ID, a MAC address, a manufacturer ID, standard, version, and protocol of the wireless communication, a manufacturer name, a product name, a model number, an error, and/or a history. Here, the mobile terminal may transmit the readout information to the server.

Next, the mobile terminal determines whether or not the home appliance control device 5000 and the n-th apparatus (solar panel, for example) can communicate with each other (Step S5096). Here, in the case where the mobile terminal transmits the readout information to the server at Step S5095, the server may determine whether or not the home appliance control device 5000 and the n-th apparatus (solar panel, for example) can communicate with each other.

Next, the mobile terminal determines whether or not the home appliance control device 5000 and the n-th apparatus have respective different communication protocols (Step S5097).

If it is determined that the home appliance control device 5000 and the n-th apparatus have the same communication protocol (No at Step S5097), then the mobile terminal further determines whether or not the communication protocol of the n-th apparatus is old (Step S5098). Then, if it is determined that the communication protocol of the n-th apparatus is old (Yes at Step S5098), then the mobile terminal downloads a new version of the communication protocol from the server and performs version-up of the communication protocol of the n-th apparatus by proximity wireless communication (Step S5099).

On the other hand, at Step S5097, if it is determined that the home appliance control device 5000 and the n-th apparatus have different communication protocols (Yes at Step S5097), then the mobile terminal downloads, from the server, data of a communication protocol corresponding to the n-th apparatus or the home appliance control device 5000 (Step S5101), and installs the communication protocol data onto the home appliance control device 5000.

More specifically, the mobile terminal downloads the communication protocol data corresponding to the n-th apparatus from the server. When the user makes the mobile terminal touch the home appliance control device 5000, the mobile terminal installs, onto the home appliance control device 5000 via NFC, the new protocol by which the home appliance control device 5000 can communicate with the n-th apparatus. Here, the mobile terminal may perform the installation via the Internet such as wireless LAN.

It is also possible at Step S5097 that the mobile terminal issues instructions to the home appliance control device 5000 to download the communication protocol data corresponding to the n-th apparatus, so that the new protocol, by which the home appliance control device 5000 can communicate with the n-th apparatus, is installed onto the home appliance control device 5000.

Next, the mobile terminal determines whether or not the new protocol, by which the home appliance control device 5000 can communicate with the n-th apparatus, has already been installed onto the home appliance control device 5000 (Step S5102).

If the installation has not yet been completed due to, for example, error occurred during a process from the downloading to the installation (No at Step S5012), then the Steps S5101 and S5102 are repeated. On the other hand, if the installation has already been completed (Yes at Step S5102), then the user inputs (presses) a switch (button) of the mobile terminal for "start of connection between the home appliance control device 5000 and the apparatus".

Next, the mobile terminal detects that the switch (button) for "start of connection between the home appliance control device and the apparatus" is inputted (pressed) (Step S5103).

Next, the mobile terminal issues a secret key (with expiration) (Step S5104). It should be noted that the issue of the secret key (with expiration) is not necessarily performed by the mobile terminal. The home appliance control device 5000 (hereinafter, referred to also as a "SEG") or the server may issue the secret key.

Next, the mobile terminal transmits the issued secret key to the home appliance control device (SEG) (Step S5105). It should be noted that the mobile terminal may transmit not only the secret key but also a network ID or MAC address of the n-th apparatus, to the home appliance control device (SEG). Typically, the mobile terminal transmits the secret keys and the like to the home appliance control device (SEG) via the server on the Internet or via Intranet such as wireless LAN.

Next, the mobile terminal transmits the secret key and a transmission instruction to the n-th apparatus by NFC (Step S5106).

Here, it is also possible that the mobile terminal transmits, to the n-th apparatus, a network ID or MAC address of the home appliance control device (SEG) as well as the secret key and the transmission instruction.

FIG. 187 shows processing in mutual authentication between the home appliance control device (SEG) and the n-th apparatus.

At the beginning, the mobile terminal determines whether or not the n-th apparatus (solar panel, for example) and the home appliance control device (SEG) communicate with each other directly by short-distance wireless communication (ZigBee, for example) (Step S5110).

If the communication is performed directly (Yes at Step S5110), then the mobile terminal changes a radio strength of the short-distance wireless communication according to a distance L between the n-th apparatus and the home appliance control device (SEG), in order to increase security as well as energy saving (Step S5111). Here, if the distance L or an obstacle in the communication is large, the mobile terminal presents the user with a screen display for recommending the user to perform communication between the n-th apparatus and the home appliance control device (SEG) via a relay device that will be described later.

Next, the home appliance control device (SEG) and the n-th apparatus authenticate each other (mutual authentication) (Step S5112).

Next, the home appliance control device (SEG) transmits the authentication result to the mobile terminal via the server (Step S5113). Here, it is also possible that the user makes the mobile terminal touch the n-th apparatus, so that the mobile terminal obtains the authentication result from the n-th apparatus (Step S5115). It is further possible at Step S5115 that the authentication result is displayed on the n-th apparatus by illumination or the like so that the user learns the authentication result.

If the authentication fails (No at Step S5114, No at Step S5116), the processing returns to the step of key issuing.

Next, the mobile terminal determines whether or not connection authentication of the n-th apparatus, in other words, authentication of connection between the n-th apparatus and the home appliance control device (SEG) has already been completed (Step S5117).

Next, the mobile terminal determines whether or not the n-th apparatus is a final apparatus to be connected (Step S5118).

If the n-th apparatus is a final apparatus to be connected, in other words, connection authentication has been performed for all of target apparatuses (Yes at Step S5118), then the mobile terminal notifies the server of that connection authentication has been performed for all of target apparatuses, and then releases the connection mode and completes the processing.

On the other hand, if the n-th apparatus is not a final apparatus to be connected (No at Step S5118), then the mobile terminal performs processing shown in FIG. 188 to perform connection authentication for a next target apparatus (the (n+1)th apparatus).

More specifically, the mobile terminal is moved to a location of the next (n+1)th apparatus (Step S5119), and obtains physically relative or absolute 3D position information of the mobile terminal (Step S5121).

Then, the mobile terminal displays, on the screen of the mobile terminal, 2D or 3D image information or coordinate information which indicates pieces of 2D or 3D position information of the first to the (n+1)th apparatuses (Step S5122).

As described above, when the mobile terminal performs the above-described setting for a plurality of apparatuses, the mobile terminal displays, on the screen of the mobile terminal, pieces of the position information of the apparatuses. At S5121, the mobile terminal may transmit the obtained pieces of physically relative or absolute 3D position information, to the server. In this case, the server maps arrangement relationships of the n-th and (n+1)th apparatuses (panels in the solar panel, for example) onto a 3D space. It is also possible that the server transmits, to the mobile terminal, the 2D or 3D image information or coordinate information which indicates pieces of 2D or 3D position information of the first to the (n+1)th apparatuses, and the mobile terminal thereby displays the transmitted information on the screen of the mobile terminal.

If the screen display of the image information or coordinate information has been completed (Yes at Step S5123), then the mobile terminal returns to S5093 in FIG. 185 and repeats the processing. On the other hand, if the screen display has not yet been completed (No at Step S5123), then the processing repeats from S5121.

FIG. 189 is a flowchart of processing of equipping the solar panel according to the present embodiment. In receiving sunshine, solar panels produce DC high power, causing dangerous arc discharge. Therefore, prior to setting of a solar panel, it is preferable that a light-blocking sheet 5202 is covered on the solar panel in order to prevent power production. Furthermore, until communication setting has been completed, it is preferable to keep the light-blocking sheet being covered for safety. However, in the situation where a target panel of the solar panel is covered with the light-blocking sheet, it is difficult to know where the communication IC is on the target panel. Therefore, a mark indicating an antenna unit of proximity wireless communication is printed on a part of the light-blocking sheet which is located on the same position of the antenna unit. In performing communication setting for the target panel, the mobile terminal touches the mark on the light-blocking sheet. After completing the communication setting, the light-blocking sheet is removed. Therefore, the communication setting is performed by touching, while ensuring safety.

More specifically, at the beginning, a light-blocking sheet is removed from the n-th panel of the solar panel (Step S5201f), then it is examined whether or not the n-th panel is normal (Step S5201g). In more detail, the mobile terminal or a controller 5203c such as the above-described home appliance control device (SEG) receives, from a communication IC 5203e of the n-th panel, information of a voltage, a current, and a temperature of the n-th panel, thereby performing the above-described checking. For example, the controller 5203c checks a total energy production of the n-th panel in order to check whether or not the n-th panel is normal. Then, the controller 5203c transmits the check result to the mobile terminal via the Internet or an Intranet.

Thereby, it is possible to check whether or not each of the panels in the solar panel N10H is normal.

Here, as shown in FIG. 189, the communication IC 5203e includes a wireless IC such as ZigBee and a communication IC 5203f such as NFC. The communication IC 5203e is shielded and is not connected to the outside except a power supply line 5203a. Therefore, the communication IC 5203e has a long life of about thirty years, satisfying long life requirement. Furthermore, the controller 5203c such as the home appliance control device (SEG) receives instructions from the server 5203d, and therefore the controller 5203c causes a power supply unit 5203b to supply power to the communication IC 5203e, for several tens of seconds, several times per hour, in order to intermittently apply a voltage. As a result, a duty cycle of about 1/100 is achieved. Therefore, the communication ICs embedded on the solar panel are hardly deteriorated. As a result, the communication ICs can ensure a longer life in comparison to the method by which a voltage is constantly applied.

The following describes an example of Step S5097 in FIG. 186 in the case where the home appliance control device (SEG) and the apparatus are manufactured by different manufacturers or have different protocols, with reference to FIG. 190.

FIG. 190 is a flowchart of processing of connecting the apparatus to the home appliance control device (SEG), in the case where the home appliance control device (SEG) and the apparatus are manufactured by different manufacturers or have different protocols.

Hereinafter, the home appliance control device (SEG) is referred to also as a "controller".

At the beginning, at Step S5201a, a mode of the mobile terminal is set to a reading mode.

Next, at Step S5201b, the mobile terminal touches the home appliance control device (SEG) in order to establish proximity wireless communication with the home appliance control device (SEG).

Then, at Step S5201c, the mobile terminal reads, from the home appliance control device (SEG), various pieces of data of the home appliance control device (SEG) such as a manufacturer name, an apparatus ID, a product number, and a sever address.

Next, at Step S5201d, the mobile terminal determines whether or not the sever address is obtained from the home appliance control device (SEG). If the determination at Step S5201d is Yes, then the processing proceeds to Step S5201e.

Next, at Step S5201e, the mobile terminal accesses the sever address to be connected to the server at Step S5201f. If the connection is successful (Yes at Step S5201f), then the processing proceeds to Step S5201i in FIG. 188.

On the other hand, if the determination is No at Step S5201d or Step S5201f, the processing proceeds to Step S5201g. More specifically, at Step S5201g, the mobile terminal accesses the sever address of the manufacturer or the product number of the home appliance control device (SEG).

Next, at Step S5201h, the mobile terminal displays, on its menu screen, the manufacturer or the product number of the home appliance control device (SEG).

Then, the user confirms the manufacturer or the product number of the home appliance control device (SEG) on the menu screen, thereby selecting the home appliance control device (SEG) to be communicate with a target apparatus.

In receiving the user's selection, the mobile terminal proceeds to Step S5201i in FIG. 191.

The following describes a method of performing version-up of software in the home appliance control device (SEG) with reference to FIG. 191.

At the beginning, at Step S5201i, the mobile terminal displays an initial menu. Then, from the initial menu, the user selects a menu for connecting the home appliance control device (SEG) to a new target apparatus (for example, the n-th panel in the solar panel N10H).

Next, at Step S5201k, the mobile terminal determines whether or not there is a new version of software or firmware of the home appliance control device (SEG).

If it is determined that there is a new version of software or firmware of the home appliance control device (SEG) (Yes at Step S5201k), then the processing proceeds to Step S5201m. At Step S5201m, the mobile terminal downloads the new version form the server. Then, the mobile terminal displays, on its screen, an "Installation" button for starting installation.

Next, at Step S5201n, the mobile terminal determines whether or not the user selects the "Installation" button. If it is determined that the user selects the "Installation" button (Yes at Step S5201n), then at Step S5201p, the mobile terminal performs version-up of the software or firmware for the home appliance control device (SEG) after performing authentication between the home appliance control device (SEG) and the server. Then, the processing proceeds to Step S5201q in FIG. 192. Here, the version-up for the home appliance control device (SEG) may be performed not by the mobile terminal, but by the home appliance control device (SEG) instructed by the mobile terminal.

If the determination at Step S5201k is No, in other words, there is no new version of the software or firmware of the home appliance control device (SEG), or if the determination at Step S5201n is No, in other words, the user does not select the "Installation" button on the mobile terminal, then the processing proceeds to Step S5202q in FIG. 193.

FIG. 192 is a flowchart of processing of installing a new-version software onto the home appliance control device (SEG) according to the present embodiment.

At the beginning, at Step S5201q, the mobile terminal determines whether or not the home appliance control device (SEG) is connected to the server. If it is determined that the home appliance control device (SEG) is connected to the server (Yes at Step S5201q), then at Step S5201t, the mobile terminal performs authentication between the home appliance control device (SEG) and the server.

Next, if the authentication between the home appliance control device (SEG) and the server has been completed, then at Step S5202a, the mobile terminal causes the home appliance control device (SEG) to download a new-version software from the server to install it.

Next, at Step S5202b, the mobile terminal determines whether or not the installation has been completed. If it is determined that the installation has been completed (Yes at Step S5202b), then the processing proceeds to Step S5202g in FIG. 193. On the other hand, if the installation has not been completed at Step S5202b, the processing returns to Step S5201t.

On the other hand, if it is determined that the home appliance control device (SEG) is not connected to the server (No at Step S5201q), then at Step S5201r, the mobile terminal downloads the new-version software from the server.

Next, at Step S5201s, it is determined whether or not the downloading has been completed. If it is determined that the downloading has been completed (Yes at Step S5201s), then at Step S5202c, the mobile terminal displays "Please touch home appliance control device (SEG) for m seconds."

Next, at Step S5202d, the mobile terminal determines whether or not the mobile terminal has established proximity wireless communication with the home appliance control device (SEG).

Next, if it is determined that the mobile terminal has established proximity wireless communication with the home appliance control device (SEG) (Yes at S5202d), in other words, if the mobile terminal touches the antenna unit of the home appliance control device (SEG), then at Step S5202e, the mobile terminal transmits the new-version software to the home appliance control device (SEG) by using the proximity wireless communication (direct NFC) or the like, and causes the home appliance control device (SEG) to install the software.

On the other hand, if it is not confirmed that the mobile terminal has established proximity wireless communication with the home appliance control device (SEG) (No at S5202d), then the processing returns to Step S5202c.

Next, at Step S5202e, the mobile terminal determines whether or not the home appliance control device (SEG) has completed the installation. If it is determined that the installation has been completed (Yes at Step S5202f), then the processing proceeds to Step S5202g in FIG. 193.

On the other hand, if the home appliance control device (SEG) has not completed the installation (No at Step S5202f), then the processing proceeds to Step S5202c.

The following describes a flow in the case where a version of the software of the home appliance control device (SEG) is the latest one and the home appliance control device (SEG) previously holds information of a target apparatus to be connected, with reference to FIG. 193.

FIG. 193 is a flowchart of processing for connection between the home appliance control device (SEG) to the target apparatus, according to the present embodiment.

At the beginning, at Step S5202g, the mobile terminal determines whether or not the home appliance control device (SEG) is connected to the server.

If the determination at Step S5202g is Yes, then the processing proceeds to Step S5202h. At Step S5202h, the mobile terminal is connected to the home appliance control device (SEG) via the server. On the other hand, if the determination at Step S5202g is No, then the processing proceeds to Step S5202i. At Step S5202i, the mobile terminal is connected to the home appliance control device (SEG) via a wireless Intranet such as a wireless LAN or ZigBee.

Next, at Step S5202j, on the menu screen or the like of the mobile terminal, the mode of the mobile terminal is set to an "apparatus connection mode". Thereby, the mobile terminal displays, for example, "What is a manufacturer name of the target apparatus to be connected?"

Next, at Step S5202k, if a manufacturer name, a model number, or a product number of the target apparatus to be connected (an air conditioner, a washing machine, a TV, a recorder, or the like) is known (Yes at Step S5202k), then the user selects or inputs the manufacturer name, the model number, or the product number on the screen of the mobile terminal.

Thereby, at Step S5202m, the mobile terminal transmits the input data to the server. Then, the server examines protocol information, such as communication standard, middleware, and an application program, of the target apparatus, based on the apparatus information provided from the mobile terminal.

Next, at Step S5202p, the server determines whether or not the home appliance control device (SEG) and the target apparatus can normally communicate with each other by using their communication protocols. If the determination at Step S5202p is Yes, then the processing proceeds to Step S5203e in FIG. 195.

Referring back to Step S5202k, if the determination at Step S5202k is No, then the processing proceeds to Step S5203e in FIG. 195. If the determination at Step S5202p is No, then the processing proceeds to Step S5202q in FIG. 194.

The following explains FIG. 194. FIG. 194 is a flowchart of processing for connection between the home appliance control device (SEG) to the target apparatus, according to the present embodiment.

At the beginning, at Step S5202q, the server searches for a new-version communication protocol (physical layer, middleware, application layer) and transmits the searched-out new-version communication protocol to the mobile terminal or the home appliance control device (SEG).

Next, at Step S5202r, the mobile terminal displays "Do you wish to download a new-version communication protocol?"

Next, at Step S5202s, the mobile terminal detects whether or not an OK button displayed on its screen is pressed, thereby determining whether or not to download the new-version communication protocol. If the determination at Step S5202s is Yes, then the processing proceeds to Step S5202u. Otherwise (No at Step 5202s), the processing proceeds to Step S5202t. At Step S5202t, the mobile terminal displays "The home appliance control device (SEG) cannot be connected to this apparatus to communicate."

Next, at Step S5202u, the mobile terminal determines whether or not the home appliance control device (SEG) is connected to the server and data of the communication protocol is large.

If the determination at Step S5202u is Yes, then the processing proceeds to Step S5203a. At Step S5203a, the mobile terminal starts communication between the home appliance control device (SEG) and the target apparatus. More specifically, the mobile terminal transmits an installation instruction, a cryptographic communication key, and authentication data directly to the home appliance control device (SEG). Thereby, within a predetermined time period set by the server, the home appliance control device (SEG) downloads, from the server, communication protocol necessary for communication with the target apparatus. As a result, communication between the home appliance control device (SEG) and the target apparatus starts.

Next, at Step S5203b, the mobile terminal determines whether or not the communication between the home appliance control device (SEG) and the target apparatus is successful. If the communication is successful at Step S5203b, then the processing proceeds to Step S5203e in FIG. 195. Otherwise, the processing returns to Step S5202r.

Referring back to Step S5202u, if the determination at Step 55202u is No, then the processing proceeds to Step S5203c. At Step S5203c, the mobile terminal transmits the downloaded communication protocol to the home appliance control device (SEG), and causes the home appliance control device (SEG) to install the communication protocol. More specifically, the mobile terminal temporarily downloads the communication protocol from the user, and shares a cryptography key with the home appliance control device (SEG) after mutual authentication between the home appliance control device (SEG) and the server. Then, the mobile terminal transmits the downloaded communication protocol to the home appliance control device (SEG) by direct NFC or the like, and causes the home appliance control device (SEG) to install the communication protocol.

Next, at Step S5203d, the mobile terminal determines whether or not the home appliance control device (SEG) has installed the communication protocol. If it is determined at Step S5203d that the installation is successful, then the processing proceeds to Step S5203e in FIG. 195. Otherwise, the processing returns to Step S5202u.

The following explains FIG. 195. FIG. 195 is a flowchart of processing for connection between the home appliance control device (SEG) to the target apparatus, according to the present embodiment.

At the beginning, at Step S5203e, the mobile terminal determines whether or on the user selects a mode for performing "connection setting for a new apparatus".

If the determination at Step S5203e is Yes, then at Step S5203f, the mobile terminal establishes cryptographic communication with the home appliance control device (SEG). More specifically, when the user makes the mobile terminal touch the home appliance control device (SEG), the mobile terminal establishes cryptographic communication with the home appliance control device (SEG). Here, the cryptographic communication refers to cryptographic communication via the Internet or via a home network such as wireless LAN, except NFC.

Next, at Step S5203g, the mobile terminal displays "Please move to the location of the apparatus within n minutes."

Next, at Step S5203h, the operator (user) sees the display on the screen of the mobile terminal, and thereby starts the moving. More specifically, the mobile terminal starts moving by the operator (user), and the processing proceeds to S5203i in FIG. 196.

If the determination at Step S5203e is No, then the processing tries Step S5203e again.

The following describes 3D mapping with reference to FIG. 196. FIG. 196 is a flowchart of processing for connection between the home appliance control device (SEG) to the target apparatus, according to the present embodiment.

At the beginning, at Step S5203i, the mobile terminal obtains relative 3D coordinate information of a position of the mobile terminal with respect to the home appliance control device (SEG). More specifically, the mobile terminal measures 3D changes of the position of the mobile terminal with respect to a position of the home appliance control device (SEG), by using at least one of the angular sensor, the geomagnetism sensor, and the acceleration sensor. Then, the mobile terminal generates the relative 3D coordinate information with respect to the home appliance control device (SEG).

Next, at Step S5203j, the mobile terminal determines whether or not the mobile terminal has reached the target apparatus. More specifically, the mobile terminal determines whether or not the mobile terminal has reached the target apparatus, such as the air conditioner on the first floor, the air conditioner on the second floor, the microwave on the first floor, the washing machine on the first floor, the TV on the first floor, or the recorder on the first floor. If the determination at Step S5203j is Yes, then the processing proceeds to Step S5203k. Otherwise (No at Step S5203j), the processing returns to Step S5203i.

Next, at Step S5203k, the operator (user) determines whether or not the apparatus at which the mobile terminal has reached includes the first wireless communication unit (NFC, for example), the first antenna unit, and the like. If the determination at Step S5203 is Yes, then the processing proceeds to Step S5203n. At Step S5203n, the operator (user) makes the mobile terminal touch the first antenna unit of the apparatus to establish proximity wireless communication between the mobile terminal and the apparatus. At Step S5203p, the mobile terminal reads information regarding the apparatus from the apparatus and transmits the information to the server. More specifically, the mobile terminal reads a MAC address and a network ID of the apparatus, and transmits them to the server.

Next, at Step S5203g, the mobile terminal transmits 3D coordinate information of the position of the apparatus to the server.

Next, at Step S5203r, the mobile terminal determines whether or not the apparatus and the home appliance control device (SEG) have the same communication protocol. If the determination at Step S5203r is Yes, then the processing proceeds to Step S5203s. Otherwise (No at Step S5203r), the processing proceeds to Step S5203z. At Step S5203z, the mobile terminal performs the change routine for the communication protocol of the home appliance control device (SEG) as described above, and the processing proceeds to Step S5203s.

Here, the operator (user) presses, for example, a connection start button to start connection between the home appliance control device (SEG) and the apparatus.

Next, at Step S5203t, the mobile terminal issues a secret key (with expiration), and transmits the secret key as well as a transmission instruction to the apparatus by proximity wireless communication such as NFC. Here, the mobile terminal transmits the secret key also to the home appliance control device (SEG). It should be noted that the secret key may be issued not by the mobile terminal but by the server.

Next, at Step S5203u, the mobile terminal causes the home appliance control device (SEG) and the apparatus to start authentication between them. Here, if the home appliance control device (SEG) and the apparatus communicate directly to each other, then the mobile terminal determines that the home appliance control device (SEG) and the apparatus start the authentication. If it is determined at Step S5203x that the authentication has been completed, the connection is completed. On the other hand, if the authentication has not been completed at Step S5203x, the processing returns to Step 55203n.

Referring back to Step S5203k, if the determination at Step S5203k is No (if NFC communication fails), then the processing proceeds to Step S5203l. At Step S52031, information of the apparatus, such as a manufacturer name, a product name, a product model number, and a product serial number, are read by a bar-code reader of the mobile terminal (or by user's eyes) to input them into the mobile terminal. Then, at Step S5203n, the mobile terminal transmits the input data (the information of the apparatus) to the server, and the processing proceeds to Step S5204a in FIG. 197.

The following explains FIG. 197. FIG. 197 is a flowchart of processing for connection between the home appliance control device (SEG) to the target apparatus, according to the present embodiment.

At the beginning, at Step S5204a, based on the information of the apparatus which has been provided from the mobile terminal, the server examines protocol information of the apparatus and protocol information of the home appliance control device (SEG). Examples of the protocol information are a communication standard, a middleware, and an application program. At Step S5204b, the server determines whether or not the home appliance control device (SEG) and the target apparatus can normally communicate with each other by using their communication protocols.

If the determination at Step S5204b is Yes, then the processing proceeds to Step S5203c in FIG. 194. If the determination at Step S5204b is No, then the processing proceeds to Step S5204c. At Step S5204c, the server searches for a version of communication protocol (physical layer, middleware, application layer) of the home appliance control device (SEG) which is suitable for communication with the target apparatus.

Next, at Step S5204d, the mobile terminal displays "Do you wish to download communication protocol suitable for the target apparatus?"

Next, at Step S5204e, the mobile terminal detects whether or not the OK button displayed on the screen is pressed, thereby determining whether or not to download a new-version communication protocol. If the determination at Step S5204e is Yes, the processing proceeds to Step S5204g in FIG. 198. Otherwise (No at Step S5204e), then at Step S5204f, the mobile terminal displays "The home appliance control device (SEG) cannot communicate with this apparatus."

The following explains FIG. 198. FIG. 198 is a flowchart of processing for connection between the home appliance control device (SEG) to the target apparatus, according to the present embodiment.

At the beginning, at Step S5204g, the mobile terminal determines whether or not the home appliance control device (SEG) is connected to the server. If the determination at Step S5204g is Yes, then the processing proceeds to Step S5204h. At Step S5204h, the mobile terminal further determines whether or not the mobile terminal can perform cryptographic communication with the home appliance control device (SEG). More specifically, the mobile terminal determines whether or not the mobile terminal can perform cryptographic communication with the home appliance control device (SEG) via the Internet or a wireless home network (except NFC).

If it is determined at Step S5204h that the cryptographic communication is possible, then the processing proceeds to Step S5204i. At Step S5204i, the mobile terminal installs, onto the home appliance control device (SEG), a communication protocol necessary to be connected to the target apparatus. More specifically, the mobile terminal transmits an installation instruction, a cryptographic communication key, authentication data, and the like to the home appliance control device (SEG) via the Internet or via an intranet such as a wireless LAN within a predetermined time period. The communication protocol necessary for communication with the target apparatus is downloaded from the mobile terminal or the server to the home appliance control device (SEG). Thereby, the mobile terminal causes the home appliance control device (SEG) to install the communication protocol necessary for communication with the target apparatus.

Next, at Step S5204j, the mobile terminal determines whether or not the communication protocol has been installed on the home appliance control device (SEG). If it is determined at Step S5204j that the installation is successful, then the processing proceeds to Step S5204k. At S5204k, the apparatus and the home appliance control device (SEG) perform wireless communication except NFC with each other by using optimum communication protocol, thereby starting authentication process. Here, the home appliance control device (SEG) and the apparatus can calculate a distance and obstacles between them, based on 3D coordinate information of their positions and 3D structure information of the building, so that they can set optimum minimum signal output according to the calculation result.

Next, at Step S5204m, the mobile terminal displays a notice to persuade the user to issue instructions to the apparatus to start connection, such as "Start of connection is possible." or "Please press the OK button and the apparatus connection start button within m seconds."

On the other hand, if the determination at Step S5204g or Step S5204h is No, then the processing proceeds to Step S5205a. At Step S5205a, the mobile terminal displays "Please move and touch the home appliance control device (SEG)". More specifically, the mobile terminal is moved to the location of the home appliance control device (SEG), and displays "Please touch the home appliance control device (SEG)". Next, at Step S5205b, the mobile terminal establishes proximity wireless communication with the home appliance control device (SEG). More specifically, when the operator (user) moves to the home appliance control device (SEG) and makes the mobile terminal touch the home appliance control device (SEG), the mobile terminal establishes proximity wireless communication with the home appliance control device (SEG). Then, the processing proceeds to Step S5203c in FIG. 194.

The following explains FIG. 199. FIG. 199 is a flowchart of processing for connection between the home appliance control device (SEG) to the target apparatus, according to the present embodiment.

At the beginning, the operator (user) presses the "OK button" displayed on the mobile terminal.

Thereby, at Step S5204p, the mobile terminal transmits an instruction to the home appliance control device (SEG) to issue a secret key and continue cryptographic communication for a predetermined time period.

Subsequently, the operator (user) presses the "connection start button" on the apparatus.

Then, at Step S5204r, the apparatus issues the secret key (with expiration) and continue cryptographic communication for the predetermined time period.

Next, at Step S5204s, the mobile terminal determines whether or not the home appliance control device (SEG) and the apparatus authenticate each other. At Step S5204t, the mobile terminal determines whether or not the mutual authentication is successful.

It is determined at S5204t that the mutual authentication is successful, then the processing proceeds to Step S5204u. At Step S5204u, the mobile terminal displays "Completion of connection between home appliance control device (SEG) and apparatus" on the screen. Here, it is also possible that the mobile terminal causes the apparatus to perform a specific operation such as display.

On the other hand, if the determination at Step S5204t is No, in other words, if the mutual authentication fails, then at Step S5204x, the mobile terminal displays "Connection failure".

The following explains FIGS. 200 and 201. Each of FIGS. 200 and 201 is a flowchart of processing for connection between the home appliance control device (SEG) to the target apparatus via a relay device, according to the present embodiment.

At Step 55206a, the mobile terminal determines whether or not it is difficult for the target apparatus and the home appliance control device (SEG) to communicate directly with each other. More specifically, in order to make the above determination, the mobile terminal is connected to, for example, the server, and determines, based on (a) 3D coordinate information of a position of the target apparatus to be connected to the server or the home appliance control device (SEG) and (b) 3D coordinate information of a position of the home appliance control device (SEG), whether or not a distance or obstacle between the target apparatus and the home appliance control device (SEG) is large.

Next, if the determination at Step S5206a is Yes, then the processing proceeds to Step S5206b. At Step S5206b, the mobile terminal obtains, from the server, position information of a relay device between the target apparatus and the home appliance control device (SEG). More specifically, based on 3D coordinate information of positions of relay devices which is stored in the server, the server searches for a relay device (for example, a PAN coordinator) between the target apparatus and the home appliance control device (SEG). Then, the server notifies the position information of the searched-out relay device to the mobile terminal. Thereby, the mobile terminal obtains, from the server, the position information of the relay device existing between the target apparatus and the home appliance control device (SEG).

Here, if necessary, the operator (user) makes the mobile terminal touch the target apparatus again. Thereby, the mobile terminal obtains a MAC address, a network ID (PAN ID, for example), communication protocol, a communication key, and 3D coordinates of a position regarding the target apparatus.

Next, at Step S5206d, the mobile terminal determines whether or not the mobile terminal has network configuration information of the home appliance control device (SEG), such as a MAC address and a network ID (PAN ID, for example) regarding the home appliance control device (SEG).

If the determination at Step S5206d is Yes, then the processing proceeds to Step S5206f in FIG. 201. On the other hand, if the determination at Step S5206d is No, then the processing proceeds to Step S5206e. At Step S5206e, the mobile terminal establishes proximity wireless communication with the home appliance control device (SEG) and thereby obtains the network configuration information of the home appliance control device (SEG). Then, the processing proceeds to Step S5206f (FIG. 198) in FIG. 201. More specifically, the operator (user) holding the mobile terminal moves to the location of the home appliance control device (SEG), and makes the mobile terminal touch the home appliance control device (SEG), so that the mobile terminal establishes proximity wireless communication with the home appliance control device (SEG). Then, from the home appliance control device (SEG), the mobile terminal obtains the MAC address, the IP address, the network ID, the communication protocol, the communication key, and again the 3D coordinates of the position, regarding the home appliance control device (SEG). Then, the processing proceeds to Step S5206f (FIG. 198) in FIG. 201. Here, it is also possible that the server optimizes configuration information of the whole network (MAC addresses of child devices, and network IDs of (PAN IDs) of sub networks) by using 3D coordinate information of all apparatuses, AEGs, and relay devices, and that the optimized configuration information is registered onto the home appliance control device (SEG).

The following explains FIG. 201.

At the beginning, at Step S5206f, the mobile terminal establishes proximity wireless communication with the relay device, and sets the relay device so that the target apparatus is connected to the home appliance control device (SEG) via the relay device.

More specifically, the operator (user) moves to the location of the relay device such as ZigBee, and makes the mobile terminal touch the relay device. Thereby, the mobile terminal establishes proximity wireless communication with the relay device, so that the mobile terminal can obtain the position information of the relay device again. In addition, the mobile terminal receives, from the server or the like, 3D coordinate information of positions of the target apparatus, the relay device, and the home appliance control device (SEG) and 3D coordinates of the building where the operator (user) exists. Based on the pieces of information, the mobile terminal calculates the above-mentioned optimum network configuration information, namely, a relay connection method or a topology regarding an optimum relay device to serve as a relay point between sub networks (PAN IDs). The mobile terminal receives the configuration information via NFC or via the home appliance control device (SEG) and records it onto the mobile terminal. Or, the configuration information may be recorded onto the server.

The mobile terminal transmits a recording instruction to the relay device via at least NFC. In this case, the mobile terminal performs setting in the relay device, so that the target apparatus is connected to the home appliance control device (SEG) via the relay device. More specifically, the mobile terminal registers a MAC address, a network ID, and a communication key of a target apparatus (or each of a plurality of target apparatuses), onto the relay device.

Next, at Step S5206g, the mobile terminal determines whether or not the connection between the target apparatus and the relay device has been completed.

If the connection has been completed (Yes at Step S5206g), then the processing proceeds to Step S5206h. Otherwise (No at Step S5206g), the processing returns to Step S5206f.

Next, at Step S5206h, the mobile terminal records, onto the relay device, the connection information of the mobile terminal, the server, or the home appliance control device (SEG). More specifically, the mobile terminal records, onto the relay device, the connection information of the relay destination, such as a MAC address, a network ID, a communication key, and protocol of the mobile terminal, the server, or the home appliance control device (SEG), via NFC or a network. Thereby, the relay device (PAN coordinator) starts connecting (a) a sub network having PAN ID to which the target apparatus having the registered MAC address belongs to (b) the home appliance control device (SEG) having a MAC address belonging to a sub network having PAN ID to which the home appliance control device (SEG) belongs.

Next, at Step S5206i, the mobile terminal determines whether or not the connection between the relay device and the home appliance control device (SEG) has been completed. If the determination at Step S5206i is Yes, then the processing proceeds to Step S5206j. At Step S5206j, the mobile terminal determines whether or not connection authentication between the apparatus and the home appliance control device (SEG) has been completed.

If it is determined that the connection authentication has been completed (Yes at Step S5206j), then it is considered that the relay among the apparatus, the relay device, and the home appliance control device (SEG) has been completed. Therefore, the processing is completed.

On the other hand, if the determination at Step S5206i is No, or if the determination at Step S5206j is No, then the processing returns to Step S5206h.

As described above with reference to FIGS. 200 and 201, the use of 3D mapping according to the present embodiment allows the mobile terminal to obtain 3D position information of a child device, a parent device, and a relay device which are connected via ZigBee or wireless LAN. This is because the mobile terminal always holds the 3D coordinate information. When the mobile terminal is close to each of the child device, the parent device, and the relay device which are connected via ZigBee or wireless LAN via NFC, or when the mobile terminal, which is close to each of the devices/apparatuses, receives information from the device, the mobile terminal exchange physical position relationships (3D position information) among the devices/apparatuses with the devices/apparatuses. As a result, the mobile terminal can obtain the 3D position information as well as the network ID information such as a MAC address from each of the devices/apparatuses.

Then, the mobile terminal processes the obtained information (the 3D position information and the like regarding the above devices/apparatuses), thereby generating physically optimum network configuration information. It should be noted that the above processing may be processed not by the mobile terminal, but by the server inside or outside the user's home.

More specifically, as shown in an example in a lower part of FIG. 200, this network configuration information can be easily calculated if the 3D position relationships are known. Here, the example in the lower part of FIG. 200 shows the configuration where (a) a sub network PAN ID1 includes an apparatus having a MAC address 1, another apparatus, and a relay device having a MAC address 3, (b) a sub network PAN ID2 includes the home appliance control device (SEG) having a MAC address 2 with Internet protocols, and other apparatuses having MAC addresses 5 and 6, respectively, all of which are connected by radio. This configuration where the PAN ID1 and the PAN ID2 are connected to each other via the relay device can offer maximum energy saving, stability, and loop prevention.

Here, the conventional methods such as ZigBee require a one-to-one relationship between the home appliance control device (SEG) and the child device. This is because addition of a relay device requires optimization of designing and setting of the whole network configuration, and there has been no method for easily obtaining 3D position relationships of respective devices/apparatuses. Such conventional methods are possible in networks used in company offices that can afford cost and effort. However, general home cannot afford such cost and effort for home appliances such as air conditioners, a microwave, and a solar panel. Therefore, the addition of relay device in a home network has not been easy.

However, in the present embodiment, it is possible to obtain position information and ID information such as MAC addresses of the apparatuses (home appliances), only by making the mobile terminal touch the apparatuses by using NFC or by inputting data into the mobile terminal positioned very close to the apparatuses. Therefore, the server or the mobile terminal can obtain the configuration information without cost and effort. If the mobile terminal is operated to record the obtained configuration information directly or indirectly onto the home appliance control device (SEG) or the relay device, it is possible to easily generate optimum network configuration information. Furthermore, the use of NFC allows the user to check unauthorized actions by using a cryptography key or 3D position information, thereby increasing security. Therefore, the addition of relay device is possible also at home, and it is possible to achieve stable wireless communication over a long distance between a solar panel on the roof and the home appliance control device (SEG) on the first floor, or a long distance between the home appliance control device (SEG) at home and a heat pump system or a charging system outside home, for example. Then, in these cases, the use of the server makes it possible to calculate the network configuration information at high accuracy by using 3D coordinates. Therefore, it is possible to configure an ideal network system, and prevent abnormal communication such as loop. As a result, transmission efficiency can be increased.

Twenty-First Embodiment

In the twentieth-first embodiment, the description is given for a system that enables the mobile terminal to serve as a remote controller for operating an apparatus by using a 3D product map of a building with reference to the drawings.

FIG. 202 is a diagram showing an example of image data on a 3D map generated by a program execution unit O65. FIG. 203 is a diagram of an example of a product 3D map generated by a display unit O68d by combining the image data of FIG. 169 and the displayed image data of FIG. 202. The same reference numerals of FIGS. 169 to 171 are assigned to the identical units of FIGS. 202 and 203, so that the identical units are not explained again below.

FIG. 202 shows an example of apparatus control by, for example, a mobile device (the communication device 102 that is the mobile terminal 9) which uses the 3D product map of the building according to the present embodiment. In addition to the building data, FIG. 203 shows an example of the apparatus control in the case where it is possible to recognize a room where each apparatus exists, according to the present embodiment. The apparatus control processing performed by the mobile terminal shown in FIGS. 202 and 203 is described with reference to FIGS. 204, 205, and 206. Each of FIGS. 204 and 205 is a flowchart of remote control operation according to the present embodiment. FIG. 206 is a flowchart for explaining significance of detailed processing shown in FIG. 205.

At the beginning, at S6001, the mobile terminal determines a current position of the mobile terminal by using GPS, thereby generating position information of the mobile terminal.

Next, at S6002, the mobile terminal obtains position information that is to be used as a reference point. More specifically, for example, in the case where an unlocking system, which locks/unlocks keys by the mobile terminal via proximity wireless communication, is cooperated with an entrance key of the building, the mobile terminal obtains an apparatus ID of the unlocking system when the entrance key is unlocked by the proximity communication. Then, the mobile terminal sets, as the reference point, position information associated with the obtained apparatus ID (position "1" in FIG. 203). Here, the database in which the apparatus ID and the position information are stored in association with each other is held in the server or the mobile terminal. It should be noted that the mobile terminal may obtain the position information of the entrance key directly from the entrance key by using proximity communication, or of course, from another apparatus except the unlocking system. It should also be noted that, when the user holding the mobile terminal enters the building, the mobile terminal may detect the user's entrance to the building based on output information of a sensor provided to a door, and set a position of the door to be the reference point.

The following describes the situation where the user walks from position "1" to position "2" in FIG. 203 at Step S6003. More specifically, at S6003, the mobile terminal calculates (a) a traveling distance of the user's travel based on information of a user's step length, and also detects (b) a traveling direction of the travel. Based on the travel distance and the travel direction, the mobile terminal calculates position information of the mobile terminal. In more detail, the mobile terminal obtains (i) information of a step length of the user walking at home from a database, and detects (ii) the number of steps n in a target section by using an acceleration sensor, a geomagnetism sensor, or a vibrating gyro. Multiplying the step length by the number of steps n results in the traveling distance. In addition, the mobile terminal detects the traveling direction by using the vibrating gyro and the geomagnetism sensor. Based on the calculated traveling distance and traveling direction, the mobile terminal calculates a relative position of the mobile terminal with respect to the reference point on the 3D space, and records the calculated position information onto a database in the mobile terminal.

Next, at S6004, the mobile terminal transmits the calculated position information as well as the traveling information such as traveling distance and traveling direction to the server to be stored them in a database in the server.

The following describes the situation where the user is at position "2" in FIG. 203 at S6005. More specifically, at S6005, if the user points the mobile terminal to a TV, the mobile terminal serves as a remote controller. Here, the TV should be on a normal line passing 3D coordinate information of the position of the mobile terminal in a direction measured by the mobile terminal. In more detail, the user at position "2" in FIG. 203 moves to be in front of the TV on the first floor, and points the mobile terminal to the TV. When the TV is on a normal line passing 3D coordinate information of the position of the mobile terminal in a direction of measured by the mobile terminal, the mobile terminal serves as a remote controller of the TV, by connecting the TV to a network, for example.

After traveling from position "2" to position "3", the user further moves from position "3" to position "4" in FIG. 203 and then points the mobile terminal to an air conditioner. In the same manner as described above, the mobile terminal thereby serves as a remote controller of the air conditioner. More specifically, when the user moves on the first floor to enter a Japanese-style room and points the mobile terminal to the air conditioner, the mobile terminal is connected to the air conditioner on a network so that the mobile terminal can serve as a remote controller of the air conditioner. Here, in the same manner as described at S6003, the mobile terminal detects a traveling distance from position "3" to position "4" based on the step length and the number of steps of the user, and thereby calculates 3D position information (relative position information) of the mobile terminal. Then, the 3D position information is stored into the database in the mobile terminal or the server.

Furthermore, at S6007 in FIG. 205, when the user moves from position "4" to position "5" in FIG. 203, a traveling distance is calculated based on the number of steps, and then stored into the database in the mobile terminal or the server. As described above, such traveling information for each traveling section is accumulated in the database for each user. Therefore, the accumulation is used as a walking history of each user depending on each traveling section. A step length of each user is learned from the walking history to increase its accuracy.

Then, at S6008, when the user reaches a staircase in the home, the mobile terminal starts calculating (a) a traveling change in the height and (b) a horizontal traveling distance, regarding user's traveling on the staircase. Here, it is assumed that m represents a height of one stair and that k represents a length of one stair. Under the assumption, multiplying the number of steps by m results in the traveling change in the height, and multiplying the number of steps by k results in the horizontal traveling distance. It is noted that m and k are accumulated in the database, so that m and k are learned from the past data to increase their accuracy.

The following describes, for example, the case where the user ascends by a lift not by the staircase at S6009. In this case, characteristic data of the lift in the building is recorded on the database. A time r required to ascend from a floor P to a floor Q is obtained from the database, and the floor number to which the user ascends is measured based on the required time r. It is also possible to increase the accuracy of P, Q, and r by learning them from past data. In addition, start and stop of the ascending lift is detected by the acceleration sensor.

If it is determined at S6010 that the ascending has been completed, then the processing proceeds to S6011.

At S6011, a horizontal traveling distance of the ascending is calculated by multiplying the step length by the number of steps, and a traveling direction of the ascending is detected by the vibrating gyro. Based on the horizontal traveling distance and the traveling direction, the mobile terminal generates 3D position information of the mobile terminal. If there is 3D structure data of the building, the position information is modified based on the 3D structure data to increase its accuracy. Then, it is assumed that the user moves out from the lift or the staircase and temporarily stops at the front-left of a TV on the second floor (at position "5" in FIG. 203)

At S6013, it is determined whether or not an accumulated error E in the accumulated pieces of 3D position information is greater than a predetermined error allowable value. The accumulated error E is calculated by multiplying a traveling distance by 5%. If it is determined that the accumulated error E is greater than the error allowable value, then the processing proceeds to S6014.

At S6014, the mobile terminal searches apparatuses having (relative or absolute) position information registered in the database, for an apparatus having position information closest to the position information of the mobile terminal. The mobile terminal then presents the searched-out apparatus on the screen of the mobile terminal. The operator takes a photograph of the apparatus by a camera unit of the mobile terminal. The mobile terminal recognizes the apparatus based on the image photographed by the camera unit, and calculates a relative angle and a distance between the mobile terminal and the apparatus in order to modify a reference position.

Subsequently, at S6015, the mobile terminal obtains network information (MAC address, IP address, communication key, and the like) of the apparatus based on apparatus ID of the apparatus, and is thereby connected to the apparatus. When the user presses a Lock button on the mobile terminal while pointing the mobile terminal to the apparatus, the connection between the mobile terminal and the apparatus is fixed. As a result, the mobile terminal can serve as a remote controller of the apparatus or display video data of the apparatus on the screen of the mobile terminal.

Finally, the mobile terminal completes the remote control operation function.

The steps S6007 to S6011 are, likewise S6017 in FIG. 205, processing performed by the mobile terminal to learn past data to increase an accuracy of traveling distance calculation and generate accurate 3D position information of the mobile terminal. The step S6013 is, likewise S6018 in FIG. 205, determination as to whether or not an accumulated error of the 3D position information is greater than a predetermined value. The step S6014 is, likewise S6019 in FIG. 205, correction of an error in the 3D position information (reference position).

By the above-described processing, the mobile terminal can obtain a relative position of the mobile terminal with respect to a reference point, and can thereby serve as a remote controller of an apparatus only by pointing the mobile terminal to the apparatus without using correct absolute position information.

Furthermore, if an error in the traveling distance measured by the acceleration sensor is large, it is possible to decrease the error of the position information by using a step length, position information of the apparatus, and the like.

FIG. 207 is a flowchart for explaining processing of determining a correct reference point of the mobile terminal when a current reference point of the mobile terminal is not correct, according to the present embodiment of the present invention.

At the beginning, if it is determined that the mobile terminal has not yet obtained a reference point or that reference point information of the mobile terminal is not correct, then at S6021, the mobile terminal photographs the target apparatus. Here, the mobile terminal may transmit the photographed image of the apparatus to the server.

Next, at S6023, mobile terminal recognizes a kind of the apparatus based on the photographed image. Subsequently, at S6024, an image showing only the apparatus is filtered from the photographed image, and the resulting image is transmitted to the server.

Next, at S6026, the server specifies a building in which the mobile terminal currently exists, based on the position of the mobile terminal, and then specifies the apparatus from a list of apparatuses in the building. More specifically, the server determines a rough position of the mobile terminal by a base station, GPS, or the like, and thereby specifies a building in which the mobile terminal currently exists. In addition, the server specifies the photographed apparatus from the apparatus list associated with the building. Furthermore, the server obtains a size and 3D shape information of the apparatus, and then stores these pieces of information into the database. It should be noted that if a current position of the mobile terminal is not known, it is possible to specify the photographed apparatus from an apparatus list associated with the user of the mobile terminal.

Next, at S6027, the mobile terminal or the server calculates a relative angle between the mobile terminal and the apparatus, based on a direction which the apparatus faces in the photographed image.

Next, at S6028, the mobile terminal or the server calculates a distance between the mobile terminal and the apparatus, by using the photographed image based on a zoom magnification or the like included in optical characteristic information of the mobile terminal.

Next, at S6029, the mobile terminal or the server calculates position information Pr indicated by 3D relative coordinate information of the position of the mobile terminal or the apparatus, based on the distance and relative angle between the mobile terminal and the apparatus.

At S6030, a relative or absolute position Pm of the mobile terminal in the building is calculated. More specifically, the mobile terminal or the server reads 3D coordinate information Pd of the position of the apparatus from the server or the mobile terminal, and then calculates the relative or absolute position Pm of the mobile terminal in the building, based on the position information Pr and the coordinate information Pd.

Eventually, at S6031, the position Pm is set to be position information of a reference point of the mobile terminal.

By the above-described processing, even if a reference point of the mobile terminal has not yet been set, for example, if it is immediately after powering the mobile terminal ON, it is possible to determine the reference point by using a photographed image. In addition, the filtering of the apparatus image from the photographed image allows the user to transmit the apparatus image to the server without considering privacy of home information.

FIGS. 208 and 209 are flowcharts of processing for connecting an apparatus to a parent device in a network to which the apparatus belongs. More specifically, FIGS. 208 and 209 are flowcharts of the connection processing in the case where the apparatus according to the present embodiment does not have a NFC function.

At the beginning, the user points the mobile terminal to a target apparatus to be connected, and photographs the apparatus by a camera unit of the mobile terminal.

Next, at S6112, the mobile terminal recognizes the apparatus by processing the photographed image of the apparatus based on position information (3D coordinate information, for example) of the mobile terminal. If the apparatus is recognized, the mobile terminal can obtain a kind, a model number, and rough position information (3D coordinate information, for example) of the apparatus. Here, the mobile terminal obtains the above-mentioned kind, model number, and rough position information (3D coordinate information, for example) of the recognized apparatus, from a database in the mobile terminal or the server.

Next, at S6113, the mobile terminal determines whether or not the target apparatus to be connected has already been registered in the database in the server or the mobile terminal. More specifically, from the database in the mobile terminal or the server, the mobile terminal obtains pieces of information of apparatus candidates. Here, the apparatus candidates are apparatuses having respective pieces position information that are close to the position information of the mobile terminal. Then, the mobile terminal compares each of the apparatus candidates to the photographed apparatus, and thereby confirms whether or not the recognized apparatus has been registered in the database.

If it is determined at S6113 that the target apparatus to be connected has already been registered in the database in the server or the mobile terminal, then the processing proceeds to S6114.

At S6114, the mobile terminal obtains an apparatus ID and the like of the apparatus, and is thereby connected to the apparatus via a network. More specifically, the mobile terminal obtains an apparatus ID, a connection protocol, a communication key, and a sever address of the apparatus from the database in the server or the mobile terminal, and is connected to the apparatus via a network by using the obtained pieces of information.

Subsequently, at S6115, the mobile terminal issues various commands based on position information of the apparatus and a direction of the mobile terminal.

On the other hand, if it is determined that the target apparatus to be connected is not registered in the database in the server or the mobile terminal, then the processing proceeds to S6116.

Next, at S6116, the mobile terminal determines whether or not the apparatus has a network function. Here, it is also possible that the mobile terminal determines whether or not the mobile terminal can recognize a model number of the apparatus. This is because it is possible to determine whether or not the apparatus has a network function, if the model number of the apparatus is recognized.

If it is determined that the apparatus does not have a network function or that the mobile terminal cannot recognize the model number of the apparatus (No at S6116), then the processing proceeds to S6117.

Next, for example, the user opens a cover of the apparatus to expose a 2D bar-code of the apparatus, and photographs the bar-code by the camera unit of the mobile terminal (S6117).

Next, at S6118, the mobile terminal decrypts encrypted data of the 2D bar-code, and records the decrypted data onto the database in the server or the mobile terminal. More specifically, the mobile terminal reads the 2D bar-code and decrypts encrypted data of the 2D bar-code. Here, the decrypted data is, for example, an apparatus ID, a connection communication protocol, a communication standard, a remote control function (for infrared remote control, or for wireless ZigBee, for example), a net address (MAC address, IP address, communication key), a sever address, or the like. The mobile terminal records the read data onto the database in the server or the mobile terminal.

Next, at S6119, the mobile terminal calculates 3D position information of the apparatus and records the calculated position information onto the database. More specifically, the mobile terminal obtains 3D shape information of the apparatus from the database in the server or the mobile terminal. Then, the mobile terminal calculates 3D position information of the apparatus based on the photographed image of the apparatus and 3D position information of the mobile terminal photographing the apparatus, and then records the 3D position information onto the database.

If it is determined at S6116 that the apparatus has a network function or that the mobile terminal can recognize a model number of the apparatus, then the processing proceeds to S6121. Here, it is also possible to determine whether or not the apparatus has an AOSS function.

Next, at s6121, it is determined whether or not the mobile terminal can communicate with the parent device. If it is determined that the mobile terminal can communicate with the parent device, then the processing proceeds to S6122. Here, the parent device is, for example, the home appliance control device (SEG), an adapter (AP) of a wireless LAN, or the like.

Next, at S6122, it is determined whether or not the apparatus has an infrared communication receiving function or a wireless remote control (ZigBee, for example) receiving function. In other words, it is determined whether or not the apparatus can communicate with other apparatuses/devices except the parent device.

If it is determined at S6122 that the apparatus has neither the infrared communication reception function nor the wireless remote control (ZigBee, for example) receiving function (No at S6122), then the processing proceeds to S6123. At S6123, the parent device and the apparatus start connection authentication with each other according to AOSS start instruction from the user. More specifically, at S6123, the user presses a "connection start button" on the mobile terminal, and then the mobile terminal transmits the AOSS instruction to the parent device and thereby causes the parent device to switch its mode to a registerable mode. At the same time, the user presses an AOSS button on the apparatus, then the apparatus starts connection authentication with the parent device and continues the connection authentication for a certain time period. Here, it is preferable to increase security of the communication, by controlling a radio output to be minimum based on a distance and obstacle between the parent device and the apparatus, by using 3D position information of the parent device and 3D position information of the apparatus.

Next, it is determined at S6124 whether or not the connection authentication between the parent device and the apparatus is successful. If it is determined that the connection authentication is successful, then the processing proceeds to S6126.

On the other hand, if it is determined at S6122 whether or not the apparatus has an infrared communication receiving function or a wireless remote control (ZigBee, for example) receiving function, then the processing proceeds to S6125.

Next, at S6125, the mobile terminal transmits a communication key and "AOSS start instruction" to the parent device that has the same communication protocol as that of the apparatus. At the same time, the mobile terminal transmits the communication key and "AOSS instruction" to the apparatus to start the mutual authentication. More specifically, when the user presses the connection start button on the mobile terminal, the mobile terminal transmits the communication key and the "AOSS start instruction" to the parent device that has the same communication protocol as that of the apparatus. At the same time, the mobile terminal transmits the communication key and the "AOSS instruction" to the apparatus by using a remote control transmission function, so that the apparatus and the parent device start the mutual authentication.

Next, the mobile terminal determines at S6126 whether or not the mutual authentication has been completed. If it is determined that the mutual authentication has not yet been completed, then the processing proceeds to S6125. On the other hand, if it is determined at S6126 that the mutual authentication has been completed, then the processing proceeds to S6127. At S6127, it is determined whether or not the connection between the parent device and the apparatus has been established.

If it is determined at S6127 that the connection has been established, then the mobile terminal causes the apparatus to transmit an apparatus ID, a product number, an address, an error code, a use time period, a history, and 3D position information regarding the apparatus, to the server via the parent device.

Next, at S6129, the mobile terminal calculates 3D position information of the apparatus. More specifically, the mobile terminal obtains 3D shape information of the apparatus from the database based on a product number of the apparatus. Then, the mobile terminal calculates 3D position information of the apparatus based on (a) a distance between the apparatus and the mobile terminal which is detected from the photographed image, (b) a 3D direction which is detected from the photographed image, and (c) position information of the mobile terminal photographing the image. Then, the mobile terminal records the calculated 3D position information onto the database in the server or the mobile terminal.

By the above-described processing, even if the apparatus is not provided with a proximity communication function, the use of a 2D bar-code enables easy connection between the apparatus and the parent device. As a result, it is possible to register the apparatus onto the server, or register the 3D position information of the apparatus onto the server.

Next, the 3D mapping is described. Each of FIGS. 210 to 212 is a flowchart of a method of registering position information (position information registration method), according to the present embodiment of the present invention.

After starting 3D mapping (6140a), the operator (user) moves the mobile terminal. The following describes an example where the operator moves the mobile terminal to a location of a metes-and-bounds position.

At Step S6140c, the mobile terminal transmits, to the server, current position information of the mobile terminal which is determined by GPS (hereinafter, GPS information), and thereby obtains 3D absolute coordinates of the position information from the server. For example, the mobile terminal transmits the GPS information to the server and thereby obtains 3D absolute coordinate information that include a metes-and-bounds boundary mark or a measurement reference point ID of a location close to the current position of the mobile terminal. Then, the mobile terminal stores the obtained 3D absolute coordinate information onto an absolute position 3D coordinate database. Here, as described previously, the mobile terminal has two kinds of 3D coordinate information which are 3D coordinate information of an absolute position and 3D coordinate information of a relative position of the mobile terminal.

Next, at Step S6140d, the mobile terminal switches the position determination by the GPS to position determination by the motion sensor, in order to calculate 3D coordinate information of a current position of the mobile terminal. More specifically, the mobile terminal switches the GPS sensor to the motion sensor to determine a current position of the mobile terminal. Then, the mobile terminal calculates a distance of user's travel based on a step length and the number of steps of the user, and also detects a direction of the user's travel by the vibrating gyro. Thereby, the mobile terminal calculates 3D coordinate information of the current position in consideration of the distance and the direction in addition to the 3D absolute coordinate information.

Next, at S6140e, the mobile terminal records 3D coordinate information of the mobile terminal which has been determined when the mobile terminal has established the proximity wireless communication. More specifically, it is assumed, for example, that the user makes the mobile terminal touch a NFC unit of a key of the building in order to unlock the key.

Here, the mobile terminal records 3D coordinate information of the position of the mobile terminal establishing proximity wireless communication by touching the NFC unit of the key of the building, onto the database in the mobile terminal or the server, or onto the NFC unit of the key.

Next, at S6140f, the mobile terminal further calculates 3D coordinate information of the current position of the mobile terminal, based on the number of steps, a step length, and a direction of the steps of the user. More specifically, when the user enters the building, the mobile terminal calculates the 3D coordinate information of the current position, based on the number of steps, the step length, and the direction of the steps of the user. Here, if the accuracy of the triaxial magnetic sensor is deteriorated by noise or the like, the information detected by the triaxial magnetic sensor is replaced by direction information detected by the vibrating gyro.

Next, at S6140g, the mobile terminal updates 3D position information of the apparatus, and records a high-accuracy position information identifier in association with the updated 3D position information. More specifically, if a traveling distance from a reference point (3D absolute coordinate information of a position of a reference point) to the current position of the mobile terminal is short, the mobile terminal determines that the position accuracy is high. Therefore, if the user makes the mobile terminal touch the antenna unit of the NFC unit of the apparatus having registered 3D position information and thereby establishes proximity wireless communication between the mobile terminal and the apparatus, the mobile terminal updates the 3D position information of the apparatus, and records a high-accuracy position information identifier, which indicates that the 3D position information has a high accuracy, onto the NFC unit or onto the database in the server or the mobile terminal, in association with the 3D coordinate information.

Next, at S6140h, the mobile terminal determines whether or not an accumulated error in the 3D coordinate information is greater than a predetermined value. More specifically, the mobile terminal determines whether or not the accumulated error PE of the 3D coordinate information is greater than the predetermined value.

If the determination at S6140h is Yes, the processing proceeds to S6140i. At S6140i, the mobile terminal searches neighborhood of the mobile terminal for an apparatus assigned with such a high-accuracy position identifier. Then, the mobile terminal displays, on the screen, the searched-out apparatus with instructions "Please touch the antenna unit of the NFC of the apparatus". More specifically, the mobile terminal searches apparatuses having NFC functions in the home (TV, air conditioner, microwave, refrigerator, and the like) for an apparatus that is assigned with a high-accuracy position identifier and that is close to the mobile terminal. The mobile terminal displays, on the screen of the mobile terminal, the searched-out apparatus (TV, for example) together with instructions "Please touch the antenna unit of the NFC of the apparatus". Then, the processing proceeds to S6140j in FIG. 212.

On the other hand, if the determination at S6140h is No, then the processing proceeds to S6140n in FIG. 212. At S6140n, the mobile terminal updates 3D reference coordinates and records the high-accuracy position identifier onto the database. More specifically, the mobile terminal can detect an action of the user by the acceleration sensor. For example, the acceleration sensor can detect that the user walks up the first stair of a staircase, that the user has already walked up the final stair of the staircase, that the user stops in front of a closed door, that the user starts ascending by a lift, that the user stops the ascending in the lift, that the user stops in front of a closed entrance door, that the user walks up a step of the entrance, that the user starts ascending by a ladder, that the user turns at a corner of a corridor, or that the user goes around a bulged wall of the building. Then, the mobile terminal compares (performs matching) the 3D coordinate information of the mobile terminal detected by using the acceleration sensor to the 3D coordinate information of the building, thereby updating the 3D reference coordinates. By the above-described processing, it is possible to increase the accuracy of the 3D reference coordinates. Then, here, the updated 3D reference coordinates and the high-accuracy position identifier are recorded onto the database.

Next, at S6140j, the mobile terminal determines whether or not the mobile terminal has established proximity wireless communication with the apparatus. More specifically, the mobile terminal determines whether or not the user makes the mobile terminal touch the antenna unit of the apparatus and thereby proximity wireless communication is established between the mobile terminal and the apparatus. If the determination is Yes, then the processing proceeds to S6140k.

Next, at S6140k, the mobile terminal determines whether or not the 3D coordinate information of the apparatus is significantly different from the 3D coordinate information of the mobile terminal. If the determination at S6140k is Yes, then the processing proceeds to S6140p. At S6140p, the mobile terminal determines that the apparatus has moved from an original position indicated by the previously-measured coordinates. Therefore, the mobile terminal records an error information identifier onto a database in the apparatus.

Here, if there is an apparatus assigned with a high-accuracy position identifier near the mobile terminal, the operator (user) makes the mobile terminal touch the apparatus to update the 3D coordinate information of the current position of the mobile terminal held in the mobile terminal. Furthermore, the operator (user) makes the mobile terminal touch the target apparatus that has been determined at S6140k as having moved from the original position, in order to record the updated 3D coordinate information onto the database to correct the position information of the target apparatus. Here, in the database, the target apparatus is assigned with a high-accuracy position identifier, instead of the error information identifier. Thereby, in the database, the target apparatus is stored in association with the high-accuracy position information.

On the other hand, if the determination at S6140j is No, then the processing proceeds to Step S6140n. Since Step S6140n has already been described, this step will not be described again.

On the other hand, if the determination at S6140k is No, then the processing proceeds to S6140m. At S6140m, the 2D or 3D coordinate information of the position of the apparatus is updated as 3D coordinate information of the position of the mobile terminal. As a result, the 3D coordinate information of the position of the mobile terminal is corrected. Then, the processing proceeds to Step S6140n.

Twenty-Second Embodiment

The following describes cooperation between (a) a mobile device that is the above-described communication device and (b) apparatus(es).

FIG. 213 is a diagram for explaining the situation of the mobile device and apparatuses cooperated with the mobile device (hereinafter, referred to also as "cooperation apparatuses") according to the twenty-second embodiment of the present invention.

In FIG. 213, display screens 9001, 9002, and 9003 of the mobile device show various examples of the same display screen of the mobile device 9000.

More specifically, the display screen 9001 of the mobile device 9000 is presented when the user holding the mobile device 9000 points the mobile device 9000 to a TV 9004 ("A"). At "A", data on the display screen 9001 of the mobile device 9000 is transmitted to the TV 9004, and thereby displayed also on the TV 9004.

Likewise, the display screen 9002 of the mobile device 9000 is presented when the user holding the mobile device 9000 points the mobile device 9000 to a recorder 9005 ("B"). Furthermore, the display screen 9003 of the mobile device 9000 is presented when the user holding the mobile device 9000 points the mobile device 9000 to a microwave apparatus 9006 ("C"). Regarding "B", a remote control screen for operating the recorder 9005 is displayed on the display screen 9002 of the mobile device 9000. The user presses a desired button on the remote control screen to operate the recorder 9005. Regarding "C", a recipe screen for operating the microwave 9006 is displayed on the display screen 9003 of the mobile device 9000. In FIG. 213, a pair of the upper and lower mobile devices 9000 show, for example, that the mobile device 9000 can appropriately operate a target apparatus such as the TV 9004 regardless whether the mobile device 9000 points to a front side or a rear side of the target apparatus.

FIG. 214 is a diagram showing (a) display screens of the mobile device 9000 and (b) display screens of a TV as an example of the cooperation apparatuses, according to the present embodiment of the present invention. FIGS. 215 to 219 are flowcharts of processing according to the present embodiment of the present invention.

First, the processing in which the user selects a desired cooperation apparatus is described with reference to FIG. 215.

At the beginning, the mobile device 9000 obtains position information of the mobile device (S9302). More specifically, the mobile device obtains position information of the mobile device, by calculating or determining a reference position (position of a reference point) of the mobile device. The calculation or determination of the reference position of the mobile device is performed, for example, by (1) searching for an apparatus by a camera function, (2) then obtaining information detected by a distance sensor, (3) then establishing proximity wireless communication with the apparatus, and (4) receiving specific radio which enables position determination. Here, the method of obtaining the position information of the mobile device has already been described in detail with reference to FIG. 204, so that the description will not be repeated below.

Next, the mobile device 9000 is pointed in the direction "A" in FIG. 213. More specifically, the user points the mobile device 9000 to a desired target apparatus (the TV 9004, in this example) (S9303).

Here, the mobile device 9000 extracts, from the database, apparatus candidates existing in a direction pointed by the mobile device 9000 (S9304). More specifically, the mobile device 9000 extracts, from the database, apparatus candidates in the direction pointed by the mobile device 9000, based on (a) 3D (relative or absolute) coordinate information of positions of the mobile device 9000 and the TV 9004, (b) direction information indicating the direction pointed by the mobile device 9000, (c) attitude information of the apparatus (the TV 9004, in this example), (d) area information of the apparatus (the TV 9004, in this example), and the like.

Here, the mobile device 9000 determines whether or not there are a plurality of apparatus candidates in the direction pointed by the mobile device 9000 (S9305). If there are a plurality of such apparatus candidates (Yes at S9305), then the mobile device 9000 displays a list of the apparatus candidates with their position relationships on the screen of the mobile device 9000 (S9306).

Next, the mobile device 9000 determines whether or not the direction pointed by the mobile device 9000 is changed (S9307). If the direction pointed by the mobile device 9000 is changed, in other words, if the user changes the direction pointed by the mobile device 9000 (Yes at S9307), then the mobile device 9000 changes the display of the apparatus candidates according to the changed direction (S9308). More specifically, the mobile device 9000 changes the display of the apparatus candidates on the screen of the mobile device 9000 according to the direction changed by the mobile device 9000, based on a determination as to how much each of the apparatus candidates is close to the center of the direction pointed by the mobile device 9000.

Here, when the apparatus candidates are displayed on the display screen of the mobile device 9000, an apparatus candidate closer to the center of the direction pointed by the mobile device 9000 is displayed closer to the center of the display screen. It is also possible that the apparatus candidate closer to the center of the direction pointed by the mobile device 9000 is displayed higher in the display screen, or displayed with a target cursor.

Then, the mobile device determines whether or not pressing of a Lock button is detected (S9309). If the mobile device detects pressing of the Lock button (Yes at S9309), then the processing proceeds to Step S9310. More specifically, when a target apparatus that the user desires to operate is displayed at the center of the display, the user presses the Lock button. Then, the mobile device detects the pressing of the Lock button, and thereby the processing proceeds to Step S9310. Here, the Lock button may be a physical switch of the mobile device 9000, or may be a virtual button displayed on a touch panel of the mobile device 9000. Or, the Lock button may be a different device logically connected to the mobile device 9000. The above step is shown in 9222 in FIG. 214.

Next, if the determination at S9309 is Yes, then the mobile device 9000 specifies the target apparatus selected by the user, and obtains or downloads network connection information of the selected apparatus from the database (S9310). More specifically, the mobile device 9000 specifies the target apparatus (a TV or a microwave, for example) selected by the user from among the apparatus candidates existing in the direction pointed by the mobile device 9000. Then, the mobile device 9000 obtains or downloads, from the database in the server or the mobile device 9000, network connection information (a MAC address, an IP address, a communication key, a communication standard, a communication protocol) of the specified apparatus, a performance capability of the specified apparatus, a program for the specified apparatus, a script for the apparatus, and the like.

The mobile device 9000 holds a flag (Lock flag). When the Lock button is pressed, the Lock flag indicates that the mobile device 9000 is connected to the target apparatus pointed by the mobile device 9000. While the Lock flag is ON, the Step S9304 is not performed even if the user changes the direction of the mobile device 9000. Therefore, even if the user changes the direction of the mobile terminal 9000 while the mobile device 9000 is connected to the target apparatus such as the TV 9004, the mobile terminal 9000 is not disconnected from the target apparatus. As a result, it is possible to prevent that the display of the apparatus selected by the user is disappeared.

The following describes a direction pointed by the user using the mobile device 9000 to a certain apparatus (a TV, a recorder, a microwave, or the like) with reference to FIG. 220.

In the present embodiment, a target apparatus to be operated by the mobile device 9000 is specified by using (a) 3D (relative or absolute) coordinate information of positions of the mobile device 9000 (communication device) held by the user and the target apparatus (a TV, a recorder, a microwave, or the like), and (b) a direction of the mobile device 9000. If the mobile device 9000 is in almost cuboid shape, a direction of the mobile device which is used to specify the target apparatus is assumed to be in parallel to a longer side of a virtual cuboid forming a case of the mobile device 9000. For example, it is assumed that the mobile device 9000 has the buttons and the display screen as shown in FIG. 220, and that the user generally holds the mobile device 9000 by the display screen side not the buttons side. Under the assumption, the direction of the mobile device 9000 pointing the target apparatus is a direction 9111 from the buttons side to the display screen side. If the mobile device 9000 is a Smartphone, such as iPhone 4™ manufactured by Apple Inc., which hardly has buttons, and therefore the user holds the mobile device 9000 by hand in various ways, it is possible that a gravity point of the user's hand on the mobile device 9000 is detected by a gravity sensor, a gyro sensor, a camera unit, a proximity sensor, and the like of the mobile device 9000, and a direction resulting in the longest distance from the gravity point to the outer periphery of the mobile device is set to be the direction from the mobile device 9000. It should be noted that, if the mobile device 9000 has a rear-side camera unit 9113 on the rear side of the display screen, a parallel direction 9111 in parallel to the direction of the rear-side camera unit may be set to be a direction from the mobile device 9000. The direction 9111 may be used as the direction from the mobile device 9000 when the camera unit is not operated, while the direction 9112 may be used as the direction from the mobile device 9000 when the camera unit is operated. When the camera unit is operated and the direction 9112 is therefore set to be the direction from the mobile device 9000, the user can press the Lock button to specify the target apparatus, while watching the target apparatus displayed on the display screen of the mobile device 9000. Here, the target apparatus is specified based on the 3D coordinate information of positions of the mobile device 9000 and the target apparatus and the direction information of the mobile device 9000.

It is also possible to dynamically change a direction of the mobile device 9000, according to a shape of the mobile device 9000, an activation state of the gravity sensor, the gyro sensor, a camcorder unit, a user proximity sensor, an activation state of the camera unit, user's selection of a direction pointed by the mobile device 9000, a line of sight of the user, a posture of the user, or the like.

Therefore, the user can select the target apparatus merely by pointing the mobile device 9000 intuitively to a certain apparatus, without being conscious of how the user holds the mobile device 9000.

Moreover, it is also possible that the mobile device 9000 may be pointed in a plurality of directions at the same time to specify a target apparatus. It is therefore possible to search a wide range for the target apparatus regardless of how the user holds the mobile device 9000.

Referring back to FIG. 216, the following further describes Step S9310.

Next, the mobile device 9000 attempts to be connected with the apparatus via a network, by using the network connection information obtained at S9310 (S9401). If the connection is successful (Yes at S9401) and only communication information is obtained from the database (Yes at S9402), then the mobile device 9000 inquires the apparatus or the server for a performance capability of the apparatus (S9403). Then, the mobile device 9000 changes a display quality according to the obtained performance capability of the apparatus. Here, the mobile device 9000 may also obtain a control display program to be executed in the mobile device 9000.

Next, the mobile device executes the control display program (S9404).

Next, in the case where the apparatus is a TV, the mobile device obtains, from the apparatus, the number of TV programs, titles, thumbnails, and the like of channel broadcast programs of the TV. Then, the mobile device displays them on the display screen of the mobile device 9000 (S9405). The above step is shown in 9223 in FIG. 214.

Then, the user selects (presses a button, clicks on a touch panel, performs pinch out gesture, for example) a thumbnail of a certain program on the screen (display screen 9001) of the mobile device 9000. Therefore, the mobile device 9000 issues an instruction to display the selected TV program on the screen of the apparatus (TV) (S9407). The above step is shown in 9224 in FIG. 214.

Next, from the TV 9004, the mobile device 9000 receives video data having quality that corresponds to the performance capability of the mobile device 9000 (S9408). More specifically, the TV displays the designated TV program, and transmits video data having quality corresponding to the performance capability of the mobile device 9000 to the mobile device 9000. Therefore, the mobile device 9000 receives the video data having quality corresponding to the performance capability from the TV 9004.

Next, the mobile device 9000 displays the video data received from the TV (S9409). The above step is shown in 9225 in FIG. 214.

Here, if the user flicks to the right on the display screen of the mobile device 9000, a next channel TV program is displayed on both the display screen of the mobile device 9000 and the screen of the TV. More specifically, when the user flicks to the right on the display screen of the mobile device 9000, Steps S9407 to S9409 are performed for a next channel TV program, and the next channel TV program is displayed on both the display screen of the mobile device 9000 and the screen of the TV 9004 (S9410). The above steps are shown in 9225 to 9227 in FIG. 214.

With the above structure, the user can intuitively control a function of the target apparatus to be operated, merely by pointing the mobile device 9000 to the apparatus.

Furthermore, the use of attitude and shape information of the apparatus makes it possible to specify the apparatus pointed by the mobile device 9000, even if a distance from the center of the apparatus such as a large-screen TV and an edge of the mobile device 9000 is long. As a result, it is possible to correctly specify the apparatus which the user intends to point.

The following describes the processing from S9410 with reference to FIGS. 217 and 218.

At the beginning, the mobile device 9000 displays a certain TV program on the display screen of the mobile device 9000 (S9501). Here, it is assumed that, while pressing a Move button on the mobile device 9000, the user points the mobile device 9000 to a target apparatus (a recorder, a TV, or the like) into/on which the user wishes to store or display the TV program.

Here, the mobile device 9000 extracts, from the database, apparatus candidates existing in a direction pointed by the mobile device 9000 (S9503). More specifically, the mobile device 9000 extracts, from the database, apparatus candidates in the direction pointed by the mobile device 9000, based on (a) 3D (relative or absolute) coordinate information of positions of the mobile device 9000 and the apparatus candidates, (b) direction information indicating the direction pointed by the mobile device 9000, (c) attitude information of each of the apparatus candidates, and (d) area information of each of the apparatus candidates.

Here, the mobile device 9000 determines whether or not there are a plurality of apparatuses in the direction pointed by the mobile device 9000 (S9504). If there are a plurality of such apparatuses (namely, apparatus candidates) (Yes at S9504), then the mobile device 9000 displays a list of the apparatus candidates with their position relationships on the display screen of the mobile device 9000 (S9505).

Next, the mobile device 9000 determines whether or not the direction pointed by the mobile device 9000 is changed (S9506). If the direction pointed by the mobile device 9000 is changed, in other words, if the user changes the direction pointed by the mobile device 9000 (Yes at S9506), then the mobile device 9000 changes an apparatus candidate that is displayed at the center of the display screen to another apparatus candidate, according to the changed direction (S9507). More specifically, the mobile device 9000 changes the display status of the apparatus candidates on the display screen of the mobile device 9000 according to the direction changed by the mobile device 9000, based on a determination as to how much each of the apparatus candidates is close to the center of the direction pointed by the mobile device 9000. Here, regarding the apparatus candidate display on the display screen of the mobile device 9000, an apparatus candidate that is at the more center of the direction pointed by the mobile device 9000 is displayed at the more center in the display. It is also possible that the apparatus candidate that is at the more center of the direction pointed by the mobile device 9000 is displayed higher in the display, or displayed with a target cursor.

Next, the mobile device 9000 confirms whether or not pressing of the Move button is detected (S9508). If the mobile device detects pressing of the Move button (Yes at S9508), then the processing proceeds to Step S9509. More specifically, when the target apparatus which the user desires to operate is displayed at the center of the display, the user presses the Move button. Then, the mobile device detects the pressing of the Move button, and thereby the processing proceeds to Step S9310. Here, the Move button may be a physical switch of the mobile device 9000, or may be a virtual button displayed on a touch panel of the mobile device 9000. Or, the Move button may be a different device logically connected to the mobile device 9000. The above step is shown in 9227 in FIG. 214.

Next, when pressing of the Move button is detected, the mobile device 9000 specifies a certain apparatus among the apparatuses existing in the direction pointed by the mobile device 9000 (S9509). More specifically, when pressing of the Move button is detected, the mobile device 9000 specifies the target apparatus (a TV or a microwave, for example) selected by the user among the apparatuses existing in the direction pointed by the mobile device 9000.

Next, the mobile device 9000 obtains or downloads network connection information and the like of the specified apparatus from the database (S9510). More specifically, the mobile device 9000 obtains or downloads, from the database in the server or the mobile device 9000, network connection information (a MAC address, an IP address, a communication key, a communication standard, a communication protocol) of the apparatus, a performance capability of the apparatus, a program for controlling the apparatus, a script for the apparatus, and the like.

Next, the mobile device 9000 determines whether or not the specified apparatus has a capability of recording a target content (S9601). If the specified apparatus has the recording capability (Yes at S9601), then the mobile device 9000 transmits, to the specified apparatus, content source information, authentication information, recording range information together with a recording instruction regarding the content (S9602). More specifically, to the specified apparatus, the mobile device 9000 transmits the recording instruction as well as information including content source information (a channel number, a content address, a content URI, and the like), a recording range (time, unit, or the like), a content sever address, a source range, authentication information (authentication protocol, a key), and the like regarding the content.

Subsequently, when the apparatus (specified target apparatus) receives the recording instruction and the like from the mobile device 9000, the apparatus is connected to and receive the target content according to the recording instruction and records the content onto the apparatus itself. To the mobile device 9000, the apparatus transmits information of the recorded content, such as a title, details, a still picture thumbnail, a video thumbnail, and the like.

The mobile device 9000 receives information of the content recorded on the apparatus (S9604), and displays details of the recorded content on the display screen of the mobile device 9000 (S9605).

Next, the mobile device displays a dialog for the user, in order to determine whether or not the recording by the apparatus is to be continued (S9606). If the recording by the apparatus is to be continued, in other words, if the user agrees with the continuation (Yes at S9606), then the mobile device 9000 causes the apparatus to continue the recording (S9608). On the other hand, if the recording by the apparatus is not to be continued, in other words, if the user disagrees against the continuation (No at S9606), then the mobile device 9000 causes the apparatus to stop the recording (S9607).

Next, when the mobile device 9000 is disconnected from the apparatus (the recorder, for example) that performs the recording, the mobile device 9000 displays information of the previously displayed apparatus (the TV, for example) again (S9609).

With the above structure, the user can record a TV program currently watched on a TV onto a recorder, without complicated processes. For example, when the user inputs information of the watching TV program to the recorder by using a remote controller of the recorder, the user does not need to switching a holding device from a remote controller of the TV to the remote controller of the recorder.

It should be noted that it has been described in the present embodiment that the target apparatus to be operated by the mobile device is a recorder and that the user records a TV program currently watched on a TV onto the recorder. However, the present embodiment is not limited to the above example. The apparatus may be a display apparatus. In this case, the user may displays the currently watching TV program or content on the target apparatus, instead of recording the TV program or content onto the target apparatus. As a result, the user can watch a currently-watched TV program, Web page, or content also on a different display apparatus, without necessity of inputting information of the TV program, Web page, or content by using a keyboard of a remote controller of the different display apparatus. Furthermore, a Web page which the user is watching on the mobile device can be displayed also on the display apparatus.

The following describes the processing from S9609 with reference to FIG. 219.

At the beginning, it is assumed that, on the mobile device 9000, the user is watching the same video as that displayed on the TV (S9701).

Next, the mobile device 9000 confirms whether or not pressing of a remote control mode button on the mobile device 9000 is detected (S9702). If pressing of the remote control mode button is detected (Yes at S9702), then a mode on the display screen of the mobile device 9000 is switched to a remote control mode for remotely controlling the TV (S9703).

More specifically, when the user wishes to use the mobile device 9000 as a remote controller of the TV (target apparatus), the user presses the remote control mode button displayed on the display screen of the mobile device 9000. The mobile device 9000 therefore detects the pressing of the remote control mode button, and thereby switches a current mode on the display screen to the remote control mode for the TV. Here, the program for controlling the target apparatus (TV) which has been obtained at S9510 includes a remote control mode button display function and a remote control mode control program (or script).

With the above structure, when the user points the mobile device 9000 to the TV to be controlled, the user can control the TV by using the mobile device 9000 as a remote controller, without using a remote controller of the TV. More specifically, the mobile device 9000 can display a remote control mode for the TV on the mobile device 9000, so that user can control channels and a sound volume of the TV on the mobile device 9000. Meanwhile, conventional mobile telephones have a problem that, if such a mobile telephone is to be used as a remote controller of a target TV, it is necessary to download TV remote control application programs and select a program suitable for the target TV from them, for example. However, the mobile device 9000 according to the present embodiment does not have the above problem. In the mobile device 9000 according to the present embodiment, a program for controlling a target TV pointed by the mobile device 9000 is automatically downloaded onto the mobile device 9000, so that the mobile device 9000 can serve as a remote controller of the TV. As a result, it is possible to reduce complicated steps for switching to the remote control mode.

Next, the mobile device 9000 determines whether or not (a) a communication rate of communication between the mobile device 9000 (remote controller) and the target apparatus or (b) a use frequency of the communication are low (S9704). If the use frequency or the communication rate is low (Yes at S9704), then the mobile device 9000 serving as a remote controller of the TV obtains ZigBee or infrared communication protocol from the server. Therefore, the mobile device 9000 switches the current communication standard to wireless communication standard that results in lower power consumption (S9705).

With the above structure, automatic selection of a communication standard optimal to a corresponding function can reduce power consumption of the mobile device 9000 and the peripheral apparatus (for example, the TV).

Next, the mobile device 9000 detects that a Lock Release button is pressed (S9706). If the pressing of the Lock Release button is detected, in other words, if it is detected that the user presses the Lock Release button displayed on the display screen of the mobile device 9000 (Yes at S9706), then the mobile device 9000 releases connection from the apparatus (TV or the like) (S9707).

Next, the mobile device 9000 returns to the initial screen (S9708). The above step is shown in 9228 in FIG. 214.

With the above structure, when the user wishes to cause the mobile device 9000 to execute functions of different apparatuses, it is possible to selectively switch the functions.

FIG. 221 is a flowchart of an example of displays of the mobile device and the cooperation apparatus, according to the present embodiment of the present invention. S9801 to S9807 in FIG. 221 show an example situation where a TV program displayed on a TV is recorded onto a recorder that is a target apparatus. In FIG. 221, display states on the mobile device 9000 and user's actions can be intuitively understood. Since the above situation have previously been described in detail, it will not be described again below.

The following describes processing in the case where a cooperation apparatus which the user desires to operate by the mobile device 9000 is a microwave, with reference to FIGS. 222 and 223. FIGS. 222 and 223 are flowcharts of processing in the case where the cooperation apparatus is a microwave, according to the present embodiment of the present invention.

At the beginning, the mobile device 9000 obtains position information of the mobile device (S9912). More specifically, More specifically, the mobile device 9000 obtains position information of the mobile device 9000, by calculating or determining a reference position (position of a reference point) of the mobile device. The calculation or determination of the reference position of the mobile device is performed, for example, by (1) searching for a target apparatus by a camera function, (2) then obtaining information detected by a distance sensor, (3) then establishing proximity wireless communication with the apparatus, and (4) receiving specific radio which enables position determination. Here, the method of obtaining the position information of the mobile device 9000 has already been described in detail with reference to FIG. 204, so that the description will not be repeated below.

Next, the mobile device 9000 displays a cooking recipe selected by the user from a Web browser or the like (S9901).

Next, the mobile device 9000 is pointed to the desired target apparatus (S9902). More specifically, in the situation where the specific recipe is displayed on the display screen of the mobile device 9000, the user points the mobile device 9000 to the target apparatus (a microwave, a cooking machine, or the like) which the user intends to use for cooking, while pressing the Move button on the mobile device 9000. In the above manner, the mobile device 9000 is pointed to the target apparatus. This step is shown in "C" in FIG. 213.

Here, the mobile device 9000 extracts, from the database, apparatus candidates existing in a direction pointed by the mobile device 9000 (S9903). More specifically, the mobile device 9000 extracts, from the database, apparatus candidates in the direction pointed by the mobile device 9000, based on (a) 3D (relative or absolute) coordinate information of positions of the mobile device 9000 and the apparatus to be used for cooking, (b) direction information indicating the direction pointed by the mobile device 9000, (c) attitude information of the apparatus (here, a microwave 9006), and (d) area information of the apparatus (the microwave 9006).

Here, the mobile device 9000 determines whether or not there are a plurality of apparatus candidates in the direction pointed by the mobile device 9000 (S9904). If there are a plurality of such apparatus candidates (Yes at S9904), then the mobile device 9000 displays a list of the apparatus candidates with their position relationships on the display screen of the mobile device 9000 (S9905).

Next, the mobile device 9000 determines whether or not the direction pointed by the mobile device 9000 is changed (S9906). If the user changes the direction pointed by the mobile device 9000, in other words, if the direction pointed by the mobile device 9000 is changed (Yes at S9906), then the mobile device 9000 changes the display state of apparatus candidates according to the direction (S9907). More specifically, the mobile device 9000 changes the display state of the apparatus candidates on the display screen of the mobile device 9000 according to the direction changed by the mobile device 9000, based on a determination as to how much each of the apparatus candidates is closer to the center of the direction pointed by the mobile device 9000.

Here, regarding the apparatus candidate display on the display screen of the mobile device 9000, an apparatus candidate closer to the center of the direction pointed by the mobile device 9000 is displayed closer to the center of the display. It is also possible that the apparatus candidate closer to the center of the direction pointed by the mobile device 9000 is displayed higher in the display, or displayed with a target cursor.

Furthermore, the mobile device detects that the pressing of the Move button is released (S9908). If the release of the pressing of the Move button is detected (Yes at S9908), then the processing proceeds to Step S9910. More specifically, when the target apparatus that the user desires to operate is displayed at the center of the display, the user presses the Move button. Then, the mobile device detects the release of the pressing of the Move button, and thereby the processing proceeds to Step S9910. Here, the Move button may be a physical switch of the mobile device 9000, or may be a virtual button displayed on a touch panel of the mobile device 9000. Or, the Move button may be a different device logically connected to the mobile device 9000.

Next, if the determination at S9908 is Yes, then the mobile device 9000 obtains or downloads, from the database, network connection information and the like of the target apparatus selected by the user (S9910). More specifically, the mobile device 9000 specifies the target apparatus (here, the microwave) selected by the user from among the apparatus candidates in the direction pointed by the mobile device 9000. Then, the mobile device 9000 obtains or downloads, from the database in the server or the mobile device 9000, network connection information (a MAC address, an IP address, a communication key, a communication standard, a communication protocol) of the specified apparatus, a performance capability of the specified apparatus, a program for controlling the specified apparatus, a script for the specified apparatus, and the like.

Next, the mobile device 9000 determines whether or not the specified apparatus has a capability of performing target cooking (S9001). If the specified apparatus has the cooking capability (Yes at S9001), then the mobile device 9000 transmits, to the specified apparatus, authentication information, recipe information, and recipe source information together with a cooking instruction (S9602). Here, the recipe information indicates cooking details and a cooking method. For example, the recipe information indicates cooking processes (with a temperature, a time, and the like), such as ranging, oven-frying, mixing, kneading, baking, swearing, thawing, heating, and steaming. The recipe source information indicates a channel number, a content URL address, a content sever address, or a source range. The authentication information includes an authentication protocol, a key, and the like.

Subsequently, when the apparatus receives the cooking instruction and the like from the mobile device 9000, the apparatus is connected to and receive cooking data according to the cooking instruction, and records the cooking data. The apparatus transmits the recorded cocking data such as cooking detail recipe to the mobile device 9000.

Next, the mobile device 9000 receives the cooking detail recipe recorded on the apparatus (S9004), and displays, on the mobile device 9000, the cooking details to be performed by the apparatus (S9005).

Next, the mobile device 9000 displays a dialog for the user in order to determine whether or not to start the cooking by the apparatus (S9606). If the cooking is to start by the apparatus, in other words, if the user agrees with start of the cooking by the apparatus (Yes at S9006), then the mobile device 9000 causes the apparatus to start cooking (S9008). On the other hand, if the cooking is not to start by the apparatus, in other words, if the user disagrees against the start (No at S9006), then the mobile device 9000 causes the apparatus to stop the cooking (S9009).

Next, when the mobile device 9000 is disconnected from the cooking apparatus (for example, a cooking appliance such as a microwave), the mobile device 9000 displays information of the previously-displayed apparatus (a TV, for example) again (S9010).

In the above-described manner, when the user wishes to cook by using a cooking recipe displayed on the mobile device 9000, the user can start the cooking without inputting the cooking recipe into a microwave or a cooking machine. Furthermore, even if the recipe is not stored in the microwave or the cooking machine, the recipe can be recorded onto the apparatus without any complicated procedures. In addition, the cooking appliance does not need to have a device such as a browser or a touch panel. As a result, a cost of the cooking appliance can be reduced.

The following describes the processing in the case where, while pressing the Move button, the user points the mobile device 9000 to a target apparatus onto (a recorder, a TV, or the like) which information is to be recorded or on which information is to be displayed (namely, steps between S9501 and S9503 in FIG. 217) with reference to steps from 9227 in FIG. 214.

At the beginning, if the user unlock (releases) the Lock button at Step 9227a (Yes at Step 9227a), then the mobile device 9000 returns to the previously-displayed screen (here, the screen displaying the TV).

On the other hand, if the user does not release the Lock button (No at Step 9227a) and wishes to record the displayed information onto the recorder (Yes at Step 9227b), then the user points the mobile device 9000 in a direction from "A" to "B" in FIG. 213 while pressing the Move button (Step 9227c).

The mobile device 9000 therefore detects an apparatus existing in the pointed 3D direction from 3D coordinate information by using a 3D direction sensor in the mobile device 9000, and is thereby connected to the apparatus (here, the recorder) (Step 9227d). Here, the display image (display on the mobile device) shown at Step 9227e in FIG. 214 is displayed on the display screen of the mobile device 9000.

Next, if the user releases the pressing of the Move button at Step 9227e (Step 9227f), then the mobile device 9000 transmits a request (a recording instruction and the like) for recording a currently-displayed TV program, to the apparatus (recorder). Then, the mobile device 9000 displays the display state shown at Step 9227g in FIG. 214 on the display screen, and the recorder starts recording of the TV program displayed on the mobile device 9000.

Furthermore, if the user changes the direction pointed by the mobile device 9000 from direction "B" to direction "A" in FIG. 213 (Step 9227h), then the mobile device 9000 displays the display state shown at Step 9227i in FIG. 214 on the display.

The following describes effects of the present embodiment with reference to FIG. 213. In FIG. 213, solid lines show directions of "A", "B", and "C", respectively, from the mobile device 9000 to respective target apparatuses, in the case where the display screen 9001 of the mobile device 9000 is pointed to the front sides of the TV 9004, the recorder 9005, and the microwave 9006, respectively. Doted lines show directions of the mobile device 9000, in the case where the display screen 9001 of the mobile device 9000 is pointed to the rear sides of the TV 9004, the recorder 9005, and the microwave 9006, respectively. In a conventional method merely using a motion sensor, which is applied to games and the like, when the display screen 9001 of the mobile device 9000 is pointed to the front side of the TV, the direction "A" is rotated to the left (in other words, in anticlockwise direction) to be switched to the direction "B". Therefore, the target apparatus is switched from the TV 9004 to the recorder 9005 as the operator intends. However, when the display screen 9001 of the mobile device 9000 is pointed to the rear side of the TV, the direction "A" is rotated in clockwise direction, which is opposite to the anticlockwise direction, to be switched to the direction "B" to point the recorder 9005. Therefore, the motion sensor wrongly detects that the target apparatus pointed by the mobile device 9000 is switched from the TV 9004 to the microwave 9006. As a result, the mobile device 9000 wrongly selects the microwave and displays it on the display screen. Therefore, the mobile device 9000 performs false operation which the operator does not intends.

In the present embodiment, however, 3D mapping coordinate information of the TV 9004, the recorder 9005, and the microwave 9006 are previously registered by using NFC and the server. The mobile device 9000 also stores 3D coordinate information of the mobile device itself. Therefore, when the mobile device 9000 is moved to the rear side of the TV 9004 located at the center of a large room and then rotated in clockwise direction from the direction "A" shown by the dotted arrow to the TV 9004 to the direction "B" shown by the dotted arrow to the recorder 9005, the mobile device 900 can correctly select the recorder 9005 to be displayed, based on the 3D coordinate information of the positions of the TV 9004, the recorder 9005, and the mobile device 9000 and the direction pointed by the mobile device 9000. As a result, the screen of the mobile device 9000 can display the recorder 9005. Furthermore, the mobile device 9000 can be linked to the recorder 9005. As described above, the present embodiment can offer special advantages of preventing false operations.

Generally, there are few dozens of home appliances at home. In the present embodiment, when NFC communication is performed by touching such a home appliance by the mobile device 9000, a distance between the mobile device 9000 and the home appliance is about 5 cm to 10 cm. If the mobile device 9000 has correct position information, the position information with accuracy of about 5 cm to 10 cm is sent to the server. In other words, in the present embodiment, the few dozens of home appliances at home are set to be reference points for position determination. Conventionally, there has been a problem that there is no reference point that is a reference in position determination so that a position in a building cannot be determined correctly. The present embodiment, however, can offer significant advantages that most of home appliances can serve as reference points.

(Position Information Obtainment Method in Communication Method Having Plural Transmission Paths)

The following describes an example of a method using radio, as the position information obtainment method.

FIG. 224 is a diagram for explaining a communication method for establishing a plurality of transmission paths by using a plurality of antennas and performing transmission via the transmission paths.

As shown in FIG. 224, there is a communication method, such as Multiple Input Multiple Output (MIMO), which uses a plurality of antennas to establish a plurality of transmission paths to transmit data.

The following describes a method of obtaining position information in the case where a parent device 9306 and a mobile terminal (mobile device) 9308 communicate with each other by the above-mentioned communication method. The parent device 9306 communicates with the mobile terminal 9308 via three transmission paths 9308a, 9308b, and 9308c. In practice, there are nine transmission paths (3×3 transmission paths), but the following description is given under the assumption of the three transmission paths.

For the communication, the mobile terminal 9308 using the communication method such as MIMO calculates a transfer function A at Steps 9307a to 9307d, and further calculates eigenvectors X and Wi, an eigenvalue λ, and the like at Step 9307g. Here, the nine transmission paths have respective different characteristics, such as different eigenvectors, phases, and amplitudes. More specifically, at Step 9307a, characteristics of the respective transmission paths are extracted. At Step 9307b, a radio field strength is measured. At Step 9307c, transmission characteristics of the respective transmission paths are determined based on the 3D coordinate information of the mobile terminal 9308 stored in the mobile terminal itself and the direction information of the mobile terminal 9308. At Step 9307f, (a) transfer functions 9307d of the respective transmission paths corresponding to the coordinate information and (b) the radio field strength 9307e as well as (c) the 3D coordinate information and (d) the direction information are transmitted to a server 9302. Then, the processing proceeds to Step 9350 in FIG. 225.

FIG. 225 is a flowchart for explaining a method for obtaining position information by the communication method using a plurality of transmission paths.

At Step 9350, the server 9302 generates a pattern of (a) the 3D coordinate information of the mobile terminal 9406 determined at a specific time, (b) the direction of the mobile terminal 9406, (c) transmission characteristics (transfer function, eigenvalue, eigenvector of the transmission path), and (d) the strength.

Subsequently, at Steps 9351a, 9351b, and 9351c, the generated pattern is compressed with the transmission patterns 9352a, 9352b, 9352c (in more detail, AAA, ADA, CAB, for example) corresponding to the respective pieces of 3D coordinate information (3D coordinate information 1, 3D coordinate information 2, 3D coordinate information 3), thereby mapping the patterns onto a 3D coordinate space.

Then, at Step 9353a, the resulting transmission patterns (pieces of transmission information) are recorded onto a database in the server 9302 in which 3D coordinate positions are stored. Here, it is also possible to record characteristics of a change in the transmission information for a predetermined time period during which the mobile terminal 9308 is moved.

As described above, the pieces of transmission information (transmission patterns) are recorded onto the database in the server 9302. Here, such transmission information (transmission pattern) of the mobile terminal 9308 is recorded in association with each user. For example, if the mobile terminal 9308 transmits position information with a low accuracy to the server, pieces of input transmission information (transmission patterns) are learned to record position information with a higher accuracy on the database.

Next, at Step 9353b, it is assumed that the mobile terminal 9308 after Step 9353a transmits current transmission information (transmission patterns) to the server 9302 in order to obtain current position information (Yes at Step 9353). Under the assumption, at Step 9353c, the server 9302 matches (a) the transmission pattern transmitted from the mobile terminal 9308 with (b) each of the transmission patterns (pieces of transmission information) recorded on the database in the server 9302. Here, it is assumed that "AAA" is searched for by using a pattern matching method. Here, fifteen circles at the lower left of FIG. 225 schematically show transmission patterns recorded on the database in the server 9302.

Next, at Step 9353d, the server 9302 determines whether or not there is any transmission pattern candidate in the database which is similar to the transmission pattern (AAA) transmitted from the mobile terminal 9308 and the radio field strength of the mobile terminal 9308. If there is such a candidate at Step 9353d, then the server 9302 further determines whether or not the number of such candidates is one (Step 9353e). If there is only one such candidate (Yes at Step 9353e), then the server 9302 transmits, to the mobile terminal 9308, 3D coordinate position information of the transmission pattern candidate in the database (Step 9353g).

On the other hand, if there is not only one candidate (No at Step 9353e), then the processing proceeds to Step 9353h. At Step 9353h, a plurality of candidates are filtered based on low-accuracy 3D coordinate information stored in the mobile terminal 9308 in order to reduce the candidates. Here, with reference to the example shown at the lower left of FIG. 225, at Step 9353e, it is assumed that there are three transmission patterns of AAA, which are patterns 9355a, 9355b, and 9355c. Under the assumption, at Step 9353h, based on low-accuracy 3D coordinate information 9357 stored in the mobile terminal 9308 (shown as a bold-line circle in FIG. 225), the plurality of candidates are narrowed down (filtered) to only candidates close to the mobile terminal. As a result, the number of candidates can be reduced.

Next, after the filtering at Step 9353h, the server 9302 determines whether or not the number of candidates is one (Step 9353i). If the number of candidates is not one (No at Step 9353i), then the server 9302 instructs the mobile terminal 9308 to use the low-accuracy 3D coordinate information stored in the mobile terminal 9308 at Step 9353f. On the other hand, if the number of candidates is one (Yes at Step 9353i), then the server 9302 transmits 3D coordinate information of the candidate (transmission pattern) to the mobile terminal 9306 (Step 9353j).

However, the mobile terminal 9308 in a room cannot obtain GPS position information from satellites. Therefore, a position of the mobile terminal 9308 in a room is determined by using the triaxial vibrating gyro, the acceleration sensor, and the geomagnetic sensor. However, as the mobile terminal 9308 is far from a reference point, more errors are accumulated to decrease an accuracy.

However, in the case of the method according to the present embodiment, such as MIMO, which uses a plurality of transmission paths, the number of patterns such as transfer functions is increased. Therefore, there are more transmission patterns in a room in comparison with the situation using one transmission path. Each of the patterns is changed with a move of $\lambda/2$. In other words, if a pattern from which characteristics of a transmission path are extracted is known, it is possible to determine a position with a high accuracy of $\lambda/2$. For example, in the case of 1 GHz, it is possible to determine a position with an accuracy of 15 cm. The method has a problem that there would be a plurality of identical transmission patterns in the same room. In the present embodiment, however, the mobile terminal 9308 includes the position detection unit so that false patterns can be eliminated from pieces of low-accuracy position information. Thereby, the mobile terminal 9308 can obtain high-accuracy position information.

Moreover, MIMO can change directions of beams emitted from a plurality of antennas. If a beam direction from the mobile terminal to the parent device is changed, it is possible to change a level of received signals such as a strength of a transmission path of a receiver, for example. Move of the mobile terminal 9308 changes the state of the transmission path. Therefore, if the 3D coordinate position of the parent device is known, the position of the mobile terminal 9308 can be calculated.

As described above, according to the present embodiment, a mobile device (communication device), such as a mobile telephone or a Smartphone, can easily serve as an extended user interface, such as a multiple remote controller or a home appliance content download interface, of a target apparatus, by using a RF-ID unit of the mobile device and various sensors such as a GPS and a motion sensor.

Although the communication device according to the present invention has been described with reference to the above embodiments, the present invention is not limited to the above. Those skilled in the art will be readily appreciated that various modifications and combinations of the structural elements and functions in the embodiments are possible without materially departing from the novel teachings and advantages of the present invention. Accordingly, all such modifications and combinations are intended to be included within the scope of the present invention.

Twenty-Third Embodiment

The twenty-third embodiment of the present invention will be described.

FIG. 226 is a diagram showing an example of (a) a floor of a general home such as a user's home and (a) apparatuses related to processing performed when a user holding a mobile device (hereinafter, referred to also simply as a "mobile") moves on the floor. In the user's home, it is assumed that home appliances such as TVs (a TV-A and a TV-B) are placed in different rooms. The location of the user is determined by a technology of determining a coordinate value of a position in the home. Such a coordinate value is stored in the mobile. A coordinate value (position information) of each of the home appliances in the home is previously registered. Therefore, for example, if the user wishes to control one TV (the TV-A) in a bedroom, the user points the mobile device to the TV. As a result, the mobile device recognizes that the mobile device is pointed to the TV, based on a relative relationship between the coordinate value of the mobile device and the coordinate value of the TV. Therefore, the mobile device specifies the TV to be controlled, and sends a command to control the target TV. It should be noted in FIG. 226 that the map information of the home, which is used by the mobile device to determine positions, may be held in the mobile device, in a home server such as the SEG (401c), or in a server connected to the mobile device via the Internet. The home server is connected to the mobile device via a public network of the mobile device or via a wireless LAN access point (401e). It is preferable that, as long as the map information is stored in the home server, the home server can provide the map information to the mobile device even if the Internet line is not connected. What is more, the map information can be managed without consuming a storage (region for storing data) of the mobile device more than needs.

The following describes a flow of processing by which a user, who holds the mobile device 401a and is first near a building (user's home or the like) before entering the building, starts determining a position of the mobile device in the building by using a sensor in the mobile device.

With reference to FIG. 227, the processing of determining a position of the mobile device in the building is described.

At the beginning, at Step 402a, the mobile device determines whether or not a GPS sensor or a function of detecting radio waves in the building in the mobile device is running. If the GPS sensor or the function is running (Yes), then the processing proceeds to Step 402c. At Step 402c, the mobile device determines whether or not coordinate information of a current position of the mobile device which are detected by the GPS sensor are close to the target building (user's home, for example) that has been registered, or whether or not the mobile device detects waves emitted from an apparatus in the target building which is to be connected via wireless LAN. Thereby, the mobile device detects whether or not the mobile device is close to the target building. If it is detected that the mobile device is close to the target building (Yes at Step 402c), then the processing proceeds to Step 402d. If the determination at Step 402c is No, then the processing is repeated until the determination at Step 402c becomes Yes. On the other hand, if the determination at Step 402a is No, then the processing proceeds to Step 402b. At Step 402b, the user at the entrance of the building (user's home) selects an "indoor position determination mode" on a user interface of the mobile device in order to start position determination in the building. Then, the processing proceeds to Step 402d. At Step 402d, if the angular velocity sensor, the geomagnetism sensor, and the acceleration sensor of the mobile device are not running, then the mobile device activates these sensors and the processing proceeds to Step 402e. At Step 402e, it is determined whether or not a map and reference point information can be obtained from a map management server on a Cloud system or from a SEG (server in the user's home). If the determination at Step 402e is Yes, then the processing proceeds to Step 402f. At Step 402f, the mobile device obtains the map and the reference point information. The reference point information indicates positions that are to be used as reference positions when a move amount of the mobile device is measured by a sensor in the mobile device and then converted into a coordinate value of a current position. In the reference point information, coordinate values of such reference points on the map are previously registered. The mobile device detects such a reference point and obtains a coordinate value of the reference point, thereby setting coordinate information which is stored in the mobile device as a current position of the mobile device. These reference points are characteristic parts on the map, such as an entrance, a foot of stairs, and an end of a corridor. The reference points also include positions of home appliances, chairs, sofas, and the like.

If the mobile device has an enough storage, the mobile device holds the map and the reference point information. How to store and obtain the map and the reference point information is not limited. It is also possible that the map and the reference point information are stored in the SEG or the server on the Cloud system, and the mobile device inquires the SEG or the server on the Cloud system about the map and the reference point information based on detection results of the sensor in the mobile device, so that the mobile device performs, via a network, the same processing as that in the case where the mobile device holds the map and the reference point information.

It is further possible that the mobile device obtains a limited part of the map and a limited part of the reference point information, regarding only a location close to a position of the mobile device. More specifically, as the mobile device is moved, the mobile device may download a part of the map and a part of the reference point information from the SEG or from the server on the Cloud system. If the determination at Step 402e is No, then the processing proceeds to Step 402g. At Step 402g, the mobile device detects a predetermined characteristic change pattern (a move of a sliding door indicated by repetition of a previously-measured angle change, or a move on stairs indicated by a vertical acceleration change, for example). If such a pattern is detected at Step 402g (Yes), then the processing proceeds to Step 402h. At Step 402h, it is determined whether or not a "similar characteristic change pattern" similar to the detected pattern is registered in the mobile device. If the determination at Step 402h is Yes, then the processing proceeds to "1" in FIG. 228. If the determination at Step 402g is No, then the detection routine is repeated until the determination at Step 402g becomes Yes.

Here, the characteristic change pattern at Step 402g is, for example, a change G in a vertical direction of an acceleration in a Z-axis (vertical) direction which indicates that the user holding the mobile device ascends three steps of stairs within three seconds. The detection of the change indicates that the user holding the mobile device reaches a height of a floor of the entrance. Then, within five seconds, for example, the angular velocity sensor detects that a Yew direction is changed by 90 degrees, which indicates that the user faces the entrance.

In this case, it is recognized that opening of a door is a user's usual action. As a result, it is determined that the mobile device is currently close to a reference point near the entrance door. In the situation, if the sensor in the mobile device detects that the user is almost still for five seconds, for example, it is determined that the user is unlocking a key of the entrance. If the server or the mobile device holds coordinate information of the position in front of the entrance, position information of the mobile device is updated to the coordinate information. Then, the absolute coordinate system indicated by latitude/longitude of GPS information is switched to the relative coordinate system in the building. The switch to the relative coordinate system can eliminate conversion to coordinates to latitude/longitude, and also reduce conversion errors.

The following describes the situation where the entrance door has a RF-ID (NFC) lock. Regarding the RF-ID according to the present embodiment, coordinate information and a coordinate accuracy evaluation point Vs are recorded on the lock or the server. When the mobile device touches the lock, a distance between the mobile device and an antenna unit of the lock is within 5 cm. Therefore, if a coordinate accuracy evaluation point Vm of coordinate information of a position of the mobile device is greater than the coordinate accuracy evaluation point Vs, coordinate information of the lock is replaced by the coordinate information of the mobile device. On the other hand, if the coordinate accuracy evaluation point Vm of the mobile device is smaller than the coordinate accuracy evaluation point Vs, the above replacement is not performed. According to the present embodiment, coordinate information and a coordinate accuracy evaluation point of the coordinate information are recorded on a RF-ID unit of an apparatus such as an air conditioner or a TV or on a server corresponding to the apparatus, so that, every time the mobile device touches the apparatus, higher-accuracy coordinate information and a higher-accuracy evaluation point are updated. As a result, the accuracy of position coordinate information of each apparatus is increased for every touching.

Regarding an apparatus having a RF-ID function, coordinate information and a coordinate accuracy evaluation point of the apparatus are recorded as shown in FIG. 260.

FIG. 228 is a flowchart of processing of determining a position of the mobile device in the building. At Step 403a, the mobile device specifies a target reference point (the entrance, for example) based on the data change pattern generated by the sensor in the mobile device, and then obtains a coordinate value (a relative coordinate value with respect to an arbitrary reference point as an initial position, an absolute coordinate value based on latitude/longitude and sea level, or the like) of the reference point based on the map and the reference point information. At Step 403b, the mobile device determines that a current position of the mobile device is the reference point, and writes the coordinate value of the reference point over the current position information stored in the mobile device. At Step 403c, by using the angular velocity sensor, the geomagnetism sensor, and the acceleration sensor, the mobile device starts measuring move of the mobile device from the reference point. At Step 403d, the mobile device determines a current position (current coordinate information) of the mobile device on a 3D space based on the information (move information) of the move from the reference point, and registers the 3D coordinate information of the current position. The Step 403d is repeated during move. At Step 403e, the mobile device determines based on the move information whether or not the mobile device moves without obvious ascending action using stairs or a lift on the map. At Step 403f, the mobile device determines whether or not the current coordinate information is higher height information. The height information is a height of the user holding the mobile device, which is obtained from the mobile device or from the server (the SEG, the server on a Cloud system, or the like). If the height information cannot be obtained, an average height (170 cm, for example) in the corresponding country or region is obtained from preset information in the SEG, the server, or the mobile device. If the current coordinate information is higher than the height, the coordinate information is modified to be lower than the height and then the processing proceeds to "2" in FIG. 229.

Here, at Step 403c, the use of the angular velocity sensor, the geomagnetic sensor, and the acceleration sensor enables the mobile device to measure a move amount of the user to determine a 3D position of the user. It is also possible to use a sound sensor, an atmospheric pressure sensor, and the like to detect a location or a floor number where sound occurs. As a result, an accuracy of the position determination can be further increased.

According to the present embodiment, it is possible to prevent the situation where the sensors in the mobile device are always ON whenever the mobile device is inside and outside a target building. As described in the example of the present embodiment, the sensors for determining positions inside the building are turned ON only when the mobile device is detected as being close to the building. When the mobile device is not close to the building, the mobile device is at a sleep mode or turned OFF to save energy, if other application programs such as games are not used.

Furthermore, the angular velocity sensor is turned OFF or switched to a sleep mode, when the mobile device exists on a straight-line part on the map of the building, such as a path along which only rectilinear travel is possible. It is also possible to use the geomagnetic sensor to determine a direction. Then, the angular velocity sensor is turned ON at a curved part or a fork in the path. For example, the existing common triaxial angular velocity sensors consume energy of about 5 mA to 10 mA. Turning ON and OFF of the angular velocity sensor as necessary can reduce power consumption. Moreover, the existing common geomagnetic sensors consume energy of about 1 mA that is less than that of the common angular velocity sensors. Therefore, when high-accurate angular velocity detection and attitude detection by the angular velocity sensor are not necessary, it is possible to use only the geomagnetic sensor to detect the attitude of the mobile device.

FIG. 229 is a flowchart of processing of determining a position of the mobile device in the building.

At Step 404a, it is determined whether or not area information (coordinate value) indicating respective areas such as a living room and a bedroom, are previously set in the map information (the map). If the determination at Step 404a is Yes, then the processing proceeds to Step 404b. At Step 404b, the mobile device obtains the area information indicating rooms on the map, with reference to the map information stored in the mobile device. At Step 404c, based on coordinate information of the mobile device and the obtained area information, the mobile device specifies a room where the mobile device exists ($X_1, Y_1, Z_1 < Xm, Ym, Zm < X_2, Y_2, Z_2$). At Step 404d, the mobile device displays a room name (living room, for example) of the specified room on the screen of the mobile device. At Step 404e, with reference to the map information stored in the mobile device, the mobile device specifies controllable apparatuses existing in a direction pointed by the head of the mobile device. At Step 404f, the mobile device determines, based on a previously-set coordinate value of the equipped position of each of the specified apparatus, whether or not the apparatus is in the room where the mobile device exists. It is also possible to make the determination based on a previously-set room name, if any. At Step 404g, the mobile device generates an apparatus list to be presented to the user. In the apparatus list, apparatuses in the room where the mobile device exists are distinguished from apparatuses not in the room. For example, the different groups of the apparatuses are displayed in respective different color frames. Then, the processing proceeds to "3" in FIG. 233. If the determination at Step 404a is No, then the processing proceeds to Step 404h. At Step 404h, with reference to the map information stored in the mobile device, the mobile device specifies controllable apparatuses existing in a direction pointed by the head of the mobile device. At 404i, the mobile device generates an apparatus list to be presented to the user. Then, the processing proceeds to Step "3" in FIG. 233. Here, the geomagnetic sensor and the acceleration sensor detect a direction of gravitational force, and the angular velocity sensor generates attitude information indicating a direction and a vertical angle of the mobile device. Based on the detection results, the mobile device determines the direction which the user intends to point by the mobile device.

As described above, by recognizing a room where the mobile device is, it is possible to control a target apparatus (TV, for example) in the room, even if there are two TVs in different rooms.

Furthermore, the acceleration sensor counts the number of user's steps to measure a move amount, thereby enhancing an accuracy of the acceleration sensor. The move amount measurement is calculated by multiplying the number of steps by a move amount of one step (step length). Here, after the mobile device recognizes the room where the mobile device is, the mobile device obtains a type of the room from the map. The step length varies depending on a kind of the floor (wooden floor, carpet, or the like) of each room. Therefore, the move amount measurement is performed by using an appropriate step length for each floor, in order to increase an accuracy of the move amount detection. For example, the step length is 70 cm for a wooden floor, and 60 cm for carpet.

FIG. 230 is a diagram showing an example of information indicating an area of a room on the 3D map. If a shape of a room is complicated and is not a simple cuboid, such a room is considered as a combination of a plurality of cuboids. In this case, the room (area) where the mobile device exists is specified by determining which of the cuboids in the room includes the current coordinate information of the mobile device.

FIG. 231 is a diagram showing a move of the mobile device near a reference point.

As shown in FIG. 231, when it is detected that the mobile device (406a) having the angular velocity sensor at a sleep mode (406b) enters an area (range) within 3 meters from the reference point, the angular velocity sensor is turned ON (406c) to detect the reference point with a higher accuracy. Until the mobile device enters the range, a position of the mobile device is recognized by sensors such as the acceleration sensor and the geomagnetic sensor, by calculating a speculative coordinate value of the position on the map based on a move amount measured from an immediately prior reference point passed by the mobile device.

FIG. 232 is a diagram showing a location to be detected with a high accuracy in a direction of moving the mobile device.

For example, as shown in FIG. 232, a door between a bed room and an entrance is not far from a door between the bed room and a living room. Here, it is assumed that the mobile device enters a range (within 3 meters, for example) from a reference point (407b). At the reference point (407b), map-matching is difficult because inaccurate detection of user's turning causes the current position of the mobile device to vary depending on the respective rooms on the map. In this case, it is possible to increase an accuracy of the map matching, by operating the angular velocity sensor during a certain time period (for 10 seconds, for example).

FIG. 233 is a flowchart of processing of determining a position of the mobile device in the building.

At Step 408a, the mobile device obtains a current coordinate value (current coordinate information) of the mobile device. At Step 408b, it is determined, based on the map, whether or not there is any reference point or any attention point in a range within 3 meters from the current coordinate information on the map. If the determination at Step 408b is Yes, then the processing proceeds to Step 408c. On the other hand, if the determination at Step 408b is No, then the processing returns to Step 408a. At Step 408c, the mobile device refers to a list of sensors to be used near the reference point or the attention point. At Step 408d, the mobile device obtains detection information detected by the target "angular velocity sensor" and time information (10 seconds, 5 seconds after arrival). At Step 408e, a sleep mode of the angular velocity sensor is released to start measurement. At Step 408f, if a pattern of a detection result of the sensor regarding the reference point or the attention point is detected (Yes), then the processing proceeds to Step 408g. At Step 408g, it is determined whether or not the predetermined time period of 5 seconds has passed. If the determination at Step 408g is Yes, then the processing is completed. On the other hand, if the determination at Step 408g is No, then the step is repeated until the determination at Step 408g is Yes. If the determination at Step 408f is No, then the processing proceeds to Step 408h. At Step 408h, it is determined whether or not a time period of 10 seconds has passed. If the determination at Step 408h is Yes, then the processing proceeds to Step 408i. At Step 408i, the mobile device counts a discovery rate within the time period (decrement by 1 count). At Step 408j, the time information on the list is overwritten to be extended. In the case where the list is obtained from the server, the mobile device notifies the server of the time information to be written over the list, and then the processing returns to Step 408a.

FIG. 234 is a table of moves of the mobile device near reference points and an attention point.

The table (409a) shown in FIG. 234 indicates sensors to be activated by the mobile device in order of priorities. The sensors are prioritized according to reference points and an attention point on the map. The attention point is a position near a range where map-matching errors are likely to occur. The table also indicates a time of activation and an operating time period during which each of the sensors is to be kept operating after detecting each of the reference points and the attention point. Based on the table, it is possible to realize higher-accuracy detection of the reference points and the attention point. Furthermore, the table shows a discovery rate within the operating time period. The discovery rate indicates a percentage of discovery of each of the reference points and the attention point, within the operating time period since the mobile terminal enters the range near the reference point or the attention point and activates the sensor indicated in the table. The table further indicates an error rate. The error rate indicates a rate of case(s) where it is determined, based on the detection data after map-matching, an actual position is different from a result of map-matching. Therefore, the operating time period is set longer when the discovery rate is lower, while the operating time period is set shorter when the discovery rate is higher. As a result, it is possible to reduce the operating time period to save energy. Moreover, if a rate of map-matching errors is high, a distance for detecting the range near the reference point or attention point is extended (from 3 meters to 5 meters), instead of extending the operating time period of the sensor. As a result, it is possible to increase an accuracy of discovery of the reference points and the attention point. On the other hand, if a rate of map-matching errors is low, the distance for detecting the range is shortened to decrease the operating time period of the sensor, thereby saving energy.

The attention points include areas where a detection accuracy of each sensor is decreased. For example, the geomagnetic sensor produces significant noises near a TV or in a space having magnetic force. If the mobile device detects noise causing the geomagnetic sensor to point an apparently wrong direction, the mobile device registers a location causing the noise, as an attention point, onto the map. When the mobile device enters a vicinity of an attention point, the angular velocity sensor is activated to correct the wrong direction detection. Furthermore, if the mobile device detects noise but a location of the noise has not yet been registered as an attention point on the map, the mobile device immediately activates the angular velocity sensor to correct wrong detection and registers the location as an attention point on the map. Furthermore, regarding coordinate information (coordinate point) where the user always changes a way of holding the mobile device on a steep slope or on stairs, when the angular velocity sensor arrives at a position where an accuracy of the angular velocity sensor is likely to be influenced by change of a direction of gravitational force, the mobile device corrects detection of the sensor to increase the accuracy and a sampling amount. Moreover, when the geomagnetic sensor is not operated, the geomagnetic sensor is activated to perform the correction. It is determined whether or not coordinate information (coordinate value), from which a change of a position of the mobile device is detected, is always near the location where such position change is always occurred according to a state of the user. If such position change is always occurred at the location, the coordinate information (coordinate value) is registered as an attention point.

With reference to FIG. 235, the processing of determining a position of the mobile device in the building is described.

At the beginning, at Step 410a, the mobile device determines whether or not the mobile device detects (a) coordinate information of a range near the user's home by GPS, (b) an access point of a wireless LAN in the user's home, or (c) one of access points of the wireless LAN in the user's home which have previously been detected in the user's home. If the determination at Step 410a is No, then the mobile device waits until the determination becomes Yes. If the determination at Step 410a is Yes, then at Step 410b, the mobile device specifies a sensor for detecting a reference point passing in entering the home, from a reference point detection sensor priority list shown in FIG. 236 that indicates priorities of sensors for detecting reference points. Here, it is assumed that the mobile device specifies the acceleration sensor at Step 410c, and the acceleration sensor detects G (acceleration) in a Z-axis direction which indicates a registered acceleration pattern (for example, three steps of stairs). In this case, the mobile device determines that the mobile device is currently positioned at previously-registered coordinate information (coordinate value) of the reference point. Therefore, the coordinate value is set in the mobile device. Then, the processing proceeds to "4" in FIG. 237.

Here, in addition to Step 410c, a direction of move on the stairs is determined based on G (acceleration) on a moving direction axis (X-axis) which is detected by the geomagnetic sensor. Then, it is determined whether or not the determined direction is the same as the direction of the stairs which is previously detected and registered on the map. If the detected direction is not the same as the registered direction of the stairs, it is possible to determine that the stairs are not a target reference point.

FIG. 236 is a list indicating priorities of sensors for detecting each of reference points.

As shown in the list 411a, since priorities of sensors to be activated are varied depending on a kind of a target reference point. For example, when an entrance door is to be detected, the sound sensor can correctly detect the entrance door by examining a similarity of sound caused by a key hole of the entrance door. However, the sound sensor has a difficulty in detecting a door of a living room because a door of a living room does not make loud sound. Therefore, the acceleration sensor instead of the sound sensor can detect the living room door, because the user ascends one step to a height of the floor in entering the living room. More specifically, detection of a vertical move by the acceleration sensor can provide more efficient characteristic pattern than the sound detection by the sound sensor. As a result, the acceleration sensor is prioritized higher than the sound sensor for the living room door.

For example, with reference to the list 411a, in the normal operation, two highest sensors in the order of priorities in the list are always operated. Here, if the two highest-priority sensors do not provide effective detection even after a certain time period, the third priority sensor is also operated. On the other hand, if the two highest-priority sensors are enough to provide effective detection, only the highest-priority sensor is operated to be used. Therefore, depending on characteristics of a reference point and the detection state, sensors to be operated are selected. As a result, it is possible to performing the detection using only necessary sensors, thereby saving energy consumption and increasing the detection accuracy. Furthermore, if a battery of the mobile device has enough charges, lower-priority sensors are also operated, for example, three highest sensors are always operated. As a result, it is possible to increase the detection accuracy without decreasing usability.

With reference to FIG. 237, the processing of determining a position of the mobile device in the building is described.

For example, at Step 412a, if an amount of acceleration components in a minus direction along the Z-axis is large (Yes), it is determined at Step 412b that the user is ascending stairs. At Step 412c, the number "n" of user's steps on the stairs is counted. At Step 412d, a position of the user is determined based on a radio field strength and a phase of access points of the wireless LAN, and thereby stairs A is specified from among plural sets of stairs. At Step 412f, if the number "n" of the user's steps reaches the number "m" of steps of the stairs A that is obtained from the memory in the server or the mobile device, or if the atmospheric pressure sensor detects a certain atmospheric pressure (Yes), then the processing proceeds to Step 412g. At Step 412g, it is determined that the user is at the top of the stairs, then coordinate information of the top step and a coordinate accuracy evaluation point Vs of the coordinate information are obtained from the server, and the processing proceeds to "5" in FIG. 238. On the other hand, if the determination at Step 412f is No, then the processing returns to Step 412c. If the determination at Step 412a is No, then the processing proceeds to Step 412h. At Step 412h, if an amount of acceleration components in a plus direction along the Z-axis is large (Yes), then it is determined at Step 412i that the user is descending stairs. At Step 412k, the number of user's steps on the stairs is counted. At Step 412m, a position of the user is determined based on a radio field strength and a phase of access points of the wireless LAN, and thereby stairs A is specified from among plural sets of stairs. At Step 412n, if the number of the user's steps reaches the number "m" of steps of the stairs A that is obtained from the memory in the server or the mobile device, or if the atmospheric pressure sensor detects a certain atmospheric pressure (Yes), then the processing proceeds to Step 412p. At Step 412p, it is determined that the user is at the bottom of the stairs, then coordinate information of the bottom step and a coordinate accuracy evaluation point Vs of the coordinate information are obtained from the server, and the processing proceeds to "5" in FIG. 238. On the other hand, if the determination at Step 412p is No, then the processing returns to Step 412k.

With reference to FIG. 238, the processing of determining a position of the mobile device in the building is described.

At Step 413a, the coordinate accuracy evaluation point Vm of the coordinate information measured by the mobile device is retrieved from the mobile device. At Step 413b, if Vs is greater than Vm, in other words, if the coordinate information registered in the server is accurate more than the coordinate information stored in the mobile device (Yes), then the processing proceeds to Step 413c. At Step 413c, the coordinate information stored in the mobile device is rewritten by the coordinate information registered in the server. At Step 413g, the setting of the coordinate information of the reference point at the stairs has been completed. Then, the processing proceeds to "2" in FIG. 229. If the determination at Step 413b is No, then the processing proceeds to Step 413d. At Step 413d, the coordinate information stored in the mobile device is not rewritten by the coordinate information registered in the server. At Step 413e, if an automatic rewriting flag for automatically rewriting the coordinate information registered in the server as the coordinate information stored in the mobile device is ON, or if the user agrees (OK) with the screen display "Can it be written?" (Yes), then the processing proceeds to Step 413f. At Step 413f, the coordinate information registered in the server is rewritten as the coordinate information stored in the mobile device. At Step 413g, the setting of the coordinate information of the reference point at the stairs has been completed. Then, the processing proceeds to "2" in FIG. 229. If the determination at Step 413e is No, then at Step 413g, the setting of the coordinate information of the reference point at the stairs has been completed. Then, the processing returns to "2" in FIG. 229.

FIG. 239 shows graphs each indicating detection data in the Z-axis (vertical) direction which is detected by the acceleration sensor.

As shown in a pattern 414a in FIG. 239, when the user ascends stairs, an acceleration is high in a minus direction along the vertical Z-axis which is an ascending direction, and such acceleration is periodically detected (414a). On the other hand, when the user descends stairs, an acceleration is high in a plus direction along the vertical Z-axis which is a descending direction, and such acceleration is periodically detected (414b). Moreover, when the user walks horizontally, an acceleration in the minus direction and an acceleration in the plus direction are almost the same along the vertical direction (414c). In the graphs in FIG. 239, gravity measured by the acceleration sensor in the steady state is not considered to simplify the explanation.

With reference to FIG. 240, the processing of determining a position of the mobile device in the building is described.

At the beginning, at Step 415a, the mobile device determines whether or not the mobile device detects (a) coordinate information of a range near the user's home by GPS, (b) an access point of a wireless LAN in the user's home, or (c) one of access points of the wireless LAN in the user's home which have previously been detected in the user's home. If the determination at Step 415a is No, then the mobile device waits until the determination becomes Yes. If the determination at Step 415a is Yes, then at Step 415b, the mobile device specifies a sensor for detecting reference points in user's entrance from the reference point detection sensor priority list 411a. At Step 415c, if the sound sensor is specified from the obtained list, the mobile device of the user (hereinafter, referred to as a "user's mobile device") accesses a previously-registered mobile device (for example, a mobile device of a family member, hereinafter, referred to as "family mobile device") that is going to enter the building (the user's home), via proximity wireless communication such as a cellular network, a wireless LAN, or a booster transformer (BT). Thereby, the user's mobile device inquires the family mobile device whether or not the family mobile device is near the building. At Step 415d, if there is such a mobile device (the family mobile device, for example) near the user's mobile device and the family mobile device is permitted to enter the building to receive position determination services, the user's mobile device inquires a coordinate value (coordinate information) of the family mobile device. Then, the user's mobile device determines whether or not the a distance between the position of the family mobile device (the obtained coordinate value) and a position of a reference point (a reference value) is shorter than a distance between the position of the user's mobile device and the position of the reference point. If the distance between the family mobile device and the reference point is shorter than the distance between the user's mobile device and the reference point, then the processing proceeds to Step 415f. At Step 415f, the user's mobile device examines the reference point detection sensor priority list to select another detection method except sound. At Step 415g, by the selected detection method, the user's mobile device detects that the user's mobile device moves to the reference point, then sets coordinate value (coordinate information) of the reference point to the user's mobile device, and the processing proceeds to "6" in FIG. 241.

If it is determined at Step 415d that the distance between the family mobile device and the reference point is longer than the distance between the user's mobile device and the reference point, then the processing proceeds to Step 415e. At Step 415e, the user's mobile device determines whether or not sound emitted at the current position of the user's mobile device matches previously-registered sound (sound of a door knob, or sound of a key). If the determination at Step 415e is Yes, the user's mobile device determines that the current position of the user's mobile device is a reference point and sets a coordinate value of the reference point into the user's mobile device. Then, the processing proceeds to "6" in FIG. 236.

With reference to FIG. 241, the processing of determining a position of the mobile device in the building is described.

At Step 416a, an amount of a move of the mobile device from a reference point is calculated for each predetermined time period (10 ms) by the acceleration sensor, the angular velocity sensor, and the geomagnetism sensor, so that an estimated coordinate value (estimated coordinate information) of the mobile device is registered in the mobile device for each of the calculation by using an automatic navigation method. At Step 416b, the mobile device (i) detects the user's walk based on a results of detecting the Z-axis accelerations, (ii) detects a time at which the user's foot touches the floor, and (iii) detects one or more sounds occurred at a target time, and (iv) detects a moment at which sound is changed. At Step 416c, a pattern of the sound change is compared with previously-registered patterns resulting from differences between floors, such as a difference between a wooden floor and a carpet. If the pattern is similar to one of the previously-registered patterns, then the processing proceeds to Step 416d. At Step 416d, a direction of the move of the mobile device (hereinafter, referred to as a "moving direction") is detected by the geomagnetism sensor and the angular velocity sensor. Then, coordinate information of the mobile device is corrected to coordinates of an intersection between (a) the moving direction and (b) a straight line drawn from a coordinate value (coordinate information) that is currently registered as current position information in the mobile device (or corrected to a position that is the closest to the intersection). Then, the processing proceeds to "7" in FIG. 242. On the other hand, if the pattern is not similar to any of the previously-registered patterns, then the processing proceeds to "7" in FIG. 242.

FIG. 242 shows graphs and a diagram for showing a relationship between detection data and a walker in the acceleration Z-axis (vertical) direction.

As shown in 417a, a walking state can be detected based on acceleration. By detecting times (417b, 417c) at each of which a foot touches a floor, it is possible to extract, based on the detected time, only a footstep sound from sound occurred in walking. As a result, a difference of footstep sounds can be detected more efficiently. As shown in 417d, when the user moves from a living room having a wooden floor to an European-style room having a carpet floor, it is determined that a time of the footstep sound change point 417e is a time where the user walks across a boundary between the living room and the European-style room (417f). As a result, a coordinate value (coordinate information of a current position) of the mobile device is corrected based on the map.

FIG. 243 shows a diagram showing an example of moves in the building.

The mobile device detects a reference point 418a, and can calculate an accuracy of a coordinate value of a position of a TV-A based on (a) an amount 418b of turning towards the TV-A and (b) an accuracy of a coordinate value of the reference point 418a on the map. More specifically, if the turning amount 418b is large, the accuracy of the coordinate value of the position of the TV-A which is recognized by the mobile device is set low. On the other hand, if the turning amount 418b is small, the accuracy is set high. The resulting accuracy information of the reference point is registered. Likewise, for a move from the TV-A to a TV-B, an accuracy of a coordinate value of a position of the TV-B is calculated based on (a) the accuracy information of the coordinate value of the TV-A and (b) a turning amount or a move amount along the Z-axis (418c), and eventually the calculated accuracy information is registered.

FIG. 244 is a table indicating a path of the mobile device from a reference point to a next reference point.

In the table 419a, path information includes: (a) original reference point accuracy information that is accuracy information of an immediately-prior reference point which the mobile device has passed; (b) a move amount; (c) the number of steps (step number) calculated by the acceleration sensor; (d) a total turning amount that is calculated by the angular velocity sensor and the geomagnetic sensor; (e) an elapsed time; and (f) a total amount of a vertical move along the Z-axis. An accuracy evaluation point (coordinate accuracy evaluation point) of a current position of the mobile device is calculated based on values of the above pieces of information.

FIG. 245 shows a table and a diagram for explaining the original reference point accuracy information.

As shown in the table 420a, the reference point A such as an entrance, the TV-A, the TV-B, and their reference point accuracy information are registered. As shown in an example in FIG. 245, a coordinate accuracy evaluation point of the TV-A is calculated based on the coordinate accuracy evaluation point of the reference point A and a path 1 (420b). A coordinate accuracy evaluation point of the TV-B is calculated based on the coordinate accuracy evaluation point of the TV-A and a path 2 (420c).

The calculated coordinate accuracy evaluation points are stored as map information and kept updating. The updating may be performed for each time the mobile device reaches a target reference point. It is also possible to accumulate coordinate accuracy evaluation points of a target reference point, predetermined times, and calculate statistics from them. For example, 10 coordinate accuracy evaluation points are averaged.

With reference to FIG. 246, the processing of determining a position of the mobile device in the building is described.

At Step 421a, a first reference point is detected. At Step 421b, a coordinate value of a current position of the mobile device is rewritten by a coordinate value of the first reference point. At Step 421c, coordinate accuracy evaluation point information that indicates an accuracy of the coordinate value of the first reference point is obtained from reference point information. The first reference point is considered as an original reference point in a path list. At Step 421d, a move from the first reference point is measured by the angular velocity sensor, the geomagnetic sensor, and the acceleration sensor, and then stored. At Step 421e, it is determined whether or not the mobile device arrives at a second reference point or touches an apparatus having a RF-ID function for communication which is located at the second reference point. If the determination at Step 421e is Yes, then the processing proceeds to Step 421f. At Step 421f, the mobile device obtains information of the second reference point (reference point information) or information of the apparatus (apparatus information). Then, at Step 421g, the mobile device obtains coordinate accuracy evaluation point information of the second reference point or the apparatus based on the reference point information or the apparatus information. The coordinate accuracy evaluation point information is obtained from the server (SEG, for example) or from the mobile device itself, in the same manner as described in the case where the mobile device touches the apparatus, such as a home appliance having a RF-ID function, which is located at the second reference point. Then, the processing proceeds to "8" in FIG. 242. On the other hand, if the determination at Step 421e is No, then the processing returns to Step 421d.

With reference to FIG. 247, the processing of determining a position of the mobile device in the building is described.

At Step 422a, a coordinate accuracy evaluation point of the second reference point or the apparatus is calculated based on the path information. At Step 422b, if the coordinate accuracy evaluation point calculated by the mobile device is higher than coordinate accuracy evaluation point that has been previously calculated and registered (Yes), then the processing proceeds to Step 422c. At Step 422c, 3D coordinate information and the coordinate accuracy evaluation point of the second reference point or the apparatus which are currently calculated are written over 3D coordinate information and the coordinate accuracy evaluation point which are registered. If the determination at Step 422b is No, then the processing proceeds to Step 422d. At Step 422d, the 3D coordinate information of the second reference point or the apparatus which is registered is obtained. At Step 422e, the obtained 3D coordinate information is overwritten as a coordinate value of a current position of the mobile device. Then, the processing returns to "2" in FIG. 229.

The following describes a position determination method regarding a lift with reference to FIGS. 248 and 249.

First, FIG. 248 is explained.

At Step 423a, it is determined whether or not the user holding the mobile device arrives at a position of a lift. If the determination at Step 423a is Yes, then the processing proceeds to Step 423b. Otherwise (No at Step 423a), Step 423a is repeated.

At Step 423b, it is determined whether or not the user holding the mobile device enters the lift. If the user holding the mobile device enters the lift (Yes at Step 423b), then the processing proceeds to Step 423c. Otherwise (No at Step 423b), Step 423b is repeated.

If there are a plurality of lifts having different performance in the building, it is determined at Step 423c, based on position information, which lift the user enters and on which floor (floor number) the lift currently exists. At Step 423d, the mobile device obtains "characteristic information" of the target lift from the server. The characteristic information includes: (a) a time period required to ascend or descend from the n-th floor to the m-th floor; (b) information of Ts and load change characteristics; (c) an absolute or relative height of each floor; and (d) a position of a lift door on each floor. At Step 423e, a vertical acceleration along the Z-axis is measured. At Step 423f, if an acceleration in the same direction as the gravity direction is increased, or if atmospheric pressure is decreased, it is determined that the user starts ascending in the lift. Therefore, measurement of an elapsed time of the ascending starts. At step 423g, if an acceleration in the same direction as the gravity direction is decreased, or if increase of atmospheric pressure stops, it is determined that the ascending stops. Therefore, the measurement of the elapsed time is stopped to calculate the elapsed time TA. At Step 423h, information of a "time period required from the n-th floor to the m-th floor" is calculated based on (a) the floor from which ascending starts, (b) the elapsed time TA, and (c) the required time period information of the lift, and then information of a "floor (floor number) at which the mobile device arrives" is determined based on the "time period required from the n-th floor to the m-th floor". At Step 423i, it is determined whether or not the mobile device is moved outside the lift. If the determination at Step 423i is Yes, then the processing proceeds to "9" in FIG. 249.

On the other hand, if the determination at Step 423i is No, then the processing returns to Step 423e.

It should be noted that, in the case where the lift is descending, detected values of data such as an acceleration and atmospheric pressure are opposite to those in the case where the lift is ascending. Therefore, the floor at which the mobile device arrives is determined in the same manner as described with the above steps.

It should also be noted that, in the case where the lift is stopped for someone before arriving at the user's target floor, a move amount from start of ascending or descending to each stop is considered until the user holding the mobile device eventually goes out of the lift.

Next, FIG. 249 is explained.

At Step 424a, height information or floor number information of the above-described "floor (floor number) at which the mobile device arrives" is recorded as Z information in the current 3D coordinate information of the mobile device. At Step 424b, it is determined at Step 424b whether or not the user holding the mobile device goes out by a few steps from a door of the lift. If the determination at Step 424b is Yes, then the processing proceeds to Step 424c. Otherwise (No at Step 424b), Step 424b is repeated.

At Step 424c, the mobile device obtains (a) position information of an entrance of the floor and (b) coordinate accuracy evaluation point Vs of the entrance, which are previously stored in the server or the memory in the mobile device. In addition, the mobile device obtains coordinate information of the current position of the mobile device measured by sensors and the like in the mobile device. Then, the processing proceeds to "5" in FIG. 238. In this case, if the coordinate accuracy evaluation point Vs of the entrance is higher than the coordinate accuracy evaluation point Vm of the entrance which is stored in the mobile device, the coordinate information (coordinate value) of the entrance is written over the coordinate information stored in the mobile device to re-set information of the reference point (the entrance). As a result, the accuracy of the coordinate information stored in the mobile device is increased. After that, as a distance and a time period of move of the mobile device are increased, the coordinate accuracy evaluation point Vm stored in the mobile device is decreased if a next reference point is not set. The decrease is executed by a program corresponding to characteristics of a model of the mobile device. The program is downloaded by the mobile device.

In the case where the user holding the mobile device gets on an escalator, the mobile device detects both (a) an acceleration upwards along the Z-axis, which is averagely steady, and (b) an acceleration in a move direction, which is also averagely steady. The accelerations show a considerably characteristic pattern as long as the user holding the mobile device does not walk up an escalator. Therefore, based on detection of such a pattern, it is possible to determine that the user gets on an escalator and ascends or descends. Then, a step-number sensor detects that the user gets out of the escalator, and therefore information of the reference point can be re-set.

As described above, it is possible to obtain the floor number and height information of the floor at which the user holding the mobile device arrives by a lift.

Twenty-Fourth Embodiment

In the twenty-fourth embodiment, the description is given for processing performed when a mobile device touches a NFC tag of a home appliance with reference to FIGS. 254 to 259. Here, the mobile device has a NFC reader/writer, the home appliance has the NFC tag and a home appliance CPU, and a server manages information of the mobile device and information of the home appliance.

With reference to FIG. 254, at Step 951v, the home appliance CPU included in the home appliance regularly records data regarding the home appliance onto a memory in the NFC tag. Therefore, when the mobile device (hereinafter, referred to also as a "mobile terminal") accesses the tag of the home appliance, the home appliance can provide the mobile terminal with information stored in the home appliance which can be read not by the mobile terminal but only by the home appliance CPU.

At Step 951a, the mobile terminal (mobile device) is activated.

At Step 951b, the mobile terminal determines whether or not an application program for operating the home appliance has already been activated on the mobile terminal. If the application program has already been activated (Yes at S951b), then at Step 951c, the display terminal displays "Please touch" on the display device of the mobile terminal, in order to notify the user of that the mobile terminal is ready for touching the tag of the home appliance.

At Step 951d, the mobile terminal determines whether or not the user makes the mobile terminal touch the NFC tag of the home appliance. If it is determined that the user makes the mobile terminal touch the NFC tag (Yes at Step 951d), then the processing proceeds to Step 951e. At Step 951e, the mobile terminal issues a request for reading data from the tag. At Step 951f, the home appliance reads the data from the memory in the tag.

At Step 951g, the home appliance determines whether or not to access the home appliance CPU. If it is determined that it is necessary to access the home appliance CPU (Yes at S951g), then the processing proceeds to Step 951h. At Step 951h, the home appliance accesses to the home appliance CPU. At Step 951j, the home appliance reads information by accessing the home appliance CPU. At Step 951k, the home appliances transmits provides the information read from the home appliance CPU, to the memory in the tag of the home appliance, or stores the information in the home appliance. Then, the processing proceeds to Step 5951m. Therefore, when the mobile terminal accesses the tag of the home appliance, the home appliance can provide the mobile terminal with the information stored in the home appliance which can be read not by the mobile terminal but only by the home appliance CPU.

If the determination at Step 951d is No, then Step 951d is repeated. On the other hand, if the determination at Step 951d is Yes, then the processing proceeds to Step S951e.

If the determination at Step 951g is No, then the processing proceeds to Step 951m.

At Step 951m, the home appliance transmits the required information to the mobile terminal. At Step 951n, the mobile terminal receives the information including a tag ID, a signature, a key ID, an apparatus model, an error code, a use history (the number of uses), log data, a product serial number, an operating state (current state) of the home appliance, a URL, position information, an on-sale mode identifier, and the like.

At Step 951q, the mobile terminal determines whether or not the mobile terminal is within the service range. If the determination at Step 951q is Yes, then the processing proceeds to Step 951r. At Step 951r, the mobile terminal transmits, to the server having an address of the above-mentioned URL, information including a user ID, the tag ID, the signature, the key ID, the apparatus model, the error code, the use history (the number of uses), the log data, the operating state (current state) of the home appliance, the position information, and the on-sale mode identifier. At Step 951s, the server receives the information transmitted from the mobile terminal.

If the determination at Step 951q is No, then the processing proceeds to "11" in FIG. 255.

The following explains FIG. 255.

At Step 952a, the mobile terminal determines whether or not the mobile terminal has an application program corresponding to the apparatus model received from the touched home appliance. If the determination at Step 952a is Yes, then at Step 952i, the mobile terminal activates the application program. Therefore, when the mobile terminal holds the apparatus model information and the application program corresponding to the apparatus model, the mobile terminal can activate the application program even outside the service range.

If the determination at Step 952a is No, then the processing proceeds to Step 952b. At Step 952b, the mobile terminal activates a general local processing routine. At Step 952c, the mobile terminal displays a part of the information read from the tag of the home appliance. Therefore, even if the mobile terminal is outside the service range and does not have the application program corresponding to the apparatus model of the touched home appliance, the mobile terminal can present the user with the information obtained from the home appliance.

At Step 952d, the mobile terminal determines whether or not the error code indicates "error". If the determination at Step 952d is Yes, then the processing proceeds to Step 952e. At Step 952e, the mobile terminal determines whether or not the mobile terminal holds pieces of attribute information each indicating details and the like of a corresponding error code. If the determination at Step 952e is Yes, then the processing proceeds to Step S952f.

If the determination at Step 952e is No, then the processing proceeds to Step 952g. At Step 952g, the mobile terminal displays the apparatus model and the error code or letters converted from the error code, and the processing proceeds to Step S952h. Therefore, even if the mobile terminal does not hold pieces of attribute information each indicating details and the like of the corresponding error code, the mobile terminal can present the user with the error information of the home appliance.

At Step 952f, the mobile terminal displays information for explaining details of the error based on the error code, and the processing proceeds to Step S952h. Therefore, even if the mobile terminal is outside the service range, the mobile terminal holds relationship information indicating a relationship between each error code and error details, and thereby converts an error code provided from the touched home appliance to corresponding error details. As a result, the mobile terminal can present the user with error details based on the error code provided from the home appliance, so that the user can easily understand the error. When a relationship between an error code and error details is to be changed, it is possible that the mobile terminal receives also a manufacturer code from the tag of the home appliance, then manages a relationship table indicating a relationship between each error code and error details for each manufacturer, and changes the relationship. If common error codes for apparatuses are defined by each manufacturer, it is also possible that the mobile terminal receives also a manufacturer code from the tag of the home appliance, then manages a relationship table indicating a relationship between each error code and error details for each manufacturer, and changes the error details. As a result, it is possible to decrease the number of kinds of errors registered in the mobile terminal. Furthermore, it is possible that the mobile terminal manages a relationship table indicating a relationship among a manufacturer code of a manufacturer, an apparatus model of the manufacturer, an error code, and error details, and changes the error details.

At Step 952h, the mobile terminal determines whether or not the mobile terminal holds a telephone number, an e-mail address, or a URL for inquiring an apparatus model of the home appliance. If the determination at Step 952h is Yes, then the processing proceeds to Step S954a of "4" in FIG. 257.

If the determination at Step 952h is No, then the processing proceeds to Step S954b of "10" in FIG. 257.

With reference to FIG. 256, at Step 953a, the mobile terminal determines whether or not the on-sale mode identifier provided from the server or the tag of the home appliance is ON. If the determination at Step 953a is Yes, then the processing proceeds to Step 953b. At Step 953b, the mobile terminal displays a menu screen.

An on-sale mode represented by the on-sale mode identifier indicates that the home appliance is on sale in an electronics retail store. In general distribution of home appliances, products are manufactured by a manufacturer, then a part of them are stored in a warehouse, and a pat selected at random from the stored products are displayed in electronics retail stores. Consumers checks a usability or design of such a displayed product in the electronics retail store. However, there is a problem described below.

The processing from Step 953d offers advantages to the manufacturer, because the processing from Step 953d enables the user to easily perform user registration only by making the mobile terminal touch a target home appliance. Consumers, who touch a product in an electronics retail store, do not always decide to buy the product. If a malicious consumer does not intend to buy a home appliance displayed in a store but makes his/her mobile terminal touch the home appliance, the touching results in registration of the consumer as a user of the home appliance. In recent years, user registration is vital information for a manufacturer to specify purchasers of products to be recalled. Therefore, many manufacturers offer financial or additional merits to purchasers who perform user registration. Therefore, such a situation would increase malicious consumers attempting to perform user registration for products which the consumers do not intend to buy. Technologies of preventing such malicious user registration have been highly demanded. At Steps 953a and 953b, based on the on-sale mode identifier held in the server or the tag of the home appliance, the mobile terminal determines whether or not the home appliance is on sale (at the on-sale mode). If the home appliance is at the on-sale mode, the mobile terminal prohibits user registration for the home appliance and displays a menu screen to notify the on-sale mode. As a result, it is possible to prevent malicious user registration. It is possible that the on-sale mode is changed or referred to by the server. In this case, the server does not need to directly touch the target home appliance. Therefore, the sever can change the on-sale mode for a large number of home appliances at once, or can control the home appliances in distance locations. It is also possible that the on-sale mode is changed or referred to by the home appliance or the tag of the home appliance. In this case, it is possible to change an on-sale mode for each of home appliances displayed in stores, for example.

Referring back to Step 953a, if the determination at Step 953a is No, then the processing proceeds to Step 953c. At Step 953c, the mobile terminal searches a database for a target home appliance based on the tag ID and the apparatus model, and thereby determines whether or not the home appliance has already been registered (in other words, whether or not user registration has already been performed for the home appliance). If the determination at Step 953d is Yes, then the processing proceeds to Step 953e. At Step 953e, the mobile terminal determines whether or not a user ID of the mobile terminal and the user ID registered in the server are identical or belong to the same family. If the determination at Step 953e is Yes, then the processing proceeds to Step 953f. At Step 953f, the mobile terminal displays a menu screen corresponding to a general apparatus model. Therefore, if the mobile terminal has already performed user registration for the home appliance, the mobile terminal does not need to display an unnecessary user registration screen again and again to a purchaser of the home appliance. Recently, almost everyone has one or more mobile terminals. Therefore, for example, if the user performs user registration for a purchased washing machine by using a mobile terminal of his/her father, and makes a mobile terminal of his/her mother touch a NFC tag of the washing machine, it is wrongly determined that a different user requests user registration. As a result, the mobile terminal of the user's mother displays a user registration change screen, even if the father and the mother live in the same home. In order to solve the above problem, as indicated at Step 953e, the user ID of the mobile terminal of the user is associated with user IDs of the mobile terminals of the family members of the user. Therefore, in the above example, if it is determined that the mobile terminal of the user's mother and the mobile terminal of the user's father belong to the same family, it is determined that the user registration has already been performed for the washing machine correctly. As a result, the mobile terminals of the user's family do not need to display a user registration screen again and again.

If the determination at Step 953d is No, then the processing proceeds to Step 953g. At Step 953g, the mobile terminal displays the user registration screen. At Step 953h, the mobile terminal determines whether or not there is position information of a current position of the mobile terminal which is detected by the GPS or the like. If the determination at Step 953h is Yes, the processing proceeds to Step 953j. At Step 953j, the mobile terminal determines whether or not the mobile terminal is positioned at a specific region such as a building in which a target apparatus (an apparatus model of a target home appliance) is on sale. The processing proceeds to "6" in FIG. 259.

If the determination at Step 953e is No, then the processing proceeds to "5" in FIG. 258.

The following explains FIG. 257.

At Step 954a, the mobile terminal displays, on its screen, the above-mentioned telephone number, e-mail address, or URL for inquiring the apparatus model. At Step 954b, the mobile terminal is connected to the server and determines whether or not there is data to be exchanged with the server. If the determination at Step 954b is Yes, then the processing proceeds to Step 954c. Otherwise (No at Step 954b), the processing proceeds to Step 954d, and is completed.

At Step 954c, the mobile terminal displays "Move to the service range" to persuade the user to move into the service range. At Step 954e, the mobile terminal causes the data (information) read from the tag of the home appliance to be in a "savable state" where the data can be saved in a memory. At Step 954f, the mobile terminal determines whether or not the mobile terminal is in the service range. If the determination at Step 954f is Yes, then the processing proceeds to Step 954g. Otherwise (No at Step 954f), then the processing returns to Step 954c.

At Step 954g, the mobile terminal is connected to the server having the URL recorded on the tag of the home appliance or on the mobile terminal. At Step 954h, user authentication is performed. At Step 954j, the mobile terminal transmits, to the server, the data read from the tag or information generated based on the data, or the mobile terminal processes the data or the information by executing an application program provided from the server.

As a result, even if the mobile terminal touches the home appliance outside the service range, after the user moves into the service range, the mobile terminal can display a menu screen regarding user authentication, user registration/change, or the target apparatus.

The following explains FIG. 258.

At Step 955a, the mobile terminal (here, it is assumed that the mobile terminal does not belong to a target building) determines whether or not it is possible to determine a current position of the mobile terminal by using the GPS or the like. If the determination at Step 955a is Yes, then the processing proceeds to Step 955b. At Step 955b, the mobile terminal determines whether or not the determined position (position information) of the mobile terminal almost matches one of pieces of position information registered in the server. If the determination at Step 955b is Yes, then the processing proceeds to Step 955c.

At Step 955c, the mobile terminal determines whether or not the matching position information in the server is assigned with an identifier indicating that "Other users (other user IDs) are accepted". If the determination at Step 955c is Yes, then the processing proceeds to Step 955d. At Step 955d, the mobile terminal is set to be at a guest mode.

On the other hand, if the determination at Step 955c is No, then the processing proceeds to Step 955e and is terminated.

At the guest mode, the mobile terminal (for example, a mobile terminal of a visitor except family members of the user) can operate only a predetermined home appliance at one of the positions registered in the server. For example, it is assumed that a visitor except family members of the user visits the user's home. Here, it is also assumed that the user wishes to allow the visitor to use a mobile terminal of the visitor as a remote controller of a TV in the user's home, but does not want to let anyone except the family members see a laundry history of a user's washing machine. Under such assumption, the TV is assigned with the identifier indicating "Other users (other user IDs) are accepted" which is currently ON, while the washing machine is assigned with the same identifier which is currently OFF. Furthermore, the introduction of the guest mode allows any visitor to use a part of functions of his/her mobile terminal. For example, the gust mode inhibits anyone except family members in a target home from seeing a laundry history of a washing machine in the home, but permits anyone to display an error code of the washing machine on his/her mobile terminal.

If the determination at Step 955b is No, then the processing proceeds to Step 955f. At Step 955f, the mobile terminal displays, on its screen, a question such as "Has the address been changed?" or "Has the owner been changed?" If an answer of the question is Yes, then the processing proceeds to Step 955g. At Step 955g, the mobile terminal displays an address change menu or an user change menu.

As a result, this offers the following advantages. For example, it is assumed that the user moves with his/her home appliances to a new home and therefore a user's address registered in user registration at purchase of the home appliances is changed. Under the assumption, if the user forgets to register a new address in the user registration, the mobile terminal of the user can automatically persuade the user to perform the user registration.

If the determination at Step 955f is No, then the processing proceeds to Step 955h to be continued.

The following describes a variation of the present embodiment in the case where a home appliance is on sale in an electronics retail store, with reference to FIG. 259.

At Step 956a, the mobile terminal determines whether or not the mobile terminal is in a target region. If the determination at Step 956a is Yes, then the processing proceeds to Step 956b. Otherwise (No at Step 956a), the processing proceeds to Step 956c. At Step 956c, the mobile terminal performs user registration for a target home appliance in the target region.

Here, the target region is space information generally indicating one of floors of an electronics retail store. The target region is indicated by GPS information or the like. The determination at Step 956a may be made based on a current position of the mobile terminal, or a beacon of the store. The determination at Step 956a may also be made with reference to home appliance distribution route information and a present time.

This produces the following advantages. For example, if a home appliance is displayed in a retail store, it is possible to prevent a malicious user from performing malicious user registration for the displayed home appliance which the user has not yet purchased.

At Step 956b, the mobile terminal (having a user ID) and the server performs user authentication. At Step 956d, the mobile terminal determines whether or not the user authentication is successful (OK). If the determination at Step 956d is Yes, then the processing proceeds to Step 956e. Otherwise (No at Step 956d), then the processing proceeds to Step 956f and is terminated.

At Step 956e, the mobile terminal requires input of a password of the retail store or a manufacturer of the target home appliance.

At Step 956g, authentication is performed, and the processing proceeds to Step 956h.

At Step 956h, the mobile terminal determines whether or not the authentication is successful (OK). If the determination at Step 956h is Yes, then the processing proceeds to Step 956j. Otherwise (No at Step 956h), then the processing proceeds to Step 956k and is terminated.

At Step 956j, the mobile terminal determines whether or not the password is correct. If the determination at Step 956j is Yes, then the processing proceeds to Step 956m. Otherwise (No at Step 956j), then the processing proceeds to Step 956n and is terminated.

At Step 956m, the mobile terminal is switched to be at the on-sale mode. At Step 956p, the mobile terminal inquires the user whether or not to record an identifier of the on-sale mode (on-sale mode identifier) onto the tag of the home appliance or onto the server.

If the user instructs the mobile terminal to record the on-sale mode identifier (Yes at Step 956p), then the processing proceeds to Step 956q. At Step 956q, the mobile terminal sets the on-sale mode identifier ON in the tag of the home appliance or in the server. At Step 956r, the mobile terminal transmits information regarding the on-sale mode identifier (identifier information) to the server, or encrypts the identifier information, a password, and a key, and transmits the encrypted information to the tag of the home appliance, so that the encrypted information is recorded on a memory region allocated in the tag. At Step 956s, the mobile terminal is still at the on-sale mode.

At Step 956t, the tag of the home appliance performs authentication by using the received password and key as well as a key stored in the tag. At Step 956u, the tag determines whether or not the authentication is successful (OK). If the determination at Step 956u is Yes, then the processing proceeds to Step 956v. At Step 956v, a value representing ON is recorded on the memory region for the on-sale mode identifier in the tag.

Otherwise (No at Step 956u), then the processing proceeds to Step 956w and is terminated.

If the determination at Step 956p is No, then the processing proceeds to Step 956s.

This can produce the following advantages. For example, it is possible to prevent a malicious consumer from changing an on-sale mode of a home appliance displayed in a store without authorization. It is also possible to prevent a malicious consumer from setting an on-sale mode of a home appliance to be OFF and performing user registration for the home appliance which the consumer has not yet purchased. Even if there is no such a non-sale mode, it is possible to prevent that a mobile terminal of a malicious consumer requests the malicious consumer to enter a password of a store or a manufacturer of a home appliance displayed in the store, and that the malicious user performs user registration for the home appliance which the malicious consumer has not purchased.

It should be noted that it has been described that the mobile terminal is switched to be at the on-sale mode at Step 956m. However, it is also possible that the mobile terminal performs user registration at Step 956m. As a result, it is possible to prevent malicious user registration for home appliances not yet been purchased, and also possible to permit sales people in an electronics retail store to perform user registration instead of a purchaser of a target home appliance.

FIG. 260 shows attributes of pieces of information recorded on the tag described in the twenty-third, twenty-fourth, twenty-fifth embodiments and so on.

Twenty-Fifth Embodiment

The following describes the twenty-fifth embodiment of the present invention. FIG. 261 shows a mobile terminal 5201 according to the present embodiment. FIG. 262 shows a home appliance 5211 according to the present embodiment. The present embodiment provides a method of easily increasing an accuracy of positional matching between an antenna unit of a proximity wireless communication module of the mobile terminal 5021 and an antenna unit of a proximity wireless communication module of the home appliance 5211, by using a guidance function of the mobile terminal 5201 and a guidance function of the home appliance 5211 in proximity wireless communication between the mobile terminal 5201 and the home appliance 5211. The mobile terminal 5201 is assumed to be a terminal, such as a Smartphone, which has a front side most of which is occupied by a display unit. In the mobile terminal 5201, an antenna unit of a proximity wireless communication module is assumed to be provided at the rear side of a button unit of the display unit. As shown in FIG. 262, in the home appliance 5211 (general home appliance), an antenna unit of a proximity wireless communication module is provided at a certain part of the home appliance. Furthermore, on the home appliance 5211, a mark 5301, which serves as a certain mark, is provided to a part near the center of the NFC antenna. The mark may be a common sign such as a circle or a cross, or a specific sign representing the proximity wireless communication module. In addition, a mark, such as a manufacturer logo or a product logo, may be used. However, the mark producing higher positional matching effect is a cross 5302 having a vertical longer line and the center that is the center part of the antenna 5302, likewise the mark 5301.

FIG. 263 is a diagram showing display states of a position (antenna position) 5303 of the antenna unit of the proximity wireless communication module of the mobile terminal 5201 according to the present embodiment of the present invention. In using proximity wireless communication, the mobile terminal 5201 according to the present embodiment shows, on a display unit on the front side of the mobile terminal 5201, a position (antenna position) of the antenna unit of the proximity wireless communication module provided on the rear side of the mobile terminal 5201. The antenna position may be displayed depending on the shape of the antenna unit, or may be displayed as a common sign. Furthermore, it is possible to combine a plurality of displaying ways. Here, a kind of the display of the antenna position may be selected by the user. According to the present embodiment, in comparison to the case where the mobile terminal 5201 simply has, on the rear side of the mobile terminal 5201, a display for showing a position of the proximity wireless communication module, the above method can further reduce inconvenient actions of the user for approaching the proximity wireless communication module to a certain position of the home appliance while seeing the rear side of the mobile terminal 5201.

FIG. 264 is a diagram showing display states of a position of the proximity wireless communication module of the home appliance 5211 according to the present embodiment of the present invention. The home appliance 5211 according to the present embodiment displays guidance in using proximity wireless communication. Normally, a position of the tag on the home appliance is indicated by a printed mark. However, when the home appliance 5211 has data to be transmitted to the mobile terminal 5201, the home appliance 5211 clearly displays the existence of the data by using LED or the like. Various kinds of the display are considered in the same manner as described for the mobile terminal 5201. However, the kinds of the display on the home appliance are basically graphics expanding from the position of the proximity wireless communication module of the home appliance. According to the present embodiment, it is possible to clearly display the position of the proximity wireless communication module of the home appliance when proximity wireless communication is required, without deteriorating a simple design of white goods and the like.

FIG. 265 is a diagram showing states of proximity wireless communication between the mobile terminal 5201 and the home appliance 5211 by using their proximity wireless communication modules, according to the present embodiment of the present invention. The user simply approaches the mark displayed on the display unit of the mobile terminal 5201 to the center of the graphic on the home appliance 5211, so that the proximity wireless communication module of the mobile terminal 5201 can approach to the proximity wireless communication module of the home appliance 5211. Therefore, it is considerably easy to perform proximity wireless communication within a limit of a capability of the proximity wireless communication modules. The present embodiment is effective for each of the mobile terminal 5201 side and the home appliance side. However, if both of the mobile terminal 5201 and the home appliance have the function of the present embodiment, further effects can be expected.

FIG. 266 is a diagram showing the situation where the proximity wireless communication display is combined with an acceleration meter and a gyro. If the graphic displayed on the home appliance is not a circle expanding from the proximity wireless communication module, the graphic is assumed to be displayed depend on an inclination of the mobile terminal 5201. Therefore, it is possible to approach the mobile terminal 5201 to the graphic displayed on the home appliance at a desired angle depending on a shape of the graphic. In general, the mobile terminal 5201 is not in a shape of a circle and a square, the present embodiment is efficient to the mobile terminal 5201.

FIG. 267 is a diagram showing the situation where the proximity wireless communication display is cooperated with a camera unit (camera) on the rear side of the mobile terminal 5201. Even if the home appliance displays guidance, the guidance is hidden behind the mobile terminal 5201 and therefore the user cannot see a most part of the guidance. In order to solve the above problem, the camera unit in the mobile terminal 5201 is used to display the guidance on the mobile terminal 5201. Most of mobile terminals (mobile terminal 5201) has a camera unit on the rear side, so that the present embodiment is efficient for the mobile terminals. If the camera unit is provided near the antenna unit of the mobile terminal 5201, an antenna position mark of the antenna unit of the mobile terminal 5201 is displayed on the center of the image taken by the camera unit. Or, a positional matching display is located on the antenna position mark on the display unit. However, if the antenna position mark is not displayed on the center of the image taken by the camera, the following is performed. An autofocus distance data or a size of the antenna position mark is previously downloaded from the server. Then, based on the position of the mobile terminal, the target home appliance is specified. Then, based on the size of the antenna mark, a distance between the mobile terminal and the target home appliance is calculated. Then, based on the distance, a displacement between the center of the camera unit and the antenna unit on the mobile terminal is corrected on the display on the mobile terminal, so that an antenna position mark of the home appliance is displayed on the center of the display on the mobile terminal or on the center of the positional matching display on the mobile terminal.

FIG. 268 is a diagram showing the situation where the mobile terminal 5201 is cooperated with a server 5505 to download an application program from the server 5505 to achieve the present embodiment. In the present embodiment, it is necessary to download an application program onto the mobile terminal 5201. When an application program is to be downloaded, the mobile terminal 5201 transmits model information 5510 indicating a model of the mobile terminal 5201 to the server. Based on the model information 5510, the server searches a coordinate information database 5503 for (a) (a-1) coordinate information of a position of a NFC antenna of the mobile terminal 5201 and (a-2) coordinate information of a position of a display unit 5221 of the mobile terminal 5201 which correspond to the model of the mobile terminal 5201, or (b) information indicating a positional relationship between both pieces of the coordinate information. Especially, if there is identification information indicating whether or not a center position of the antenna unit of the mobile terminal 5201 is on the rear side of the display unit of the mobile terminal 5201 such as a Smartphone, and the identification information indicates "Yes (namely, the center position of the antenna unit is on the rear side)", the server obtains antenna position display coordinate information 5513 (x1, y1) indicating the center position of the antenna unit which is displayed on the display unit, and transmits the antenna position display coordinate information 5513 as well as the target application program 5501 to the mobile terminal 5201. The application program 5501 is displayed when the application program 5501 is read by NFC, so that a position corresponding to the center position of the antenna unit is displayed at the center that is the antenna position display coordinate information 5513 (x1, y1), likewise 5513r, 5513s, 5513r, 5513z, 5513v, 5513a, 5513y, 5513x of the antenna position display coordinate information 5513 (x1, y1) shown in the display examples (5) to (12) in FIG. 263. Especially in the case of the cross display 5521 as shown in (4), when the user matches the antenna position of the antenna unit of the mobile terminal 5201 to the antenna position mark 5321a, 5321b of the home appliance, it is possible to match the antenna position of the mobile terminal to the antenna position of the home appliance with a high accuracy. Therefore, the mobile terminal 5201 can surely read data from the tag on the home appliance. Especially as shown in FIG. 271, for example, in updating or downloading of a home appliance firmware which takes about one minute, if the user has to keep matching the antenna positions for a long time by hand, the present embodiment can produce high effects. A value corresponding to a position of the mobile terminal 5201 is inputted, and thereby a target application program is distributed. It is assumed that the server has a database 5503 holding position information including information indicating a relationship between a position of the antenna unit of the proximity wireless communication of each mobile terminal 5201 and a position of the display unit of each mobile terminal 5201. With the above structure, the server can cope with various kinds of mobile terminal 5201. It should be noted that each of the mobile terminals 5201 may previously hold the antenna position display center coordinates. Even in this case, the same effects of the present embodiment can be produced.

FIG. 269 is a functional block diagram of the mobile terminal 5201 for implementing the present embodiment. A control unit of the mobile terminal 5201 obtains display coordinates of a position of the antenna unit of the mobile terminal 5201, by using a general wireless communication unit. Then, the control unit stores the obtained display coordinates into a display coordinate holding unit. When a proximity wireless communication unit of the mobile terminal 5201 attempts to start proximity wireless communication, the control unit obtains the display coordinates from the display coordinate holding unit, and also obtains a display image from an antenna position display image holding unit. As a result, the control unit displays the display image at the display coordinates on the display unit of the mobile terminal 5201. It is also possible that the control unit displays, on the display unit, also image taken by the camera unit of the mobile terminal 5201. When a proximity wireless communication antenna unit of the mobile terminal 5201 approaches to a proximity wireless communication unit of the target home appliance, proximity wireless communication starts between the mobile terminal 5201 and the home appliance.

FIG. 270 is a diagram showing how the guidance display is changed in the case where a trouble occurs in the home appliance 5211. When a trouble occurs, the home appliance displays a red warning mark. Here, the trouble refers to a state, such as breakdown, where necessity of proximity wireless communication should be immediately notified to the user. After the trouble is notified, the color of the warning mark is changed from red to blue, for example. If the trouble is not urgent, for example, if a filter is to be exchanged or a firmware is requested to be updated, the warning mark is displayed in yellow. Here, the displayed colors are not limited to the above two colors. In addition, the notification to the user may be performed by producing warning sound or the like.

FIG. 271 is a diagram showing the situation of long-time communication. If long-time communication such as firmware updating is to be performed, a remaining time period of the communication is notified to the user. The notification may be displayed on the mobile terminal 5201, or on the home appliance 5211.

FIG. 272 is a diagram of the case where the home appliance 5211 having a display screen displays guidance. The proximity wireless communication module of the home appliance 5211 is not provided at the rear side of the home appliance 5211. The proximity wireless communication module is not provided on the display screen, either. Therefore, the guidance is displayed to allow the user to recognize the proximity wireless communication module provided on a part except the display screen. The guidance display may be a cross or an arrow.

FIG. 273 is a flowchart according to the present embodiment of the present invention. As shown in FIG. 262, a printed mark 5301 is printed on the home appliance 5211. The printed mark 5301 has a length d1 and the center that is located at the center of the antenna 5302. The printed mark 5301 may be tilted. If an event occurs, or if proximity wireless communication has not been performed for a predetermined time period (Step 5201a), then the home appliance 5211 attempts to be connected to the server. At Step 5201b, the home appliance 5211 determines whether or not the home appliance 5211 can be connected to the server via the Internet. If the determination at Step 5201b is Yes, then the home appliance 5211 transmits information to the server (Step 5201k). On the other hand, if the home appliance 5211 cannot be connected to the server via the Internet, or if the home appliance 5211 does not have a communication function, then the home appliance 5211 displays (illuminates) an illuminated mark (5321a, 5321b) in order to connect the home appliance 5211 to the server by proximity wireless communication. The illuminated mark (5321a, 5321b) has a horizontal length d2. At least the horizontal length d2 is longer than a length d1 of the printed mark 5301. The illuminated mark is similar to the illuminated mark shown in FIG. 262 which has the center that is positioned at the center of the antenna unit of the home appliance 5211. More specifically, the illuminated mark is changed in the same manner as the display mark (5321, 5320), as shown (1) to (2) in FIG. 271. It is impossible to turn off the illumination of the printed mark 5301. Therefore, if the printed mark is large, flexibility of design is decreased. However, as shown in (3) in FIG. 271, an illuminated mark (5321e, 5320f) is larger than the printed mark 5301, in other words, d2>d1. Therefore, the illuminated mark (5321e, 5320f) has a shape larger than the mobile terminal 5201 such as a Smartphone. As a result, the illuminated mark does not hide behind the mobile terminal 5201. Therefore, it is possible to easily match a position of the antenna unit of the mobile terminal 5201 to a position of the antenna unit of the home appliance 5211. In the above situation, as shown in (2) in FIG. 270, the illuminated mark 5321 having a cross shape is displayed (blinking) in red color. In the case of general errors except trouble errors, the illuminated mark 5321 is displayed in a different color (for example, blue) ((3) in FIG. 270 or (4) in FIG. 271) (5201c). Here, the trouble errors refer to errors, such as breakdown, which do not occur in normal operation. The general errors refer to errors, such as filter exchange for air conditioners, which occur in normal operation and are not the troubles. If there is any information except errors to be transmitted to the server, it is possible to display something. In the case of errors, a warning sound is produced (5201d) At Step 5201e, the home appliance 5211 determines whether or not proximity wireless communication (touching) has not yet been performed for a predetermined time period since the warning sound. If the touching has not yet been performed for the predetermined time period (Yes at Step 5201e), the home appliance 5211 determines that the user is not near, and therefore stops the warning sound (5201f). Furthermore, the home appliance 5211 makes interval of blinking of the illuminated mark longer or makes the illuminated mark darker (5201g). The home appliance 5211 estimates using hours of the home appliance based on a user history stored in the home appliance 5211. The home appliance 5211 illuminates the mark or makes interval of the illumination blinking shorter only in the using hours, in order to save energy (5201h). Then, the home appliance 5211 determines whether or not touching by the mobile terminal of the user has been performed for a time period longer than the above predetermined time period (5201j). If the touching has not yet been performed for the time period (Yes at Step 5201j), then the home appliance 5211 produces the warning sound again. If the home appliance 5211 detects touching by the mobile terminal of the user (No at Step 5201j), then the home appliance 5211 starts data transfer (5201k). The user notices the illuminated mark or the warning sound of the home appliance 5211 (5202a), and then activates an application program in the mobile terminal 5201 (5202b). According to the application program, the mobile terminal 5201 displays a touch instruction mark on the display unit of the mobile terminal 5201. The touch instruction mark is a cross or a circle having the center that is positioned at a target part on the display unit. The target part on the display unit corresponds to almost the center of the NFC antenna unit provided on the rear side of the display unit (5202c). The mobile terminal 5201 starts transmit radio to the home appliance 5211 via the antenna unit (5202d). At the same time, the user attempts to match the touch instruction mark on the mobile terminal 5201 to the antenna display mark on the home appliance 5211 (5202e). The mobile terminal 5201 repeats polling (5202g). The mobile terminal 5201 determines whether or not the communication starts within a predetermined time period (5202h). If the communication starts within a predetermined time period (No at Step 5205h), then the mobile terminal 5201 reads data from the memory in the proximity wireless communication unit in the home appliance (5203d in FIG. 275). On the other hand, if the communication does not start within the predetermined time period (Yes at 5202h), then the mobile terminal 5201 stops the polling (5202j), and displays "Please match them again" (5203a). Then, the user tries to perform the matching. The mobile terminal 5201 determines whether or not the mobile terminal 5201 can communicate with the home appliance 5211 after the try (5203b). If the communication fails even after the try (No at 5203b), then the mobile terminal 5201 terminates the processing (5203c). In reading data, the mobile terminal 5201 obtains, from a part of the data firstly transmitted, (a) information of a total amount of data to be readout and (b) a communication speed at the home appliance 5211 side (5203e). The mobile terminal 5201 calculates an error ratio based on a state of the communication (5203f). At 5203f, the mobile terminal 5201 may transmit the error ratio to the server. The mobile terminal 5201 calculates a time period required to read data from the home appliance 5211, based on the data amount and the communication speed (5203g). Then, on the display unit, the mobile terminal 5201 displays an estimated time period required to read the data (5204a in FIG. 276). The mobile terminal 5201 also displays a remaining time period as a bar or circle indicator. If the communication is completed (5204b), then the mobile terminal 5201 displays the fact of the communication completion (5204c), and then transmits the readout data to the server (5204d). As the data transfer is progressed from the home appliance 5211 to the mobile terminal 5201 (5204e), the home appliance may make the illuminated mark brighter, make the blinking of the illuminated mark faster, or change the color of the illuminated mark (5204f). If the communication is completed (5204g), the home appliance 5211 notifies the completion to the mobile terminal 5201 (5204h). After the communication completion (5204j), then the home appliance 5211 stops the blinking of the illuminated mark but keeps illuminating of the mark (5204k), and then turns off the illumination after a predetermined time period (5204m).

As described above, in the present embodiment, the mobile terminal such as a Smartphone is touched to (performs proximity wireless communication with) the home appliance and thereby transmits information of the home appliance to the server. Therefore, a very low-cost and simple structure with an antenna and a single IC can receive Internet services. Here, the server can provide data to the user via the mobile terminal anytime. However, connection from the home appliance to the mobile terminal and the server is not achieved until the mobile terminal touches the home appliance. In the present embodiment, however, if the home appliance has not been connected to the server for a predetermined time period, or if the home appliance needs to be connected to the server due to breakdown, the home appliance illuminates a red LED or the like which has the center that is positioned at the center of the NFC antenna unit or produces sound. Thereby, the home appliance requires the user to make the mobile terminal touch the home appliance. Therefore, it is possible to connect the home appliance to the mobile terminal or the server via a human. In addition, the home appliance displays the illuminated mark (illuminated display mark) that has the center that is positioned at the center of the NFC antenna and that is larger than the printed mark. The illuminated mark is larger than a Smartphone (the mobile terminal). Therefore, the cross display of the illuminated mark enables the user to recognize the position of the antenna unit of the home appliance, even if the position of the antenna unit hides behind the Smartphone.

Moreover, in the present embodiment, the memory unit in the mobile terminal such a Smartphone previously holds, as a parameter, coordinate information (x1, y1) to be displayed on the display unit of the mobile terminal. The coordinate information corresponds to the center position of the antenna unit provided on the rear side of the mobile terminal. The coordinate information enables the mobile terminal to display the position of the antenna unit on the display unit. Especially, as shown in (4) in FIG. 263, on the display unit of the mobile terminal, the antenna position mark of the mobile terminal is displayed as a cross at a position corresponding to the mark (5321a, 5321b) indicating a position of the NFC antenna of the home appliance. Therefore, the user can easily match the position of the antenna unit of the mobile terminal to the position of the antenna unit of the home appliance. As a result, it is possible to prevent that a time for starting data transfer is too early, or that an error occurs during long-time downloading. The above-described coordinate information for the display unit of the mobile terminal may be downloaded together with an application program for readout, from the server. Even in this case, the same effects can be produced. Furthermore, a physical position of the antenna unit of the mobile terminal, a physical position of the display unit of the mobile terminal, information indicating a positional relationship between displayed positions, and respective pieces of position information may be used. A cross mark is effective. However, a circle or a square may be displayed on the display unit of the mobile terminal. It is important that the user can easily recognize a mark for the home appliance side and a displayed mark for the mobile terminal side and easily match the marks.

If a mark, such as a displayed mark 5401 in FIG. 272, which indicates a position of the antenna unit of the home appliance such as a TV is displayed on a display screen of the home appliance (TV), even the display screen having a narrow frame can display the mark larger.

In the present embodiment, if the mobile terminal, such as a Smartphone, has an antenna unit on the rear side of the display unit, antenna arrangement identification information is ON. In this case, regarding coordinate position information of a region in the display unit which corresponds to the center of the antenna unit, for example, in the case of the display unit having horizontal 480 pixels×vertical 1200 pixels, the center position of the antenna unit is defined as (x, y)=(200 dots, 400 dots). This enables positions of antenna units of mobile terminals (mobile telephones) manufactured by any manufacturer to be correctly specified. Therefore, normalization and standardization are easy. In this case, it is possible to specify a range of a target antenna, for example, by defining an end point (150, 200) and another end point (250, 500) for a region of the antenna. Furthermore, the above method is performed with a minimum data amount. As a result, a memory is not consumed. The above data may be stored in the mobile terminal. It is also possible to download the data from the server and stored in an antenna coordinate storage dedicated area in the mobile terminal. In this case, the data is inputted to the mobile terminal when the application program for readout is downloaded from the server. As a result, in the downloading of the application program, the mobile terminal can automatically determine a position of the antenna unit. The above-described coordinate information can produce considerable effects.

Furthermore, a folding mobile telephone as shown in FIG. 268 has an antenna unit on the rear side of a button unit. Therefore, based on data (antenna position data) indicating a position of the antenna unit in the mobile terminal 5201m, by (i) illuminating a horizontal direction and a vertical direction which cross to indicate a position of a pressed button corresponding to the position of the antenna unit, or by (ii) providing another display unit, it is possible to display the position of the antenna unit so that the user can match the mark indicating the position of the antenna unit of the mobile telephone to a mark (antenna display mark), such as a cross mark, which indicates a position of the antenna unit of the home appliance. As a result, even conventional mobile telephone can display the antenna positions.

The following describes a method of displaying a standby screen on the mobile terminal in synchronized operation according to the present embodiment, with reference to FIG. 277.

At Step 5205a, on the display unit of the mobile terminal, the mobile terminal selects a reservation screen for a target home appliance. When the reservation screen is selected (Yes), the mobile terminal proceeds to Step 5205b. At Step 5205b, the user inputs a reservation start time, details of reservation processing, and a parameter of a kind of the processing, into the mobile terminal. At Step 5205c, the mobile terminal determines whether or not an operation time period is varied, for example, depending on laundry in the case of a washing machine. If the determination at Step 5205c is Yes, then the processing proceeds to Step 5205d. At Step 5205d, the mobile terminal turns a "forced synchronized operation mode" ON or OFF. Then, the processing proceeds to Step 5205e.

If the determination at Step 5205c is No, then the processing proceeds to Step 5205e.

At Step 5205e, the mobile terminal determines whether or not the mobile terminal touches a target home appliance. If the determination at Step 5205e is Yes, then the processing proceeds to Step 5205f. Otherwise (No at Step 5205e), then Step 5205e is repeated.

At Step 5205f, the mobile terminal transmits an instruction for setting a program or the like to the home appliance. At Step 5205g, the home appliance receives the instruction. At Step 5205h, to the mobile terminal, the home appliance transmits the program data including an estimated time period of processing from a start to an end.

The home appliance proceeds from Step 5205h to Step 5205i. At Step 5205i, the home appliance starts the program. At Step 5205j, the home appliance determines whether or not the enforced synchronized operation mode is ON or whether or not an operation time period is fixed. If the determination at Step 5205j is Yes, then the processing proceeds to Step 5205k. Then, synchronized operation is performed between the mobile terminal and the home appliance. At Step 5205m, for example, if the home appliance such as a washing machine completes its processing in 15 minutes although the processing generally takes 20 minutes at maximum, the home appliance is stopped until 20 minutes pass. Thereby, the home appliance can be operated completely in synchronization with the mobile terminal.

If the determination at Step 5205j is No, then the processing proceeds to Step 5205n. At Step 5205n, the home appliance performs operation not always in synchronization with the mobile terminal.

The processing of the mobile terminal proceeds to Step 5205p. At Step 5205p, the mobile terminal receives the program from the home appliance. At Step 5205q, the mobile terminal starts the program. At Step 5205r, the mobile terminal determines whether or not the forced synchronized operation mode is ON, or whether or not an operation time period is fixed. If the determination at Step 5205r is Yes, then the processing proceeds to Step 5205s. At Step 5205s, the mobile terminal displays the same data as operated in the home appliance. At Step 5205t, the mobile terminal displays a standby screen as shown at 5302a in FIG. 278, and then processing proceeds to Step 5205u. At Step 5205u, the mobile terminal displays an icon for indicating a current state of the target home appliance, such as an icon 5305, 5306, or 5307 in FIG. 278. For example, when an air conditioner (home appliance) starts a reserved operation, the mobile terminal displays an icons for indicating a start time or a remaining time period of the operation, as shown in 5306b, 5305b, or 5306c in FIG. 278. If the user presses one of the icons, the mobile terminal changes the screen to a menu screen for a washing machine as shown at 5303, for example. Here, if the user selects an icon 5309a on the menu screen, the mobile terminal displays a reservation screen like a screen 5304. As a result, the mobile terminal notifies the user outside home of what kind of reservation is made for the washing machine or the air conditioner.

More specifically, in the present embodiment, communication is performed when the mobile terminal touches a target home appliance. However, even if the mobile terminal is not communicating with home appliances, each of the home appliances is forced to operate in synchronization with the mobile terminal according to setting of the application program shared with the mobile terminal. Therefore, the user outside home sees a standby screen of the mobile terminal to check current operation states of the home appliances in home, and the mobile terminal notifies the user of laundry completion, heating start, and the like. As a result, the user can receive services as if the services were provided via a network.

If the determination at Step 5205r is No, then the processing proceeds to Step 5205v. At Step 5205v, the server causes the mobile terminal to displays a time period required for processing of each of home appliances. Here, for example, the mobile terminal displays, on the standby screen, a minimum required time period, a maximum required time period, and a completion time of laundry and drying of a washing machine. In the present embodiment, even if the mobile terminal displays the standby screen 5351a, the application programs for the home appliances are operating. Therefore, the mobile terminal displays icons as shown in (1) in FIG. 278, and also displays current operation states of the home appliances as shown in (2) in FIG. 278. As a result, the user can learn current states of the home appliances without operating the mobile terminal. In the present embodiment, an icon of a home appliance that completes its operation is disappeared from the standby screen. Therefore, the standby screen is simple to see, without unnecessary icons.

Although the communication device according to the present invention has been described with reference to the above embodiments, the present invention is not limited to the above. Those skilled in the art will be readily appreciated that various modifications and combinations of the structural elements and functions in the embodiments are possible without materially departing from the novel teachings and advantages of the present invention. Accordingly, all such modifications and combinations are intended to be included within the scope of the present invention.

It should be noted that it has been described in the embodiment with reference to FIG. 263 that the center of the NFC antenna unit of the mobile terminal is positioned at the rear side of the display unit (such as LCD or LED) of the mobile terminal. However, even if the center of the NFC antenna unit is positioned at the rear side of a part without the display unit, a part of concentric circle having the center that is the center of the NFC antenna unit is displayed on the display unit. In this case, although the center of the concentric circle is not displayed on the display unit, a partial curve line of the concentric circle enables the user to guess the center and match the concentric circle displayed on the mobile terminal to the mark on a target home appliance. As a result, the center of the NFC antenna unit of the mobile terminal can touch the appropriate position of the home appliance.

It should also be noted that it has been described in the embodiment with reference to FIG. 267 that the camera unit of the mobile terminal is used. Here, it is also possible to illuminate a LED illumination provided in the mobile terminal, when the camera unit is activate, when the NFC reader is activated, when a change of electric field strength is occurred due to the mobile terminal touching the home appliance, or when the acceleration sensor or the like detects that the mobile terminal touches the home appliance. The mobile terminal is generally provided with a white LED for a camera flash. Therefore, in the case of using the camera unit, the LED illumination can solve the problem that the mark on the home appliance becomes dark under the mobile terminal and therefore not displayed on the mobile terminal. In this case, a lens of the camera unit is positioned at a range of the NFC antenna unit of the mobile terminal. Therefore, the camera unit can take an image of the antenna unit of the home appliance, without adjusting the image. In this case or in the case where the camera lens is out of alignment, the camera unit recognizes the antenna arrangement mark on the home appliance by recognizing a pattern of the image taken by the camera unit. Therefore, the mobile terminal can detect a displacement between the mark on the mobile terminal and the mark on the home appliance. If the mobile terminal displays arrows (right, left, down, and up arrows) on the screen, the user can adjust the antenna positions correctly. In this case, the adjustment becomes easy if a matching ratio is indicated by sound. As a point is far from the center, louder or higher warning sound is emitted to notify the user of the displacement.

It should also be noted that it has been described in the embodiment with reference to FIG. 268 that the pressing button unit of the mobile terminal 5201m displays illumination cross lines for guiding to the antenna position. However, the method is not familiar to the user using the method at the first time. Therefore, the mobile terminal 5201m displays (a) an overall image of the mobile terminal on the screen, and also displays (b) an image on which the illumination lines on the pressing button unit are to match the antenna mark of the home appliance. As a result, even the user as a beginner can understand that the user needs to match the illumination lines on the pressing button part to the cross mark of the antenna unit of the home appliance. Therefore, operations become easy.

In the embodiment, in general, the guidance for matching the antenna units is displayed on the screen of the mobile terminal. If the NFC unit of the mobile terminal serves as a "reader/writer", the antenna guidance is displayed. On the other hand, if the NFC unit of the mobile terminal serves as an "IC tag", the antenna guidance is not displayed. In some situations, the antenna guidance is not illuminated. As a result, it is possible to eliminate unnecessary display element and unnecessary illuminating of the display unit, thereby saving energy. If the NFC unit of the mobile terminal serves as an "IC tag", the antenna of the reader/writer is large and guidance of the antenna is not necessary. In addition, since the IC tag is used only to provide data, it is not always necessary to illuminate the display unit.

It should also be noted that the mobile terminal may have an illumination display unit, such as a LED, on a part that corresponds to a position of the center of the antenna unit and on the case surface opposite to the NFC antenna side. As a result, when the NFC antenna unit is to face the target, it is possible to clearly notify the user of the center of the NFC antenna unit.

INDUSTRIAL APPLICABILITY

The communication device according to the present invention is suitable as a communication device which can easily serve as an extended user interface by using RF-ID and various sensors in the communication device. Examples of the communication device are a mobile telephone, a Smartphone, and the like. Examples of the extended user interface are a mufti-purpose remote controller of a target home appliance, an interface for downloading a content onto a target home appliance, and the like. Examples of the sensors are a GPS sensor, a motion sensor, and the like. More specifically, the communication device according to the present invention has a motion sensor that detects a direction of the communication device. Therefore, the communication device can easily serve as an extended user interface of a target home appliance.

NUMERICAL REFERENCES

100 communication system
101 terminal apparatus
102 communication device
102a minimum structure part

103 Internet
104 server device
105 controller
106 memory
107 proximity wireless communication unit
108, 109 antenna
110 display unit
111 keys
201 proximity wireless communication unit
202 proximity wireless detection unit
203 apparatus information obtainment unit
204 external communication unit
205 sensor unit
206 position information obtainment unit
207 direction sensor unit
208 directional space calculation unit
209, 309, 409 apparatus specification unit
209a selection unit
210 move determination unit
211 operation information setting unit
212 operation information obtainment unit
213 storage unit
214 display information decision unit
215 operation information transmission unit
216 operation history obtainment unit
217 sound sensor
219 communication antenna
220 receiving unit
221 transmission unit
222 communication control unit
223 acceleration sensor
224 GPS sensor
225 angular velocity sensor
226 orientation sensor
227 absolute position obtainment unit
228 relative position obtainment unit
229 position information calculation unit
2092 apparatus direction calculation unit
2093 difference calculation unit
2094, 3096, 4094 apparatus decision unit
3095 space information storage unit
4092 apparatus candidate output unit
4093 user input receiving unit
4095 apparatus pitch angle detection unit
4096 apparatus pitch angle storage unit
1201 air conditioner
1203 two-dimensional (2D) bar-code
O10, O50 RF-ID unit
O50C, O50D, O50F air conditioner
O51 product ID
O52 first server URL
O53 service ID
O54 accuracy identifier
O60 mobile device
O61 antenna
O62 RF-ID reader/writer
O63 coordinate accuracy identification information
O64 CPU
O65 program execution unit
O66 data processing unit
O67 memory unit
O68d display unit
O68 communication antenna
O70 transmission unit
O71 receiving unit
O72 communication unit
O73 position information storage unit
O74 RF-ID storage unit
O75 RF-ID detection unit
O76 URL unit
O77 reproducing unit
O78 relative position calculation unit
O79 coordinate information sending unit
O80 recording unit
O81 building coordinate information output unit
O82 registered-coordinate unit
O83 determination unit
O84 reference coordinate unit
O85 position information output unit
O86 position information unit
O87, O89 direction information unit
O88 magnetic compass
O90 satellite antenna
O91 position information calculation unit
O92 position information unit
O93 position information correction unit
O94 direction information correction unit
O95, O96, O97 angular velocity sensor
O98, O99, O100 acceleration sensor
O101 first server
O102 registered-coordinate information unit
O103 second server
O104 building coordinate database
O105 integrator
O106 integrator
O107 absolute coordinate calculation unit

The invention claimed is:

[1. A communication device comprising:

an apparatus information obtainment unit configured to obtain, from an apparatus, apparatus information for uniquely identifying the apparatus;

a position information obtainment unit configured to obtain position information indicating a position of said communication device;

an external communication unit configured to perform external communication;

an operation information obtainment unit configured to obtain, via said external communication unit, operation information for allowing said communication device to operate the apparatus, based on the apparatus information;

a storage unit configured to store the position information and the operation information in association with each other, the operation information being obtained by said operation information obtainment unit, and the position information being obtained when said apparatus information obtainment unit obtains the apparatus information and being considered as apparatus position information indicating a position of the apparatus;

a direction sensor unit configured to generate direction information indicating a direction to which said communication device faces;

a directional space calculation unit configured to calculate a directional space based on the position information obtained by said position information obtainment unit and the direction information generated by said direction sensor unit, the directional space being a space pointed by said communication device facing the space;

a selection unit configured to (i) specify the apparatus existing in the directional space based on the apparatus position information stored in said storage unit, and (ii) select, from said storage unit, the operation information associated with the apparatus position information of the specified apparatus; and an operation information transmission unit configured to transmit, based on the operation information selected by said selection unit, a control signal to the apparatus specified by said selection unit so as to allow said communication device to operate the apparatus.]

[2. The communication device according to claim 1, further Comprising a proximity wireless communication unit configured to perform proximity wireless communication, wherein said apparatus information obtainment unit is configured to obtain the apparatus information regarding the apparatus via said proximity wireless communication unit.]

3. [The communication device according to claim 2,] *A communication device comprising:*

*an apparatus information obtainment unit configured to obtain, from an apparatus, apparatus information for uniquely identifying the apparatus;*

*a position information obtainment unit configured to obtain position information indicating a position of said communication device;*

*an external communication unit configured to perform external communication;*

*an operation information obtainment unit configured to obtain, via said external communication unit, operation information for allowing said communication device to operate the apparatus, based on the apparatus information;*

*a storage unit configured to store the position information and the operation information in association with each other, the operation information being obtained by said operation information obtainment unit, and the position information being obtained when said apparatus information obtainment unit obtains the apparatus information and being considered as apparatus position information indicating a position of the apparatus;*

*a direction sensor unit configured to generate direction information indicating a direction to which said communication device faces;*

*a directional space calculation unit configured to calculate a directional space based on the position information obtained by said position information obtainment unit and the direction information generated by said direction sensor unit, the directional space being a space which is pointed by said communication device facing the space and is within a range having a predetermined angle with respect to a direction pointed by said communication device;*

*a selection unit configured to (i) specify the apparatus existing in the directional space based on the apparatus position information stored in said storage unit, and (ii) select, from said storage unit, the operation information associated with the apparatus position information of the specified apparatus;*

*an operation information transmission unit configured to transmit, based on the operation information selected by said selection unit, a control signal to the apparatus specified by said selection unit so as to allow said communication device to operate the specified apparatus; and*

*a proximity wireless communication unit configured to perform proximity wireless communication,*

*wherein said apparatus information obtainment unit is configured to obtain the apparatus information regarding the apparatus via said proximity wireless communication unit, and* wherein said selection unit includes:

an apparatus direction calculation unit configured, when there are a plurality of apparatuses including the apparatus in the directional space, to calculate plural pieces of apparatus direction information based on the position information of said communication device and plural pieces of apparatus position information including the apparatus position information, the plural pieces of apparatus direction information each indicating a direction from said communication device to a corresponding one of the apparatuses, and the plural pieces of apparatus position information being stored in said storage unit and each indicating a position of the corresponding one of the apparatuses;

a difference calculation unit configured to calculate a difference between the direction information of said communication device and each of the plural pieces of apparatus direction information; and an apparatus decision unit configured to decide, as the specified apparatus existing in the directional space, an apparatus having the difference that is smaller than a predetermined value from among the apparatuses, the difference being calculated by said difference calculation unit.

[4. The communication device according to claim 2, wherein said selection unit includes:

a space information storage unit configured to store space information indicating (a) a space and (b) an arrangement of the apparatus in the space; and an apparatus decision unit configured, when there are a plurality of apparatuses including the apparatus in the directional space, to (i) obtain the space information including information of a space in which said communication device exists from said space information storage unit based on the position information of said communication device, and (ii) decide, as the specified apparatus existing in the directional space, an apparatus existing in the space in which said communication device exists based on the obtained space information.]

5. [The communication device according to claim 2, further comprising] *A communication device comprising:*

*an apparatus information obtainment unit configured to obtain, from an apparatus, apparatus information for uniquely identifying the apparatus;*

*a position information obtainment unit configured to obtain position information indicating a position of said communication device;*

*an external communication unit configured to perform external communication;*

*an operation information obtainment unit configured to obtain, via said external communication unit, operation information for allowing said communication device to operate the apparatus, based on the apparatus information;*

*a storage unit configured to store the position information and the operation information in association with each other, the operation information being obtained by said operation information obtainment unit, and the position information being obtained when said apparatus information obtainment unit obtains the apparatus information and being considered as apparatus position information indicating a position of the apparatus;*

*a direction sensor unit configured to generate direction information indicating a direction to which said communication device faces;*

*a directional space calculation unit configured to calculate a directional space based on the position information*

*obtained by said position information obtainment unit and the direction information generated by said direction sensor unit, the directional space being a space which is pointed by said communication device facing the space and is within a range having a predetermined angle with respect to a direction pointed by said communication device;*

*a selection unit configured to (i) specify the apparatus existing in the directional space based on the apparatus position information stored in said storage unit, and (ii) select, from said storage unit, the operation information associated with the apparatus position information of the specified apparatus;*

*an operation information transmission unit configured to transmit, based on the operation information selected by said selection unit, a control signal to the apparatus specified by said selection unit so as to allow said communication device to operate the specified apparatus; and*

*a proximity wireless communication unit configured to perform proximity wireless communication,*

*wherein said apparatus information obtainment unit is configured to obtain the apparatus information regarding the apparatus via said proximity wireless communication unit,*

*wherein said communication device further comprises* a display unit, wherein said selection unit includes:

a pitch angle detection unit configured to generate pitch angle information indicating an angle of a pitch direction of said communication device;

a pitch angle information storage unit configured to store the pitch angle information in association with the apparatus information; and an apparatus decision unit configured to decide, as the specified apparatus existing in the directional space, an apparatus selected by a user from an apparatus candidate list displayed on said display unit, wherein said display unit is configured to display, as the apparatus candidate list, apparatuses existing in the directional space, based on plural pieces of apparatus position information including the apparatus position information stored in said storage unit and plural pieces of pitch angle information including the pitch angle information stored in said pitch angle information storage unit, and

*wherein* said pitch angle detection unit is configured to store the generated pitch angle information into said pitch angle information storage unit in association with the apparatus decided by said apparatus decision unit.

6. The communication device according to claim 5, further comprising an apparatus state obtainment unit configured to obtain an operation state of the apparatus, wherein said display unit is further configured to display, based on the operation state obtained by said apparatus state obtainment unit, (a) the apparatus candidate list and (b) plural pieces of operation information including the operation information associated with respective apparatuses in the apparatus candidate list.

7. [The communication device according to claim 2,] *A communication device comprising:*

*an apparatus information obtainment unit configured to obtain, from an apparatus, apparatus information for uniquely identifying the apparatus;*

*a position information obtainment unit configured to obtain position information indicating a position of said communication device;*

*an external communication unit configured to perform external communication;*

*an operation information obtainment unit configured to obtain, via said external communication unit, operation information for allowing said communication device to operate the apparatus, based on the apparatus information;*

*a storage unit configured to store the position information and the operation information in association with each other, the operation information being obtained by said operation information obtainment unit, and the position information being obtained when said apparatus information obtainment unit obtains the apparatus information and being considered as apparatus position information indicating a position of the apparatus;*

*a direction sensor unit configured to generate direction information indicating a direction to which said communication device faces;*

*a directional space calculation unit configured to calculate a directional space based on the position information obtained by said position information obtainment unit and the direction information generated by said direction sensor unit, the directional space being a space which is pointed by said communication device facing the space and is within a range having a predetermined angle with respect to a direction pointed by said communication device;*

*a selection unit configured to (i) specify the apparatus existing in the directional space based on the apparatus position information stored in said storage unit, and (ii) select, from said storage unit, the operation information associated with the apparatus position information of the specified apparatus;*

*an operation information transmission unit configured to transmit, based on the operation information selected by said selection unit, a control signal to the apparatus specified by said selection unit so as to allow said communication device to operate the specified apparatus; and*

*a proximity wireless communication unit configured to perform proximity wireless communication,*

*wherein said apparatus information obtainment unit is configured to obtain the apparatus information regarding the apparatus via said proximity wireless communication unit,* wherein said apparatus information obtainment unit further includes:

an absolute position generation unit configured to generate absolute position information of said communication device; and a relative position generation unit configured to generate relative position information of said communication device, the relative position information indicating a position moved from a position indicated by said absolute position information, *and* wherein the position information is generated from the absolute position information and the relative position information.

8. The communication device according to claim 7, further comprising a still determination unit configured to obtain move information of said communication device from the relative position information and the direction information, and determine, based on the move information, whether or not said communication device is still, wherein said direction sensor unit is configured to generate the direction information indicating a direction to which said communication device faces, when said still determination unit determines that said communication device is still.

9. The communication device according to claim 7, wherein, when it is determined based on the apparatus information that it is possible to obtain the apparatus position information from said storage unit, said position information obtainment unit is configured to (i) store, into said storage unit, the absolute position information generated by said absolute position obtainment unit as the apparatus position information, and (ii) initialize the relative position information generated by said relative position generation unit.

[10. The communication device according to claim 2, further comprising a display unit, wherein, when it is determined, based on the direction information and the position information, that said communication device is outside a communicable range where said operation information transmission unit is capable of transmitting the control signal to the apparatus, said display unit is configured to display a fact that said communication device is outside the communicable range, when said operation information transmission unit is to transmit the control signal to the apparatus.]

[11. The communication device according to claim 2, further comprising a sound sensor unit configured to detect sound information produced by the apparatus, wherein said communication device determines, based on the sound information detected by said sound sensor unit, whether or not the transmission of the control signal to the apparatus is successful.]

12. [The communication device according to claim 11, further comprising] *A communication device comprising:*

*an apparatus information obtainment unit configured to obtain, from an apparatus, apparatus information for uniquely identifying the apparatus;*

*a position information obtainment unit configured to obtain position information indicating a position of said communication device;*

*an external communication unit configured to perform external communication;*

*an operation information obtainment unit configured to obtain, via said external communication unit, operation information for allowing said communication device to operate the apparatus, based on the apparatus information;*

*a storage unit configured to store the position information and the operation information in association with each other, the operation information being obtained by said operation information obtainment unit, and the position information being obtained when said apparatus information obtainment unit obtains the apparatus information and being considered as apparatus position information indicating a position of the apparatus;*

*a direction sensor unit configured to generate direction information indicating a direction to which said communication device faces;*

*a directional space calculation unit configured to calculate a directional space based on the position information obtained by said position information obtainment unit and the direction information generated by said direction sensor unit, the directional space being a space which is pointed by said communication device facing the space and is within a range having a predetermined angle with respect to a direction pointed by said communication device;*

*a selection unit configured to (i) specify the apparatus existing in the directional space based on the apparatus position information stored in said storage unit, and (ii) select, from said storage unit, the operation information associated with the apparatus position information of the specified apparatus;*

*an operation information transmission unit configured to transmit, based on the operation information selected by said selection unit, a control signal to the apparatus specified by said selection unit so as to allow said communication device to operate the specified apparatus; and*

*a proximity wireless communication unit configured to perform proximity wireless communication,*

*wherein said apparatus information obtainment unit is configured to obtain the apparatus information regarding the apparatus via said proximity wireless communication unit,*

*wherein said communication device further comprises a sound sensor unit configured to detect sound information produced by the apparatus,*

*wherein said communication device determines, based on the sound information detected by said sound sensor unit, whether or not the transmission of the control signal to the apparatus is successful,*

*wherein said communication device further comprises* an operation history obtainment unit configured to obtain an operation history including a history of the transmission of the control signal to the apparatus, *and* wherein said communication device transmits the operation history to a server by performing the external communication, when it is determined that the transmission of the control signal to the apparatus is successful.

13. The communication device according to claim 5, wherein the apparatus information further includes individual identification information for identifying a user of said communication device, and said communication device controls the display on said display unit, based on the individual identification information.

14. [The communication device according to claim 2,] *A communication device comprising:*

*an apparatus information obtainment unit configured to obtain, from an apparatus, apparatus information for uniquely identifying the apparatus;*

*a position information obtainment unit configured to obtain position information indicating a position of said communication device;*

*an external communication unit configured to perform external communication;*

*an operation information obtainment unit configured to obtain, via said external communication unit, operation information for allowing said communication device to operate the apparatus, based on the apparatus information;*

*a storage unit configured to store the position information and the operation information in association with each other, the operation information being obtained by said operation information obtainment unit, and the position information being obtained when said apparatus information obtainment unit obtains the apparatus informa-*

*tion and being considered as apparatus position information indicating a position of the apparatus;*

*a direction sensor unit configured to generate direction information indicating a direction to which said communication device faces;*

*a directional space calculation unit configured to calculate a directional space based on the position information obtained by said position information obtainment unit and the direction information generated by said direction sensor unit, the directional space being a space which is pointed by said communication device facing the space and is within a range having a predetermined angle with respect to a direction pointed by said communication device;*

*a selection unit configured to (i) specify the apparatus existing in the directional space based on the apparatus position information stored in said storage unit, and (ii) select, from said storage unit, the operation information associated with the apparatus position information of the specified apparatus;*

*an operation information transmission unit configured to transmit, based on the operation information selected by said selection unit, a control signal to the apparatus specified by said selection unit so as to allow said communication device to operate the specified apparatus; and*

*a proximity wireless communication unit configured to perform proximity wireless communication,*

*wherein said apparatus information obtainment unit is configured to obtain the apparatus information regarding the apparatus via said proximity wireless communication unit,* wherein said operation information obtainment unit is configured to obtain external communication operation information of the apparatus for allowing said communication device to operate the apparatus via said external communication unit, when it is determined, based on the position information obtained by said position information obtainment unit, that the apparatus does not exist in a range where said operation information transmitting unit is capable of transmitting the control signal to the apparatus, and

*wherein* said communication device operates the apparatus via said external communication unit based on the external communication operation information.

[15. The communication device according to claim 1, wherein said apparatus information obtainment unit includes a reading unit configured to read the apparatus information from an image regarding the apparatus information, the image being provided on the apparatus.]

* * * * *